US008847522B2

(12) United States Patent
Nashiki et al.

(10) Patent No.: US 8,847,522 B2
(45) Date of Patent: Sep. 30, 2014

(54) RELUCTANCE MOTOR WITH IMPROVED STATOR STRUCTURE

(75) Inventors: Masayuki Nashiki, Komaki (JP); Tomokazu Ishikawa, Nagoya (JP); Yuichiro Ito, Kariya (JP)

(73) Assignee: Denso Corporation, Kariya (JP)

( * ) Notice: Subject to any disclaimer, the term of this patent is extended or adjusted under 35 U.S.C. 154(b) by 1160 days.

(21) Appl. No.: 12/617,973

(22) Filed: Nov. 13, 2009

(65) Prior Publication Data

US 2010/0123426 A1    May 20, 2010

(30) Foreign Application Priority Data

Nov. 14, 2008  (JP) ................................ 2008-292142
May 15, 2009   (JP) ................................ 2009-119063

(51) Int. Cl.
| | |
|---|---|
| *H02P 25/08* | (2006.01) |
| *H02K 3/34* | (2006.01) |
| *H02K 3/28* | (2006.01) |
| *H02K 16/02* | (2006.01) |
| *H02K 1/12* | (2006.01) |
| *H02K 1/24* | (2006.01) |
| *H02K 21/44* | (2006.01) |
| *H02K 1/14* | (2006.01) |
| *H02K 1/16* | (2006.01) |
| *H02K 1/27* | (2006.01) |
| *H02K 21/14* | (2006.01) |
| *H02K 41/03* | (2006.01) |

(52) U.S. Cl.
CPC .............. *H02P 25/085* (2013.01); *H02K 3/345* (2013.01); *H02K 3/28* (2013.01); *H02K 2201/18* (2013.01); *H02K 1/276* (2013.01); *H02K 16/02* (2013.01); *H02K 21/14* (2013.01); *H02K 1/12* (2013.01); *H02K 1/246* (2013.01); *H02K 21/44* (2013.01); *H02K 1/146* (2013.01); *H02K 41/03* (2013.01); *H02K 1/165* (2013.01)
USPC ........ 318/254.1; 318/701; 318/125; 318/702; 318/436; 318/400.17; 310/90; 310/168; 310/166; 310/162

(58) Field of Classification Search
CPC ..... H02P 25/08; H02P 25/082; H02P 25/083; H02P 25/085; H02P 6/182; H02P 6/002; H02K 19/103; H02K 1/146; H02K 21/16; H02K 24/00; H02K 1/148; H02K 1/16; H02K 3/28; H02K 1/246; H02K 17/12; H02K 1/08; F16D 2066/005; F16D 2125/40; F16D 2127/06; F16D 2125/48; B60T 8/1893; G04C 3/065; G04C 3/068; G04C 3/066; G04C 3/069; G04C 3/0278; B60L 2220/18
USPC ......... 318/254, 772, 773, 701, 254.1, 400.17; 310/166, 162, 168
See application file for complete search history.

(56) References Cited

U.S. PATENT DOCUMENTS

| | | | | |
|---|---|---|---|---|
| 4,389,605 | A * | 6/1983 | Noda ............................ | 318/696 |
| 5,260,635 | A * | 11/1993 | Bahn ............................ | 318/701 |
| 5,545,938 | A | 8/1996 | Mecrow | |
| 5,619,113 | A | 4/1997 | Bahn | |
| 5,652,492 | A * | 7/1997 | Bahn ............................ | 318/696 |
| 5,841,358 | A * | 11/1998 | Jamieson ..................... | 340/648 |
| 5,852,334 | A | 12/1998 | Pengov | |
| 5,973,431 | A * | 10/1999 | Li et al. ......................... | 310/168 |
| 6,081,083 | A * | 6/2000 | Nashiki ...................... | 318/254.2 |
| 6,252,325 | B1 | 6/2001 | Nashiki | |
| 6,590,312 | B1 | 7/2003 | Seguchi et al. | |
| 7,078,839 | B2 * | 7/2006 | Kim ............................ | 310/90.5 |
| 7,554,281 | B2 | 6/2009 | Satake et al. | |
| 7,622,840 | B2 | 11/2009 | Yonemori et al. | |
| 7,723,889 | B2 | 5/2010 | Kusase et al. | |
| 2005/0189843 | A1 | 9/2005 | Imai et al. | |
| 2008/0143114 | A1 | 6/2008 | Kusase et al. | |
| 2008/0197739 | A1 | 8/2008 | Nashiki | |
| 2008/0278010 | A1 | 11/2008 | Ishikawa et al. | |
| 2009/0021089 | A1 * | 1/2009 | Nashiki ........................ | 310/46 |
| 2009/0134734 | A1 | 5/2009 | Nashiki | |
| 2009/0236930 | A1 | 9/2009 | Nashiki | |
| 2010/0201294 | A1 | 8/2010 | Yuuki et al. | |
| 2010/0259136 | A1 | 10/2010 | Hiramoto et al. | |

FOREIGN PATENT DOCUMENTS

| | | | |
|---|---|---|---|
| CN | 86 1 05770 A | 2/1988 | |
| JP | S61-191248 | 8/1986 | |
| JP | H03-032387 | 2/1991 | |
| JP | 4-43380 | 4/1992 | |
| JP | H06-038472 | 2/1994 | |
| JP | 07-046808 | 2/1995 | |
| JP | 7-504079 | 4/1995 | |
| JP | H07-163124 | 6/1995 | |
| JP | A-H07-308088 | 11/1995 | |
| JP | 08-126273 | 5/1996 | |
| JP | A-H08-116651 | 5/1996 | |
| JP | 11-191987 | 7/1999 | |
| JP | 11191987 A * | 7/1999 | |
| JP | 11-289726 | 10/1999 | |
| JP | 11-513876 | 11/1999 | |
| JP | 2001-268866 | 9/2001 | |
| JP | 2002-027785 | 1/2002 | |
| JP | 2002-272071 | 9/2002 | |
| JP | 2003-180059 | 6/2003 | |
| JP | 2005-080432 | 3/2005 | |
| JP | 2005-110431 | 4/2005 | |
| JP | 2005-261182 | 9/2005 | |
| JP | WO 2006/123659 | 11/2006 | |
| JP | 2007-037213 | 2/2007 | |
| JP | 2008-148519 | 6/2008 | |
| JP | 2008-283785 | 11/2008 | |
| JP | 2009-072046 | 4/2009 | |
| WO | WO 2005/112249 | 11/2005 | |
| WO | 2006/123659 | 11/2006 | |
| WO | WO 2006/126552 | 11/2006 | |
| WO | WO 2009/057467 | 5/2009 | |

OTHER PUBLICATIONS

Japanese Office Action dated Jan. 8, 2013 issued in corresponding Japanese Application No. 2011-096953 with English Translation.
Japanese Office Action dated Jan. 8, 2013 issued in corresponding Japanese Application No. 2011-096986 with English Translation.
Japanese Office Action dated Jan. 8, 2013 issued in corresponding Japanese Application No. 2011-097022 with English Translation.
Japanese Office Action dated Jan. 8, 2013 issued in corresponding Japanese Application No. 2011-097057 with English Translation.
Japanese Office Action dated Jan. 8, 2013 issued in corresponding Japanese Application No. 2011-097096 with English Translation.
Japanese Office Action dated Feb. 22, 2011 issued in corresponding Japanese Application No. 2009-119063 with English Translation.
Chinese Office Action dated Feb. 22, 2012 issued in corresponding Chinese Application No. 2009-11000239.4, with English Translation.
Japanese Office Action dated Jul. 5, 2011 issued in corresponding Japanese Application No. 2008-292142 with English Translation.
Japanese Office Action dated Aug. 31, 2010 issued in corresponding Japanese Application No. 2008-292142 with English Translation.
Japanese Office Action issued for Japanese Patent Application No. 2011-096921, dated Mar. 28, 2013 with English Translation—5 pages.
Notification of Reasons for Rejection issued for Japanese Patent Application No. 2011-096953, dated Sep. 26, 2013 (with partial English translation).
Notification of Reasons for Rejection issued for Japanese Patent Application No. 2011-097057, dated Sep. 26, 2013 (with partial English translation).
Notification of Reasons for Rejection issued for Japanese Patent Application No. 2011-097096, dated Sep. 26, 2013 (with partial English translation).

* cited by examiner

*Primary Examiner* — Shawki S Ismail
*Assistant Examiner* — Jorge L Carrasquillo
(74) *Attorney, Agent, or Firm* — Nixon & Vanderhye P.C.

(57) ABSTRACT

In a motor, a stationary member is provided with a number M (M is a positive integer) of first poles within 360 electrical degrees at spaces therebetween. A plurality of windings are at least partly wound in the spaces, respectively. A movable member is movably arranged relative to the stationary member and provided with a number K (K is a positive integer) of second poles. The number K of second poles is different from the number M of first poles. A unidirectional current supply unit supplies a unidirectional current to at least one of the windings so as to create an attractive force between at least one of the first poles and a corresponding at least one of the second poles to thereby move the movable member relative to the stationary member.

81 Claims, 87 Drawing Sheets

FIG.4
(a)
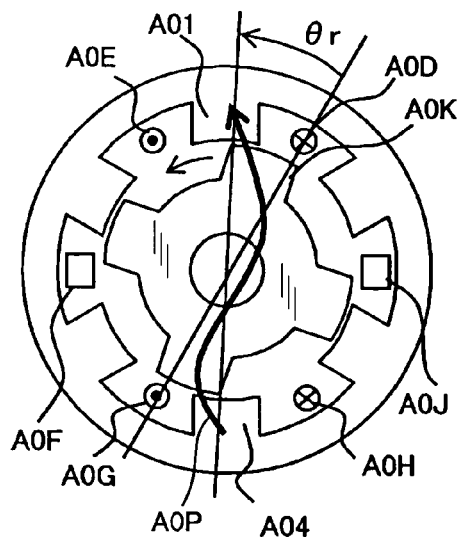
(b)
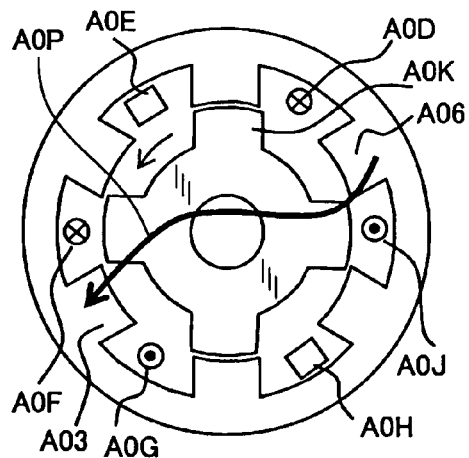
(c)
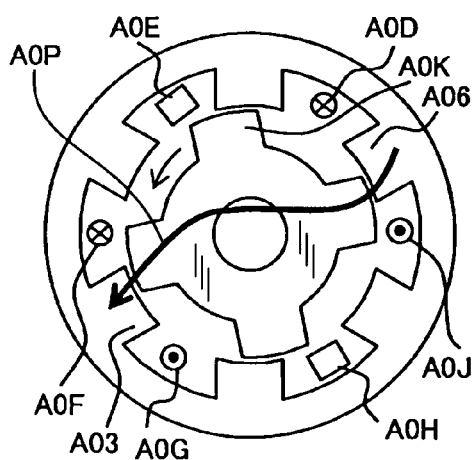
(d)
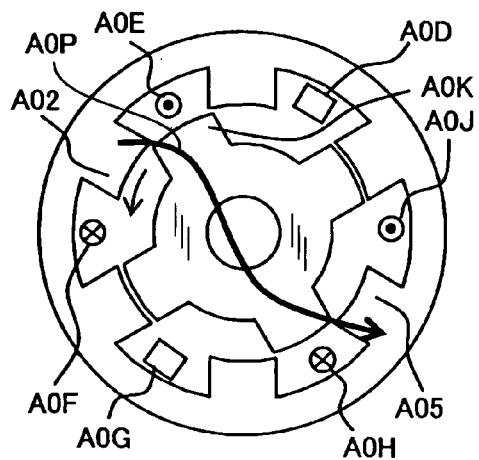

FIG.7
(a)
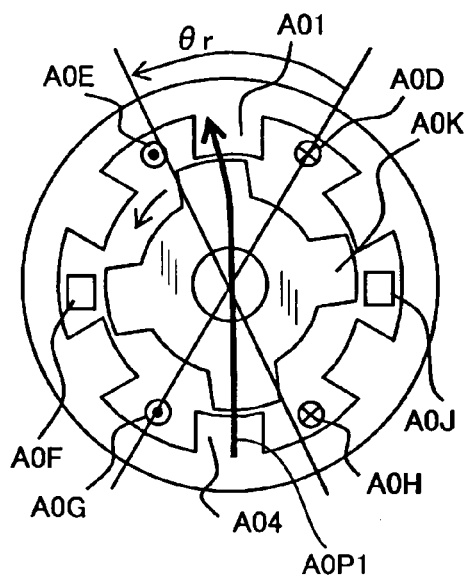
(b)
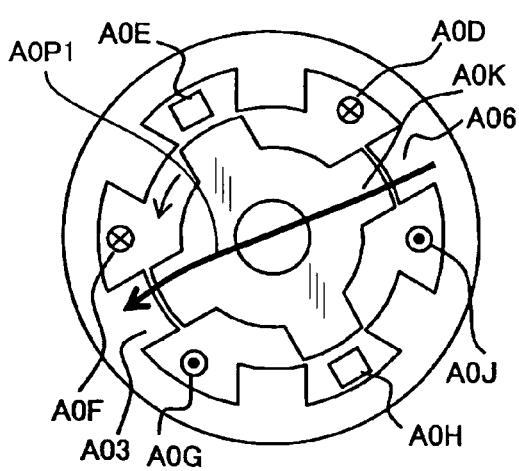
(c)
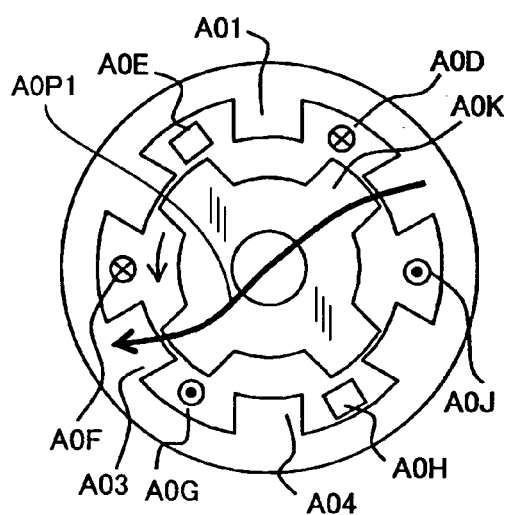
(d)
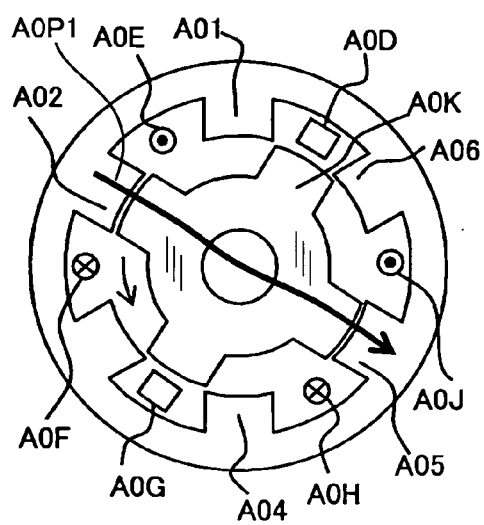

| K \ M | 4 | 6 | 8 | 10 | 12 | 14 | ..... |
|---|---|---|---|---|---|---|---|
| 2 | 4S2R | 6S2R | 8S2R | 10S2R | 12S2R | 14S2R | ..... |
| 4 |  | 6S4R | 8S4R | 10S4R | 12S4R | 14S4R | ..... |
| 6 | 4S6R |  | 8S6R | 10S6R | 12S6R | 14S6R | ..... |
| 8 | 4S8R | 6S8R |  | 10S8R | 12S8R | 14S8R | ..... |
| 10 | 4S10R | 6S10R | 8S10R |  | 12S10R | 14S10R | ..... |
| 12 | 4S12R | 6S12R | 8S12R | 10S12R |  | 14S12R | ..... |
| 14 | 4S14R | 6S14R | 8S14R | 10S14R | 12S14R |  | ..... |
| ⋮ | ⋮ | ⋮ | ⋮ | ⋮ | ⋮ | ⋮ | |

FIG.28
(a) 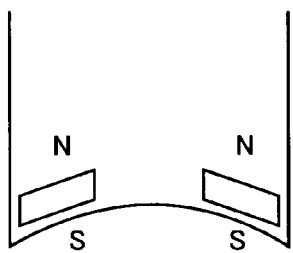
(b) 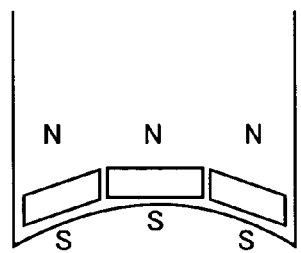
(c) 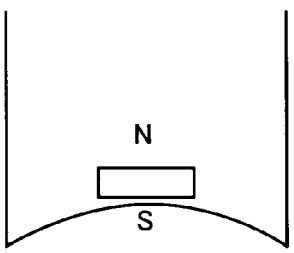
FIG.29
(a) 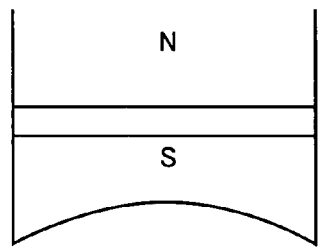
(b) 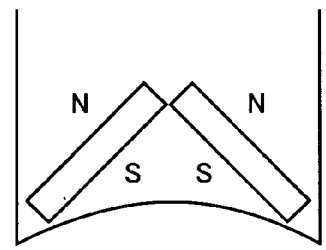
(c) 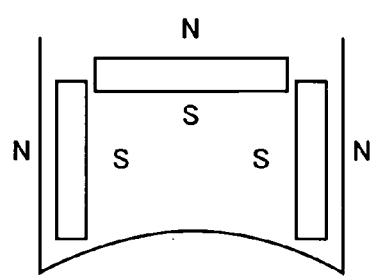
(d) 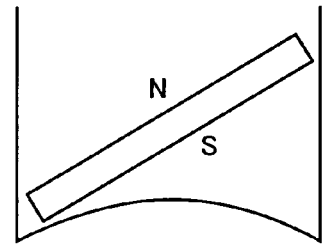

FIG.31
(a)
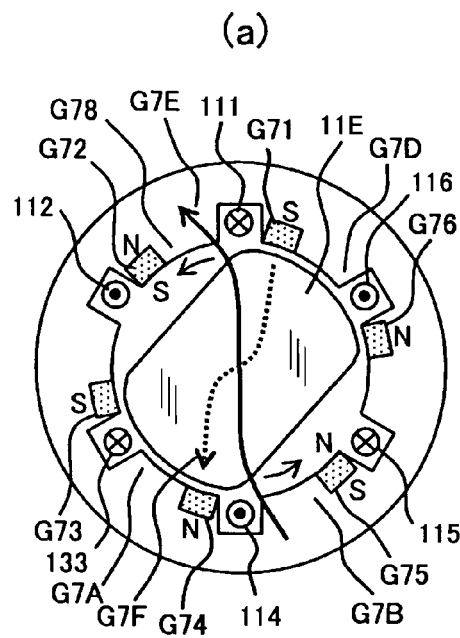
(b)
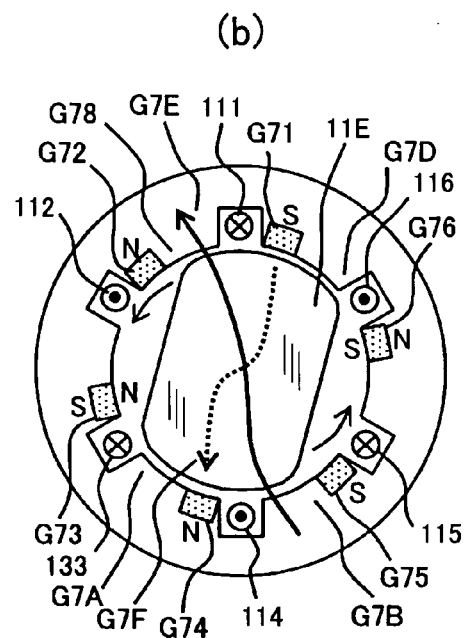
(c)
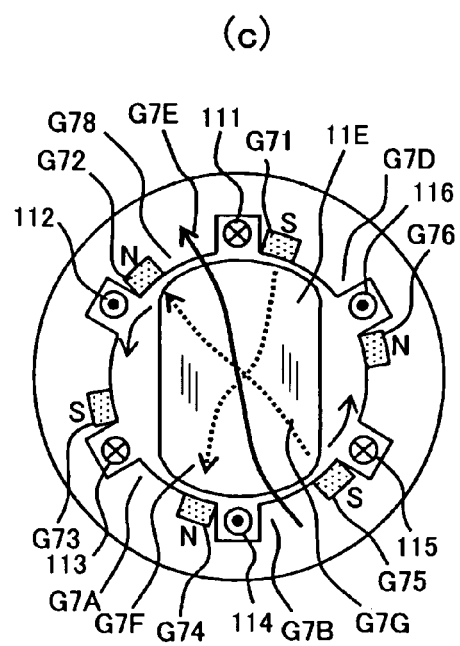
(d)
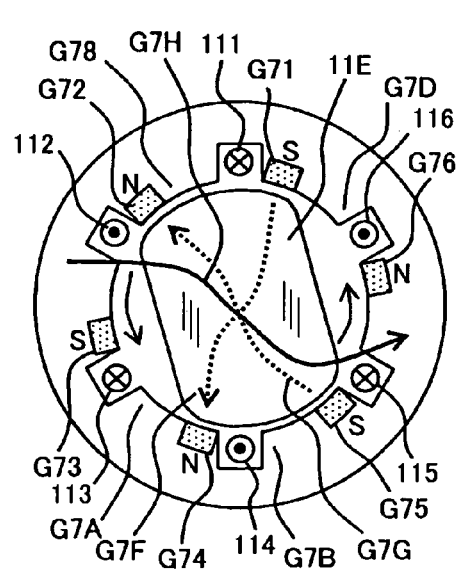

FIG.32
(a)
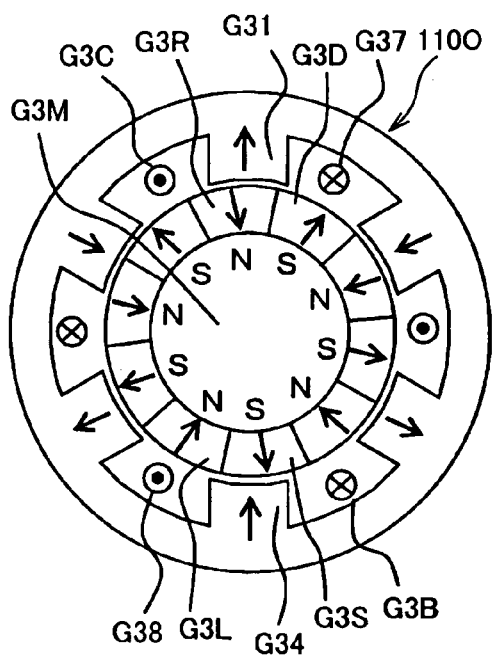
(b)
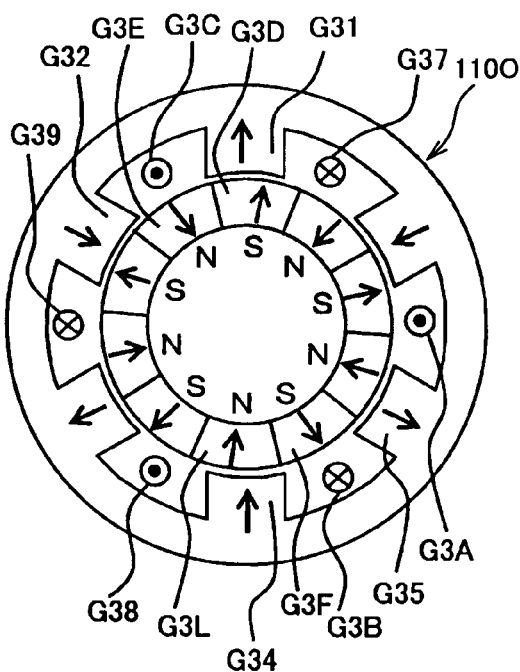
(c)
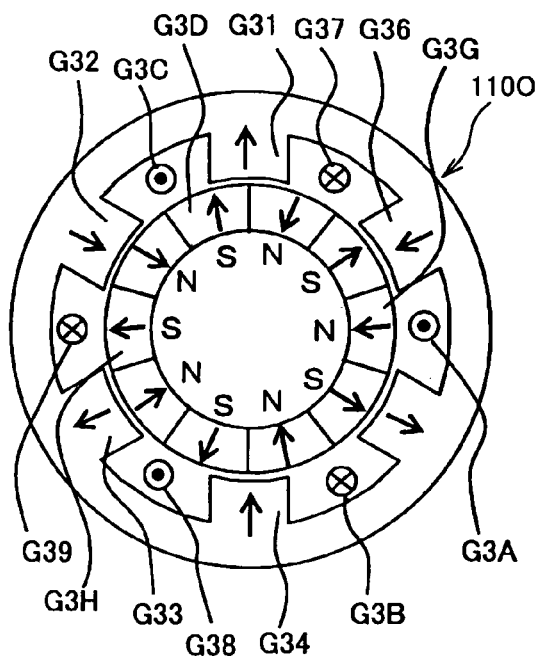
(d)
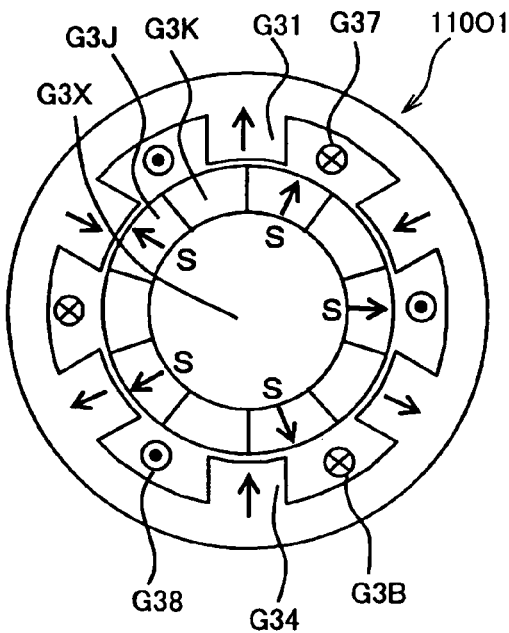

FIG.35
(a)
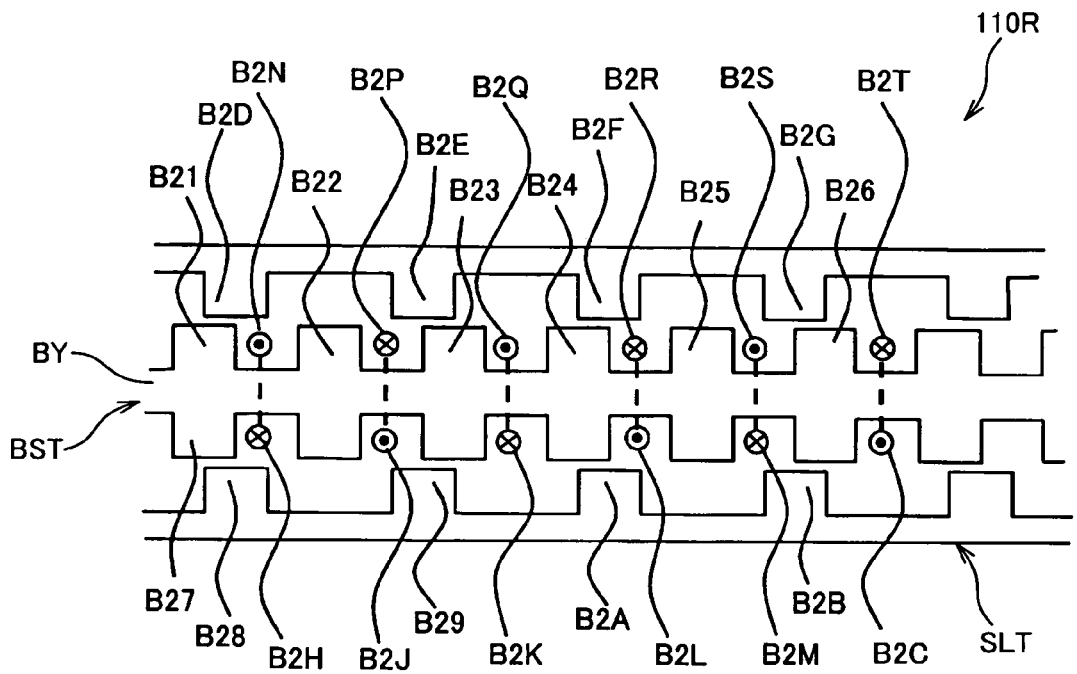
(b)
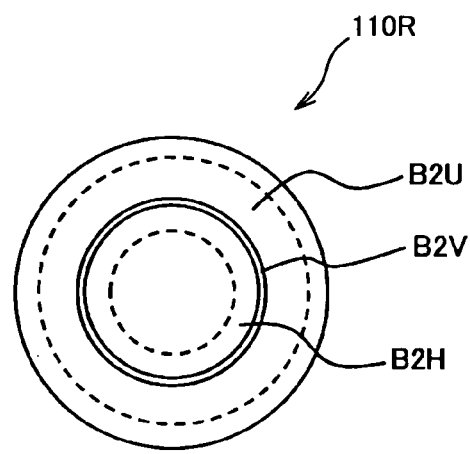

FIG.39
(a)
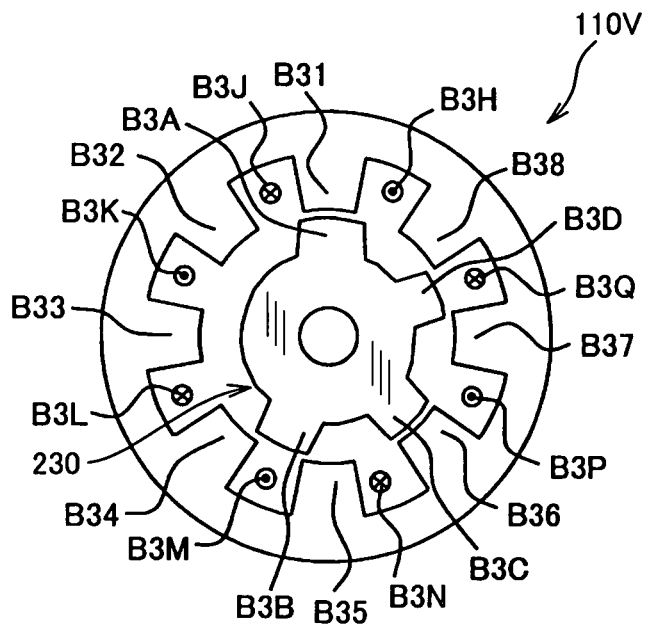
(b)
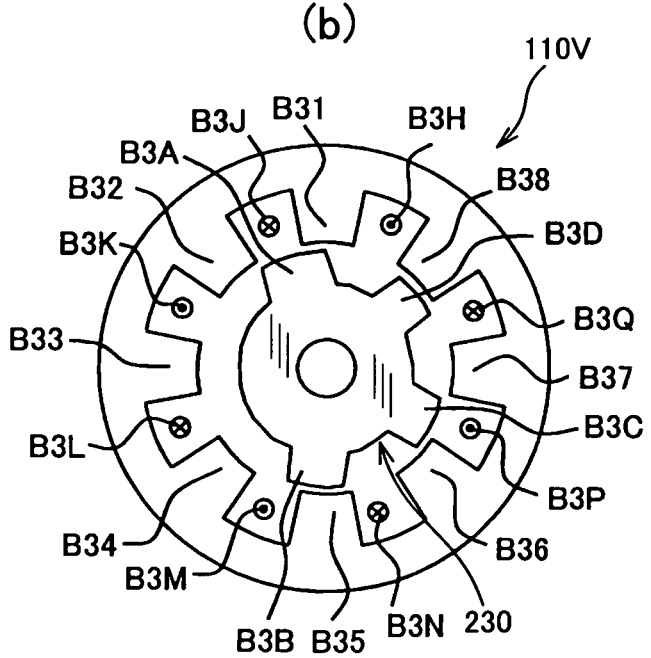

FIG.40
(a)
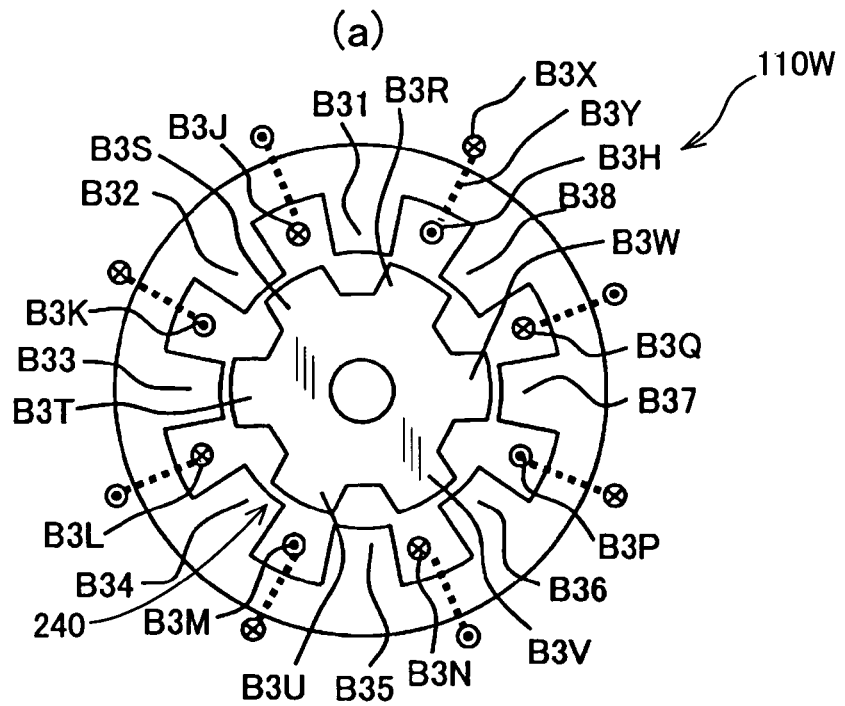
(b)
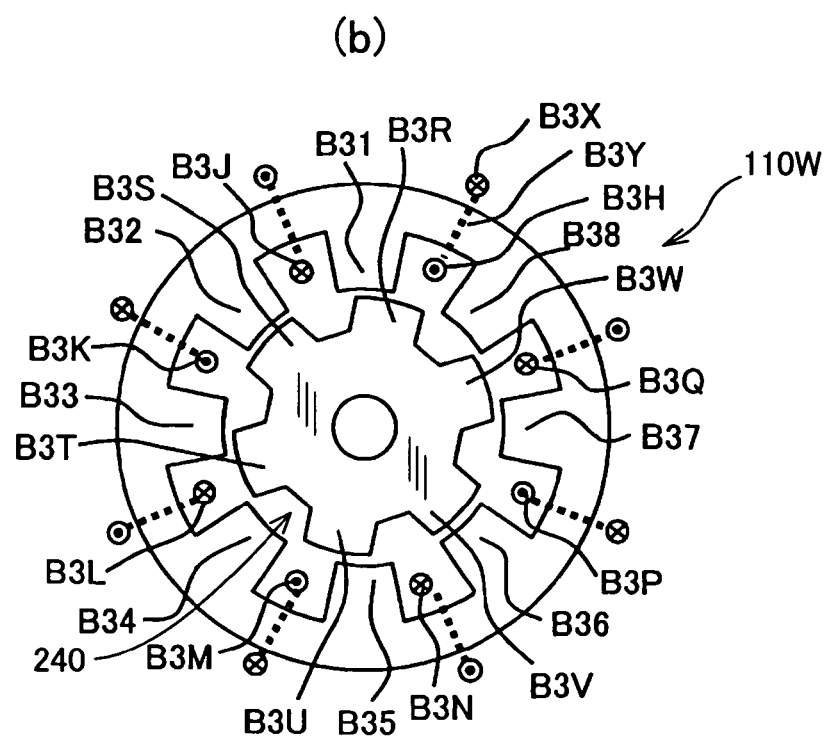

FIG.42
(a)
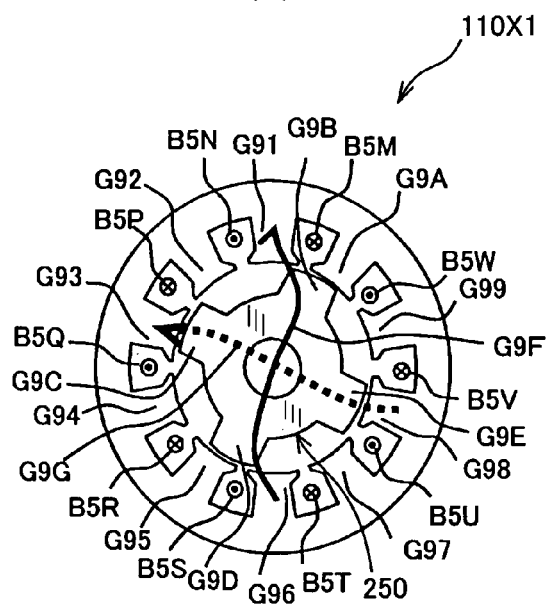
(b)
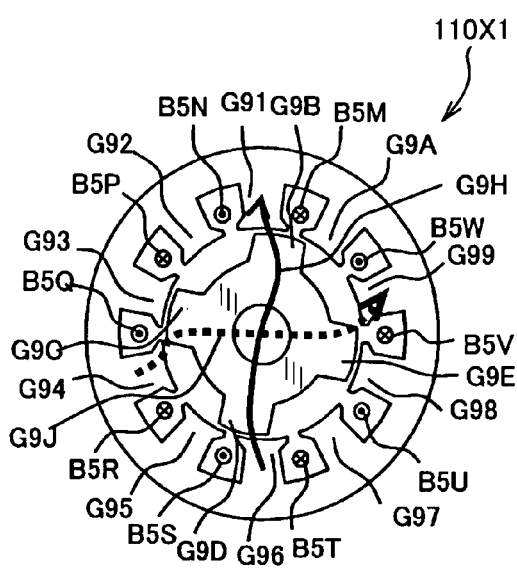
(c)
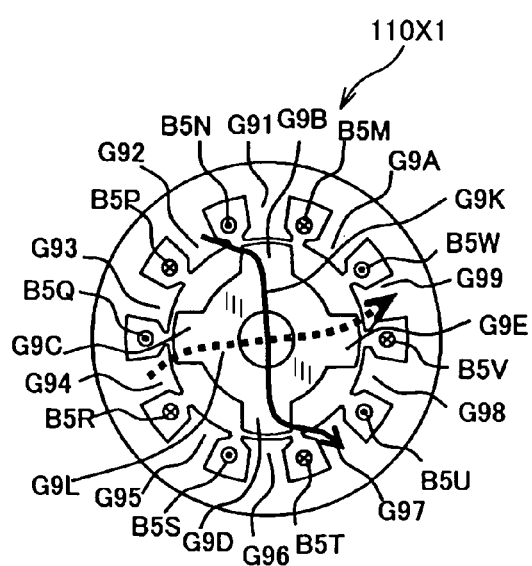
(d)
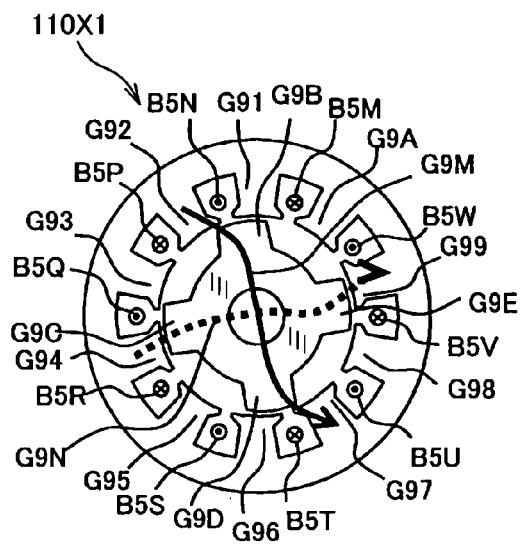

FIG.45
(a)
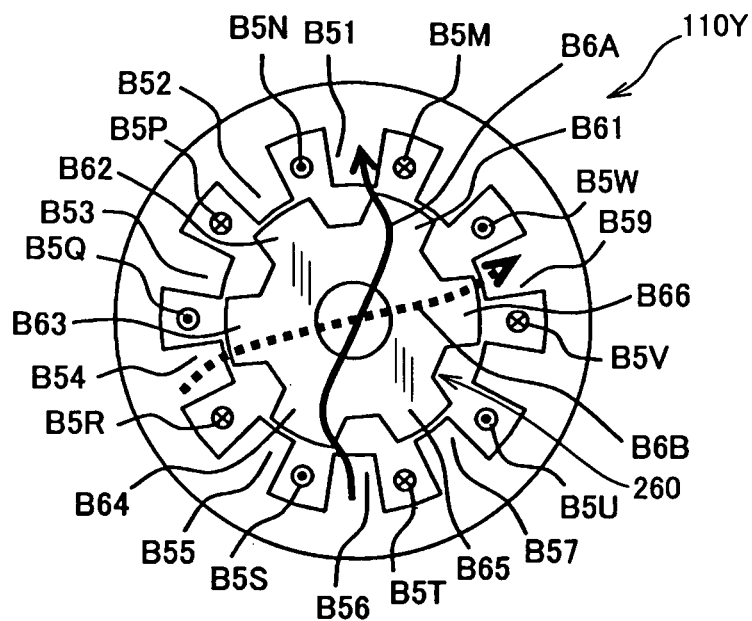
(b)
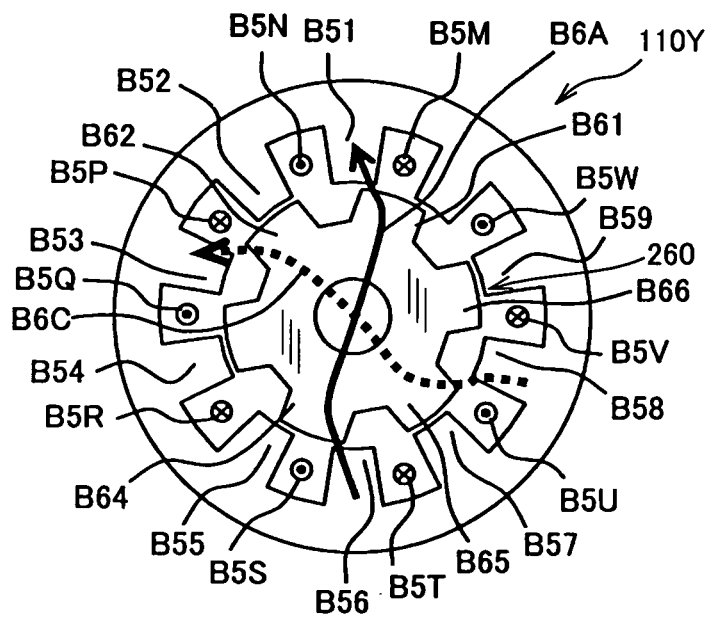

FIG.46
(a)
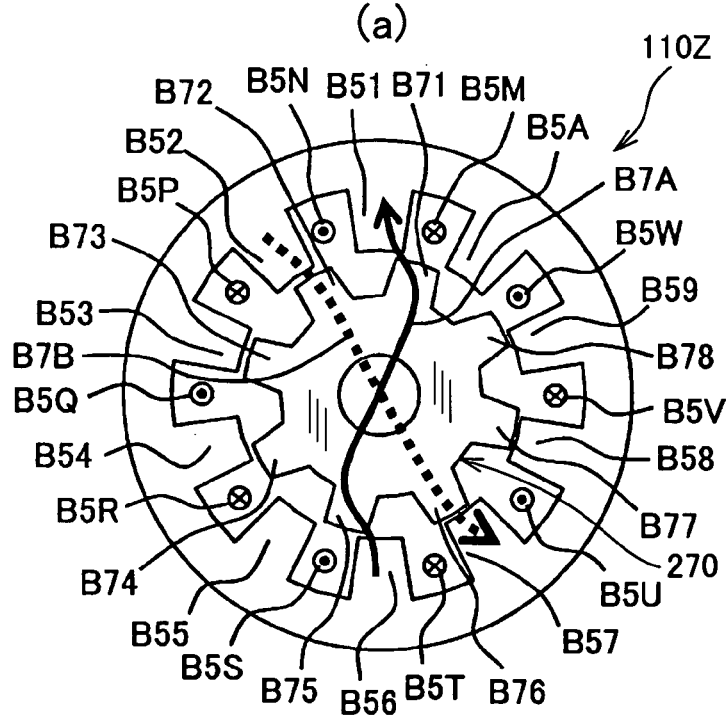
(b)
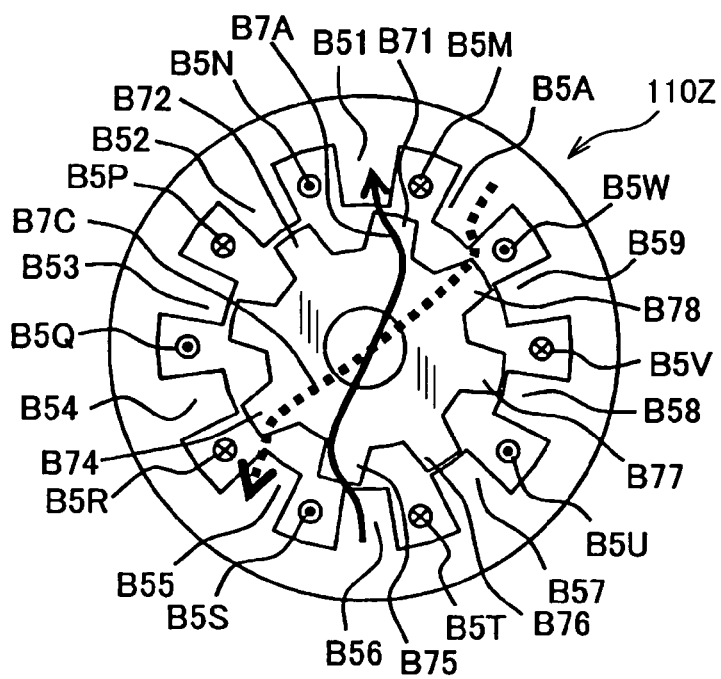

FIG.60

| Hs Max Min Hm | 5° | | 10° | | 15° | | 20° | | 25° | | 30° | |
|---|---|---|---|---|---|---|---|---|---|---|---|---|
| | Min | Max | Min | Max | Min | Max | Min | Max | Min | Max | Min | Max |
| 30° | 30 | 30 | 30 | 30 | 30 | 30 | 30 | 30 | 30 | 30 | 30 | 30 |
| 35° | 25 | 35 | 25 | 35 | 25 | 35 | 25 | 35 | 25 | 35 | 35 | 35 |
| 40° | 20 | 30 | 20 | 40 | 20 | 40 | 20 | 40 | 30 | 40 | 40 | 40 |
| 45° | 15 | 25 | 15 | 35 | 15 | 45 | 25 | 45 | 35 | 45 | 45 | 45 |
| 50° | 10 | 20 | 10 | 30 | 20 | 40 | 30 | 50 | 40 | 50 | 50 | 50 |
| 55° | 5 | 15 | 15 | 25 | 25 | 35 | 35 | 45 | 45 | 55 | 55 | 55 |
| 60° | 10 | 10 | 20 | 20 | 30 | 30 | 40 | 40 | 50 | 50 | 60 | 60 |

FIG.61
(a)
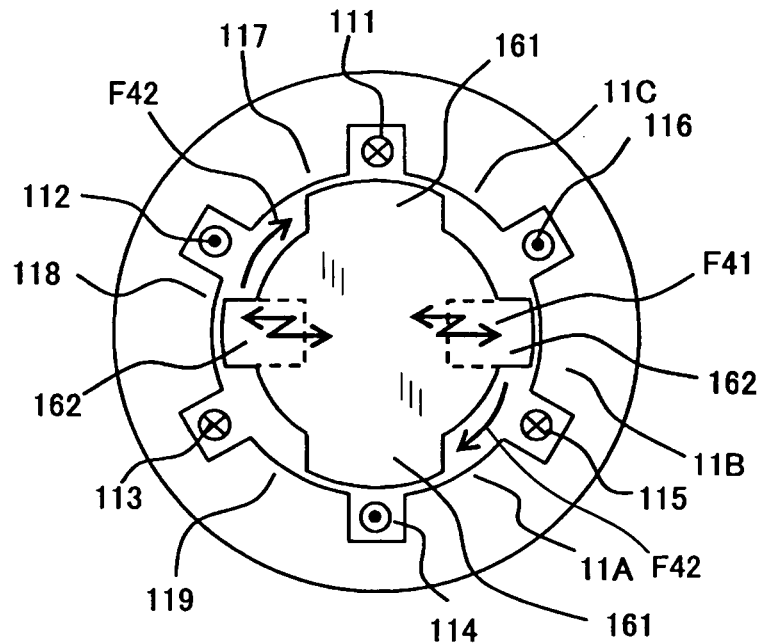
(b)
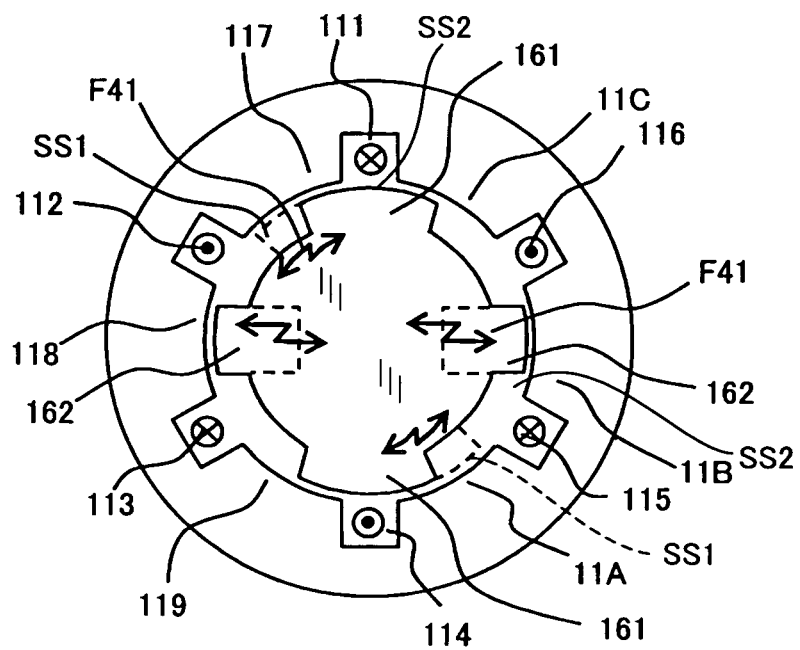

FIG.69
(a)
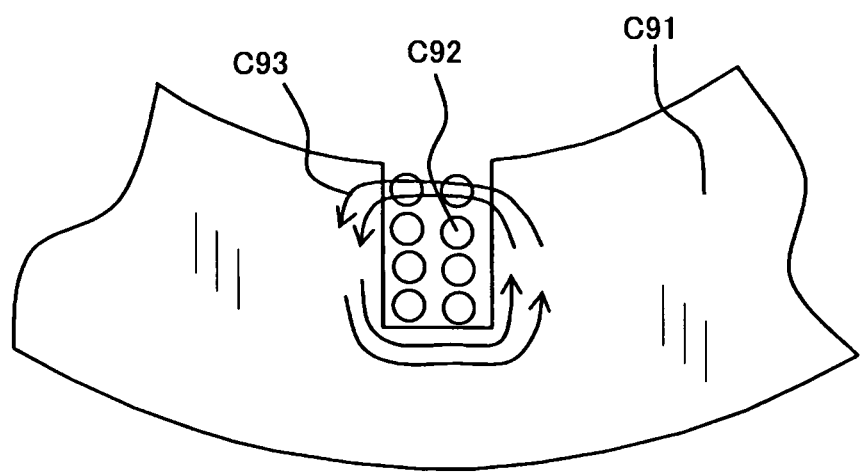
(b)
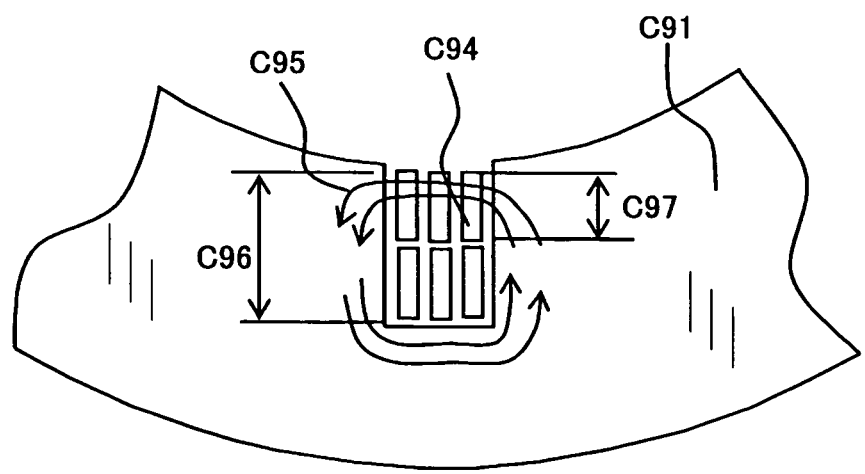

(a)  (b)

FIG.103
(a)
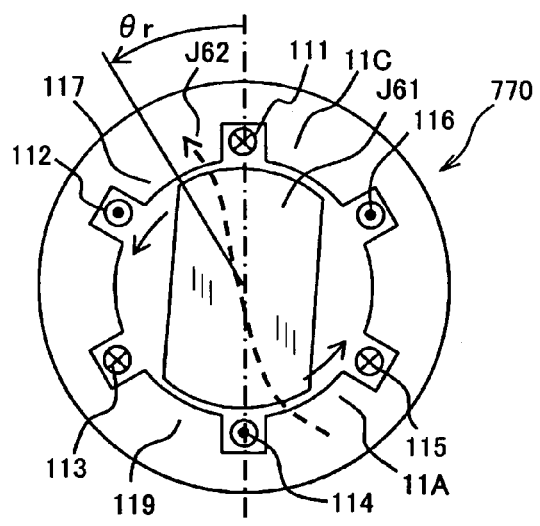
(b)
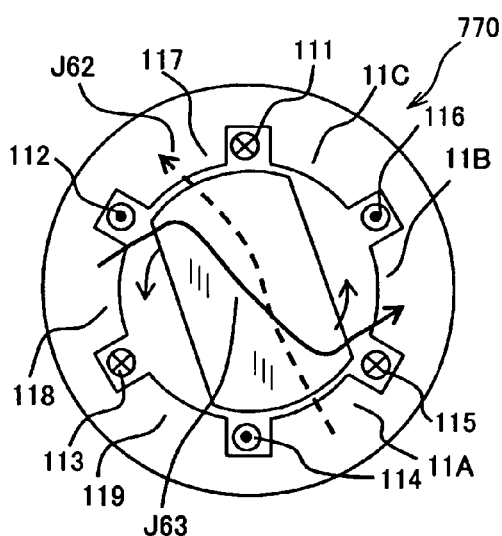
(c)
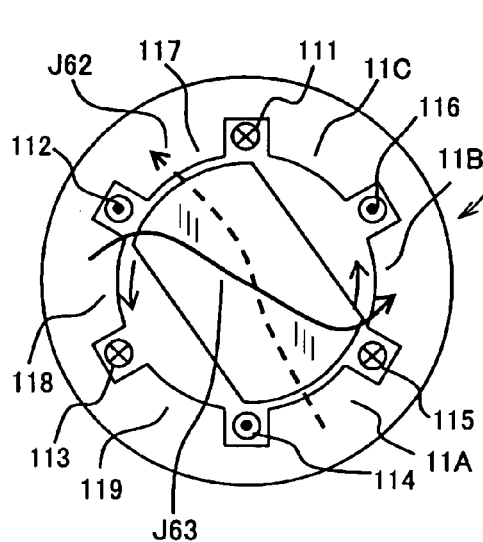
(d)
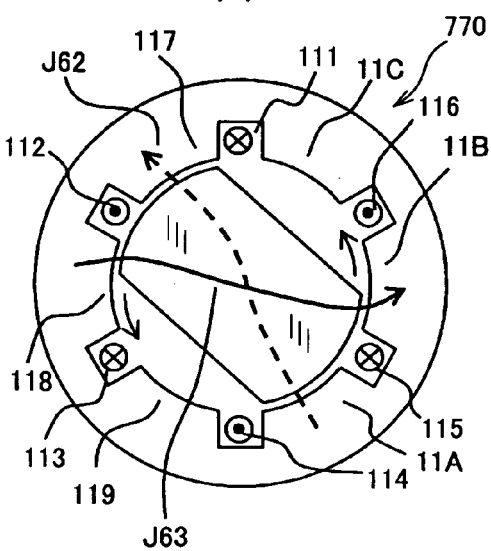

FIG.105
(a)
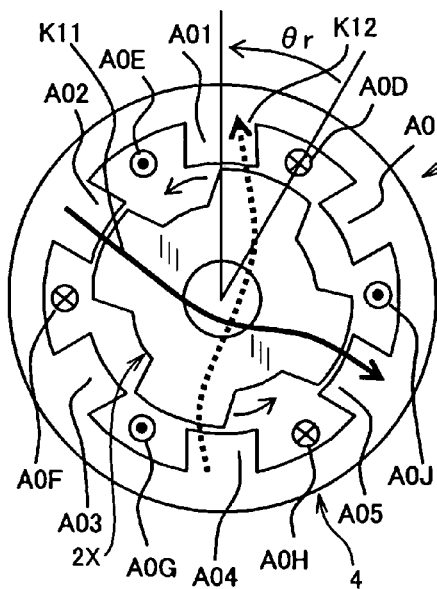
(b)
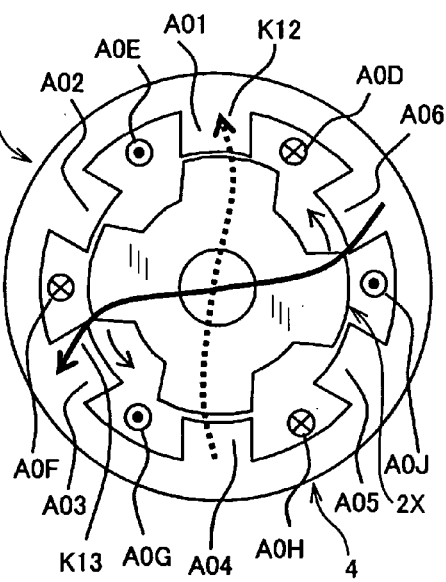
(c)
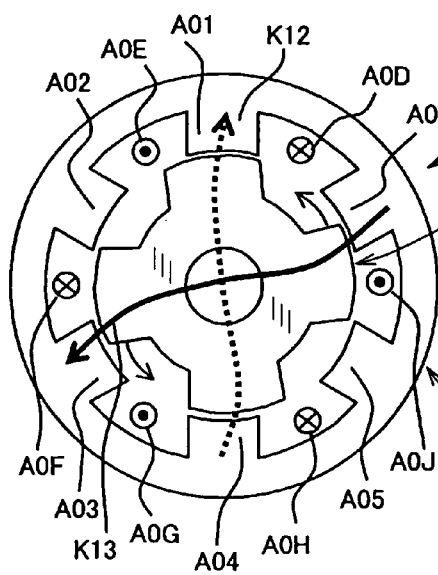
(d)
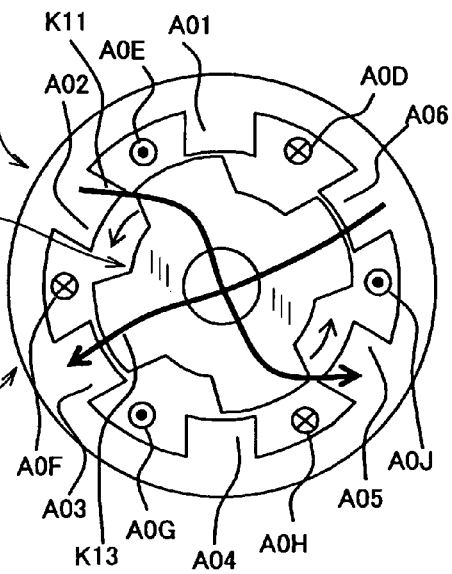

FIG.109

| θr \ I | θ₁ | θ₂ | ... θm ... | θ_{A-1} | θ_A |
|---|---|---|---|---|---|
| $I_1$ | $\Psi_{11}$ | $\Psi_{21}$ | ... $\Psi_{m1}$ ... | $\Psi_{(A-1)1}$ | $\Psi_{A1}$ |
| $I_2$ | $\Psi_{12}$ | $\Psi_{22}$ | ... $\Psi_{m2}$ ... | $\Psi_{(A-1)}$ | $\Psi_{A2}$ |
| ⋮ | ⋮ | ⋮ | ⋮ | ⋮ | ⋮ |
| $I_n$ | $\Psi_{1n}$ | $\Psi_{2n}$ | ... $\Psi_{mn}$ ... | $\Psi_{(A-1)n}$ | $\Psi_{An}$ |
| ⋮ | ⋮ | ⋮ | ⋮ | ⋮ | ⋮ |
| $I_{C-1}$ | $\Psi_{1(C-1)}$ | $\Psi_{2(C-1)}$ | ... $\Psi_{m(C-1)}$ ... | $\Psi_{(A-1)(C-1)}$ | $\Psi_{A(C-1)}$ |
| $I_C$ | $\Psi_{1C}$ | $\Psi_{2C}$ | ... $\Psi_{mC}$ ... | $\Psi_{(A-1)C}$ | $\Psi_{AC}$ |

FIG.110

| θr \ Tc | θ₁ | θ₂ | ... θm ... | θ_{A-1} | θ_A |
|---|---|---|---|---|---|
| $T_1$ | $P_{11}$ | $P_{21}$ | ... $P_{m1}$ ... | $P_{(A-1)1}$ | $P_{A1}$ |
| $T_2$ | $P_{12}$ | $P_{22}$ | ... $P_{m2}$ ... | $P_{(A-1)}$ | $P_{A2}$ |
| ⋮ | ⋮ | ⋮ | ⋮ | ⋮ | ⋮ |
| $T_n$ | $P_{1n}$ | $P_{2n}$ | ... $P_{mn}$ ... | $P_{(A-1)n}$ | $P_{An}$ |
| ⋮ | ⋮ | ⋮ | ⋮ | ⋮ | ⋮ |
| $T_{B-1}$ | $P_{1(B-1)}$ | $P_{2(B-1)}$ | ... $P_{m(B-1)}$ ... | $P_{(A-1)(B-1)}$ | $P_{A(B-1)}$ |
| $T_B$ | $P_{1B}$ | $P_{2B}$ | ... $P_{mB}$ ... | $P_{(A-1)B}$ | $P_{AB}$ |

RELUCTANCE MOTOR WITH IMPROVED STATOR STRUCTURE

CROSS REFERENCE TO RELATED APPLICATIONS

This application is based on Japanese Patent Applications No. 2008-292142 and No. 2009-119063 filed on Nov. 14, 2008 and May 15, 2009, respectively. This application claims the benefit of priority from the Japanese Patent Applications, so that the descriptions of which are all incorporated herein by reference.

FIELD OF THE INVENTION

The present invention relates to reluctance motors installable in various motor vehicles, such as passenger cars and trucks, various types of industrial equipment, and various home appliances, and to systems including such motors and circuits for driving the motors.

BACKGROUND OF THE INVENTION

Three-phase AC (Alternating Current) motors have been widely used, an example of which is disclosed in Japanese Patent Application Publication No. 2005-110431.

FIG. 120 is an axial cross sectional view illustrating a schematic structure of a surface permanent magnet synchronous motor as an example of such three-phase AC motors.

The motor illustrated in FIG. 120 is provided with an output shaft 811, a substantially annular rotor core 812, and a pair of N and S poles 817 and 818 of permanent magnets. The motor is also provided with a pair of bearings 813, a substantially annular stator core 814, and a substantially cylindrical inner hollow motor housing 816 with an opening in its axial direction.

The output shaft 811 is fixedly mounted on an inner circumference of the rotor core 812. The output shaft 811 is disposed in the opening of the motor housing 816 such that both ends thereof project from the opening, and the rotor core 812 is installed in the motor housing 816. The output shaft 811 is rotatably supported by the motor housing 816 with the bearings 813. The N and S poles 817 and 818 are, for example, mounted on the outer circumference of the rotor core 812 such that the N and S poles are alternatively arranged in the circumferential direction of the rotor core 812. The rotor core 812 and the N and S poles 817 and 818 of the permanent magnet constitute a rotor of the motor.

The stator core 814 is made up of a plurality of magnetic steel sheets stacked in alignment. The stator core 814 is installed in the motor housing 816 such that its inner circumference is opposite to the outer circumference of the rotor core 812 with an air gap therebetween. Three-phase stator windings are installed in the stator core 814. Ends 815 of the three-phase stator windings are drawn out from the stator core 814. The three-phase stator coils and the stator core constitute a stator.

FIG. 121 is a lateral cross sectional view taken on line AA-AA in FIG. 120. In these FIGS. 120 and 121, a two-pole, 12-slot three-phase permanent magnet synchronous motor is used. In order to simply illustrate the structure of the motor, the hatching of the output shaft 811 is omitted in illustration in FIG. 121.

As each of three-phase stator windings of the synchronous motor illustrated in FIGS. 120 and 121, a distributed, full-pitch winding is used. In FIG. 121, the stator core 184 consists of an annular back yoke and 12 teeth 821, 822, 823, 824, 825, 826, 827, 828, 829, 82A, 82B, and 82C projecting inwardly and circumferentially arranged at equal pitches therebetween. Spaces between circumferentially adjacent teeth provide 12 slots of the stator core 814. U-, V-, and W-phase stator windings are distributedly arranged in corresponding slots of the stator core 184.

Specifically, a first U-phase winding is wound from a slot 82Q to a slot 82K, and a second U-phase winding is wound from a slot 82D to a slot 82J. A first V-phase winding is wound from a slot 82G to a slot 82P, and a second V-phase winding is wound from a slot 82H to a slot 82N. A first W-phase winding is wound from a slot 82L to a slot 82F, and a second W-phase winding is wound from a slot 82M to a slot 82E. The pitch between the slots in which each of the U-, V-, and W-phase windings is wound is set to 180 electrical degrees.

FIG. 122 is a developed view of the inner periphery of the stator core 184 in its circumferential (rotational) direction; the horizontal axis of the view represents positions of the stator in its rotational direction by corresponding electric angles in degrees. Note that, because the motor is a two-pole motor, an electric angle of a given position of the stator in its rotational direction is in agreement with a mechanical angle of the corresponding position of the stator.

In FIG. 122, reference character U represents a terminal of the second U-phase winding, and, to the terminal U, a U-phase current Iu is supplied. Reference character V represents a terminal of the second V-phase winding, and, to the terminal V, a V-phase current Iv is supplied. Reference character W represents a terminal of the second W-phase winding, and, to the terminal W, a W-phase current Iw is supplied.

Reference character 831 represents a connection wire that connects the first and second U-phase windings in series, reference character 832 represents a connection wire that connects the first and second V-phase windings in series, and reference character 833 represents a connection wire that connects the first and second W-phase windings in series. The U-phase coil (series-connected U-phase windings), V-phase coil (series-connected V-phase windings), and W-phase coil (series-connected W-phase windings) are connected to each other in star configuration to provide a stator coil of the stator. Reference character N represents a neutral point of the star-connected three-phase coils.

FIG. 123 schematically illustrates the connecting structure of the stator coil (three-phase coils) of the permanent magnet synchronous motor set forth above and a control device for the permanent magnet synchronous motor. In FIG. 123, reference character 834 represents the U-phase coil, reference character 835 represents the V-phase coil, and reference character 836 represents the W-phase coil.

The control device is provided with a three-phase inverter and a DC battery 84D. The three-phase inverter consists of a first pair of series-connected high- and low-side power transistors 841 and 842, and a second pair of series-connected high- and low-side power transistors 843 and 844, and a third pair of power transistors 845 and 846. Flywheel diodes 847, 848, 849, 84A, 84B, and 84C are connected in antiparallel across the power transistors 841, 842, 843, 844, 845 and 846, respectively.

The three-phase inverter is operative to convert a DC voltage supplied from the DC battery 84D into three-phase AC currents Iu, Iv, and Iw, and to supply the three-phase AC currents Iu, Iv, and Iw to the three-phase coils 834, 835, and 836, respectively, thus driving the three-phase motor.

Such surface permanent magnet synchronous motors illustrated in FIGS. 120 to 123 have been widely utilized as high-efficient motors. However, from higher performance, smaller size, and lower cost standpoints, there have been problems in these surface permanent magnet motors depending on their applications.

Specifically, assuming that a current I is supplied to one of the stator windings of such a permanent magnet synchronous motor and a magnet flux density B applied to a permanent magnet rotor of the motor, a force F acts on the rotor as basic characteristics of the brushless motor in accordance with the following equation:

$$F=BIL$$

where L represents the length of an effective portion of each stator winding.

Thus, a torque T generated by the brushless motor is represented by the following equation:

$$T=FR$$

where R represents the radius of the rotor.

FIG. 124 schematically illustrates an example of three-phase AC motors with a two-pole multi-flux-barrier rotor. The structure of a stator of the three-phase AC motor illustrated in FIG. 124 is identical to that of the permanent magnet synchronous motor illustrated in FIG. 121.

The rotor of the three-phase AC motor consists of a soft magnetic material rotor core. The rotor also consists of a plurality of slits 852 formed in the rotor core so as to be arranged at intervals therebetween in parallel to one diameter of the rotor core.

The rotor further consists of a plurality of thin magnetic paths 851 each formed between a corresponding one of the slits 852 and a corresponding alternative one of the slits 852 adjacent thereto. Specifically, the slits 852 are operative to barrier flux in the rotor core. Thus, the slits 852 are referred to as "flux barriers".

The flux barriers 852 restrict the direction in which the flux passes in the direction of each slit (for example, the vertical direction in FIG. 124). One ant the other sides of the rotor core in the direction of each slit serve as a pair of magnetic poles of the rotor.

Note that an identical type of the control device illustrated in FIG. 123 can be used to drive these three-phase AC motors with such a multi-flux-barrier.

A lateral cross section of another conventional motor is illustrated in FIG. 125. The motor illustrated in FIG. 125 is called "switched reluctance motor". An example of such switched reluctance motors is disclosed in Japanese Patent Application Publication No. 2002-272071.

The switched reluctance motor consists of a substantially annular rotor 86L made up of a plurality of magnetic steel sheets stacked in alignment. The rotor 86L has, at its outer circumferential surface, four salient poles. The four salient poles are circumferentially arranged at regular pitches. The switched reluctance motor also consists of a substantially annular stator with equal-pitched six teeth. There have been many studies of such switched reluctance motors, but a few switched reluctance motors have been put to practical use.

Reference numeral 861 represents a tooth around which an A-phase coil is concentrically wound in positive and negative directions (see reference numerals 867 and 868); this causes the tooth 861 to serve as an A-phase stator pole. The positive direction represents a direction into the paper of FIG. 125, and the negative direction represents a direction out of the paper of FIG. 125.

Reference numeral 864 represents a tooth. As illustrated by a broken line, an A-phase coil is concentrically wound around the tooth 864 in the positive and negative directions (see reference numerals 86E and 86D); this causes the tooth 864 to serve as a negative A-phase stator pole. The A-phase coils are connected to each other in series through a connection wire to provide an A-phase winding.

A group of conductors (wires) in each A-phase coil through each of which a current in the positive direction flows is defined as "a positive A-phase winding", and a group of conductors (wires) in each A-phase coil through each of which a current in the negative direction flows is defined as "a negative A-phase winding". That is, reference numerals 867 and 86E represents positive A-phase windings, and reference numerals 868 and 86D represent negative A-phase windings.

When the rotor 861, is presently located at an rotational angle θr relative to a reference position R illustrated in FIG. 125, an A-phase current is supplied to flow through each of the positive A-phase windings 867 and 86E in the positive direction, and flow through each of the negative A-phase windings 868 and 86D in the negative direction. This generates a magnetic flux illustrated by an arrow 86M in FIG. 125

The magnetic flux 86M causes a magnetic attractive force between the A-phase stator pole 861 and one salient pole of the rotor 86L close thereto and between the A-phase stator pole 864 and one salient pole of the rotor 86L close thereto. The attractive force creates a torque to rotate the rotor 86M in counterclockwise direction.

Reference numeral 863 represents a tooth around which a B-phase coil is concentrically wound in the positive and negative directions (see reference numerals 86B and 86C); this causes the tooth 863 to serve as a B-phase stator pole. Reference numeral 866 represents a tooth. As illustrated by a broken line, a B-phase coil is concentrically wound around the tooth 866 in the positive and negative directions (see reference numerals 86J and 86H); this causes the tooth 866 to serve as a negative B-phase stator pole. The B-phase coils are connected to each other in series through a connection wire to provide a B-phase coil member.

Like the A-phase winding, a group of conductors in each B-phase coil through each of which a current in the positive direction flows is defined as "a positive B-phase winding", and a group of conductors in each B-phase coil through each of which a current in the negative direction flows is defined as "a negative B-phase winding". That is, reference numerals 86B and 86J represents positive B-phase windings, and reference numerals 86C and 86H represent negative B-phase windings.

Reference numeral 865 represents a tooth around which a C-phase coil is concentrically wound in the positive and negative directions (see reference numerals 86G and 86F); this causes the tooth 865 to serve as a C-phase stator pole. Reference numeral 862 represents a tooth. As illustrated by a broken line, a C-phase coil is concentrically wound around the tooth 862 in the positive and negative directions (see reference numerals 869 and 86A); this causes the tooth 862 to serve as a negative C-phase stator pole. The C-phase coils are connected to each other in series through a connection wire to provide a C-phase coil member.

Like the A- and B-phase windings, a group of conductors in each C-phase coil through each of which a current in the positive direction flows is defined as "a positive C-phase winding", and a group of C-phase windings in each C-phase coil through each of which a current in the negative direction flows is defined as "a negative C-phase winding". That is, reference numerals 86G and 869 represents positive C-phase windings, and reference numerals 86F and 86A represent negative C-phase windings.

In the motor illustrated in FIG. 125, the A-phase current, a B-phase current, and a C-phase current are sequentially supplied to the corresponding A-phase, B-phase, and C-phase coils, respectively, according to the rotational position of the rotor 86L relative to the reference position. This creates a continuous torque as a total torque to rotate the rotor 86L.

Simultaneously reversing the direction of the A-phase current flowing through each of the positive A-phase windings and that of the A-phase current flowing through each of the negative A-phase winding maintains unchanged the direction of the created torque because the magnetic attractive force of the soft magnetic material creates the torque. This is established in the B-phase and C-phase currents as well. However, in order to lower the number of alternating rotor poles, the directions of the A-, B-, and C-phase current flows illustrated in FIG. 125 are known to thereby reduce iron loss in the rotor.

The switched reluctance motor illustrated in FIG. 125 has the following features:

The first feature is that the switched reluctance motor is low in cost because it uses no permanent magnets.

The second feature is that, because each of the stator windings is concentratedly wound around a corresponding tooth, the arrangement of individual stator windings is simple.

The third feature is to utilize torque based on high flux density because the magnetic flux acting between the salient poles of the stator and those of the rotor is based on a saturation flux density of the magnetic steel sheets.

The fourth feature is that the rotor can be rotated at a higher RPM because the rotor is rugged.

SUMMARY OF THE INVENTION

Let us consider the permanent magnet brushless motor illustrated in FIG. 121. It is assumed that a maximum flux density $B_{max}$ of the magnetic steel sheet at each tooth of the stator is set to 2.0 [Teslas; T], and a circumferential length Ws of an opening end of each slot close to the air gap between the rotor and the stator is identical to a circumferential length Wt of each tooth. Note that the maximum flux density of a magnetic steel sheet is determined within a flux saturation region of the magnetic steel sheet depending on, for example, the application desired.

In these assumptions, an average flux density acting as a torque of the motor becomes 1.0 [T]. Thus, the permanent magnet brushless motor illustrated in FIG. 121 may have a problem that the maximum flux density $B_{max}$ of 2.0 [T], which is fully obtained at the teeth, cannot be sufficiently utilized. Particularly, in view of a smaller size, peak torque, which is one of the important characteristics of the permanent magnet brushless motor, may be insufficient for the same reason as the maximum flux density $B_{max}$.

In the structure of the stator of the permanent magnet brushless motor illustrated in FIG. 121, because each of the three-phase stator windings is designed to be a distributed, full pitch winding, the arrangement of the individual three-phase windings is complicated. This may make it difficult to produce the stator coil.

In addition to the difficulty of the arrangement of the individual three-phase windings, the opening end of each slot of the stator illustrated in FIG. 121 has a narrow circumferential length. This may make it difficult to form turns of wires as the three-phase windings in corresponding slots, thus reducing the lamination factor of the stator coil. This may reduce a torque to be created by the permanent magnet brushless motor.

The difficulty in forming turns of wires as the three-phase windings may also increase both ends of the stator coil projecting from the stator core in the axial direction of the rotor; this may increase the permanent magnet brushless motor in size. The difficulty in forming turns of wires as the three-phase windings may further lower the productivity of the stator coils; this may increase the manufacturing cost of the permanent magnet brushless motors.

In the structure of the rotor of the permanent magnet brushless motor illustrated in FIG. 121, centrifugal force acts on the rotating rotor (permanent magnetic poles 817 and 818). Thus, the rotor nominally requires reinforcements to withstand the centrifugal force; this may increase the cost of the rotor. The centrifugal force acting on the rotating rotor limits the maximum allowed rotational, speed of the permanent magnet brushless motor. Because the output Pout of the permanent magnet brushless motor is represented by the product of torque and angular velocity ωm, the restriction on the rotational speed of the permanent magnet brushless motor set forth above may restrict the output of the permanent magnet brushless motor.

In the structure of the rotor of the permanent magnet brushless motor illustrated in FIG. 121, because the rotor has a non-salient pole structure, it may be difficult to carry out field weakening control; this may make it hard to carry out constant output control for the permanent magnet brushless motor based on the field weakening control.

High-performance permanent magnet brushless motors normally use, as their permanent magnets, rare-earth magnets, such as Neodymium iron boron (NdFeB) magnets. However, because rare-earth magnets are expensive, permanent magnet brushless motors using such rare-earth magnets have the disadvantage of raising cost issues. Particularly, there is apprehension that using many rare-earth magnets causes depletion of natural resources.

Motors, such as permanent magnet brushless motors, are used in various load conditions. For example, when permanent magnet brushless motors are used in electric or hybrid vehicles, they require a large maximum torque, but, during normal operation, require a torque responding to a relatively light load. Thus, the efficiency of motors to be used in electric or hybrid vehicles during light load strongly acts as the fuel economy.

In view of motor efficiency, there are Joule loss, iron loss, and mechanical loss in permanent magnet brushless motors. The Joule loss is due to the flow of current in the stator windings. The iron loss is due to the rotation of the magnetic field based on the permanent magnet. The mechanical loss is produced at the bearings and the like. Particularly, during a relatively light load, the iron loss may become problems in quite a few operating ranges of permanent magnet brushless motors.

In particular, in an operating range during a permanent magnet brushless motor being rotated together with its output shaft so that no torque is required, the iron loss is mostly attributable to drag torque. That is, in the operating range, the magnetic field based on the permanent magnet of a permanent magnet brushless motor may become a problem to reduce the motor efficiency.

The structure of the control device of the permanent magnet brushless motor illustrated in FIG. 123 requires many power transistors; this increases the cost of the control device. Because a pair of power transistors are connected to each other in series for power supply to each phase stator winding, the inverter efficiency may be reduced due to the turn-on power loss of the pair of series-connected power transistors for each phase stator winding.

Specifically, the competitiveness is required for the set of a permanent magnet synchronous motor and a control device in performance, size, and cost.

In the structure of the multi-flux barrier rotor illustrated in FIG. 124, because the magnetic paths 851 and the flux barriers 852 are alternatively arranged, the flux density of the magnetic poles is approximately the half of the saturation flux density of the soft magnetic material of the rotor core. There is a problem that a maximum flux density of the soft magnetic material of the rotor core cannot be used. In addition, the power factor of such three-phase AC motors with a multi-flux-bather rotor is the range of 0.6 to 0.8, and therefore not so high.

In addition, in the structure of such a multi-flux-barrier rotor, because each of the magnetic paths is thin, when the multi-flux-barrier rotor rotates at a high RPM, the rotating rotor requires reinforcements to withstand centrifugal force acting thereon.

In the structure of the switched reluctance motor illustrated in FIG. 125, radial force acting between the stator and rotor with rotation of the rotor is changed in direction every time excitation is switched from one pair of opposing teeth to another pair of opposing teeth. This may cause the stator to be deformed in its radial directions, resulting in that the stator may strongly vibrate and/or noise may be produced In view of the efficiency of excitation of the stator windings, a current is supplied, at a time, to two pairs of one-phase windings, that is, four windings, in six pairs of three-phase windings, that is, twelve windings, to excite them. In other words, the efficiency of excitation of the three-phase stator windings of the switched reluctance motor illustrated in FIG. 125 is $4/12=1/3$. Because the stator-winding excitation efficiency of $1/3$ is relatively low, this may result in that the amount of heat, such as Joule heat, generated by the excited windings increases.

Note that another topic associated with such a switched reluctance motor has been described in Akira Chiba and Tadashi Fukao "*An Egg-shaped Diagram and its Discrepancies in Switched Reluctance Motor*" IEEJ Transactions on Industry Applications Vol. 123 (2003) No. 2. p. 82-89.

As described above, these conventional motors may have at least one high-cost, low performance, and/or large-size structure, such as its stator, rotor, and/or a stator-winding arrangement. This may cause a circuit for driving these conventional motors to be large size and cost. Thus, systems each including one of the conventional motors and a circuit for driving it may also be large in cost and size, and low in performance.

In view of the foregoing circumstances, an object of at least one aspect of the present invention is to solve at least one of the problems described beforehand.

A specific object of the at least one aspect of the present invention is to provide motors designed to have at least one low-cost, high-performance, and/or small-sized structure, such as its stator, rotor, and/or stator-winding arrangement. Another specific object of the at least one aspect of the present invention is to provide systems each including such a motor and a circuit for driving it.

According to one aspect of the present invention, there is provided a motor. The motor includes a stationary member provided with a number M (M is a positive integer) of first poles within 360 electrical degrees at spaces therebetween, and a plurality of windings at least partly wound in the spaces, respectively. The motor includes a movable member movably arranged relative to the stationary member and provided with a number K (K is a positive integer) of second poles. The number K of second poles being different from the number M of first poles. The motor includes a unidirectional current supply unit that supplies a unidirectional current to at least one of the windings so as to create an attractive force between at least one of the first poles and a corresponding at least one of the second poles to thereby move the movable member relative to the stationary member.

BRIEF DESCRIPTION OF THE DRAWINGS

Other objects and aspects of the invention will become apparent from the following description of embodiments with reference to the accompanying drawings in which:

FIG. 4 is a view schematically illustrating operations of the motor illustrated in FIGS. 1A and 1B;

FIG. 7 is a view schematically illustrating operations in regenerative mode of the motor illustrated in FIGS. 1A and 1B;

FIG. 28 is a view schematically illustrating examples of the shape of each stator pole of the reluctance motor illustrated in FIG. 27;

FIG. 29 is a view schematically illustrating various arrangements and shapes of at least one permanent magnet embedded in each stator pole of the reluctance motor illustrated in FIG. 27;

FIG. 31 is a lateral cross sectional view of a reluctance motor according to the eleventh modification of the reluctance motor according to the first embodiment;

FIG. 32 is a lateral cross sectional view of a reluctance motor according to the twelfth modification of the reluctance motor according to the first embodiment;

FIG. 35 is a lateral cross sectional view of a reluctance motor according to the fifteenth modification of the reluctance motor according to the first embodiment;

FIG. 39 is a lateral cross sectional view of a reluctance motor according to the nineteenth modification of the reluctance motor according to the first embodiment;

FIG. 40 is a lateral cross sectional view of a reluctance motor according to the twentieth modification of the reluctance motor according to the first embodiment;

FIG. 42 is a lateral cross sectional view of a reluctance motor according to a modification of the reluctance motor illustrated in FIG. 41;

FIG. 45 is a lateral cross sectional view of a reluctance motor according to the twenty-second modification of the reluctance motor according to the first embodiment;

FIG. 46 is a lateral cross sectional view of a reluctance motor according to the twenty-third modification of the reluctance motor according to the first embodiment;

FIG. 60 is a table schematically illustrating combinations of values of a circumferential width of each main salient pole, values of a circumferential width of an innermost open end of each slot, and maximum and minimum values of a circumferential width Hh of each auxiliary salient pole;

FIG. 61 is a lateral cross sectional view schematically illustrating a modification of the reluctance motor illustrated in FIG. 54;

FIG. 69 is an enlarged lateral cross sectional view schematically illustrating one measure associated with flux leakages in the motors according to the first embodiment and its modifications;

FIG. 103 is a lateral cross sectional view of a reluctance motor according to the second embodiment of the present invention;

FIG. 105 is a lateral cross sectional view of a reluctance motor according to the third embodiment of the present invention;

FIG. 109 is a table schematically illustrating the number $\Psi$ (I, $\theta$r) of flux leakage $\phi$x to each phase stator winding at each sampling point (I, $\theta$r), which are stored in a database illustrated in FIG. 107;

FIG. 110 is a table schematically illustrating data P (TC, $\theta$r) at each sampling point (TC, $\theta$r) associated with the number $\Psi$ (I, $\theta$r) of flux leakages $\phi$x to each phase stator winding, at each sampling point (TC, $\theta$r), which can be stored in a database illustrated in FIG. 107 in place or in addition to the table illustrated in FIG. 109;

FIG. 115 is a lateral cross sectional view schematically illustrating a modification of the 12S4R motor illustrated in FIG. 114;

FIG. 116 is a lateral cross sectional view schematically illustrating another modification of the 12S4R motor illustrated in FIG. 114;

FIG. 117 is a lateral cross sectional view schematically illustrating another modification of the 12S4R motor illustrated it FIG. 116;

FIG. 118 is a graph schematically illustrating relationships between flux linkages $\phi$ to each of A- and C-phase windings of a motor model and each of A- and C-phase currents according to the first to third embodiments and their modifications;

FIG. 119 is a graph schematically illustrating a characteristic curve of each of inductances La and Lc achieved when the A- and C-phase windings are excited by a same level current is substantially similar to the cyclic characteristic curves illustrated in FIG. 118;

FIG. 120 is an axial cross sectional view illustrating a schematic structure of a conventional surface permanent magnet synchronous motor;

FIG. 121 is a lateral cross sectional view taken on line AA-AA in FIG. 120;

FIG. 122 is a developed view of an inner periphery of a stator core illustrated in FIGS. 120 and 121 in, its circumferential (rotational) direction;

FIG. 123 is a circuit diagram schematically illustrating a connecting structure of a stator coil (three-phase coils) of the conventional permanent magnet synchronous motor and a control device therefor;

FIG. 124 is a lateral cross sectional view schematically illustrating a conventional three-phase AC motor with a two-pole multi-flux-barrier rotor; and FIG. 125 is a lateral cross sectional view schematically illustrating a conventional switched reluctance motor with a two-pole multi-flux-barrier rotor.

DETAILED DESCRIPTION OF EMBODIMENTS OF THE INVENTION

Figure 1A:
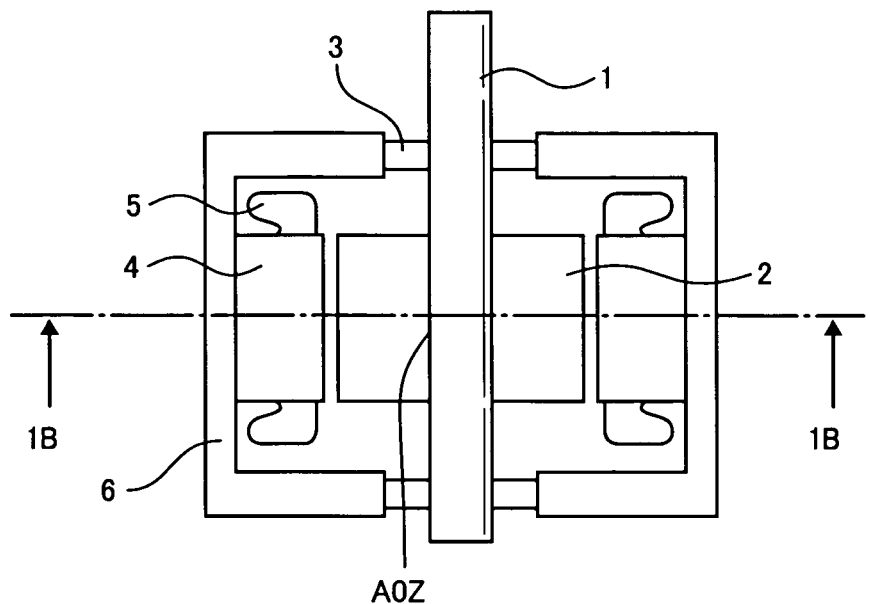
FIG. 1A is an axial cross sectional view illustrating a schematic structure of a synchronous reluctance motor according to a first embodiment of the present invention.

Embodiments of the present invention will be described hereinafter with reference to the accompanying drawings. In each embodiment, the present invention is, for example, applied to a reluctance motor; this reluctance motor is an example of various types of motors.

First Embodiment

Referring to the drawings, in which like reference characters refer to like parts in several figures, there is illustrated a synchronous reluctance motor 110.

Figure 1B:
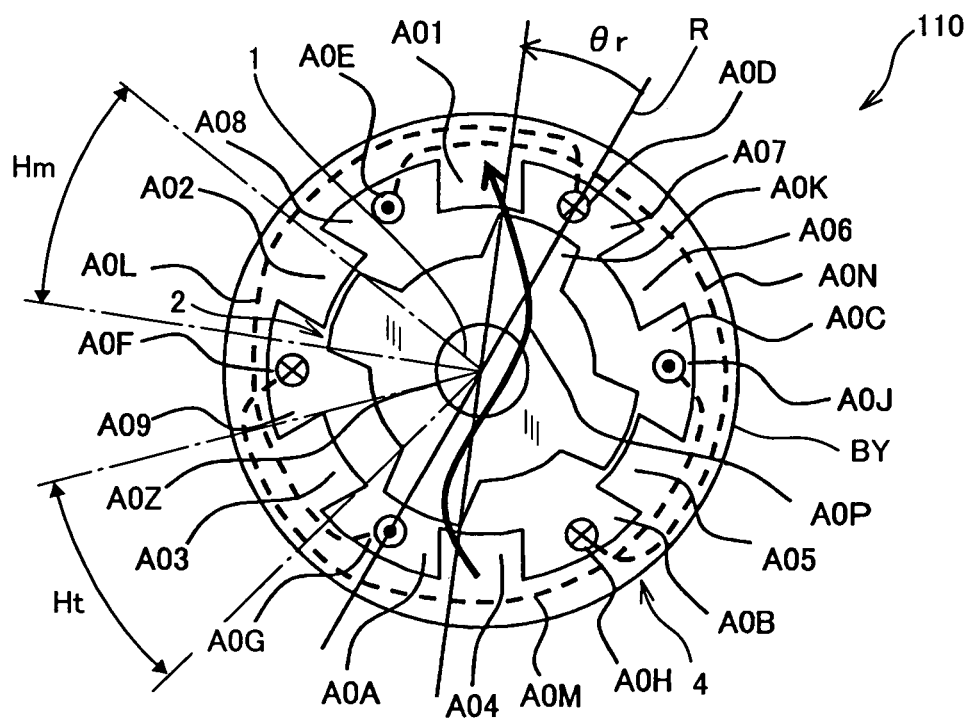
FIG. 1B is a lateral cross sectional view taken on line IB-IB in FIG. 1A.

The motor 110 illustrated in FIGS. 1A and 1B is provided with an output shaft 1 and a four salient pole rotor (movable member) 2. The motor 110 is also provided with a pair of bearings 3, a substantially annular stator core 4, and a substantially cylindrical inner hollow motor housing 6 with an opening in its axial direction.

The four salient pole rotor, referred to simply as "rotor", 2 has a substantially annular shape and a through hole A0Z at its center portion in its axial direction. The rotor 2 is coaxially is installed in the motor housing 6. An axis passing the center portion of the rotor 2 in the axial direction thereof will be referred to as "center axis" hereinafter.

The output shaft 1 is fixedly mounted on the inner surface of the through hole A0Z of the rotor 2. The output shaft 1 is disposed in the opening of the motor housing 6 such that both ends thereof project from the opening. The output shaft 1 is rotatably supported by the motor housing 6 with the bearings 3.

The rotor 2 is made up of, for example, a plurality of magnetic silicon steel sheets, as an example of soft magnetic materials, stacked in alignment. The rotor 2 is provided with four salient poles A0K. Each of the four salient poles A0K is formed such that its corresponding outer circumference portion radially outwardly projects. Thus, the outer surface of each of the salient poles A0K of the rotor 2 has a convexly circumferentially rounded shape.

The four salient poles consist of first and second pairs of opposing salient poles. The four salient poles are circumferentially arranged at regular pitches.

The stator core 4 is made up of, for example, a plurality of magnetic silicon steel sheets, as an example of soft magnetic materials, stacked in alignment. The stator core 4 is installed in the motor housing 6 such that its center axis is coaxial, to the center axis of the rotor 2 and its inner circumference is opposite to the outer circumference of the rotor 2 with an air gap therebetween.

Three-phase stator coils are installed in the stator core 4. The three-phase stator coils and the stator core 4 constitute a stator (stationary member).

Note that, in order to simply illustrate the structure and operations of each motor according to the embodiments of the present invention, hatching is omitted in illustration in some of the accompanying drawings.

Next, the structure of the stator will be fully described with reference to FIG. 1B.

The stator core 4 consists of an annular back yoke BY and six teeth A01, A02, A03, A04, A05, and A06 radially inwardly projecting from the inner circumference of the back yoke BY and circumferentially arranged at equal pitches therebetween. Each of the teeth A01, A02, A03, A04, A05, and A06 serves as a salient pole. The inner surface of each of the teeth (salient poles) has a concavely circumferentially rounded shape with a curvature identical to that of the outer surface of each of the salient poles of the rotor 2. Spaces between circumferentially adjacent teeth provide 6 slots A08, A09, A0A, A0B, A0C, and A07 of the stator core 4.

As each of three-phase stator coils of the motor 110 illustrated in FIGS. 1A and 1B, a concentrated, full pitch winding is used.

An A-phase coil A0D and A0G is concentrically wound in a slot A07 between the teeth A06 and A01 and in a slot A0A between the teeth A03 and A04 at a pitch of 180 electrical degrees. Reference character A0L represents a winding path of an end of the A-phase coil A01) and AUG.

Similarly, a B-phase coil A0F and A0J is concentrically wound in a slot A09 between the teeth A02 and A03 and in a slot A0C between the teeth A05 and A06 at a pitch of 180 electrical degrees. Reference character A0M represents a winding path of an end of the B-phase coil A0F and A0J.

In addition, a C-phase coil A0H and A0E is concentrically wound in a slot A0B between the teeth A04 and A05 and in a slot A08 between the teeth A01 and A02 at a pitch of 180 electrical degrees. Reference character A0N represents a winding path of an end of the C-phase coil A0H and A0E.

In the first embodiment, the motor 110 is driven such that a direct current is supplied to flow through each of the A-, B-, and C-phase coils in positive and negative directions indicated by circled cross and circled dot symbols illustrated in FIG. 1B. The positive direction represents a direction into the paper of FIG. 1B, and the negative direction represents a direction out of the paper of FIG. 1B.

Specifically, a group of conductors in the A-phase coil through which a direct current in the positive direction flows in a slot is defined as "a positive A-phase winding (A0D)", and a group of conductors in the A-phase coil through which a direct current in the negative direction flows in a slot is defined as "a negative A-phase winding (A0G)"

Similarly, a group of conductors in the B-phase coil through which a direct current in the positive direction flows in a slot is defined as "a positive B-phase winding (A0F)", and a group of conductors in the B-phase coil through which a direct current in the negative direction flows in a slot is defined as "a negative B-phase winding (A0J)". In addition, a group of conductors in the C-phase coil through which a direct current in the positive direction flows in a slot is defined as "a positive C-phase winding (A0H)", and a group of conductors in the C-phase coil through which a direct current in the negative direction flows in a slot is defined as "a negative C-phase winding (A0E)".

Each of the coil ends A0L, A0M, and A0N is arranged over a corresponding one half part of the back yoke BY, but can be arranged over each half part of the back yoke BY.

Reference character Ht represents a circumferential electrical angular width of the inner surface of each of the teeth. Reference character Nm represents a circumferential electrical angular width of the outer surface of each of the salient poles A0K of the rotor 2. Each of the circumferential electrical angular widths Ht and Hm is for example set to be 30 electrical degrees. Note that, in the first embodiment, "circumferential electrical angular width" will also be referred to simply as "circumferential width" hereinafter.

A reference position R illustrated in FIG. 1B is a plane passing through the center of the positive A-phase winding A0D, the center axis of the rotor 2 (output shaft 1), and the center of the negative A-phase winding A0G. A present rotational position of the rotor 2 is represented by θr between one edge of one salient pole leading the rotation of the rotor 2 and the reference position R illustrated in FIG. 1B.

Note that how to describe various types of motors described in the "DETAILED DESCRIPTION OF EMBODIMENTS OF THE INVENTION" of the specification will be defined as follows. Specifically, when a motor model has the number M of salient poles of a stator and the number K of salient poles of a rotor, the motor is referred to as "MSKR motor". For example, when a motor has six salient poles of a stator (M=6) and four salient poles of a rotor (K=4) according to the first embodiment, the motor 110 is referred to as "6S4R motor 110". In other words, because the motor 110 provided with two stator poles per phase will be referred to as "two-pole motor" hereinafter.

Assuming that a rotational direction of the rotor 2 is set to counterclockwise direction CCW, the rotor 2 is for example presently located close to the rotational angle θr illustrated in FIG. 1B so that one salient pole of the first pair of the rotor 2 starts to face the tooth A01 and the other salient pole of the first pair of the rotor 2 starts to face the tooth A04. The counterclockwise direction CCW will be referred to as "CCW" hereinafter.

At that time, for creating a torque T in the CCW at the rotational position θr, an A-phase current Ia is supplied to flow through the positive A-phase winding A0D (see the circled cross) and negatively flow through the negative A-phase winding A0G (see the circled dot).

Simultaneously, a C-phase current IC is supplied to positively flow through the positive C-phase winding A0H (see the circled cross) and negatively flow through the negative C-phase winding A0E (see the circled dot).

The A-phase current Ia flowing through the A-phase coil and the C-phase current Ie flowing through the C-phase coil induce a magnetic flux from the tooth A04 to tooth A01 in accordance with the Ampere's right-handed rule through the rotor 2; this induced magnetic flux is illustrated in FIG. 1B by thick arrow A0P.

The induced magnetic flux A0P causes a magnetic attractive force between the tooth A01 and the one salient pole of the first pair of the rotor 2 and between the tooth A04 and the other salient pole of the first pair of the rotor 2. The attractive force creates a torque T in the rotor 2 in the CCW to rotate the rotor 2 therein.

At that time, no current is supplied to flow through the positive and negative B-phase windings A0F and A0J. In addition, no magnetic fluxes are created in directions substantially orthogonal to the magnetic flux A0P, that is, directions toward the stator poles A02 and A03 and toward the stator poles A05 and A06 because a magnetomotive force based on the A-phase current Ia and that based on the C-phase current Ic cancel each other. If the A-phase current Ia and the C-phase current Ic were different in magnitude from each other, magnetic fluxes would be created the directions substantially orthogonal to the magnetic flux A0P because a magnetomotive force proportional to the difference is created.

Figure 2:
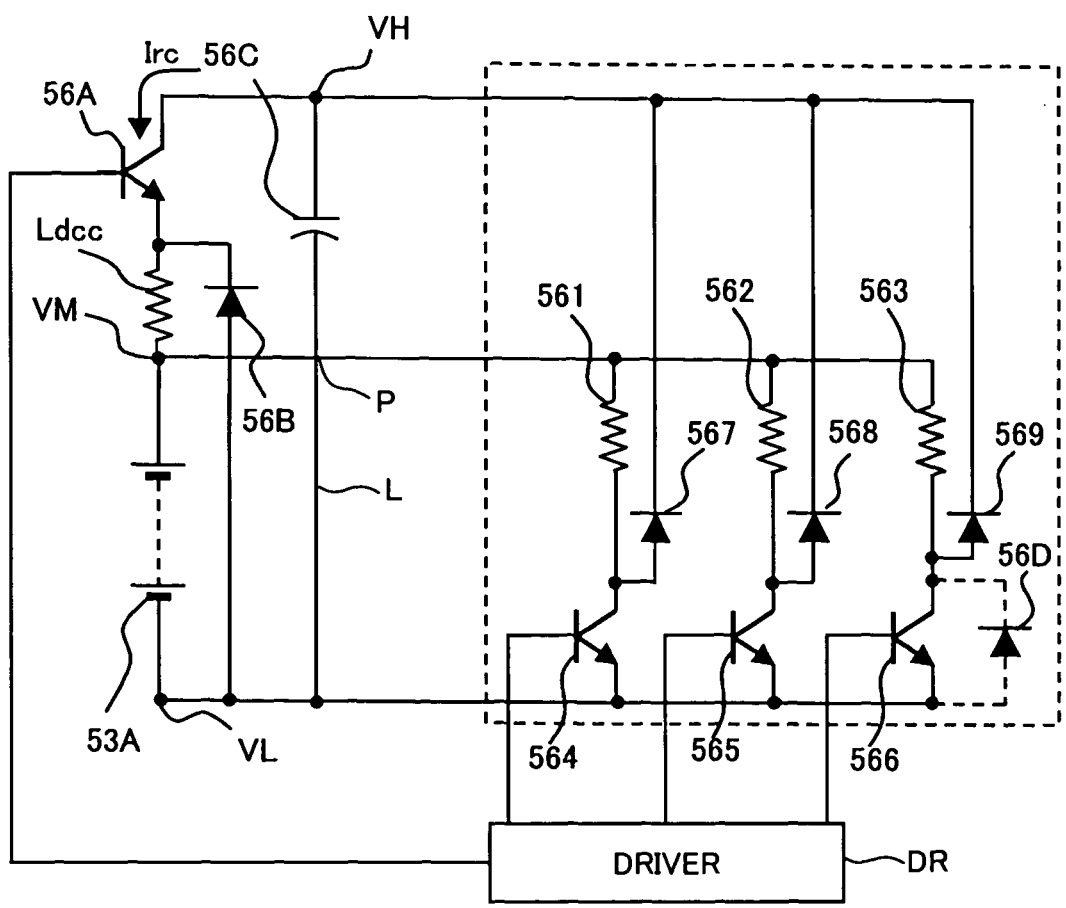
FIG. 2 is a circuit diagram schematically illustrating an example of a control device according to the first embodiment.

An example of control devices for supplying the A-, B-, and C-phase currents Ia, Ib, and Ic to the respective A-, B-, and C-phase coils is illustrated in FIG. 2.

The control device CC illustrated in FIG. 2 is designed as an inverter with a simple structure.

Reference character 561 represents the A-phase coil (positive and negative A-phase windings A0D and A0G), and reference character 562 represents the B-phase coil (positive and negative B-phase windings A0F and A0J). Reference character 563 represents the C-phase coil (positive and negative C-phase windings A0H and A0E).

The control device CC illustrated in FIG. 2 is provided with a DC power source, such as battery 53A, first to third power transistors 564 to 566, and first to third diodes 567 to 569. For example, bipolar transistors are used as the first to third power transistors, referred to simply as "first to third transistors".

A positive terminal of the battery 53A is connected to the collector of each of the first to third transistors 564 to 566. A negative terminal of the battery 53A is connected to the emitter of each of the first to third transistors 564 to 566. The A- and B-phase coils 561 and 562 are connected between the collector of the transistor 564 and the positive terminal of the battery 53A, and between the collector of the transistor 565 and the positive terminal of the battery 53A, respectively. In addition, the C-phase coil 563 is connected between the collector of the transistor 565 and the positive terminal of the battery 53A.

The anode of each of the diodes 567, 568, and 569 is connected to a point at which a corresponding one of the coils 561, 562, and 563 and the collector of a corresponding one of the transistors 564, 565, and 566 are connected to each other.

The control device CC illustrated in FIG. 2 is also provided with a choke coil Ldcc, a fourth transistor, such as a bipolar transistor, 56A, a diode 56B, and a capacitor 56C. One end of the choke coil Ldcc is connected to the positive terminal of the battery 53A, and the other end thereof is connected to the emitter of the fourth transistor 56A.

The cathode of the diode 56B is connected to a point at which the emitter of the transistor 56A and the other end of the choke coil Ldcc are connected to each other. The anode of the diode 56B is connected to the negative terminal of the battery 53A.

The battery 53A, the choke coil Ldcc, and the fourth transistor 56A are connected to each other in series to constitute a series member. The capacitor 56C is parallelly connected to the series member. That is, one electrode of the capacitor 56C is connected to the collector of the transistor 56A, and the other electrode of the capacitor 56C is connected to the negative terminal of the battery 53A.

The collector of the fourth transistor 56A is connected to the cathode of each of the diodes 567, 568, and 569.

The fourth transistor 56A, the choke coil Ldcc, and the diode 56B serve as a DC to DC converter.

The control device CC is provided with a driver DR. The driver DR consisting of, for example, a microcomputer and its peripheries is connected to the base of each of the first to fourth transistors 567, 568, 569, and 56A.

In order to excite the A-phase coil 561, the driver DR supplies an electric signal to the base of the first transistor 564 to turn it on. This allows the A-phase current to flow through the A-phase coil 561 and the first transistor 564 based on a voltage (battery voltage) VM of the battery 53A. Similarly, turning on of each of the second and third transistors 565 and 566 allows a corresponding phase winding to be excited.

For example, when the rotation of the motor is abruptly decelerated, regenerative electric power is created in each of the stator coils. The regenerative electric power is taken out through a corresponding one of the diodes 567 to 569 as a regenerative current. The regenerative current charges the capacitor 560 in a closed loop (the coil 561, the diode 567, the capacitor 56C, the battery 53A, and the coil 561).

The charged voltage in the capacitor 560 is converted by the DC to DC converter into a voltage chargeable in the battery 53A. Thus, the converted voltage is charged in the battery 53A.

Note that the other electrode of the capacitor 560 can be connected to a point P to which the positive terminal of the battery 53A is connected. In this structure, a line L between the point P and the negative terminal of the battery 53A should be omitted.

Specifically, the driver DR supplies an electric signal to the control terminal of the fourth transistor 56A to turn it on. This allows the charged voltage in the capacitor 560 to flow a DC current Irc to the choke coil Ldcc. This charges magnetic energy in the choke coil Ldcc. When the driver DR turns the fourth transistor 56A off, the charged magnetic energy causes the current Irc to flow through the diode 56B and the battery 53A to thereby charge the battery 53A. Note that reference character VM represents the voltage of the battery 53A, and reference character Vii represents a regenerative voltage based on the regenerative current to be charged in the capacitor 56C.

As described above, the control device CC illustrated in FIG. 2 is operative to obtain regenerative electric power from kinetic energy and magnetic energy of the motor 110 thus effectively recovering the regenerative electric power in the battery 53A.

Note that the regenerative voltage VH illustrated in FIG. 2 can be set to meet regenerative characteristics of the motor 110 to be required. Particularly, when the motor 110 is to be used at a higher RPM, it is necessary to reduce a current reduction time of each stator winding. Because the reduction in current in a stator winding means the regeneration of magnetic energy created in the stator winding, the higher the regenerative voltage VH is, the more the current reduction time of each stator winding can be reduced.

The structure of the DC to DC converter can be modified. A snubber circuit can be provided in parallel to each transistor for preventing high voltage spikes from damaging a corresponding transistor. A blocking diode, illustrated by an imaginary line as 56D in FIG. 2, can be connected in antiparallel to each of the transistors.

Figure 3:
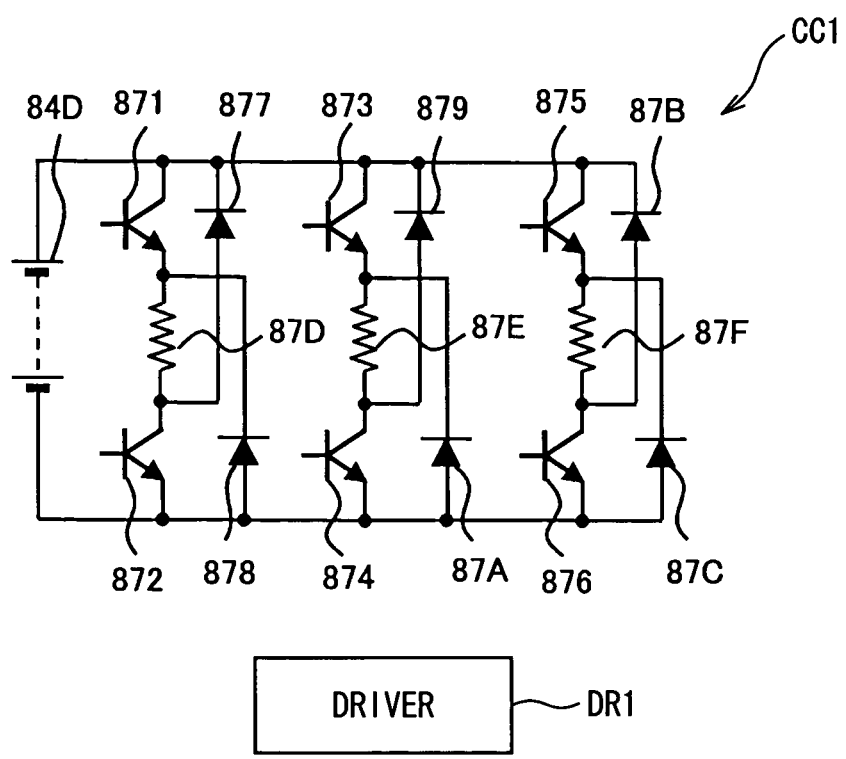
FIG. 3 is a circuit diagram schematically illustrating another example of a control device according to the first embodiment.

An alternative example of control devices for supplying the A-, B-, and C-phase currents Ia, Ib, and Ic to the respective A-, B-, and C-phase windings is illustrated in FIG. 3.

The control device CC1 illustrated in FIG. 3 is designed as an inverter with six transistors.

In FIG. 3, reference character 87D represents the A-phase coil (positive and negative A-phase windings A0D and A0G), and reference character 87E represents the B-phase coil (positive and negative B-phase windings A0F and A0J). Reference character 87F represents the C-phase coil (positive and negative C-phase windings A0H and A0E).

The control device CC1 is provided with a DC battery 84D. The control device CC1 consists of a first pair of power transistors 871 and 872 between which the A-phase coil is connected, and a, second pair of power transistors 873 and 874 between which the B-phase coil is connected. The inverter also consists of a third pair of power transistors 875 and 876 between which the C-phase coil is connected. As power transistors, bipolar transistors are for example used.

Specifically, the emitter of each of the high-side transistors 871, 873, and 875 is commonly connected to one end of a corresponding one phase winding, and the collector thereof is commonly connected to a positive terminal of the battery 84D. The collector of each of the low-side transistors 872, 874, and 876 is commonly connected to the other end of a corresponding one phase winding, and the emitter thereof is commonly connected to a negative terminal of the battery 84D.

A diode 877 is connected in antiparallel to the series-connected transistor 871 and A-phase winding 87D, and a diode 878 is connected in antiparallel to the series-connected transistor 872 and A-phase coil 8713. Similarly, a diode 879 is connected in antiparallel to the series-connected transistor 873 and B-phase coil 87E, and a diode 87A is connected in antiparallel to the series-connected transistor 874 and B-phase coil 87E. In addition, a diode 87B is connected in antiparallel to the series-connected transistor 875 and C-phase coil 87F, and a diode 87C is connected in antiparallel to the series-connected transistor 876 and C-phase coil 87F.

The control device CC1 illustrated in FIG. 3 is provided with, a driver DR1. The driver DR1 consisting of for example, a microcomputer and its peripheries is connected to the base of each of the transistors 871, 872, 873, 874, 875, and 876.

For example, in order to excite the A-phase coil 87D, the driver DR1 is operative to supply an electric signal to the base of each of the transistors 871 and 872 to turn on the transistors 871 and 872, thus applying a DC voltage supplied from the DC battery 8413 to the A-phase coil 87D.

In order to recover magnetic energy created in the A-phase coil 87D during the transistors 871 and 872 being excited, the driver DR1 is operative to turn the transistors 871 and 872 off. This allows a regenerative current based on the magnetic energy created in the A-phase coil 87D to flow through the flywheel diode 877, the battery 84D, and the flywheel diode 878. This charges the battery 84D.

At that time, turning on of the transistor 872 with the transistor 871 being off causes a flywheel current to flow through the A-phase coil 87D, the transistor 872, and the diode 878.

The DC-voltage applying control, the magnetic energy recovering control, and the flywheel-current control for the A-phase coil 87D, the transistors 871 and 872, and the diodes 877 and 878 can be carried out for the B-phase coil 87E, the transistors 873 and 874, and the diodes 879 and 87A and for the C-phase coil 87F, the transistors 875 and 876, and the diodes 87B and 87C.

Note that, as described above, the control device CC1 illustrated in FIG. 3 is designed to cause a current to flow through each stator coil in only one direction. When a negative voltage might be applied to each transistor due to operations of the motor 110, it would be possible to additionally connect a protective diode, such as a diode illustrated by an imaginary line as 56D in FIG. 2, in antiparallel to each of the transistors 871 to 876. This can be established in other inverters according to the present invention for causing a current to flow through each stator coil in only one direction.

As well as the control device CC illustrated in FIG. 2, in order to reduce a current reduction time of each stator winding, each diode can be connected to an alternative DC battery higher than the DC battery 84D. This can creates a regenerative voltage to be recovered to the alternative DC battery.

Next, operations of the motor 110 illustrated in FIGS. 1A and 113 will be described hereinafter with reference to (a) to (d) of FIG. 4.

Specifically, when the rotor 2 is presently located close to the rotational angle θr of 30 degrees illustrated in (a) of FIG. 4 as well as FIG. 1B, one salient pole of the first pair of the rotor 2 starts to face the tooth A01 and the other salient pole of the first pair of the rotor 2 starts to face the tooth A04.

At that time, the A-phase DC current Ia is supplied from the control device CC or CC1 to positively flow through the positive A-phase winding A0D illustrated by the circled cross and negatively flow through the negative A-phase winding A0C illustrated by the circled dot. Simultaneously, the C-phase DC current Ic is supplied from the control device CC or CC1 to positively flow through the positive C-phase winding A0H illustrated by the circled cross and negatively flow through the negative C-phase winding A0E illustrated by the circled dot.

The A-phase DC current Ia flowing through the A-phase coil and the C-phase DC current Ic flowing through the C-phase coil induce a magnetic flux from the tooth A04 to tooth A01 illustrated in (a) of FIG. 4 by thick arrow A0P.

The induced magnetic flux A0P causes a magnetic attractive force between the tooth A01 and the one salient pole of the first pair of the rotor 2 and between the tooth A04 and the other salient pole of the first pair of the rotor 2. The attractive force creates a torque T in the rotor 2 in the CCW to rotate the rotor 2 therein.

At that time, no DC current is supplied from the control device CC or CC1 to flow through the B-phase windings A0F and A0J. In addition, no magnetic fluxes are created in directions substantially orthogonal to the magnetic flux A0P, that is directions toward the stator poles A02 and A03 and toward the stator poles A05 and A06 because a magnetomotive force based on the A-phase DC current Ia and that based on the C-phase DC current Ic cancel each other.

Note that, because the magnetic flux A0P passes through the B-phase coil so that it links the B-phase coil, a voltage Vb is generated across both ends of the B-phase winding; this voltage Vb is given by the following expression:

$$Vb = Nw \times d\phi/dt.$$

where Nw represents the number of turns of the B-phase coil, and φ represents the magnetic flux A0P created by the excited A- and C-phase coils and linking the B-phase coil. Thus, the magnetic flux A0P will be also referred to as "linkage flux φ" hereinafter.

When the rotor 2 is presently located close to the rotational angle θr of 45 degrees illustrated in (b) of FIG. 4, one salient pole of the second pair of the rotor 2 is close to the tooth A03 and the other salient pole of the second pair of the rotor 2 is close to the tooth A06. In addition, one salient pole of the first pair of the rotor 2 faces the tooth A01 and the other salient pole of the first pair of the rotor 2 faces the tooth A04.

At that time, the A-phase DC current Ia is supplied from the control device CC or CC1 to positively flow through the positive A-phase winding A0D illustrated by the circled cross and negatively flow through the negative A-phase winding A0G illustrated by the circled dot. Simultaneously, the B-phase DC current Ib is supplied from the control device CC or CC1 to positively flow through the positive B-phase winding A0F illustrated by the circled cross and negatively flow through the negative B-phase winding A0J illustrated by the circled clot.

The A-phase DC current Ia flowing through the A-phase coil and the B-phase DC current Ib flowing through the B-phase coil induce a magnetic flux A0P from the tooth A06 to tooth A03 illustrated in (b) of FIG. 4.

The induced magnetic flux A0P causes a magnetic attractive force between the tooth A03 and the one salient pole of the second pair of the rotor 2 and between the tooth A06 and the other salient pole of the second pair of the rotor 2. The attractive force creates a torque T in the rotor 2 in the CCW to rotate the rotor 2 therein.

At that time, no DC current is supplied from the control device CC or CC1 to flow through the C-phase windings A0H and A0E.

When the rotor 2 is presently located close to the rotational angle θr of 60 degrees illustrated in (c) of FIG. 4, one salient pole of the second pair of the rotor 2 faces the tooth A03 and the other salient pole of the second pair of the rotor 2 faces the tooth A06. In addition, one salient pole of the first, pair of the rotor 2 faces the tooth A01 and the other salient pole of the first pair of the rotor 2 faces the tooth A04.

At that time, the A-phase DC current Ia is supplied from the control device CC or CC1 to positively flow through the positive A-phase winding A0D illustrated by the circled cross and negatively flow through the negative A-phase winding A0C illustrated by the circled dot. Simultaneously, the B-phase DC current Ib is supplied from the control device CC or CC1 to positively flow through the positive B-phase winding A0F illustrated by the circled cross and negatively flow through the negative B-phase winding A0J illustrated by the circled dot.

The A-phase DC current Ia flowing through the A-phase coil and the B-phase DC current Ib flowing through the B-phase coil induce a magnetic flux A0P from the tooth A06 to tooth A03 illustrated in (c) of FIG. 4.

The induced magnetic flux A0P causes a magnetic attractive force between the tooth A03 and the one salient pole of the second pair of the rotor 2 and between the tooth A06 and the other salient pole of the second pair of the rotor 2. The attractive force creates a torque T in the rotor 2 in the CCW to rotate the rotor 2 therein.

At that time, no DC current is supplied from the control device CC or CC1 to flow through the C-phase windings A0H and A0E.

When the rotor 2 is presently located close to the rotational angle θr of 75 degrees illustrated in (d) of FIG. 4, one salient pole of the first pair of the rotor 2 is close to the tooth. A02 and the other salient pole of the first pair of the rotor 2 is close to the tooth A05. In addition, one salient pole of the second pair of the rotor 2 faces the tooth A03 and the other salient pole of the second pair of the rotor 2 faces the tooth A06.

At that time the B-phase DC current Ib is supplied from the control device CC or CC1 to positively flow through the positive B-phase winding A0F illustrated by the circled cross and negatively flow through the negative B-phase winding A0J illustrated by the circled dot. Simultaneously, the C-phase DC current Ic is supplied from the control device CC or CC1 to positively flow through the positive C-phase winding A0H illustrated by the circled cross and negatively flow through the negative C-phase winding A0E illustrated by the circled dot.

The B-phase DC current Ib flowing through the B-phase coil and the C-phase DC current Ic flowing through the C-phase coil induce a magnetic flux A0P from the tooth A02 to tooth A05 illustrated in (d) of FIG. 4.

The induced magnetic flux A0P causes a magnetic attractive force between the tooth A02 and the one salient pole of the first pair of the rotor 2 and between the tooth A05 and the other salient pole of the first pair of the rotor 2. The attractive force creates a torque T in the rotor 2 in the CCW to rotate the rotor 2 therein.

At that time, no DC current is supplied from the control device CC or CC1 to flow through the A-phase windings A0D and A0G.

As illustrated in FIG. 4, switching the A-, B-, and C-phase currents Ia, Ib, and Ic from one another depending upon the rotational position θr of the rotor 2 under control of the control device CC or CC1 achieves a continuous torque to continuously rotate the rotor 2. As described above, the supply of one pair of in the previously directed DC currents Ia, Ib, and Ic to a corresponding one pair of stator coils generates the magnetic flux A0P to thereby generate a torque T; this one pair of the stator coils is located at both circumferential sides of each stator pole magnetically attracting a corresponding one rotor pole.

Specifically, the motor 110 according to the first embodiment has a feature that each of the currents Ia, Ib, and Ic is one-way (unidirectional) current and each of the stator coils and a corresponding one current contribute to two different electromagnetic actions. In addition, two-phase stator coils serve as two individual paths through which power is supplied.

Because each stator winding serves to drive corresponding two stator poles at its both circumferential sides, in other words, each stator coil serves to drive corresponding four stator poles, each power transistor serves to drive corresponding four stator poles. For example, the A-phase stator coil serves to drive four stator poles A01, A07, A04, and A03. Reluctance torque, which is created by the motor 110 according to the first embodiment, effectively utilizes one-directional attractive force independently of the direction of the magnetic flux.

These characteristics of the motor 110 according to the first embodiment can reduce the motor 110 in size, and reduce the current capacity of each power transistor of the control device CC or CC1. These characteristics can be applied to other types of motors described later.

Note that the motor 110 according to the first embodiment can be driven by a bidirectional current controller for bidirectionally supplying a current to each of the stator coils, and therefore, such bidirectional current controller for individually exciting the stator coils can be included within the scope of the present invention. As described later, in some types of motors, supplying positive and negative currents to each of the stator windings can improve the average output torques, the peak output torques, and the constant-output characteristics of these motors.

Next, let us qualitatively consider torque T to be created by the motor according to the first embodiment.

The efficiency of motors at their maximum toques is not much of a problem in motors for many applications, such as automobiles; each motor for automobiles is required to create the half of its maximum toque or less and the maximum toque in each motor is not frequently used.

In these applications, the reduction in size and cost of motors significantly depends on the characteristics of their maximum torques.

Let us consider torque characteristics of the motor model illustrated in FIGS. 1A and 1B and located close to the rotational position θr of 30 degrees in a region between each of the salient poles of the rotor and a corresponding one of the teeth of the stator opposite thereto. The region is divided into a linear operating area Aa and a nonlinear operating area As.

In the linear operating area Aa, the soft magnetic material of each of the salient poles of the rotor and that of a corresponding one of the teeth of the stator are not magnetically saturated. In the nonlinear operating area As, the soft magnetic material of each of the salient poles of the rotor and that of a corresponding one of the teeth of the stator are magnetically saturated.

In the linear operating area Aa, a created flux density Bx and a created flux linkage φ are schematically given with the use of the following equations (1) to (5) on the condition that each of the A- and C-phase current Ia, and Ic is constant and the B-phase current Ib is zero:

$$\omega r = d\theta r/dt \quad (1)$$

$$Vx = Nw \times d\varphi/dt \quad (2)$$

$$= Nw \times d\varphi/d\theta r \times d\theta r/dt \quad (3)$$

$$= Nw \times d\varphi/d\theta r \times \omega r \quad (4)$$

$$Bx = Kb \times Ix \times Nw \quad (5)$$

where Nw represents the number of turns of each stator coil, Ix represents a current to be supplied to each of the A- and C-phase coils, Vx represents a voltage induced across both ends of one-phase coil, Kb represents a proportional constant of the flux density, tc represents the thickness of the motor in the axial direction of the rotor, wr represents a rotational angular velocity of the rotor, t represents a time, and R represents the radius of the rotor.

The flux-linkage change rate dφ/dθr through one-phase winding with change in the rotational position of the rotor appearing in the equation (4) is given by the following equations (6) and (7):

$$d\varphi/d\theta r \approx \Delta\varphi/\Delta\theta r \quad (6)$$

$$= (tc \times \omega r \times \Delta t \times R \times Bx)/(\omega r \times \Delta t) \quad (7)$$

$$= (tc \times \omega r \times \Delta t \times R \times Kb \times Ix \times Nw)/(\omega r \times \Delta t)$$

$$= tc \times R \times Kb \times Ix \times Nw$$

At that time, input power Pin from the stator coils is represented by the following equation (8) assuming that a resistance Ra of each stator coil is zero, an iron loss Pfe and a mechanical loss of the motor are all zero, and the air gap between the rotor and the stator is set to be sufficiently-small:

$$Pin = 2 \times Vx \times Ix = 2 \times Nw \times d\varphi/dt \times Ix \quad (8)$$

Note that the coefficient of 2 represents, at 30 degrees of the rotational position θr of the rotor, the number of stator coils, such as A- and C-phase coils, that supply power.

In addition, a mechanical output Pout of the motor is represented by the following equation (9):

$$Pout = T \times wr \quad (9)$$

where T represents a torque of the motor in the linear operating area Aa.

In accordance with the equations (1) to (9), the torque T of the motor in the linear operating area Aa is given by the following equation (10):

$$T = 2 \times Nw \times d\varphi/dt \times Ix/\omega r \quad (10)$$

$$= 2 \times Nw \times d\varphi/d\theta r \times d\theta r/dt \times Ix/\omega r$$

$$= 2 \times Nw \times d(tc \times R \times Kb \times Ix \times Nw) \times \omega r \times Ix/\omega r$$

$$= 2 \times Nw \times tc \times R \times Kb \times Nw \times Ix^2$$

Thus, the torque T of the motor in the linear operating area Aa is proportional to the proportional constant Kb of the flux density and to the square of the current Ix.

Figure 5:
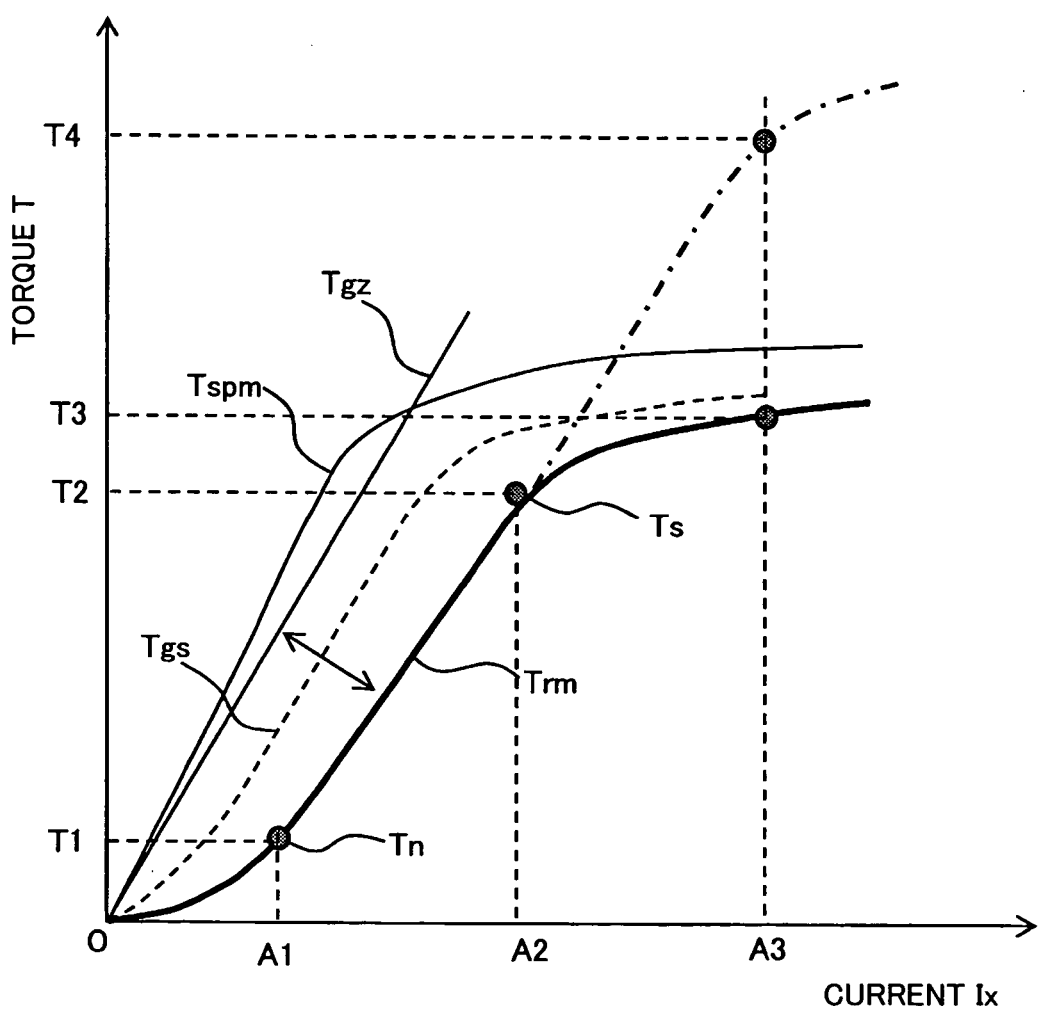
FIG. 5 is a view schematically illustrating examples of the relationship between current and torque of the motor illustrated in FIGS. 1A and 1B in graph format.
Figure 113:
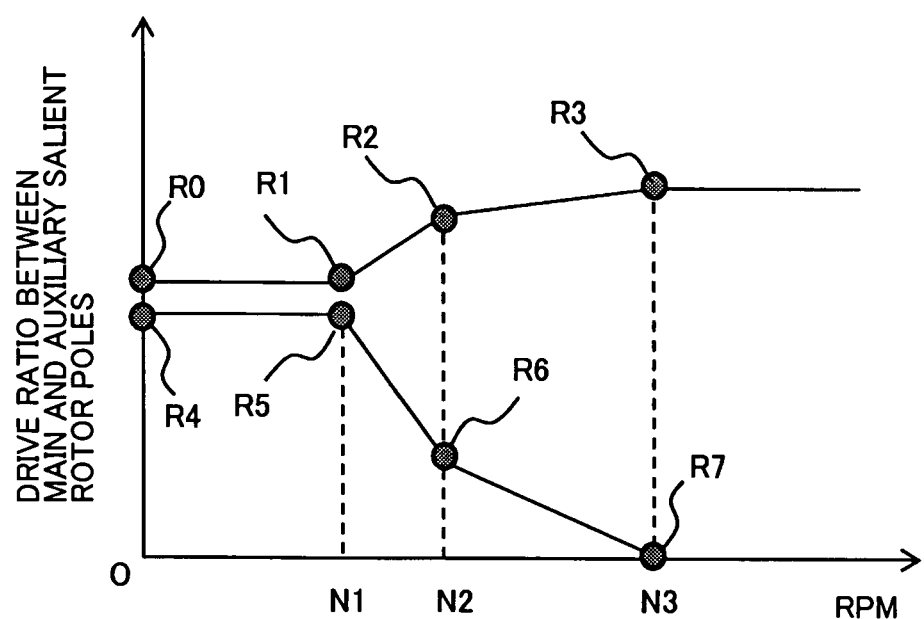
FIG. 113 is a graph schematically illustrating an example of the ratio of the number of excitations of the main salient poles to the number of excitations of the auxiliary salient poles of the reluctance motor illustrated in FIG. 54.

FIG. 5 illustrates examples of the relationship between current Lx and torque T of the motor 110 illustrated in FIGS. 1A and 113 in graph format. Thick characteristic curve indicated by reference character Tim represents a typical current-torque characteristic curve obtained by the motor 110. Within a region in the motor corresponding to a portion of the curve Trm from its origin O to its operating point Tn at a value A1 of the current Ix and a value T1 of the torque T, the change of the soft magnetic material of the motor is substantially magnetically linear. Thus, the relationship between torque T and current Ix has a characteristic curve close to a quadratic function; this relationship is represented by the equation (10).

A portion of the curve Tm from the operating point Tn to a torque-saturated point Ts at a value A2 of the current Ix and a value T2 of the torque T corresponds to a magnetic region in the motor within which the flux density of a portion of the soft magnetic material of the motor close to the air gap between a stator pole and a rotor pole becomes a saturation flux density of 2.0 [T]. The torque characteristics of the motor in the region will be described below.

A portion of the curve T greater in current than the torque-saturated point Ts corresponds to a region in the motor within which any point in a magnetic path, such as the back yoke, formed in the motor in addition to the portion of the motor close to the air gap is magnetically saturated. In the magnetically saturated region in the magnetic path, it is difficult to apply electric energy to the air gap.

A characteristic curve Tgs illustrated in FIG. 5 represents a current-torque characteristic curve obtained by a motor model in which the length of the air gap between each stator pole and a corresponding one rotor pole is substantially the half of the air gap between each stator pole and a corresponding one rotor pole of the motor 110 having the characteristic curve Trm.

Approaching the length of the air gap to zero makes the characteristic curve Tgs approach to a substantially linear characteristic curve Tgz illustrated in FIG. 5.

Figure 121:
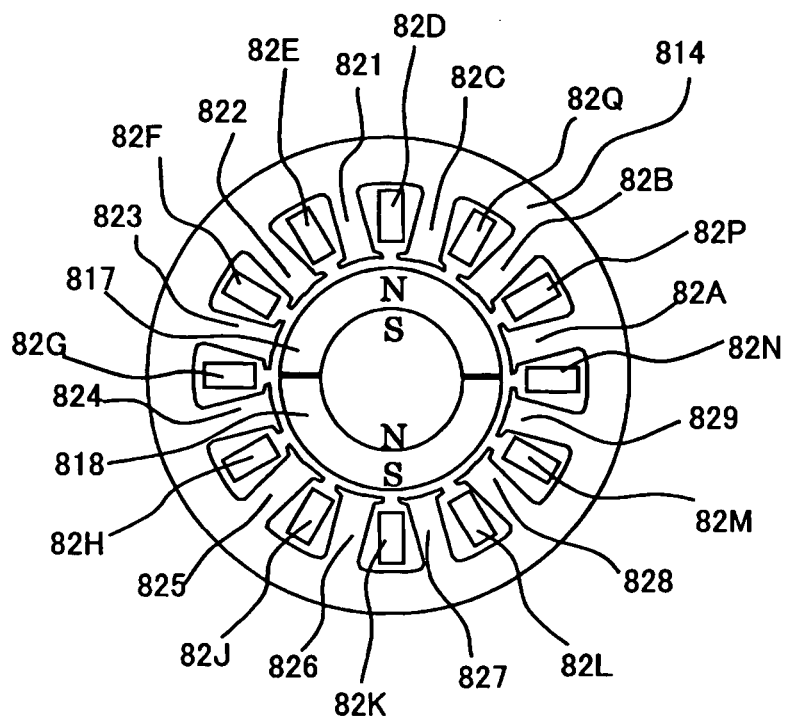

A characteristic curve Tspm illustrated in FIG. 5 represents a current-torque characteristic curve obtained by a surface permanent magnet synchronous motor model, an example of which is illustrated in FIG. 121. Specifically the motor model uses, as its permanent magnets, Neodymium iron boron (NdFeB) permanent magnets and produces a flux density of the order of 1.2 [T].

Although the saturation flux density of NdFeB permanent magnets is the order of 1.2 [T] lower than that of a soft magnetic material of 2.0 [T], a magnetic flux at the surface of a NdFeB permanent magnet depends on its position. For this reason, the flux-linkage change rate dφ/dθr with change in the rotational position of the rotor is twice that in such a motor with the substantially linear characteristic curve Tgz. This results in that such a surface permanent magnet synchronous motor model using NdFeB permanent magnets can be designed such that its characteristic curve Tspm has a steeper gradient as compared with that of the characteristic curve Tgz.

For example, the average flux density of each of the NdFeB permanent magnets of the surface permanent magnet synchronous motor model is 1.0 [T], the gradient of the characteristic curve Tspm is identical to that of the characteristic curve Tgz. The gradients of such characteristic curves of motors can be flexibly designed.

Next, let us obtain a torque T in the nonlinear operating area As assuming that reference character Bsat represents a saturation flux density. The nonlinear operating area As corresponds to the portion of the curve Tm from the operating point Tn to the torque-saturated point Ts within which a portion of the soft magnetic material of the motor close to the air gap is magnetically saturated.

The flux-linkage change rate dφ/dθr with change in the rotational position of the rotor is given by the following equation (11):

$$d\varphi/d\theta r \approx \Delta\varphi/\Delta\theta r \quad (11)$$
$$= (tc \times \omega r \times \Delta t \times R \times Bsat)/(\omega r \times \Delta t)$$
$$= tc \times R \times Bsat$$

The voltage Vx across both ends of one stator coil that generates torque is given by the following equation (12):

$$Vx = Nw \times d\varphi/dt \quad (12)$$
$$= Nw \times d\varphi/d\theta r \times d\theta r/dt$$
$$= Nw \times tc \times R \times Bsat \times \omega r$$

The input power Pin from the stator windings of the motor is represented by the following equations (13) and (14):

$$Pin = 2 \times Vx \times Ix \quad (13)$$
$$= T \times \omega r$$
$$= 2 \times Nw \times tc \times R \times Bsat \times \omega r \quad (14)$$

The torque T of the motor in the nonlinear operating area As is given by the following equation (15):

$$T = 2 \times Nw \times Vx \times Ix/\omega r \quad (15)$$
$$= 2 \times Nw \times tc \times R \times Bsat \times \omega r \times Ix/\omega r$$
$$= 2 \times Nw \times tc \times R \times Bsat \times Ix$$

Thus, the torque T of the motor in the nonlinear operating area As is proportional to the saturation flux density Bsat and to the current Ix. The torque T of the motor in the nonlinear operating area As corresponds to the portion of the curve Tin from the operating point Tn to the torque-saturated point Ts.

The maximum torque T is naturally proportional to the number Nw of turns of each stator coil, the thickness tc of the motor in the axial direction of the rotor, and the radius R of the rotor.

It follows from what has been described that the characteristics of maximum torques of motors, which are important to reduce in size and cost of them, can be estimated to be strongly dependent on the saturation flux density Bsat.

Note that the equation (11) is established when predetermined conditions are met; these predetermined conditions include:

the first condition that there are no magnetic saturations in the motor except for the region between each of the salient poles of the rotor and a corresponding one of the teeth of the stator opposite thereto; and the second condition that the leakage flux density in a space around the rotor in the circumferential direction thereof is set to be sufficiently lower than the flux density of the soft magnetic portion of the motor.

It is assumed that the first and second conditions are equivalently met among these compared motors set forth above.

Magnetic energy Ew associated with each stator coil is represented by the following equation (16):

$$Ex = \frac{1}{2} \times Nw \times \varphi \times Ix \quad (16)$$

For example, when the rotor 2 is located close to the rotational angle θr of 30 degrees illustrated in (a) of FIG. 4 and, as each of the A-phase current Ia and C-phase current To, the current Ix is supplied to flow through each of the A- and C-phase coils, magnetic energy represented by the equation (16) is present in each of the A- and C-phase coils. Thus, because the number of the A- and C-phase coils is two, magnetic energy in the whole of the motor is twice the magnetic energy represented by the equation (16). The magnetic energy is required to calculate voltage, current, and time required to increase or reduce current based on the magnetic energy.

As described above, the maximum torque of a motor is strongly dependent on the saturation flux density Bsat at which the motor operates. At the operating point of the motor 110 illustrated in FIG. 1B, the motor 110 utilizes the maximum flux density. As described above, when the magnetic steel sheets are used to produce the stator and the rotor of the motor 110, it is possible to utilize the flux density of the order of 2.0 [T].

Features of the reluctance motor 110 illustrated in FIG. 1B will be described hereinafter in comparison to the conventional surface permanent magnet synchronous motor illustrated in FIG. 121. In describing the features of the reluctance motor 110, it is assumed that the air gap between the stator and the rotor is set to be sufficiently small, and therefore the burden of excitation by the reluctance motor 110 is small.

Assuming that the conventional motor illustrated in FIG. 121 uses high-performance magnets, such as NdFeB magnets, as its permanent magnets and the average flux density of each of the high-performance magnets is 1.0 [T], the flux density of each of the teeth of the stator of the motor illustrated in FIG. 121 becomes its saturation flux density of 2.0 [T]. Because a flux density acting as a torque of the motor illustrated in FIG. 121 is the average flux density between a flux density of each tooth of the stator and that of each slot, the half of the saturation flux density of 2.0 [T] of each tooth acts as a torque of the motor illustrated in FIG. 121. That is, the flux density of 1.0 [T] contributes to a torque of the motor illustrated in FIG. 121.

Thus, the flux density acting as a torque of the motor illustrated in FIG. 121 is lower than that acting as a torque of the reluctance motor 110.

In addition, the flux-linkage change rate with change in the rotational position of the rotor of the motor illustrated in FIG. 121 is twice the flux-linkage change rate with change in the rotational position of the rotor of the reluctance motor 110. This is because fluxes of permanent magnets strongly depend in magnitude and direction on locations of the permanent magnets, but fluxes of the salient pole rotor 2 made of a soft magnetic material can be freely changed, relative to the stator poles, in magnitude and direction within the magnetic hysteresis of the soft magnetic material Consequently, a torque of the reluctance motor 110 is twice in flux density that of the surface permanent magnet motor illustrated in FIG. 121, and is the half, in location dependence of fluxes, of that of the surface permanent magnet motor illustrated in FIG. 121. Thus, the total torque of the reluctance motor 110 is identical to that of the surface permanent magnet motor illustrated in FIG. 121.

In addition, when the rotor 2 of the reluctance motor 110 illustrated in FIG. 1B and located close to the rotational angle θr of 30 degrees is designed to output a maximum torque, the reluctance motor 110 is designed to use the saturation flux density Bsat of the soft magnetic material, which is the limit flux density thereof.

Next, an algorithm for driving the reluctance motor 110 by the control device CC or CC1 will be described hereinafter with reference to FIG. 4.

As described above, when the rotor 2 is presently located close to the rotational angle θr of 30 degrees illustrated in (a) of FIG. 4, the A-phase DC current Ia flowing through the A-phase windings A0D, A0G and the C-phase DC current Ic flowing through the C-phase windings A0H, A0E induce the magnetic flux A0P illustrated in (a) of FIG. 4. The magnetic flux is A0P creates a torque T in the rotor 2 in the CCW to rotate the rotor 2 therein.

When the rotor 2 is presently located close to the rotational angle θr of 45 degrees illustrated in (b) of FIG. 4, the A-phase DC current Ia flowing through the A-phase windings A0D, A0G and the B-phase DC current Ib flowing through the B-phase windings A0F, A0J induce the magnetic flux A0P illustrated in (b) of FIG. 4. The magnetic flux A0P creates a torque T in the rotor 2 in the CCW to rotate the rotor 2 therein.

When the rotor 2 is presently located close to the rotational, angle θr of 60 degrees illustrated in (c) of FIG. 4, the A-phase DC current Ia flowing through the A-phase windings A0D, A0G and the B-phase DC current Ib flowing through the B-phase windings A0F, A0J induce the magnetic flux A0P illustrated in (b) of FIG. 4. The magnetic flux A0P creates a torque T in the rotor 2 in the CCW to rotate the rotor 2 therein.

When the rotor 2 is presently located close to the rotational angle θr of 75 degrees illustrated in (d) of FIG. 4, the B-phase DC current Ib flowing through the B-phase windings A0F, A0J and the C-phase DC current Ic flowing through the C-phase windings A0H, A0E induce the magnetic flux A0F illustrated in (d) of FIG. 4. The magnetic flux A0P creates a torque T in the rotor 2 in the CCW to rotate the rotor 2 therein.

Figure 6:
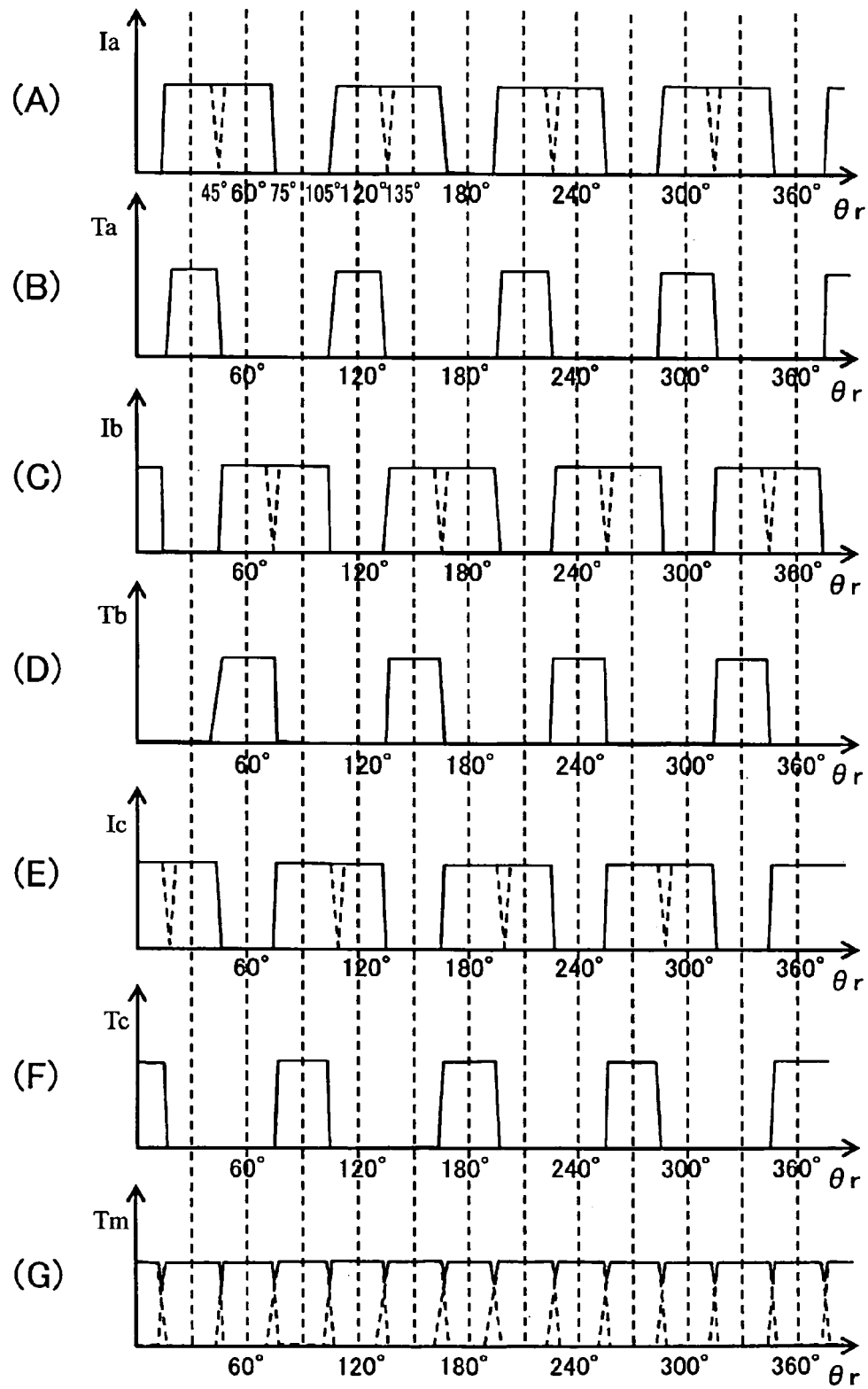
FIG. 6 is a timing chart schematically illustrating an example of exciting patterns for stator windings of the motor illustrated in FIGS. 1A and 1B, and torques created by the excited stator windings.

As illustrated in FIG. 6, switching, by the control device CC or CC1, the A-, B-, and C-phase currents Ia, Ib, and Ic from one another depending upon the rotational position θr of the rotor 2 in accordance with the exciting pattern illustrated in FIG. 6 allows the rotor 2 to continuously rotate. Change of the direction of each of the A-, B-, and C-phase currents Ia, Ib, and Ic allows the rotor 2 to turn in the CCW and clockwise direction CW. In addition, the reluctance motor 110 can be driven in power running mode in which the rotational direction and the torque direction are identical to each other, and in regeneration mode in which the rotational direction and the torque direction are opposite to each other. The clockwise direction will be referred to simply as "CW" hereinafter.

FIG. 6 schematically illustrates an example of exciting patterns (current supply patterns) for the stator windings in a transitional range of the rotational position θr in a range from 0 to 360 electrical degrees. FIG. 6 also illustrates torques created by exciting the stator windings in accordance with the example of the exciting patterns in the transitional range of the rotational position θr.

Specifically, (A) of FIG. 6 illustrates, by solid line, an excitation pattern (a pattern of supplying the A-phase current Ia) for the A-phase windings by the control device CC or CC1, and (C) of FIG. 6 illustrates, by solid line, an excitation pattern (a pattern of supplying the B-phase current Ib) for the B-phase windings by the control device CC or CC1. In addition, (E) of FIG. 6 illustrates, by solid line, an excitation pattern (a pattern of supplying the C-phase current Ic) for the C-phase windings by the control device CC or CC1.

(B) of FIG. 6 shows a torque Ta to be given to the rotor 2 from the stator poles A01 and A04 illustrated in (a) of FIG. 4, and (D) of FIG. 6 shows a torque Tb to be given to the rotor 2 from the stator poles A03 and A06 illustrated in (b) and (c) of FIG. 4. (F) of FIG. 6 shows a torque Tc to be given to the rotor 2 from the stator poles A02 and A05 illustrated in (d) of FIG. 4.

(G) of FIG. 6 shows a transition of a continuous torque Tm for rotation of the rotor 2 by making connections between the created torques Ta, Tb, and Tc by solid line.

The motor 110 illustrated in FIG. 1B is designed such that the circumferential electrical angular width Ht of the inner surface of each tooth and the circumferential electrical angular width Hm of the outer surface of each salient pole AUK of the rotor 2 are each set to 30 electrical degrees. That is, because the number (M) of the stator poles is 6, the circumferential electrical angular width Ht of the inner surface of each of the teeth can be calculated by the following equation:

$$Ht = 360/(6 \times 2) = 30 \text{ electrical degrees.}$$

For this reason, when a torque created by a corresponding pair of stator poles excited by a corresponding phase current is shifted to another torque to be created by a corresponding alternative pair of stator poles excited by a corresponding alternative phase current, the continuous torque Tm is reduced. An increase in each of the circumferential electrical angular width of the inner surface of each tooth and that of the outer surface of each salient pole MK of the rotor 2 from an electric angle of 30 degrees can reduce the drop in the torque Tm at a torque shift in the continuous torque Tm.

A basic example of how to drive the reluctance motor 110 illustrated in FIG. 1B is illustrated in FIG. 6, but the present invention is not limited to the example. Specifically, adjustment of the phase and/or the magnitude of each phase current can more effectively drive the reluctance motor 110. For example, advance of the phase of each phase current can effectively address a delay in current-increase and current-reduction responses during high-speed rotation of the motor.

Even if the same current is supplied to flow through one pair of two-phase stator coils, the magnitude of the magnetic flux φ is changed with change in the rotational position of the rotor 2 so that the magnetic energy represented by the equation [16] is changed. In addition, a voltage is induced across both ends of each stator winding as the rotor 2 is turned. Thus, an application of a voltage to one phase coil in an electrical angular range during which no voltage is induced across the one phase coil and a small magnetic energy is stored therein can speed up the increase in one phase current flowing through the one phase coil. For this reason, advance of the phase of each phase current can effectively address a delay in current-increase and current-reduction responses.

In order to apply a proper voltage to each phase coil at a proper timing, the flux linkage by each phase coil is estimated, and, based on the estimated flux linkage by each phase coil, the proper voltage to be applied to a corresponding one phase winding is calculated. Then, the calculated proper voltage can be applied to each phase coil in feedforward control. This can properly control each phase current at a high response. The feedforward control method set forth above will be described later.

The supply of one phase current to a corresponding phase winding in one direction and an alternative one phase current to a corresponding alternative phase winding circumferentially adjacent to each other via one stator pole in a direction opposite to the one direction creates a magnetic flux by the one stator pole. One phase current to a corresponding phase winding and an alternative one phase current to a corresponding alternative phase winding circumferentially adjacent to each other via one stator pole can be different in magnitude from each other. A current can be simultaneously supplied to flow through each of the three-phase stator coils.

The example of the exciting pattern for the A-phase coil illustrated in (A) of FIG. 6 is designed such that:

a constant value of the A-phase current Ia is supplied to the A-phase coil during the rotation of the rotor 2 from its rotational position of 15 degrees to that of 75 degrees in a first mode;

no current is supplied to the A-phase coil during the rotation of the rotor 2 from its rotational position of 75 degrees to that of 105 degrees in a second mode; and the first and second modes are cyclically repeated.

The example of the exciting pattern for the B-phase coil illustrated in (C) of FIG. 6 is designed such that the B-phase current Ib to be supplied to the B-phase coil is delayed in phase of 30 electrical degrees from the A-phase current Ia. The example of the exciting pattern for the C-phase winding illustrated in (E) of FIG. 6 is designed such that the C-phase current Ic to be supplied to the C-phase coil is delayed in phase of 30 electrical degrees from the B-phase current Ib.

The control device CC or CC1 is designed to simultaneously supply two phase currents to the corresponding two phase coils, and to reduce one phase current with increase in another one phase current.

An alternative example of the exciting patterns for the three-phase stator coils is illustrated by combinations of solid and dashed lines in FIG. 6.

Specifically, each of the A-phase current Ia and the C-phase current Ic to be supplied to a corresponding one of the A- and C-phase coils is increased from 0 [Amperes; A] to a constant level [A] at the rotor's rotational position of 15 degrees. Each of the A-phase current Ia and the C-phase current Ic to be supplied to a corresponding one of the A- and C-phase coils is reduced to 0 [A] at the rotor's rotational position of 45 degrees. Immediately thereafter, each of the B-phase current Ib and the A-phase current Ia to be supplied to a corresponding one of the B- and A-phase coils is increased from 0 [A] to a constant level [A].

Each of the B-phase current Ib and the A-phase current Ia to be supplied to a corresponding one of the B- and A-phase coils is reduced to 0 [A] at the rotor's rotational position of 75 degrees. Immediately thereafter, each of the C-phase current Ic and the B-phase current Ib to be supplied to a corresponding one of the C- and B-phase coils is increased from 0 [A] to a constant level [A].

Each of the C-phase current Ic and the B-phase current Ib to be supplied to a corresponding one of the C- and B-phase coils is reduced to 0 [A] at the rotor's rotational position of 105 degrees. Immediately thereafter, each of the A-phase current Ia and the C-phase current Ic to be supplied to a corresponding one of the A- and C-phase coils is increased from 0 [A] to a constant level [A].

Each of the A-phase current Ia and the C-phase current Ic to be supplied to a corresponding one of the A- and C-phase coils is reduced to 0 [A] at the rotor's rotational position of 135 degrees.

The winding exciting sequence set forth above is cyclically repeated to thereby turn the rotor 2 in the CCW by a constant torque.

The alternative example of the exciting patterns for the three-phase stator coils induces a desired directed magnetic flux. Note that the transient reduction in each phase current illustrated by the solid lines in FIG. 6 is not required to 0 [A]. Specifically, the transient reduction in each phase current to a preset level [A] can achieve the advantage set forth above. In order to increase the responsivity of each phase current at an RPM of the rotor 2 higher than a present RPM, the phase of each phase current can be advanced from the phase thereof illustrated in FIG. 6.

As an alternative example of the exciting patterns for the three-phase stator coils, when only one phase coil is energized, a magnetic flux is induced in each of two paths. In addition, when currents are simultaneously supplied to the three-phase stator coils, it is possible to produce various electromagnetic actions based on a combination of the magnitudes of the respective currents. It is also possible to combine the various electromagnetic actions with one another to thereby create desired torques.

Next, operations of the reluctance motor 110 according to the first embodiment when the motor 110 being rotated in the CCW is braked, such as when regenerative braking is applied to the motor 110 being rotated in the CCW will be described hereinafter with reference to FIGS. 7 and 8. Note that torque to be created by the reluctance motor 110 depends on only currents to be supplied to the stator coils, and therefore, is independent of the rotating direction and the rotating speed of the motor 110. The reluctance motor 110 is driven in the power running mode in which the rotational direction and the torque direction are identical to each other. The reluctance motor 110 is driven in the regeneration mode in which the rotational direction and the torque direction are opposite to each other.

Figure 8:
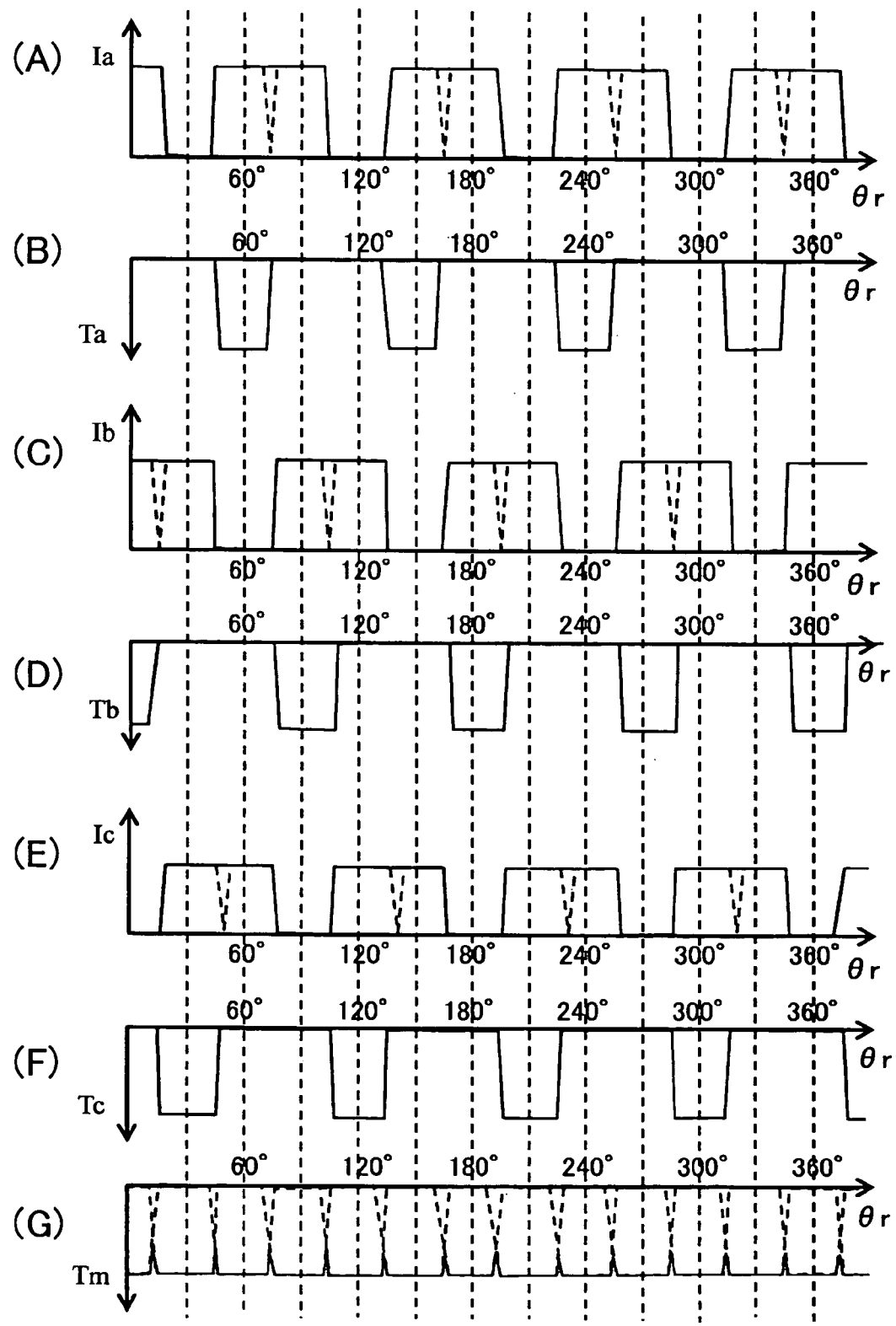
FIG. 8 is a timing chart schematically illustrating an example of exciting patterns in the regenerative mode and torques created by the excited stator windings.

In FIGS. 7 and 8, reference characters Ia, Ib, Ic, θr, Ta, Tb, Tc, and Tm are same as those disclosed in FIGS. 1, 4, and 6.

(a) of FIG. 7 represents a situation in which the rotor 2 is presently located close to the rotational angle θr of 60 degrees illustrated in (a) of FIG. 7 so that one salient pole of the first pair of the rotor 2 starts to depart from the tooth A01 and the other salient pole thereof starts to depart from the tooth A04.

In the situation, in order to create a torque in the CW, the A-phase DC current Ia is supplied from the control device CC or CM to positively flow through the positive A-phase winding A0L) illustrated by the circled cross and negatively flow through the negative A-phase winding A0G illustrated by the circled dot. Simultaneously, the C-phase DC current Ic is supplied from the control device CC or CC1 to positively flow through the positive C-phase winding A0H illustrated by the circled cross and negatively flow through the negative C-phase winding A0E illustrated by the circled dot.

This induces a magnetic flux A0P1 illustrated in (a) of FIG. 7. The magnetic flux A0P1 causes a magnetic attractive force between the tooth A01 and the one salient pole of the first pair of the rotor 2 and between the tooth A04 and the other salient pole of the first pair of the rotor 2. The attractive force creates a torque T in the rotor 2 in the CW to brake the rotor 2. Because the rotating direction CCW and the direction of the created torque T are opposite to each other, the motor 110 located close to the rotational angle θr of 60 degrees illustrated in (a) of FIG. 7 is driven in the regeneration mode.

Thereafter, when the rotor 2 of the motor 110 is rotated so that its rotational angle θr reaches 75 degrees illustrated in (b) of FIG. 7, one salient pole of the first pair of the rotor 2 faces the tooth A0F and the other salient pole thereof faces the tooth A06. In the situation, the A-phase DC current Ia is supplied from the control device CC or CC1 to positively flow through the positive A-phase winding A0D and negatively flow through the negative A-phase winding A0G. Simultaneously, the B-phase DC current Ib is supplied from the control device CC or CC1 to positively flow through the positive B-phase winding A0F illustrated by the circled cross and negatively flow through the negative B-phase winding A0J illustrated by the circled dot. This creates a torque T in the CW.

Thereafter, while the rotor 2 of the motor 110 is rotated from its rotational position of 75 degrees to its rotational position of 105 degrees, the one salient pole of the first pair of the rotor 2 departs from the tooth A0F and the other salient pole thereof departs from the tooth A06.

In the situation, the A-phase DC current Ia flowing through the A-phase windings A0D and A0G and the B-phase DC current Ib flowing through the B-phase windings A0F and A0J induce the magnetic flux A0P1 illustrated in (c) of FIG. 7. Note that (c) of FIG. 7 represents a situation in which the rotor 2 is located at its rotational position of 90 degrees.

The magnetic flux A0P1 causes a magnetic attractive force between the tooth A03 and the one salient pole of the first pair of the rotor 2 and between the tooth A06 and the other salient pole of the first pair of the rotor 2. The attractive force creates a torque T in the rotor 2 in the CW to brake the rotor 2.

Thereafter, when the rotor 2 of the motor 110 is rotated so that its rotational angle θr reaches 105 degrees illustrated in (d) of FIG. 7, one salient pole of the first pair of the rotor 2 faces the tooth. A05 and the other salient pole thereof faces the tooth A02. In the situation, the B-phase DC current Ib is supplied from the control device CC or CC1 to positively flow through the positive B-phase winding A0F and negatively flow through the negative B-phase winding A0J. Simultaneously, the C-phase DC current Ic is supplied from the control device CC or CC1 to positively flow through the positive C-phase winding A0H and negatively flow through the negative C-phase winding A0J. This creates a torque T in the CW.

That is, switching the A-, B-, and C-phase currents Ia, Ib, and Ic from one another depending upon the rotational position θr of the rotor 2 under control of the control device CC or CC1 in accordance with the procedure illustrated in (a) to (d) of FIG. 7 achieves a continuous torque to carry out regenerative braking of the rotor 2.

FIG. 8 schematically illustrates an example of exciting patterns (current supply patterns) for the stator windings in a transitional range of the rotational position θr in a range from 0 to 360 electrical degrees in the regeneration mode illustrated in FIG. 7 in which the rotor 2 is rotated in the CCW and a torque in the CW is designed to be created. FIG. 8 also illustrates torques created by exciting the stator windings in accordance with the example of the exciting patterns in the transitional range of the rotational position θr. Note that torques Ta, Tb, and Tc to be each created in the clockwise direction opposite to the rotating direction (counterclockwise direction) will be referred to as regenerative torque, and the regenerative torques Ta, Tb, and Tc are represented as negative values in FIG. 8.

In addition, the currents Ia, Ib, and Ic in the regeneration mode illustrated in FIG. 8 are delayed in phase of 30 electrical degrees from the currents Ia, Ib, and Ic in the power running mode illustrated in FIG. 6. Similarly, the torques Ta, Tb, and Tc in the regeneration mode illustrated in FIG. 8 are delayed in phase of 30 electrical degrees from the torques Ta, Tb, and Tc in the power running mode illustrated in FIG. 6. This is because each rotational angle of the rotor 2 at which a corresponding power running torque in the CCW is created is shifted by 30 degrees from a corresponding rotation angle of the rotor at which a corresponding regenerative torque in the CW is created.

Specifically, (A) of FIG. 8 illustrates, by solid line, an excitation pattern (a pattern of supplying the A-phase current Ia) for the A-phase winding illustrated in FIG. 7 by the control device CC or CC1. (C) of FIG. 8 illustrates, by solid line, an excitation pattern (a pattern of supplying the B-phase current Ib) for the B-phase winding illustrated in FIG. 7 by the control device CC or CC1. (E) of FIG. 8 illustrates, by solid line, an excitation pattern (a pattern of supplying the C-phase current Ic) for the C-phase winding illustrated in FIG. 7 by the control device CC or CC1.

(B) of FIG. 8 shows a regenerative torque Ta to be given to the rotor 2 from the stator poles A01 and A04 illustrated in (a) of FIG. 7, and (D) of FIG. 8 shows a regenerative torque Tb to be given to the rotor 2 from the stator poles A03 and A06 illustrated in (b) and (c) of FIG. 7. (F) of FIG. 8 shows a torque Tc to be given to the rotor 2 from the stator poles A02 and A05 illustrated in (d) of FIG. 7.

(G) of FIG. 8 shows a transition of a continuous torque Tm for braking of the rotor 2 by making connections between the created torques Ta, Tb, and Tc by solid line.

The motor 110 illustrated in FIG. 1B is designed such that each of the circumferential electrical angular width Ht of the inner surface of each tooth and the circumferential electrical angular width Hm of the outer surface of each salient pole AUK of the rotor 2 is set to 30 electrical degrees. For this reason, when a torque created by a corresponding pair of stator poles excited by a corresponding phase current is shifted to another torque to be created by a corresponding alternative pair of stator poles excited by a corresponding alternative phase current, the continuous torque Tm is reduced. An increase in each of the circumferential electrical angular width of the inner surface of each tooth and that of the outer surface of each salient pole A0K of the rotor 2 from an electric angle of 30 degrees can reduce the drop in the torque Tm at a torque shift in the continuous torque Tm.

Increase and decrease in each phase current slightly earlier in phase than those in a corresponding one phase current illustrated in FIG. 8 can speed up the increase and decrease in each phase current due to a voltage induced thereacross. As illustrated by combinations of solid and dashed lines in FIG. 8, any one pair of the three-phase currents can be simultaneously increased and reduced depending on the characteristics of the stator poles and the rotor poles.

As described above, the reluctance motor 110 illustrated in FIGS. 1A and 1B according to the first embodiment has:

a first feature of supplying a DC current to each of the three-phase stator coils;

a second feature of making each phase winding serve to drive two stator poles located at both sides of a corresponding phase winding; and a third feature that an increase and decrease in a DC current to be supplied to each of the stator coils allows the motor 110 to be driven in four quadrant drive.

Specifically, in the third feature, the motor 110 can be designed to turn the rotor 2 in the CCW and the CW, and designed such that a power running torque or a regeneration torque is applied to the rotor 2.

These features reduce, in size, an inverter of the control device CC or CC1 illustrated in FIG. 2 or 3 in closely cooperation with the structure of the motor 110 and the structure of the control device CC or CC1.

Let us use the control device CC illustrated in FIG. 2 and describe the reduction of the inverter in size.

It is assumed that a voltage of the battery 53A is set to 200 [volts; V], and a current capacitance of each power transistor is set to 10 [A]. When the rotor 2 reaches the rotational angle θr of 30 degrees illustrated in (a) of FIG. 4, it is also assumed that the A-phase current of 10 [A] is supplied to the A-phase coil A0D and A0G (561 in FIG. 2), and the C-phase current of 10 [A] is supplied to the C-phase coil A0H and A0E (563 in FIG. 2).

At that time, the flux density between each of the stator poles and a corresponding one of the rotor poles is saturated to become a saturated flux density of approximately 2.0 [T]. The voltage Vx across each of the excited A-phase stator winding and the C-phase stator winding has been represented by the equation (12). As illustrated in (a) of FIG. 4, a flux linkage φ created by the excited A-phase stator winding and that created by the excited A-phase stator winding are identical to each other (see FIG. (a) of FIG. 4), and therefore, the flux-linkage change rate dφ/dθr with change in the rotational position of the rotor 2 based on the excited A-phase winding is identical to that based on the excited C-phase winding.

In addition, the voltage Vx represented by the equation (12) is assumed to be set to 200 [V].

At that time, output power P1 from the inverter of the control device CC, which is input power to the motor 110, is given by the following equation:

$$P1 = (200\ V) \times (100\ V) \times N \tag{17}$$

where N represents the number of A- and C-phase stator windings.

Thus, the equation (17) is represented as follows:

$$P1 = 4000\ [W]$$

Figure 123:
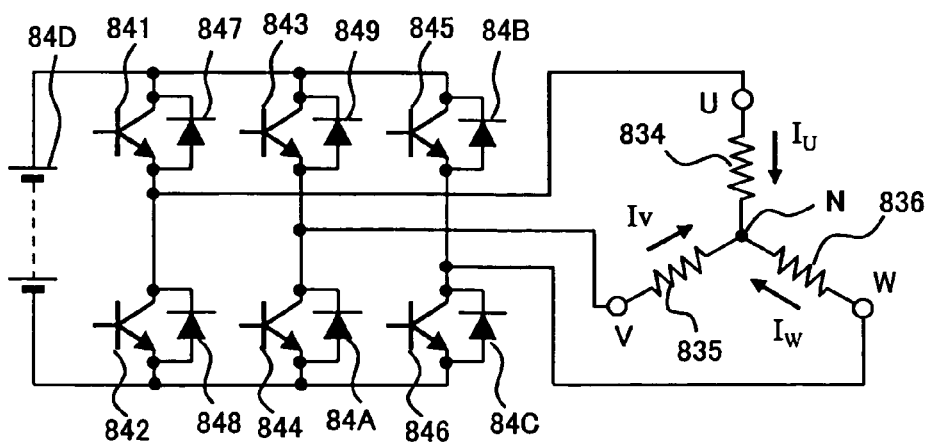
Figure 124:
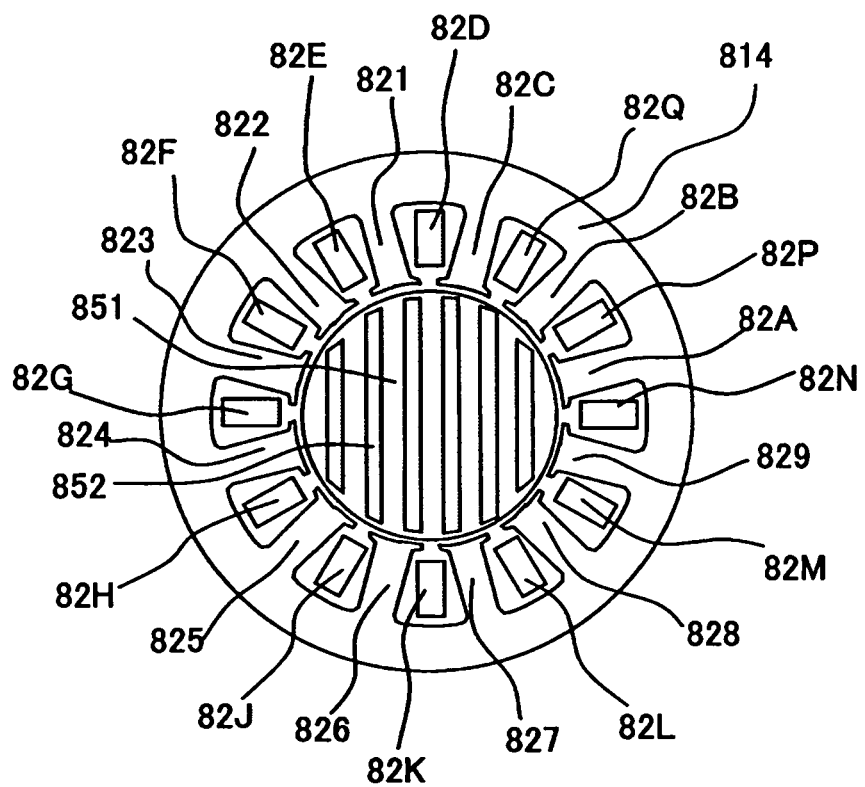

On the other hand, the conventional three-phase inverter illustrated in FIG. 123 has been frequently used. Next, let us examine maximum output power from the conventional three-phase inverter to which star-connected three-phase stator windings of a three-phase AC motor are connected. In the examination, it is assumed that a voltage of the battery 84D is set to 200 [V], and a current capacitance of each power transistor of the conventional three-phase inverter is set to 10 [A]. Assuming that a voltage of 200 [V] is applied between the U-phase winding 834 and the V-phase winding 835, and a maximum current of 10 [A] is supplied from the U-phase winding to the V-phase winding, output power P2 from the inverter of the conventional three-phase inverter is given by the following equation:

$$P2 = (200\ V) \times (10\ A) \tag{18}$$
$$= 2000\ [W] \tag{19}$$

Note that when the half of a current is supplied from the U-phase winding to the V-phase winding, and the remaining of the current is supplied from the U-phase winding to the W-phase winding, output power of the inverter equivalent to the output power P2 can be obtained.

Specifically, in the control device illustrated in FIG. 123, when an induced voltage in each stator winding becomes a value close to the voltage of the battery 84D and a three-phase sinusoidal current is supplied to the three-phase stator windings so that a peak current of the three-phase sinusoidal current is substantially equivalent to a maximum current through each power transistor, output power of the motor equivalent to the output power P2 can be obtained independently of the phase of each of the three-phase sinusoidal currents.

In a first motor system consisting of the motor 110 illustrated in FIG. 1B and the control device CC illustrated in FIG. 2, using only three power transistors achieves the output power of 4000 [W] of the control device CC. In contrast, in a second motor system consisting of a normal three-phase AC motor and the three-phase inverter illustrated in FIG. 123, using six power transistors achieves the output power of 2000 [W] of the three-phase inverter. When comparing output power per one power transistor between the first and second motor systems, the output power per one power transistor of the first motor system is four times greater than that per one power transistor of the second motor system.

When comparing the first and second motor systems in the same output power conditions, the control device CC illustrated in FIG. 2 requires three power transistors that is the half of the number of power transistors required by the second motor system. In addition, the current capacitance of each power transistor of the first motor system is the half (5 A) of that of each power transistor of the second motor system. In other words, the first motor system provided with three power transistors each having the current capacitance of 5 [A] can output 2000 [W] that can be outputted by the second motor system provided with six power transistors each having the current capacitance of 10 [A].

Note that the control device CC illustrated in FIG. 2 requires the DC to DC converter consisting of the four transistors 56A, and a breakdown voltage of each of the transistors 56A is set to be higher than 200 [V].

In automobiles using a battery voltage of 12 [V], 50 to 100 or more motors for auxiliaries have been installed in each automobile. In these applications, the DC to DC converter of the control device CC illustrated in FIG. 2 can be shared between the plurality of motors. In this case, each of the plurality of motors can be driven by the control device CC consisting of three power transistors. Thus, in comparison to the structure that a plurality of control devices illustrated in FIG. 123 is used for the respective motors, it is possible to simplify the structure of the control device CC illustrated in FIG. 2.

In motor vehicle, such as electric vehicles and/or hybrid vehicles, two or more motors have been frequently used to create drive power for the drive shaft. Normally, in automobiles, their fuel economies, such as the efficiencies of driving their motors, are important in fuel consumption test modes, such as Japanese 10-15 mode test, and US Urban Dynamometer Driving Schedule (UDDS) cycle.

In many fuel consumption test modes, the efficiency of driving a motor used in a target automobile is set to be equal to or lower than the half of a maximum torque of the motor. Thus, a generation capacity by a motor of the target automobile during regeneration, in other words, a regeneration capacity by the motor is set to be sufficiently equal to or lower than the half of maximum output capacitance of the motor. If the target automobile should be suddenly decelerated, a mechanical brake system could be used together with the regenerative braking set forth above in view of safety.

From the viewpoint set forth above, the DC to DC converter illustrated in FIG. 2 can be shared by a plurality of motors, and a drive circuit for driving one motor can be considered as a circuit consisting of three power transistors 564, 565, and 566 and three diodes 567, 568, and 569 (see FIG. 2). Thus, an inverter illustrated by dashed lines in FIG. 2 is designed as a simple inverter consisting of three transistors and three diodes for driving one motor, and therefore, the inverter illustrated in FIG. 2 can be lower in cost.

In addition, the sum of the forward voltage drops in the inverter illustrated in FIG. 2 is substantially the half of that of the forward voltage drops in the inverter illustrated in FIG. 123. Similarly, the sum of the voltage drops across the diodes of the inverter illustrated in FIG. 2 during regeneration is substantially the half of that of the voltage drops across the diodes of the inverter illustrated in FIG. 123.

This improves the efficiency of the inverter and reduces the heat to be generated by the inverter, thus reducing the inverter illustrated in FIG. 2 in size.

Next, let us use the control device CC1 illustrated in FIG. 3 and describe the reduction of the inverter in size.

It is assumed that a voltage of the battery 84D is set to 200 [V], and a current capacitance of each power transistor is set to 10 [A].

When a maximum voltage and a maximum current of 10 [A] are applied to the A-phase coil A0D and A0G (871) in FIG. 3), and a maximum voltage and a maximum current of 10 [A] are applied to the C-phase coil A0H and A0E (87F in FIG. 3), maximum output power P3 of the inverter illustrated in FIG. 3, which is input power to the motor 110, is given by the following equation:

$$P1=(200\,V)\times(100\,V)\times N \quad (20)$$

where N represents the number of A- and C-phase stator coils.

Thus, the equation (20) is represented as follows:

$$P1=4000\,[W]$$

A third motor system consisting of the motor 114 illustrated in FIG. 1B and the control device CC1 illustrated in FIG. 3 achieves the output power of 4000 [W] of the control device CC1. In contrast, as described above, the second motor system consisting of a normal three-phase AC motor and the three-phase inverter illustrated in FIG. 123 achieves the output power of 2000 [W] of the three-phase inverter. Thus, the output power of the third motor system is two times greater than that of the second motor system.

When comparing the third and second motor systems in the same output power conditions, the current capacitance of each power transistor of the third motor system is the half (5 A) of that of each power transistor of the second motor system. In other words, the third motor system provided with six power transistors each having the current capacitance of 5 [A] can output 2000 [W] that can be outputted by the second motor system provided with six power transistors each having the current capacitance of 10 [A].

Therefore, the third motor system can be lower in cost as compared with the second motor system.

As described above, the first and third motor system according to the first embodiment are each designed to reduce the current capacitance of the inverter to substantially the half of conventional three-phase inverters; these first and third motor systems are therefore new and rendered unobvious from conventional motor systems.

Note that a conventional control system for driving normal DC motors requires four transistors in order to drive them in variable-speed four quadrant drive. As a result of comparison between the third motor system and a conventional DC motor system consisting of the conventional control system and a normal DC motor, the current capacitance of each power transistor of the conventional control system is two times greater than that of each power transistor of the third motor system. Thus, the rate R of the total current capacitance of the control system CC1 of the third motor system to that of the conventional control system is given by the following equation:

$$R=6/(4\times2)=6/8$$

This allows the third motor system to be lower in cost and size than the conventional DC motor system.

Similarly, the rate R of the total current capacitance of the control system CC of the first motor system to that of the conventional control system is given by the following equation:

$$R=3/(4\times2)=3/8$$

This allows the first motor system to be much lower in cost and size than the conventional DC motor system.

As described above, the features of the first and third motor system illustrated in FIGS. 1 to 3 allow the inverters to be lower in cost and size than conventional inverters. Next, alternative features of the first and third motor systems will be described hereinafter.

Each of the rotor and the stator of the reluctance motor 110 is made up of, for example, a plurality of magnetic silicon steel sheets, as an example of soft magnetic materials, stacked in alignment. That is, the reluctance motor uses no rare-earth magnets, and therefore, has a lower cost than a cost of motors using such rare-earth magnets. This at least slightly contributes to the depletion of resources, such as rare-earth magnets, and to the rise in the price of such rare-earth magnets.

Figure 125:
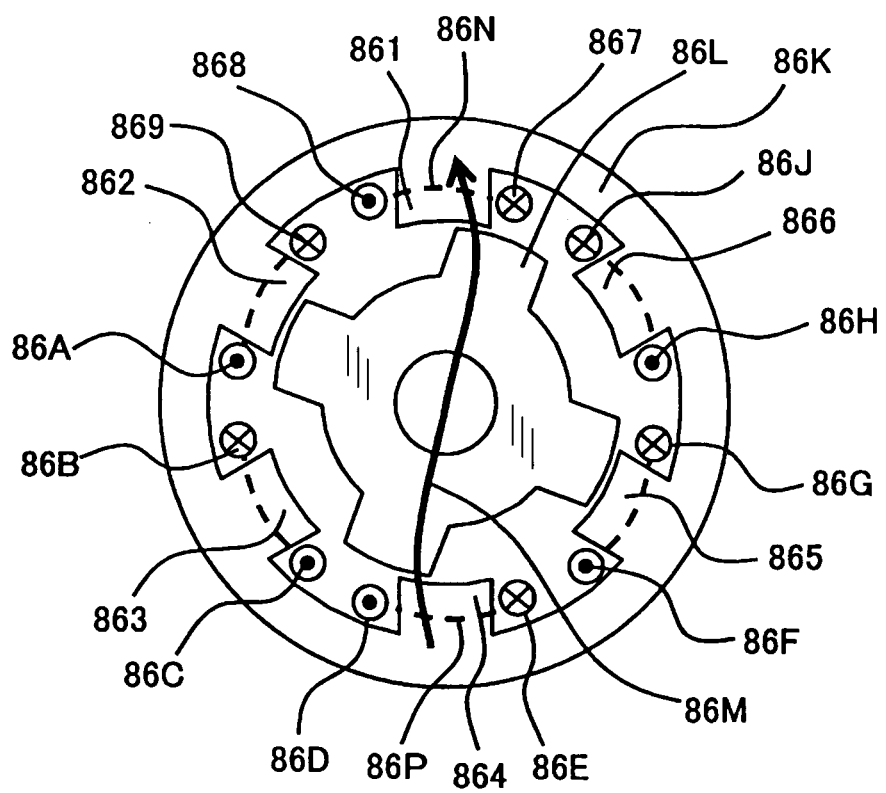

In addition, the number of stator windings disposed in each slot according to the reluctance motor 110 is the half of that of stator windings disposed in each slot of the surface permanent magnet synchronous motor illustrated in FIG. 125. Thus, it is possible to increase the thickness of each stator winding of the reluctance motor 110 to the twice of that of each stator winding of the surface permanent magnet synchronous motor illustrated in FIG. 125. It is preferable to reduce the length of the end of each stator coil of the reluctance motor 110.

Because the rotor 2 is made up of for example, a plurality of magnetic silicon steel sheets, the rotor 2 is rugged. This makes it easy to physically use a higher RPM of the rotor 2, thus increasing the output of the reluctance motor 110 to a high level.

As described above, the reluctance motor 110 illustrated in FIG. 1B uses the magnetic attractive force between each stator pole and a corresponding one rotor pole to thereby create a torque for turning the rotor 2. Thus, it is possible to use a simple torque-generation principle, making it easy to achieve the torque characteristics of the reluctance motor 110 with relatively low ripples. This allows the reluctance motor 110 to be lower in vibration and noise. Note that rapid variations in the attractive force in the radial directions of the rotor may cause the stator core to vibrate.

The reluctance motor 110 has no permanent magnets so that no magnetic fluxes are generated inside the reluctance motor 110 while the stator windings are unexcited. This achieves an important feature to prevent, during the reluctance motor 110 being rotated together with the output shaft 1, unnecessary iron loss mostly attractive to drag torque from occurring. That is, in hybrid motors, electric motors, and the like, there is a problem that the unnecessary iron loss may occur during a conventional permanent magnet motor being rotated together with the output shaft at a higher RPM.

Plural types of the motor systems according to the first embodiment have been described. They can be further modified and/or combined to each other.

Note that the configurations of motors illustrated in the accompanying drawings according to the present invention are illustrated as their examples, and therefore, they can be variably modified.

The reluctance motor 110 with the six (M=6) stator poles according to the first embodiment is designed such that the circumferential electrical angular width Ht of the inner surface of each of the teeth is set to be 30 electrical degrees. Similarly, the circumferential electrical angular width Hm of the outer surface of each salient pole A0K of the rotor 2 is set to 30 electrical degrees. However, the present invention is not limited to the electrical angular regions of widths Ht and Hm.

Specifically, an increase in the circumferential electrical angular width Ht over 30 electrical degrees can increase a circumferential width of each stator pole by which a torque is created. In addition, an increase in the circumferential electrical angular width Hm over 30 electrical degrees can create a more continuous torque at each time when one phase current is switched to an alternative phase current.

In order to facilitate the increase in each phase current to be supplied to a corresponding one phase winding, the control device CC or CC1 can supply two phase currents to corresponding two phase windings, respectively, when the rotational position θr of the rotor 2 is located such that one rotor pole faces one slot. One of these corresponding two phase windings is a winding disposed in the one slot and the other thereof is a winding disposed in a slot circumferentially adjacent to the one slot in the rotational direction. In order to increase the advantage of facilitating the increase in each phase current, the circumferential electrical angular widths Ht and Hm can be set to be lower than 30 electrical degrees.

Consequently, the circumferential electrical angular widths Ht and Hm can be variably set according to various methods of driving the reluctance motor 110.

A reduction in the circumferential length of the opening end of each slot allows the reluctance motor 110 to be driven like synchronous motors.

FIG. 1B illustrates the four salient poles (rotor poles) of the rotor 2 are arranged to be equally pitched in its circumferential direction, but can be arranged to be irregularly spaced in its circumferential direction in order to reduce torque ripples. In addition, the circumferential electrical angular width Hm of the outer surface of one salient pole of the rotor 2 can be longer than that of the outer surface of an alternative salient pole of the rotor 2. This aims at smoothly creating a torque and reduce vibrations of the motor 110 at a high RPM or low RPM of the rotor 2.

Each of the four salient poles A0K is configured to radially outwardly project and have the convexly rounded outer surface, and each of the salient poles (teeth A01, A02, A03, A04, A05, and A06) is configured to radially and inwardly project and to have the concavely rounded inner surface. The present invention is not limited to the configurations of the salient rotor poles and salient stator poles.

Specifically, each of the salient rotor poles and each of the salient stator poles can be deformed in the axial direction, the circumferential direction, and radial directions of the rotor 2. Particularly, at least one of the outer surface of each of the salient rotor poles and the inner surface of each of the salient stator poles can be radially deformed at its circumferential both ends. This deformation allows an air gap between each stator pole and a corresponding one rotor pole to become wide. This can reduce rapid variations in the magnetic flux when one rotor pole starts to face one stator pole, making it possible to reduce vibrations of the motor 110 and noises due to the rapid variations of the radial attractive force based on the magnetic flux.

The control device CC or CC1 is operative to intermittently supply each of the A-, B-, and C-phase currents to a corresponding one of the A-, B-, and C-phase coils in pulses (see FIG. 6). However, the present invention is not limited to the driving method. Specifically, the reluctance motor 110 is driven based on differences of attractive forces. Thus, the control device CC or CC1 can be operative to continuously supply each of the A-, B-, and C-phase currents to a corresponding one of the A-, B-, and C-phase coils in pulses while adjusting the differences in level among the A-, B-, and C-phase currents to thereby create a torque based on the differences.

Specifically, the control device CC or CC1 can be operative to superimpose a superimposed current Iset on each of the A-, B-, and C-phase currents Ia, Ib, and Ic illustrated in FIG. 6.

Various methods can be used to determine a level of the superimposed current Iset. For example, the superimposed current Iset can have a constant level, or a level that is a constant percentage of the amplitude level of a corresponding one of the A-, B-, and C-phase currents Ia, Ib, and Ic. The superimposed current Iset can have a level defined according to the control requirement for the motor 110. Note that the superimposed current Ise can serve as a field current for exciting all of the teeth (stator poles).

The superimposed current Iset allows all of the stator poles to be excited up to a given level; this can reduce variations in the radial attractive force, and therefore, reduce vibrations of the motor 110 and noises due to the rapid variations in the radial attractive force. This may improve the responsiveness of each of the three-phase currents Ia, Ib, and Ic during its increasing or decreasing.

A torque T created when the rotor 2 is located at each of the rotational positions θr of 30 degrees, 45 degrees, 60 degrees, and 75 degrees becomes constant, and therefore, some torque ripples appear. Specifically, a torque T is represented properly as a complicated function depending on an electric phase angle θre of the rotor 2 and a level of each of the A-, B-, and C-phase currents Ia, Ib, and Ic because of flux leakage and/or the non-linearity of the soft magnetic material of which the stator and rotor are made. Thus, in order to rotate the rotor 2 while creating a constant torque T, it is necessary to add a current component to each of the A-, B-, and C-phase currents Ia, Ib, and Ic illustrated in FIG. 6; this current component reduces errors of torque relative to the constant torque T.

In the first embodiment, the A-, B-, and C-phase current Ia, Ib, and Ic used to drive the three-phase 6S4R motor 110 have been described. When the present invention is applied to a multiphase MSKR motor, the A-, B-, and C-phase currents Ia, Ib, and Ic can be expanded to multiphase stator currents used to drive the multiphase MSKR motor.

The reluctance motor 110 according to the first embodiment includes two stator poles per one phase, but can include many stator poles per one phase. Specifically, the reluctance motor 110 can be deformed to include, for example, eight stator poles per one phase. In the deformed reluctance motor, a distributed, full pitch winding is used as each stator winding.

This can reduce the length of each stator coil end of the deformed reluctance motor to a level of the quarter of that of each stator coil of the reluctance motor 110. This can reduce the rate of increase in the resistance of the coil end of each stator coil.

In FIG. 1B, the path of the coil end of each stator coil is illustrated from a corresponding one slot and an opposing one slot, but the present invention is not limited thereto. Specifically, the path of the coil end of each stator coil between corresponding paired slots can be divided into two or three paths; this deformed structure of the reluctance motor can provide the same electromagnetic actions as the reluctance motor 110 illustrated in FIG. 1B.

As each of the three-phase stator coils of the reluctance motor 110 illustrated in FIG. 1B, a concentrated, full pitch winding is used and concentrically wound in corresponding paired slots at a pitch of 180 electrical degrees. The winding structure can be deformed while maintaining the advantages achieved by the reluctance motor 110.

Specifically, each of the slots illustrated in FIG. 1B can be divided into two slots (referred to "sub-slots"). In this case, a distributed, full pitch winding can be used so as to be distributedly wound in corresponding pairs of sub-slots. This may cause the winding structure of the three-phase stator coils to be complicated, but can achieve advantages that the variations in the torque are smoothed and each stator winding having a longer length is smoothly inserted into corresponding pairs of sub-slots.

As each of the three-phase stator coils of the reluctance motor 110 illustrated in FIG. 1B, a short pitch and concentrated winding can be used to be concentrically wound in corresponding paired slots at an electrical angular pitch lower than 180 electrical degrees. This winding structure can achieve the advantages achieved by the reluctance motor 110. Particularly, each of the three-phase short pitch and concentrated windings is wound in the stator core such that a part of one-phase stator winding to be disposed in one slot and a part of an alternative-phase stator winding to be disposed in an alternative slot circumferentially adjacent to the one slot can be overlapped with each other. In this winding structure, it is possible to make smooth the variations in the torque when one-phase current is switched to an alternative-phase current.

Next, a first modification of the reluctance motor 110 according to the first embodiment will be described hereinafter. In the first modification, a reluctance motor having six salient poles of a stator (M=6) and two salient poles of a rotor (K=2), such as "6S2R motor 110A, will be described hereinafter. Like elements between the reluctance motor 110 and the reluctance motor 110A, to which like reference characters are assigned, are omitted or simplified in description.

Figure 9:
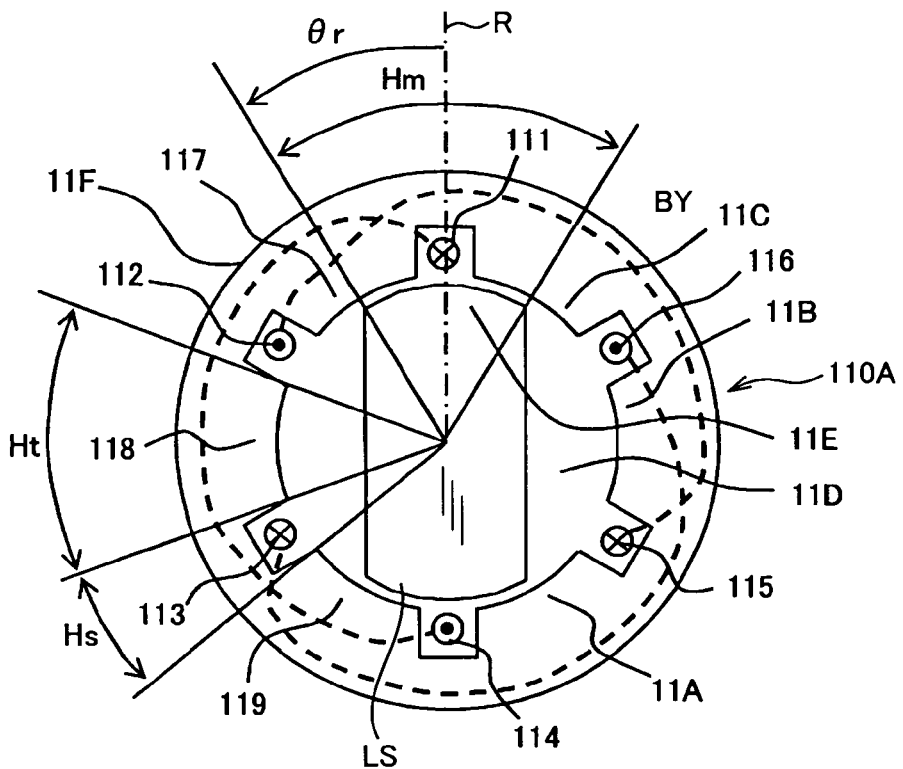
FIG. 9 is a lateral cross sectional view of a reluctance motor according to the first modification of the reluctance motor according to the first embodiment.

The reluctance motor 110A illustrated in FIG. 9 is provided with a two salient pole rotor 11E and a substantially annular stator core 11F.

The two salient pole rotor, referred to simply as "rotor", 11E has a substantially rectangular prism and a through hole at its center portion in its height direction. An axis passing the center portion of the rotor 11E in the height direction thereof will be referred to as "center axis" hereinafter.

The output shaft 1 is fixedly mounted on the inner surface of the through hole of the rotor 11E. The output shaft 1 is disposed in the opening of the motor housing 6 such that both ends thereof project from the opening, and the rotor 11E is installed in the motor housing 6. The output shaft 1 is rotatably supported by the motor housing 6 with the bearings 3.

The rotor 11E is made up of, for example, a plurality of magnetic silicon steel sheets, as an example of soft magnetic materials stacked in alignment. Similarly, the stator core 11F is made up of for example, a plurality of magnetic silicon steel sheets, as an example of soft magnetic materials, stacked in alignment.

The stator core 11F is installed in the motor housing 6 such that its center axis is coaxial to the center axis of the rotor 11E and its inner circumference is opposite to a first pair of lateral sides LS and a second pair of longitudinal sides of the rotor 11E.

Each of the lateral sides LS of the first pair of the rotor 11E is outwardly rounded with a curvature identical to that of the inner circumference of the stator core 11F. Each of the lateral sides LS of the first pair of the rotor 11E is shorter than one of the longitudinal sides of the second pair thereof so that each of the lateral sides LS of the first pair projects from the center axis of the rotor 11E in comparison to the longitudinal sides of the second pair. This configuration provides two salient poles. Each of the lateral sides LS of the first pair of the rotor 11E is closely opposite to the inner surface of the stator core 11F with an air gap therebetween. The three-phase stator coils and the stator core constitute a stator.

Note that, in order to simply illustrate the structure of the motor 110, hatching is omitted in illustration in FIG. 9.

Next, the structure of the stator will be fully described with reference to FIG. 9.

The stator core 11F consists of an annular back yoke BY and 6 teeth 117, 118, 119, 11A, 11B, and 11C projecting inwardly and circumferentially arranged at equal pitches therebetween. Each of the teeth 117, 118, 119, 11A, 11B, and 11C serves as a salient pole. The inner surface of each of the teeth (salient poles) has a concavely circumferentially rounded shape with a curvature identical to that of the outer surface of each of the salient poles of the rotor 11E. Spaces between circumferentially adjacent teeth provide 6 slots of the stator core 11F.

As each of three-phase stator coils of the motor 110A illustrated in FIG. 9, a concentrated, full pitch winding is used.

An A-phase coil 111 and 114 is concentrically wound in a slot between the teeth 11C and 117 and in a slot between the teeth 119 and 11A, and a B-phase coil 113 and 116 is concentrically wound in a slot between the teeth 118 and 119 and in a slot between the teeth 11B and 11C. A C-phase coil 115 and 112 is concentrically wound in a slot between the teeth 11A and 11B and in a slot between the teeth 117 and 118.

In the first modification, the motor 110A is driven such that a direct current is supplied to flow through each of the A-, B-, and C-phase coils in positive and negative directions indicated by circled cross and circled dot symbols illustrated in FIG. 9. The positive direction represents a direction into the paper of FIG. 9, and the negative direction represents a direction out of the paper of FIG. 9.

Specifically, a group of A-phase windings in the A-phase coil through which a direct current in the positive direction is defined as "a positive A-phase winding (111)", and a group of A-phase windings in the A-phase coil through which a direct current in the negative direction flows is defined as "a negative A-phase winding (114)".

Similarly, a group of B-phase windings in the B-phase coil through which a direct current in the positive direction is defined as "a positive B-phase winding (113)", and a group of B-phase windings in the B-phase coil through which a direct current in the negative direction flows is defined as "a negative B-phase winding (114)". In addition, a group of C-phase windings in the C-phase coil through which a direct current in the positive direction is defined as "a positive C-phase winding (115)", and a group of C-phase windings in the C-phase coil through which a direct current in the negative direction flows is defined as "a negative C-phase winding (112)".

Reference character Ht represents a circumferential electrical angular width of the inner surface of each of the teeth, and reference character Hs represents a circumferential electrical angular width of the innermost open end of each slot. The sum of the angular width Ht and the angular width. Hs is set to 60 electrical degrees. A present rotational position of the rotor 11E is represented by θr relative to a reference position R illustrated in FIG. 1B. The reference position is a line passing through the center of the slot between the teeth 11C and 117, the center axis of the rotor 11E, and the center of the slot between the teeth 119 and 11A.

As illustrated in FIG. 9, because the rotor 11E has the two-pole salient structure, a space 11D is formed between each of the longitudinal sides of the rotor 11E and a corresponding inner surface of the stator core 11F opposite thereto. Note that, in order to reduce winding loss when rotating, the rotor can be formed with a nonmagnetic member. The nonmagnetic member is mounted on each of the longitudinal sides of the rotor 11E to provide a substantially circular shape of the rotor 11E in its lateral cross section with an air gap between the nonmagnetic member and the inner surface of the stator core 11F opposite thereto.

Reference character Hm represents a circumferential electrical angular width of each of the lateral sides of the rotor 11E, in other words, each of the salient poles of the rotor 11E.

Note that FIG. 9 illustrates an example of two-pole motors for the sake of describing its operations, but multi-pole motors can be used as an example of synchronous reluctance motors according to the first embodiment.

Figure 10:
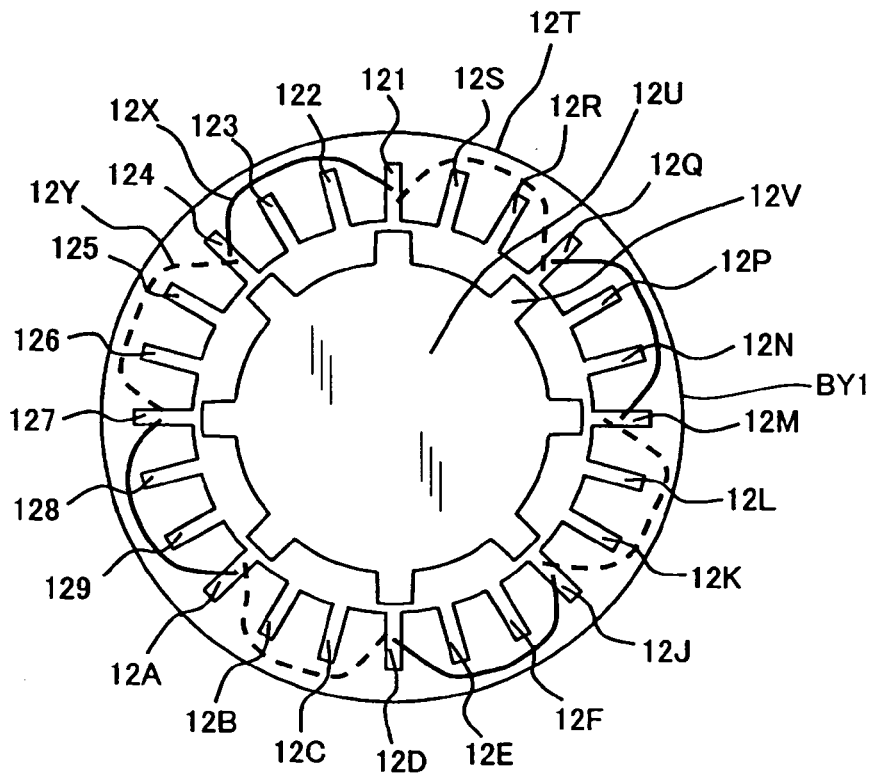
FIG. 10 is a lateral cross sectional view of a reluctance motor according to a modification of the reluctance motor illustrated in FIG. 9.

FIG. 10 schematically illustrates an example of eight-pole motor. The eight-pole motor illustrated in FIG. 10 includes a rotor 12U and a stator core 12T different from the rotor 11E and the stator core 11F of the two-pole motor illustrated in FIG. 9.

Specifically, the rotor 12U has a substantially annular shape, and has, at its outer circumferential surface, eight salient poles 12V. The eight salient poles 12V are circumferentially arranged at regular pitches.

The stator core 12T consists of an annular back yoke BY1 and 24 teeth. The teeth project inwardly and are circumferentially arranged at equal pitches therebetween. Each of the teeth serves as a salient pole. Spaces between circumferentially adjacent teeth provide 24 slots 121, 122, 123, 124, 125, 126, 127, 128, 129, 12A, 12B, 12C, 12D, 12E, 12F, 12J, 12K, 12L, 12M, 12P, 12Q, 12R, and 12S of the stator core 12T.

The control device CC illustrated in FIG. 2 or the control device CC1 illustrated in FIG. 3 can be used to supply the A-, B-, and C-phase currents Ia, Ib, and Ic to the respective A-, B-, and C-phase coils.

Operations of the motor 110A illustrated in FIG. 9 will be described hereinafter with reference to (a) to (f) of FIG. 11 assuming that the circumferential angular width Hs of each slot is set to 20 electrical degrees, and the circumferential electrical angular width Hm of each salient pole of the rotor 11E is set to 40 electrical degrees.

Figure 11:
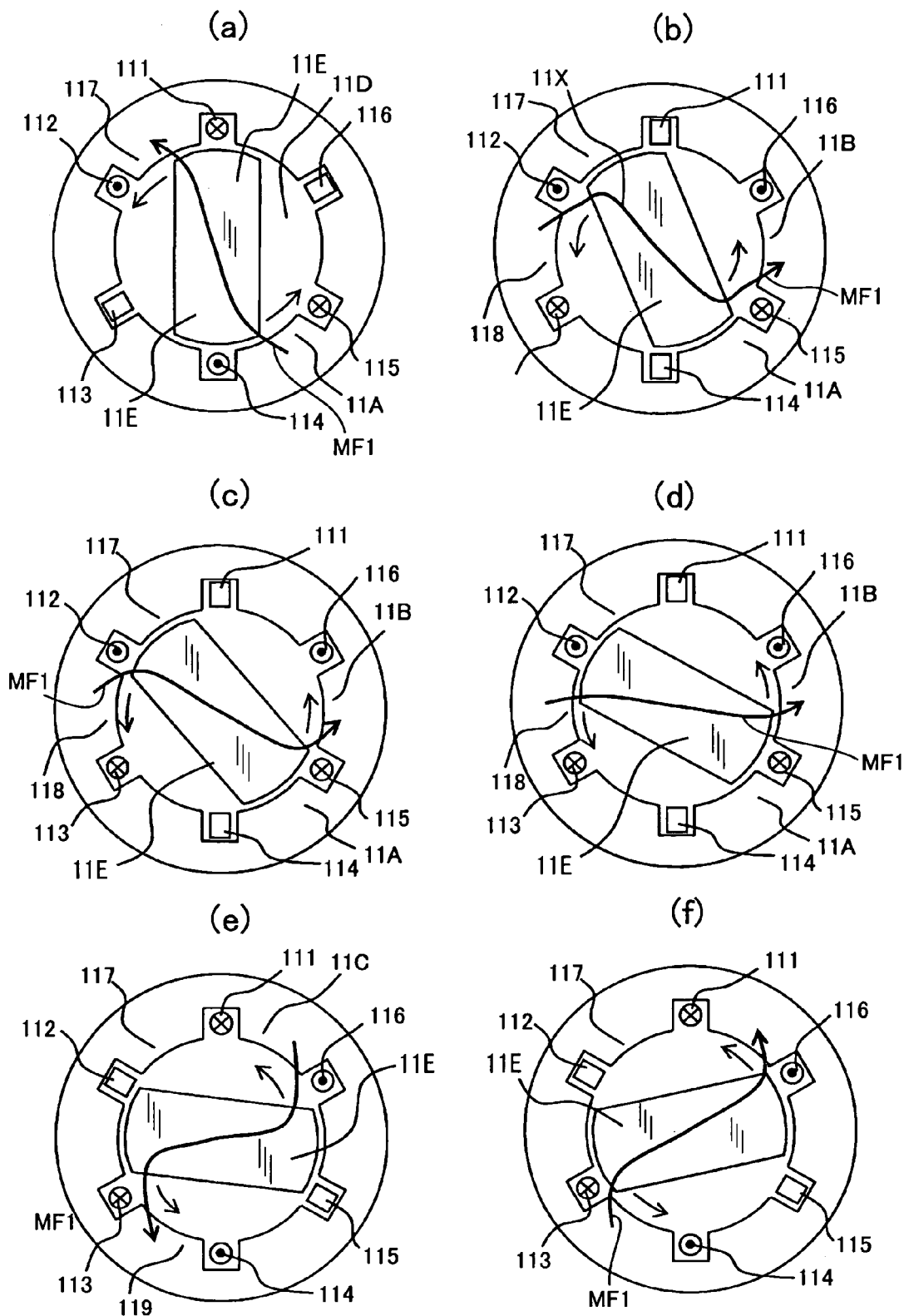
FIG. 11 is a view schematically illustrating operations of the motor illustrated in FIG. 9.

The motor 110A illustrated in FIGS. 9, 10, and 11 is designed such that each phase coil is concentratedly wound in a full pitch pattern and the teeth 117, 118, 119, 11A, 11B, and 11C are arranged over a substantially entire circumference of the stator core. For this reason, the motor 110A is configured such that a current flows through at least two-phase coils to produce torque. This causes magnetic attractive force between at least two salient teeth of the stator core 11F and corresponding salient poles of the rotor 11E. The attractive force serves as reluctance torque to rotate the rotor 11E.

Note that reference character Ta represents a torque created between the salient pole rotor 11E and each of the teeth 11C and 119, and reference character Tb represents a torque created between the salient pole rotor 11E and each of the teeth 118 and 11B. Reference character Tc represents a torque created between the salient pole rotor 11E and each of the teeth 117 and 11A.

In addition, reference character Ia represents a current to be supplied to flow through the A-phase winding, reference character Ib represents a current to be supplied to flow through the B-phase wincing, and reference character Ic represents a current to be supplied to flow through the C-phase winding. In the first modification, the magnitudes of their A-, B-, and C-phase currents Ia, Ib, and Ic to be supplied to the respective windings are set to be equal to one another.

Figure 12:
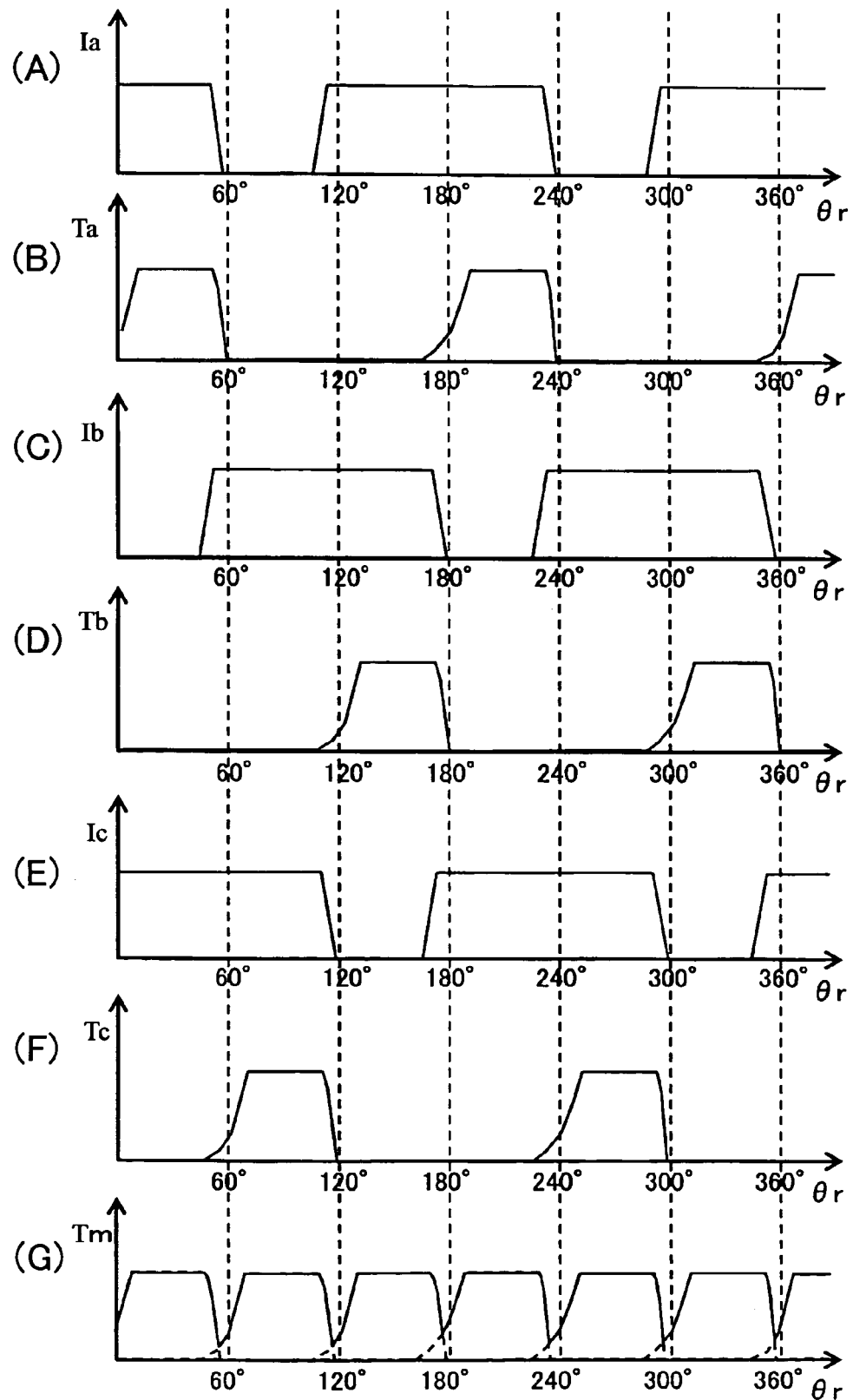
FIG. 12 is a timing chart schematically illustrating an example of exciting patterns for stator windings of the motor illustrated in FIG. 9, and torques created by the excited stator windings.

FIG. 12 schematically illustrates an example of exciting patterns (current supply patterns) for the stator windings in a transitional range of the rotational position θr in electric angle from 0 degrees to 360 degrees.

FIG. 12 also illustrates torques created by exciting the stator windings in accordance with the example of the exciting patterns in a transitional range of the rotational position θr in electric angle from 0 degrees to 360 degrees. Specifically, the example of the excitation patterns (current supply patterns) is illustrated in (A), C), and (E) of FIG. 12.

Specifically, when the rotor 11E is presently located close to the rotational angle θr of 30 degrees illustrated in (a) of FIG. 11, one salient pole of the rotor 11E starts to face the tooth 11A and the other salient pole starts to face the tooth 117.

At that time, the A-phase current Ia is supplied to positively flow through the positive A-phase winding 111 (see the circled cross) and negatively flow through the negative A-phase winding 114 (see the circled dot).

Simultaneously, the C-phase current Ic is supplied to positively flow through the positive C-phase winding 115 (see the circled cross) and negatively flow through the negative C-phase winding 112 (see the circled dot). No current is supplied to flow through the B-phase coil.

The A-phase current Ia flowing through the A-phase windings and the C-phase current Ic flowing through the C-phase windings induce a magnetic flux from the tooth 11A to tooth 117 in accordance with the Ampere's right-handed rule; this induced magnetic flux is illustrated in (a) of FIG. 11 by thick arrow MF1.

The induced magnetic flux MF1 causes a magnetic attractive force between the tooth 11A and one salient pole of the rotor 11E and between the tooth 117 and the other salient pole. The attractive force creates the torque Ta illustrated in (B) of FIG. 12 to rotate the rotor 11E in the CCW.

In the first modification, it is assumed that the motor 110 is designed as a simple model. In the simple model, the magnetic permeability of each of the soft magnetic portions of the stator core 11F and the rotor 11E is set to be sufficiently high. In addition, in the simple model, the magnetic permeability of the space 11D is set to be sufficiently low, and the magnetic resistance in the air gap between each of the salient poles of the rotor 11E and a corresponding inner surface of the stator core 11F is set to be sufficiently low.

Because the motor 110A is designed as the simple model, the intensity [Ampere per meter; A/m] of the magnetic field around each of the teeth 118, 119, 11B, and 11C is very nearly zero. Thus, a magnetic flux radially passing through each of the teeth 118, 119, 11B, and 11C is also substantially zero, and therefore, a torque induced by the magnetic flux is substantially zero.

Thereafter, when the rotor 11E is turned in the CCW so as to be presently located close to the rotational angle θr of 50 degrees illustrated in (b) of FIG. 11, one salient pole of the rotor 11E faces the tooth 11A and the other salient pole faces the tooth 117.

At that time, the C-phase current Ic is supplied to positively flow through the positive C-phase winding 115 (see the circled cross) and negatively flow through the negative C-phase winding 112 (see the circled dot).

Simultaneously, the B-phase current Ib is supplied to positively flow through the positive B-phase winding 113 (see the circled cross) and negatively flow through the negative B-phase winding 116 (see the circled dot). No current is supplied to flow through the A-phase coil.

The C-phase current Ic flowing through the C-phase windings and the B-phase current Ib flowing through the B-phase windings induce a magnetic flux from the tooth 118 to tooth 113 in accordance with the Ampere's right-handed rule; this induced magnetic flux is illustrated in (b) of FIG. 11 by thick arrow MF1.

The induced magnetic flux MF1 causes a magnetic attractive force between the tooth 11B and one salient pole of the rotor 11E and between the tooth 118 and the other salient pole. The attractive force creates the torque Tc illustrated in (F) of FIG. 12 to rotate the rotor 11E in the CCW.

The induced magnetic flux MF1 illustrated in (b) of FIG. 11 passes through part of the space 11D close to the slot corresponding to the positive C-phase winding 115 and the slot corresponding to the negative C-phase winding 112. For this reason, the density of the induced magnetic flux MF1 illustrated in (b) of FIG. 11 is small, and therefore, the torque Tc is not so large. Thus, the torque Tc is abruptly increased as one and the other salient poles are shifted to be close to the respective teeth 11B and 118.

Thereafter, when the rotor 11E is turned in the CCW so as to be presently located close to the rotational angle θr of 70 degrees illustrated in (c) of FIG. 11, one salient pole of the rotor 11E is close to the tooth 11B and the other salient pole of the rotor 11E is close to the tooth 118.

At that time, used is the same exciting pattern as when the rotor 11E is presently located close to the rotational angle θr of 50 degrees illustrated in (b) of FIG. 11. Thus, the torque Tb created by the induced magnetic flux MF1 illustrated in FIG. (c) of FIG. 11 turns the rotor 11E in the CCW.

That is, while the rotor 11E is rotated in the CCW from the rotational position θr of 70 degrees to near the rotational position θr of 110 degrees (see (e) of FIG. 11) via the rotational position θr of 90 degrees (see (d) of FIG. 11), used is the same exciting pattern as when the rotor 11E is presently located close to the rotational angle θr of 50 degrees illustrated in (b) of FIG. 11. Thus, the torque Tb turns the rotor 11E in the CCW from the rotational position θr of 70 degrees to near the rotational position θr of 110 degrees (see (e) of FIG. 11) via the rotational position θr of 90 degrees (see (d) of FIG. 11).

When the rotor 11E turns in the CCW so as to be presently located close to the rotational angle θr of 110 degrees illustrated in (e) of FIG. 11, one salient pole of the rotor 11E faces the tooth 113 and the other salient pole of the rotor 11E faces the tooth 118.

At that time, the B-phase current Ib is supplied to positively flow through the positive B-phase winding 113 (see the circled cross) and negatively flow through the negative B-phase winding 116 (see the circled dot).

Simultaneously, the A-phase current Ia is supplied to positively flow through the positive A-phase winding 111 (see the circled cross) and negatively flow through the negative A-phase winding 114 (see the circled dot). No current is supplied to flow through the C-phase coil.

The B-phase current Ib flowing through the B-phase windings and the A-phase current Ia flowing through the A-phase windings induce a magnetic flux from the tooth 110 to tooth 119 in accordance with the Ampere's right-handed rule; this induced magnetic flux is illustrated in (e) of FIG. 3 by thick arrow MF1.

The induced magnetic flux MF1 causes a magnetic attractive force between the tooth 11C and one salient pole of the rotor 11E and between the tooth 119 and the other salient pole of the rotor 11E. The attractive force creates the torque Tb illustrated in (D) of FIG. 12 to rotate the rotor 11E in the CCW.

While the rotor 11E is turned from the rotational position θr of 110 degrees near to the rotational position θr of 120 degrees, the induced magnetic flux MF illustrated in (e) of FIG. 11 passes through part of the space 11D close to the slot corresponding to the B-phase winding portion 113 and the slot corresponding to the B-phase winding portion 116. For this reason, the density of the induced magnetic flux MF1 within the range of the rotor's rotational position θr from 110 degrees near to 120 degrees is small, and therefore, the torque Tb is not so large. Thus, the torque Tb is abruptly increased as one and the other salient poles are shifted to be close to the respective teeth 11C and 119 (see (f) of FIG. 11).

The operation of the motor 110A illustrated in (a) of FIG. 11 is identical to that of the motor 110A illustrated in (d) of FIG. 11 except that:

the rotational position θr of the rotor 11E illustrated in (d) of FIG. 11 advances by an angle of 60 degrees from the rotational position θr of the rotor 11E illustrated in (d) of FIG. 11 in the CCW; and the magnetic flux MF1 induced through the rotor 11E illustrated in (d) of FIG. 11 is opposite in direction from that induced through the rotor 11E illustrated in (a) of FIG. 11.

Similarly, the operation of the motor 110A illustrated in (b) of FIG. 11 is identical to that of the motor 110A illustrated in (e) of FIG. 11 except that:

the rotational position θr of the rotor 11E illustrated in (e) of FIG. 11 advances by an angle of 60 degrees from the rotational position θr of the rotor 11E illustrated in (b) of FIG. 11 in the CCW; and the magnetic flux MF1 induced through the rotor 11E illustrated in (e) of FIG. 11 is opposite in different from that induced through the rotor 11E illustrated in (b) of FIG. 11.

In addition, the operation of the motor 110A illustrated in (c) of FIG. 11 is identical to that of the motor 110 illustrated in (f) of FIG. 11 except that:

the rotational position θr of the rotor 11E illustrated in (f) of FIG. 11 advances by an angle of 60 degrees from the rotational position θr of the rotor 11E illustrated in (c) of FIG. 11 in the CCW; and the magnetic flux MF1 induced through the rotor 11E illustrated in (f) of FIG. 11 is opposite in different from that induced through the rotor 11E illustrated in (c) of FIG. 11.

Note that the magnitude of a magnetic attractive force caused by a magnetic flux in one direction between one tooth and a corresponding salient pole of the rotor 11E is identical to that of a magnetic attractive force caused by a magnetic flux in the other direction opposite to the one direction therebetween. Thus, the magnitude of a torque created based on a magnetic flux in one direction between one tooth and a corresponding salient pole of the rotor 11E is identical to that of a torque created based on a magnetic flux in the other direction opposite to the one direction therebetween.

As illustrated in FIGS. 11 and 12, switching the A-, B-, and C-phase currents Ia, Ib, and Ic from one another depending upon the rotational position θr of the rotor 11E in accordance with the exciting pattern illustrated in FIG. 12 allows the rotor 11E to continuously rotate.

A transition of a continuous torque Tm by making connections between the created torques Ta, Tb, and Tc is illustrated in (G) of FIG. 12 by solid line. As illustrated in (G) of FIG. 12, when each salient pole of the rotor 11E is shifted to be close to the opening end of a corresponding one slot, the continuous torque Tm is reduced. Many applications of the motor 110A according to the first modification have no problems with the partial reductions in the continuous torque Tm. In order to restrict the partial reductions in the continuous torque Tm, the motor 110A can be designed such that the rotor 11E or the stator 11F is skewed. Another method of reducing the partial reductions in the continuous torque Tm will be described later.

In the operations of the motor 110A illustrated in (a) to (f) of FIG. 11, the direction of a magnetic flux induced in the salient pole of each tooth of the stator 11F is constant independently of the rotation of the rotor 11E. The direction of a magnetic flux induced through the rotor 11E is reversed at some of the rotational position of the rotor 11E. That is, the A-, B-, and C-phase currents Ia, Ib, and Ic directed in one directions drive the motor 110A without changing their one directions.

As described in the first embodiment, the reluctance motor 110A can be driven in the regeneration mode illustrated in FIG. 8.

Specifically, the combinations of the DC currents Ia, Ib, and Ic allow the motor 110A to be driven in four quadrant drive.

Thus, the motor 110A can be designed to turn the rotor 11E in the CCW and the CW, and designed such that a power running torque or a regeneration torque is applied to the rotor 11E.

These features reduce, in size and cost, an inverter of the control device CC or CC1 illustrated in FIG. 2 or 3 in closely cooperation with the structure of the motor 110A and the structure of the control device CC or CC1.

At least one one-phase current can be different in magnitude from the remaining phase current(s). Three-phase currents can be controlled to simultaneously flow through the three-phase coils, respectively.

The values of the circumferential electrical angular width Hm, Ht, and Hs can be changed from 40 electric degrees, 40 electric degrees, and 20 electric degrees, respectively. A method of driving the reluctance motor 110A when the circumferential electrical angular width of the outer surface of each of the salient poles A0K of the rotor 2 is equal to or greater than 40 electrical degrees in order to reduce variations in the radial attractive force will be described later.

The open end of each slot of the stator core 11F can be deformed in various structures. For example, the stator core 11F can be deformed such that the open end of each slot is narrower than that illustrated in FIG. 9, or such that the air gap between at least one circumferential end of each of the teeth and the rotor 11E is wider than that illustrated in FIG. 9. The structure of the rotor 11E can be variously deformed.

The deformations and modifications to be applied to the reluctance motor 110 according to the first embodiment set forth above can be applied to the reluctance motor 110A according to the first modification of the reluctance motor 110.

Each of the stator coils illustrated in a corresponding one of FIGS. 1B and 9 is so formed in a lap winding as to be convolutedly wound in corresponding paired slots to provide overlapped loop portions.

Each of the stator coils illustrated in a corresponding one of FIGS. 1B and 9 can be so farmed in a wave winding as not to lap back. Note that the stator windings formed in a full pitch winding, which are disposed in the same slot, are arranged at a pitch of 360 electric degrees. A positive one-phase stator winding of one-phase stator coil formed in a full pitch winding, which is disposed in one of a corresponding pair of slots, and a negative one-phase stator winding of the same one-phase stator coil, which is disposed in the other of the corresponding pair of slots, are arranged at a pitch of 180 electric degrees.

The motors 110 and 110A illustrated in FIGS. 1B and 9 are each designed as a two-pole motor, and therefore, it may be difficult to understand the difference between the lap winding and the wave winding. In contrast, in the eight-pole motor illustrated in FIG. 10, it is possible to understand the difference between the lap winding and the wave winding.

For example, when the A-phase coil is formed in the stator core 12T in the wave winding, each of the positive windings of the A-phase coil is disposed in a corresponding one of the slots 121, 127, 12D, and 12M. Similarly, each of the negative windings of the A-phase coil is disposed in a corresponding one of the slots 124, 12A, 12J, and 12Q. Solid line to which reference character 12X is attached represents first coil ends of the A-phase stator coil located over one annular end surface of the yoke BY1 of the stator core 12T. Dashed line to which reference character 12Y is attached represents second coil ends of the A-phase stator coil located over the other annular end surface of the yoke BY1 of the stator core 12T.

As described above, the A-phase coil formed in the wave winding is wound in the slots 121, 124, 127, 12A, 12D, 12J, 12M, and 12Q such that the first and second coil ends 12X and 12Y are alternately arranged over the one and the other annular end surface sides of the stator core 12T in its axial direction.

The B-phase stator coil and the C-phase stator coil each formed in the wave winding can be wound in the stator core 12T like the A-phase stator coil.

As described above, any one of various winding methods including the lap winding, the wave winding, and other windings can be freely selected to provide the winding configuration of each of the stator coils outside of the slots of the stator core 4, 12T. The electromagnetic actions of the reluctance motor 110 or 110A using any one of the various winding methods can be identical to those of the reluctance motor 110 or 110A using another one of the various winding methods.

In addition, the various winding methods strongly depend on the structures of winding machines to be used to automatically mass produce products of the stator core 4, 12T. Thus, it is possible to select any one of the various winding methods to meet any one of the winding machines selected to produce many products of the stator core 4, 12T. In order to produce many products of another stator core according to the present invention, it is also possible to select any one of the various winding methods to meet any one of the winding machines selected to produce many products of another stator core.

As each of the stator coils of each of the motors 110 and 110A, a distributed winding can be used. The slots can be circumferentially arranged at irregular pitches therebetween. For example, a same-phase coil can be distributedly wound in corresponding circumferentially adjacent slots such that the circumferential width of the inner surface of one tooth located between the circumferentially adjacent slots is shorter than that of the inner surface of another tooth.

Figures 13, 14:
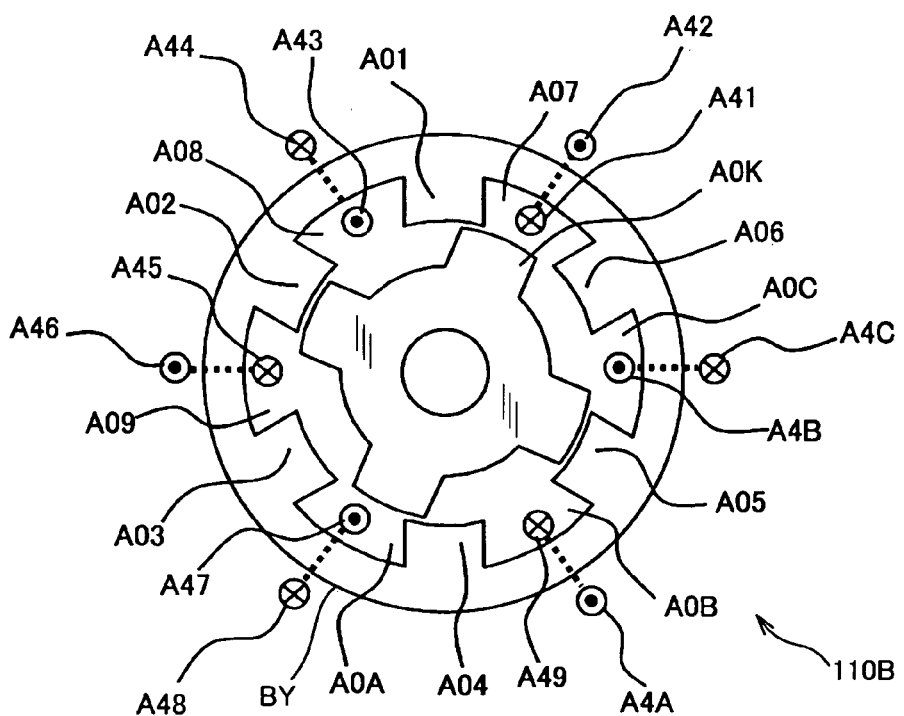
FIG. 13 is a table schematically illustrating other many types of motors to which the present invention is applied.
FIG. 14 is a lateral cross sectional view of a reluctance motor according to the second modification of the reluctance motor according to the first embodiment.

As various types of motors according to the first embodiment, the 6S4R motor 110 and the 6S2R motor 110A have been described, but the present invention can be applied to other many types of motors illustrated in FIG. 13.

In FIG. 13, the horizontal axis represents the number (M) of stator poles, and the vertical axis represents the number (K) of rotor poles.

FIG. 13 illustrates various types of MSKR motors each having the M number of rotor poles and the K number of stator poles. The M is selected any one of even numbers equal to or more than 4, such as 4, 6, 8, 10, 12, 14, . . . , and the K is selected any one of even numbers equal to or more than 2, such as 2, 4, 6, 8, 10, 12, 14, . . . .

The various types of MSKR motors include multi-pole motors each having the number of stator poles that is an integral multiple of the number of stator poles of the two-pole motor models described in the first embodiment. These various types of MSKR motors illustrated in FIG. 13 are included within the scope of the present invention.

When the number of M and that of K are slightly increased, although the number of power transistors of a control device is increased, the total output capacitance of the control device is kept unchanged. Thus, the total voltage and current capacitances of the power transistors of a motor system with a relatively high number of M and a relatively high number of K are basically identical to those of the power transistors of a motor system with a relatively low number of M and a relatively low number of K.

The more increased the number of M and that of K are, the more increased the number of locations of the stator poles and rotor poles are. This achieves an advantage of cancelling torque ripples when the phases of the stator and rotor poles are different from each other. However, if the number of M and that of K were excessively increased, the increase in complexity of the control device could not be ruled out. Thus, it is inadvisable to excessively increase the number of M and that of K. Preferable combinations of the number of M of the stator poles and the number of K of the stator poles will be described later.

Next, a second modification of the reluctance motor 110 according to the first embodiment will be described hereinafter.

FIG. 14 schematically illustrates an example of the structure of a reluctance motor 110B according to the second modification of the first embodiment. In the second modification, a reluctance motor having six salient poles of a stator (M=6) and four salient poles of a rotor (K=4), such as "6S4R motor 110B, will be described hereinafter. Like elements between the reluctance motor 110 and the reluctance motor 110B, to which like reference characters are assigned, are omitted or simplified in description.

A different point between the reluctance motors 110I3 and 110 is that, as each of three-phase stator coils of the motor 1103, a toroidal winding is used.

A first A-phase coil A41 and A42 serving as a positive winding is concentrically positively wound around a portion of the back yoke BY between teeth A01 and A08 in the form of a toroidal coil so that the A-phase winding portion A42 is located outside the yoke BY of the stator core 4. A second A-phase coil A47 and A48 serving as a negative winding portion is concentrically negatively wound around a portion of the back yoke BY between teeth A03 and A04 in the form of a toroidal coil so that the A-phase winding portion A48 is located outside the yoke BY of the stator core 4.

A first B-phase coil A45 and A46 serving as a positive winding is concentrically positively wound around a portion of the back yoke BY between teeth A02 and A03 in the form of a toroidal coil so that the B-phase winding portion A46 is located outside the yoke BY of the stator core 4. A second B-phase coil A4B and A4C serving as a negative winding is concentrically negatively wound around a portion of the back yoke BY between teeth A05 and A06 in the form of a toroidal coil so that the B-phase winding portion A4C is located outside the yoke BY of the stator core 4.

A first C-phase coil A49 and A4A serving as a positive winding is concentrically positively wound around a portion of the back yoke BY between teeth A04 and A05 in the form of a toroidal coil so that the C-phase winding portion A4A is located outside the yoke BY of the stator core 4. A second C-phase winding A43 and A44 serving as a negative winding is concentrically negatively wound around a portion of the back yoke BY between teeth A01 and A02 in the form of a toroidal coil so that the C-phase winding portion A02 is located outside the yoke BY of the stator core 4.

Electromagnetic actions of each of the winding portions A42, A44, A46, A48, A4A, and A4C provide a closed magnetic path passing a space outside the stator 4; this space has a magnetic resistance higher than that of the stator 4. Thus, a current flowing through each of the winding portions A42, A44, A46, A48, A4A, and A4C has an effect on the electromagnetic actions inside the motor 1103; this effect is very small enough to be negligible. For this reason, the reluctance motor 1103 illustrated in FIG. 14 provides magnetic characteristics that are the same as the reluctance motor 110 illustrated in FIG. 1B.

To each of six pairs of stator coils, a unidirectional current can be supplied while being adjusted. Specifically, the control device CC illustrated in FIG. 2 can be expanded as a six-phase control device to include six pairs of power transistors and diodes; each pair is configured as the pair of, for example, the power transistor 564 and the diode 567.

The driver DR is designed to turn on the power transistor of each pair to thereby cause a unidirectional current to flow through a corresponding pair of stator coils. That is the operations of the expanded control device CC are substantially identical to the control device CC illustrated in FIG. 2.

Similarly, the control device CC1 illustrated in FIG. 3 can be expanded as a six-phase control device to include six sets of a pair of power transistors and a diode; each set is configured as the set of, for example, the first pair of power transistors 871 and 872 and the diode 877.

The driver DR1 is designed to turn on the power transistors of each set to thereby cause a unidirectional current to flow through a corresponding pair of stator coils. That is, the operations of the expanded control device CC1 are substantially identical to the control device CC1 illustrated in FIG. 3.

Note that each of the expanded six-phase control devices can be designed such that a voltage across each of the power transistors is identical to that across each of the power transistors of a corresponding one of the control device CC and CC1. Although the number of power transistors of each of the expanded six-phase control devices is twice that of power transistors of a corresponding one of the control device CC and CC1, each of the expanded six-phase control devices can reduce its total current capacity to the half of the total current capacity of a corresponding one of the control device CC and CC1. This maintains the output capacitance of each of the expanded control device at the output capacitance of a corresponding one of the control device CC and CC1, thus maintaining the cost of each of the expanded control device at a same level of the cost of a corresponding one of the control device CC and CC1.

Note that, when the output capacitance of the motor 1103 is set to be identical to that of the motor 110 or 110A, the total current capacitance of the power transistors of an expanded control device can be principally the same as that of the power transistors of the control device CC or CC1.

Thus, if the cost of a power transistor was in proportion to the current capacitance thereof, the cost and the total current capacity of the power transistor portion of an expanded control device would be identical to that of the power transistor portion of the control device CC or CC1 independently of the number of phases of each of the expanded control device and the control device CC or CC1. If the output capacitance of the motor 110B was set to be equal to or lower than 100 [W], the number of parts, such as the number of phases, of the motor 1103 would be affected to the cost thereof.

The A-phase coil A41 and A42 and the A-phase coil A47 and A48 can be connected to each other by a connection wire in series so that a unidirectional current flows therethrough in the same direction. This makes the A-phase coil A41 and A42 and the A-phase coil A47 and A48 equivalent to the A-phase coil illustrated in FIG. 1B.

Similarly, the B-phase coil A45 and A46 and the B-phase coil A4B and A4C can be connected to each other by a connection wire in series so that a unidirectional current flows therethrough in the same direction. This makes the B-phase coil A45 and A46 and the B-phase coil A4B and A4C equivalent to the B-phase coil illustrated in FIG. 1B.

In addition, the C-phase coil A49 and A4A and the C-phase coil A43 and A44 can be connected to each other by a connection wire in series so that a unidirectional current flows therethrough in the same direction. This makes the C-phase coil A49 and A4A and the C-phase coil A43 and A44 equivalent to the C-phase winding illustrated in FIG. 1B.

This winding configuration using the connection wires allows the motor 110E illustrated in FIG. 14 to serve as a three-phase motor equivalent to the motor 110 illustrated in FIG. 1B, and therefore, the motor 110B can be driven by the control device CC or CC1.

As described above, each of the winding portions A42, A44, A46, A48, A4A, and A4C located outside the stator core 4 is electromagnetically ineffective. However, if the thickness of the stacked stator core 4 in its axial direction was short or the number of poles was small, using the toroidal winding as each of the stator winding could make it easy to form each of the six pairs of toroidal coils in a corresponding slot of the stator core. This is because a toroidal coil illustrated in FIG. 14 is shorter in length than a concentrated coil illustrated in FIG. 1B. This provides the motor 110B with a high practicality.

The toroidal motor 110B illustrated in FIG. 14 is designed as the 6S4R motor, but various types of MSKR motors illustrated in FIG. 13 can be designed as toroidal motors like the toroidal motor 110B.

In FIG. 13, various types of MSKR motors each having an even number of rotor poles and an even number of stator poles are illustrated, but the present invention is not limited thereto.

Specifically, various types of MSKR motors each having an odd number of rotor poles and an odd number of stator poles can be included within the scope of the present invention in an MSKR motor having an odd number of rotor poles and an odd number of stator poles, the control device CC or CC1 can be configured to supply positive and negative currents to one stator coil or a few stator coils. This allows the control device CC or CC1 can drive the remaining stator coils in the same manner as an MSKR motor having an even number of rotor poles and an even number of stator poles.

Next, a third modification of the reluctance motor 110 according to the first embodiment will be described hereinafter.

Figure 15:
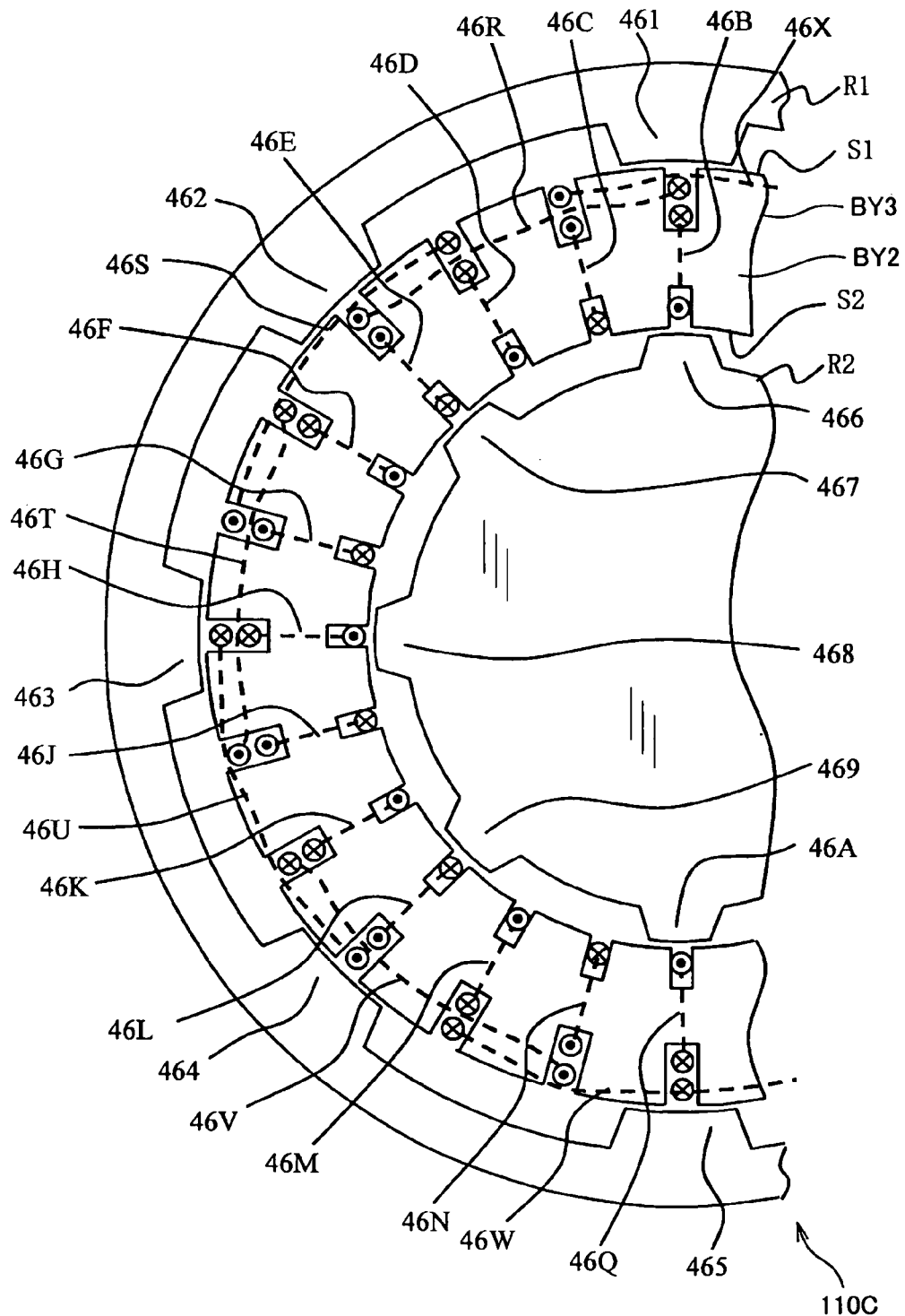
FIG. 15 is a lateral cross sectional view of a dual motor according to the third modification of the reluctance motor according to the first embodiment.

FIG. 15 schematically illustrates an example of the structure of a dual motor 110C according to the third modification of the first embodiment. The dual motor 11C is designed as an eight-pole motor based on the motor 110A illustrated in FIG. 9.

Specifically, the dual motor 110C includes a first rotor R2, a first stator S2, a second rotor R1, and a second stator S1.

The first rotor R2 has a substantially annular shape, and has, its outer circumferential surface, eight salient poles, five of which are illustrated by 466, 467, 468, 469, and 46A. The eight salient poles are circumferentially arranged at regular pitches. The first rotor R2 is coaxially mounted on the output shaft 1.

The first stator S2 consists of an annular back yoke BY2 and 24 teeth. The teeth project radially inwardly from the inner circumference of the back yoke BY2 and are circumferentially arranged at equal pitches therebetween. Each of the teeth serves as a salient pole. Spaces between circumferentially adjacent teeth provide 24 slots of the first stator S2.

The first stator S2 is arranged such that its center axis is coaxial to the center axis of the first rotor R2 and its inner circumference is opposite to the outer circumference of each salient pole with an air gap therebetween.

The second stator S1 consists of an annular back yoke BY3 and 24 teeth. The teeth project radially outwardly from the outer circumference of the back yoke BY3 and are circumferentially arranged at equal pitches therebetween. Each of the teeth serves as a salient pole. Spaces between circumferentially adjacent teeth provide 24 slots of the second stator core S1.

The second stator S1 is arranged such that:

its center axis is coaxial to the center axis of the first rotor R2;

its inner circumference is opposite to the outer circumference of the first stator S2; and each of the slots of the second stator S1 is radially aligned with a corresponding one of the slots of the first stator S2.

The inner circumference of the second stator S1 can be joined to the outer circumference of the first stator core S2 to provide a common back yoke.

The second rotor R1 has a substantially annular shape and has at its inner circumferential surface eight salient poles, five of which are illustrated by 461, 462, 463, 464, and 465. The eight salient poles are circumferentially arranged at regular pitches.

The second rotor R1 is arranged such that its center axis is coaxial to the center axis of the first rotor R2 and the inner circumference of each salient pole of the second rotor R1 is opposite to the outer circumference of the second stator S1 with an air gap therebetween.

Specifically, a first motor consisting of the first rotor R2 and the first stator S2 and a second motor consisting of the second rotor R1 and the second stator S1 are concentrically combined to each other.

As described above, the first stator S2 and the second stator S1 are arranged such that the back yoke BY2 of the first stator S2 faces the back yoke BY1 of the second stator S1.

Specifically, the dual motor is designed such that the direction of a current flowing through one slot of the first stator S2 is opposite to that of a current flowing through one slot of the second stator S1; this one slot of the second stator S1 is radially aligned with the one slot of the first stator S2.

This allows one-phase coil to be wound in a corresponding pair of slots radially aligned with each other. This simplifies the winding configuration of each stator winding, and reduces the length of the coil end of each stator winding.

Each of positive A-phase windings 46B, 46H, and 46Q is concentrically wound in a corresponding pair of radially aligned slots. An A-phase current is supplied to flow through each of the positive A-phase windings 46B, 46H, and 46Q into the paper of FIG. 15 illustrated by the circled cross and flow therethrough out of the paper of FIG. 15 illustrated by the circled dot.

Each of negative A-phase windings 46E and 46I, is concentrically wound in a corresponding pair of radially aligned slots. An A-phase current is supplied to flow through each of the negative A-phase windings 46E and 46L out of the paper of FIG. 15 illustrated by the circled dot and flow therethrough into the paper of FIG. 15 illustrated by the circled cross.

Each of positive B-phase windings 46D and 46K is concentrically wound in a corresponding pair of radially aligned slots, A B-phase current is supplied to flow through each of the B-phase windings 46D and 46K into the paper of FIG. 15 illustrated by the circled cross and flow therethrough out of the paper of FIG. 15 illustrated by the circled dot.

Each of negative B-phase windings 46G and 46N is concentrically wound in a corresponding pair of radially aligned slots. A B-phase current is supplied to flow through each of the B-phase windings 46G and 46N out of the paper of FIG. 15 illustrated by the circled dot and flow therethrough into the paper of FIG. 15 illustrated by the circled cross.

Each of positive C-phase windings 46F and 46M is concentrically wound in a corresponding pair of radially aligned slots, A C-phase current is supplied to flow through each of the C-phase windings 46F and 46M into the paper of FIG. 15 illustrated by the circled cross and flow therethrough out of the paper of FIG. 15 illustrated by the circled dot.

Each of negative C-phase windings 46C and 46J is concentrically wound in a corresponding pair of radially aligned slots. A C-phase current is supplied to flow through each of the C-phase windings 46C and 45J out of the paper of FIG. 15 and flow therethrough into the paper of FIG. 15 illustrated by the circled cross.

These stator windings can be handled as six-phase stator windings consisting of the positive A-phase winding, the negative A-phase winding, the positive B-phase winding, the negative B-phase winding, the positive C-phase winding, and the negative C-phase winding. Thus, the control device CC or CC1 is expanded as a six-phase control device set forth above so as to be connected to the dual motor illustrated in FIG. 15. The expanded control device CC or CC1 can supply each of six-phase currents to a corresponding one of the six-phase stator windings in a corresponding direction set forth above to thereby create a torque.

With the structure of the dual motor illustrated in FIG. 15, the total current capacitance of the power transistors is lower than that of the power transistors of a conventional three-phase AC inverter set forth above. For this reason, it is possible to reduce a motor system consisting of the composite motor and the control device CC or CC1 in cost and size.

The positive A-phase windings and the negative A-phase windings can be connected in series by connection wires, the positive B-phase windings and the negative B-phase windings can be connected in series by connection wires, and the positive C-phase windings and the negative C-phase windings can be connected in series by connection wires. This changes the six-phase stator windings illustrated in FIG. 15 to three-phase stator windings. Thus, the control device CC or CC1 can drive the three-phase stator windings set forth above, thus reducing the motor system consisting of the dual motor and the control device CC or CC1 in cost and size.

In one type of the various types of MSKR motors illustrated in FIG. 13 using the full pitch winding, the increase in the number M of stator poles increases the number of stator windings that intersect with one another. This may make the winding configuration of the one type of MSKR motors become complicated. Thus, the manufacturability of the one type of MSKR motors may be deteriorated, and the coil end of each of the stator windings may become a relatively large length.

In contrast, in the motor 110C illustrated in FIG. 15, even if the number M of stator windings is increased, the manufacturability of each of the stator windings can be maintained at a high level. This is because each stator winding can be wound in a corresponding pair of radially aligned slots. This prevents the winding configuration of the motor 110C from becoming complicated. Note that, even if the number M of stator windings is increased in one type of the various types of MSKR motors illustrated in FIG. 13 using the toroidal winding, it is possible to prevent the winding configuration of the one type of the various types of MSKR motors from becoming complicated.

Note that the inner first motor and the outer second motor are different in diameter from each other so that they are different in electromagnetic condition from each other. Thus, for electromagnetically optimizing each of the individual first and second motors, it is necessary to determine the magnitude of a direct current to be required for the first motor and that of a direct current to be required for the second motor; these magnitudes are different from each other. The structure of the dual motor illustrated in FIG. 15 may make it difficult to supply one direct current with a preset magnitude to the first motor and mother direct current with another magnitude to the second motor.

in order to address such a problem, the dual motor 1100 according to the third modification can be additionally provided with a full pitch coil for each phase as illustrated in FIG. 1B; this full pitch coil for each phase is operative to strike an electromagnetic balance between the first motor and the second motor.

Specifically, an A-phase coil 46R is wound in a slot of the second stator S1 in which the positive A-phase winding 46B is disposed and wound in a slot of the second stator S1 in which the negative A-phase winding 46K is disposed. Similarly, an A-phase coil 46U is wound in a slot of the second stator core S1 in which the positive A-phase winding 46H is disposed and wound in a slot of the second stator S1 in which the negative A-phase winding 46L is disposed.

A B-phase coil 46S is wound in a slot of the second stator S1 in which the positive B-phase winding 460 is disposed and wound in a slot of the second stator S1 in which the negative B-phase winding 46G is disposed. Similarly, a B-phase coil 46V is wound in a slot of the second stator S1 in which the positive B-phase winding 46K is disposed and wound in a slot of the second stator S1 in which the negative B-phase winding 46N is disposed. A C-phase coil 46T is wound in a slot of the second stator S1 in which the positive C-phase winding 46F is disposed and wound in a slot of the second stator S1 in which the negative C-phase winding 46J is disposed. Similarly, a C-phase coil 46W is wound in a slot of the second stator S1 in which the positive C-phase winding 46M is disposed and wound in a slot of the second stator S1 in which the negative C-phase winding (not shown) is disposed.

The added coils contribute to electromagnetic actions in the second motor, and therefore, adjustment of the magnitude of a direct current to be individually supplied to each added coil can electromagnetically optimize each of the first and second motors. This makes it possible to increase the output power of the dual motor, and to reduce the dual motor in size and cost.

Figure 16:
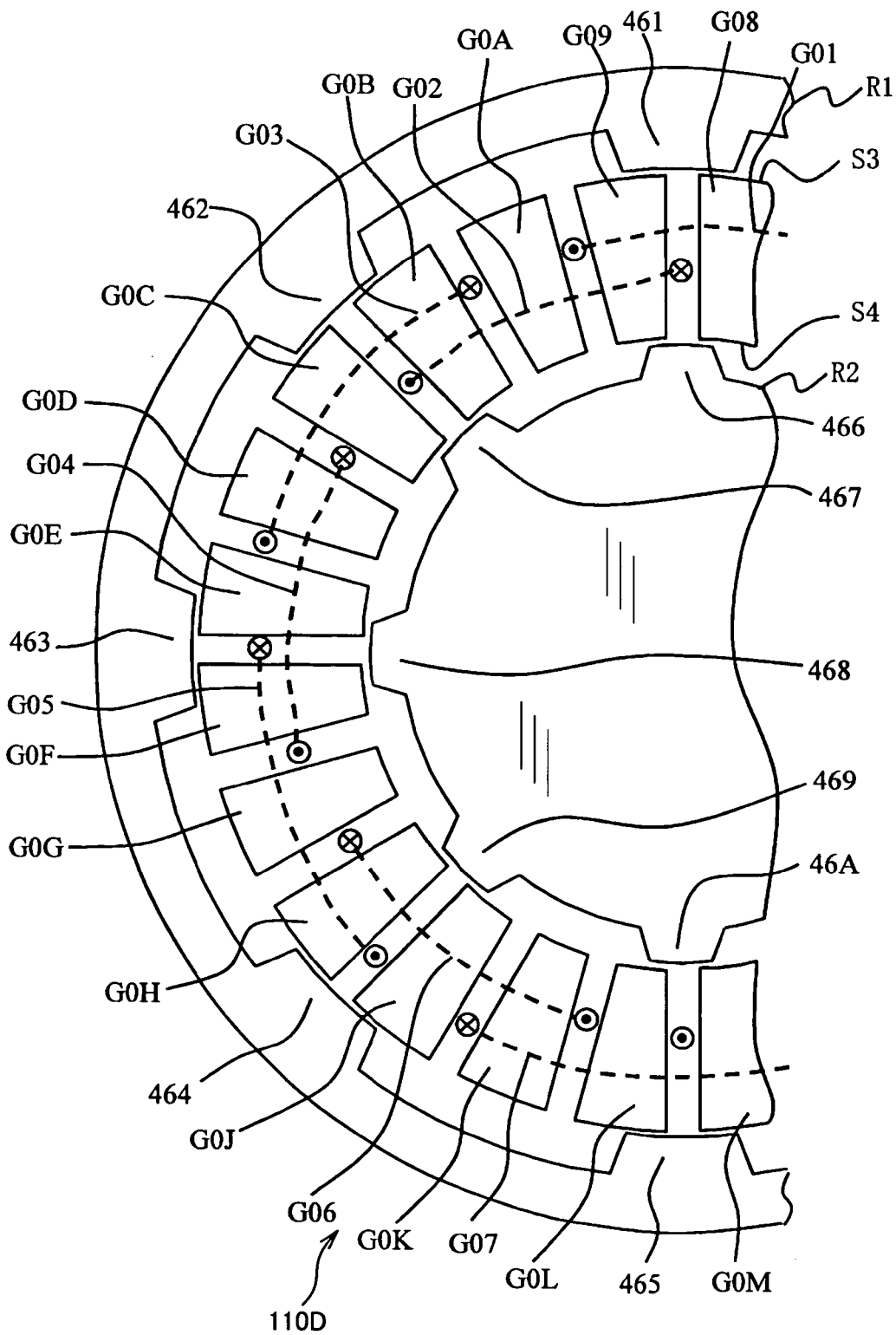
FIG. 16 is a lateral cross sectional view of a dual motor according to a modification of the dual motor illustrated in FIG. 15.

FIG. 16 schematically illustrates an example of the structure of a dual motor 110D according to a modification of the dual motor illustrated in FIG. 15. The dual motor 110D is a modification of the dual motor 110C illustrated in FIG. 15, and therefore, like elements between the dual motor 1100 and the dual motor 110D, to which like reference characters are assigned, are omitted or simplified in description.

Specifically, the dual motor 110D is designed as an eight-pole motor based on the motor 110A illustrated in FIG. 9.

The dual motor 110D includes the first rotor R2, a first stator S4, the second rotor R1, and a second stator S3. The structures of the first and second rotors R2 and R1 are the same as those of the first rotor R2 and the second rotor R1 of the dual motor 1100.

The first and second stators S4 and S3 share 24 teeth, fourteen of which are illustrated by G08, G09, G0A, G0B, G0C, G0D, G0E, G0F, G0G, G0H, G0J, G0K, G0L, and G0M. Specifically, the teeth are circumferentially arranged at equal pitches therebetween such that:

their inner surfaces face the outer circumference of the first rotor R2 with an air gap therebetween; and their outer surfaces face the inner circumference of the second rotor R1 with an air gap therebetween. Each of the teeth is aligned in a corresponding radial direction of the first rotor R2. That is, the inner-side portion of each of the teeth serves as a tooth of the first stator S4, and the outer-side portion thereof serves as a tooth of the second stator S3.

The polarity of the inner-side portion of each of the teeth is designed to be reversed to that of the outer-side portion of a corresponding one of the teeth. For example, when each of the first and second rotors R2 and R1 are located such that the salient pole 461 of the second rotor R1 and the salient pole 466 of the first rotor R2 face the teeth G08 and G09, a magnetic flux passing through the salient pole 461 of the second rotor R1 passes through the tooth G08 or tooth G09 so as to pass through the salient pole 461 of the second rotor R1.

The shared teeth are supported by a supporting means (not shown) from sides of the rotor in its axial direction to thereby eliminate the need of the back yokes BY2 and BY3. The magnetic characteristics of the supporting means can, be carefully determined.

The first and second stators S4 and S3 also share a plurality of stator windings. Specifically, an A-phase coil is wound in a slot between the teeth G08 and G09 and in a slot between the teeth G0B and G0C; an end of this A-phase coil is represented by reference character G02. An A-phase coil is wound in a slot between the teeth G0E and G0F and in a slot between the teeth G0H and G0J; an end of this A-phase coil is represented by reference character G05.

A B-phase coil is wound in a slot between the teeth G0A and G0B and in a slot between the teeth G0D and G0E; an end of this B-phase coil is represented by reference character G03. A B-phase coil is wound in a slot between the teeth G0G and G0H and in a slot between the teeth G0K and G0L; an end of this B-phase coil is represented by reference character G06.

A C-phase coil is wound in a slot between the teeth (not shown) and in a slot between the teeth G09 and G0A; an end of this C-phase coil is represented by reference character G01. A C-phase coil is wound in a slot between the teeth G0C and G0D and in a slot between the teeth G0F and G0G; an end of this C-phase coil is represented by reference character G04. A C-phase coil is wound in a slot between the teeth G03 and G0K and in a slot between the teeth (not shown); an end of this C-phase coil is represented by reference character G07.

The control device CC or CC1 can drive the A-, B-, and C-phase coils by supplying a unidirectional current to each of the A-, B-, and C-phase coils indicated by the symbols of "circled cross" or "circled dot". Thus, a motor system consisting of the dual motor 110D and the control device CC or CC1 can reduce in size and cost. Note that, at that time, a unidirectional current is supplied to flow through each of the stator coils so that a unidirectional magnetic flux passes through a corresponding one shared stator pole; this magnetic flux electromagnetically acts the dual motor 110D.

Note that it is necessary to equalize the magnitude of the magnetic flux produced in each of the first motor and the second motor. The magnitude of the magnetic flux produced in the first motor may be excessively higher than that of the magnetic flux produced in the second motor. In order to address this matter, an intermediate dual motor between the dual motors 110C and 110D can be implemented.

Specifically, the intermediate dual motor is provided with a back yoke between the first stator S4 and the second stator S3 to provide slots of the first stator S4 between the teeth and the back yoke, and provide slots of the second stator S3 between the teeth and the back yoke.

The back yoke is operative to compensate the unbalance in magnetic flux between the first and second stators S4 and S3. Each of the stator coils illustrated in FIG. 16 is divided into a pair of stator coils. One of the paired stator coils of each phase is wound by a suitable number of turns in a corresponding pair of slots of the first stator S4, and the other of the paired stator coils of each phase is wound by a suitable number of turns in a corresponding pair of slots of the second stator S3.

The dual motor 110C illustrated in FIG. 15 is designed such that the first and second motors are radially coaxially arranged. A dual motor, as an additional modification of the dual motor 1100, can be designed such that a first axial gap motor and a second axial gap motor are arranged in its axial direction. Rotors of the first and second axial gap motors are arranged at both ends of the dual motor, and stators thereof are arranged such that their back yokes are opposite to each other.

As an alternative structure of the dual motors according to the first embodiment, a first stator having a substantially annular shape and a plurality of outwardly projecting teeth (salient poles) is coaxially mounted on the output shaft 1. A first rotor having a substantially annular shape and, at its inner circumferential surface, a plurality of salient poles is arranged such that its center axis is coaxial to the center axis of the first stator and its inner circumference is opposite to the outer circumference of the first stator with an air gap therebetween.

A second rotor has a substantially annular shape, and has, at its outer circumferential surface, a plurality of salient poles. The second rotor is arranged such that its center axis is coaxial to the center axis of the first stator and its inner circumference is opposite to the outer circumference of the first rotor.

A second stator having a substantially annular shape and has at its inner circumferential surface a plurality of inwardly projecting teeth (salient poles) is arranged such that its center axis is coaxial to the center axis of the first stator and its inner circumference is opposite to the outer circumference of the second rotor with an air gap therebetween. The salient poles of the first rotor and those of the second rotor are shared (integrated) with each other. A plurality of stator coils illustrated in FIG. 16 can be wound in each of the first and second stators in the same manner as the dual motor illustrated in FIG. 16.

Next, a fourth modification of the reluctance motor 110 according to the first embodiment will be described hereinafter.

Figure 17:
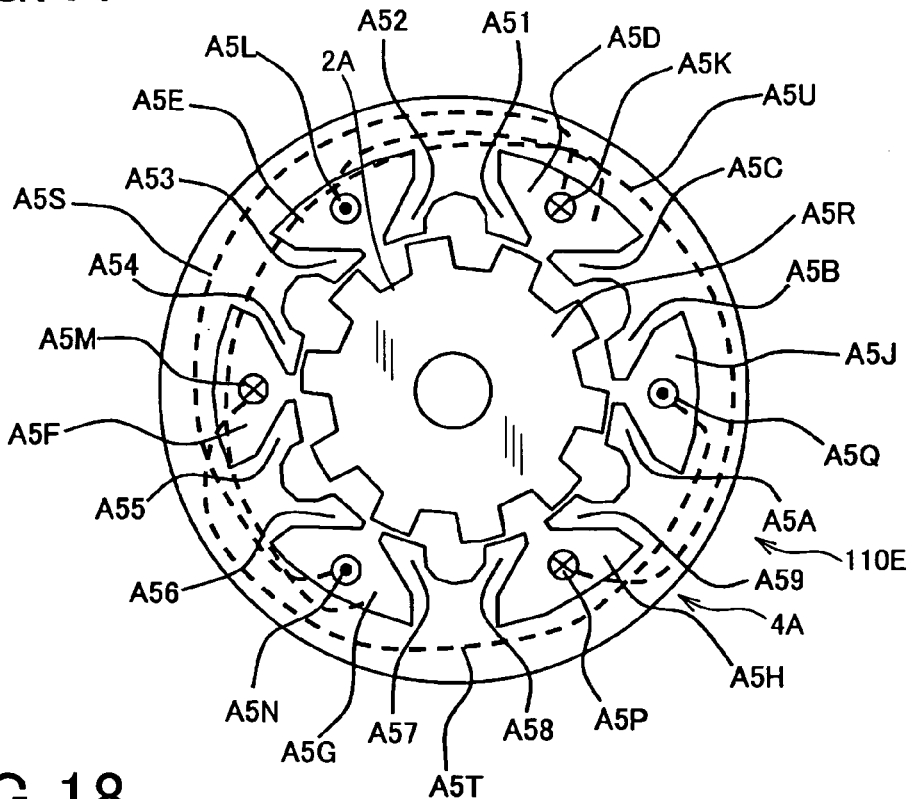
FIG. 17 is a lateral cross sectional view of a reluctance motor according to the fourth modification of the reluctance motor according to the first embodiment.

FIG. 17 schematically illustrates an example of the structure of a reluctance motor 110E according to the fourth modification of the first embodiment. A reluctance motor 110E according to the fourth modification is designed such that the configuration of stator poles and that of rotor poles are devised in order to increase torque to be produced by the reluctance motor 110E.

There are some different points between the reluctance motors 110E and 110.

The first point is that the inner surface of each of the teeth of a stator core 4A is circumferentially forked to provide two forked teeth. Specifically, reference numerals A51 and A52 represent the two forked teeth of the tooth A01, reference numerals A53 and A54 represent the two forked teeth of the tooth A02, and reference numerals A55 and A56 represent the two forked teeth of the tooth A03. Reference numerals A57 and A58 represent the two forked teeth of the tooth A04, reference numerals A59 and A5A represent the two forked teeth of the tooth A05, and reference numerals A5B and A5C represent the two forked teeth of the tooth A06. A pitch between one pair of the two forked teeth of the stator core 4A is identical to that between another pair of the two forked teeth of the stator core 4A.

That is the number of salient stator poles of the stator core 4A is increased to twelve in comparison to the number of salient stator poles of the stator core 4.

The second point is that a rotor 2A of the reluctance motor 110E is provided with ten salient poles ASR. Each of the ten salient poles ASR is formed such that a corresponding outer circumference portion radially outwardly projects. The ten salient poles of the rotor 2A are circumferentially arranged at regular pitches. The pitch of circumferentially adjacent poles of the rotor 2A is set to be substantially equal to the pitch between the two forked teeth, of the stator core 4A.

An A-phase coil A5K and A5N is concentrically wound in a slot A5D between the forked teeth A5C and A5I and in a slot A5G between the forked teeth A56 and A57 at a pitch of 180 electrical degrees. Reference character A5S represents an end of the A-phase coil A5K and A5N.

A B-phase coil A5M and A5Q is concentrically wound in a slot A5F between the forked teeth A54 and A55 and in a slot A5J between the forked teeth A5A and A5B at a pitch of 180 electrical degrees. Reference character A5T represents an end of the B-phase coil A5M and A5Q.

A C-phase coil A5P and A5L is concentrically wound in a slot A5H between the forked teeth A58 and A59 and in a slot A5E between the forked teeth A52 and A53 at a pitch of 180 electrical degrees. Reference character A5U represents an end of the C-phase coil A5P and A5L.

Operations of the reluctance motor 110E are substantially identical to those of the reluctance motor 110 illustrated in FIGS. 4, 6, 7, and 8 by the control device CC or CC1, so that A-, B-, and C-phase direct currents are similarly supplied to flow through the A-, B-, and C-phase stator coils, respectively. Note that the circumferential electrical, angular width of the outer surface of each of the salient poles A5R of the rotor 2A is shorter than that of the outer surface of each of the salient poles A0K of the rotor 2. For this reason, the rotational speed of the rotor 2A is lower than that of the rotor 2.

As a result, in comparison to the motor 110, a torque created by the motor 110E becomes twice in principle that created by the motor 110 because the number of teeth of the stator of the motor 110E is twice that of teeth of the stator of the motor 110. In addition, the rotational speed of the motor 110E is lower by the ratio of the number of teeth of the rotor 2 to that of teeth of the rotor 2A than the rotational speed of the rotor 2.

Figure 18:
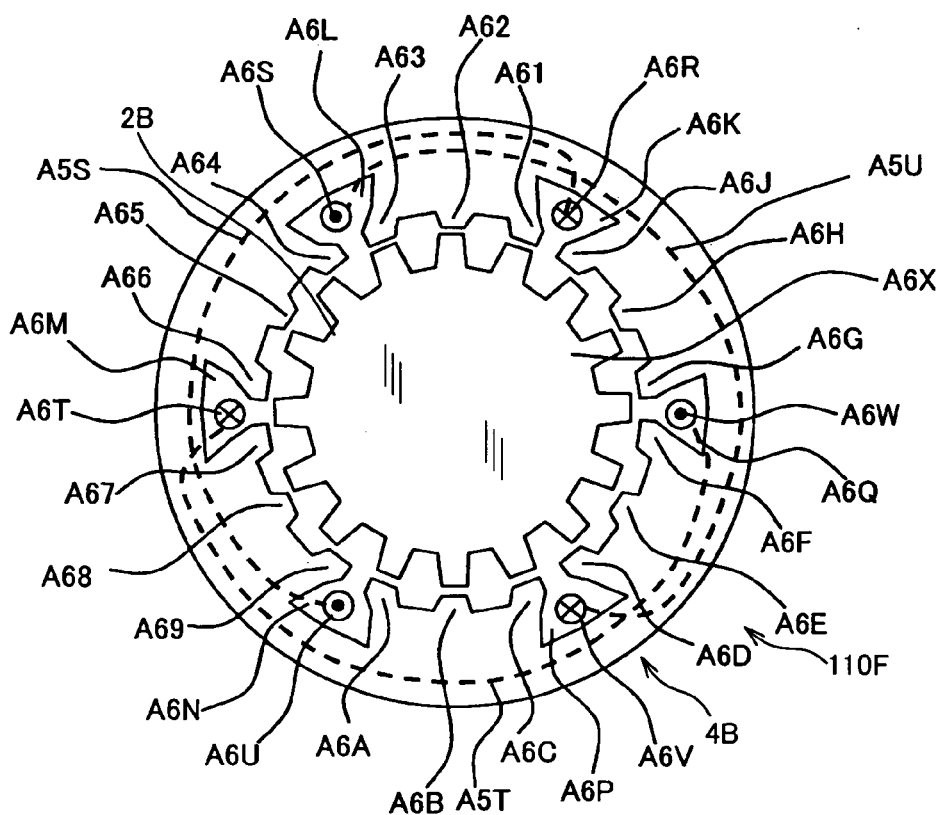
FIG. 18 is a lateral cross sectional view of a reluctance motor according to the fifth modification of the reluctance motor according to the first embodiment.

FIG. 18 schematically illustrates an example of the structure of a reluctance motor 110E according to the fifth modification of the first embodiment. The reluctance motor 110F according to the fifth modification is designed such that the configuration of stator poles and that of rotor poles are devised in order to increase torque to be produced by the reluctance motor 110F.

There are some different points between the reluctance motors 110F and 110.

The first point is that the inner surface of each of the teeth of a stator core 4B has a circumferentially trident shape to provide three trident teeth. Specifically, reference numerals A61, A62, and A63 represent the three trident teeth of the tooth A01, reference numerals A64, A65, and A66 represent the three trident teeth of the tooth A02, and reference numerals A67, A68, and A69 represent the three trident teeth of the tooth A03. Reference numerals A6A, A6B, and A6C represent the three trident teeth of the tooth A04, reference numerals A6D, A6E, and A6F represent the three trident teeth of the tooth A05, and reference numerals A6G, A6H, and A6J represent the three trident teeth of the tooth A06. A pitch among one set of the three trident teeth of the stator core 4A is identical to that among another set of the three trident teeth of the stator core 4A.

That is the number of salient stator poles of the stator core 4A is increased to eighteen in comparison to the number of salient stator poles of the stator core 4.

The second point is that a rotor 2B of the reluctance motor 110F is provided with sixteen salient poles A6X. Each of the sixteen salient poles A6X is formed such that a corresponding outer circumference portion radially outwardly projects. The sixteen salient poles of the rotor 2B are circumferentially arranged at regular pitches. The pitch of circumferentially adjacent poles of the rotor 2B is set to be substantially equal to the pitch among the three trident teeth of the stator core 4A.

An A-phase coil A6R and A6U is concentrically wound in a slot A6K between the divided teeth A61 and A6J and in a slot A6N between the divided teeth A69 and A6A at a pitch of 180 electrical degrees. Reference character A5S represents an end of the A-phase coil A6R and A6U.

A B-phase coil A6T and A6W is concentrically wound in a slot A6M between the divided teeth A66 and A67 and in a slot A6Q between the divided teeth A6F and A6G at a pitch of 180 electrical degrees. Reference character A5T represents an end of the B-phase coil A6T and A6W.

A C-phase coil A6V and A6S is concentrically wound in a slot A6P between the divided teeth A6C and A6D and in a slot A61, between the divided teeth A63 and A64 at a pitch of 180 electrical degrees. Reference character A5U represents an end of the C-phase coil A6V and A6S.

Operations of the reluctance motor 110F are substantially identical to those of the reluctance motor 110 illustrated in FIGS. 4, 6, 7, and 8 by the control device CC or CC1, so that A-, B-, and C-phase direct currents are similarly supplied to flow through the A-, B-, and C-phase stator coils, respectively. Note that the circumferential electrical angular width of the outer surface of each of the salient poles A6X of the rotor 2B is shorter than that of the outer surface of each of the salient poles A0K of the rotor 2. For this reason, the rotational speed of the rotor 2B is lower than that of the rotor 2.

As a result, in comparison to the motor 110, a torque created by the motor 110F becomes triple in principle that created by the motor 110 because the number of teeth of the stator of the motor 110F is triple that of teeth of the stator of the motor 110. In addition, the rotational speed of the motor 110F is lower by the ratio of the number of teeth of the rotor 2 to that of teeth of the rotor 2A than the rotational speed of the rotor 2.

The reluctance motor 110E is designed such that the number of teeth of each stator pole of the stator core is twice that of teeth of the stator core of the motor 110, thus increasing its torque constant. Similarly, the reluctance motor 110F is designed such that the number of teeth of each stator pole of the stator core is triple that of teeth of the stator core of the motor 110, thus increasing its torque constant. In comparison to the motor 110, each of the reluctance motors 110E and 110F can increase its torque constant and a torque, and therefore, its efficiency. However, in comparison to the motor 110, a peak torque to be achieved by each of the reluctance motors 110E and 110F does not increase very much because leakage fluxes occur around the stator poles and/or the rotor poles so that magnetic saturation is partly generated.

In order to address such an insufficient increase in peak toque, two measures can be applied to the reluctance motor 110E or 110F.

As the first measure, a permanent magnet is provided in each of concave spaces formed between circumferentially adjacent two or three divided teeth. The permanent magnet creates a magnetic flux a direction of which is opposite to that of a magnetic flux formed by each of the circumferentially adjacent two or three divided teeth. This configuration can reduce leakage fluxes between circumferentially adjacent two or three divided teeth, thus increasing a torque to be created by the reluctance motor 110E or 110F.

As the second measure, a magnet is provided from one inner side of each of the circumferentially adjacent two or three divided teeth to the bottom of a corresponding one of the concave spaces. The magnet increases the magnitude of a magnetic flux passing through each of the circumferentially adjacent two or three divided teeth. This configuration can increase a torque to be created by the reluctance motor 110E or 110F. Both the first and second measures can be applied to the reluctance motor 110E or 110F.

Next, a sixth modification of the reluctance motor 110 according to the first embodiment will be described hereinafter.

Figure 19:
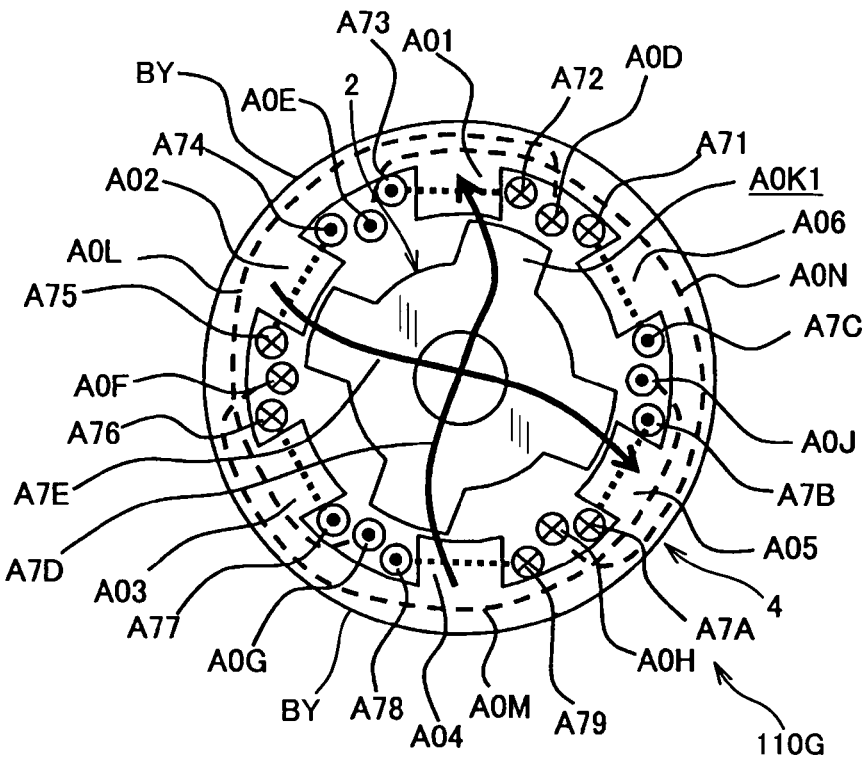
FIG. 19 is a lateral cross sectional view of a reluctance motor according to the sixth modification of the reluctance motor according to the first embodiment.

FIG. 19 schematically illustrates an example of the structure of a reluctance motor 110G according to the sixth modification of the first embodiment.

In addition to the structure of the motor 110, the reluctance motor 110G according to the sixth modification includes a plurality of field windings (field coils) provided for respective teeth of the stator core 4.

Specifically, a field coil A72 and A73 is concentrically wound around the stator pole (tooth) A01, a field coil A75 and A74 is concentrically wound around the stator pole (tooth) A02, and a field coil A76 and A77 is concentrically wound around the stator pole (tooth) A03. Similarly, a field coil A79 and A78 is concentrically wound around the stator pole (tooth) A04, a field coil A7A and A7B is concentrically wound around the stator pole (tooth) A05, and a field coil A71 and A7C is concentrically wound around the stator pole (tooth) A06.

The motor 110G is driven such that a direct current is supplied to flow through each of the field coils A72 and A73, A75 and A74, A76 and A77, A79 and A78, A7A and A7B, and A71 and A7C in positive and negative directions indicated by circled cross and circled dot symbols illustrated in FIG. 19. The positive direction represents a direction into the paper of FIG. 19, and the negative direction represents a direction out of the paper of FIG. 19.

The field coils A72 and A73, A75 and A74, A76 and A77, A79 and A78, A7A and A7B, and A71 and A7C are connected each other by connection wires in series such that a field current If flows in a same direction through each of the field coils.

Figure 21:
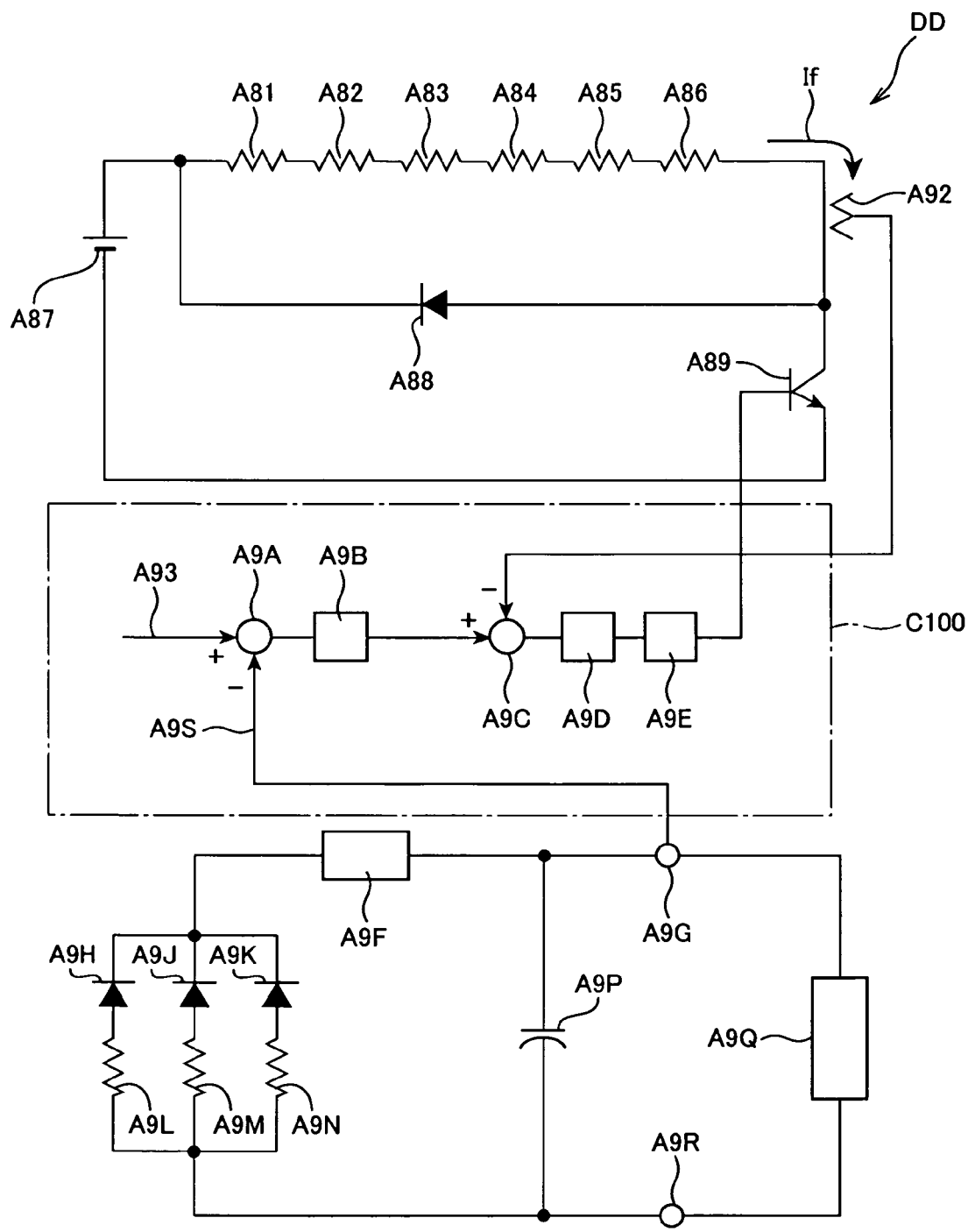
FIG. 21 is circuit diagram schematically illustrating an example of a drive circuit according to the modification illustrated in FIG. 20.

Specifically, an example of drive circuits for supplying the field current If to the series-connected field coils is illustrated in FIG. 21.

The drive circuit DD illustrated in FIG. 21 includes a DC power source A87, a flywheel diode A88, series-connected field coils A81, A82, A83, A84, A85, and A86 illustrated in FIG. 19, a transistor (bipolar transistor) A89 for adjusting the field current if, and a current sensor A92.

A positive terminal of the DC power source A87 is connected to one end of the series-connected field coils A81 to A86, and a negative terminal of the DC power source A87 is connected to the other end of the series-connected field coils A81 to A87. The flywheel diode A88 is connected in antiparallel across the series-connected field coils A81 to A86.

The other end of the series-connected field coils A81 to A86 is connected to the collector of the transistor A89, and the emitter of the transistor A89 is connected to the negative terminal of the DC power source A87. The base of the transistor A89 is connected to a controller C100. The current sensor A92 is so located as to measure the field current If flowing through the series-connected field coils A81 to A86. The current sensor A92 is operative to output a measured value of the field current If to the controller C100. The controller C100 is connected to the base of transistor A89, and operative to supply a PWM (Pulse-Width Modulated) signal, such as a train of pulses, with a variable duty cycle to thereby turn on and off the transistor A89.

Specifically, when no three-phase currents Ia, Ib, and Ic are supplied to the three-phase coils of the motor 110E with the rotor 2 being located at a rotational position illustrated in FIG. 19, the controller C100 drives the transistor A89 to turn it on. This supplies the field current (direct current) f from the DC power source A87 through the series-connected field coils A81 to A86.

The current flowing through the field coil A79 and A78 (A84) and that flowing through the field coil A72 and A73 (A81) induce a magnetic flux A7D, illustrated by thick allow, from the tooth A04 to the tooth A01. In addition, the current flowing through the field coil A75 and A74 (A82) and that flowing through the field coil A7A and A7D (A85) induce a magnetic flux A7E, illustrated by thick allow, from the tooth A02 to the tooth A05.

The induced magnetic flux A7D causes a magnetic attractive force between the tooth A01 and one salient pole A0K1 of the first pair of the rotor 2 opposite thereto and between the tooth A04 and the other salient pole of the first pair of the rotor 2 opposite thereto in the counterclockwise direction. In contrast, the induced magnetic flux A7E causes a magnetic attractive force between the tooth A02 and one salient pole of the second pair of the rotor 2 opposite thereto and between the tooth A05 and the other salient pole of the second pair of the rotor 2 opposite thereto in the clockwise direction.

Thus, a torque based on the magnetic attractive force in the counterclockwise direction and that based on the magnetic attractive force in the clockwise direction are cancelled out each other. In this situation, when the rotor 2 is rotated in the counterclockwise direction, a flux linkage through each field coil is changed, but a total flux linkage through the six field coils is unchanged. Thus, as illustrated in FIG. 21, when the rotor 2 is rotated in the counterclockwise direction during the field current If being supplied to flow the series-connected field coils, the magnetic flux based on each of the teeth A01 and A04 is increased, but the magnetic flux based on each of the teeth A02 and A05 is reduced. This results in that the total magnetic flux is unchanged even if the rotor 2 is rotated in the counterclockwise direction. At that time, magnetic energies created in the respective field coils are transferred and accepted between one another. Therefore, no transfer of power from the DC power source to the field coils is generated in principle.

There is one problem caused when the rotor 2 of the motor 110 illustrated in FIG. 1 is rotatably driven at a high RPM.

For example, during the rotor 2 being rotated in the counterclockwise direction, it is necessary to supply, as soon as possible, a direct current with a preset level to each of the stator coil A0D and A0G and the stator coil A0H and A0E immediately before or after one salient pole A0K1 of the first pair of the rotor 2 starts to face the stator pole A01. Thereafter, a torque is created between the stator pole A01 and the one salient pole A0K1 of the first pair of the rotor 2 and between the stator pole A04 and the other salient pole of the first pair of the rotor 2 so that the rotor 2 is rotated.

Immediately before the one salient pole A0K1 of the first pair of the rotor 2 reaches directly in front of the stator pole A01, the direct current being supplied to each of the stator coils A0D and A0G and the stator coil A0H and A0E is reduced to 0 [A]. That is, the first problem is that, in order to produce a field magnetic flux, an immediate raise in a direct current to be supplied to a pair of stator coils at a preset timing and an immediate drop in the direct current to be supplied thereto at a preset timing are required.

However, with the structure of the motor 110G illustrated in FIG. 19, because a field magnetic flux is established by the series-connected field windings, an increase and decrease of a magnetic flux based on an increase and decrease of a direct current to be supplied to a pair of stator coils is limited. Thus, because a voltage required to supply the direct current to a pair of stator coils is limited, it is possible to easily control the direct current to be supplied to a pair of stator coils.

In addition, because the total voltage variation in the series-connected field coils is limited within a short range, a relatively thin wire can be wound around each of the stator poles in a large number of turns. This can reduce a level of the field current If required to produce a desired field magnetic flux, making it possible to adjust the field current If by the transistor A89 with a relatively small current capacitance. This can reduce the burden of each transistor of the control device CC or CC1 required to produce a magnetic flux, thus reducing the current capacitance of the control device CC or CC1. In other words, the power factor of power to be supplied from the control device CC or CC1 can be improved.

The structure of a motor system consisting of the reluctance motor 110G and the drive circuit DD can improve the power factor of the motor system when the motor system regenerates power or is used as a power generator.

The field coils illustrated in FIG. 19 are wound around the stator poles, respectively, but the present invention is not limited thereto. Specifically, as each of filed coils, a concentrated, full pitch winding is used.

Figure 20:
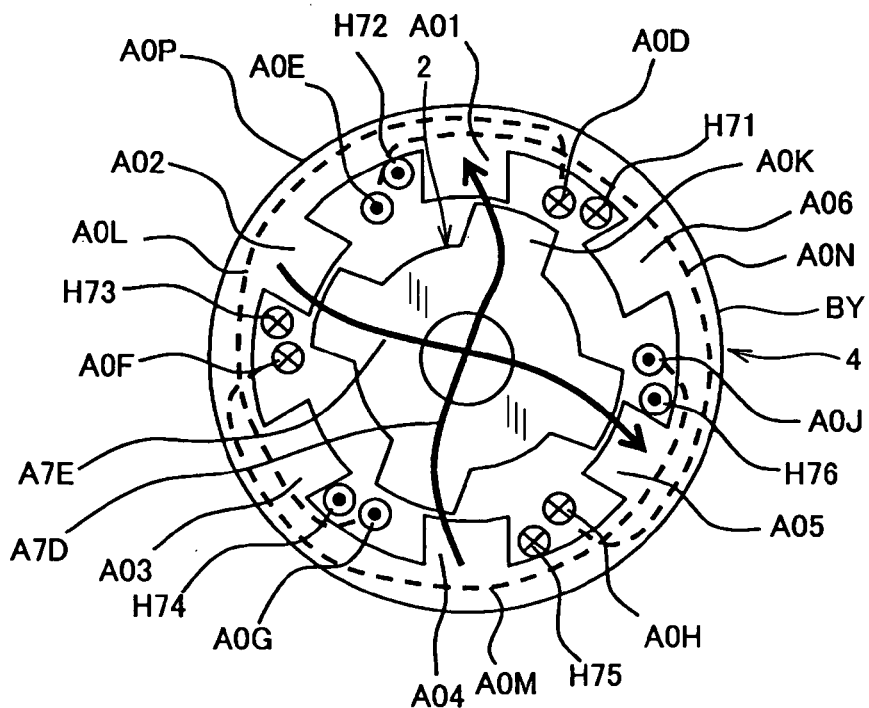
FIG. 20 is a lateral cross sectional view of a reluctance motor according to a modification of the reluctance motor illustrated in FIG. 19.

As illustrated in FIG. 20, an A-phase filed coil H71 and H74 is concentrically wound in a slot A07 between the teeth A06 and A01 and in a slot A0A between the teeth A03 and A04 at a pitch of 180 electrical degrees. Similarly, a B-phase field coil H75 and H72 is concentrically wound in a slot A09 between the teeth A02 and A03 and in a slot A0C between the teeth A05 and A06 at a pitch of 180 electrical degrees. In addition, a C-phase field coil H75 and H72 is concentrically wound in a slot A0B between the teeth A04 and A05 and in a slot A08 between the teeth A01 and A02 at a pitch of 180 electrical degrees.

The field coils H71 and H74, H75 and H72, and H73 and H76 are preferably connected each other by connection wires in series such that a field current If flows in a same direction through each of the field coils. The drive circuit DD illustrated in FIG. 21 can supply the field current IF to the series-connected field coils. Note that, when the field coils H71 and H74, H75 and H72, and H73 and H76 are unconnected to each other, the drive circuit DD can supply the field current If to individually each of the field coils H71 and H74, H75 and H72, and H73 and H76.

Each of the field coils can be formed by toroidal coils, an example of which is illustrated in FIG. 14. When the field coils are applied to a dual motor, an example of which is illustrated in FIG. 15, each of field coils can be alternately wound in a corresponding one slot of the first stator S2 and a corresponding one slot of the second stator S1 radially aligned therewith.

As described above and illustrated in FIG. 4, in order to produce a torque in a given rotational direction, during the motor 110 being rotated in the given rotational direction, when a salient pole of the rotor 2 starts to face one stator pole of the stator core 4, a direct current is supplied to flow through each of two positive and negative stator windings disposed in both slots of the stator core 4; these slots are circumferentially adjacent to the one stator pole. The direction of the direct current to be supplied to one of the two positive and negative stator windings is opposite to that of the direct current to be supplied to the other of the two stator windings.

That is, a positive current and a negative current are alternately supplied to circumferentially aligned positive and negative windings. This results in that a positive magnetic flux and a negative magnetic flux are alternately induced at circumferentially aligned stator poles.

The following features are important in order to achieve the advantages of each of the motors according to the first embodiment and the control device CC or CC1 set forth above:

The first feature is that a unidirectional current is supplied to each stator coil.

The second feature is that the direction of the unidirectional current to be supplied to one of two positive and negative stator windings disposed at both circumferential sides of each stator pole is opposite to that of the unidirectional current to be supplied to the other of the two positive and negative stator windings. This means that the unidirectional current flowing through a positive or negative stator winding contributes to two stator poles disposed circumferentially adjacent to the positive or negative stator winding when each of the two stator poles creates a torque. That is, each positive or negative stator winding serves to excite corresponding two stator poles at its both circumferential sides.

The third feature is that switching the unidirectional current to be supplied to one positive or negative stator winding to another positive or negative stator winding in a preset order depending upon the rotational position θr of the rotor 2 can continuously turn the rotor 2 either forward or reverse, as well as decelerate in either direction. In other words, switching the unidirectional current to be supplied to one positive or negative stator winding to another positive or negative stator winding in a preset order depending upon the rotational position θr of the rotor 2 allows the motor 2 to be driven in four quadrant drive.

The fourth feature is that each salient pole of the rotor 2 is made of a soft magnetic material and is capable of producing magnetic fluxes in both outward and inward directions. This allows, in either direction, a magnetic attractive force to act on the rotor 2.

At that time, in order to serve a positive or negative stator winding to excite two stator poles at its both circumferential sides, it is necessary to connect each of the stator coils to a DC power source so as to individually control a direct current to be supplied to each of the stator coils.

The most simple connection for individually controlling a direct current to be supplied to each of the stator coils is that the stator coils are connected to the DC power source via individual transistors to thereby individually apply a direct voltage or a direct current to each of the stator coils, examples of which are illustrated in FIGS. 2 and 3. As described above, each of the positive or negative stator windings shared to excite two stator poles at its circumferential either side not only reduces a substantial resistance of each stator winding but also share a power transistor to energize both positive and negative stator windings of each stator coil.

The first to fourth features allow a direct current to flow through each of the stator coils for exciting it, and allow the direct current for each positive or negative stator winding to be shared to excite different stator poles, thus sharing a power transistor to drive two stator poles at both circumferential sides of each positive or negative stator winding.

This reduces the total current capacitance of all of the power transistors of the control device CC or CC1, making it possible to reduce the control device CC or CC1.

Specifically, the advantages set forth above make it possible to reduce, in cost, a motor system consisting of:

at least one of the reluctance motors according to the first embodiment and its modifications; and the control device CC or CC1 or an expanded multiphase control circuit based on the control devices CC or CC1. Note that how much the total current capacitance of au of the power transistors of the control device CC or CC1 or an expanded multiphase control circuit of a motor system based on the control device CC or CC1 is reduced depends on which at least one of the reluctance motors according to the first embodiment and its modifications is installed in the motor system.

The motor 110 illustrated in FIG. 18 has features that two stator coils in the three stator coils contribute to generation of a torque, and power is supplied, at one time, to the two stator coils via different paths in the control device CC or CC1.

In contrast, in the three-phase inverter illustrated in FIG. 123 and a three-phase AC motor to be controlled thereby, maximum output power of the inverter is the product of a voltage of the DC battery 84D and a current capacitance of one power transistor, and power is supplied, at one time, to two stator coils via only one path. In other words, although six power transistors are used, only one path can supply power to the stator coils.

Note that, in a motor system consisting of at least one of the reluctance motors according to the first embodiment and its modifications, when the number M of stator poles is relatively high, power can be supplied, via three or more different paths, to corresponding stator coils, which will be described later.

In the first embodiment and its modifications, same-phase stator coils and/or opposite-phase stator coils can be connected to each other in series such that a current flowing through each of the same-phase stator coils and/or opposite-phase stator coils is identical in direction to that flowing through another one of the same-phase stator coils and/or opposite-phase stator coils. This simplifies the structure of a current control means, such as the control device CC or CC1.

For example, in the eight-pole motor illustrated in FIG. 10, because four same-phase (positive A-phase) stator windings pitched by 360 electrical degrees are disposed in respective four slots 121, 127, 121), and 12M, the four positive A-phase stator windings can be connected to each other in series. Similarly, four same-phase (positive B-phase) stator windings pitched by 360 electrical degrees and disposed in respective four slots 123, 129, 12F, and 12P can be connected to each other in series, and four same-phase (positive C-phase) stator windings pitched by 360 electrical degrees and disposed in respective four slots 122, 128, 12E, and 12N can be connected to each other in series.

Similarly, four same-phase (negative one-phase) stator windings disposed in respective four slots can be connected to each other in series. For example, four same-phase (negative A-phase) stator windings disposed in respective four slots 124, 12A, 12J, and 12Q can be connected to each other in series. The series-connected positive one-phase stator windings and the series-connected negative one-phase stator windings can be connected to each other in series such that a direct current flows in a same direction.

As another example, in six-pole motor, three same-phase stator windings for each of the A-, B-, and C-phase can be connected to each other in series. A current control means individually prepared for each of the A-, B-, and C-phase can individually supply a direct current to the three same-phase stator windings for a corresponding one of the A-, B-, and C-phase.

As a further example, in the reluctance motor 110, the first A-phase coil A41 and A42 and the second A-phase coil A47 and A48 in opposite phase to the A-phase coil A41 and A42 can be connected to each other in series by a connection wire such that a direct current flows through the first A-phase coil A41 and A42 and the second A-phase coil A47 and A48 in a same direction.

Note that, when the motor 110 is rotated in the counterclockwise direction (forward direction), in order to make the start pole A01 pull one salient pole A0K of the rotor 2, a direct current is supplied to positively flow through the positive A-phase winding A0L, and simultaneously, a direct current is supplied to negatively flow through the negative C-phase winding A0E.

Next, in order to make the start pole A02 pull one salient pole A0K of the rotor 2, a direct current is supplied to positively flow through the positive B-phase winding A0F, and simultaneously, a direct current is supplied to negatively flow through the negative C-phase winding A0E, but no direct current is supplied to flow through the positive A-phase winding A0D.

Direct currents each with a same level can be supplied to flow through the positive A-phase winding A0D and the negative C-phase winding A0E, respectively. In addition, direct currents with different levels can be supplied to flow through the positive A-phase winding A0D and the negative C-phase winding A0E, respectively. When direct currents are supplied to flow through a positive one-phase winding and a negative another-phase winding, respectively, the direct currents are not identical in phase to each other, and not opposite to phase from each other.

That is, one-phase current, such as A-phase current Ia, to be supplied to a positive one-phase winding, such as the positive A-phase winding A0D, and an another-phase current, such as C-phase current Ic, to be supplied to a negative another-phase winding, such as the negative C-phase winding A0E adjacent to the positive one-phase winding in the rotational direction are different in phase from each other.

specifically, one-phase current to be supplied to a positive one-phase winding and an another-phase current to be supplied to a negative another-phase winding adjacent to the positive one-phase winding in the rotational direction are different in phase from each other. For example, an A-phase current Ia to be supplied to the positive A-phase winding A0D and a C-phase current Ie to be supplied to the negative C-phase winding A0E adjacent to the positive A-phase winding A0D in the rotational direction are different in phase from each other.

In each of the reluctance motors illustrated in FIGS. 1, 9, 14, and 15, the control device CC or CC1 supplies the A-phase current Ia, the B-phase current Ib, and the C-phase current Ic to the respective A-, B-, and C-phase stator coils to thereby rotatably drive the rotor 2. At that time, a direct current can be simultaneously supplied to each stator coil via at least two different current-supply paths by at least two current control means.

For example, when each of the reluctance motors illustrated in FIGS. 1, 9, 14, and 15, the control device CC or CC 1 is driven by the control device CC, CC1, CC2 illustrated in FIG. 98 described later, power can be supplied to each stator coil via two different paths. For this reason, two current control means can supply, to each stator coil, power represented by the product of two, the current capacitance of one power transistor, and the voltage of a DC power source. In comparison to the three-phase AC inverter illustrated in FIG. 123, which can supply power represented by the product of one, the current capacitance of one power transistor, and the voltage of the DC battery 84D, the control device CC, CC1, or CC2 can supply power twice the power that can be supplied from the three-phase AC inverter illustrated in FIG. 123.

The supply of a current to each stator coil via at least two different paths can be established by the first and second features of a reluctance motor according to the first embodiment or one of its modifications.

That is, the first feature is that a unidirectional current is supplied to each stator coil.

The second feature is that the direction of the unidirectional current to be supplied to one of two positive and negative stator windings disposed at both circumferential sides of each stator pole is opposite to that of the unidirectional current to be supplied to the other of the two positive and negative stator windings. This means the unidirectional current flowing through a positive or negative stator winding excites, in two torque generation modes, two stator poles disposed circumferentially adjacent to the positive or negative stator winding when each of the two stator poles creates a torque. That is, each positive or negative stator winding serves to excite corresponding two stator poles at its both circumferential sides.

For example, to the switched reluctance motor illustrated in FIG. 125, a current cannot be supplied simultaneously to each stator coil via two different paths. Thus, a control system equipped with the switched reluctance motor and a control device for driving it cannot reduce the current capacitance of each power transistor of the control circuit. The reluctance motors according to the first embodiment and its modifications is are clearly different from the switched reluctance motor in at least winding method, connection-wire connecting method, stator-coil exciting method, and motor-drive method.

There are significant differences between each of motor systems according to the first embodiment and its modifications and a motor system based on the switched reluctance motor in motor efficiency, motor-size, motor-cost, control-device efficiency, control-device size, and control-device cost.

As described above, the filed coils illustrated in FIG. 19 can be used. As illustrated in FIG. 21, the field coils are connected to each other in series such that the field current If flows in a same direction through each of the field coils. This serves each of reluctance motors according to the first embodiment and its modifications as a power generator with a simple structure.

An example of the power generator is illustrated in FIG. 21. Reference character A9L represents the A-phase coil A0D and A0G, reference character A9M represents the B-phase coil A0F and A0J, and reference character A9N represents the C-phase coil A0H and A0E. Reference characters A9H, A9J, and A9K represent rectifying diodes, the anodes of which are connected to one ends of the A-, B-, and C-phase coils A9L, A9M, and A9N, respectively. That is, the series-connected coil A9L and diode A9H, the series-connected coil A9M and diode A9J, and the series-connected coil A9N and diode A9K are connected in parallel to each other to constitute a parallel circuit.

Reference character A9F represents a rectifying choke coil with an input terminal to which a common terminal connected to the cathodes of the rectifying diodes A9L, A9M, and A9N are connected. Reference characters A9P, A9Q, and A9R represent a storage device, such as a capacitor or battery, a load, and a signal common, respectively. An output terminal of the rectifying coil A9F is connected to one end of the load A9Q via an output terminal A9G of the power generator. The other ends of the A-, B-, and C-phase coils A9L, A9M, and A9N, are connected to the signal common A9R, and the signal common A9R is connected to the other end of the load A9Q. The capacitor A9P is connected in parallel to the parallel circuit and to the load A9Q.

Each of the diodes A9H, A9J, and A9K rectifies either the positive or negative voltage induced across a corresponding one of the three-phase coils A9L, A9M, and A9N to generate a DC voltage. The generated DC voltage is smoothed by the choke coil A9F and the capacitor A9P. A direct current based on the DC voltage smoothed by the choke coil A9F and the capacitor A9P is supplied to the load A9G and to another device.

In place of the rectifying diodes A9H, A9J, and A9K, switching elements, such as IGBTs, can be used. A switching element, such as an IGBT, can be added between the output terminal of the choke coil A9F and the signal common A9R in parallel to the capacitor A9P, and a diode can be added between the choke coil A9F and the capacitor A9P. The choke coil A9F, the added switching element, the added diode, and the capacitor A9P serve as a DC to DC converter for converting the DC voltage generated by the power generator (three-phase coils A9L, A9M, and A9N) into a DC voltage with a level different from a level of the generated DC voltage. Such a DC to DC converter can be provided at a rear stage of the capacitor A9P.

Power generation by the structure of the reluctance motor 1100 illustrated in FIG. 19 be described hereinafter.

During the rotor 2 being rotated in the CCW, when one salient pole A0K of the rotor 2 being directly located in front of the stator pole A01 is further rotated in the CCW so that the opposing areas between the one salient pole A0K and the stator pole A01 are reduced. When the opposing areas between the one salient pole AUK and the stator pole A01 are reduced, a voltage is induced across the A-phase stator coil A0D and A0G and across the C-phase stator coil A0H and A0E so as to prevent the reduction in the magnetic flux from the stator pole A04 to the stator pole A01. The induced voltage across the A-phase stator coil allows a current to flow through the A-phase stator coil A0D and A0G, and the induced voltage across the C-phase stator coil allows a current to flow through the C-phase stator coil A0H and A0E. The power generation for the combination of the stator pole A01, the one rotor pole A0K, and the A- and C-phase stator coils can be similarly established for the combination of another stator pole, the one rotor pole A0K, and a pair of two-phase stator coils.

Because the current generated by the motor 110G flows through each of two-phase stator coils in the three-phase stator coils, it is possible to increase the power-generation efficiency of the motor 110G.

Alternators to be used as power generators for motor vehicles are normally required to output, within a wide rotational speed range from, for example, 1,000 RPM to 10,000 RPM, a voltage within a range from 12 V to 14 V; this voltage corresponding to a voltage of a battery to be installed in the motor vehicles. In addition, in order to meet cost-saving requirements, alternators are required to have a simple structure.

Presently, most of alternators to be used in various vehicles over the world are designed as Lundell type alternators. Specifically, a Lundell type alternator includes a Lundell type (claw pole) rotor provided with a plurality of circumferentially aligned claw poles at regular pitches and a DC field coil. The DC field coil is concentrically wound around an axial direction of the rotor. The rotor is also provided with slip rings and brushes configured to provide electrical connections between the field coil and a power supply (battery).

In the Lundell type alternator described above, a field current is applied to the field coil through the slip rings and the brushes while the field coil of the rotor is rotating based on torque applied directly or indirectly from an internal combustion engine. In this situation, the field current flowing through the field coil magnetizes the claw portions such that they become alternate north and south poles. The rotation of the alternately magnetized north and south poles create magnetic fluxes, and the created magnetic fluxes induce a three-phase AC voltage in a three-phase stator coil. The induced three-phase AC voltage is full-wave rectified by a set of diodes connected in bridge configuration, thereby generating a DC voltage (output voltage) of 12 V.

Such alternators have the following problems:

The first problem is due to the reduction in lifetime and reliability of each of the slip rings and brushes, and the second problem is that the structure of the rotor is complicated. The third problem is that it is difficult to output high power due to the structure of the field coil of the rotor, and the fourth problem is that the rotor may be deformed at a high RPM due to its claw pole structure. The fifth problem is that an air gap between the stator and the rotor may be increased over time.

An example of a functional structure of the controller C100 for controlling the filed current If is disclosed in FIG. 21.

Specifically, the controller CC includes an adder A9A, a compensator A9B, an adder A9C, a compensator A9D, and a driver A9E.

When the output DC voltage generated by the alternator (motor) 110G) and a preset target DC voltage required to be outputted from the alternator are inputted to the adder A9A, the adder A9A is operative to calculate the deviation of the actually outputted DC voltage from the target DC voltage.

The compensator A9B is operative to set, based on the deviation, a first command field current based on a proportional gain term and an integral gain term of a proportional integral feedback algorithm.

In the proportional integral feedback algorithm, the first command field current is expressed based on the proportional gain term and integral gain term.

The proportional gain term for the first command field current contributes to change in the command field current in proportion to the deviation. The integral gain term is proportional to an accumulated offset of instantaneous values of the deviation over time to reset the accumulated offset (steady-state deviation) over time to zero.

When the first command field current generated by the compensator A9B and an actual field current If measured by the current sensor A92 are inputted to the adder A9C, the adder A9C is operative to calculate the deviation of the actual field current If from the first command field current.

The compensator A9D is operative to set, based on the deviation, a second command field current based on a proportional gain term and an integral gain term of a proportional integral feedback algorithm.

In the proportional integral feedback algorithm, the second command field current is expressed based on the proportional gain term and integral gain term.

The proportional gain term for the second command field current contributes to change in the second command field current in proportion to the deviation. The integral gain term is proportional to an accumulated offset of instantaneous values of the deviation over time to reset the accumulated offset (steady-state deviation) over time to zero.

The driver A9E serving as a pulse-width modulator is operative to generate, based on the second command field current set by the compensator A9D, a PWM signal, that is, a train of pulses, with a variable duty cycle to thereby turn on and off the transistor A89 based on the duty cycle. The turning on and off of the transistor A89 based on the duty cycle of the PWM signal can stably and smoothly adjust the field current If flowing through the series-connected field coils to the second command field current.

With the functional structure of the controller C 100, it is possible to control the field current If while monitoring the output power actually generated by the alternator (motor) 110G to thereby allow the alternator to stably generate a substantially constant voltage within a wide rotational speed range from, for example, 1,000 RPM to 10,000 RPM.

Because an alternator system illustrated in FIG. 21 is designed to use only one an active power element (power transistor) A89 without using brushes and slip rings for field current, it is possible to implement the alternator system illustrated in FIG. 21 at low cost. In addition, because the alternator system illustrated in FIG. 21 includes no brushes and slip rings, it is possible to improve the reliability of the alternator system. Various modifications or deformations can be applied to each part of the alternator system illustrated in FIG. 21.

As described above, the motor 110G illustrated in FIG. 19 can be expanded as multi-pole motors, such as eight-pole motors (see, for example, FIG. 10). Alternators based on the multi-pole motors can also be provided. In each of the alternators based on the motor 110O or any one of the multi-pole motors, the stator coils and the field coils can be provided in the stator core 4. This simplifies the structure of each of the alternators with high reliability. The reason why the field coils can be provided in the stator core 4 and they can be excited by a direct current is that each of the motors according to the first embodiment and its modifications is driven by a unidirectional current and a magnetic flux passing through each of the stator poles is a unidirectional magnetic flux. These features are specific features of each of the motors according to the first embodiment and its modifications.

In contrast, in conventional three-phase alternators, in order to create a magnetic field by the stator, three-phase AC currents are required; this may cause the structures of the conventional three-phase alternators to become complicated and increase their costs.

Because the stator coils and the field coils are provided in the stator core 4, the output power and the size of an alternator system based on the motor 110G can be easily increased. In addition, because the rotor 2 is made up of, for example, a plurality of magnetic silicon steel sheets, the rotor 2 is rugged. This makes it possible to use higher RPM of the rotor 2 without deforming the rotor 2, and to reduce the air gap between the stator core 4 and the rotor 2 up to a limit defined by their assembly accuracies, thus making the motor 110G speed up and have improved efficiency.

As descried above, the alternator (motor 110O) according to the sixth modification of the first embodiment can solve the aforementioned almost problems caused by the conventional Lundell type alternators.

Note that each of the motor systems according to the first embodiment and its modifications is driven in the regeneration mode to thereby generate power even if no field coils are provided in the stator core 4 illustrated in FIG. 19. That is, the operations of each of the motor systems according to the first embodiment and its modifications in the regeneration mode have been described with reference to FIGS. 7 and 8. The operations of each of the motor systems according to the first embodiment and its modifications in the regeneration mode can regenerate energy from the motor portion (stator core 4 and rotor 2) to the DC power source.

Next, a seventh modification of the reluctance motor 110 according to the first embodiment will be described hereinafter.

Figure 22:
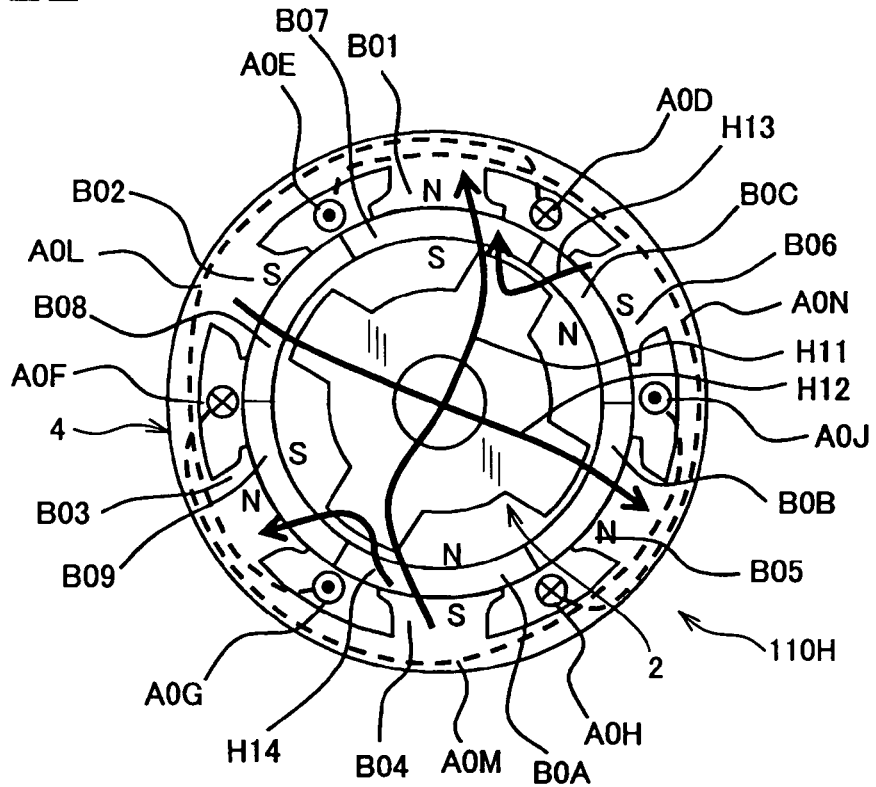
FIG. 22 is a lateral cross sectional view of a reluctance motor according to the seventh modification of the reluctance motor according to the first embodiment.

FIG. 22 schematically illustrates an example of the structure of a reluctance motor 110H according to the seventh modification of the first embodiment.

In addition to the structure of the motor 110 illustrated in FIG. 1B as a basic structure, the reluctance motor 110H according to the seventh modification includes a plurality of permanent magnets B07, 130B, B09, B0A, B0B, and B0C. The plurality of permanent magnets B07, B08, B09, B0A, B0B, and B0C are mounted on the inner surfaces of stator poles B01, B02, B03, B04, B05, and B06 corresponding to the stator poles A01, A02, A03, A04, A05, and A06, respectively. Each of the plurality of permanent magnets B07, B08, B09, B0A, B0B, and B0C has a concavely circumferentially rounded shape with a curvature identical to that of the inner surface of each of the stator poles B01, B02, B03, B04, B05, and B06. The plurality of permanent magnets B07, B08, B09, B0A, B0B, and B0C are circumferentially contacted to one another to form a substantially ring shape.

The rotor 2 is arranged such that its outer circumference is opposite to an inner circumference of the ring-shaped permanent magnets B07, B08, B09, B0A, B0B, and B0C with an air gap therebetween.

As well as the first embodiment, the control device CC or CC1 is operative to supply an A-phase direct current Ia to the A-phase coil A0D and A0G in the direction indicated by the circled cross and circled dot, and a B-phase direct current Ib to the B-phase coil A0F and A0J in the direction indicated by the circled cross and circled dot. In addition, the control device CC or CC1 is operative to supply a C-phase direct current Ic to the C-phase coil. A0H and A0E in the direction indicated by the circled cross and circled dot.

A direction of a magnetic flux to be created by each of the permanent magnets B07, B08, B09, B0A, B0B, and B0C is illustrated by reference characters "N" and "S" in FIG. 22. Specifically, the direction of a magnetic flux to be created by each of the permanent magnets B07, B08, B09, B0A, B0B, and B0C is matched with a direction of a magnetic flux to be created by a corresponding one stator pole when two stator windings disposed at its both circumferential sides are energized.

That is, the motor 110H is designed such that:

each of the stator poles is excited by a unidirectional current flowing each of two phase stator windings located at its both circumferential sides of a corresponding one of the stator poles to thereby create a unidirectional magnetic flux by each of the excited stator poles.

The design of the motor 110H allows the permanent magnets B07, B08, B09, B0A, B0B, and B0C to be mounted on the stator poles B01, B02, B03, B04, B05, and B06, respectively.

Magnetic fluxes in the motor 110H are not simplified because there are plurality of magnetic paths therein, and the magnetomotive force by each permanent magnet and that by each unidirectional current act on the rotor 2.

As illustrated in FIG. 22, during the rotor 2 being rotated in the counterclockwise direction, when one salient pole of the rotor 2 faces both the permanent magnets 307 and 130C, four magnetic fluxes H11, H12, H13, and H14 are induced. Specifically, the magnetic flux H11 is induced based on the permanent magnets B0A and B07 from the stator pole B04 to the stator pole B01, and the magnetic flux H12 is induced based on the permanent magnets B08 and B05 from the stator pole B02 to the stator pole B05. In addition, the magnetic flux H18 is induced based on the permanent magnets B0C and B07 from the permanent magnet B0C to the permanent magnet B07, and the magnetic flux H14 is induced based on the permanent magnets B0A and B09 from the permanent magnet B0A to the permanent magnet B09.

These magnetic fluxes H11, H12, H13, and H14 are changed depending on the rotation of the rotor 2.

As represented by the equation (10) and the like, a torque of the motor 110H is proportional to the flux-linkage change rate $d\phi/d\theta r$ through one-phase stator coil with change in the rotational position of the rotor 2 and a current to be supplied to the one-phase stator coil.

Let us consider to create a torque in the CCW when the rotor 2 is located at a rotational position illustrated in FIG. 22.

At the rotational position of the rotor 2 illustrated in FIG. 22, the flux-linkage change rate $d\phi/d\theta r$ through the C-phase coil A0H and A0E with change in the rotational position of the rotor 2 becomes a higher value because the magnetic flux H11 is increased with rotation of the rotor 2.

For this reason, the supply of a C-phase current Ic to the C-phase coil A0H and A0E allows a torque in the CCW to be generated. Note that, because the magnetic flux H12 is unchanged before and after the rotational position of the rotor 2 illustrated in FIG. 22, the magnetic flux H12 does not contribute to the generation of the torque in the CCW.

At the time of the rotational position of the rotor 2 illustrated in FIG. 22, it is assumed that a flux density in a portion at which each of the permanent magnets faces a corresponding one salient pole of the rotor 2 becomes a constant flux density Bx. In addition, it is assumed that a magnetic flux in a portion at which each of the permanent magnets does not face a corresponding one salient pole of the rotor 2 becomes zero or has no effect on the operations of the motor 110H.

In this assumption, a flux linkage through the A-phase coil A0D and A0G is unchanged before and after the rotational position of the rotor 2 illustrated in FIG. 22. This is because, although the magnetic flux H11 is increased with rotation of the rotor 2, each of the magnetic flux H13 and H14 is reduced with rotation of the rotor 2 so that the increase in the magnetic flux is cancelled out by the reduction in each of the magnetic fluxes H13 and H14.

This results in that the A-phase current Ia flowing through the A-phase coil A0D and A0G does not contribute to the generation of torque; this action is not different from the action by the A-phase current Ia in the motor 110.

However, an actual magnetic circuit is formed in the motor 110H in a state different from the assumed state set forth above. For this reason, proper design of a magnetic circuit formed in the motor 110H allows a motor system based on the motor 110H to achieve efficient characteristics; these efficient characteristics demonstrate a higher toque of the motor 110H to thereby reduce the current capacitance of each of the power transistors of the control device CC or CC1.

Figure 26:
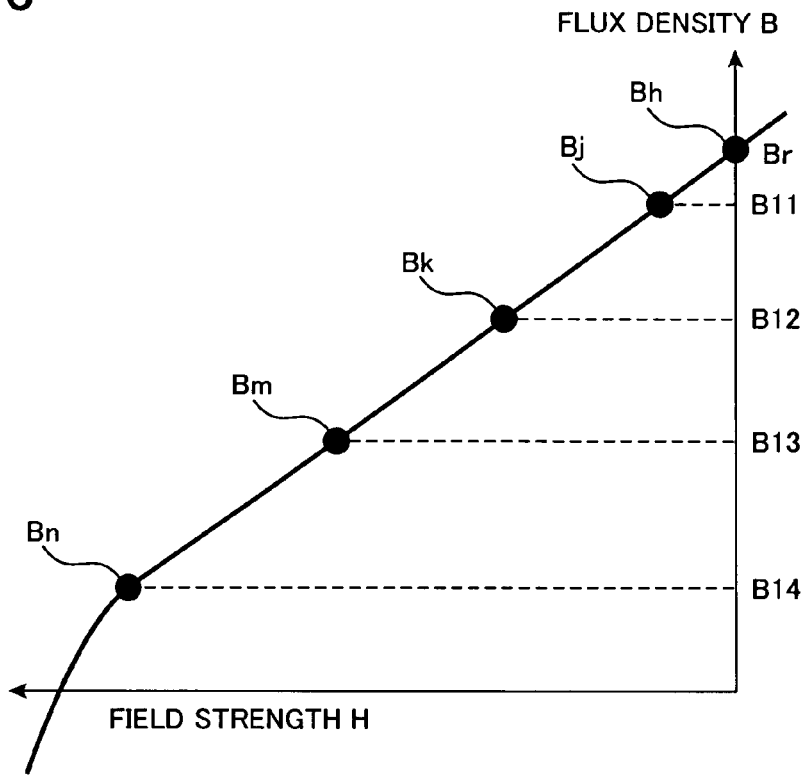
FIG. 26 is a view schematically illustrating a characteristic curve indicative of an example of the relationship between magnetic field strength of a permanent magnet to be used in the motor illustrated in FIG. 22

FIG. 26 illustrates a characteristic curve indicative of an example of the relationship between magnetic field strength H of a permanent magnet to be used in the motor 110H and flux density H in graph format.

A magnetic flux density Br at an operating point Bh on the characteristic curve represents a remanent flux density, and a magnetic flux density 814 at an operating point Bn on the characteristic curve represents a demagnetization limit of the permanent magnet.

For example, in the seventh modification, the motor 110H is designed such that a flux density at an operating point Bk on the characteristic curve when a current for each stator coil is zero is set to a value B12 illustrated in FIG. 26. The motor 110H is also designed such that the operating point Bn on the characteristic curve is changeable within a range between an operating point Bin with a flux density B13 and an operating point Bj with a flux density B11. The flux density B13 is set to be higher than the demagnetization limit B14 and lower than the flux density B12, and the flux density B11 is set to be higher than the flux density B12 and lower than the remanent flux density Br.

The design set forth above can change the flux density of each of the permanent magnets within the range between the flux density Bm and the flux density Bj. For this reason, magnetic actions in the motor 110H to create a torque are different from those described above.

Specifically, in order to crate a torque in the CCW at the rotational position of the rotor 2 illustrated in FIG. 22, an A-phase current Ia with a preset level is supplied to flow through the A-phase coil A0D and A0G. At the same time, a C-phase current Ic with the same preset level is supplied to flow through the C-phase coil A0H and A0E. This causes magnetomotive force to act on each of the permanent magnets 307 and B0A in a direction in which a magnetic flux based on each of the permanent magnets B07 and B0A is increased. This increases the flux density B12 of each of the permanent magnets B07 and B0A at the operating point Bk on its characteristic curve up to the flux density B11 thereof at the operating point Bj on its characteristic curve.

In contrast, the operating point Bk of each of the remaining permanent magnets B08, B09, B0B, and B0C on its characteristic curve is kept unchanged because no magnetomotive force acts on each of the remaining permanent magnets B08, B09, B0B, and B0C.

At that time, the flux-linkage change rate $d\phi/d\theta r$ of the magnetic flux H11 with change in the rotational position of the rotor 2 is increased in proportional to the increased flux density B11 of the operating point Bj. This increases a torque created by the C-phase current Ic supplied to flow through the C-phase coil A0H and A0E, and generates a torque by an A-phase current Ia supplied to flow through the A-phase coil A0D and A0G; this torque is in proportional to the deviation of the flux density B11 from the flux density B12.

In addition, when the C-phase current Ic is higher than the A-phase current Ia, magnetomotive force is generated in proportional to the deviation (Ic-Ia) of the C-phase current Ic from the A-phase current Ia, thus attenuating a flux density based on the permanent magnets B09 and B0C. This reduces the flux density B12 of each of the permanent magnets B09 and B0O at the operating point Bk on its characteristic curve up to the flux density B13 thereof at the operating point Bin on its characteristic curve. This causes a torque based on the A-phase current Ia to increase by the reduction in flux-density of each of the permanent magnets B09 and B0C.

At that time, a torque Tc created by the C-phase current Ic flowing through the C-phase coil A0H and A0E is in proportional to the sum (B11+B12) of the flux density B11 and the flux density B13 in the characteristic curve. In addition, a torque Ta created by the A-phase current Ia flowing through the A-phase coil A0D and A0G is in proportional to the deviation (B11−B13) of the flux density B13 of each of the permanent magnets B09 and B0C from the flux density B11 of each of the permanent magnets B0A and B07.

Specifically, the motor 110H illustrated in FIG. 22 achieves the first feature that allows the control device CC or CC1 to drive the motor 110H to thereby reduce the current capacitance of each power transistor of the control device CC or CC1. The motor 110H achieves the second feature that adding the permanent magnets B07 to B0O increases and enhances the current-torque characteristic curve Trm obtained by the motor 110 illustrated in FIG. 1B up to the current-torque characteristic curve Tspm (see FIG. 5). Particularly, when the motor 110H is designed as a tiny motor, it is possible to remarkably improve torque in a low current range (see FIG. 5).

In addition, each of the A-phase current Ia, the B-phase current Ib, and the C-phase current Ic corresponds to so-called torque current, and the permanent magnets B07 to B0C allows the number of turns of each of three-phase stator coils to be reduced. This reduces the inductance of each of the three-phase stator coils, thus improving the responsivity of each phase current and the controllability of the motor 110G.

In the structure of the motor 110H, a negative B-phase current (−Ib) can be supplied to negatively flow through the positive B-phase winding A0F out of the paper of FIG. 22 (in the reverse direction of the circled cross) and to positively flow the negative B-phase winding A0J into the paper of FIG. 22 (in the reverse direction of the circled dot). This can increase the magnetic flux H11 to thereby increase a torque. The motor 110H illustrated in FIG. 22 can be driven by the conventional three-phase AC inverter illustrated in FIG. 123 on the condition that the three-phase coils are connected to each other in star configuration.

Next, an eighth modification of the reluctance motor 110 according to the first embodiment will be described hereinafter.

Figure 23:
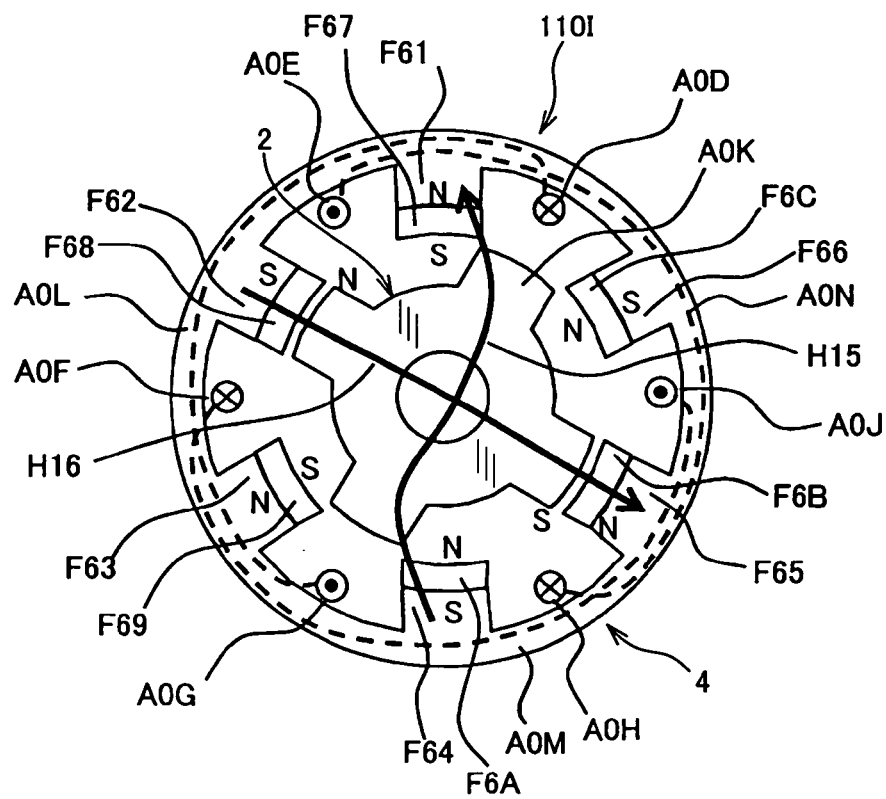
FIG. 23 is a lateral cross sectional view of a reluctance motor according to the eighth modification of the reluctance motor according to the first embodiment.

FIG. 23 schematically illustrates an example of the structure of a reluctance motor 110I according to the eighth modification of the first embodiment.

In addition to the structure of the motor 110 illustrated in FIG. 1B as a basic structure, the reluctance motor 110I according to the eighth modification includes a plurality of permanent magnets F67, F68, F69, F6A, F6B, and F6C. The plurality of permanent magnets F67, F68, F69, F6A, F6B, and F6C are mounted on the inner surfaces of stator poles F61, F62, F63, F64, F65, and F66 corresponding to the stator poles A01, A02, A03, A04, A05, and A06, respectively. Each of the plurality of permanent magnets P67, F68, F69, F6A, F6B, and F6C has a concavely circumferentially rounded shape with a curvature identical to that of the inner surface of each of the stator poles F61, F62, F63, F64, F65, and F66.

The rotor 2 is arranged such that its outer circumference is opposite to an inner circumference of the stator core 4 with an air gap therebetween.

The influence of a unidirectional current to be supplied to each of the three-phase coils on the characteristic curve of each of the permanent magnets F61 to F6A is substantially identical to that as with the reluctance motor 110H illustrated in FIG. 22.

A direction of a magnetic flux to be created by each of the permanent magnets F67, F68, F69, F6A, F6B, and F6C is illustrated by reference characters "N" and "S" in FIG. 23. Specifically, the direction of a magnetic flux to be created by each of the permanent magnets F67, F68, F69, F6A, F6B, and F6C is matched with a direction of a magnetic flux to be created by a corresponding one stator pole when two stator windings disposed at its both circumferential sides are energized.

As illustrated in FIG. 23, during the rotor 2 being rotated in the counterclockwise direction, when one salient pole of the rotor 2 faces a space between the permanent magnets F67 and F6C, two magnetic fluxes H15 and H16 are induced. Specifically, the magnetic flux H15 is induced based on the permanent magnets F6A and F67 from the stator pole F64 to the stator pole F61, and the magnetic flux H16 is induced based on the permanent magnets F68 and F6B from the stator pole F62 to the stator pole F65. These magnetic fluxes H15 and H16 are changed depending on the rotation of the rotor 2.

In order to crate a torque in the CCW at the rotational position of the rotor 2 illustrated in FIG. 23, an A-phase current Ia with a preset level is supplied to flow through the A-phase coil A0D and A0C. At the same time, a C-phase current Ic with the same preset level is supplied to flow through the C-phase coil A0H and A0E. This causes magnetomotive force to increase the magnetic flux H15 while keeping the magnetic flux H16 unchanged.

As described above, torque is in proportional to the flux-linkage change rate $d\phi/d\theta r$ through a stator winding with change in the rotational position of the rotor 2.

At the rotational position of the rotor 2 illustrated in FIG. 23, a flux linkage based on the magnetic flux H15 through the A-phase coil A0D and A0G is positive, and a flux linkage based on the magnetic flux H16 through the A-phase coil A0D and A0G is negative. In other words, the flux linkage based on the magnetic flux H15 through the A-phase coil A0D and A0G is opposite in direction to the flux linkage based on the magnetic flux H16 through the A-phase coil A0D and A0G.

When the rotor 2 is rotated in the CCW at the rotational position of the rotor 2 illustrated in FIG. 23, the positive flux linkage based on the magnetic flux H15 through the A-phase coil A0D and A0G is increased because one salient pole A0K of the rotor 2 approaches the stator pole F61. This represents that the flux-linkage change rate $d\phi/d\theta r$ through the A-phase coil A0D and A0G based on the magnetic flux H15 with change in the rotational position of the rotor 2 is increased.

In contrast, when the rotor 2 is rotated in the CCW at the rotational position of the rotor 2 illustrated in FIG. 23, the negative flux linkage based on the magnetic flux H16 through the A-phase coil A0D and A0G is reduced because one salient pole A0K of the rotor 2 comes away from the stator pole F62. This represents that the flux-linkage change rate $d\phi/d\theta r$ through the A-phase coil A0D and A0G based on the magnetic flux H16 with change in the rotational position of the rotor 2 is also increased.

Thus, a torque Ta created by the A-phase current Ia flowing through the A-phase coil A0D and A0G is in proportional to the sum of the flux density B11 of each of the permanent magnets F6A and F67 and the flux density B13 of each of the permanent magnets F68 and F6B.

In addition, at the rotational position of the rotor 2 illustrated in FIG. 23, a flux linkage based on the magnetic flux H15 through the C-phase coil A0H and A0E is positive, and a flux linkage based on the magnetic flux H16 through the C-phase coil A0H and A0E is positive. In other words, the flux linkage based on the magnetic flux H15 through the C-phase coil A0H and A0E is identical in direction to the flux linkage based on the magnetic flux H16 through the C-phase coil A0H and A0E.

When the rotor 2 is rotated in the CCW at the rotational position of the rotor 2 illustrated in FIG. 23, the positive flux linkage based on the magnetic flux H15 through the C-phase coil A0H and A0E is increased because one salient pole A0K of the rotor 2 approaches the stator pole F61. This represents that the flux-linkage change rate $d\phi/d\theta r$ through the C-phase coil A0H and A0E based on the magnetic flux H15 with change in the rotational position of the rotor 2 is increased.

In contrast, when the rotor 2 is rotated in the CCW at the rotational position of the rotor 2 illustrated in FIG. 23, the positive flux linkage based on the magnetic flux H16 through the C-phase coil A0H and AGE is reduced because one salient pole A0K of the rotor 2 comes away from the stator pole F62. This represents that the flux-linkage change rate $d\phi/d\theta r$ through the C-phase coil A0H and AGE based on the magnetic flux H16 with change in the rotational position of the rotor 2 is reduced.

Thus, a torque Tc created by the C-phase current Ic flowing through the C-phase coil A0H and A0E is in proportional to the deviation (B11–B13) of the flux density B13 from the flux density B11 in the characteristic curve.

As described above, the ratio between the torque Ta based on the A-phase current Ia and the torque Tc based on the C-phase current Ic in the reluctance motor 110H illustrated in FIG. 22 is opposite to that between the torque Ta based on the A-phase current Ia and the torque Tc based on the C-phase current Ic in the reluctance motor 110I illustrated in FIG. 23.

In order to utilize the feature, a dual motor can be designed such that the motor 110H and the motor 110I are coaxially arranged. This can improve the balance between the A-phase current Ia and the C-phase current Ic. In the dual motor, a same stator winding can be wound in the axial direction of the rotors to form each phase stator coil of each of the motors 110H and 110I. The improvement of the balance between the A-phase current Ia and the C-phase current Ic can reduce the current capacitance of each power transistor of the control device CC or CC1.

In the structure of the motor 110I, a negative B-phase current (−Ib) can be supplied to negatively flow through the positive B-phase winding A0F out of the paper of FIG. 23 (in the reverse direction of the circled cross) and to positively flow the negative B-phase winding A0J into the paper of FIG. 23 (in the reverse direction of the circled dot). This can increase the magnetic flux H11 to thereby increase a torque. The motor 110H illustrated in FIG. 23 can be driven by the conventional three-phase AC inverter illustrated in FIG. 123 on the condition that the three-phase coils are connected to each other in stir configuration.

In addition, in the reluctance motors 110H and 110I illustrated in FIGS. 22 and 23, change of the configuration of each of the permanent magnets mounted on the inner circumferences of the stator poles can achieve various current-torque characteristic curves within the range from the curve Trm and the curve Tspm illustrated in FIG. 5.

Specifically, a magnetic member composed of a permanent magnet and a soft magnetic material can be mounted on the inner surface of each stator pole of the stator. The ratio of the permanent magnet to the soft magnetic material is referred to as "Rspm". That is, when the ratio Rspm is set to 1 (100%), a magnetic member composed of only a permanent magnet is mounted on the inner surface of each stator pole of the stator. When the ratio Rspm is set to 0.5 (50%), a magnetic member composed of a permanent magnet and a soft magnetic material is mounted on the inner surface of each stator pole of the stator. When the ratio Rspm is set to 0 (0%), no magnetic member is mounted on the inner surface of each stator pole of the stator (see FIG. 1B).

Change of the ratio Rspm from 0 (0%) to 1 (100%) can achieve various current-torque characteristic curves within the range from the curve TIM and the curve Tspm illustrated in FIG. 5.

Next, a ninth modification of the reluctance motor 110 according to the first embodiment will be described hereinafter.

Figure 24:
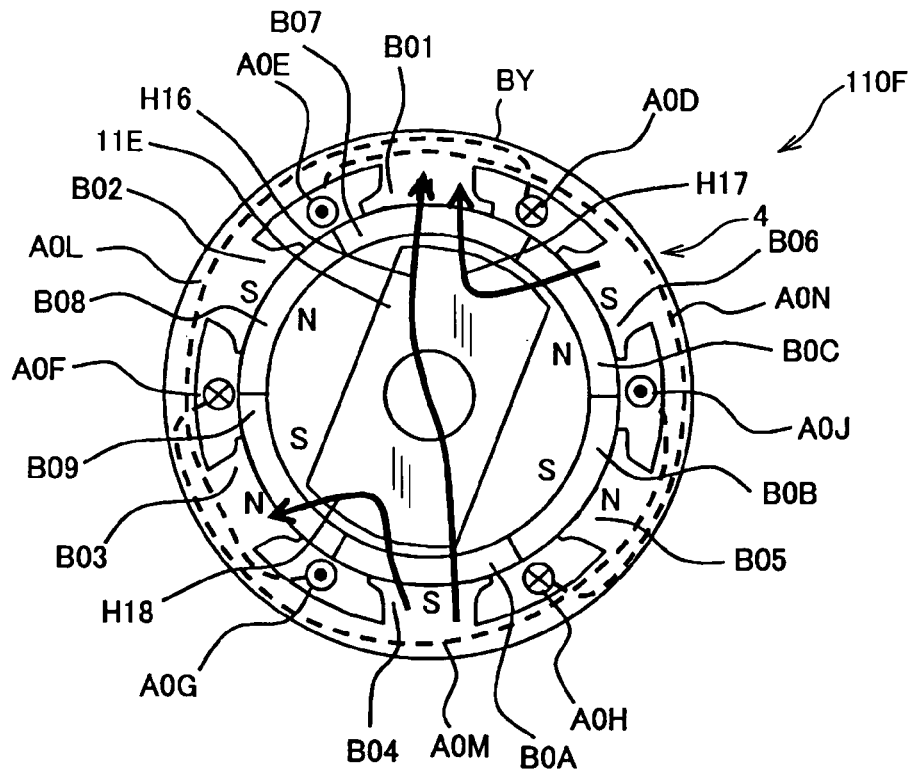
FIG. 24 is a lateral cross sectional view of a reluctance motor according to the ninth modification of the reluctance motor according to the first embodiment.

FIG. 24 schematically illustrates an example of the structure of a reluctance motor 110J according to the ninth modification of the first embodiment.

A different point between the reluctance motor 110J and the reluctance motor 110H is that the two salient pole rotor 11E illustrated in FIG. 9 is used in place of the four salient pole rotor 2 illustrated in FIG. 22. The circumferential electrical angular width Hm of each of the salient poles of the rotor 11E is set to 50 electrical degrees.

As illustrated in FIG. 24, during the rotor 11E being rotated in the counterclockwise direction, when one salient pole of the rotor 11E faces both the permanent magnets B07 and B0C, three magnetic fluxes H16, H17, and H18 are induced. Specifically, the magnetic flux H16 is induced based on the permanent magnets B0A and 307 from the stator pole B04 to the stator pole B01, and the magnetic flux H16 is induced based on the permanent magnets B0C and B07 from the permanent magnet B0C to the permanent magnet B07. In addition, the magnetic flux H17 is induced based on the permanent magnets B0A and B09 from the permanent magnet B0A to the permanent magnet B09.

These magnetic fluxes H15, H15, and H17 are changed depending on the rotation of the rotor 11E.

In order to crate a torque in the CCW at the rotational position of the rotor 11E illustrated in FIG. 24, an A-phase current Ia is supplied to flow through the A-phase coil A0D and A0G. At the same time, a C-phase current Ic is supplied to flow through the C-phase coil A0H and A0E.

This causes magnetomotive force to increase the magnetic flux H15 to thereby create a magnetic attractive force. The magnetic attractive force pulls each of the salient poles of the rotor 11E toward a corresponding one of the stator poles B01 and B04 to thereby create a torque in the CCW.

Thereafter, when the rotor 11E is rotated in the CCW direction so that the one salient pole of the rotor 11E is located directly in front of the permanent magnet B07, a B-phase current Ib is supplied to flow through the B-phase coil A0F and A0J. At the same time, the C-phase current Ic is supplied to flow through the C-phase coil A0H and A0E.

This causes magnetomotive force to increase a magnetic flux (not shown) based on the permanent magnets B08 and B0B from the permanent magnet B08 to the permanent magnet B0B to thereby create a magnetic attractive force. The magnetic attractive force pulls each of the salient poles of the rotor 11E toward a corresponding one of the stator poles B05 and B02 to thereby create a torque in the CCW.

That is, as well as the first modification illustrated in FIGS. 9 to 12, switching the A-, B-, and C-phase currents Ia, Ib, and Ic from one another depending upon the rotational position θr of the rotor 11E under control of the control device CC or CC1 achieves a continuous torque to continuously rotate the rotor 11E. While the rotor 11E is rotated at 360 degrees, the direction of the magnetic flux is reversed at six times. Because a same salient pole of the rotor 11E is sequentially polled by six stator poles of the stator 4 in a same direction so that the rotor 11E is turned in the same direction, the motor 110J is driven in the same manner as synchronous motors.

Selectively supplying one-phase direct current to any one phase of the three-phase stator coils allows a rotational torque to be sequentially created in a preset direction. Selectively supplying two-phase direct currents to corresponding any two-phase stator coils in the three-phase stator coils also allows a rotational torque to be sequentially created in a preset direction.

In the structure of the motor 110J, a negative B-phase current (−Ib) can be supplied to negatively flow through the positive B-phase winding A0F out of the paper of FIG. 24 (in the reverse direction of the circled cross) and to positively flow the negative B-phase winding A0J into the paper of FIG. 24 (in the reverse direction of the circled dot). This allows the negative B-phase current to contribute the generation of a torque.

The motor 110J illustrated in FIG. 24 achieves the first feature that allows the control device CC or CC1 to drive the motor 110J to thereby reduce the current capacitance of each power transistor of the control device CC or CC1. The motor 110J achieves the second feature that adding the permanent magnets B07 to B0C increases and enhances the current-torque characteristic curve Trm obtained by the motor 110 illustrated in FIG. 1B up to the current-torque characteristic curve Tspm (see FIG. 5). Particularly, when the motor 110J is designed as a tiny motor, it is possible to remarkably improve torque in a low current range (see FIG. 5).

Figure 25:
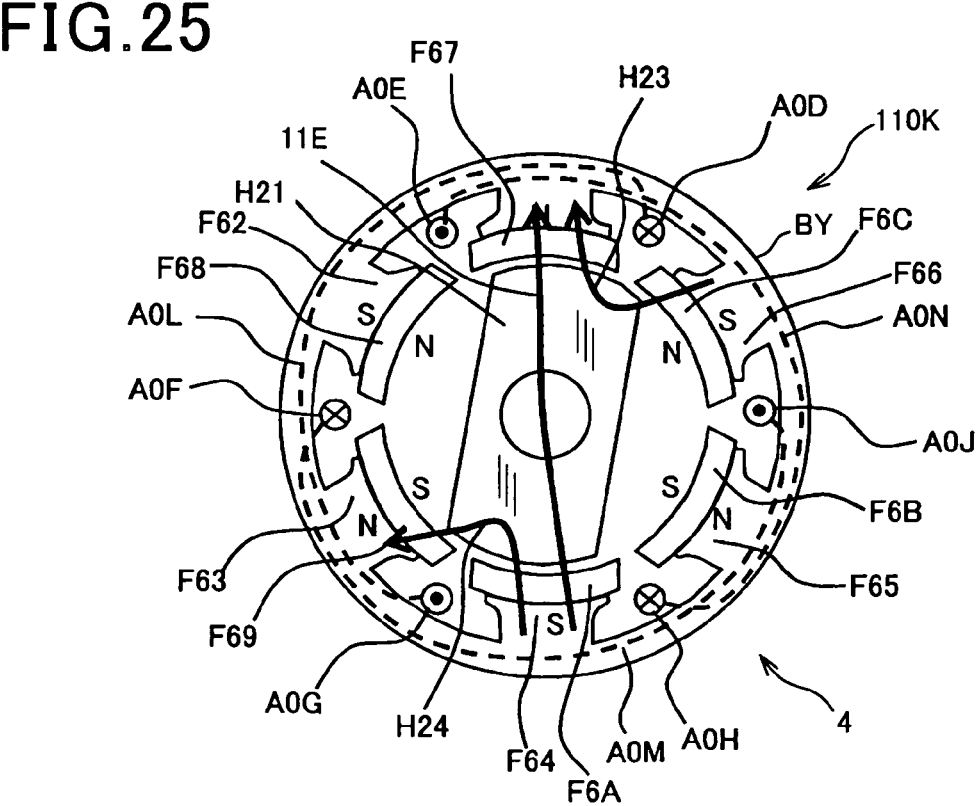
FIG. 25 is a lateral cross sectional view of a reluctance motor according to a modification of the reluctance motor illustrated in FIG. 24.

As a modification of the reluctance motor 110J, a reluctance motor 110K is illustrated in FIG. 25.

The reluctance motor 110K includes a plurality of permanent magnets F67, F68, F69, F6A, F6B, and F6C corresponding to the plurality of permanent magnets B07, B08, B09, B0A, B0B, and B0C, respectively. Each of the permanent magnets F67, F68, F69, F6A, F6B, and F6C has a concavely circumferentially rounded shape with a curvature identical to that of the inner surface of each of stator poles F61, P62, F63, F64, F65, and F66 corresponding to the stator poles B01, B02, B03, B04, B05, and B06.

The plurality of permanent magnets F67, F68, F69, F6A, F6B, and F6C are mounted on the inner surfaces of stator poles F61, F62, F63, F64, F65, and F66, respectively such that they are circumferentially separated at regular intervals.

Other elements of the reluctance motor 110K are identical to those of the reluctance motor 110J, and therefore, they are omitted in description. In addition, electromagnetic actions of the motor 110K are also identical to those of the motor 110J, and therefore, they are omitted in description.

In each of the reluctance motors 110H, 110I, 110K, and 110J, the shape of each of the stator poles and/or each of the salient rotor poles can be deformed to one of various shapes.

As well as the reluctance motors 110H and 110I, in the reluctance motors 110J and 110K illustrated in FIGS. 24 and 25, change of the configuration of each of the permanent magnets mounted on the inner circumferences of the stator poles can achieve various current-torque characteristic curves within the range from the curve Tan and the curve Tspm illustrated in FIG. 5.

In each of the reluctance motors 110H, 110I, 110K, and 110J, each of the permanent magnets set forth above can be embedded in a corresponding one of the stator poles, which will be described later.

As described above, various modifications can be applied to the reluctance motors 110H, 110I, 110K, and 110J. Specifically, the shape of each stator pole, each permanent magnet, and/or each rotor pole can be freely designed in terms of torque, cogging torque, and/or torque ripples.

In view of torque, the circumferential width of the inner surface of each stator pole, that of the inner surface of each permanent magnet, and/or that of the outer surface of each rotor pole can be changed to significantly change the magnetic characteristics of each of the motors 110H, 110I, 110K, and 110J.

For example, the circumferential width of the inner surface of each permanent magnet can be narrowed to 30 electrical degrees like the motor 110. In order to reduce cogging torque at each of the boundaries between adjacent permanent magnets, each of the boundaries can have a concavely smoothly rounded shape. In order to reduce torque ripples, both circumferential ends of the inner-side end of each of the permanent magnet can be smoothly rounded in the form of barrel. Each of the stator and rotor can be skewed. The outer surface of each of the salient rotor poles can be convexly smoothly rounded in the form of barrel. Each of the stator poles, each of the permanent magnets, and/or each of the salient rotor poles can be deformed in at least one of the radial direction, the circumferential direction, and the axial direction of the rotor.

In order to prevent damage of each of the permanent magnets, a material with a low magnetic permeability, such as a resin, can be coated on the inner surface of the stator core. Each of the stator coils of each of the reluctance motors 110H, 110I, 110K, and 110J can be wound using the winding method illustrated in FIG. 14 or that illustrated in FIG. 15.

The reluctance motors 110H, 110I, 110K, and 110J can be deformed as multi-pole reluctance motors. As described later, various MSKR motors can be achieved. Various magnetic characteristics are required for motors depending on depending on their applications. When different magnetic characteristics are required for a reluctance motor according to the first embodiment depending on its rotational speed, the reluctance motor can be designed such that the number of salient rotor poles is changeable depending on its rotational speed by another power or an electrical actuator in cooperation with a mechanical member.

In each of the motors 110H, 110I, 110K, and 110J, demagnetization of each permanent magnet acts in a direction to increase magnetic fluxes. Because the rotor is rugged, it is possible to lower an air gap between the stator and the rotor, thus allowing each of the permanent magnet with a thin thickness to be used. This can reduce each of the motors 110H, 110I, 110K, and 110J in cost. In order to prevent demagnetization of each permanent magnet due to improper control of a motor, each permanent magnet can be designed such that it can be magnetized by a corresponding one phase winding. Under proper control of a motor, each of the permanent magnets is not demagnetized.

In each of the motors 110H, 110I, 110K, and 110J, during the rotor being rotated, change of the magnitude of each of the permanent magnets allows field-weakening control and constant-output control to be carved out. That is, each of the permanent magnets that can be designed such that it is easily demagnetized or further magnetized. In this case, in addition to NdFeB magnets each with a very high magnetic field strength. H, alnico magnets can be used for each of the permanent magnets.

Next, a tenth modification of the reluctance motor 110 according to the first embodiment will be described hereinafter.

Figure 27:
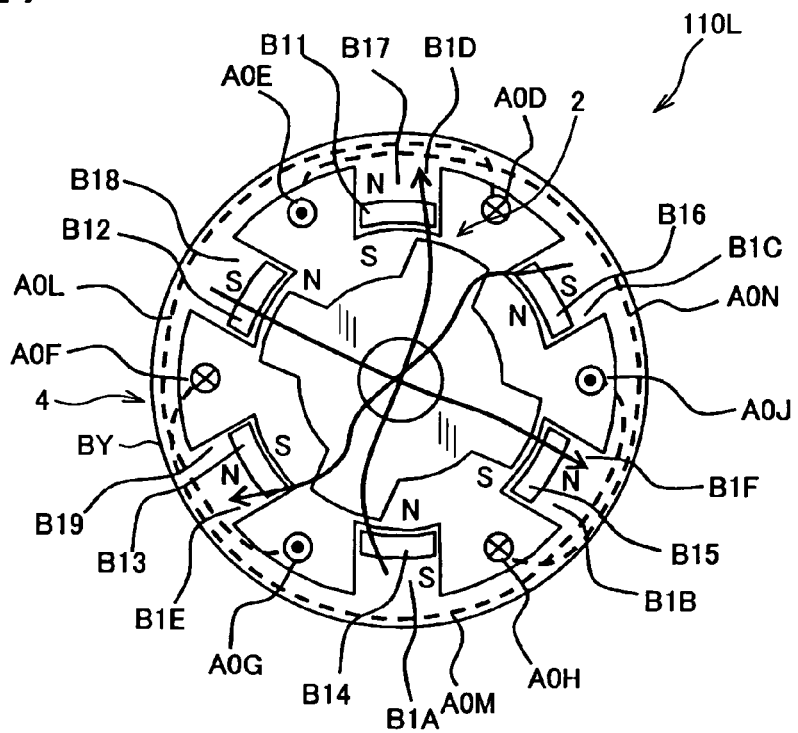
FIG. 27 is a lateral cross sectional view of a reluctance motor according to the tenth modification of the reluctance motor according to the first embodiment.

FIG. 27 schematically illustrates an example of the structure of a reluctance motor 110L according to the tenth modification of the first so embodiment.

In comparison to the structure of the motor 110 illustrated in FIG. 1B, each of stator poles B17, B18, B19, B1A, B1B, and B1C corresponding to the respective stator poles A01, A02, A03, A04, A05, and A06 has a radial height (length) longer than that of each of the stator poles A01, A02, A08, A04, A05, and A06.

In addition to the structure of the motor 110 illustrated in FIG. 1B as a basic structure, the reluctance motor 110L includes a plurality of permanent magnets B11, B12, B13, B14, B15, and B16. The plurality of permanent magnets B11, B12, B13, B14, B15, and B16 are embedded in the stator poles B17, B18, B19, B1A, B1B, and B1C, respectively. Each of the plurality of permanent magnets B11, B12, B13, B14, B15, and B16 has a concavely circumferentially rounded shape with a curvature identical to that of the inner surface of each of the stator poles B17, B18, B19, B1A, B1B, and B1C.

As well as the first embodiment, the control device CC or CC1 is operative to supply an A-phase direct current Ia to the A-phase coil A0D and A0G in the direction indicated by the circled cross and circled dot, and a B-phase direct current Ib to the B-phase coil A0F and A0J in the direction indicated by the circled cross and circled dot. In addition, the control device CC or CC1 is operative to supply a C-phase direct current Ic to the C-phase coil A0H and A0E in the direction indicated by the circled cross and circled dot.

A direction of a magnetic flux to be created by each of the permanent magnets B11, B12, B13, B14, B15, and B16 is illustrated by reference characters "N" and "S" in FIG. 27. Specifically, the direction of a magnetic flux to be created by each of the permanent magnets B11, B12, B13, B14, B15, and B16 is matched with a direction of a magnetic flux to be created by a corresponding one stator pole when two stator windings disposed at its both circumferential sides are energized.

Note that the circumferential width of each stator pole and each permanent magnet can be shorter or longer than that illustrated in FIG. 27.

The structure of the reluctance motor 110L can achieve magnetic characteristics of the stator between the magnetic characteristics of each permanent magnet and those of a soft magnetic material used to form the stator core (each tooth). The magnetic characteristics required for the stator poles are different depending on the applications of the motor 110L.

For example, when a high torque during a low RPM of the motor 110L is required, the flux density of each stator pole is desirably set to be higher than the range of the flux densities of rare-earth magnets. In other words, the flux density of each stator pole is desirably set to be approximately 2.0 [T] close to the saturation flux density of the soft magnetic material to be used to form the stator core (each tooth). When a high flux density material, such as a permendur alloy, is used to form the stator core (each tooth), the flux density of each stator pole can be set to be approximately 2.5 [T].

In contrast, in order to carry out field-weakening control for the motor 110L to thereby rotate the rotor 2 at a high RPM, the flux density of the inner surface of each stator pole can be preferably set to be approximately 0.5 [T] or less during no stator phase current flowing through each stator coil.

When the rotor 2 is located such that one salient pole A0K of the rotor 2 starts to face the stator pole B17 illustrated in FIG. 27, three magnetic fluxes B1D, B1E, and B1F are induced. Specifically, the magnetic flux B1D is induced based on the permanent magnets B14 and B11 from the stator pole B1A to the stator pole B17, and the magnetic flux B1E is induced based on the permanent magnets B16 and B13 from the stator pole B1C to the stator pole B1E. In addition, the magnetic flux B1F is induced based on the permanent magnets B18 and B15 from the stator pole B18 to the stator pole B1B.

In order to crate a torque in the CCW at the rotational position of the rotor 2 illustrated in FIG. 27, an A-phase current Ia is supplied to flow through the A-phase coil A0D and A0G. At the same time, a C-phase current Ic is supplied to flow through the C-phase coil A0H and A0E. This causes magnetomotive force to increase the magnetic flux BID to thereby create a magnetic attractive force. The magnetic attractive force pulls each of the salient poles of the rotor 2 toward a corresponding one of the stator poles B1D and B1A to thereby create a torque in the CCW.

At that time, it is desired to reduce each of the magnetic fluxes BIB and B1F as low as possible. This can not only reduce a torque in the CW but also increase a voltage across the C-phase coil.

That is a voltage induced across the C-phase coil is represented by a value the sum of the rate of change of the magnetic flux BID over time and that of change of the magnetic flux B IF over time because the rate of change of the magnetic flux B1F is substantially zero. The flux linkage based on the magnetic flux B1F through the C-phase coil is negatively directed opposing the positively directed flux linkage based on the magnetic flux B1D therethrough. For this reason, the more the negative flux linkage based on the magnetic flux B1F is reduced, the more the voltage across the C-phase coil is increased.

In addition, the reduction in the flux density based on the magnetic flux B1F at the inner surface of each stator pole can supply power to the stator coils while more balancing the voltage across the A-phase coil and that across the C-phase coil. An increase in the balance among the voltages across the respective three-phase coils contributes to the reduction in the current capacitance of each power transistor of the control device CC or CC1 because the previously determined voltage limit of the DC power source and each power transistor. In addition, in view of voltage balance, it is desired that the A-phase current IA is higher in level than the C-phase current Ic because of achieving an advantage of reducing the magnetic flux B1F.

In the structure of the motor 110L, a negative C-phase current (−Ic) can be supplied to negatively flow through the positive C-phase winding A0H out of the paper of FIG. 27 (in the reverse direction of the circled cross) and to positively flow the negative C-phase winding A0E into the paper of FIG. 27 (in the reverse direction of the circled dot). This can increase a torque to be created, which will be described later. The negative C-phase current (−Ic) can achieve an advantage of generating a magnetomotive force that reduces the magnetic fluxes B1E and B1F.

Each of (a), (b), and (c) of FIG. 28 illustrates each stator pole of the motor 110L. (a) of FIG. 28 illustrates circumferentially divided two permanent magnets embedded in each stator pole at a soft magnetic portion therebetween, and (b) of FIG. 28 illustrates circumferentially divided three permanent magnets embedded in each stator pole at soft magnetic portion thereamong. (c) of FIG. 28 illustrates axially divided plural permanent magnets embedded in each stator pole at soft magnetic portions thereamong. This can freely design and select the magnitude of the magnetic flux of each stator pole. Circumferentially divided plural permanent magnets can be embedded in each stator pole at soft magnetic portions thereamong. The length of each pitch between such divided permanent magnets can be freely set.

(a), (b), (c), and (d) of FIG. 29 illustrates various arrangements and shapes of at least one permanent magnet embedded in each stator pole of the motor 110L. Each stator pole of the motor 110K can be provided with at least one slot in which at least one permanent magnet is embedded.

Determination of the direction of the at least one slot allows the at least one permanent magnet embedded in the at least one slot to set a desired direction of a magnetic flux created by the at least one permanent magnet.

Figure 30:
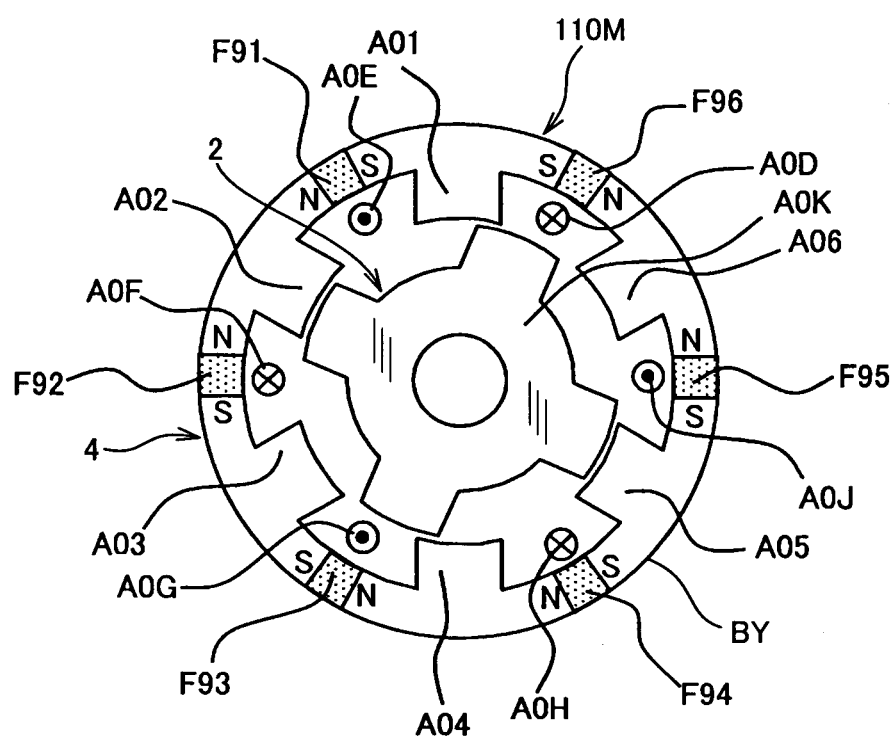
FIG. 30 is a lateral cross sectional view of a reluctance motor according to a modification of the reluctance motor illustrated in FIG. 27.

As a modification of the reluctance motor 110L, a reluctance motor 110M is illustrated in FIG. 30.

In addition to the structure of the motor 110 illustrated in FIG. 1B as a basic structure, the reluctance motor 110M includes a plurality of permanent magnets F91, F92, F93, F94, F95, and F96. The plurality of permanent magnets F91, F92, F93, F94, F95, and F96 are embedded in the back yoke BY.

The permanent magnets F91, F92, F93, F94, F95, and F96 are so circumferentially arranged in the back yoke BY at regular pitches as to be radially aligned with the positive or negative stator windings A0E, A0F, A0G, A0H, A0J, and A0D, respectively.

A direction of a magnetic flux to be created by each of the permanent magnets F91, F92, F93, F94, F95, and F96 is illustrated by reference characters "N" and "S" in FIG. 30. Specifically, the direction of a magnetic flux to be created by each of the permanent magnets F91, F92, F93, F94, F95, and F96 is matched with a direction of a magnetic flux to be created by a current flowing through a corresponding one positive or negative stator winding.

Operations of the reluctance motors 110L and 110N are substantially identical to those of a reluctance motor 110N described hereinafter, and therefore, they will be described as operations of the reluctance motor 110N.

Next, an eleventh modification of the reluctance motor 110 according to the first embodiment will be described hereinafter.

(a), (b), (c), and (d) of FIG. 31 schematically illustrate an example of the structure of the reluctance motor 110N according to the eleventh modification of the first embodiment.

In comparison to the structure of the motor 110A illustrated in FIG. 9 as a basic structure, the reluctance motor 110N includes a plurality of permanent magnets G71, G72, G73, G74, G75, and G76.

The plurality of permanent magnets G71, G72, G73, G74, G75, and G76 are embedded in the back yoke BY.

The permanent magnets G71, G72, G73, G74, G75, and G76 are embedded in the stator poles 117, 118, 119, 11A, 11B, and 11C, respectively. Each of the plurality of permanent magnets G71, G72, G73, G74, G75, and G76 is arranged at one circumferential end of a corresponding one stator pole to be close to a corresponding one positive or negative stator winding.

As well as the first embodiment, the control device CC or CC1 is operative to supply an A-phase direct current Ia to the A-phase coil A0D and A0G in the direction indicated by the circled cross and circled dot, and a B-phase direct current Ib to the B-phase coil A0F and A0J in the direction indicated by the circled cross and circled dot. In addition, the control device CC or CC1 is operative to supply a C-phase direct current Ic to the C-phase coil A0H and A0E in the direction indicated by the circled cross and circled dot.

A direction of a magnetic flux to be created by each of the permanent magnets G71, G72, G73, G74, G75, and G76 is illustrated by reference characters "N" and "S" in FIG. 31. Specifically, the direction of a magnetic flux to be created by each of the permanent magnets G71, G72, G73, G74, G75, and G76 is matched with a direction of a magnetic flux to be created by a corresponding one stator pale when two stator windings disposed at its both circumferential sides are energized.

In the reluctance motor 110N, the circumferential electrical angular width Hm of each salient pole of the rotor 11E is set to 75 electrical degrees. Both ends of the outer surface of each of the salient poles of the rotor 11E are rounded.

Depending on the application, it is desired that at least one of the reluctance motors according to the first embodiment and its modifications has a function of rapidly increasing and reducing a current being supplied to each phase coil to thereby make the rotor 11E rotate at a higher RPM or ensure a torque. It is also desired that at least one of the reluctance motors according to the first embodiment and its modifications has a function of making smooth the variations in the radial attractive force to thereby lower the at least one reluctance motor in vibration and noise.

The reluctance motor 110N is designed to meet the desires.

Let us consider that the motor 110N generates a torque in the CCW to rotate the rotor 11E in the CCW. The operations of the motor 110N being rotated in the CCW and those of the motor 110N being rotated in the CW are structurally different from each other. When the motor 110N is installed in electric or hybrid vehicles, how the motor 110N is used is different between when the motor 110N is rotated in the CCW and when it is rotated in the CW. When the motor 110N is installed in compressors for air conditions, the compressor makes the motor 110N rotate in only one direction to thereby carry out various works using the motor 110N.

When the rotor 11E is presently located at the rotational angle θr illustrated in (a) of FIG. 31, one salient pole of the rotor 11E faces the stator pole G7A and the other salient pole faces the stator pole G7D.

At that time, an A-phase current Ia is supplied to positively flow through the positive A-phase winding 111 (see the circled cross) and negatively flow through the negative A-phase winding 114 (see the circled dot). Simultaneously, a C-phase current Ic is supplied to positively flow through the positive C-phase winding 115 (see the circled cross) and negatively flow through the negative C-phase winding 112 (see the circled dot).

The A-phase current Ia flowing through the A-phase windings and the C-phase current Ic flowing through the C-phase windings excites a magnetic flux G7E from the stator pole G73 to the stator pole G78 illustrated in (a) of FIG. 31 by thick arrow. The induced magnetic flux G7E causes a magnetic attractive force between the stator pole G7B and one salient pole of the rotor 11E and between the stator pole G78 and the other salient pole. The attractive force creates a torque in the CCW to rotate the rotor 11E in the CCW.

At that time, when the A-phase current Ia and the C-phase current Ic are identical in level to each other, no magnetic fluxes are created between the stator poles G7D and G7A because magnetomotive forces based on the currents Ia and Ic are cancelled out. However, between the permanent magnets G71 and G74, a magnetic flux G7F is created. The magnetic flux G7F does not contribute to generate a torque.

Thereafter, when the rotor 11E is presently located at the rotational angle θr illustrated in (b) of FIG. 31, the one salient pole of the rotor 11E continuously faces the stator pole G7A and the other salient pole faces the stator pole G7D.

At that time, the A-phase current Ia is continuously supplied to positively flow through the positive A-phase winding 111 and negatively flow through the negative A-phase winding 114. Simultaneously, the C-phase current Ic is continuously supplied to positively flow through the positive C-phase winding 115 and negatively flow through the negative C-phase winding 112.

In the same manner as the rotor 11E being located at the rotational position θr illustrated in (a) of FIG. 31, the A-phase current Ia flowing through the A-phase windings and the C-phase current Ic flowing through the C-phase windings excites the magnetic flux G7E from the stator pole G7B to the stator pole G78 illustrated in (b) of FIG. 31.

The induced magnetic flux G7E causes the magnetic attractive force between the stator pole G7B and the one salient pole of the rotor 11E and between the stator pole G78 and the other salient pole. The attractive force creates a torque in the CCW to rotate the rotor 11E in the CCW. In addition, the magnetic flux G7F is created; this magnetic flux G7F does not contribute to generate a torque.

Thereafter, when the rotor 11E is presently located at the rotational angle θr illustrated in (c) of FIG. 31, the one salient pole of the rotor 11E continuously faces both the stator pole G7A and the stator pole G78, and the other salient pole faces the stator pole G7D and the stator pole G7E.

At that time, the A-phase current Ia is continuously supplied to positively flow through the positive A-phase winding 111 and negatively flow through the negative A-phase winding 114. Simultaneously, the C-phase current Ic is continuously supplied to positively flow through the positive C-phase winding 115 and negatively flow through the negative C-phase winding 112.

In the same manner as the rotor 11E being located at the rotational position θr illustrated in (a) of FIG. 31, the A-phase current Ia flowing through the A-phase windings and the C-phase current Ic flowing through the C-phase windings excites the magnetic flux G7E from the stator pole G78 to the stator pole G78 illustrated in (c) of FIG. 31.

The induced magnetic flux G7E causes the magnetic attractive force between the stator pole G7B and the one salient pole of the rotor 11E and between the stator pole G78 and the other salient pole. The attractive force creates a torque in the CCW to rotate the rotor 11E in the CCW. During the rotor 11E being turned at a high RPM, it is necessary to reduce the A-phase current Ia at the rotational position θr of the rotor 11E illustrated in (a) of FIG. 31. At that time, the magnetic flux G7F is created between the permanent magnets G71 and G74. In addition, a magnetic flux G7G is started to be created between the permanent magnets G75 and G72.

Thereafter when the rotor 11E is presently located at the rotational angle θr illustrated in (d) of FIG. 31, the one salient pole of the rotor 11E continuously faces the stator pole G75, and the other salient pole faces the stator pole G78.

At that time, the A-phase current Ia is reduced to reach zero, and a B-phase current Ib is supplied to positively flow through the positive B-phase winding 113 and negatively flow through the negative B-phase winding 116.

The B-phase current Ib flowing through the B-phase windings is excites the magnetic flux G7H from the stator pole G79 to the stator pole G7C illustrated in (d) of FIG. 31. At that time, the magnetic flux G7F based on the permanent magnets G71 and G74 and the magnetic flux G7G based on the permanent magnets G75 and G72 are created.

Because the A-phase current Ia is rapidly reduced from the situation (c) of FIG. 31 to (d) of FIG. 31, it is necessary to regenerate magnetic energy based on the magnetic flux G7E to the DC power source of the control device CC or CC1, but unnecessary to regenerate magnetic flux energy based on the permanent magnets G72 and G75. In contrast, in the situation (b) of FIG. 11, it is necessary to regenerate all magnetic energy based on magnetic fluxes passing through the stator pole 17. In comparison to the regeneration illustrated in (b) of FIG. 11, it is possible to reduce the regenerative energy by the magnetic flux based on the permanent magnets G72 and G75, thus shortening the reduction time of the A-phase current Ia. That is, the permanent magnets G72 and G75 can reduce the burden required to reduce the excited magnetic energy.

While the situation illustrated in (c) of FIG. 31 is changed to that illustrated in (d) of FIG. 31, the radial, attractive force between the stator and the rotor 11E are greater than zero even if each of the A- and C-phase currents are rapidly reduced. This is because the magnetic flux G7F based on the permanent magnets G71 and G72 and the magnetic flux G7G based on the permanent magnets G75 and G72 are remained. In contrast, in (b) of FIG. 11, when each of the A- and C-phase currents are rapidly reduced, the radial attractive force becomes substantially zero.

In comparison to the situation illustrated in (b) of FIG. 11, while the situation illustrated in (c) of FIG. 31 is changed to that illustrated in (d) of FIG. 31, the permanent magnets G71, G74, G75, and G72 reduce the variations in the radial attractive force. In addition, in (d) of FIG. 31, the variations in the A-phase current Ia can be smoothly adjusted within a range over zero enough to reduce the variations in the radial attractive force.

The operations of the motor 110N have been described within an electrical angular range of 60 degrees from the situation (a) to the situation (d) in FIG. 31, but these operations of the motor 110N are repeated to thereby continuously rotate the rotor 11E.

Note that, regarding the shape of each permanent magnet described above, some of the permanent magnets can be greater in thickness than the remaining thereof; this makes different the magnetic characteristics of some of the permanent magnets and those of the remaining of the permanent magnets. As the permanent magnets, rare-earth magnets, cast magnets, ferrite magnets, or bond magnets of them can be used according to the purpose of using the motor 110N. For example, a rare-earth magnet with a sufficient thickness used as some of the permanent magnets always exerts high flux-density characteristics. The flux density of the remaining part of the permanent magnets can be variably adjusted by changing a current for exciting it.

In addition, as described above, adjustment of a current to be supplied to the three-phase coils during the motor running can demagnetize or further magnetize the permanent magnets.

As illustrated in some of the drawings, each of the permanent magnets has a substantially rectangular shape in its lateral cross section, but it can have any shape, such as a triangular shape or trapezoid shape, in its lateral cross section.

The electromagnetic actions based on a permanent magnet mounted on the inner surface of a stator pole and those based on a permanent magnet embedded in the same stator pole are similar to each other on the condition that the soft magnetic portion between the embedded permanent magnet and the inner surface of the stator pole is very thin.

Next, a twelfth modification of the reluctance motor 110 according to the first embodiment will be described hereinafter.

FIG. 32 schematically illustrates an example of the structure of a reluctance motor 1100 according to the twelfth modification of the first embodiment.

In comparison to the structure of the motor 110 illustrated in FIG. 1B, six stator poles (the number M is six) G31, G32, G33, G34, G35, and G36 correspond to the stator poles A01, A02, A03, A04, A05, and A06, respectively.

As a different point between the motor 110 and the motor 1100, the motor 1100 is provided with a ten-pole rotor G3M (the number K is ten).

Specifically, the rotor has a substantially annular shape, and is provided at its outer circumference with ten permanent magnets, some of which are represented by G3D, G3R, G3L, G3S. The ten permanent magnets are circumferentially contacted to one another to form a substantially ring shape.

The stator core 4 is arranged to be coaxial to the center axis of the rotor G3M and its inner circumference is opposite to the outer circumference of the rotor G3M with an air gap therebetween.

An inner magnet pole to be created by each of the permanent magnets G3D, G3R, G3L, G3S, . . . is illustrated by reference characters "N" and "S" in FIG. 32. When the inner magnet pole created by a permanent magnet is N pole, the outer magnet pole of the permanent magnet is S pole, and when the inner magnet pole created by a permanent magnet is S pole, the outer magnet pole of the permanent magnet is N pole.

(a), (b), and (c) of FIG. 32 illustrate the situations in which the rotor G3M is rotated in the CCW in this order.

In (a) of FIG. 32, in order to create a torque T in the CCW, an A-phase current Ia is supplied to positively flow through a positive A-phase winding G37 corresponding to winding A0D and negatively flow through a negative A-phase winding G38 corresponding to winding A0G. Simultaneously, a, C-phase current Ic is supplied to positively flow through a positive C-phase winding G3B corresponding to winding A0H and negatively flow through a negative C-phase winding G3C corresponding to winding A0E.

The A-phase current Ia flowing through the A-phase coil and the C-phase current Ic flowing through the C-phase coil excite the stator poles G31 and G34, thus generating magnetomotive forces illustrated by arrows in the stator poles G31 and G34, respectively.

This pulls the permanent magnet G3D toward the stator pole G31 in the CCW, and simultaneously, pulls the permanent magnet G3L toward the stator pole G34 in the CCW.

Simultaneously, each of the permanent magnets G3R and G3S repels a corresponding one of the stator poles G31 and G34 thus creating a torque in the counterclockwise direction.

Note that, in order to create a torque in the clockwise direction, in the situation illustrated in (a) of FIG. 32, an A-phase current Ia is supplied to negatively flow through the positive A-phase winding G37 (in the reverse direction of the circled cross) and positively flow through the negative A-phase winding G38 (in the reverse direction of the circled dot). This excites the stator pole G31 to create a magnetomotive force illustrated by the reverse direction of the arrow in the stator pole G31, and excites the stator pole G34 to create a magnetomotive force illustrated by the reverse direction of the arrow in the stator pole G34.

This pulls the permanent magnet G3R toward the stator pole G31 in the clockwise direction CW, and simultaneously, pulls the permanent magnet G3S toward the stator pole G34 in the CW.

Thus, in the situation (a) in FIG. 32, it is possible to create a torque T in the CCW.

In (b) of FIG. 32, in order to create a torque T in the CCW, a B-phase current Ib is supplied to positively flow through a positive B-phase winding G39 corresponding to winding A0F and negatively flow through a negative B-phase winding G3A corresponding to winding ADJ. Simultaneously, the C-phase current Ic is supplied to positively flow through the positive C-phase winding G3B and negatively flow through the negative C-phase winding G3C.

The B-phase current Ib flowing through the B-phase coil and the C-phase current Ic flowing through the C-phase coil excite the stator poles G32 and G35, thus generating magnetomotive forces illustrated by arrows in the stator poles G32 and G35, respectively.

This pulls the permanent magnet G3E toward the stator pole G32 in the CCW, and simultaneously, pulls the permanent magnet G3F toward the stator pole G35 in the CCW.

Thus, in the situation (b) in FIG. 32, it is possible to create a torque T in the CCW.

In (c) of FIG. 32, in order to create a torque T in the CCW, the A-phase current Ia is supplied to positively flow through the positive A-phase winding G37 and negatively flow through the negative A-phase winding G38. Simultaneously, the B-phase current Ib is supplied to positively flow through the positive B-phase winding G39 and negatively flow through the negative B-phase winding G3A.

The A-phase current Ia flowing through the A-phase coil and the B-phase current Ib flowing through the B-phase coil excite the stator poles G36 and G33, thus generating magnetomotive forces illustrated by arrows in the stator poles G36 and G33, respectively.

This pulls the permanent magnet G3G toward the stator pole G36 in the CCW, and simultaneously, pulls the permanent magnet G3H toward the stator pole G33 in the CCW.

Thus, in the situation (c) in FIG. 32, it is possible to create a torque T in the CCW.

As a modification of the reluctance motor 1100, a reluctance motor 11001 is illustrated in (d) of FIG. 32.

As a different point between the reluctance motors 1100 and 11001, the rotor is provided at its outer circumference with five permanent magnets, some of which are represented by G3K and G3J. The five permanent magnets are circumferentially arranged at regular pitches. Each of the five permanent magnets is an outer N-pole permanent magnet. In each of the pitches between the five permanent magnets, a soft-magnetic pole G3K is provided to contact corresponding two stator poles located at its both sides. Each of the soft-magnetic poles serves as an outer S-pole.

In the modification, magnetic fluxes based on, for example, one outer N-pole permanent magnet G3J and the like pass, via the stator, through a corresponding one soft-magnetic S-pole. That is, through each soft-magnet S-pole, magnetic fluxes pass; these magnetic fluxes are similar to those when an outer S-pole permanent magnet is located as each soft-magnet S-pole. Thus, how to generate a torque by the motor 11001 is identical to how to generate a torque by the model 1100 set forth above.

A plurality of permanent magnets provided for the rotor can be embedded in the rotor. Examples of how to embed them in each stator pole illustrated in FIGS. 27, 28, 29, and 30 can be applied to how to embed the plurality of permanent magnets in the rotor.

Next, a thirteenth modification of the reluctance motor 110 according to the first embodiment will be described hereinafter.

Figure 33:
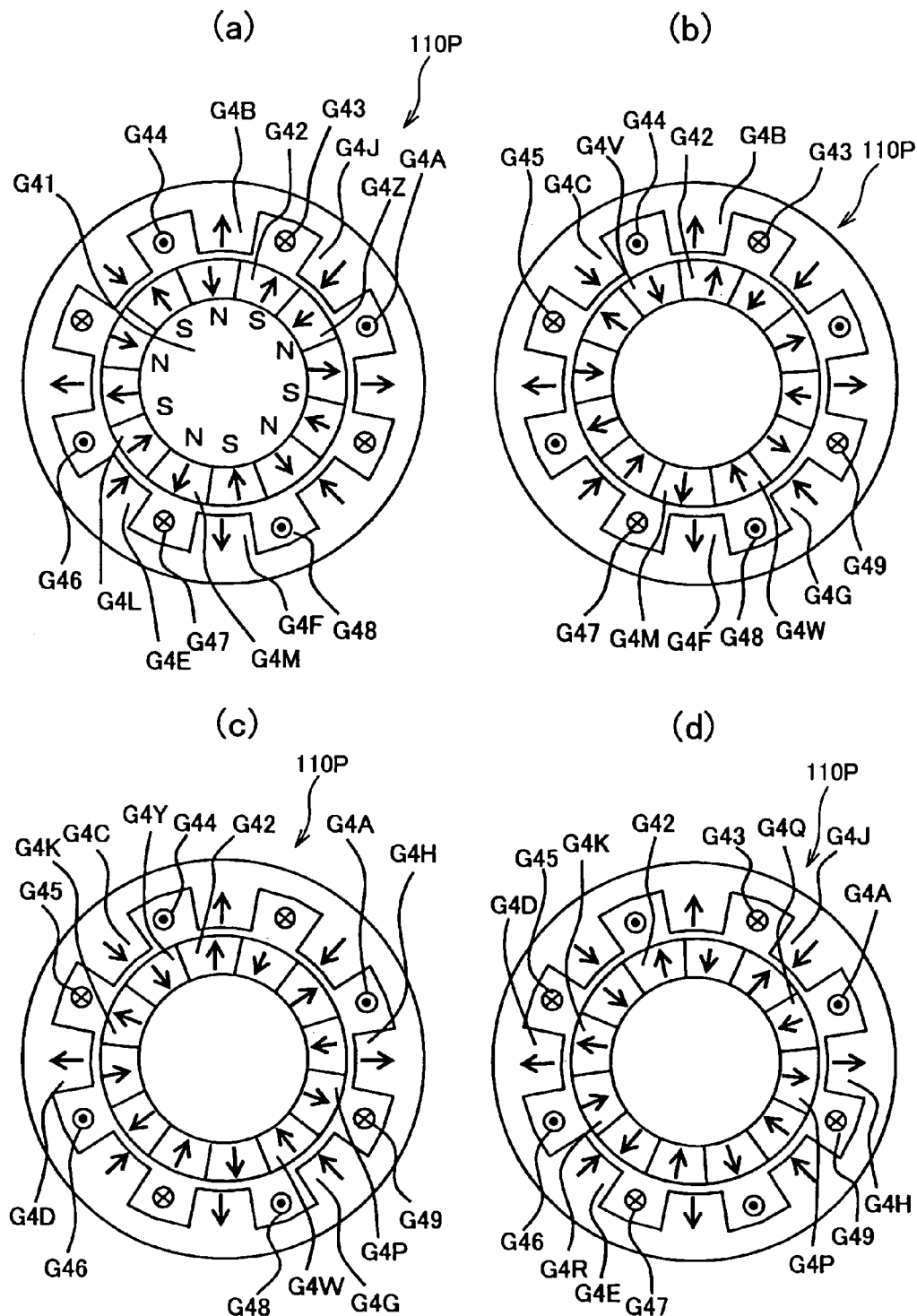
FIG. 33 is a lateral cross sectional view of a reluctance motor according to the thirteenth modification of the reluctance motor according to the first embodiment.

FIG. 33 schematically illustrates an example of the structure of a reluctance motor 110P according to the thirteenth modification of the first embodiment.

In comparison to the structure of the motor 110 illustrated in FIG. 1B, the motor 110P is provided with eight stator poles (the number M is eight), which are represented by G4B, G4E, G4F, G4J, . . . , and a twelve-pole rotor G41 (the number K is twelve).

Specifically, the rotor G41 has a substantially annular shape, and is provided at its outer circumference with twelve permanent magnets G42, G4L, G4Z, . . . . The twelve permanent magnets are circumferentially contacted to one another to form a substantially ring shape.

The stator core is arranged to be coaxial to the center axis of the rotor G41 and its inner circumference is opposite to the outer circumference of the rotor G41 with an air gap therebetween.

In the motor 110P, each of the stator coils is not wound in full pitch winding.

For example, each of the stator coils is formed by toroidal coils, an example of which is illustrated in FIG. 14. Otherwise, when the motor 110P is designed as a dual motor, each of the stator coils is alternately wound in a corresponding one slot of the first stator and a corresponding one slot of the second stator radially aligned therewith (see FIG. 15).

An inner magnet pole to be created by each of the permanent magnets is illustrated by reference characters "N" and "S" in (a) of FIG. 33. When the inner magnet pole created by a permanent magnet is N pole, the outer magnet pole of the permanent magnet is S pole, and when the inner magnet pole created by a permanent magnet is S pole, the outer magnet pole of the permanent magnet is N pole.

(a), (b), (c), and (d) of FIG. 33 illustrate the situations in which the rotor G41 is rotated in the CCW in this order.

In (a) of FIG. 33, in order to create a torque T in the CCW, a direct current is supplied to flow through stator windings G43 and G44 located at both sides of the stator pole G4B in directions indicated by the circled cross and the circled dot. The direct current flowing through the windings G43 and G44 excites the stator pole G4B, thus generating a magnetomotive force illustrated by an arrow in the stator pole G413. This generates a magnetic attractive force between the stator pole G4B and the permanent magnet G42, thus pulling the permanent magnet G42 toward the stator pole G4B in the CCW.

Simultaneously, a direct current is supplied to flow through stator windings G43 and G4A located at both sides of the stator pole G4J in directions indicated by the circled cross and the circled dot. The direct current flowing through the stator windings G43 and G4A excites the stator pole G4J, thus generating a magnetomotive force illustrated by an arrow in the stator pole G4J. This generates a magnetic attractive force between the stator pole G4J and the permanent magnet G4Z, thus pulling the permanent magnet G4Z toward the stator pole G48 in the CCW.

At the same time, a direct current is supplied to flow through stator windings G47 and G46 located at both sides of the stator pole G4E directions indicated by the circled cross and the circled dot. The direct current flowing through the stator windings G47 and G46 excites the stator pole G4E, thus generating a magnetomotive force illustrated by an is arrow in the stator pole G4E. This generates a magnetic attractive force between the stator pole G4E and the permanent magnet G4L, thus pulling the permanent magnet GAL toward the stator pole G4E in the CCW.

Simultaneously, a direct current is supplied to flow through stator windings G47 and G48 located at both sides of the stator pole G4F in directions indicated by the circled cross and the circled dot. The direct current flowing through the stator windings G47 and G48 excites the stator pole G4F, thus generating a magnetomotive force illustrated by an arrow in the stator pole G4F. This generates a magnetic attractive force between the stator pole G4F and the permanent magnet G4M, thus pulling the permanent magnet G4M toward the stator pole G4F in the CCW.

At that time, a direct current is overlappedly supplied to flow through each of the stator windings G43 and G47, and therefore, the magnitude of the direct current through each of the stator windings G43 and G48 is set twice that of the direct current to be supplied to another stator winding. The sum of the torques created by the magnetic attractive forces based on the four stator poles G4B, G4Z, G4G, and G4F provide a torque T created by the motor 110P. In addition, four permanent magnet, which are circumferentially adjacent to the permanent magnets (rotor poles) G42, G4A, G4U, and G4M, repel the four stator poles G4B, G4Z, G4G, and G4F, respectively. This also creates a torque in the counterclockwise direction.

In (b) of FIG. 33, in order to create a torque T in the CCW, a direct current is supplied to flow through the stator windings G43 and G44 in the directions indicated by the circled cross and the circled dot. The direct current flowing through the windings G43 and G44 excites the stator pole G4B, thus generating a magnetomotive force illustrated by an arrow in the stator pole G41. This generates a magnetic attractive force between the stator pole G4B and the permanent magnet G42, thus pulling the permanent magnet G42 toward the stator pole G4B in the CCW.

Simultaneously, a direct current is supplied to flow through a stator winding G45 and the stator winding G44 located at both sides of the stator pole G4C in directions indicated by the circled cross and the circled dot. The direct current flowing through the stator windings G45 and G44 excites the stator pole G4C, thus generating a magnetomotive force illustrated by an arrow in the stator pole G4C. This generates a magnetic attractive force between the stator pole G4C and the permanent magnet G4V, thus pulling the permanent magnet G4V toward the stator pole G4C in the CCW.

At the same time, a direct current is supplied to flow through a stator winding G49 and the winding G48 located at both sides of the stator pole G4G in directions indicated by the circled cross and the circled dot. The direct current flowing through the stator windings G49 and G48 excites the stator pole G4G, thus generating a magnetomotive force illustrated by an arrow in the stator pole G4G. This generates a magnetic attractive force between the stator pole G40 and the permanent magnet G4W, thus pulling the permanent magnet G4W toward the stator pole G4G in the CCW.

Simultaneously, a direct current is supplied to flow through stator windings G47 and G48 located at both sides of the stator pole G4F in directions indicated by the circled cross and the circled dot. The direct current flowing through the stator windings G47 and G48 excites the stator pole G4F, thus generating a magnetomotive force illustrated by an arrow in the stator pole G4F. This generates a magnetic attractive force between the stator pole G4F and the permanent magnet G4M, thus pulling the permanent magnet G4M toward the stator pole G4F in the CCW.

In (c) of FIG. 33, in order to create a torque T in the CCW, a direct current is supplied to flow through the stator windings G45 and G44 in the directions indicated by the circled cross and the circled dot. The direct current flowing through the stator windings G45 and G44 excites the stator pole G4C, thus generating a magnetomotive force illustrated by an arrow in the stator pole G4C. This generates a magnetic attractive force between the stator pole G4C and the permanent magnet G4Y, thus pulling the permanent magnet G4Y toward the stator pole G4C in the CCW.

Simultaneously, a direct current is supplied to flow through stator windings G45 and G46 located at both sides of the stator pole G4D in directions indicated by the circled cross and the circled dot. The direct current flowing through the stator windings G45 and G46 excites the stator pole G4D, thus generating a magnetomotive force illustrated by an arrow in the stator pole G4D. This generates a magnetic attractive force between the stator pole G4D and the permanent magnet G4K, thus pulling the permanent magnet G4K toward the stator pole G4D in the CCW.

At the same time, a direct current is supplied to flow through the stator windings G49 and G48 located at both sides of the stator pole G4G in directions indicated by the circled cross and the circled dot. The direct current flowing through the stator windings G49 and G48 excites the stator pole G4G, thus generating a magnetomotive force illustrated by an arrow in the stator pole G4G. This generates a magnetic attractive force between the stator pole G4G and the permanent magnet G4W, thus pulling the permanent magnet G4W toward the stator pole G4G in the CCW.

Simultaneously, a direct current is supplied to flow through the stator windings G49 and G4A located at both sides of the stator pole G4H in directions indicated by the circled cross and the circled dot. The direct current flowing through the stator windings G49 and G4A excites the stator pole G4H, thus generating a magnetomotive force illustrated by an arrow in the stator pole G4H. This generates a magnetic attractive force between the stator pole G4H and the permanent magnet G4P, thus pulling the permanent magnet G4P toward the stator pole G4H in the CCW.

In (d) of FIG. 33, in order to create a torque T in the CCW, a direct current is supplied to flow through the stator windings G45 and G46 in the directions indicated by the circled cross and the circled dot. The direct current flowing through the windings G45 and G46 excites the stator pole G4D, thus generating a magnetomotive force illustrated by an arrow in the stator pole G4D. This generates a magnetic attractive force between the stator pole G4D and the permanent magnet G4K, thus pulling the permanent magnet G4K toward the stator pole G41) in the CCW.

Simultaneously, a direct current is supplied to flow through the stator windings G47 and G46 located at both sides of the stator pole G4E in directions indicated by the circled cross and the circled dot. The direct current flowing through the stator windings G47 and G46 excites the stator pole G4E, thus generating a magnetomotive force illustrated by an arrow in the stator pole G4E. This generates a magnetic attractive force between the stator pole G4E and the pens magnet G4R, thus pulling the permanent magnet G4R toward the stator pole G4E in the CCW.

At the same time, a direct current is supplied to flow through the stator windings G49 and G4A located at both sides of the stator pole G4H in directions indicated by the circled cross and the circled dot. The direct current flowing through the stator windings G49 and G4A excites the stator pole G4H, thus generating a magnetomotive force illustrated by an arrow in the stator pole G4H. This generates a magnetic attractive force between the stator pole G4H and the permanent magnet G4P, thus pulling the permanent magnet G4P toward the stator pole G4H in the CCW.

Simultaneously, a direct current is supplied to flow through the stator windings G43 and G4A located at both sides of the stator pole G4J in directions indicated by the circled cross and the circled dot. The direct current flowing through the stator windings G43 and G4A excites the stator pole G4J, thus generating a magnetomotive force illustrated by an arrow in the stator pole G4J. This generates a magnetic attractive force between the stator pole G4J and the permanent magnet G4Q, thus pulling the permanent magnet G4Q toward the stator pole G4J in the CCW.

These operations are repeated to thereby create a continuous torque.

Next, a fourteenth modification of the reluctance motor 110 according to the first embodiment will be described hereinafter.

Figure 34:
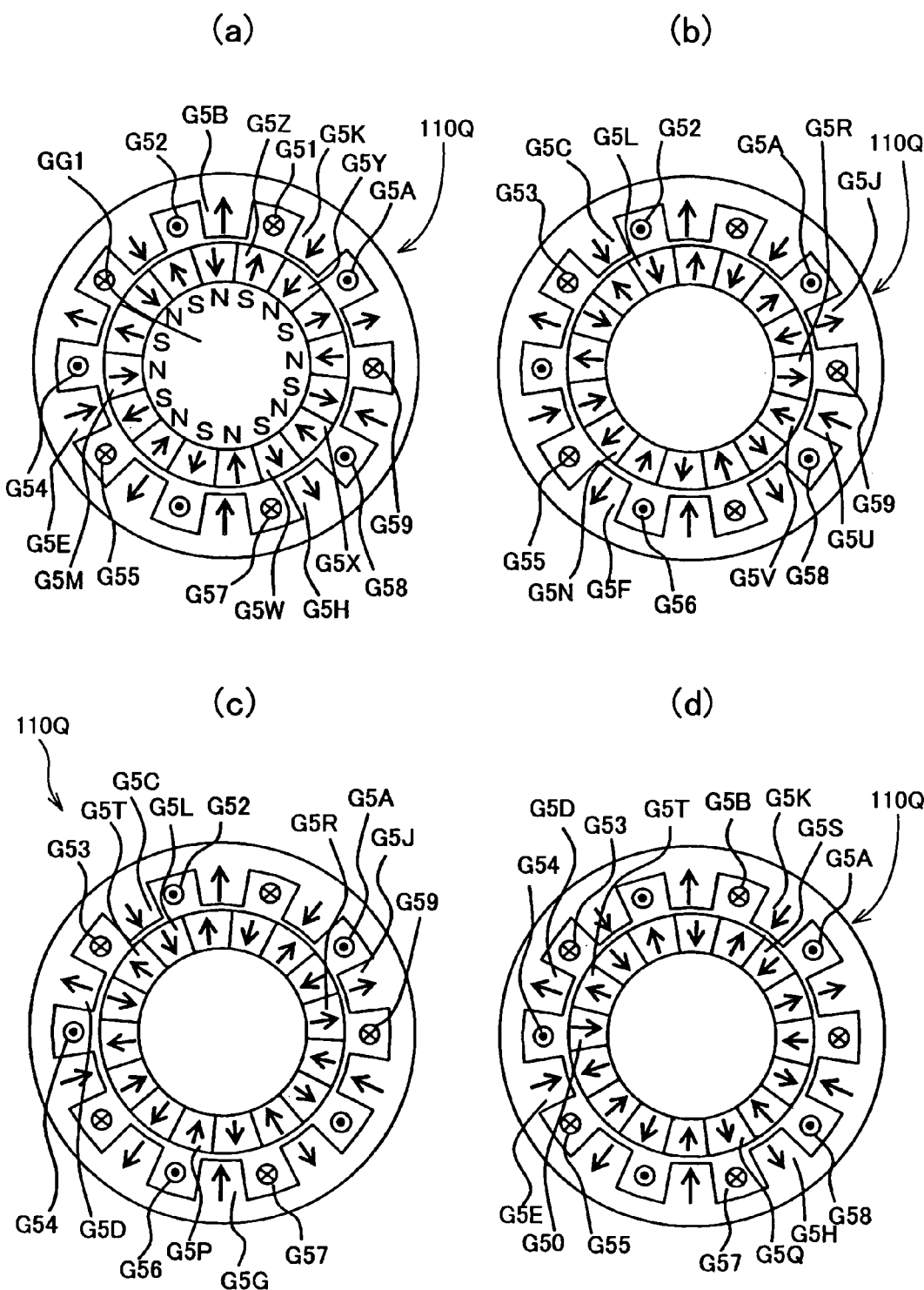
FIG. 34 is a lateral cross sectional view of a reluctance motor according to the fourteenth modification of the reluctance motor according to the first embodiment.

FIG. 34 schematically illustrates an example of the structure of a reluctance motor 110Q according to the fourteenth modification of the first embodiment.

In comparison to the structure of the motor 110 illustrated in FIG. 18, the motor 110Q is provided with ten stator poles (the number M is ten), which are represented by G5B, G5E, G5H, G5K, . . . , and a sixteen-pole rotor GG1 (the number K is sixteen).

Specifically, the rotor GG1 has a substantially annular shape, and is provided at its outer circumference with sixteen permanent magnets G42, G5M, G5W, G5X, G5Y, . . . . The twelve permanent magnets are circumferentially contacted to one another to form a substantially ring shape.

The stator core is arranged to be coaxial to the center axis of the rotor GG1 and its inner circumference is opposite to the outer circumference of the rotor GG1 with an air gap therebetween.

In the motor 110Q, each of the stator coils is not wound in full pitch winding because a direction of a rotor pole and that of another rotor pole from the rotor pole by 180 electrical degrees are opposite to each other.

For example, each of the stator coils is formed by toroidal coils, an example of which is illustrated in FIG. 14. Otherwise, when the motor 110P is designed as a dual motor, each of the stator coils is alternately wound in a corresponding one slot of the first stator and a corresponding one slot of the second stator radially aligned therewith (see FIG. 15).

An inner magnet pole to be created by each of the permanent magnets is illustrated by reference characters "N" and "S" in (a) of FIG. 34. When the inner magnet pole created by a permanent magnet is N pole, the outer magnet pole of the permanent magnet is S pole, and when the inner magnet pole created by a permanent magnet is S pole, the outer magnet pole of the permanent magnet is N pole.

(a), (b), (c), and (d) of FIG. 34 illustrate the situations in which the rotor GG1 is rotated in the CCW in this order.

In (a) of FIG. 34, in order to create a torque T in the CCW, a direct current is supplied to flow through stator windings G51 and G52 located at both sides of the stator pole G5B in directions indicated by the circled cross and the circled dot. The direct current flowing through the windings G51 and G52 excites the stator pole G5B, thus generating a magnetomotive force illustrated by an arrow in the stator pole G5B. This generates a magnetic attractive force between the stator pole G5B and the permanent magnet G5Z, thus pulling the permanent magnet G5Z toward the stator pole G5B in the CCW.

Simultaneously, a direct current is supplied to flow through stator windings G59 and G58 located at both sides of the stator pole G5U in directions indicated by the circled cross and the circled dot. The direct current flowing through the stator windings G59 and G58 excites the stator pole G5U, thus generating a magnetomotive force illustrated by an arrow in the stator pole G5U. This generates a magnetic attractive force between the stator pole G5U and the permanent magnet G5V, thus pulling the permanent magnet G5V toward the stator pole G5U in the CCW.

At the same time, a direct current is supplied to flow through stator windings G57 and G58 located at both sides of the stator pole G5H in directions indicated by the circled cross and the circled dot. The direct current flowing through the stator windings G57 and G58 excites the stator pole G5H, thus generating a magnetomotive force illustrated by an arrow in the stator pole G5H. This generates a magnetic attractive force between the stator pole G5H and the permanent magnet G5W, thus pulling the permanent magnet G5W toward the stator pole G5H in the CCW.

Simultaneously, a direct current is supplied to flow through stator windings G55 and G54 located at both sides of the stator pole G5E in directions indicated by the circled cross and the circled dot. The direct current flowing through the stator windings G55 and G54 excites the stator pole G5E, thus generating a magnetomotive force illustrated by an arrow in the stator pole G5E. This generates a magnetic attractive force between the stator pole G5E and the permanent magnet G5M, thus pulling the permanent magnet G5M toward the stator pole G5E in the CCW.

The sum of the torques created by the magnetic attractive forces based on the four stator poles G5B, G5U, G5H, and G5E provide a torque T created by the motor 110Q. In addition, four permanent magnets, which are circumferentially adjacent to the permanent magnets (rotor poles) G5Z, G5V, G5W, and G5M, repel the four stator poles G5B, G5U, G5H, and G5E, respectively. This also creates a torque in the counterclockwise direction.

In (b) of FIG. 34, in order to create a torque T in the CCW, a direct current is supplied to flow through stator windings G53 and G52 located at both sides of the stator pole G5C in directions indicated by the circled cross and the circled dot. The direct current flowing through the windings G53 and G52 excites the stator pole G5C, thus generating a magnetomotive force illustrated by an arrow in the stator pole G5C. This generates a magnetic attractive force between the stator pole G5C and the permanent magnet G5L, thus pulling the permanent magnet G5L toward the stator pole G5C in the CCW.

Simultaneously, a direct current is supplied to flow through stator windings G59 and G5A located at both sides of the stator pole G5J in directions indicated by the circled cross and the circled dot. The direct current flowing through the stator windings G59 and G5A excites the stator pole G5J, thus generating a magnetomotive force illustrated by an arrow in the stator pole G5J. This generates a magnetic attractive force between the stator pole G5J and the permanent magnet G5R, thus pulling the permanent magnet G5R toward the stator pole G5J in the CCW.

At the same time, a direct current is supplied to flow through stator windings G59 and G58 located at both sides of the stator pole G5U in directions indicated by the circled cross and the circled dot. The direct current flowing through the stator windings G59 and G58 excites the stator pale G5U, thus generating a magnetomotive force illustrated by an arrow in the stator pole G5U. This generates a magnetic attractive force between the stator pole G5U and the permanent magnet G5V, thus pulling the permanent magnet G5V toward the stator pole G5U in the CCW.

Simultaneously, a direct current is supplied to flow through stator windings G55 and G56 located at both sides of the stator pole G5F in directions indicated by the circled cross and the circled dot. The direct current flowing through the stator windings G55 and G56 excites the stator pole G5F, thus generating a magnetomotive force illustrated by an arrow in the stator pole G5F. This generates a magnetic attractive force between the stator pole G5F and the permanent magnet G5N, thus pulling the permanent magnet G5N toward the stator pole G5F in the CCW.

In (c) of FIG. 34, in order to create a torque T in the CCW, a direct current is supplied to flow through stator windings G53 and G52 located at both sides of the stator pole G5C in directions indicated by the circled cross and the circled dot. The direct current flowing through the windings G53 and G52 excites the stator pole G5C, thus generating a magnetomotive force illustrated by an arrow in the stator pole G5C. This generates a magnetic attractive force between the stator pole G5C and the permanent magnet G5T, thus pulling the permanent magnet G5T toward the stator pole G5C in the CCW.

Simultaneously, a direct current is supplied to flow through stator windings G59 and G5A located at both sides of the stator pole G5J in directions indicated by the circled cross and the circled dot. The direct current flowing through the stator windings G59 and G5A excites the stator pole G5J, thus generating a magnetomotive force illustrated by an arrow in the stator pole G5J. This generates a magnetic attractive force between the stator pole G5J and the permanent magnet G5A, thus pulling the permanent magnet G5A toward the stator pole G5J in the CCW.

At the same time, a direct current is supplied to flow through stator windings G57 and G56 located at both sides of the stator pole G5G in directions indicated by the circled cross and the circled dot. The direct current flowing through the stator windings G57 and G56 excites the stator pole G5G, thus generating a magnetomotive force illustrated by an arrow in the stator pole G5G. This generates a magnetic attractive force between the stator pole G5G and the permanent magnet G5P, thus pulling the permanent magnet G5P toward the stator pole G5G in the CCW.

Simultaneously, a direct current is supplied to flow through stator windings G53 and G52 located at both sides of the stator pole G5C in directions indicated by the circled cross and the circled dot. The direct current flowing through the stator windings G53 and G52 excites the stator pole G5C, thus generating a magnetomotive force illustrated by an arrow in the stator pole G5C. This generates a magnetic attractive force between the stator pole G5C and the permanent magnet G5L, thus pulling the permanent magnet G5L toward the stator pole G5C in the CCW.

Figure 84:
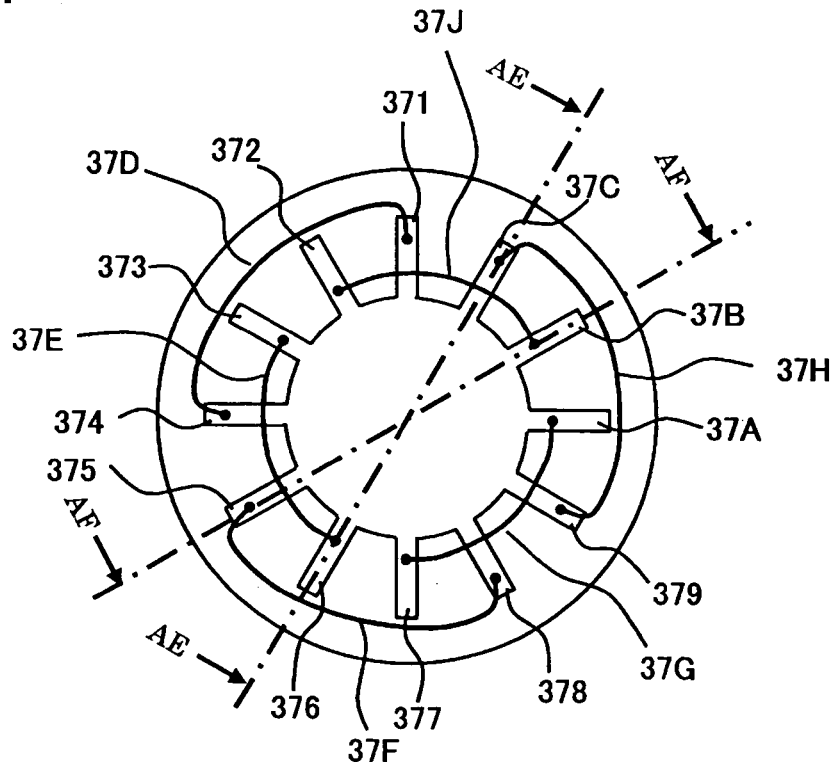
FIG. 84 is a lateral cross sectional view schematically illustrating a four-pole, twelve-slot stator model according to the first embodiment and its modifications while being viewed from an axial end side of the rotor.

In (d) of FIG. 84, in order to create a torque T in the CCW, a direct current is supplied to flow through stator windings G5B and G5A located at both sides of the stator pole G5K in directions indicated by the circled cross and the circled dot. The direct current flowing through the windings G53 and G5A excites the stator pole G5K, thus generating a magnetomotive force illustrated by an arrow in the stator pole G5K. This generates a magnetic attractive force between the stator pole G5K and the permanent magnet G5S, thus pulling the permanent magnet G5S toward the stator pole G5K in the CCW.

Simultaneously, a direct current is supplied to flow through stator windings G57 and G58 located at both sides of the stator pole G5H in directions indicated by the circled cross and the circled dot. The direct current flowing through the stator windings G57 and G58 excites the stator pole G5H, thus generating a magnetomotive force illustrated by an arrow in the stator pole G5H. This generates a magnetic attractive force between the stator pole G5H and the permanent magnet G5Q, thus pulling the permanent magnet G5Q toward the stator pole G5H in the CCW.

At the same time, a direct current is supplied to flow through stator windings G55 and G54 located at both sides of the stator pole G5E in directions indicated by the circled cross and the circled dot. The direct current flowing through the stator windings G55 and G54 excites the stator pole G5E, thus generating a magnetomotive force illustrated by an arrow in the stator pole G5E. This generates a magnetic attractive force between the stator pole G5E and the permanent magnet G5G, thus pulling the permanent magnet G5G toward the stator pole G5E in the CCW.

Simultaneously, a direct current is supplied to flow through stator windings G53 and G54 located at both sides of the stator pole G5D in directions indicated by the circled cross and the circled dot. The direct current flowing through the stator windings G53 and G54 excites the stator pole G5D, thus generating a magnetomotive force illustrated by an arrow in the stator pole G5D. This generates a magnetic attractive force between the stator pole G5D and the permanent magnet G53, thus pulling the permanent magnet G53 toward the stator pole G5D in the CCW.

These operations are repeated to thereby create a continuous torque.

Various examples of reluctance motors in which a plurality of permanent magnets are provided in a rotor according to the first embodiment have been described. Except for the examples, various types of MSKR motors in which a plurality of permanent magnets are provided in a rotor can be included in the first embodiment of the present invention. In each of FIGS. 32 to 34, a plurality of permanent magnets are so mounted on the outer surface of the rotor as to be contacted to one another, but they can be mounted thereon at given pitches. Various deformations can be applied to the configuration of each of the permanent magnets and/or a plurality of soft magnetic portions located between the permanent magnets.

When the reluctance motors in which a plurality of permanent magnets are provided in a stator or rotor according to the first embodiment are served as power generators, an exciting current, such as the field current If, may be unused. When rectifying an AC voltage generated by each stator coil, in order to use positive and negative portions of the AC voltage, such a reluctance motor serving as a power generator needs to full-wave rectify the AC voltage.

Various motors according to the various modifications of the first embodiment, which have been described, can be combined to each other.

For example, in an eight-pole motor, four permanent magnets are mounted on the inner surfaces of respective four stator poles of a stator, and the remaining four stator poles are each formed by a soft magnetic material. This can achieve intermediate magnetic characteristics between the magnetic characteristics achieved when eight permanent magnets are mounted on the inner surfaces of the respective eight stator poles and the magnetic characteristics achieved when the eight stator poles are each formed by the same soft magnetic material.

Various motors according to the various modifications of the first embodiment, which have been described, can be combined to conventional motors.

Next, a fifteenth modification of the reluctance motor 110 according to the first embodiment will be described hereinafter.

Various motors according to the various modifications of the first embodiment, which have been described, can be designed as liner motors.

FIG. 35 schematically illustrates an example of the structure of a reluctance motor 110S according to the fifteenth modification of the first embodiment.

(a) of FIG. 35 is a cross sectional, view of the linear reluctance motor 110R in its longitudinal cross section, and (b) of FIG. 35 is a cross sectional view of the linear reluctance motor 110R in its lateral cross section.

The linear reluctance motor 110R is provided with a substantially cylindrical stator BST and a substantially annular slider (movable member) SLT. The linear reluctance motor 110R can be provided with a substantially cylindrical slider and a substantially annular stator.

The slider SLT is provided with an annular base and a plurality of annular salient poles (B28, B2D), (B29, B2E), (B2A, B2F), (B2B, B2G), (B2C, B2T9), . . . . Each of the annular salient poles (B28, B2D), (B29, B2E), (B2A, B2F), (B2B, B2G), (B2C, B2T9) radially inwardly projects from the inner surface of the annular base. The annular salient poles (B28, B2D), (B29, B2E), (B2A, B2F), (B23, B2G), (B2C, B2T9) are arranged in its axial direction at regular pitches.

The stator BST is composed of a cylindrical back yoke BY and a plurality of annular stator poles B21, B22, B23, B24, B25, and B26 arranged in its axial direction at regular pitches. Each of the annular stator poles B21, B22, B23, B24, B25, and B26 radially outwardly projects from the outer surface of the back yoke BY. The stator BST and the slider SLT are arranged such that, when one of the stator poles faces one of the salient poles of the slider SLT, an air gap B2V is formed between the one of the stator poles and the opposing one of the salient poles of the slider SLT.

The stator BST includes three-phase annular stator coils each wound around the back yoke BY.

A positive A-phase coil B2T and B2C is concentrically wound around the back yoke BY adjacent to the stator pole B26, and a negative A-phase coil B2Q and B2K is concentrically wound around the back yoke BY between the stator poles B23 and B24. A positive B-phase coil B2R and B2L is concentrically wound around the back yoke BY between the stator poles B24 and 1325, and a negative B-phase coil B2N and B2H is concentrically wound around the back yoke BY between the stator poles B21 and B22. A positive C-phase coil B2P and B2J is concentrically wound around the back yoke BY between the stator poles B22 and B23, and a negative C-phase coil B2M and B2S is concentrically wound around the back yoke BY between the stator poles B25 and B26.

The positive and negative A-phase coils are connected to each other in series by a connection wire, the positive and negative B-phase coils are connected to each other in series by a connection wire, and the positive and negative C-phase coils are connected to each other in series by a connection wire.

(a) of FIG. 35 schematically illustrates a part of the linear reluctance motor R in its axial direction, and therefor, the linear reluctance motor R can have a given length in its axial direction. In (b) of FIG. 35, reference character B2U represents the slider poles, and reference character B2H represents the stator poles.

The motor 110R is driven by the control device CC or CC1 in the same manner as the motor 110.

Specifically, when the stator BST and the slider SLT are located to have a positional relationship illustrated in (a) of FIG. 35, an A-phase current Ia is supplied by the control device CC or CC1 to flow through the positive A-phase coil B2T and B2C in the directions indicated by the circled cross and the circled clot, and through the negative A-phase coil B2K and B2Q in the directions indicated by the circled cross and the circled dot.

Simultaneously, a C-phase current Ic is supplied by the control device CC or CC1 to flow through the positive C-phase coil B2P and B2J in the directions indicated by the circled cross and the circled dot, and through the negative C-phase coil B2M and B2S in the directions indicated by the circled cross and the circled dot.

The A-phase current Ia flowing through the positive A-phase coil B2T and B2C and the C-phase current Ic flowing through the negative C-phase coil B2M and B2S excite the stator pole B26. The excited stator pole B26 pulls the salient pole (B23, B2G) in the right direction in (a) of FIG. 35. Similarly, the A-phase current Ia flowing through the negative A-phase coil B2K and B2Q and the C-phase current Ic flowing through the positive C-phase coil B2P and B2J excite the stator pole B23. The excited stator pole B23 pulls the salient pole (B29, B2E) in the right direction in (a) of FIG. 35.

Thus, the slider SLT is moved (slid) in the right direction.

Note that slide bearings and/or ball bearings can be provided between the stator BST and the slider SLT. The slide bearings and/or ball bearings can guide the slide of the slider SLT in its axial direction while keeping constant the air gap between each of the stator poles and a corresponding one of the slider poles when they are opposite to each other.

As described above, a linear motor system consisting of the linear reluctance motor 110R and the control device CC or CC1 can be lower in cost and size as compared with conventional linear motor systems.

In addition, in the linear motor system according to the fifteenth modification of the first embodiment, the four stator coils (B2T, B2C), (B2M, B2S), (B2K, B2Q), and (B2P, and B2J) in the total six stator coils contribute to create a torque, making it possible to provide the linear motor systems with high efficiency according to the fifteenth modification of the first embodiment.

A plurality of permanent magnets can be provided on/in the plurality of stator poles, respectively; this can increase a torque to be outputted from the linear motor systems according to the fifteenth modification.

The slider SLT and the stator BST can be reversed to each other such that the slider SLT has a cylindrical shape with salient poles, and the stator BST has an annular shape with a plurality of projecting stator poles.

The stator SLT can be designed to be movable in its axial direction to serve as a slider, and the slider SLT can be designed to serve as a stator.

Various modifications and deformations can be applied to the linear motor 110R.

Next, a sixteenth modification of the reluctance motor 110 according to the first embodiment will be described hereinafter.

Figure 36:
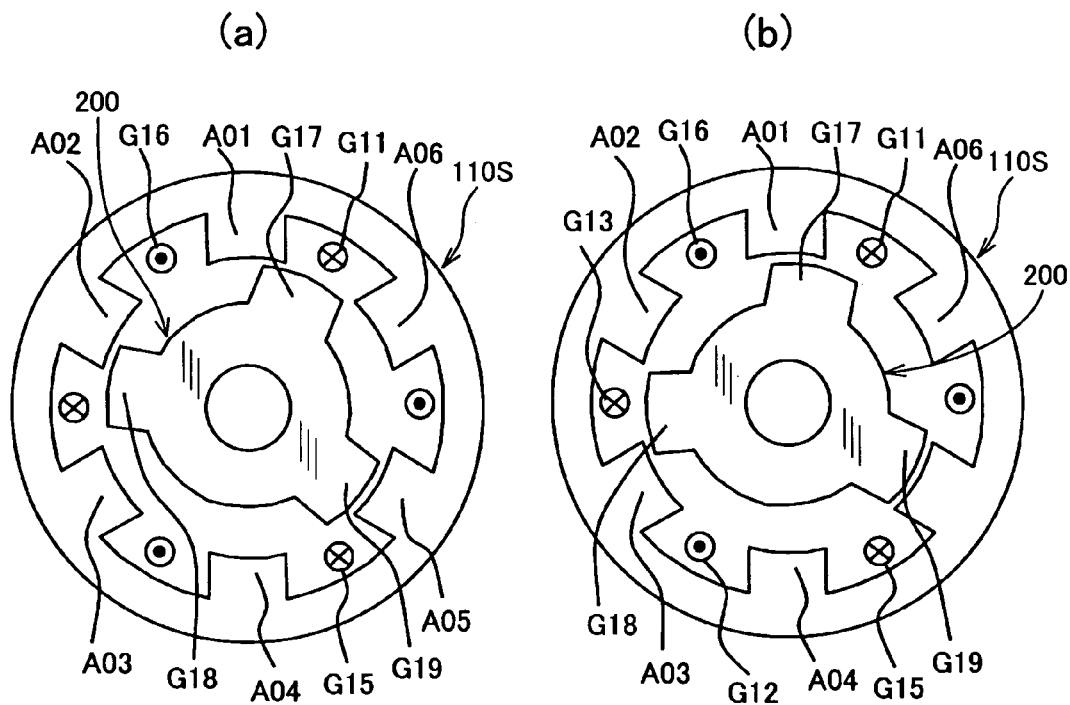
FIG. 36 is a lateral cross sectional view of a reluctance motor according to the sixteenth modification of the reluctance motor according to the first embodiment.

(a) and (b) FIG. 36 schematically illustrate an example of the structure of a reluctance motor 110S according to the sixteenth modification of the first embodiment.

The reluctance motor 110S is designed as 6S3R motor.

Specifically, in comparison to the structure of the motor 110 illustrated in FIG. 1B, the motor 110S is provided with a three-pole rotor 200.

Specifically, the rotor 110S has a substantially annular shape, and is provided at its outer circumference with three salient poles G17, G18, and G19. Each of the three salient poles G17, G18, and G19 is formed such that a corresponding outer circumference portion radially outwardly projects. Each of the salient poles G17, G18, and G19 has a substantially rectangular shape in its cross section orthogonal to the axial direction of the rotor 200. The outer surface of each of the salient poles G17, G18, and G19 has a convexly circumferentially rounded shape.

The three salient poles are circumferentially arranged at regular pitches.

In the motor 110S, each of the stator coils is not wound in full pitch winding because the number of the salient rotor poles is three.

For example, each of the stator coils is formed by toroidal coils, an example of which is illustrated in FIG. 14. Otherwise, when the motor 110S is designed as a dual motor, each of the stator coils is alternately wound in a corresponding one slot of the first stator and a corresponding one slot of the second stator radially aligned therewith (see FIG. 15).

(a) and (b) of FIG. 36 illustrate the situations in which the rotor 200 is rotated in the CCW in this order.

In (a) of FIG. 36, in order to create a torque T in the CCW, a direct current is supplied to flow through stator windings G11 and G16 located at both sides of the stator pole A01 in directions indicated by the circled cross and the circled dot. The direct current flowing through the windings G11 and G16 excites the stator pole A01, thus generating a magnetomotive force. This generates a magnetic attractive force between the stator pole A01 and the salient rotor pole G17, thus pulling the salient rotor pole G17 toward the stator pole A01 in the CCW.

In (b) of FIG. 36, in order to create a torque T in the CCW, a direct current is supplied to flow through stator windings G13 and G12 located at both sides of the stator pole A03 in directions indicated by the circled cross and the circled dot. The direct current flowing through the windings G13 and G12 excites the stator pole A03, thus generating a magnetomotive force. This generates a magnetic attractive force between the stator pole A03 and the salient rotor pole G18, thus pulling the salient rotor pole G18 toward the stator pole A03 in the CCW.

Switching any one adjacent pair of the stator windings depending upon the rotational position θr of the rotor 200 under control of the control device CC or CC1 achieves a continuous torque to continuously rotate the rotor 200. Each stator winding can excite two stator poles at both sides thereof.

Next, a seventeenth modification of the reluctance motor 110 according to the first embodiment will be described hereinafter.

Figure 37:
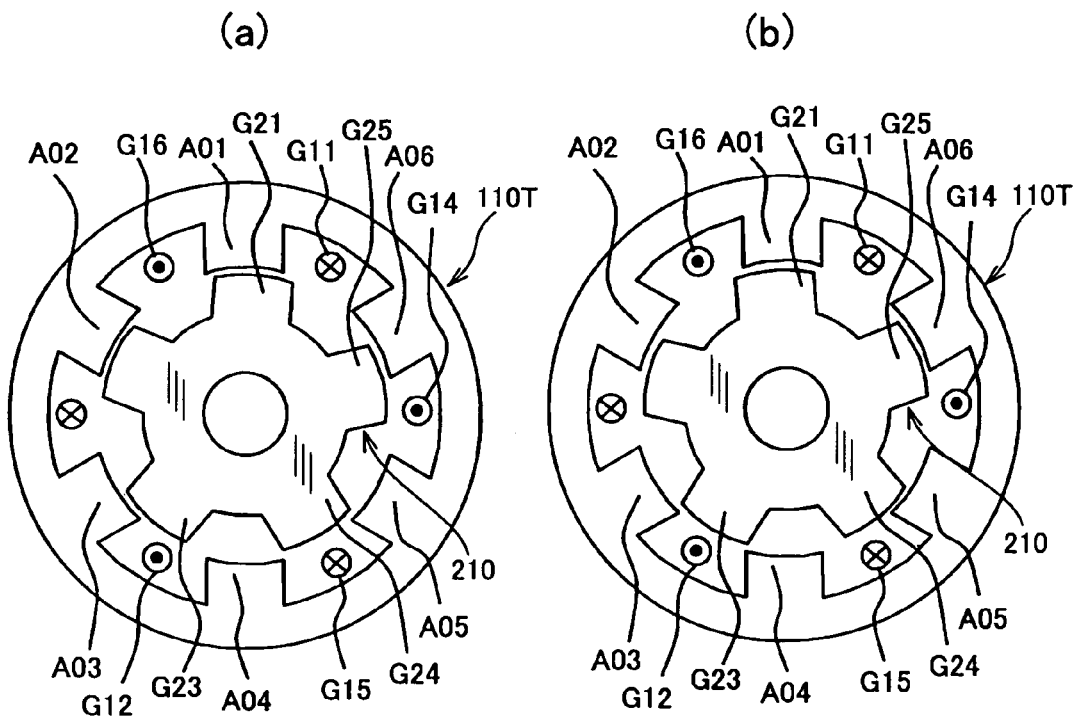
FIG. 37 is a lateral cross sectional view of a reluctance motor according to the seventeenth modification of the reluctance motor according to the first embodiment.

(a) and (b) FIG. 37 schematically illustrate an example of the structure of a reluctance motor 110T according to the seventeenth modification of the first embodiment.

The reluctance motor 110T is designed as 6S5R motor.

Specifically, in comparison to the structure of the motor 110 illustrated in FIG. 1B, the motor 110T is provided with a five-pole rotor 210.

Specifically, the rotor 110T has a substantially annular shape, and is provided at its outer circumference with five salient poles G21, G22, G23, G24, and G25. Each of the three salient poles G21, G22, G23, G24, and G25 is formed such that a corresponding outer circumference portion radially outwardly projects. Each of the salient poles G21, G22, G23, G24, and G25 has a substantially rectangular shape in its cross section orthogonal to the axial direction of the rotor 210. The outer surface of each of the salient poles G21, G22, G23, G24, and G25 has a convexly circumferentially rounded shape.

The five salient poles are circumferentially arranged at regular pitches.

In the motor 110T, each of the stator coils is not wound in full pitch winding because the number of the salient rotor poles is three.

For example, each of the stator coils is formed by toroidal coils, an example of which is illustrated in FIG. 14. Otherwise, when the motor 110T is designed as a dual motor, each of the stator coils is alternately wound in a corresponding one slot of the first stator and a corresponding one slot of the second stator radially aligned therewith (see FIG. 15).

(a) and (b) of FIG. 37 illustrate the situations in which the rotor 210 is rotated in the CCW in this order.

In (a) of FIG. 37, in order to create a torque T in the CCW, a direct current is supplied to flow through stator windings G11 and G14 located at both sides of the stator pole A06 in directions indicated by the circled cross and the circled dot. The direct current flowing through the windings G11 and G14 excites the stator pole A06, thus generating a magnetomotive force. This generates a magnetic attractive force between the stator pole A06 and the salient rotor pole G25, thus pulling the salient rotor pole G25 toward the stator pole A06 in the CCW.

At the same time, a direct current is supplied to flow through stator windings G15 and G14 located at both sides of the stator pole A05 in directions indicated by the circled cross and the circled dot. The direct current flowing through the windings G15 and G14 excites the stator pole A05, thus generating a magnetomotive force. This generates a magnetic attractive force between the stator pole A05 and the salient rotor pole G24, thus pulling the salient rotor pole G24 toward the stator pole A05 in the CCW.

In (b) of FIG. 37, in order to create a torque T in the CCW, a direct current is supplied to flow through stator windings G15 and G12 located at both sides of the stator pole A04 in directions indicated by the circled cross and the circled dot. The direct current flowing through the windings G15 and G12 excites the stator pole A04, thus generating a magnetomotive force. This generates a magnetic attractive force between the stator pole A04 and the salient rotor pole G23, thus pulling the salient rotor pole G23 toward the stator pole A04 in the CCW.

At the same time, a direct current is supplied to flow through stator windings G15 and G14 located at both sides of the stator pole A05 in directions indicated by the circled cross and the circled dot. The direct current flowing through the windings G15 and G14 excites the stator pole A05, thus generating a magnetomotive force. This generates a magnetic attractive force between the stator pole A05 and the salient rotor pole G24, thus pulling the salient rotor pole G24 toward the stator pole A05 in the CCW.

Switching any two pairs of adjacent windings in all of the stator windings depending upon the rotational position θr of the rotor 210 under control of the control device CC or CC1 achieves a continuous torque to continuously rotate the rotor 210. Each stator winding can excite two stator poles at both sides thereof.

In each of the motors 110S and 110T, a circumferential width of each stator pole and each salient rotor pole can be changed as needed. In each of the motors 110S and 110T, an integral multiple of the number of stator poles and that of the rotor poles can deform each of the motors 110S and 110T as a multi-pole motors. A multi-phase motor based on each of the motors 110S and 110T can improve the geometrical balance thereof. A change of the direction of at least one of the stator windings of each of the motors 110S and 110T allows all of the created magnetic fluxes to be balanced to each other.

Reluctance motors each with a rotor having six or more salient poles can generate a torque, and has a feature that is capable of running with low torque ripples within a relatively lower torque range.

MSKR motors each with a stator having odd stator poles can be included within the scope of the present invention.

When a reluctance motor with a stator having odd stator poles according to the first embodiment is used, magnetomotive-force generation by a stator pole may become inconvenient due to the direction of a current in one slot.

There are various measures to solve such an inconvenient problem.

The first measure is not to use such an inconvenient stator pole. The second measure is to control the flow of a current through a stator winding in positive and negative directions; this stator winding is associated with such an inconvenient stator pole. The third measure is to provide two stator windings in the one slot, and to cause a unidirectional current to flow through one of the two stator windings in a positive direction and a unidirectional current to flow through the other in a negative direction. That is, because the magnetomotive-force generation inconvenient problem is due to a part of a reluctance motor with a stator having odd stator poles, various measures, examples of which have been described, can address the problem on the condition that some burden of cost is accepted. In order to achieve a specific relationship between the number of stator poles and that of rotor poles, it is possible to set the number of stator poles and that of rotor poles to an odd number. Similarly, when there is a restriction to implement a reluctance motor according to the first embodiment and its modifications, it is possible to set the number of stator poles and that of rotor poles to an odd number.

Next, an eighteenth modification of the reluctance motor 110 according to the first embodiment will be described hereinafter.

Figure 38:
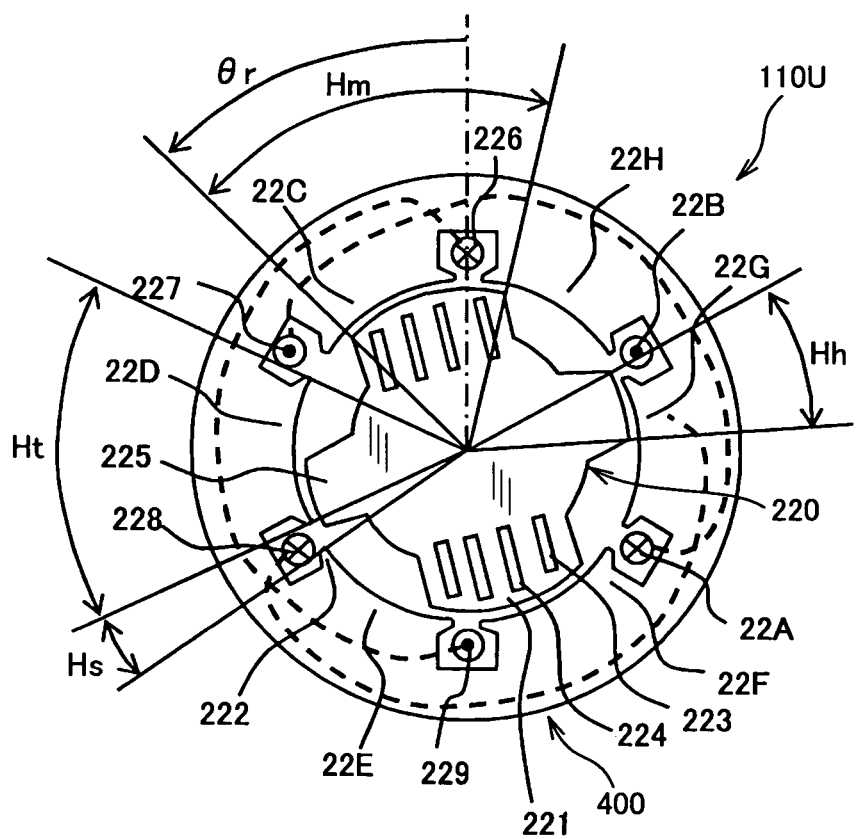
FIG. 38 is a lateral cross sectional view of a reluctance motor according to the eighteenth modification of the reluctance motor according to the first embodiment.

FIG. 38 schematically illustrate an example of the structure of a reluctance motor 110U according to the eighteenth modification of the first embodiment.

The reluctance motor 110U is designed as 6S4R motor using hill-pitch winding, and the configurations of each stator pole, each slot and each rotor pole are deformed.

Specifically, in comparison to the structure of the motor 110 illustrated in FIG. 1B, the motor 110V is provided with a substantially annular stator core 400 and a four-pole rotor 220.

As different points between the stator core 4 and the stator core 400, the stator core 400 is provided with six slots each having an inner flanged opening 222. The inner flanged opening 222 of each sot has a short circumferential electrical angular width Hs enough that a stator winding can be installed.

The stator core 400 is also provided with six teeth 22C, 22D, 22E, 22F, 22G, and 22H each formed between a corresponding pair of adjacent slots. The six teeth 22C, 22D, 22E, 22F, 22G, and 22H radially inwardly project from, the inner circumference of the back yoke BY. Each of the teeth 22C, 22D, 22E, 22F, 22G, and 22H has an inner surface with a circumferential electrical angular width Ht; this circumferential electrical angular width Ht is close to 60 electrical degrees.

The rotor 220 has a substantially annular shape, and is provided at its outer circumference with four salient poles, in other words, first and second pairs of opposing salient poles. Each of the four salient poles is formed such that a corresponding outer circumference portion radially outwardly projects.

Each of the salient poles has a substantially rectangular shape in its cross section orthogonal to the axial direction of the rotor 220. The outer surface of each of the salient poles has a convexly circumferentially rounded shape.

The four salient poles are circumferentially arranged at regular pitches.

The circumferential electrical angular width Hm of each of the opposing salient poles 221 of the first pair is greater than the circumferential electrical angular width Hh of each of the opposing salient poles 222 of the second pair.

The structure of the rotor 220 allows the opposing salient poles 221 of the first pair and the opposing salient poles 222 of the second pair to alternately contribute to create a torque at a lower RPM of the rotor 200. As the RPM of the rotor 200 is increased, the use of the opposing salient poles 222 of the second pair to create a torque is reduced so as to increase the use of the opposing salient poles 221 of the first pair. This simplifies a drive algorism for the reluctance motor 110U. The structure of the rotor 220 also aims at reducing iron loss, motor vibrations, and/or motor noise.

As each of three-phase stator coils of the motor 110U, a concentrated, full pitch winding is used.

An A-phase coil 226 and 229 is concentrically wound in a slot between the stator poles 22H and 22C and in a slot between the stator poles 22E and 22F at a pitch of 180 electrical degrees. A dashed line connecting between the positive A-phase winding 226 and the negative A-phase winding 229 represents an end of the A-phase coil.

A B-phase coil 228 and 22B is concentrically wound in a slot between the stator poles 22D and 22E and in a slot between the stator poles 22G and 22H at a pitch of 180 electrical degrees. A dashed line connecting between the positive B-phase winding 228 and the negative B-phase winding 22B represents an end of the B-phase coil.

A C-phase coil 22A and 227 is concentrically wound in a slot between the stator poles 22F and 22G and in a slot between the stator poles 22C and 22D at a pitch of 180 electrical degrees. A dashed line connecting between the positive C-phase winding 22A and the negative C-phase winding 227 represents an end of the C-phase coil.

Each of the opposing salient poles 221 of the first pair is formed with, as an example of holes, a plurality of, for example four, slits 223 and 224 each has a preset length and radially extends. The four slits 223 and 224 fanned in one salient rotor pole 221 of the first pair are radially aligned with the four slits formed in the other salient rotor pole 221 of the first pair.

The slits 223 and 224 aim at preventing the magnetic flux at each rotor pole from being excessively increased, and making uniform the distribution of the magnetic fluxes at the rotor poles. The shape of each slit or hole can be variably determined.

A closed looped conductor or conductor plate can be installed in each slit; this conductor or conductor plate induces a current that impedes the change of the magnetic flux passing through a corresponding slit to thereby restrict the distribution of the magnetic fluxes. In addition, the four slits formed in one salient rotor pole 221 of the first pair and four slits formed in the other salient rotor pole 221 of the first pair can be connected to each other.

A reference position R illustrated in FIG. 38 is a plane passing through the center of the positive A-phase winding 226 and the center axis of the rotor 220. A present rotational position of the rotor 220 is represented by θr between one edge of one salient pole 221 leading the rotation of the rotor 220 and the reference position R illustrated in FIG. 38.

In FIG. 38, in order to create a torque T in the CCW, an A-phase current Ia with a preset level is supplied to flow through the A-phase coil 226 and 229 in the directions indicated by the circled cross and the circled dot. Similarly, a C-phase current Ic with the same level is supplied to flow through the C-phase coil 22A and 227 in the directions indicated by the circled cross and the circled dot.

The A- and C-phase currents flowing through the respective A- and C-phase coils excite the stator poles 22C and 22F, thus generating a magnetic flux from the stator pole 22F to the stator pole 22C through the rotor 220. This generates a magnetic attractive force between the stator pole 220 and, one salient pole 221 of the rotor 220, and that between the stator pole 22F and the other salient pole 221. The magnetic attractive forces gull the one salient pole 221 toward the stator pole 22C, and the other salient pole 221 toward the stator pole 22F in the CCW.

The level of each of the A- and C-phase currents Ia and Ie can be determined based on the value a torque command Tc. More accurately, the level of each of the A- and C-phase currents Ia and Ic is a function of the rotational position θr of the rotor 220 due to the flux leakage in the space between the rotor 220 and the stator core 400 and the magnetic non-linearity of the soft magnetic material. At that time, the level of a B-phase current is set to be zero.

However, the levels of the A-, B-, and C-phase currents can be variably set for the purpose of the motor 110U.

For example, at a higher RPM of the rotor 220, it is effective to advance the phase of each phase current in view of a delay in current-increase and current-reduction responses. An addition of a level in each phase current to a corresponding phase current as an offset level allows the radial attractive force in the motor 110U to become stable, thus reducing vibrations of the motor 110U and noise thereby.

As described later, a C-phase current Ic can be supplied to negatively flow through the positive C-phase winding 22A out of the paper of FIG. 38 (in the reverse direction of the circled cross) and to positively flow the negative C-phase winding 227 into the paper of FIG. 38 (in the reverse direction of the circled dot). This can increase a torque, thus improving the average output torque of the motor 110U.

As described above, various methods for supplying three-phase currents, each having a given level, to three-phase stator coils can be used, and therefore, they are included in the scope of the present invention.

An integral multiple of the number of stator poles and that of the rotor poles of the motor 110U in its circumferential direction while increasing another portion of the motor 110U as need arises can deform the motor 110U as a multi-pole motor. This multi-pole motor can reduce the length of the end of each of the stator coils and the radial thickness of the back yoke BY.

Let us describe characteristics of reluctance motors each with a stator having eight stator poles (M=8) hereinafter.

As illustrated in, for example, FIG. 33, two stator windings disposed in circumferentially adjacent slots of each pair are arranged such that a direct current to be supplied to one of the two stator windings is opposite in direction to that to be supplied to the other thereof. However, a same-directional current is supplied to flow through each of two stator winding G43 and G47 located at a pitch of 180 electrical degrees. Thus, in such reluctance motor having an eight pole stator, each of the stator coils is not wound in full pitch winding.

For example, each of the stator coils is formed by toroidal coils, an example of which is illustrated in FIG. 14. Otherwise, when the motor is designed as a dual motor, each of the stator coils is alternately wound in a corresponding one slot of the first stator and a corresponding one slot of the second stator radially aligned therewith (see FIG. 15).

In such reluctance motors each having an eight pole stator, the number K of rotor poles can be set to equal to or greater than 2. When K is set to 2, the rotor 11E illustrated in FIG. 9 can be used. The rotor 11E can be rotatably driven by sequentially pulling, by each stator pole, a corresponding one of the two rotor poles set forth above. In this structure, it is necessary to provide a bypass path for magnetic fluxes between the back yoke of the stator and a back yoke of the rotor. In this structure, in FIG. 39, rotor poles B3B and B3D can be eliminated. In a torque reduction region, a generation of a torque by flux leakage, skews of the rotor, and/or stepped skews can be applied to such reluctance motors each having an eight pole stator.

8S2R motors according to the first embodiment and its modifications have a feature that a freedom of overlapping torques created by circumferentially adjacent stator poles is more increased in comparison to 6S2R motors according to the first embodiment and its modifications.

Specifically, in a 6S2R motor, when the rotor is located at a rotational, position when a torque is shifted, a current is overlappedly supplied so that each of two stator poles creates a forward (positive) torque, a reverse (negative) torque may be created by another stator pole.

Against such a problem, in a 8S2R motor, when the rotor is located at a rotational position when a torque is shifted, even if a current is overlappedly supplied so that each of two stator poles creates a forward (positive) torque, magnetomotive force can be little affected to another stator pole close to one rotor pole. This makes it possible to easily achieve excellent torque characteristics.

Next, a nineteenth modification of the reluctance motor 110 according to the first embodiment will be described hereinafter.

(a) and (b) of FIG. 39 schematically illustrate an example of the structure of a reluctance motor (8S4R motor) 110V according to the nineteenth modification of the first embodiment.

In comparison to the structure of the motor 110 illustrated in FIG. 1B, the motor 110V is provided with eight stator poles (the number M is eight), which are represented by B31, B32, B33, B34, B35, B36, B37, and B38, and a four-pole rotor 230 (the number K is four).

The rotor 230 has a substantially annular shape, and has, at its outer circumference, with four salient poles B3A, B3B, B3C, and B3D. Each of the four salient poles B3A, B3B, B3C, and B3D is formed such that its corresponding outer circumference portion radially outwardly projects.

Each of the salient poles has a substantially rectangular shape in its cross section orthogonal to the axial direction of the rotor 230. The outer surface of each of the salient poles has a convexly circumferentially rounded shape.

The four salient poles are circumferentially asymmetrically arranged with respect to the axial direction of the rotor 230 (output shaft 1). In other words, the four salient poles are biased to one circumferential part of the rotor 230.

Eight stator coils B3J, B3K, B3L, B3M, B3N, B3P, B3Q, and B3H are wound in the stator core.

The stator coil B3J is wound in a slot between the stator poles 831 and B32, the stator coil B3K is wound in a slot between the stator poles B32 and B33, and the stator coil B3L is wound in a slot between the stator poles B33 and B34. The stator coil B3M is wound in a slot between the stator poles B34 and B35, the stator coil B3N is wound in a slot between the stator poles B35 and B36, and the stator coil B3P is wound in a slot between the stator poles B36 and B37. The stator coil B3Q is wound in a slot between the stator poles B37 and B38, and the stator coil B3H is wound in a slot between the stator poles B38 and B31.

In the reluctance motor 110V, each of the stator coils is not wound in full pitch winding.

For example, each of the stator coils is formed by toroidal coils, an example of which is illustrated in FIG. 14. Otherwise, when the motor 110V is designed as a dual motor, each of the stator coils is alternately wound in a corresponding one slot of the first stator and a corresponding one slot of the second stator radially aligned therewith (see FIG. 15).

The 8S4R motor 110V can be driven in the same manner as the 6S4R motor 110 according to the first embodiment.

Specifically, in the rotor position illustrated in (a) of FIG. 39, in order to create a torque in the CCW, a direct current is supplied to flow through the stator windings B3N and B3M in the directions indicated by the circled cross and the circled dot. The direct current flowing through the windings B3N and B3M excites the stator pole B35, thus generating a magnetic attractive force between the stator pole B35 and the salient rotor pole B38. This pulls the salient rotor Pole B3B toward the stator pole B35 in the CCW, thus creating a torque in the CCW.

At the same time, a direct current is supplied to flow through the stator windings B3Q and B3H in the directions indicated by the circled cross and the circled dot. The direct current flowing through the windings B3Q and B3H excites the stator pole B38, thus generating a magnetic attractive force between the stator pole B38 and the salient rotor pole B3D. This pulls the salient rotor pole B3D toward the stator pole B38 in the CCW, thus creating a torque in the CCW.

After the rotor 230 is slightly rotated from the rotor position illustrated in (a) of FIG. 39 in the CCW, in the rotor position illustrated in (b) of FIG. 39, in order to create a torque in the CCW, a direct current is supplied to flow through the stator windings B3J and B3K in the directions indicated by the circled cross and the circled dot. The direct current flowing through the windings B3J and B3K excites the stator pole B32, thus generating a magnetic attractive force between the stator pole B32 and the salient rotor pole B3A. This pulls the salient rotor pole B3A toward the stator pole B32 in the CCW, thus creating a torque in the CCW.

At the same time, a direct current is supplied to flow through the stator windings B3Q and B3P in the directions indicated by the circled cross and the circled dot. The direct current flowing through the windings B3Q and B3P excites the stator pole B37, thus generating a magnetic attractive force between the stator pole B37 and the salient rotor pole B3C. This pulls the salient rotor pole B3C toward the stator pole B37 in the CCW, thus creating a torque in the CCW.

Switching any one adjacent pair of the stator windings depending upon the rotational position θr of the rotor 230 under control of the control device CC or CC1 achieves a continuous torque to continuously rotate the rotor 230. Each stator winding can excite two stator poles at both sides thereof.

Next, a twentieth modification of the reluctance motor 110 according to the first embodiment will be described hereinafter.

(a) and (b) of FIG. 40 schematically illustrate an example of the structure of a reluctance motor (8S6R motor) 110W according to the twentieth modification of the first embodiment.

In comparison to the structure of each of the motors 110 and 110V, the motor 110W is provided with the eight stator poles B31, B32, B33, B34, B35, B36, B37, and B38, and a six-pole rotor 240 (the number K is six).

The rotor 240 has a substantially annular shape, and has, at its outer circumference, with six salient poles B3R, B3S, B3T, B3U, B3V, and B3W. Each of the six salient poles B3R, B3S, B3T, B3U, B3V, and B3W is formed such that its corresponding outer circumference portion radially outwardly projects.

Each of the salient poles has a substantially rectangular shape in its cross section orthogonal to the axial direction of the rotor 240. The outer surface of each of the salient poles has a convexly circumferentially rounded shape.

The six salient poles are circumferentially arranged at regular pitches.
Each of the stator coils B3J, B3K, B3L, B3M, B3N, B3P, B3Q, and B3H is wound in a corresponding slot between a corresponding pair of circumferentially adjacent stator poles around a corresponding portion of the back yoke BY via a path B3Y in the form of a toroidal coil.

In the rotor position illustrated in (a) of FIG. 40, in order to create a torque in the CCW, a direct current is supplied to flow through the stator coils 83J and B3H in the directions indicated by the circled cross and the circled dot. The direct current flowing through the coils B3J and B3H excites the stator pole B31, thus generating a magnetic attractive force between the stator pole B31 and the salient rotor pole B3R. This pulls the salient rotor pole B3R toward the stator pole B31 in the CCW, thus creating a torque in the CCW.

At the same time, a direct current is supplied to flow through the stator coils B3J and B3K in the directions indicated by the circled cross and the circled dot. The direct current flowing through the coils B3J and B3K excites the stator pole B32, thus generating a magnetic attractive force between the stator pole B32 and the salient rotor pole B3S. This pulls the salient rotor pole B3S toward the stator pole B32 in the CCW, thus creating a torque in the CCW.

Simultaneously, a direct current is supplied to flow through the stator coils B3N and B3M in the directions indicated by the circled cross and the circled dot. The direct current flowing through the coils B3N and B3M excites the stator pole B35, thus generating a magnetic attractive force between the stator pole B35 and the salient rotor pole B3U. This pulls the salient rotor pole B3U toward the stator pole B35 in the CCW, thus creating a torque in the CCW.

At the same time, a direct current is supplied to flow through the stator coils B3N and B3P in the directions indicated by the circled cross and the circled dot. The direct current flowing through the coils B3N and B3P excites the stator pole B36, thus generating a magnetic attractive force between the stator pole B36 and the salient rotor pole B3V. This pulls the salient rotor pole B3V toward the stator pole B36 in the CCW, thus creating a torque in the CCW.

After the rotor 240 is rotated from the rotor position illustrated in (a) of FIG. 40, in the rotor position illustrated in (b) of FIG. 40, in order to create a torque in the CCW, a direct current is supplied to flow through the stator coils B3Q and B3H in the directions indicated by the circled cross and the circled dot. The direct current flowing through the coils B3Q and B3H excites the stator pole B38, thus generating a magnetic attractive force between the stator pole B38 and the salient rotor pole B3W. This pulls the salient rotor pole B3W toward the stator pole B38 in the CCW, thus creating a torque in the CCW.

At the same time, a direct current is supplied to flow through the stator coils B3J and B3H in the directions indicated by the circled cross and the circled dot. The direct current flowing through the coils B3J and B3H excites the stator pole B31, thus generating a magnetic attractive force between the stator pole B31 and the salient rotor pole B3R. This pulls the salient rotor pole B3R toward the stator pole B31 in the CCW, thus creating a torque in the CCW.

Simultaneously, a direct current is supplied to flow through the stator coils B3L and B3M in the directions indicated by the circled cross and the circled dot. The direct current flowing through the coils B3L and B3M excites the stator pole B34, thus generating a magnetic attractive force between the stator pole B34 and the salient rotor pole B3T. This pulls the salient rotor pole B3T toward the stator pole B34 in the CCW, thus creating a torque in the CCW.

At the same time, a direct current is supplied to flow through the stator coils B3N and B3M in the directions indicated by the circled cross and the circled dot. The direct current flowing through the coils B3N and B3M excites the stator pole B35, thus generating a magnetic attractive force between the stator pole B35 and the salient rotor pole B3U. This pulls the salient rotor pole B3U toward the stator pole B35 in the CCW, thus creating a torque in the CCW.

Switching any one adjacent pair of the stator coils depending upon the rotational position θr of the rotor 230 under control of the control device CC or CC1 achieves a continuous torque to continuously rotate the rotor 240.

Let us describe characteristics of reluctance motors each with a stator having ten stator poles (M=10) hereinafter.

As illustrated in, for example, FIG. 41 described later, two stator windings disposed in circumferentially adjacent slots of each pair are arranged such that a direct current to be supplied to one of the two stator windings is opposite in direction to that to be supplied to the other thereof.

In addition, a direction of a current to be supplied to flow through a stator winding, for example, B5M and that of a current to be supplied to flow through a stator winding, for example, B5S, which are located at a pitch of 180 electrical degrees, are opposite to each other.

Thus, in such reluctance motor having a ten pole stator, each of the stator coils can be wound in full pitch winding. In full pitch winding, the A-phase coil consists of a positive A-phase winding B5M and a negative A-phase winding B5S, and the B-phase coil consists of a positive B-phase winding B5P and a negative B-phase winding 135U. In addition, C-phase coil consists of a positive C-phase winding B5R and a negative C-phase winding B5W, a D-phase coil consists of a positive D-phase winding BST and a negative D-phase winding B5N, and an E-phase coil consists of a positive E-phase winding B5V and a negative E-phase winding B5Q.

Each of the stator coils can be formed by toroidal coils, an example of which is illustrated in FIG. 14. Otherwise, when the motor is designed as a dual motor, each of the stator coils is alternately wound in a corresponding one slot of the first stator and a corresponding one slot of the second stator radially aligned therewith (see FIG. 15).

In such reluctance motors each having a ten pole stator, the number K of rotor poles can be set to equal to or greater than 2. When K is set to 2, the rotor 11E illustrated in FIG. 9 can be used. The rotor 11E can be rotatably driven by sequentially pulling, by each stator pole, a corresponding one of the two rotor poles set forth above. In this structure, it is necessary to provide a bypass path for magnetic fluxes between the back yoke of the stator and a, back yoke of the rotor. In this structure, in FIG. 39, rotor poles B3B and B3D can be eliminated. In a torque reduction region, a generation of a torque by flux leakage, skews of the rotor, and/or stepped skews can be applied to such reluctance motors each having an eight pole stator.

10S2R motors according to the first embodiment and its modifications have a feature that a freedom of overlapping torques created by circumferentially adjacent stator poles is more increased in comparison to 6S2R motors according to the first embodiment and its modifications.

Specifically, in a 6S2R motor, when the rotor is located at a rotational position when a torque is shifted, a current is overlappedly supplied so that each of two stator poles creates a forward (positive) torque, a reverse (negative) torque may be created by another stator pole.

Against such a problem, in a 10S2R motor, when the rotor is located at a rotational position when a torque is shifted, even if a current is overlappedly supplied so that each of two stator poles creates a forward (positive) torque, magnetomotive force can be little affected to another stator pole close to one rotor pole. This makes it possible to easily achieve excellent torque characteristics.

In addition, in comparison to the 8S2R motors, a full pitch winding can be used for a 10S2R, and no specific design for the directions of the magnetic fluxes can be applied to a 10S2R motor.

Next, a twenty-first modification of the reluctance motor 110 according to the first embodiment will be described hereinafter.

Figure 41:
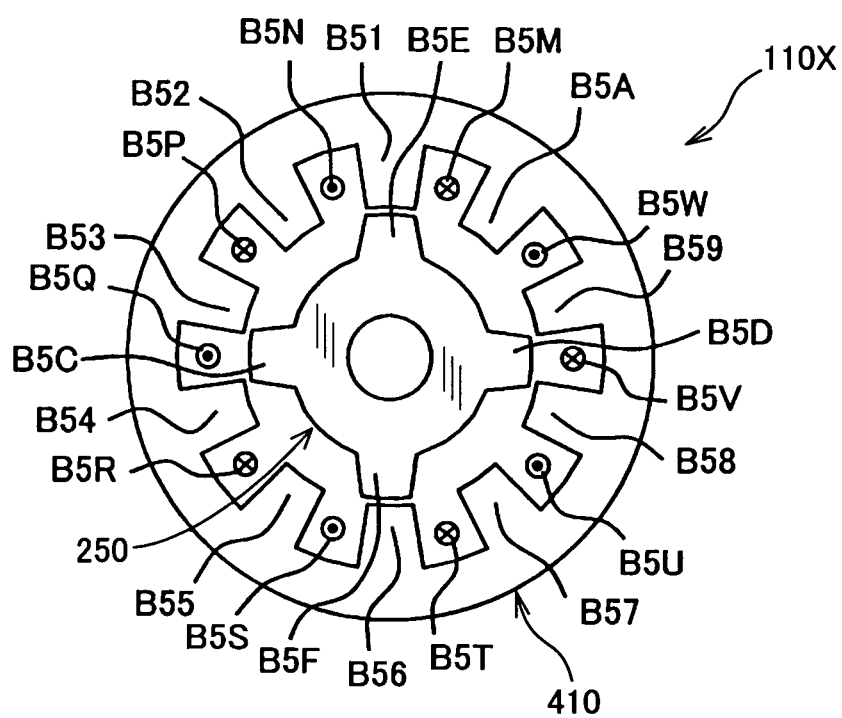
FIG. 41 is a lateral cross sectional view of a reluctance motor according to the twenty-first modification of the reluctance motor according to the first embodiment.

FIG. 41 schematically illustrate an example of the structure of a reluctance motor (10S4R motor) 110X according to the twenty-first modification of the first embodiment.

In comparison to the structure of the motor 110 illustrated in FIG. 1B, the motor 110X is provided with ten stator poles (the number M is ten), which are represented by B51, B52, B53, B54, B55, B56, B67, B58, B59, and B5A, and a four-pole rotor 250 (the number K is four).

The rotor 250 has a substantially annular shape, and has, at its outer circumference, with four salient poles B5C, B5D, B5E, and B5F. Each of the four salient poles B5C, B5D, B5E, and B5F is formed such that its corresponding outer circumference portion radially outwardly projects. One pair of salient poles B5C and B5D are radially opposite to each other, and the other pair of salient poles B5E and B5F are also radially opposite to each other.

The four salient poles are circumferentially arranged at regular pitches.

Ten stator windings (five pairs of stator coils) B5M, B5N, B5P, B5Q, B5R, B5S, B5T, B5U, B5V, and B5W are wound in the stator core.

The A-phase coil B5M and B5S are wound in opposing slots, one of which is between the stator poles B5A and B51 and the other is between the stator poles B55 and B56. The B-phase coil B5P and B5U are wound in opposing slots, one of which is between the stator poles B52 and B53 and the other is between the stator poles B57 and B58. The C-phase coil B5R and B5W are wound in opposing slots, one of which is between the stator poles B54 and B55 and the other is between the stator poles B59 and B5A.

The D-phase coil B5T and B5N are wound in opposing slots, one of which is between the stator poles B56 and B57 and the other is between the stator poles B51 and B52. The E-phase coil B5V and B5Q are wound in opposing slots, one of which is between the stator poles B58 and B59 and the other is between the stator poles B53 and B54.

The 10S4R motor 110X can be driven in the same manner as the 6S4R motor 110 according to the first embodiment illustrated in FIG. 4.

In accordance with the rotational position θr of the rotor 250, the one pair of salient poles B5E and B56 and the other pair of salient poles B5C and B5D are alternately excited by a unidirectional current to be supplied to at least one of the stator coils to thereby create a torque. The supply of a unidirectional current is carried out by a five-phase expanded control device based on the control device CC or CC1.

In the five-phase expanded structure, the efficiency of excitation of the five-pair stator coils using two power transistors in five power transistors is ⅖, in contrast, in the conventional three-phase inverter (see FIG. 123), the efficiency of excitation of the three-phase stator coils using one power transistor in six power transistors is ⅙.

Thus, the efficiency of excitation of the five-pair stator coils using the five-phase expanded control device is X times the efficiency of excitation of the three-phase stator coils using the conventional three-phase inverter; this X is represented by the following equation:

$$X = (1/6)/(2/5) = 1/2.4$$

This can reduce the total current capacitance of the expanded control device, thus reducing it in size.

Next, a modification of the 10S4R motor 110X will be described hereinafter.

FIG. 42 schematically illustrate an example of the structure of a reluctance motor (10S4R motor) 110X1 according to the modification of the 10S4R motor 110X.

To the ten stator poles of the 110X1, reference characters G91, G92, G93, G94, G95, G96, G97, G98, G99, and G9A are assigned in place of the reference characters B51, B52, B53, B54, B55, B56, B57, B58, B59, and B5A.

The reluctance motor 110X1 is designed such that the circumferential electrical angular width of each stator pole and each rotor pole is greater than that of each stator pole and each rotor pole of the reluctance motor 110X. In FIG. 42, an end of each coil is omitted in illustration.

In the rotor position illustrated in (a) of FIG. 42, in order to create a torque in the CCW, an A-phase current Ia is supplied to flow through the A-phase stator coil B5M and B5S in the directions indicated by the circled cross and, the circled dot. At the same time, a D-phase current Id is supplied to flow through the D-phase stator coil B5T and B5N in the directions indicated by the circled cross and the circled dot.

The A- and D-phase currents flowing through the respective A- and D-phase coils induce a magnetic flux G9F from the stator pole G96 to the stator pole G91. The induced magnetic flux G9F causes a magnetic attractive force between the stator pole G91 and the salient rotor pole G9B and between the stator pole G96 and the salient rotor pole G9D. The attractive force pulls the salient rotor pole G9B to the stator pole G91, and pulls the salient pole G9D to the stator pole G96. This creates a torque T in the CCW.

At the same time, a B-phase current Ib is supplied to flow through the B-phase Stator coil B5P and B5U in the directions indicated by the circled cross and the circled dot. At the same time, an E-phase current Ie is supplied to flow through the E-phase stator coil B5V and B5Q in the directions indicated by the circled cross and the circled dot.

The B- and E-phase currents flowing through the respective B- and E-phase coils induce a magnetic flux G9G from the stator pole G98 to the stator pole G93. The induced magnetic flux G9G causes a magnetic attractive force between the stator pole G93 and the salient rotor pole G90 and between the stator pole G98 and the salient rotor pole G9E. The attractive force polls the salient rotor pole G90 to the stator pole G93, and pulls the salient pole G9E to the stator pole G98. This creates a torque T in the CCW.

After the rotor 250 is slightly rotated from the rotor position illustrated in (a) of FIG. 42 in the CCW, in the rotor position illustrated in (b) of FIG. 42, the A-phase current Ia is supplied to flow through the A-phase stator coil B5M and B5S in the directions indicated by the circled cross and the circled dot. At the same time, the ID-phase current Id is supplied to flow through the D-phase stator coil BST and B5N in the directions indicated by the circled cross and the circled dot.

The A- and D-phase currents flowing through the respective A- and ID-phase coils induce a magnetic flux G9H from the stator pole G96 to the stator pole G91. The induced magnetic flux G9H causes a magnetic attractive force between the stator pole G91 and the salient rotor pole G9B and between the stator pole G96 and the salient rotor pole G9D. The attractive force pulls the salient rotor pole G9B to the stator pole G91, and pulls the salient pole G9D to the stator pole G96. This creates a torque T in the CCW.

At the same time, a C-phase current Ic is supplied to flow through the C-phase stator coil B5R and B5W in the directions indicated by the circled cross and the circled dot. At the same time, the E-phase current Ie is supplied to flow through the E-phase stator coil B5V and B5Q in the directions indicated by the circled cross and the circled dot.

The C- and E-phase currents flowing through the respective C- and E-phase coils induce a magnetic flux G9J from the stator pole G94 to the stator pole G99. The induced magnetic flux G9J causes a magnetic attractive force between the stator pole G94 and the salient rotor pole G9C and between the stator pole G99 and the salient rotor pole G9E. The attractive force pulls the salient rotor pole G9C to the stator pole G94, and pulls the salient pole G9E to the stator pole G99. This creates a torque T in the CCW.

In the rotor position illustrated in (c) of FIG. 42, the B-phase current

Ib is supplied to flow through the B-phase stator coil B5P and B5U in the directions indicated by the circled cross and the circled dot. At the same time, the ID-phase current Id is supplied to flow through the D-phase stator coil B5T and B5N in the directions indicated by the circled cross and the circled dot.

The B- and D-phase currents flowing through the respective B- and

1)-phase coils induce a magnetic flux G9K from the stator pole G92 to the stator pole G97. The induced magnetic flux G9K causes a magnetic attractive force between the stator pole G92 and the salient rotor pole G93 and between the stator pole G97 and the salient rotor pole G9D. The attractive force pulls the salient rotor pole G9B to the stator pole G92, and pulls the salient pole G9D to the stator pole G97. This creates a torque T in the CCW.

At the same time, the C-phase current Ic is supplied to flow through the C-phase stator coil B5R and B5W in the directions indicated by the circled cross and the circled dot. At the same time, the E-phase current Ie is supplied to flow through the E-phase stator coil B5V and B5Q in the directions indicated by the circled cross and the circled dot.

The C- and E-phase currents flowing through the respective C- and E-phase coils induce a magnetic flux G9L from the stator pale G94 to the stator pole G99. The induced magnetic flux G91 causes a magnetic attractive force between the stator pole G94 and the salient rotor pole G9C and between the stator pole G99 and the salient rotor pole G9E. The attractive force pulls the salient rotor pole G9C to the stator pole G94, and pulls the salient pole G9E to the stator pole G99. This creates a torque T in the CCW.

In the rotor position illustrated in (d) of FIG. 42, the B-phase current Ib is supplied to flow through the B-phase stator coil B5P and B5U in the directions indicated by the circled cross and the circled dot. At the same time, the ID-phase current Id is supplied to flow through the U-phase stator coil B5T and B5N in the directions indicated by the circled cross and the circled dot.

The B- and D-phase currents flowing through the respective B- and D-phase coils induce a magnetic flux G9M from the stator pole G92 to the stator pole G97. The induced magnetic flux G9M causes a magnetic attractive force between the stator pole G92 and the salient rotor pole G9B and between the stator pole G97 and the salient rotor pole G9D. The attractive force pulls the salient rotor pole G9B to the stator pole G92, and pulls the salient pole G9D to the stator pole G97. This creates a torque T in the CCW.

At the same time, the C-phase current Ic is supplied to flow through the C-phase stator coil B5R and B5W in the directions indicated by the circled cross and the circled dot. At the same time, the E-phase current Ie is supplied to flow through the E-phase stator coil B5V and 35Q in the directions indicated by the circled cross and the circled dot.

The C- and E-phase currents flowing through the respective C- and E-phase coils induce a magnetic flux G9N from the stator pole G94 to the stator pole G99. The induced magnetic flux G9N causes a magnetic attractive force between the stator pole G94 and the salient rotor pole G9C and between the stator pole G99 and the salient rotor pole G9E. The attractive force pulls the salient rotor pole G9C to the stator pole G94, and pulls the salient pole G9E to the stator pole G99. This creates a torque T in the CCW.

Switching the A, B, C, D, and E-phase currents Ia, Ib, Ic, Id, and Ie from one another depending upon the rotational position θr of the rotor 250 under control of the control device CC or CC1 achieves a continuous torque to continuously rotate the rotor 250. That is, the motor 110X1 is driven in four quadrature drive to turn the rotor 250 in the CCW and the CW, and designed such that a power running torque or a regeneration torque is applied to the rotor 250.

As described above, the reluctance motor 110X1 is designed such that a torque is created based on the four salient rotor poles, and the magnetic flux based on one pair of salient rotor poles is different in phase from that based on the other pair of salient rotor poles, thus reducing torque ripples. The reluctance motor 110X1 is designed such that four direct currents flowing through respective four stator coils in the five stator coils contribute to create a torque, thus effectively creating a torque.

In the 10S4R motor 110X1, however, an increase and decrease of a pair of magnetic fluxes intersect with each other. For this reason, energy transfer between the rotor 250 and a current flowing through each phase winding may be more complicated in comparison to the 6S2R motor 110A illustrated in FIG. 11.

Note that, for example, at the rotational position of the rotor 250 illustrated in (a) of FIG. 42, a voltage induced across the A-phase coil B5M and B5S is different from that induced across the D-phase stator coil B5T and B5N depending on the increase or decrease in the magnetic fluxes G9F and G9G.

As illustrated in (c) of FIG. 42, when one circumferential edge of the outer surface of each salient pole rotor in the counterclockwise direction is started to face the opening end of one slot of the stator core, a torque created by the situation may be a lower value. In order to address such a problem, various measures can be applied to the rotor. For example, the rotor can be skewed, or the shape of the rotor can be devised to create a torque based on flux leakage. These measures will be described later. In the motor 110X1, in order to reduce an end of each stator coil, each of the stator coils can be formed by toroidal coils, an example of which is illustrated in FIG. 14. When the motor 110X1 is designed as a dual motor, each of the stator coils is alternately wound in a corresponding one slot of the first stator and a corresponding one slot of the second stator radially aligned therewith (see FIG. 15).

Figure 43:
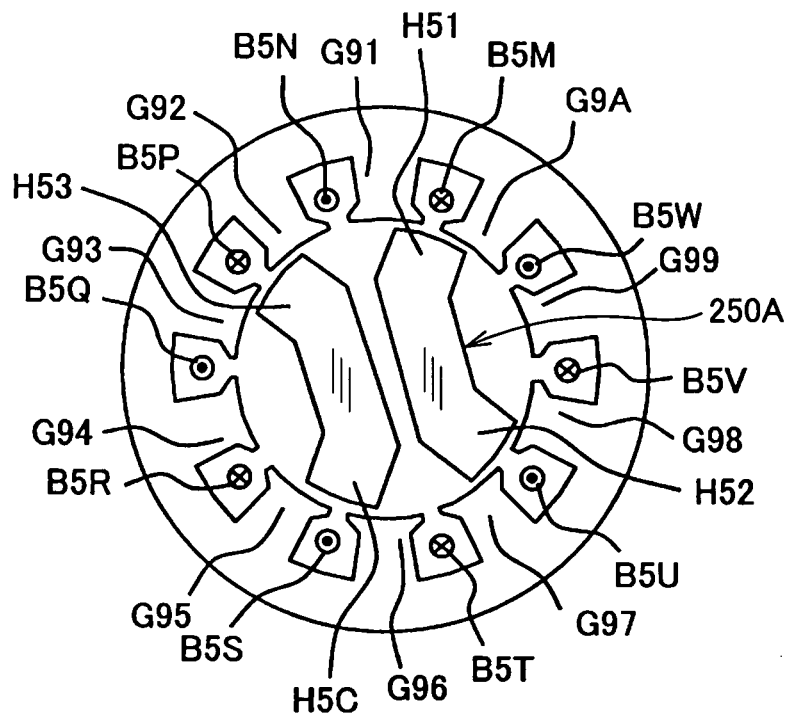
FIG. 43 is a lateral cross sectional view of a reluctance motor with a motor modified by a rotor illustrated in FIG. 42.
Figure 44:
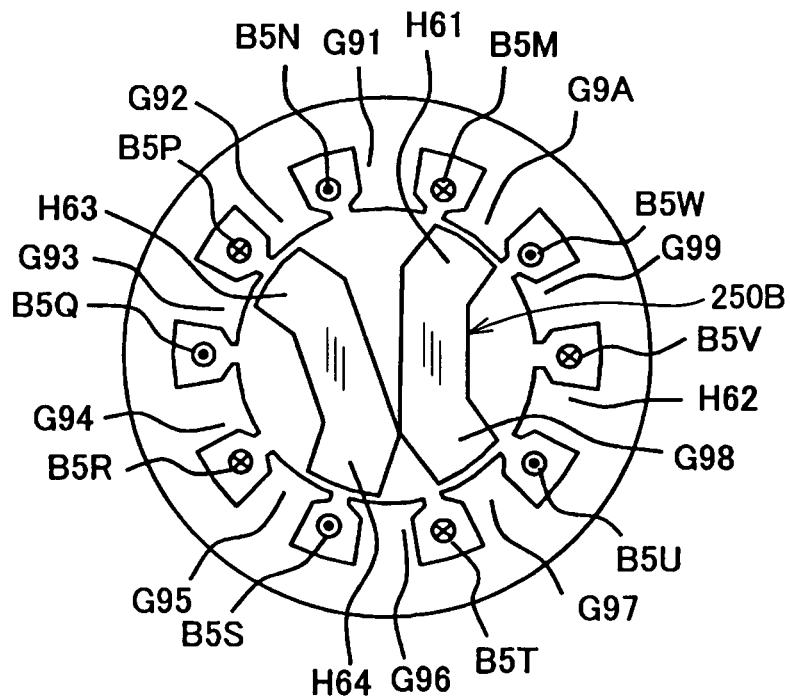
FIG. 44 is a lateral cross sectional view of a reluctance motor with a motor modified by the rotor illustrated in FIG. 42.

The configuration of the rotor 250 illustrated in FIG. 42 can be changed from that of a rotor 250A illustrated in FIG. 43 or that of a rotor 250B illustrated in FIG. 44.

The rotor 250A is designed as two axially extending plate members parallelly and radially arranged to be symmetrical with respect to the center direction of the output shaft (not shown). Both ends of one of the plate members are located close to the inner circumference of the stator core with an air gap therebetween; these ends serve as two salient poles H51 and H52. Both ends of the other of the plate members are located close to the inner circumference of the stator core with an air gap therebetween; these ends serve as two salient poles H53 and H54.

In comparison to the structure of the rotor 250A, the rotor 250B is designed such that one end of one of the plate members is contacted to one end of the other of the plate members. Both ends of one of the plate members are located close to the inner circumference of the stator core with, an air gap therebetween; these ends serve as two salient poles H61 and H62. Both ends of the other of the plate members are located close to the inner circumference of the stator core with an air gap therebetween; these ends serve as two salient poles H63 and H64.

Note that, when the 6S4R motor 110 illustrated in FIG. 9 is circumferentially expanded to be designed as a 24S8R motor (multi-pole motor) as illustrated in FIG. 10, it can be controlled by three-phase currents Ia, Ib, and Ic without magnetic fluxes being intersected. In the multi-pole motor, voltage unbalance caused in the motor 110X1 illustrated in FIG. 42 cannot be appeared. That is, multi-pole motors based on the 6S4R motor 110 can prevent a relationship between a current flowing each phase winding and flux linkages from becoming electromagnetically complicated.

Next, a twenty-second modification of the reluctance motor 110 according to the first embodiment will be described hereinafter.

(a) and (b) of FIG. 45 schematically illustrate an example of the structure of a reluctance motor (10S6R motor) 110Y according to the twenty-second modification of the first embodiment.

The structure of the stator of the motor 110Y is identical to that of the motor 110X illustrated in FIG. 41.

A rotor 260 of the motor 110Y has a substantially annular shape, and has, at its outer circumference, with six salient poles B61, B62, B63, B64, B65, and B66. Each of the four salient poles B61, B62, B63, B64, B65, and B66 is formed such that its corresponding outer circumference portion radially outwardly projects. The six salient poles are circumferentially arranged at regular pitches.

In the rotor position illustrated in (a) of FIG. 45, in order to create a torque in the CCW, an A-phase current Ia is supplied to flow through the A-phase stator coil B5M and B59 in the directions indicated by the circled cross and the circled dot. At the same time, a D-phase current Id is supplied to flow through the D-phase stator coil B5T and B5N in the directions indicated by the circled cross and the circled dot.

The A- and D-phase currents flowing through the respective A- and D-phase coils induce a magnetic flux B6A from the stator pole B56 to the stator pole B51. The induced magnetic flux B6A causes a magnetic attractive force between the stator pole B51 and the salient rotor pole B61 and between the stator pole B56 and the salient rotor pole B64. The attractive force pulls the salient rotor pole B61 to the stator pole B51, and pulls the salient pole B64 to the stator pole B56. This creates a torque T in the CCW.

At the same time, a C-phase current Ic is supplied to flow through the C-phase stator coil B5R and B5W in the directions indicated by the circled cross and the circled dot. At the same time, an E-phase current Ie is supplied to flow through the E-phase stator coil B5V and B5Q in the directions indicated by the circled cross and the circled dot. The C- and E-phase currents flowing through the respective C- and E-phase coils induce a magnetic flux B66 from the stator pole B54 to the stator pole B59. The induced magnetic flux B63 causes a magnetic attractive force between the stator pole B59 and the salient rotor pole B66 and between the stator pole B54 and the salient rotor pole B63. The attractive force pulls the salient rotor pole B66 to the stator pole B59, and pulls the salient pole B63 to the stator pole B54. This creates a torque T in the CCW.

After the rotor 260 is slightly rotated from the rotor position illustrated in (a) of FIG. 45 in the CCW, in the rotor position illustrated in (b) of FIG. 45, the A-phase current Ia is supplied to flow through the A-phase stator coil B5M and B5S in the directions indicated by the circled cross and the circled dot. At the same time, the D-phase current Id is supplied to flow through the D-phase stator coil B5T and B5N in the directions indicated by the circled cross and the circled dot.

The A- and D-phase currents flowing through the respective A- and D-phase coils induce the magnetic flux B6A from the stator pole B56 to the stator pole B51. The induced magnetic flux B6A causes a magnetic attractive force between the stator pole B51 and the salient rotor pole B61 and between the stator pole B56 and the salient rotor pole B64. The attractive force pulls the salient rotor pole 61 to the stator pole B51, and pulls the salient pole B64 to the stator pole B56. This creates a torque T in the CCW.

At the same time, a B-phase current Ib is supplied to flow through the B-phase stator coil B5P and B5U in the directions indicated by the circled cross and the circled dot. At the same time, the E-phase current Ie is supplied to flow through the E-phase stator coil B5V and B5Q in the directions indicated by the circled cross and the circled dot.

The B- and E-phase currents flowing through the respective B- and E-phase coils induce a magnetic flux B6C from the stator pole B58 to the stator pole B53. The induced magnetic flux B60 causes a magnetic attractive force between the stator pole B53 and the salient rotor pole B62 and between the stator pole B58 and the salient rotor pole B65. The attractive force pulls the salient rotor pole 862 to the stator pole 653, and pulls the salient pole B65 to the stator pole B58. This creates a torque T in the CCW.

Switching the A, B, C, D, and E-phase currents Ia, Ib, Ic, Id, and Ie from one another depending upon the rotational position θr of the rotor 260 under control of the control device CC or CC1 achieves a continuous torque to continuously rotate the rotor 260.

Next, a twenty-third modification of the reluctance motor 110 according to the first embodiment will be described hereinafter.

(a) and (b) of FIG. 46 schematically illustrate an example of the structure of a reluctance motor (10S8R motor) 110Z according to the twenty-third modification of the first embodiment.

The structure of the stator of the motor 110Z is identical to that of the motor 110X illustrated in FIG. 41.

A rotor 270 of the motor 110Z has a substantially annular shape, and has, at its outer circumference, with eight salient poles B71, B72, B73, B74, B75, B76, B77, and B78. Each of the four salient poles B71, B72, B73, B74, B75, B76, B77, and B78 is formed such that its corresponding outer circumference portion radially outwardly projects. The eight salient poles are circumferentially arranged at regular pitches.

In the rotor position illustrated in (a) of FIG. 46, in order to create a torque in the CCW, an A-phase current Ia is supplied to flow through the A-phase stator coil B5M and B5S in the directions indicated by the circled cross and the circled dot. At the same time, a D-phase current Id is supplied to flow through the D-phase stator coil B5T and B5N in the directions indicated by the circled cross and the circled dot.

The A- and D-phase currents flowing through the respective A- and D-phase coils induce a magnetic flux B7A from the stator pole B56 to the stator pole B51. The induced magnetic flux B7A causes a magnetic attractive force between the stator pole B51 and the salient rotor pole B71 and between the stator pole B56 and the salient rotor pole B75. The attractive force pulls the salient rotor pole B71 to the stator pole B51, and pulls the salient pole B75 to the stator pole B56. This creates a torque T in the CCW.

At the same time, a B-phase current Ib is supplied to flow through the B-phase stator coil B5P and B5U in the directions indicated by the circled cross and the circled dot. At the same time, a D-phase current Id is supplied to flow through the D-phase stator coil B5T and B5N in the directions indicated by the circled cross and the circled dot.

The B- and D-phase currents flowing through the respective B- and ID-phase coils induce a magnetic flux B7B from the stator pole B52 to the stator pole B57. The induced magnetic flux B7B causes a magnetic attractive force between the stator pole B57 and the salient rotor pole B76 and between the stator pole B52 and the salient rotor pole B72. The attractive force pulls the salient rotor pole B76 to the stator pole B57, and pulls the salient rotor pole B72 to the stator pole B52. This creates a torque T in the CCW.

After the rotor 270 is slightly rotated from the rotor position illustrated in (a) of FIG. 46 in the CCW, in the rotor position illustrated in (b) of FIG. 46, the A-phase current Ia is supplied to flow through the A-phase stator coil B5M and B5S in the directions indicated by the circled cross and the circled dot. At the same time the ID-phase current Id is supplied to flow through the D-phase stator coil B5T and B5N in the directions indicated by the circled cross and the circled dot.

The A- and D-phase currents flowing through the respective A- and D-phase coils induce the magnetic flux B7A from the stator pole B56 to the stator pole B51. The induced magnetic flux B7A causes a magnetic attractive force between the stator pole B51 and the salient rotor pole B71 and between the stator pole B56 and the salient rotor pole B75. The attractive force pulls the salient rotor pole B71 to the stator pole B51, and pulls the salient pole B75 to the stator pole B56. This creates a torque T in the CCW.

At the same time, the A-phase current Ia is supplied to flow through the A-phase stator coil B5M and B5S in the directions indicated by the circled cross and the circled dot. At the same time, a C-phase current Ic is supplied to flow through the C-phase stator coil B5R and B5W in the directions indicated by the circled cross and the circled dot.

The A- and C-phase currents flowing through the respective A- and C-phase coils induce a magnetic flux B7C from the stator pole B5A to the stator pole B55. The induced magnetic flux B7C causes a magnetic attractive force between the stator pole B55 and the salient rotor pole B74 and between the stator pole B5A and the salient rotor pole B78. The attractive force pulls the salient rotor pole B74 to the stator pole B55, and pulls the salient pole B78 to the stator pole B5A. This creates a torque T in the CCW.

Switching the A, B, C, D, and E-phase currents Ia, Ib, Ic, Id, and Ie from one another depending upon the rotational position θr of the rotor 270 under control of the control device CC or CC1 achieves a continuous torque to continuously rotate the rotor 270.

Let us describe reluctance motors each with a stator having twelve stator poles (M=12) hereinafter.

One type of such reluctance motors with twelve-pole stator is 12S4R motors designed by expanding the 6S2R motor 110A as a four-pole motor. The 12S4R motor based on the 6S2R motor 110A has characteristics that are the same as those of the 6S2R motor 110A.

Another type of such reluctance motors with twelve-pole stator is 12S4R motor designed by expanding the 6S4R motor 110 as a four-pole motor. The 12S4R motor based on the 6S4R motor 110 has characteristics that are the same as those of the 6S4R motor 110.

These 12S4R motors are three-phase motors. Note that, in these 12S4R motors, a part of each rotor pole can be shifted by a range of 0 to 30 electrical degrees in the circumferential direction of the rotor. The circumferential electrical angular width of a part of either each rotor pole or each stator pole can be increased or reduced by a range of 0 to 30 electrical degrees. These modifications can reduce torque ripples and vibrations of the 12S4R motors.

Next, a twenty-fourth modification of the reluctance motor 110 according to the first embodiment will be described hereinafter.

Figure 47:
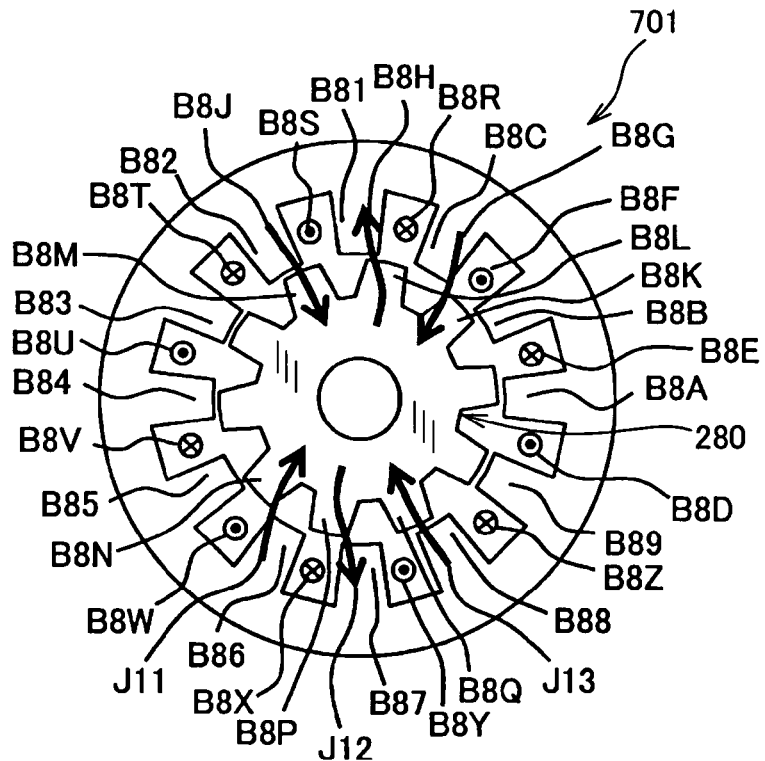
FIG. 47 is a lateral cross sectional view of a reluctance motor according to the twenty-fourth modification of the reluctance motor according to the first embodiment.

FIG. 47 schematically illustrate an example of the structure of a reluctance motor (12S10R motor) 701 according to the twenty-fourth modification of the first embodiment.

In comparison to the structure of the motor 110 illustrated in FIG. 1B, the motor 701 is provided with twelve stator poles (the number M is twelve), which are represented by B81, B82, B83, B84, B85, B86, B87, B88, B89, B8A, B83, and BBC, and a ten-pole rotor 280 (the number K is ten).

The rotor 280 has a substantially annular shape, and has, at its outer circumference, with ten salient poles. To six poles of the ten salient poles, reference characters B8K, B8L, B8M, B8N, B8P, and B8Q are assigned. Each of the ten salient poles is formed such that its corresponding outer circumference portion radially outwardly projects. One pair of salient poles B5C and B5D are radially opposite to each other, and the other pair of salient poles B5E and B5F are also radially opposite to each other. The ten salient poles are circumferentially arranged at regular pitches.

Twelve stator coils B8R, B8S, B8U, B8T, B8U, B8V, B8W, B8X, B8Y, B8Z, B8D, B8E, and B8F are wound in the stator core.

In the motor 701, each of the twelve stator coils is not wound in full pitch winding because a direction of a rotor pole and that of another rotor pole from the rotor pole by 180 electrical degrees are opposite to each other.

For example, each of the stator coils is formed by toroidal coils, an example of which is illustrated in FIG. 14. Otherwise, when the motor 701 is designed as a dual motor, each of the stator coils is alternately wound in a corresponding one slot of the first stator and a corresponding one slot of the second stator radially aligned therewith (see FIG. 15).

The A-phase coil B8R is wound in a slot between the stator poles B8C and B81, the B-phase coil B8S is wound in a slot between the stator poles B81 and B82, and C-phase coil B8T is wound in a slot between the stator poles B82 and B83. The D-phase coil B8U is wound in a slot between the stator poles B83 and B84, the E-phase coil B8V is wound in a slot between the stator poles B84 and B85, and F-phase coil B8W is wound in a slot between the stator poles B85 and B86.

The G-phase coil B8X is wound in a slot between the stator poles B86 and B87, the H-phase coil B8Y is wound in a slot between the stator poles B87 and B88, and J-phase coil B8Z is wound in a slot between the stator poles B88 and B89. The K-phase coil B8D is wound in a slot between the stator poles B89 and B8A, the M-phase coil B8E is wound in a slot between the stator poles B8A and B8B, and N-phase coil B8F is wound in a slot between the stator poles B8B and B8C.

In the rotor position illustrated in FIG. 47, in order to create a torque in the CCW, A- and D-phase currents Ia and Id are supplied to flow through the A- and D-phase stator coils B8R and B8F, respectively, indicated by the circled cross and the circled dot.

The A- and D-phase currents flowing through the respective A- and D-phase coils induce a magnetic flux B8G from the stator pole B8C to the salient rotor pole B8K. The induced magnetic flux B8G pulls the salient rotor pole B8K to the stator pole B8C, thus creating a torque T in the CCW.

In parallel to the current supply, A- and B-phase currents Ia and Ib are supplied to flow through the A- and B-phase stator coils B8R and B8S, respectively, indicated by the circled cross and the circled dot.

The A- and B-phase currents flowing through the respective A- and B-phase coils induce a magnetic flux B8H from the salient rotor pole B8L to the stator pole B81. The induced magnetic flux B8H pulls the salient rotor pole B8L to the stator pole B81, thus creating a torque T in the CCW.

In parallel to the current supply, C- and B-phase currents Ic and Ib are supplied to flow through the C- and B-phase stator coils B8T and B8S, respectively, indicated by the circled cross and the circled dot.

The C- and B-phase currents flowing through the respective C- and B-phase coils induce a magnetic flux B8J from the stator pole B82 to the stator rotor pole B8M. The induced magnetic flux B8J pulls the salient rotor pole B8M to the stator pole B82, thus creating a torque T in the CCW.

In parallel to the current supply, G- and F-phase currents Ig and If are supplied to flow through the G- and F-phase stator coils B8X and B8F, respectively, indicated by the circled cross and the circled dot.

The G- and F-phase currents flowing through the respective G- and F-phase coils induce a magnetic flux J11 from the stator pole B86 to the salient rotor pole B8N. The induced magnetic flux J11 pulls the salient rotor pole B8N to the stator pole B86, thus creating a torque T in the CCW.

In parallel to the current supply, G- and H-phase currents Ig and Ih are supplied to flow through the G- and H-phase stator coils B8X and B8Y, respectively, indicated by the circled cross and the circled dot.

The G- and H-phase currents flowing through the respective G- and H-phase coils induce a magnetic flux J12 from the salient rotor pole B8P to the stator pole B87. The induced magnetic flux J12 pulls the salient rotor pole B8P to the stator pole B87, thus creating a torque T in the CCW.

In parallel to the current supply, J- and H-phase currents Ij and Ih are supplied to flow through the J- and H-phase stator coils B8Z and B8Y, respectively, indicated by the circled cross and the circled dot.

The J- and H-phase currents flowing through the respective J- and H-phase coils induce a magnetic flux J13 from the stator pole B88 to the salient rotor pole B8Q. The induced magnetic flux J13 pulls the salient rotor pole B8Q to the stator pole B88, thus creating a torque T in the CCW.

Switching the A, B, C, D, E, F, G, H, J, K, M, and N-phase currents Ia, Ib, Ic, Id, Ie, If, Ig, Ih, Ij, Ik, Im, and In from one another depending upon the rotational position θr of the rotor 280 under control of the control device CC or CC1 achieves a continuous torque to continuously rotate the rotor 280.

In FIG. 47, the sum of radial components of the magnetic fluxes B8G, B8H, B8J, J11, J12, and J13 may not be zero, but the magnetic fluxes B8G, B8H, B8J, J11, J12, and J13 can be radially looped via another stator pole and another rotor pole. Some of the A, B, C, D, E, F, G, H, J, K, M, and N-phase currents Ia, Ib, Ic, Id, Ie, If, Ig, Ih, Ij, Ik, Im, and In cannot be supplied to flow through corresponding some of the stator coils. The level of each of the A, B, C, D, E, F, G, H, J, K, M, and N-phase currents Ia, Ib, Ic, Id, Ie, If, Ig, Ih, Ij, Ik, Im, and In can be freely selected. Thus, in order to create a torque, various combinations of the levels of the currents Ia, Ib, Ic, Id, Ie, If, Ig, Ih, Ij, Ik, Im, and In can be carried out. This means that various methods for driving the motor 701 can be provided. For example, in view of the reduction in the burden on the inverter of the control circuit CC or CC1, the reduction in iron loss, the reduction in the copper loss, and/or the reduction in the voltage across each stator coil, any one of the various driving methods for driving the motor 701 can be selected.

Note that, in the motor 701, a pair of stator windings as each-phase coil can be wound in a corresponding slot. This can drive the motor 701 as a twelve-phase reluctance motor. When the motor 701 is modified such that bidirectional currents are supplied to flow through some of the stator coils, each of the twelve stator coils can be wound in full pitch winding.

Let us describe reluctance motors each with a stator having fourteen stator poles (M=14) hereinafter.

In such a reluctance motor having a fourteen-pole stator, each of fourteenth stator coils can be wound in full pitch winding. Each of the fourteen stator coils can be formed by toroidal coils, an example of which is illustrated in FIG. 14. Otherwise, when such a reluctance motor having a fourteen-pole stator is designed as a dual motor, each of the fourteen stator coils is alternately wound in a corresponding one slot of the first stator and a corresponding one slot of the second stator radially aligned therewith (see FIG. 15). Using the toroidal winding or the winding for the dual motor can easily form the fourteen stator coils with an end of each of the fourteen stator coils being kept small.

Next, a twenty-fifth modification of the reluctance motor 110 according to the first embodiment will be described hereinafter.

Figure 48:
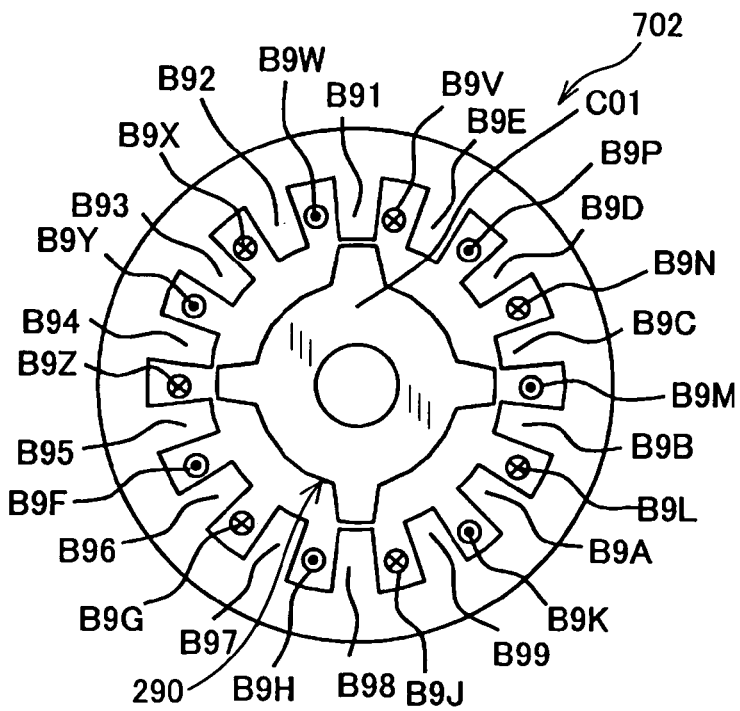
FIG. 48 is a lateral cross sectional view of a reluctance motor according to the twenty-fifth modification of the reluctance motor according to the first embodiment.

FIG. 48 schematically illustrate an example of the structure of a reluctance motor (14S4R motor) 702 according to the twenty-fifth modification of the first embodiment.

In comparison to the structure of the motor 110 illustrated in FIG. 1B, the motor 702 is provided with fourteen stator poles (the number M is fourteen), which are represented by B91, B92, B93, B94, B95, B96, B97, B98, B99, B9A, B9B, B9C, B9D, and B9E, and a four-pole rotor 290 (the number K is four).

The rotor 290 has a substantially annular shape, and has, at its outer circumference, with four salient poles. Because the structure of the four-pole rotor has been described (see FIG. 1B, 41, or the like), the descriptions of which are omitted.

Fourteen stator windings (seven pair of stator coils) B9V, B9W, B9X, B9Y, B9Z, B9F, B9G, B9H, B9J, B9K, B9L, B9M, B9N, and B9P are wound in the stator core.

In the motor 702, each of the fourteen stator coils is, four example, wound in full pitch winding.

The A-phase coil B9V and B9H is wound in corresponding opposing slots at a pitch of 180 electrical degrees. An A-phase current Ia is supplied to flow through the A-phase coil B9V and B9H. The B-phase coil 39X and B9K is wound in corresponding opposing slots at a pitch of 180 electrical degrees. A B-phase current Ib is supplied to flow through the B-phase coil B9X and B9K. The C-phase coil B9Z and 39M is wound in corresponding opposing slots at a pitch of 180 electrical degrees. A C-phase current Ic is supplied to flow through the C-phase coil B9Z and B9M. The D-phase coil B9G and 39P is wound in corresponding opposing slots at a pitch of 180 electrical degrees. A D-phase current Id is supplied to flow through the D-phase coil B9G and B9P.

The E-phase coil B9J and B9W is wound in corresponding opposing slots at a pitch of 180 electrical degrees. An E-phase current Ie is supplied to flow through the E-phase coil B9J and B9W. The F-phase coil B9L and B9Y is wound in corresponding opposing slots at a pitch of 180 electrical degrees. An F-phase current If is supplied to flow through the F-phase coil B9L and B9Y. The G-phase coil B9N and B9F is wound in corresponding opposing slots at a pitch of 180 electrical degrees. A G-phase current Ig is supplied to flow through the G-phase coil B9N and B9F.

The 14S4R motor 702 can be driven in the same manner as the motor 110. The 14S4R motor 702 has a feature that there is a large space around the outer circumference of the rotor 290. Particular, the space can be used when the shape of the rotor 290 is limited.

Next, a twenty-sixth modification of the reluctance motor 110 according to the first embodiment will be described hereinafter.

Figure 49:
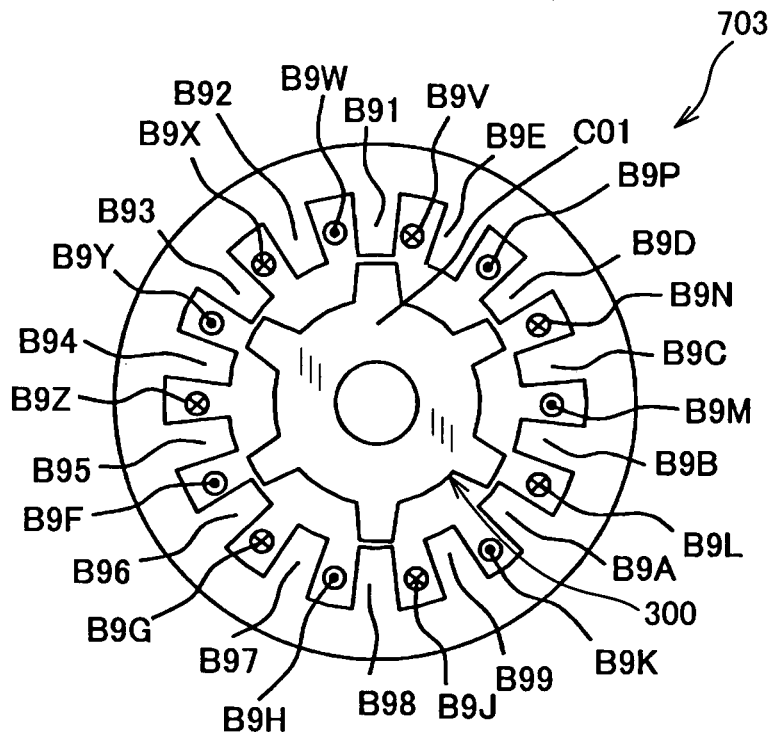
FIG. 49 is a lateral cross sectional view of a reluctance motor according to the twenty-sixth modification of the reluctance motor according to the first embodiment.

FIG. 49 schematically illustrate an example of the structure of a reluctance motor (14S6R motor) 703 according to the twenty-sixth modification of the first embodiment.

In comparison to the structure of the motor 110 illustrated in FIG. 1B, the motor 703 is provided with the stator, the structure of which is identical to that of the motor 702.

The motor 703 is also provided with a six-pole rotor 300 (the number K is six).

The rotor 300 has a substantially annular shape, and has at its outer circumference, with six salient poles C01. Each of the six salient poles is formed such that its corresponding outer circumference portion radially outwardly projects. The six salient poles are circumferentially arranged at regular pitches.

The 14S6R motor 703 can be driven in the same manner as the motor 110. The 14S6R motor 703 has a feature that a torque generation region of each of the stator poles is overlapped with that of another stator pole. Thus, in comparison to the motor 702, the motor 703 can achieve a greater torque and lower torque ripples.

Next, a twenty-seventh modification of the reluctance motor 110 according to the first embodiment will be described hereinafter.

Figure 50:
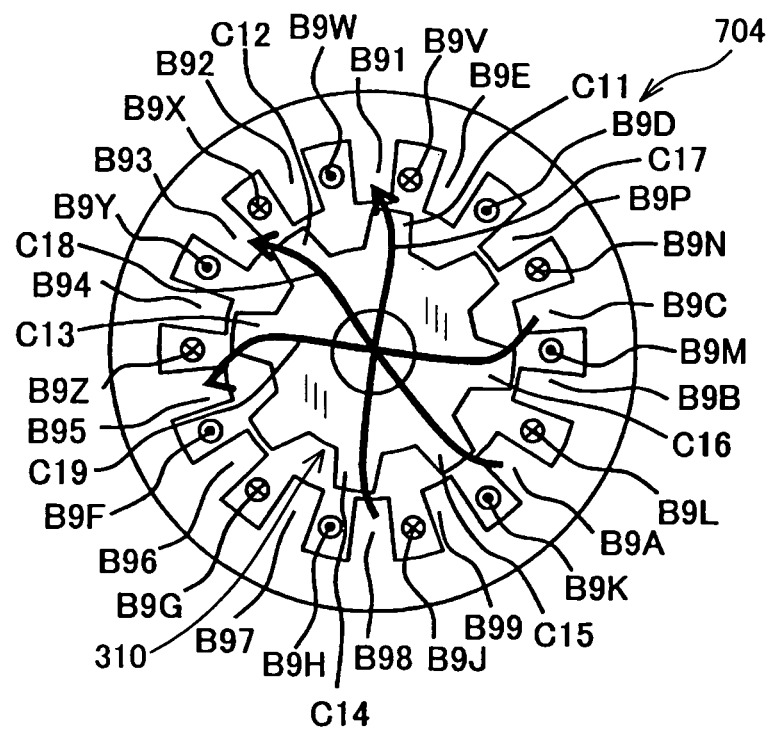
FIG. 50 is a lateral cross sectional view of a reluctance motor according to the twenty-seventh modification of the reluctance motor according to the first embodiment.

FIG. 50 schematically illustrate an example of the structure of a reluctance motor (14S8R motor) 704 according to the twenty-seventh modification of the first embodiment.

In comparison to the structure of the motor 110 illustrated in FIG. 1B, the motor 704 is provided with the stator, the structure of which is identical to that of the motor 702.

The motor 704 is also provided with an eight-pole rotor 310 (the number K is eight).

The rotor 310 has a substantially annular shape, and has, at its outer circumference, with eight salient poles. To seven of the eight salient poles, reference characters C11, C12, C13, C14, C15, C16, and C17 are assigned. Each of the eight salient poles is formed such that its corresponding outer circumference portion radially outwardly projects. The eight salient poles are circumferentially arranged at regular pitches.

The 14S8R motor 704 can use four rotor poles to create a torque during the rotor 310 being rotated, and create a torque based on a current flowing through each of eight stator windings. Thus, the 14S8R motor 704 can increase a torque to be created thereby and reduce the current capacitance of each power transistor of the control device CC or CC1 that drives it. This makes it possible to reduce a motor system consisting of the motor 704 and the control device CC or CC1 in cost and size.

In the rotor position illustrated in FIG. 50, in order to create a torque in the CCW, A- and E-phase currents Ia and Ie are supplied to flow through the A-phase coil B9V and B9H and the E-phase stator coil B9J and B9W, respectively, indicated by the circled cross and the circled dot.

The A- and E-phase currents flowing through the respective A- and D-phase coils induce a magnetic flux C17 from the stator pole B98 to the stator pole B91. The induced magnetic flux C17 pulls the salient rotor pole C11 to the stator pole B91, and pulls the salient rotor pole C14 to the stator pole B98, thus creating a torque T in the CCW.

At the same time, B- and F-phase currents Ib and If are supplied to flow through the B-phase coil B9X and B9K and the F-phase stator coil B9L and B9Y, respectively, indicated by the circled cross and the circled dot.

The B- and F-phase currents flowing through the respective B- and F-phase coils induce a magnetic flux C18 from the stator pole B9A to the stator pole B93. The induced magnetic flux C18 pulls the salient rotor pole C12 to the stator pole B93, and pulls the salient rotor pole C15 to the stator pole B9A, thus creating a torque T in the CCW.

In parallel to the current supply, C- and G-phase currents Ic and Ig are supplied to flow through the C-phase coil B9Z and B9M and the G-phase stator coil B9N and B9F, respectively, indicated by the circled cross and the circled dot.

The C- and G-phase currents flowing through the respective C- and G-phase coils induce a magnetic flux C19 from the stator pole B9C to the stator pole B95. The induced magnetic flux G19 polls the salient rotor pole C13 to the stator pole B95, and pulls the salient rotor pole C16 to the stator pole B9C, thus creating a torque T in the CCW.

Switching the A, B, C, D, E, F, and G-phase currents Ia, Ib, Ic, Id, If, and Ig from one another depending upon the rotational position θr of the rotor 310 under control of the control device CC or CC1 achieves a continuous torque in the CCW to continuously rotate the rotor 310. That is, under control of the control device CC or CC1, the motor 704 can be driven in the CCW and the CW and designed such that a power running torque or a regeneration torque is applied to the rotor 310.

The motor 704 illustrated in FIG. 50 is designed to create a torque by simultaneously exciting four stator poles or six stator poles, thus increasing a torque to be created by the motor 704. The motor 704 can be designed to restrict the number of stator poles used to create a torque to thereby reduce a voltage induced through each stator coil. This makes it possible to achieve a high RPM of the rotor 310 within a limited voltage of the direct current power source of the control device CC or CC1. Each stator winding in a slot through which a unidirectional current flows can excite circumferentially adjacent stator poles across the slot, thus simultaneously supplying power to the motor 704 through a plurality of current supply paths. This reduces the current capacitance of each power transistor of the control device CC or CC1, thus reducing a motor system consisting of the motor 704 and the control device CC or CC1 in cost and size.

Next, a twenty-eighth modification of the reluctance motor 110 according to the first embodiment will be described hereinafter.

Figure 51:
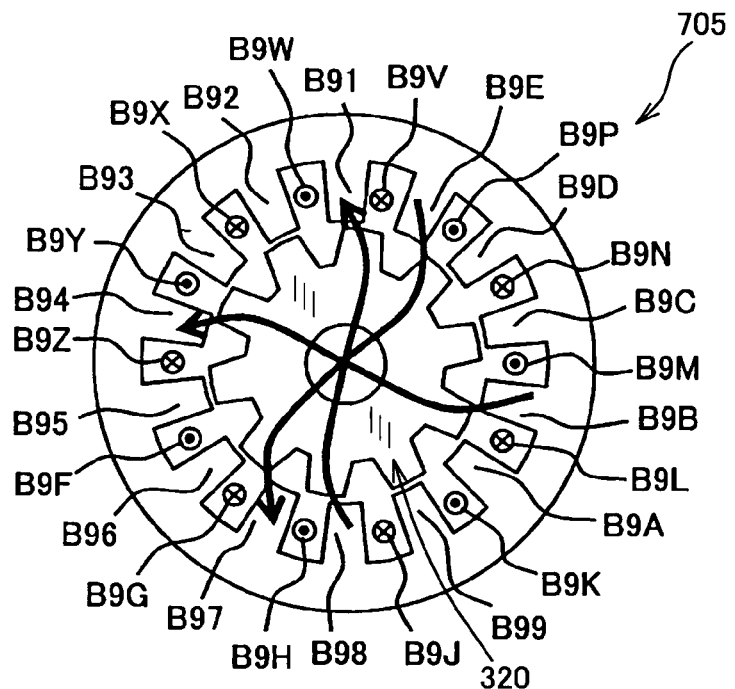
FIG. 51 is a lateral cross sectional view of a reluctance motor according to the twenty-eighth modification of the reluctance motor according to the first embodiment.

FIG. 51 schematically illustrate an example of the structure of a reluctance motor (14S10R motor) 705 according to the twenty-eighth modification of the first embodiment.

In comparison to the structure of the motor 110 illustrated in FIG. 1B, the motor 705 is provided with the stator, the structure of which is identical to that of the motor 702.

The motor 705 is also provided with a ten-pole rotor 320 (the number K is ten).

The rotor 320 has a substantially annular shape, and has, at its outer circumference, with ten salient poles. Each of the ten salient poles is formed such that its corresponding outer circumference portion radially outwardly projects. The ten salient poles are circumferentially arranged at regular pitches.

In the rotor position illustrated in FIG. 51, in order to create a torque in the CCW, three pairs of stator coils of the motor 705 are selectively excited in the same manner as the motor 704 to thereby create a continuous torque in the CCW. The characteristics of the motor 705 are similar to those of the motor 704.

Next, a twenty-ninth modification of the reluctance motor 110 according to the first embodiment will be described hereinafter.

Figure 52:
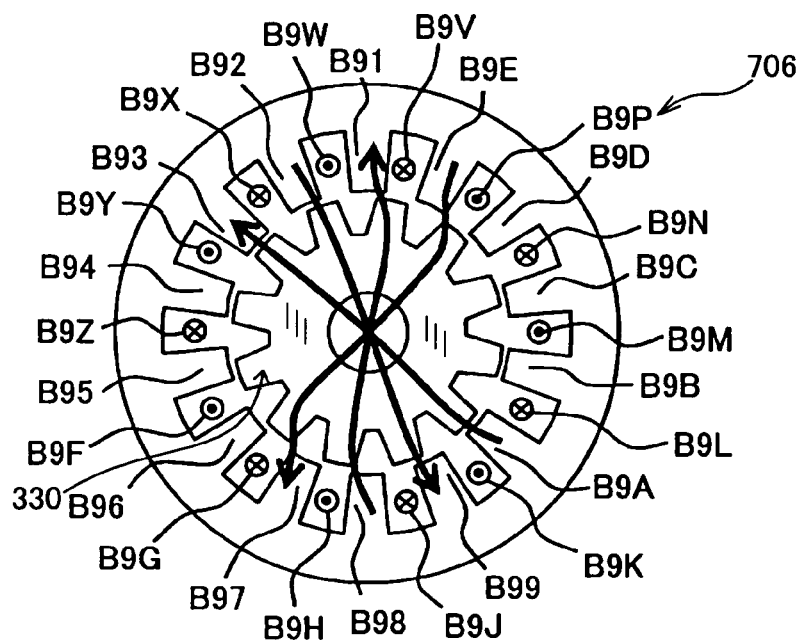
FIG. 52 is a lateral cross sectional view of a reluctance motor according to the twenty-ninth modification of the reluctance motor according to the first embodiment.

FIG. 52 schematically illustrate an example of the structure of a reluctance motor (14S12R motor) 706 according to the twenty-ninth modification of the first embodiment.

In comparison to the structure of the motor 110 illustrated in FIG. 1B, the motor 705 is provided with the stator, the structure of which is identical to that of the motor 702.

The motor 705 is also provided with a twelve-pole rotor 330 (the number K is twelve).

The rotor 330 has a substantially annular shape, and has, at its outer circumference, with twelve salient poles. Each of the twelve salient poles is formed such that its corresponding outer circumference portion radially outwardly projects. The twelve salient poles are circumferentially arranged at regular pitches.

As described above, in the rotor position illustrated in FIG. 51, in order to create a torque in the CCW, magnetic fluxes illustrated by thick arrows in FIG. 51 are induced to create magnetic attractive forces; these magnetic attractive forces generate a torque in the CCW.

However, the distribution of magnetic fluxes induced by the motor 706 illustrated in FIG. 52 is different from that of magnetic fluxes induced by the motor 704 or 705 illustrated in FIG. 50 or FIG. 51. This is because the number (M=14) of the stator poles is similar to the number (K=12) of the rotor poles. The distribution of the magnetic fluxes induced by the motor 706 is similar to that of vernier motors.

However, the motor 706 is specially designed such that:

the direction of a current flowing through each stator winding in a corresponding slot is reversed to that of a current flowing through another stator winding in a slot adjacent to the corresponding slot;

induced magnetic fluxes are different in direction from each other; and each stator pole individually excites a corresponding rotor pole.

As a result, it is possible to reduce in thickness the back yoke of the stator, and reduce the control device CC or CC1 in size in comparison to the structure of such vernier motors.

The characteristics of the motor 706 are similar to those of the motor 704 or 705, thus achieving a great torque. In the motor 706, it is possible to select at least one of a plurality of pairs of stator coils to be used to create a torque.

As described above, reluctance motors having a large number M of stator poles and a large number K of rotor poles, examples of which are illustrated in FIGS. 50, 51, and 52, are capable of creating torques by many stator poles, and therefore, they can achieve higher torques.

At that time, each phase current excites the soft magnetic material to induce a magnetic flux, and the magnetic flux induced by the each phase current is magnetically linked to a plurality of stator windings. This increases mutual inductances. As a result, a voltage Vz across each stator coil is affected by all flux linkages $\phi a$ therethrough. Thus, the voltage Vz across each stator winding is given by the product of the number Nw of turns of each stator coil and the rate of change of all flux linkages $\phi a$ through a corresponding stator coil. Thus, the voltage Vz across each stator coil is greater than a voltage across each stator coil when the voltage generates a magnetic flux of only one stator pole.

When a reluctance motor according to the first embodiment and its modifications, having a large number M of stator poles and a large number K of rotor poles, is driven within a preset limit of the DC power source, the rotational speed $\omega r$ of the rotor may be limited by the preset limit of the DC power source.

In order to address such a limitation, when the rotor is rotated at the rotational speed equal to or higher than the value $\omega r$, the reluctance motor limits the number of stator poles to be used to create a torque so as to reduce the voltage induced across each stator winding, thus maintaining the rotational speed equal to or higher than the value $\omega r$ even if the DC voltage of the DC power source is restricted within the preset limit.

Each stator winding through which a unidirectional current flows is designed to excite a pair of adjacent stator poles thereacross, thus simultaneously supplying power to the motor through a plurality of winding paths. This can reduce the current capacity of each power transistor of the control device CC or CC1, thus reducing the control circuit CC or CC1 in size and cost.

For example, in FIG. 39 and the like, the circumferential width of each stator pole and each rotor pole of a reluctance motor according to the first embodiment is set to be "360/(8× 2)=22.5 electrical degrees", but it can be increased or reduced so as to meet the required characteristics of the motor. In order to reduce torque ripples, at least part of each rotor pole or each stator pole can be circumferentially shifted to thereby arrange either the rotor poles or stator poles at irregular pitches.

Each of the stator poles, each of the permanent magnets, and/or each of the salient rotor poles can be deformed in at least one of the radial direction, the circumferential direction, and the axial direction of the rotor. Each of the stator and rotor can be skewed, or at least part of at least one pole can be omitted.

When a reluctance motor according to the first embodiment is expanded as a multi-pole motor, the structures of the multi-pole motor for every 360 electrical degrees can be different from each other. For example, at least one of the structures of the multi-pole motor for every 360 electrical degrees can be circumferentially shifted.

In the MSKR motors according to the first embodiment, a reluctance motor can be designed such that the number (K) of the rotor poles is greater than the number (M) of the stator poles.

Next, a thirtieth modification of the reluctance motor 110 according to the first embodiment will be described hereinafter.

Figure 53:
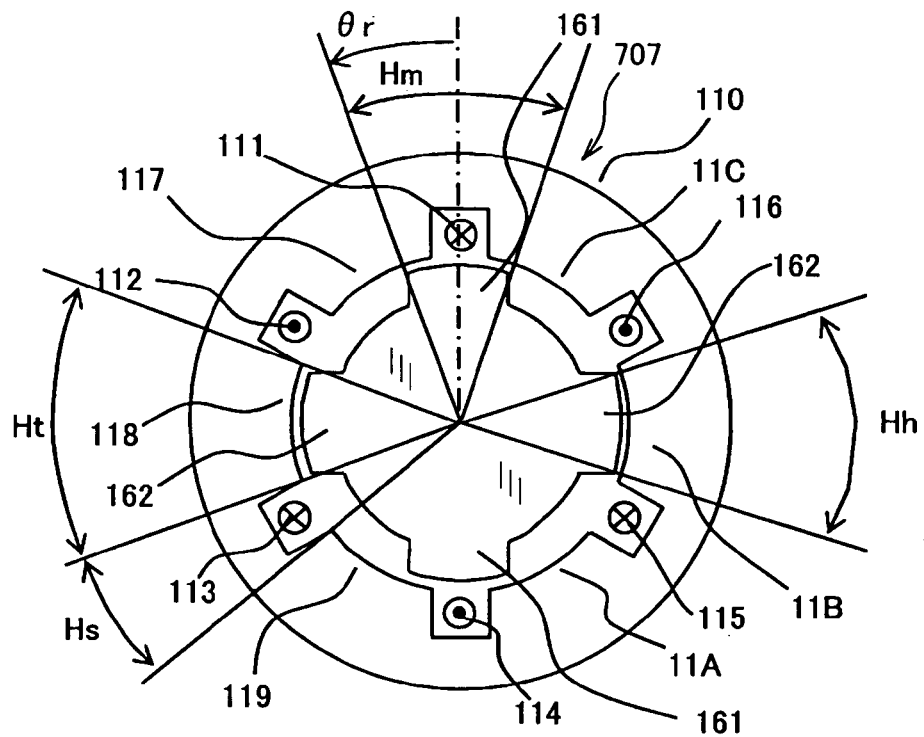
FIG. 53 is a lateral cross sectional view of a reluctance motor according to the thirtieth modification of the reluctance motor according to the first embodiment.

FIG. 53 schematically illustrate an example of the structure of a reluctance motor (6S4R motor) 707 according to the thirtieth modification of the first embodiment.

The reluctance motor 707 is provided with the stator with a structure identical to that of the stator of the reluctance motor 110A illustrated in FIG. 9.

As well as the stator illustrated in FIG. 9, the circumferential electrical angular width Ht of the inner surface of each of the teeth (stator poles) 117, 118, 119, 11A, 11B, and 11C is set to 40 electrical degrees. Similarly, the circumferential electrical angular width Hm of the outer surface of each of salient poles 161 and 162 of the rotor is set to 40 electrical degrees.

Specifically, the circumferential electrical angular width Ht of each stator pole and the circumferential electrical angular width of each rotor pole of the motor 707 are greater than the circumferential electrical angular width Ht of each stator pole and the circumferential electrical angular width of each rotor pole of the motor 110 illustrated in FIG. 18.

Therefore, when one stator pole takes over the torque generation action from an alternative stator pole, the control device CC or CC1 can control a target torque for the one stator pole to increase it while controlling a target torque for the alternative stator pole to reduce it.

Next, a thirty-first modification of the reluctance motor 110 according to the first embodiment will be described hereinafter.

Figure 54:
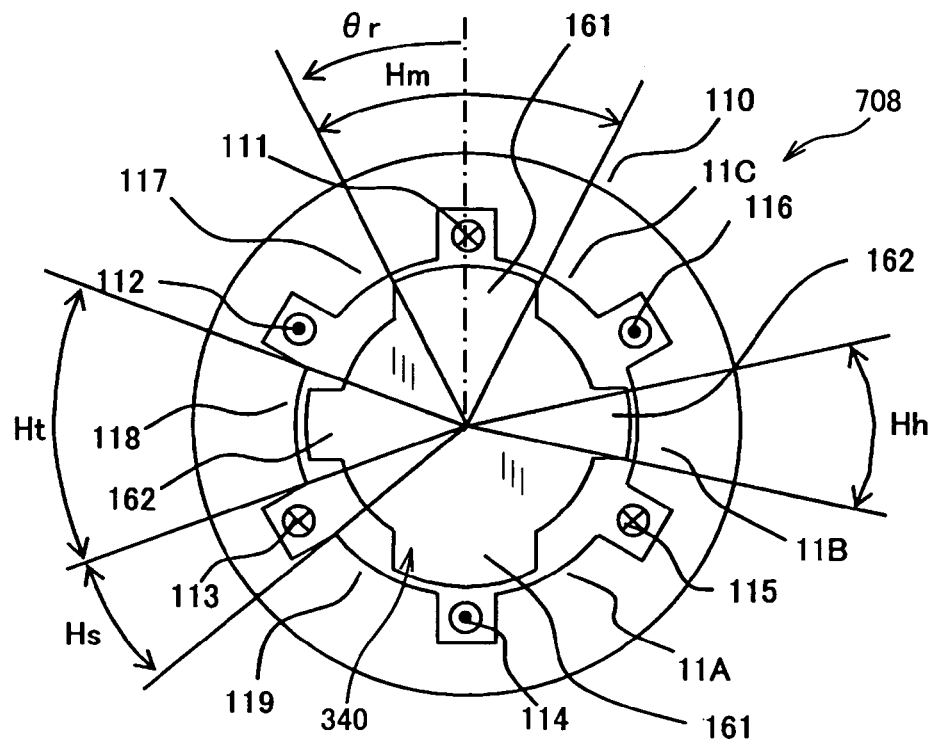
FIG. 54 is a lateral cross sectional view of a reluctance motor according to the thirtieth-first modification of the reluctance motor according to the first embodiment.

FIG. 54 schematically illustrate an example of the structure of a reluctance motor 708 according to the thirty-fast modification of the first embodiment.

The reluctance motor 708 is provided with a rotor 340. The rotor 340 has a shape substantially identical to that of the rotor 220 illustrated in FIG. 38.

Specifically, the rotor 340 is provided at its outer circumference with a first pair of opposing salient poles 161 and a second pair of opposing salient poles 162.

The circumferential electrical angular width Hm of each of the opposing salient poles 161 of the first pair is greater than the circumferential electrical angular width Hh of each of the opposing salient poles 162 of the second pair. As well as the motor 707, the circumferential electrical angular width Ht of the inner surface of each of the stator poles is set to 40 electrical degrees, and the circumferential electrical angular width Hm of each of the opposing salient poles 161 of the first pair is set to 40 electrical degrees. In contrast, the circumferential electrical angular width Hh of each of the opposing salient poles 162 of the second pair is set to 20 electrical degrees.

The salient rotor poles 161 and 162 are circumferentially arranged at regular pitches of 90 electrical degrees.

Note that, when a rotor has first and second groups of salient poles, and the circumferential electrical angular width of each salient pole of the first group is greater than that of each salient pole of the second group, the salient poles in the first group will be referred to as "main salient poles", and salient poles in the second group will be referred to as "auxiliary salient poles" hereinafter.

The motor 708 is two-pole motor, but actually can be used as multi-pole motor, such as four-pole motor or eight-pole motor. These multi-pole motors can reduce the length of each stator coil end, and/or reduce the radial thickness of the back yoke of the stator core, thus reducing the multi-pole motors in size.

Figure 55:
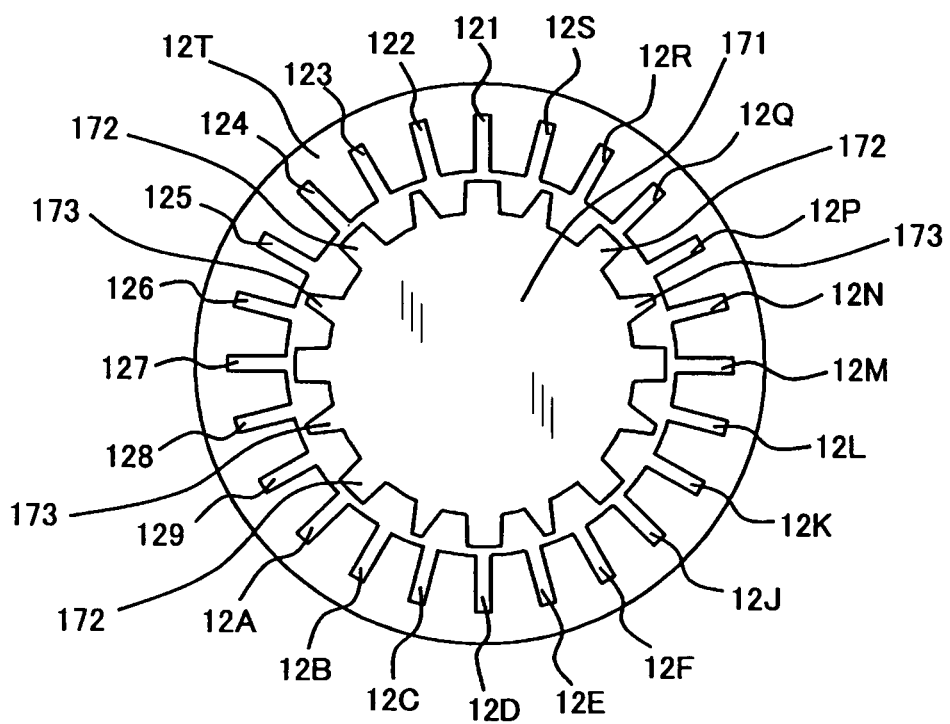
FIG. 55 is a lateral cross sectional view of a reluctance motor achieved by expanding the reluctance motor illustrated in FIG. 54.

FIG. 55 schematically illustrates an example of eight-pole motor achieved by expanding the two-pole motor 708 illustrated in FIG. 54. The eight-pole motor illustrated in FIG. 55 is provided with a rotor 171. In comparison to the rotor 12U illustrated in FIG. 10, the rotor 171 has at its outer circumferential surface, in addition to a first group of eight main salient poles 172, a second group eight auxiliary salient poles 173.

The first and second salient poles 172 and 173 are alternately arranged in the circumferential direction of the rotor 171. Specifically, the first salient poles 172 are arranged at regular pitches of 180 electrical degrees, and therefore, the sixteen salient poles 172 and 173 of the rotor 171 are arranged at regular pitches of 90 electrical degrees.

The motor 708 is designed to improve the partial reductions in the continuous torque Tm of the motor 110A illustrated in (G) of FIG. 12.

Next, operations of the motor 708 illustrated in FIG. 54 will be described hereinafter with reference to (a) to (d) of FIG. 56.

Figure 56:
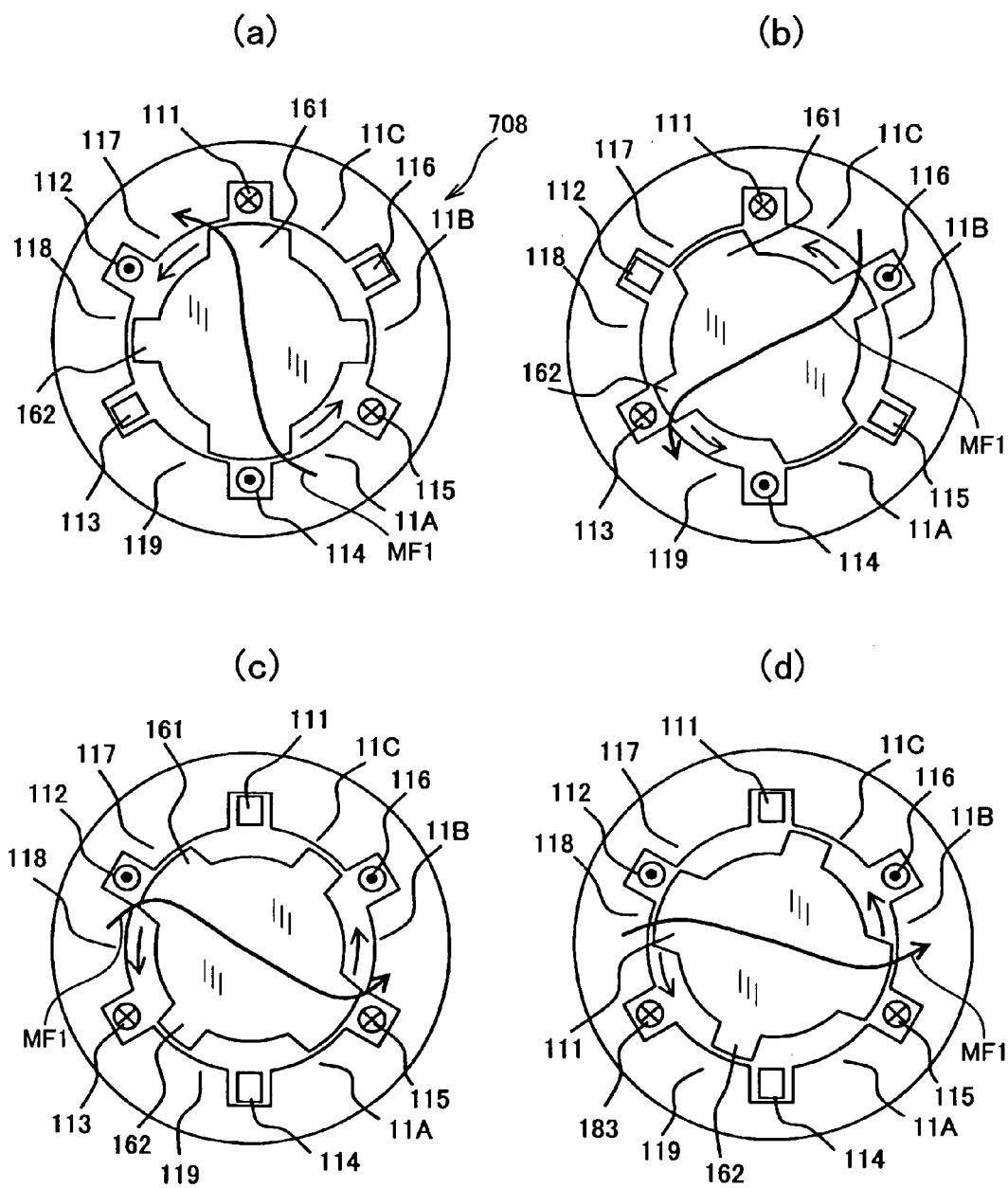
FIG. 56 is a view schematically illustrating operations of the motor illustrated in FIG. 54.

Each of the motors illustrated in FIGS. 54, 55, and 56 is designed such that each phase coil is concentratedly wound in a full pitch pattern and the teeth 117, 118, 119, 11A, 11E, and 11C are arranged over a substantially entire circumference of the stator core. For this reason, each of the motors is configured such that a current flows through at least two-phase coils to produce torque. This causes magnetic attractive force between at least two salient teeth of the stator core and corresponding salient poles of the rotor. The attractive force serves as reluctance torque to rotate the rotor.

Note that reference character Ta represents a torque created between each of the stator poles 11C and 119 and a corresponding one of the main and auxiliary salient poles 161 and 162, and reference character Tb represents a torque created between each of the stator poles 118 and 11B and a corresponding one of the main and auxiliary salient poles 161 and 162. Reference character Tc represents a torque created between each of the stator poles 117 and 11A and a corresponding one of the main and auxiliary salient poles 161 and 162.

Figure 57:
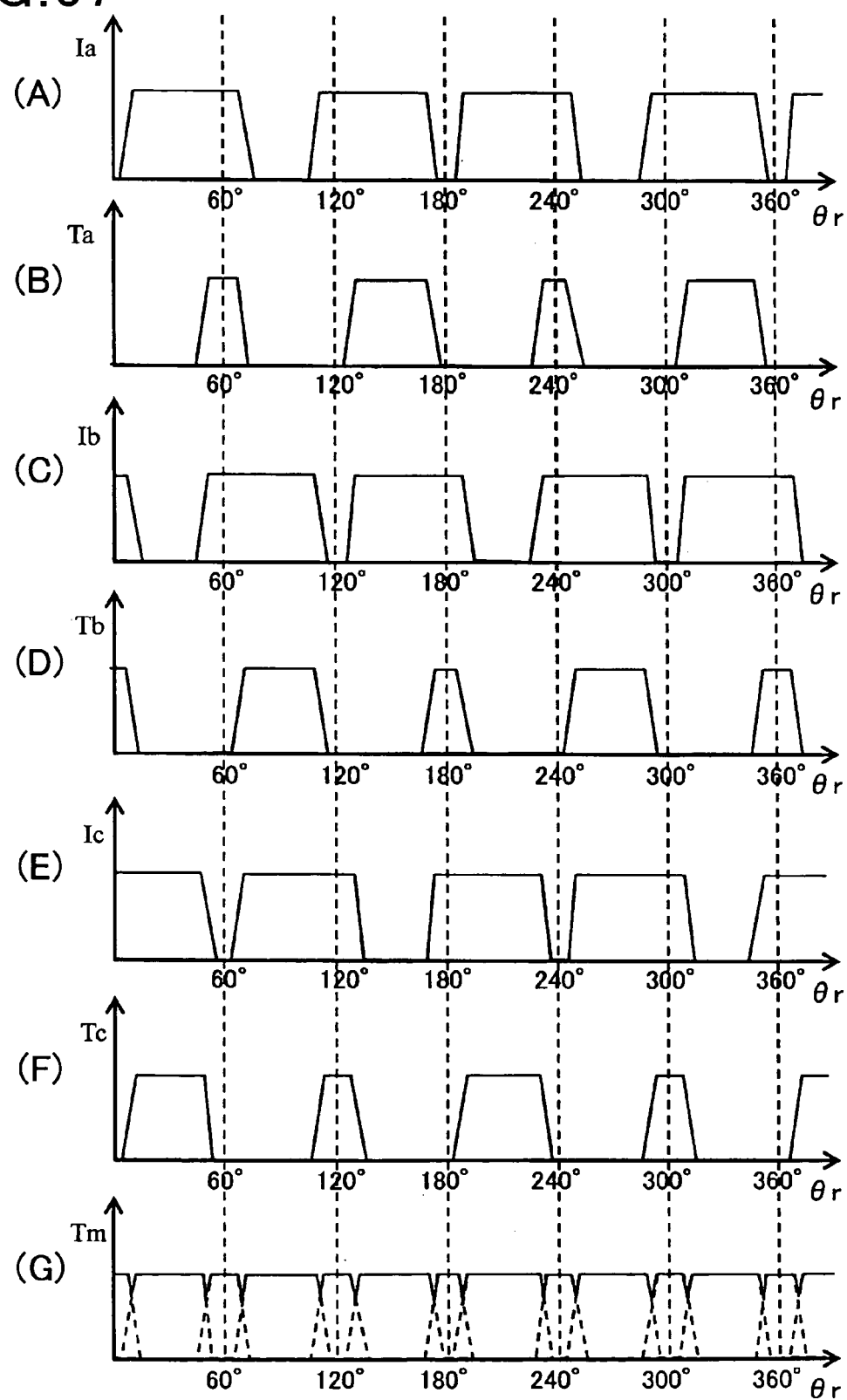
FIG. 57 is a timing chart schematically illustrating an example of exciting patterns for stator windings of the motor illustrated in FIG. 54, and torques created by the excited stator windings.

FIG. 57 schematically illustrates an example of exciting patterns (current supply patterns) for the stator windings in a transitional range of the rotational position θr in electric angle from 0 degrees to 360 degrees.

FIG. 57 also illustrates torques created by exciting the stator windings in accordance with the example of the exciting patterns in a transitional range of the rotational position θr in electric angle from 0 degrees to 360 degrees. Specifically, the example of the excitation patterns (current supply patterns) is illustrated in (A), C), and (E) of FIG. 57.

Specifically, when the rotor is presently located close to the rotational angle θr of 30 degrees illustrated in (a) of FIG. 56, one main salient pole 161 of the rotor starts to face the stator pole 11A and the other main salient pole 161 starts to face the tooth 117.

At that time, an A-phase DC current Ia is supplied from the control device CC or CC1 to positively flow through the positive A-phase winding 111 illustrated by the circled cross and negatively flow through the negative A-phase winding 114 illustrated by the circled dot. Simultaneously, a C-phase DC current Ic is supplied from the control device CC or CC1 to positively flow through the positive C-phase winding 115 illustrated by the circled cross and negatively flow through the negative C-phase winding 112 illustrated by the circled dot. No B-phase direct current Ib is supplied to flow through the B-phase windings 113 and 116 (see (A), (B), and (C) of FIG. 57).

The A-phase current Ia flowing through the A-phase windings and the C-phase current Ic flowing through the C-phase windings induce a magnetic flux MF1 from the tooth 11A to tooth 117 in accordance with the Ampere's right-handed rule.

The induced magnetic flux MF1 causes a magnetic attractive force between the tooth 11A and one main salient pole 161 of the rotor and between the tooth 117 and the other main salient pole 161. The attractive force creates a torque Tc illustrated in (F) of FIG. 12 in the CCW. At that time, it is assumed that the motor 708 is designed as a simple model. In the simple model, the magnetic permeability of each of the soft magnetic portions of the stator core and the rotor 340 is set to be sufficiently high. In addition, in the simple model, the magnetic permeability of a space is set to be sufficiently low, and the magnetic resistance in the air gap between each of the salient poles of the rotor 340 and a corresponding inner surface of the stator core is set to be sufficiently low.

Because the motor 708 is designed as the simple model, the intensity [Ampere per meter; A/m] of the magnetic field around each of the teeth 118, 119, 11B, and 11C is very nearly zero. Thus, a magnetic flux radially passing through each of the teeth 118, 119, 11B, and 11C is also substantially zero, and therefore, a torque induced by the magnetic flux is substantially zero.

Thereafter, when the rotor 340 is turned in the CCW so as to be presently located close to the rotational angle θr of 50 degrees illustrated in (b) of FIG. 56, the one main salient pole 161 of the rotor 340 faces the tooth 117 and the other main salient pole faces the tooth 117.

At that time, the A phase current Ia is supplied to positively flow through the positive A-phase winding 111 (see the circled cross) and negatively flow through the negative A-phase winding 114 (see the circled dot).

Simultaneously, the B-phase current Ib is supplied to positively flow through the positive B-phase winding 113 (see the circled cross) and negatively flow through the negative B-phase winding 116 (see the circled dot). No current is supplied to flow through the C-phase coil.

The A-phase current Ia flowing through the A-phase windings and the C-phase current Ic flowing through the C-phase windings induce a magnetic flux MF1 from the tooth 11C to tooth 119 in accordance with the Ampere's right-handed rule.

The induced magnetic flux MF1 causes a magnetic attractive force between the tooth 119 and one auxiliary salient pole 162 and between the tooth 11C and the other auxiliary salient pole 162. The attractive force creates a torque Ta illustrated in (B) of FIG. 57 in the CCW. This makes the rotor 340 to rotate.

Because the circumferential width of each auxiliary salient pole 162 is 20 electrical degrees lower than 40 electrical degrees, the width of the torque Ta at θr of 60 degrees or thereabout is narrow.

Thereafter, when the rotor 340 is turned in the CCW so as to be presently located close to the rotational angle θr of 70 degrees illustrated in (c) of FIG. 56, one main salient pole 161 of the rotor 340 is close to the tooth 118, and the other main salient pole 161 is close to the tooth 11B.

At that time, the C phase current Ic is supplied to positively flow through the positive C-phase winding 115 (see the circled cross) and negatively flow through the negative C-phase winding 112 (see the circled dot).

Simultaneously, the B-phase current Ib is supplied to positively flow through the positive B-phase winding 113 (see the circled cross) and negatively flow through the negative B-phase winding 116 (see the circled dot). No current is supplied to flow through the A-phase coil.

The C-phase current Ic flowing through the C-phase windings and the B-phase current Ib flowing through the B-phase windings induce a magnetic flux MF1 from the tooth 118 to tooth 11B in accordance with the Ampere's right-handed rule.

The induced magnetic flux MF1 causes a magnetic attractive force between the tooth 118 and one main salient pole 161 and between the tooth 11B and the other main salient pole 161. The attractive force creates a torque Tb illustrated in (D) of FIG. 57 in the CCW. This makes the rotor 340 to rotate so that the rotor 349 reaches a location of the rotational angle θr of 90 degrees illustrated in (d) of FIG. 56.

The motor 708 illustrated in FIG. 54 is designed to periodically operate over a cycle of 60 electrical degrees.

Specifically, the operation of the motor 708 at the rotational position θr of 30 degrees illustrated in (a) of FIG. 54 is identical to that of the motor 708 at the rotational position θr of 90 degrees illustrated in (d) of FIG. 54 so that both operations achieve a torque in the CCW except that:
the magnetic flux MF1 induced through the rotor 340 illustrated in (d) of FIG. 54 is opposite in direction from that induced through the rotor 340 illustrated in (a) of FIG. 54.

Similarly, the operation of the motor 708 at the rotational position θr of 90 degrees is identical to that of the motor 708 at the rotational position θr of 150 degrees so that both operations achieve a torque in the CCW. In addition, the operation of the motor 708 at the rotational position θr of 150 degrees is identical to that of the motor 708 at the rotational position θr of 210 degrees so that both operations achieve a torque in the CCW. The operation of the motor 708 at the rotational position θr of 210 degrees is identical to that of the motor 708 at the rotational position θr of 270 degrees so that both operations achieve a torque in the CCW. The operation of the motor 708 at the rotational position θr of 270 degrees is identical to that of the motor 708 at the rotational position θr of 330 degrees so that both operations achieve a torque in the CCW. The operation of the motor 708 at the rotational position θr of 330 degrees is identical to that of the motor 708 at the rotational position θr of 30 degrees so that both operations achieve a torque in the CCW.

As illustrated in FIGS. 56 and 57, switching the A-, B-, and C-phase currents Ia, Ib, and Ic from one another depending upon the rotational position θr of the rotor 340 in accordance with the exciting pattern illustrated in FIG. 57 sequentially achieves the torques Ta, Tb, and Tc to thereby turn the rotor 340.

A transition of a continuous torque Tm by making connections between the created torques Ta, Tb, and Tc is illustrated in (G) of FIG. 57 by solid line. As illustrated in (G) of FIG. 57, when one-phase current is shifted to an alternative-phase current, the continuous torque Tm is slightly reduced. In comparison to the transition of the continuous torque Tm illustrated in FIG. 12, the reduction of the continuous torque Tm of the motor 708 can be improved. In order to further improve the partial reductions in the continuous torque Tm, the circumferential width Hm of each main salient pole 161 of the rotor 340 and the circumferential width Hh of each auxiliary salient pole 162 thereof can be slightly wider than those illustrated in FIG. 54.

At a higher RPM of the rotor 340, the phase of each phase current can be advanced from the phase thereof illustrated in FIG. 12, or the deformation of the waveform of each phase current can be carried out illustrated by dashed lines in FIG. 6.

Next, the relationship between an output torque T of the motor 708 and each of the circumferential width Hm of each main salient pole 161 and the circumferential width. Hh of each auxiliary salient pole 162 will be described hereinafter.

First, let us consider conditions that allow the motor 708 to output a continuous torque. For example, let us consider conditions that allow the motor 304 located at the rotational angle θr illustrated in FIG. 58 to output a continuous torque Tm.

Figure 58:
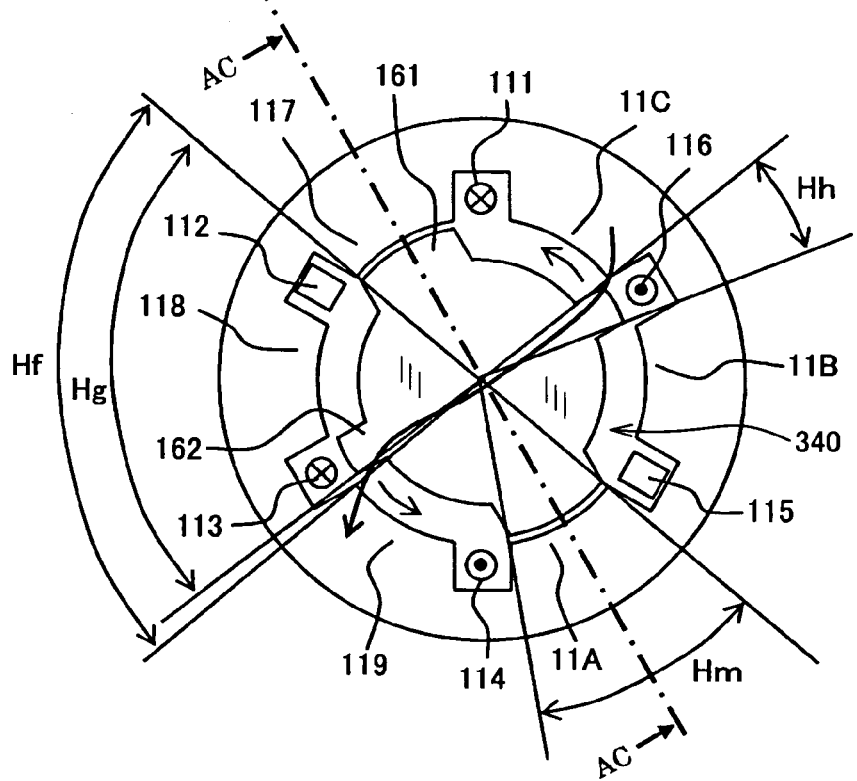
FIG. 58 is a lateral cross sectional view corresponding to FIG. 54 and being used to describe conditions that allow the motor illustrated in FIG. 54 to output a continuous torque.

Let us consider a situation when, during the rotor 340 being rotated, one main salient 161 directly faces the tooth 117 so that a left corner of the end of the one main salient pole 161 in FIG. 58 is radially aligned with a left corner of the end of the tooth 117 in FIG. 58. In other words, the rotational angular position Gr illustrated in FIG. 58 represents that the one main salient pole 161 cannot create a torque in the CCW. At that time, let us consider a first condition that allows auxiliary salient poles 162 to create a torque in the CCW.

The first condition is that the sum Hg of the circumferential width Hm of each main salient pole 161 and the circumferential width Hh of each auxiliary salient pole 162 is greater than the sum Hf of the circumferential width Hs of the innermost open end of each slot and 60 electrical degrees; this condition is given by the following equations (21) and (22):

$$Hg > Hf \tag{21}$$

$$\{360° - (Hm+Hh) \times 2\}/4 + 60° + Hs \tag{22}$$

Figure 59:
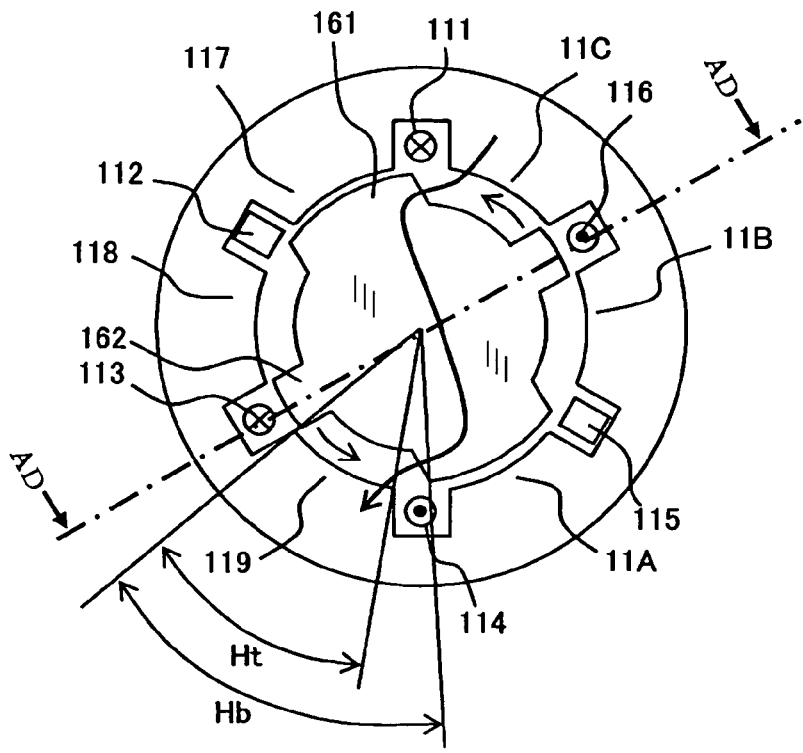
FIG. 59 is a lateral cross sectional view corresponding to FIG. 54 and being used to describe conditions that each main salient pole does not generate a torque in a counterclockwise direction.

Next, as illustrated in FIG. 59, when each auxiliary salient pole 162 creates a torque in the CCW, let us consider a second condition that each main salient pole 161 does not generate a torque in the CCW direction.

The second condition is that a circumferential width Fib between opposing corners of the ends of circumferentially adjacent main and auxiliary salient poles 161 and 162 is greater than the circumferential width Ht of each tooth; this condition is given by the following equations (23) and (24):

$$Hb > Ht \tag{23}$$

$$\{360° - (Hm+Hh) \times 2\}/4 > 60° - Hs \tag{24}$$

For example, in order to obtain the circumferential width Hh of each auxiliary salient pole 162, which meets the first and second conditions, the circumferential width Hh is given by the following equation (25) based on the equations (22) and (24):

$$Hm + 2Hs - 60° < Hh < -Hm + 2Hs + 60° \tag{25}$$

In order to simplify the first and second conditions, it is assumed that the circumferential width Hm of each main salient pole 161 is greater than the circumferential width Hh of each auxiliary salient pole 162; this relationship is given by the following equation (26):

$$Hm > Hh \tag{26}$$

In addition, because one main salient pole and one auxiliary salient pole drive the rotor 340 by at least 60 degrees, the following third condition is established:

$$Hm + Hh > 60 \text{ degrees.}$$

Specific examples of combinations of values of the circumferential width Hm of each main salient pole 161, values of the circumferential width Hs of the innermost open end of each slot, and maximum and minimum values Max and Min of the circumferential width Hh of each auxiliary salient pole 162 are illustrated in FIG. 60 in table format; these combinations meet the first to third conditions.

Specifically, the horizontal axis of the table represents the values of the circumferential width Hs of the innermost open end of each slot, and the vertical axis represents the values of the circumferential width Hm of each main salient pole 161. In the table, the maximum and minimum values Max and Min of the circumferential width Hh of each auxiliary salient pole 162 that meet the first to third conditions are illustrated.

For example, when the circumferential width Hs of the innermost open end of each slot is set to 15 electrical degrees and the circumferential width Hm of each main salient pole 161 is set to 50 electrical degrees, a value of the circumferential width Hh of each auxiliary salient pole 162, which meets the first to third conditions, are determined within a range between the minimum value of 20 electrical degrees to the maximum value of 40 electrical degrees.

In the table, values surrounded by an outer thick rectangular box represent a range within which a value of the circumferential width Hh of each auxiliary salient pole 162 is comfortably selected. Moreover, values surrounded by an inner thick rectangular box represent a range within which a value of the circumferential width Hh of each auxiliary salient pole 162 is more comfortably selected.

Note that a value of the circumferential width Hh of each auxiliary salient pole 162, which is slightly out of the range between a corresponding minimum value and a corresponding maximum value, can be actually used.

For example, even if one auxiliary salient pole 162 is not radially directly located in front of a tooth, for example, a tooth 119 in FIG. 58 so that they are slightly away from each other, it is possible to create a magnetic attractive force therebetween, thus creating a torque. Thus, even if a value of the circumferential width Hh of each auxiliary salient pole 162 is slightly smaller than a range defined by the equation (22), it is possible to create a continuous torque. In addition, even if torques to be created by the motor 708 are slightly intermittently created, such reluctance motors can be used to many applications. Thus, even if a value of the circumferential width Hh of each auxiliary salient pole 162 of reluctance motors is slightly out of a range defined by the equations (22) and (24), these reluctance motors can be utilized for many applications.

As described above, the actions of each auxiliary salient pole 162 of the motor structure illustrated in FIG. 54 are to create a torque at the reduction of the continuous torque Tm of the motor 708. This results in that, at particularly lower RPM of the rotor 340, it is possible to create a torque over the entire circumference of the motor 708, thus achieving free motor-drive at a lower RPM. As an example of driving the motor 708 illustrated in FIG. 54, as the rotational speed of the rotor 304 is increased, the generation of torque based on the main salient poles 161 are mainly carried out so that the generation of torque based on the auxiliary salient poles 162 is reduced. This more simplifies the drive of the motor 708, and because the variations in magnetic fluxes at the auxiliary salient poles 162 and the stator poles are reduced, it is possible to reduce iron loss.

When three-phase unidirectional currents are sequentially switched with rotation of the rotor, the transient unbalance between two unidirectional currents and the like may induce a magnetic flux to the auxiliary salient poles 162.

Thus, the requested specifications for the motor illustrated in FIG. 9 are to slightly improve the reduction of the continuous torque Tm illustrated in (G) of FIG. 12, it is possible to partly omit the auxiliary salient poles 162. Specifically, the axial length of each of the auxiliary salient poles 162 can be reduced to the half thereof. In a multi-pole motor according to the first embodiment illustrated in, for example, FIG. 55, the number of auxiliary salient poles 173 is reduced to the half thereof. That is, the amount of the auxiliary salient poles can be adjusted to suit the application.

As a method of changing the electromagnetic operations of a reluctance motor between a low RPM and a high RPM, a first rotor illustrated in FIG. 54 for creating a torque at a low RPM and a second quiet rotor illustrated in FIG. 9 or 10 for achieving a high average torque at a high RPM can be parallelly mounted in an axial direction of the output shaft. The configuration can, change the electromagnetic characteristics of the motor.

When a reluctance motor is driven at a low RPR, it is possible to alternately pull a main salient pole 161 and an auxiliary salient pole 162 to thereby create a torque. However, when a reluctance motor can be driven at a high RPM, it is possible to only pull a main salient pale 161 to thereby create a torque because an idle rotation of the rotor can be carried out during very short time. This configuration simplifies the drive of the motor, reduces iron loss, and reduces vibrations and noise.

More effectively, at a high RPM, the auxiliary salient poles 162 can be omitted to increase the circumferential width of each main salient pole; this structure is illustrated in FIG. 9. The structure achieves a sufficient time to increase and reduce a current for creating a torque. Note that, in terms of controllability, the circumferential width Ht of each stator pole is preferably set to be longer enough that flux leakages between teeth is not a problem.

In order to meet these requirements, it is more preferable that rotor poles are designed to be deformable during the rotor being rotated.

For example, a mechanism KS is provided in a stator to be movable in the axial direction of a rotor, and a mechanism KR is provided in the rotor to be movable in the axial direction of the rotor with the movement of the mechanism KS. The axial movement of the mechanism KR moves the auxiliary salient poles 162 in corresponding radial directions. The mechanism KS is driven by an actuator, such as a tiny servomotor. The drive of the mechanism KS by the actuator moves the auxiliary salient poles 162 in corresponding radial directions. The presence and absence of the auxiliary salient poles 162 can be controlled by the stator side during the rotor being rotated. (a) of FIG. 61 schematically illustrates the movement of the auxiliary salient poles 162, indicated by dashed lines, in corresponding radial directions indicated by arrows F41.

When the mechanism KR is designed to move the auxiliary salient poles 162 in the circumferential direction (see arrows F42), the mechanism KS is driven by an actuator, such as a tiny servomotor. The drive of the mechanism KS by the actuator moves the auxiliary salient poles 162 in the circumferential direction so that the auxiliary salient poles 162 are adjacently contacted to the main salient poles 161. This integrates the auxiliary salient poles 162 with the main salient poles 161, thus substantially widening the circumferential width of each main salient pole 161 and simultaneously eliminate each auxiliary salient pole 162.

When each of the main salient poles 161 is separated into two salient poles SS1 and SS2, movement of one of the salient poles SS1 and SS2 illustrated in (b) of FIG. 61, such as the pole SS1, in the circumferential direction substantially widen the circumferential width of each main salient pole 161. Note that, at a high RPM, field weakening control is normally carried out to reduce the amount of magnetic fluxes, thus preventing the limited voltage of the DC power source from increasing over a preset level. In terms of the field weakening control, the separation of each main salient pole 161 can reduce the amount of magnetic fluxes per circumferential unit width of each main salient pole 161 can be reduced. This can make easy to control the voltage of the DC power source within a range lower than the preset level.

Various mechanisms provided in a stator and configured to drive a part of a rotor can be used. For example, a tiny motor can be provided in a rotor, and the rotation of the tiny motor can be controlled by a stator to thereby change the shape of the rotor and the locations of rotor poles of the rotor.

Figure 62:
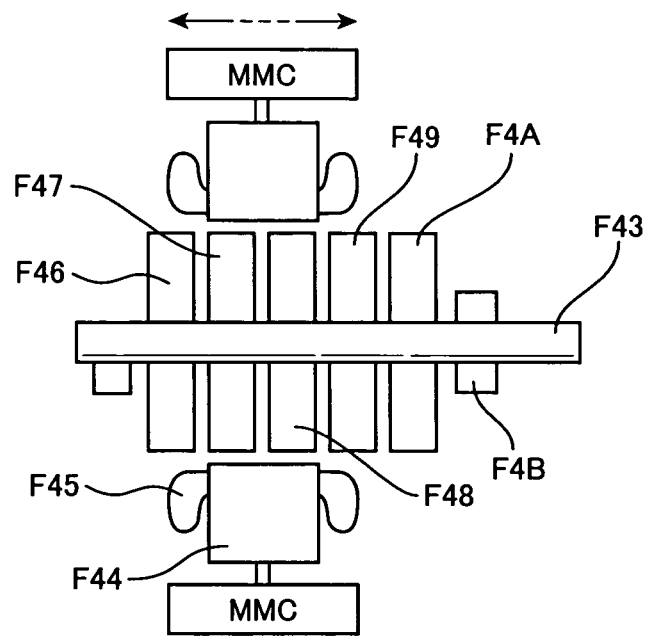
FIG. 62 is a lateral cross sectional view schematically illustrating an alternative example of changing the characteristics of a reluctance motor according to the first embodiment.

Next, an alternative example of changing the characteristics of a reluctance motor according to the first embodiment is illustrated in FIG. 62, In FIG. 62, reference character F43 represents a rotor shaft, and reference character F4B represents a bearing for rotatably supporting the rotor shaft F43. Reference F44 represents a substantially annular shaped stator core, and reference character F45 represents a coil end. Reference characters F46, F47, F48, F49, and F4A represent a plurality of rotors constituting a rotor unit. The stator F44 is arranged such that its center axis is coaxial to the center axis of the rotor unit (rotor shaft) and its inner circumference is opposite to the outer circumference of the rotor unit with an air gap therebetween.

As illustrated in FIG. 62, the stator P44 is designed to be movable by a mechanism MMC in the axial direction, indicated by an arrow, of the rotor unit. This changes a relatively positional relationship between the stator F44 and the rotor unit, thus changing the electromagnetic characteristics of the motor so as to achieve target electromagnetic characteristics.

For example, the target electromagnetic characteristics include first characteristics, at a lower RPM range, to be achieved by the reluctance motor 110 illustrated in FIG. 1B in which four rotor poles are arranged within 360 electrical degrees. The target electromagnetic characteristics also include second characteristics, at a middle RPM range higher than the lower RPM range, to be achieved by the reluctance motor 110A illustrated in FIGS. 9 and 10 in which two rotor poles are arranged within 360 electrical degrees. The target electromagnetic characteristics also include third characteristics, at a high RPM range higher than the middle RPM range, to be achieved by the reluctance motor 110A illustrated in FIGS. 9 and 10 in which the axial length of the rotor is reduced; these third characteristics can reduce the total magnetic fluxes.

The target electromagnetic characteristics can achieve higher torques with low torque ripples at the low RPM range, and achieves, at the middle RPM range, high-effective drive with low iron loss. The target electromagnetic characteristics reduce the field magnetic fluxes so as to maintain the voltage induced across each stator winding without being excessively increased, thus achieving, at the high RPM range, efficient constant output characteristics. In addition, it is possible to efficient motor characteristics from the low RPM range to the high RPM range by a control circuit with a relatively low total current capacitance.

Next, let us consider the relationship among the circumferential width Ht of each stator pole and the circumferential width Hm of each main rotor pole. For example, at the rotor position illustrated in FIG. 54, the rotor pole 162 is included within the circumferential range of the stator pole 118. Thus, even if the B-phase current Ib for the B-phase windings 113 and 116 and the C-phase current Ic for the C-phase windings 115 and 112 are increased or reduced, the rotor pole 162 does not create a torque. During the rotor being rotated, while the rotor pole 162 is included within the circumferential range of the stator pole 118, increase and decrease of the B- and C-phase currents are carried out. Therefore, it is possible to control three-phase currents for three-phase coils without affecting on the rotor. As described above, the difference between the circumferential width Ht of each stator pole and the circumferential width Hm of each main rotor pole makes it possible to prevent negative torques from occurring.

Next, how to address a problem that a torque is reduced when the rotor 11E is turned in the CCW so as to be presently located close to the rotational angle θr of 50 degrees illustrated in (b) of FIG. 11.

Figure 63:
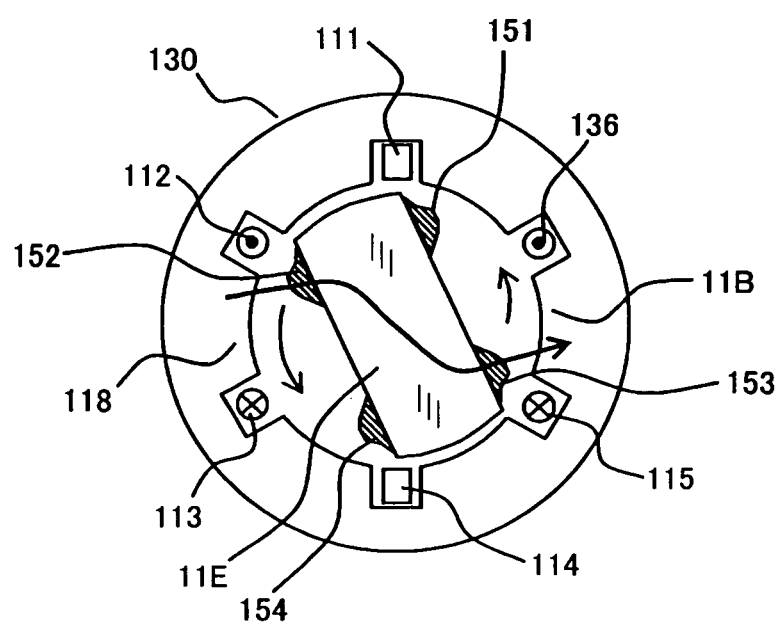
FIG. 63 is a lateral cross sectional view schematically illustrating a reluctance motor according to the first embodiment.

As illustrated in FIG. 63, projections 151 and 153 made of a soft magnetic material are mounted on both ends of one of the longitudinal sides of the rotor 11E. Similarly, projections 152 and 154 made of a soft magnetic material are mounted on both ends of one of the longitudinal sides of the rotor 11E. The projections keep out the way of rotating the rotor 11E relative to the stator core.

Each of the projections 151 to 154 can increase a torque.

For example, at the rotor position illustrated in FIG. 63, the projection 152 reduces a gap between the projection 152 and the stator pole 118 to thereby reduce a magnetic resistance in the gap. Similarly, the projection 153 reduces a magnetic resistance in a gap between the projection 153 and the stator pole 113. These features can increase a torque. When the motor requires only a torque in the CCW, the projections 151 and 154 can be omitted.

In addition, in the reluctance motor 701 illustrated in FIG. 47, when the total of radial magnetic fluxes between the stator and the rotor is not zero, any magnetic bypass path can be provided between the stator and the rotor. This increases the amount of magnetic fluxes passing through the stator and the rotor, thus effectively creating a torque. As another method, a first motor and a second motor are provided. The amount of magnetic fluxes between a stator and a rotor of the first motor and that of magnetic fluxes between a stator and a rotor of the second motor are opposite to each other. The first motor and the second motor are parallelly arranged, and the stators of the first and second motors are magnetically coupled to each other, and the rotors of the first and second motors are magnetically coupled to each other. This effectively crates a torque.

Figure 64:
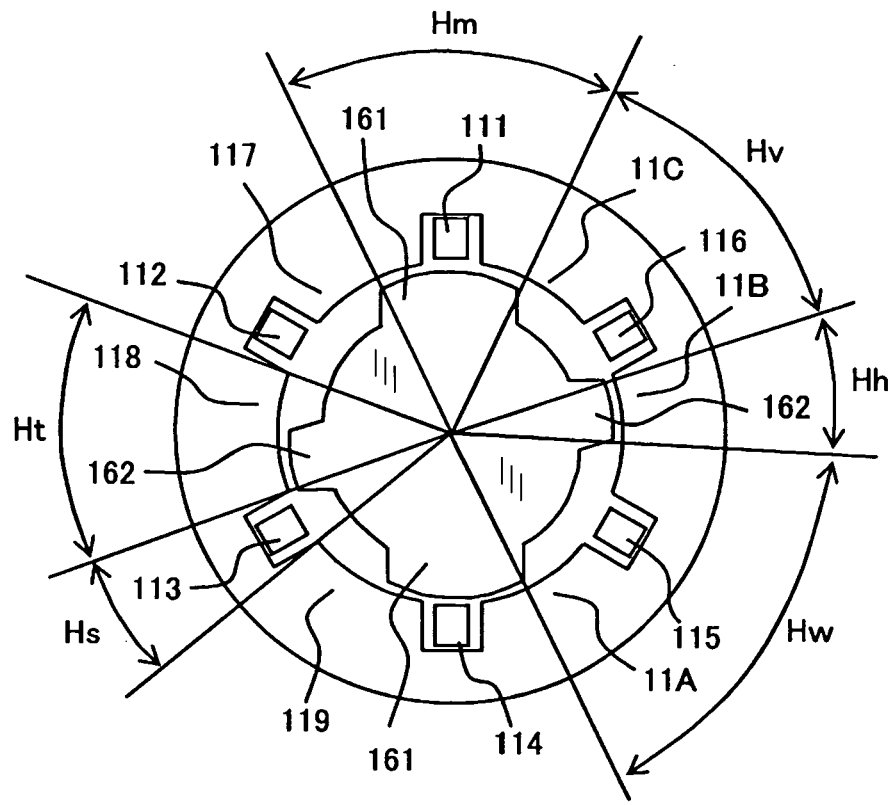
FIG. 64 is a lateral cross sectional view schematically illustrating a reluctance motor according to the first embodiment.

Next, in the motor illustrated in FIG. 58, the main salient poles 161 and the auxiliary salient poles 162 can be arranged to be asymmetry in the circumferential direction (see FIG. 64). That is, a pitch between one main salient pole 161 and one auxiliary salient pole 162 is longer than that between the other main salient pole 161 and the other auxiliary salient pole 162. The configuration of the motor illustrated in FIG. 64 can improve the torque characteristics of the motor that is used to be rotated in only one direction.

Figure 65:
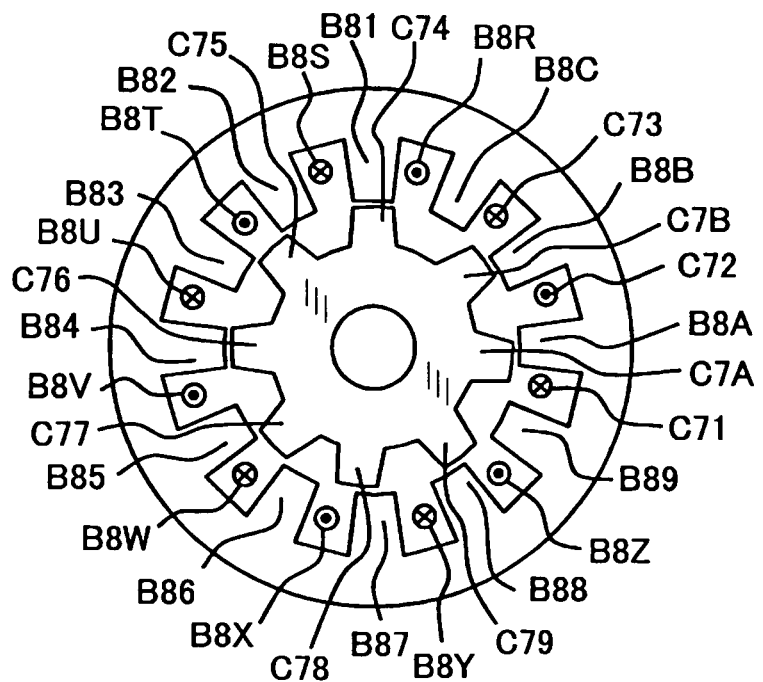
FIG. 65 is a lateral cross sectional view schematically illustrating an example of the structure of a reluctance motor (12S8R motor) according to the first embodiment.

FIG. 65 schematically illustrates an example of the structure of a reluctance motor (12S8R motor) according to the first embodiment. The 12S8R motor is designed by expanding the 6S4R motor 110 to eight-pole motor. The stator is provided with twelve stator poles (the number M is twelve), which are represented by B81, B82, B83, B84, B85, B86, B87, B88, B89, B8A, B8B, and B8C. The rotor has a substantially annular shape, and has, at its outer circumference, with eight salient poles C74, C75, C76, C77, C78, C79, C7A, and C7B.

Twelve stator coils B8R, B8S, B8U, B8T, B8U, B8V, B8W, B8X, B8Y, B8Z, B8D, B8E, and B8F are wound in the stator core (see circled dots and circled cross).

The rotor poles C78, C79, C7A, and C7B are shifted in the CW by 30 electrical degrees and by 15 mechanical degrees with respect to the remaining rotor poles C74, C75, C76, and C77. The circumferential shape of some of rotor or stator poles can reduce torque ripples.

Next, the shape of the outer surface of each of the rotor poles and that of the inner surface of each of the stator poles will be described. The shape of the outer surface of each of the rotor poles will be described because the inner surface of each of the rotor poles can have a shape relative to the shape of the outer surface of each of the rotor poles. In addition, both of the shape of the outer surface of each of the rotor poles and that of the inner surface of each of the stator poles can be deformed such that the deformed shapes relatively achieve advantages obtained by various deformed shapes illustrated in FIG. 66.

Figure 66:
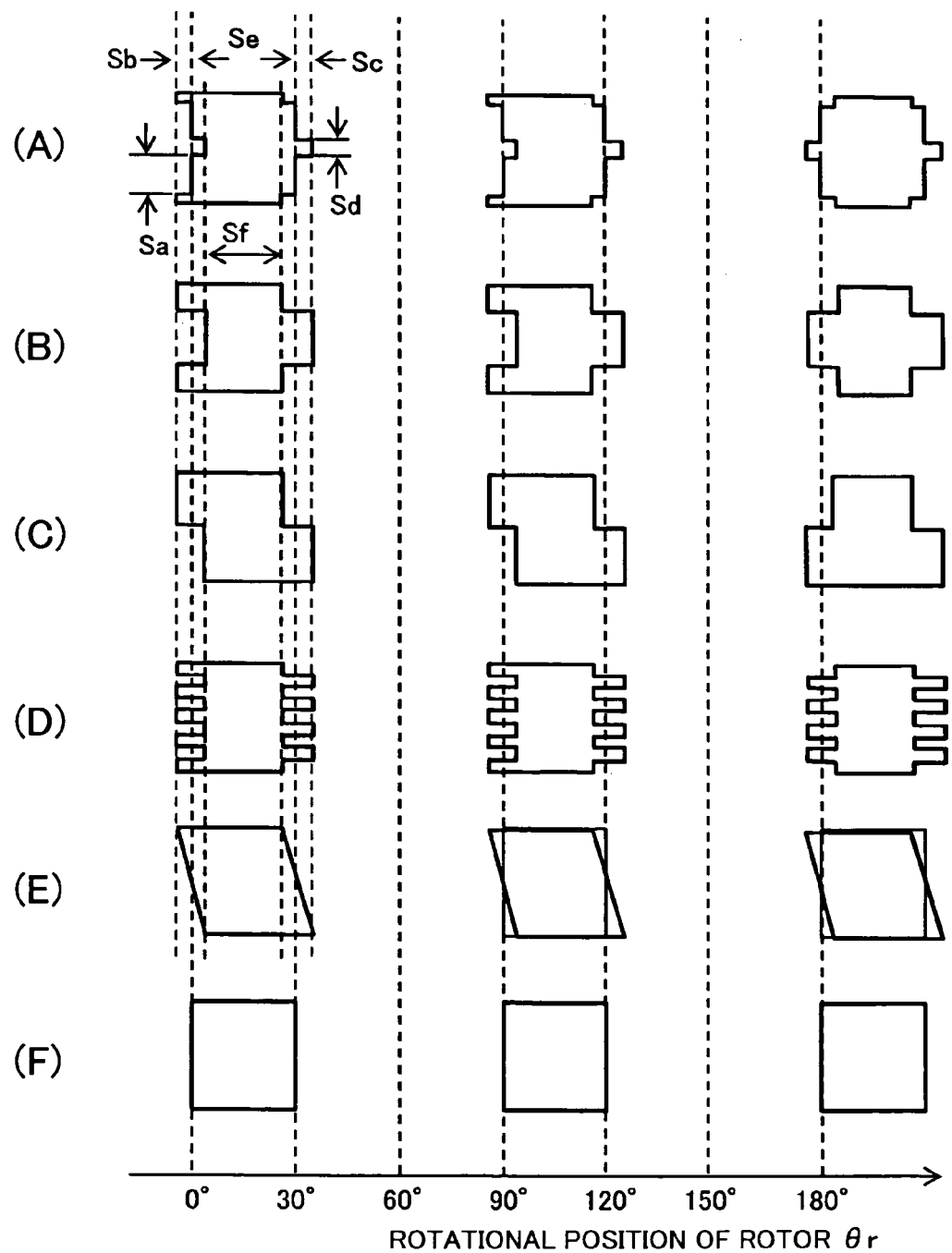
FIG. 66 is a development view schematically illustrating examples of shapes of an outer surface of each rotor pole illustrated in FIG. 1B in a rotational direction of the rotor according to the first embodiment.

(F) of FIG. 66 is a view schematically expanding the shape of the outer surface of each rotor pole A0K illustrated in FIG. 1B in the rotational direction of the rotor. As illustrated in (F) of FIG. 66, the outer surface of each rotor pole A0K has a substantially rectangular shape. The horizontal axis of FIG. 66 represents a range of the rotational position θr of the rotor from 0 degrees to 180 degrees. The vertical direction represents the axial direction of the rotor.

(E) of FIG. 66 illustrates the shape of the outer surface of each rotor pole A0K obtained by skewing the shape of the outer surface of each rotor pole A0K illustrated in (F) of FIG. 66. The skewing normally reduces torque ripples. In the first embodiment, the reduction in torque ripples and widening the torque creating region of the rotor can be expected.

(D) of FIG. 66 illustrates concave and convex portions formed at each side of each rotor pole in the axial direction of the rotor. This reduces magnetic flux components in each rotor pole in the axial direction of the rotor, and reduces eddy currents in the magnetic silicon steel sheets of the rotor.

Because the outer surface of each rotor pole A0K illustrated in (D) of FIG. 66 has a symmetrical shape with respect to the axial direction of the rotor, it is possible to reduce force acting in the axial direction of the rotor.

(C) of FIG. 66 illustrates that the shape of the outer surface of each rotor pole A0K obtained by stepped skewing the shape of the outer surface of each rotor pole A0K illustrated in (F) of FIG. 66. The stepped skewed shape is asymmetrical with respect to the axial direction of the rotor. The stepped skewing has substantially the same advantages as the skewing.

(B) of FIG. 66 illustrates that the shape of the outer surface of each rotor pole A0K obtained by skewing the shape of the outer surface of each rotor pole A0K illustrated in (F) of FIG. 66. The stepped skewed shape is symmetrical with respect to the axial direction of the rotor. The stepped skewing has substantially the same advantages as the skewing, and further reduces vibrations of the rotor in its axial direction.

(A) of FIG. 66 illustrates that the stepped skewed shape of the outer surface of each rotor pole A0K as well as the shape illustrated in (B) of FIG. 66 such that one side of each rotor pole in the axial direction of the rotor is formed at its either end with a first projection with a length of Sb, and the other side thereof is formed at its center with a second projection with a length Sc. The length of one side of each rotor pole A0K in the axial direction of the rotor illustrated in (F) of FIG. 66 is twice the length Sa of a portion of the one side of each rotor pole A0K in the axial direction of the rotor illustrated in (A) of FIG. 66.

Because the product of 2 and the length Sa is longer than the length Sc of the first projection in the axial direction of the rotor, the stepped skewed shape of the outer surface of each rotor pole A0K illustrated in (A) of FIG. 66 has electromagnetic characteristics substantially identical to those of the shape illustrated in (F) of FIG. 66. However, the stepped skewed shape of the outer surface of each rotor pole A0K illustrated in (A) of FIG. 66 makes the torque creating region of the outer surface of each rotor pole A0K in the circumferential direction wider, by the lengths Sb and Sc, than that of the outer surface of each rotor pole A0K illustrated in (F) of FIG. 66. The stepped skewed shape of the outer surface of each rotor pole A0K illustrated in (A) of FIG. 66 is preferable when it is necessary for a motor, such as the motor 110A, to make wide he torque creating region.

In addition, as illustrated at the rotational position θr of 180 electrical degrees, each of (A), (B), (C), (D), and (E) of FIG. 66 has a corresponding shape of the outer surface of each rotor pole A0K; this shape is symmetrical in the circumferential direction of the rotor.

In FIG. 66, the circumferential width of each rotor pole is set to 30 electrical degrees, but can be set to a value within a range from 20 to 60 electrical degrees. The motor model 110A illustrated in FIG. 9 is designed such that two rotor poles are arranged within 360 electrical degrees, which is different in structure from the motor model 110 illustrates in FIG. 1B. For this reason, the circumferential width of each rotor pole of the motor model 110A is set to a value within a range from 40 to 90 electrical degrees. Thus, when any one of the various shapes illustrated in (A) to (E) of FIG. 66 is applied to the outer surface of each rotor pole of the motor 110A, values on the horizontal axis are replaced to new values twice the original values.

For example, a point at 30 electrical degrees on the horizontal axis is replaced to a point at a value within a range from 40 to 90 electrical degrees, and a point at 90 electrical degrees is replaced to a point at 180 electrical degrees. In addition, a point at 180 electrical degrees is replaced to a point at 360 electrical degrees. Thus, when the circumferential width Hm of each rotor pole is set to 60 electrical degrees, a circumferential space between adjacent rotor poles is set to 120 electrical degrees, and the circumferential width Hm of each rotor pole is set to 80 electrical degrees, a circumferential space between adjacent rotor poles is set to 100 electrical degrees.

Next, in the 6S2R motor illustrated in FIGS. 9 and 11, how to more smoothly generate a continuous torque in, for example, the CCW will be described hereinafter.

For example, in (b) of FIG. 11, because the circumferential width of the innermost open end of each slot is set to 20 electrical degrees, the magnetic flux MF1 may be relatively small, and a torque created based on the magnetic flux MF1 may be relatively small. In order to cover 360 electrical degrees by six stator poles, each stator pole needs to create a torque over a range of at least 60 electrical degrees.

In the 6S2R motor illustrated in FIGS. 9 and 11, the inner surface of each stator pole has a substantially rectangular shape and the circumferential width Ht thereof is set to 40 electrical degrees in this case, let us consider a case where the outer surface of each rotor pole has any one of the shapes illustrated in (A) to (F) of FIG. 66.

Because the width Sf illustrated in FIG. 66 is set to 40 electrical degrees, the following equation is established:

$$Sb+(Se-Sf)/2+Sf \geq 60°$$

Thus, the following equation is established:

$$Sb+Se/2 \geq 40°$$

When the width Sf is set to be greater than 40 electrical degrees, the following equation is established:

$$Sb+(Se-Sf)/2+40° \geq 60°$$

Thus, the following equation is established:

$$Sb+(Se-Sf)/2 \geq 20°$$

At that time, the magnitude of a torque is changed depending of any one of the shapes illustrated in (A) to (F) of FIG. 66.

The motor 110A is designed such that one stator pole takes over the torque generation action from an alternative stator pole circumferentially adjacent to the one stator pole to thereby turn the rotor. For this reason, in order to achieve a sufficient time to transfer the torque generation action between circumferentially adjacent stator poles, 60 electrical degrees appearing in the equations can be changed to be greater than 60 electrical degrees.

In the examples set forth above, it is assumed that each of the stator pole has a rectangular shape, and each of the rotor poles has any one of the shapes illustrated in (A) to (F) of FIG. 66. Each of the stator poles and each of the rotor poles can have any one of various shapes, for example, illustrated in (A) to (F) of FIG. 66. Each of the stator poles and each of the rotor poles can include curved lines. Each of the stator poles and each of the rotor poles can have a tapered shape in its axial direction that allows an air gap is changed by change of a relative positional relationship between the rotor and the stator in the axial direction by the mechanism MMC (see FIG. 62). Modifications of the shape of each of the stator poles and each of the rotor poles can prevent circumferential force and radial force from being rapidly changed with rotation of the rotor.

In addition, in the 6S2R motor illustrated in FIGS. 9 and 11, in order to more smoothly generate a continuous torque, the half of the rotor poles can be circumferentially shifted by 20 electrical degrees to thereby generate a continuous torque. For example, in eight-pole motors, the first pair of two rotor poles are maintained at original positions, and the second pair of two rotor poles are shifted in the CCW by 20 electrical degrees. In addition, the next third pair of two rotor poles are maintained at its original positions, and the next fourth pair of two rotor poles are shifted in the CCW by 20 electrical degrees. This more smoothly creates a continuous torque. This rotor-pole arrangement allows the rotor to have a symmetrical shape about the center direction of the rotor. For this reason, the motor has a good mechanical balance. The configuration can be combined to the method illustrated in FIG. 66.

Next, in the motor 110A illustrated in FIG. 9, the relationship among the shape of the inner surface of each stator pole opposing the rotor, the shape of the outer surface of each rotor pole opposing the stator, and a torque to be created between the inner surface of each stator pole and the outer surface corresponding to one rotor pole will be described with reference to FIGS. 67 and 68.

A torque to be created by the 6S2R motor illustrated in FIG. 9 is different from that to be created by the 6S4R motor illustrated in FIG. 1B. When a rotor pole starts to face the opening end of a slot, the created torque is reduced; this may cause torque ripples. On the other hand, reduction in the circumferential width of each slot reduces a space in which a positive or negative stator winding is installed. The reduction in the circumferential width of each slot may cause flux leakages between stator poles and flux saturation of each stator pole. That is, in the motor 110A illustrated in FIG. 9, created torques and flux leakages become trade-off, and therefore, it may be difficult to implement both of them.

Figure 67:
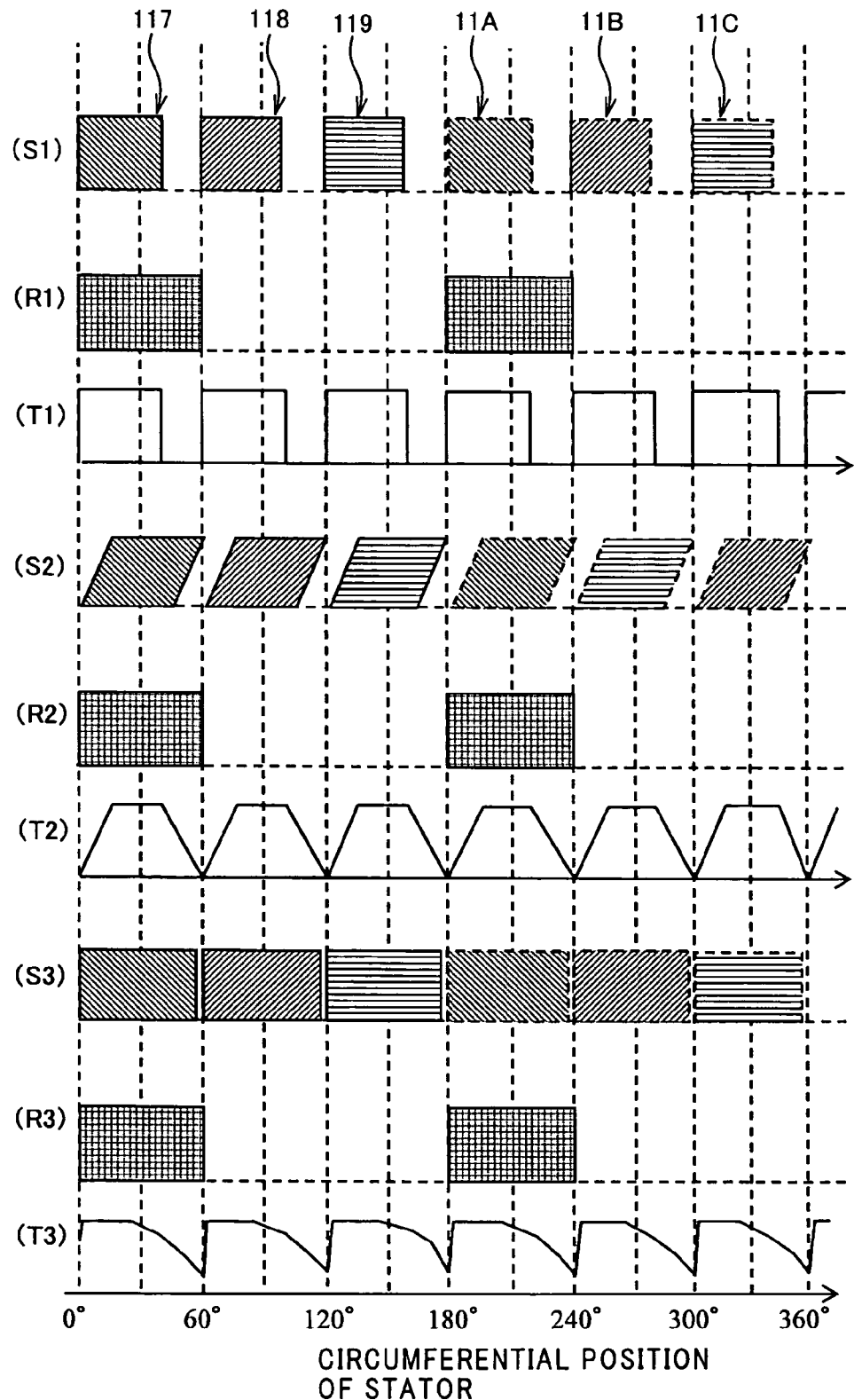
FIG. 67 is a development view schematically illustrating examples of shapes an inner surface of each stator pole illustrated in FIG. 9 according to the first embodiment.

(S1) of FIG. 67 is a view schematically expanding the shape of the inner surface of each of the stator poles 117, 118, 119, 11A, 11B, and 11C opposing the rotor in the rotational direction of the rotor. The horizontal axis of FIG. 67 represents a circumferential angular position of the stator. In the eight-pole motor illustrated in FIG. 10, the horizontal axis is represented by electrical angles.

The vertical axis represents the axial direction of the rotor. As illustrated in (S1) of FIG. 67, the inner surface of each of the stator poles has a rectangular shape. The circumferential width of the inner surface of each stator pole is set to 40 electrical degrees, and the circumferential width of the opening end of each slot is set to 20 electrical degrees.

(R1) of FIG. 67 is a view schematically expanding the shape of the outer surface of the rotor pole 11E opposing the stator in the rotational direction of the rotor. The horizontal and vertical axes are identical to those of (S1) of FIG. 67. The circumferential width of the outer surface of the rotor pole 11E is set to 60 electrical degrees, and the axial width thereof is identical to that of each stator pole.

(T1) of FIG. 67 illustrates torques to be created by the simply modeled motor 110A when the rotor with the rotor poles each having the shape illustrated in (R1) of FIG. 67 is rotated in the CCW relative to the stator with the stator poles each having the shape illustrated in (S1) of FIG. 67. The simply modeled motor 110A are designed such that the length of an air gap between the stator aid the rotor is set to be zero, and there are little flux leakages in a space close to the stator and rotor. The characteristics (T1) of the torques represent that effective torques are created at regular intervals of 20 electrical degrees, and each of effective torques is created within 40 electrical degrees.

(S2) of FIG. 67 is a view schematically expanding the shape of the inner surface of each of the stator poles 117, 118, 119, 11A, 11B, and 11C obtained by skewing the shape of the inner surface of each of the stator poles illustrated in (S1) of FIG. 67.

(R2) of FIG. 67 is kept unchanged from (R1) of FIG. 67.

(T2) of FIG. 67 illustrates torques to be created by the simply modeled motor 110A when the rotor with the rotor poles each having the shape illustrated in (R) of FIG. 67 is rotated in the CCW relative to the stator with the stator poles each having the shape illustrated in (S2) of FIG. 67.

The characteristics (T2) of the torques represent that effective torques are sequentially created except for some points, and each of effective torques has a trapezoidal shape. The torque decay period in electrical degrees becomes a wide range of, for example, 40 to 80 electrical degrees. Note that, in (S2) and (R2) of FIG. 67, when the inner surface of each stator pole has a rectangular shape, and the shape of the outer surface of each rotor pole is skewed, the characteristics of torque illustrated in (T2) of FIG. 67 can be achieved.

(S3) of FIG. 67 schematically illustrates the shape of the inner surface of each stator pole when the circumferential width of the inner surface of each stator pole is set to substantially 60 electrical degrees. This circumferentially widens the shape of the inner surface of each stator pole as much as possible. The shape of the outer surface of each rotor pole illustrated in (R3) of FIG. 67 is identical to that of the inner surface of each stator pole illustrated in (S3) of FIG. 67.

In this configuration, because the stator poles are circumferentially adjacent to each other, if flux leakage between the stator poles occurred, the magnetic paths of the stator poles would be magnetically saturated depending on the rotational position of the rotor.

The characteristics of torques to be created by the simply modeled motor 110A when the rotor with the rotor poles each having the shape illustrated in (R3) of FIG. 67 is rotated in the CCW relative to the stator with the stator poles each having the shape illustrated in (S3) of FIG. 67 are illustrated in (T3) of FIG. 67.

The characteristics (T3) of torques show that large torques are created each period when the opposing areas between of the inner surface of each stator pole and the outer surface of a corresponding one rotor pole are small. In addition, the characteristics (T3) of torques show that the created torques are reduced with increase in the opposing areas between of the inner surface of each stator pole and the outer surface of a corresponding one rotor pole.

Figure 68:
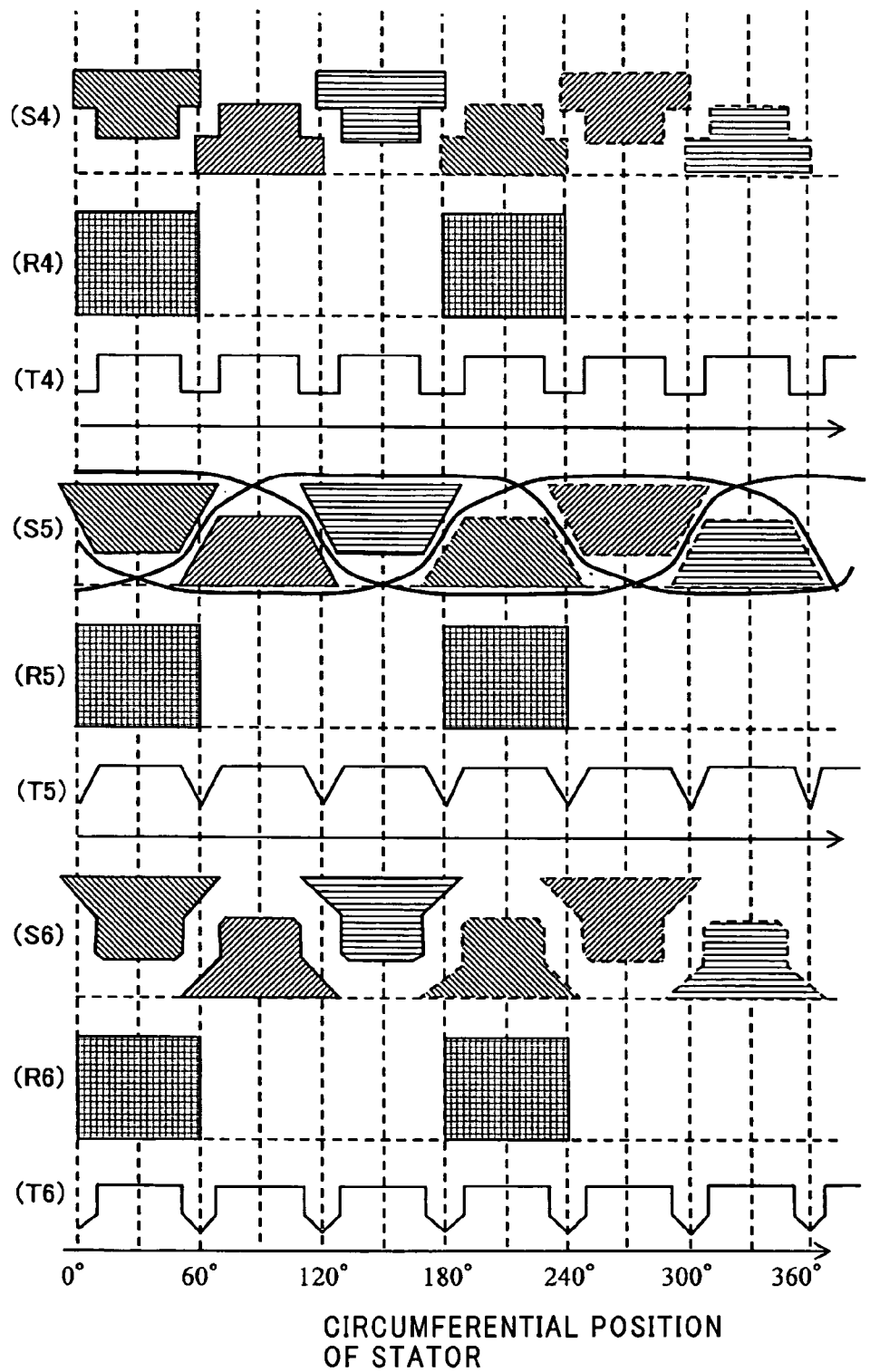
FIG. 68 is a development view schematically illustrating examples of shapes of an inner surface of each stator pole illustrated in FIG. 9 according to the first embodiment.

(S4) of FIG. 68 schematically illustrates the shape of the inner surface of each stator pole, which is illustrated in (C) of FIG. 66 at the rotational position θr of 180 electrical degrees. In other words, the shape of the inner surface of each stator pole is formed by combining the half part of the shape illustrated in (S1) of FIG. 67 with the half part of the shape illustrated in (S3) of FIG. 67. Stator poles circumferentially adjacent to each other are shaped to be symmetrical with each other with respect to the axial direction of the rotor. Stator poles are shifted in the axial direction away from each other. This results in that the axial width of each stator pole and the axial width of each rotor pole (see (S3) and (R4) of FIG. 67) are approximately 1.5 times the axial width of each stator pole and the axial width of each rotor pole illustrated in (S3) and (R3), respectively.

The characteristics of torques to be created by the simply modeled motor 110A when the rotor with the rotor poles each having the shape illustrated in (R4) of FIG. 68 is rotated in the CCW relative to the stator with the stator poles each having the shape illustrated in (S4) of FIG. 68 are illustrated in (T4) of FIG. 68.

As illustrated in (T4) of FIG. 68, in comparison to an average torque and a torque drop of each of the created torques illustrated in (T3) of FIG. 67, an average torque and a torque drop of each of the created torques is greatly improved. In addition, it is possible to increase spaces between circumferentially adjacent stator poles, thus reducing flux leakages between stator poles in comparison to the configuration illustrated in (S3) of FIG. 67.

(S5) of FIG. 68 schematically illustrates the shape of the inner surface of each stator pole obtained by deforming the shape illustrated in (S4) of FIG. 68 to a trapezoidal shape. The shape of the outer surface of each rotor pole illustrated in (R5) of FIG. 68 is identical to that of the outer surface of each rotor pole illustrated in (R4) of FIG. 68.

The characteristics of torques to be created by the simply modeled motor 110A when the rotor with the rotor poles each having the shape illustrated in (R5) of FIG. 68 is rotated in the CCW relative to the stator with the stator poles each having the shape illustrated in (S5) of FIG. 68 are illustrated in (T5) of FIG. 68.

As illustrated in (T5) of FIG. 68, in comparison to an average torque and a torque drop of each of the created torques illustrated in (T3) of FIG. 67, an average torque and a torque drop of each of the created torques is improved. In addition, widening the circumferential width of each stator pale to separate relative axial positions of circumferentially adjacent stator poles implements both of the increase in torques and reduction in flux linkages between stator poles. That is, the shape of the inner surface of each stator pole illustrated in (S5) of FIG. 68 can implement both of the increase in torques and reduction in flux linkages between stator poles.

Note that, the shape of the inner surface of each stator pole illustrated in (S5) of FIG. 68 is greater in the axial direction of the rotor than the shape illustrated in (S1) of FIG. 67. However, the shape of the inner surface of each stator pole illustrated in (S5) of FIG. 68 can reduce the length of each three-phase stator coil additionally illustrated in (S5) of FIG. 68. In addition, forming an axial concave portion in the inner surface of each stator pole illustrated in (S5) of FIG. 68 allows the length of projection of the end of each stator coil in the axial direction of the rotor to be reduced.

In addition, intersections of three-phase stator coils can be located in an axial space over each trapezoidal stator pole (see (S5) in FIG. 68). This is effective in arrangement of the three-phase coils. Thus, it is possible to provide the motor illustrated in (S5), (R5), and (T5), which is more excellent in torque-characteristic, size, and cost than the motor illustrated in (S1), (R1), and (T1).

Note that, when we laminate a plurality of magnetic steel sheets in alignment to manufacture the stator poles illustrated in (S5) of FIG. 68, it is necessary to prepare the plurality of magnetic steel sheets, each of which has a plurality of teeth each having a circumferential width that is different from a circumferential width of each tooth of another magnetic steel sheet.

Thus, dies used to punch magnetic steel sheets need to be specially designed. Conventionally, there is a technique to pressing a magnetic steel material into a rotatable die while the die is slightly rotated for one pressing to thereby accomplish a skewed laminated core.

Such a rotatable die (first die) is arranged in a station to press one side of each slot, and a rotatable die (second die) is arranged in the station is to press the other side of each slot. A magnetic steel material is pressed by the first and second dies while the first and second dies are rotated in respectively opposing directions. This produces a plurality of magnetic steel sheets, each of which has a plurality of teeth each having a circumferential width that is different from a circumferential width of each tooth of another magnetic steel sheet. The plurality of magnetic steel sheets can be laminated to produce a stator core. In this case, caulking joint, such as dowel attachment, can be utilized to join the plurality of magnetic steel sheets.

As another method, a rotatable die (first die) is arranged in a station to press one side of each slot, and a stationary die (second die) is arranged in the station to press the other side of each slot. A magnetic steel material is pressed by the first and second dies while the first die is rotated in one direction. This produces a plurality of magnetic steel sheets, each of which has a plurality of teeth each having a circumferential width that is different from a circumferential width of each tooth of another magnetic steel sheet. Thereafter, the plurality of magnetic steel sheets are aligned with each other to produce a laminated stator core. In this case, caulking joint, such as dowel attachment, cannot be utilized to join the plurality of magnetic steel sheets.

However, in this case, an alignment mechanism for alignment the rotating directions can be provided. This can utilize the caulking joint.

The motors illustrated in FIG. 68 can be designed to be relatively thin motors. A magnetic path in the axial direction of the rotor can be provided on a part of the back yoke to thereby reduce variations of the magnetic fluxes in the axial direction of the rotor. It is possible to use a material capable of increasing or reducing magnetic fluxes in three-dimensional directions.

In FIG. 68, the circumferential width of each rotor pole can be greater than 60 electrical degrees; this can overlap three-phase torques with each other.

Next, one measure associated with flux leakages in the motors according to the first embodiment and its modifications will be described with reference to FIG. 69.

There are many applications that require relatively large torques at a high RPM of the rotor. The limitation of the peak torque in the motors according to the first embodiment and its modifications may be caused by the magnetic saturation of a part of the magnetic paths through which the magnetic fluxes contributing generation of torques pass. The magnetic saturation is mostly created by the increase in the total magnetic fluxes $\phi s$ due to the flux linkages from each part of the motor. Thus, in order to achieve a large peak torque, it is effective to sufficiently ensure the area of the cross section of each of the magnetic paths in the motor, and reduce the flux leakage from the respective parts of the motor. In order to require a large torque at a high RPM of the rotor, the reduction in flux leakages improves the power factor, thus enhancing the motor efficiency.

(a) of FIG. 69 is an enlarged cross sectional view of a part of the motor illustrated in FIG. 9. Reference character C92 in FIG. 69 represents the negative A-phase winding 114 in FIG. 9, and reference character C91 represents a stator core 11F in FIG. 9. Reference character C93 represents leakage fluxes generated when a large A-phase current is supplied to flow through the negative A-phase winding C92 in a direction out of the paper of FIG. 69. The flux leakages causes a tooth (start pole) to be magnetically saturated; this may make it difficult to increase torque.

In order to address such a matter, as illustrated in (b) of FIG. 69, a rectangular copper wire C94 is used as each of the stator coil. As illustrated in (b) of FIG. 69, the negative C-phase winding C94 is wound in a corresponding slot such that a longitudinal side of its rectangular cross section is arranged to be directed toward the center portion of the rotor.

With the structure, an increase and decrease in flux leakages C95 generated when a large A-phase current is supplied to flow through the negative A-phase winding C94 induces an eddy current in the negative A-phase winding C94, and the eddy current reduces the flux leakages C95.

When the motor creates a static torque or is rotated at a low RPM, there may be little advantages. However, when a large current is supplied to flow through the negative A-phase winding C94 at a high RPM so that the frequency of the flux leakages C95 increases, the eddy current in the negative A-phase winding C94 reduces the flux leakages. As set forth above, using the rectangular copper wire C95 as each of the three-phase stator coils improves the power factor of the motor, and the motor efficiency.

At that time, there are many flux leakages C95 around the opening end of a corresponding slot. For this reason, in comparison to the length C96 between the opening end and the bottom of the slot, in other words, the depth C96 of the slot, the length C97 of the longitudinal side of the rectangular copper wire C94 is equal to or greater than the quarter of the length C96. This makes it possible to more improve the power factor of the motor, and the motor efficiency.

Next, an alternative measure associated with flux leakages from the motors according to the first embodiment and its modifications will be described with reference to FIG. 70.

In, the structure of the motor 110A illustrated in FIG. 9, two conductive members, such as conductive plates, 505 and 507 are mounted on both ends of one of the longitudinal sides of a rotor 501 corresponding to the rotor 11E. Similarly, two conductive members, such as conductive plates, 506 and 508 are mounted on both ends of the other of the longitudinal sides of the rotor 501. The conductive members 505 to 508 constitute a closed circuit. When flux leakages pass through the conductive members 505 to 508, currents are induced through the conductive members 505 to 508; these induced currents reduce the flux leakages.

In the motors according to the first embodiment and its modifications, the magnetic fluxes in the rotor alternate with rotation of the rotor. For this reason, it is possible to reduce flux leakages. The flux-leakage reducing measure set forth above can be applied to another motor according to the first embodiment and its modifications.

The flux leakages from the rotor may occur from an end of each salient pole of the rotor 501. In order to address it, a conductive member can be replaced with the magnetic steel sheet of the end of each salient pole of the rotor 501. This reduces the flux leakages from the end of each salient pole of the rotor 501.

Figure 70:
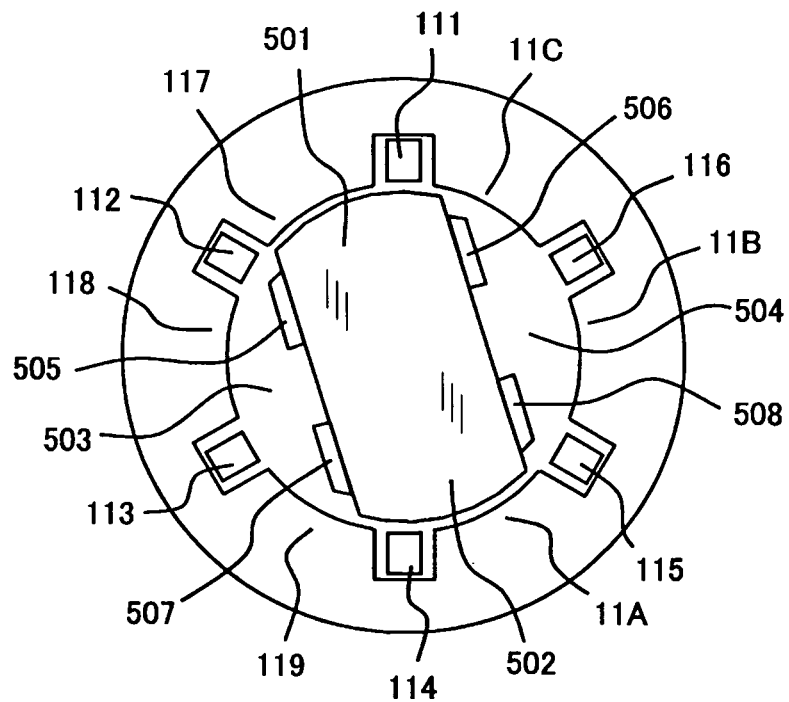
FIG. 70 is a lateral cross sectional view schematically illustrating an alternative measure associated with flux leakages in the motors according to the first embodiment and its modifications.

As a modification of the structure of the motor illustrated in FIG. 70, two slits 509 and 50B are formed in both ends of one of the longitudinal sides of a rotor 501 corresponding to the rotor 11E. Similarly, two slits 50F and 50D are fitted in both ends of the other of the longitudinal sides of the rotor 501 corresponding to the rotor 11E.

Two conductive members, such as conductive plates, 50A and 50C are fitted in the slits 509 and 50B, respectively. Similarly, two conductive members, such as conductive plates, 50G and 50E are installed in the slits 50F and 50D, respectively.

Figure 71:
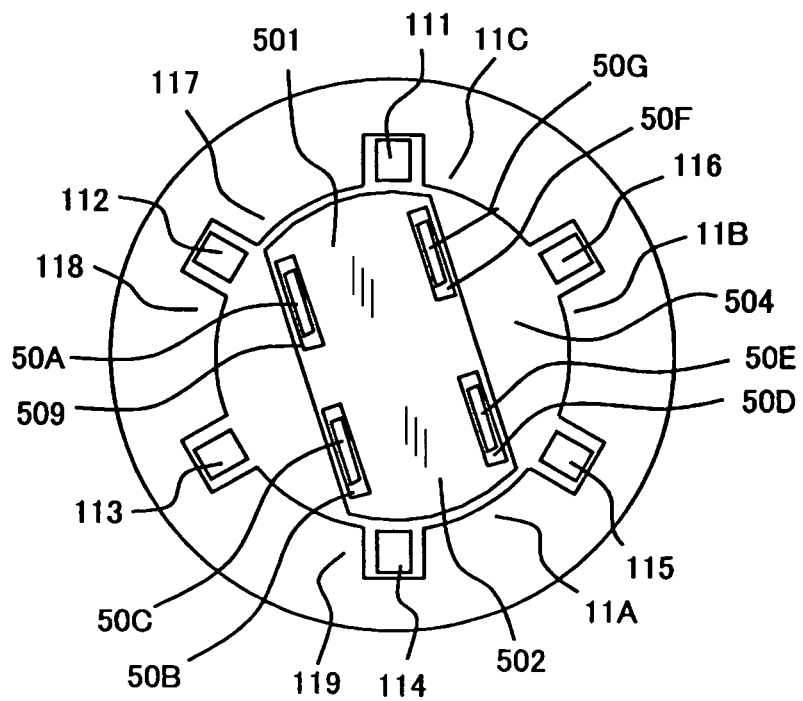
FIG. 71 is a lateral cross sectional view schematically illustrating a modification of the motor illustrated in FIG. 70.

The structure of the motor illustrated in FIG. 71 achieves the advantages achieved by the motor illustrated in FIG. 70. Additionally, the structure of the motor illustrated in FIG. 71 allows the conductive members to be easily fixed to the rotor. Thus, the motor can be easily applied to applications that require a high RPM of the rotor.

Next, a method of increasing a maximum torque of a motor according to the first embodiment will be described hereinafter.

The torque characteristic curve of the motor 708 illustrated in FIG. 54 is for example illustrated in FIG. 5 as the current-torque characteristic curve Tm.

Specifically, the relationship between torque T and current a within a range from 0 to the value A1 has a characteristic curve close to a quadratic function; this relationship is represented by the equation (10).

Torque T within a range from the value A1 of current Ix to the value A2 thereof becomes a linear function of current Ix (see the equation (15)). That is, the torque T is increased from a value T1 corresponding to the value A1 to a value T2 corresponding to a value T2.

When the current Ix is set to be greater than the value A2, a part of a magnetic path, such as the back yoke, formed in the motor except for the air gap between each stator pole and a corresponding rotor pole is magnetically saturated. This reduces the rate of increase of torque to increase in current. Thus, the relationship between torque T and current be over the value A2 of current Ix has a torque-saturated curve within a range from the value T1 of the torque T to a value T2 thereof.

An increase in a maximum torque to be created by the motor 708 means an increase in a value T3 on the current-torque characteristic curve to a value T4. This increase in the maximum torque is technically carried out by reducing the magnetic saturation inside the motor. This reduction in the magnetic saturation allows large magnetic energy to be given to the air gap between each stator pole and a corresponding rotor pole.

First, which part of a reluctance motor, such as the motor 708 illustrated in FIG. 54, is prone to be magnetically saturated will be described hereinafter. FIG. 54 illustrates a situation in which the main salient poles 161 face the tooth 117 and the tooth 11A, respectively so that each of the teeth 117 and 11A is prone to be magnetically saturated.

For example, in the situation, a magnetic-flux component from the tooth 11A passes through one main salient pole 161 so as to enter the tooth 117. In addition, a flux leakage component created by a current flowing through the winding 111 is transferred from the stator pole 11C through a portion close to the opening end of a slot corresponding to the winding 111 so that the flux linkage component enters the tooth 117.

Moreover, a flux leakage component created by a current flowing through the winding 112 is transferred from the stator pole 118 through a portion close to the opening end of a slot corresponding to the winding 111 so that the flux leakage component enters the tooth 117.

Because the flux leakage components are added to the magnetic-flux component from the stator poles at both sides of the one main salient pole 161, the amount of magnetic fluxes passing through the tooth 117 is greater than that of magnetic fluxes passing through each of the main salient pole 161. This may cause the stator pole 117 to be magnetically saturated.

In contrast, when one auxiliary salient pole 162 creates a torque, because the circumferential width of the one auxiliary salient pole 162 is lower than that of the main salient pole 161, flux leakages from both sides of the one auxiliary salient pole 162 may cause the one salient pole 162 to be magnetically saturated.

Specifically, each tooth of the stator and the auxiliary salient poles 162 is prone to be magnetically saturated.

In view of the foregoing matters, five methods of improving a maximum torque of a reluctance motor according to the first embodiment will be described hereinafter.

The first method will be described hereinafter with reference to FIG. 72.

Figure 72:
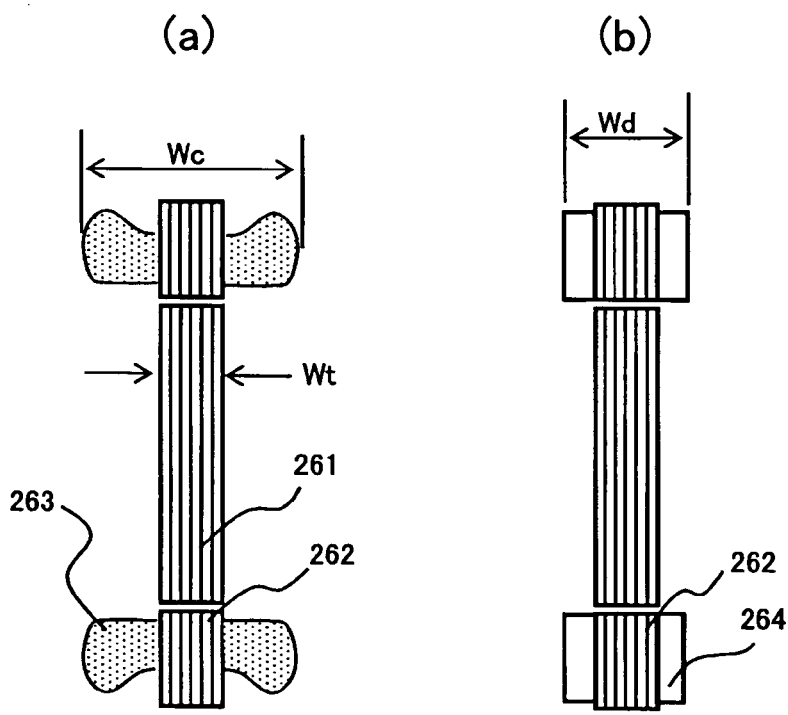
FIG. 72 is a view schematically illustrating the first method of improving a maximum torque of a reluctance motor according to the first embodiment.

(a) of FIG. 72 represents an example of an axial cross section of the reluctance motor 708 illustrated in FIG. 54. Reference character 262 represents one tooth, reference character 263 represents an end of at least one stator coil, and reference character 261 represents a rotor core (rotor 340). (b) of FIG. 72 schematically illustrates a plurality of soft magnetic members 264 each is mounted on either side surface of each tooth 262. In other words, one of the soft magnetic members 264, each tooth 262, and the other of the soft magnetic members 264 are axially laminated. The structure increases an axial thickness of each tooth 262 to thereby increases a magnetic path through each tooth 262. This reduces the magnetic saturation at each tooth 262.

Note that the flow of magnetic fluxes passes not only the radial direction and the circumferential direction but also the axial direction of the rotor. When one tooth 262 and a pair of soft magnetic members 264 are designed as a soft-magnetic laminated member, eddy currents may flow through the soft-magnetic laminated member; this may increase eddy-current loss.

Thus, measures for reducing eddy currents is preferably applied to the structure illustrated in (b) of FIG. 72. For example, it is preferable that a slit is formed in at least one of each tooth 262 and the soft magnetic members 264 mounted thereon. Otherwise, it is preferable to produce each tooth 262 and each of the soft magnetic members 264 by power magnetic core; this powder magnetic core is formed by compressing insulator-coated soft-magnetic powder.

The second method will be described hereinafter with reference to FIG. 73.

Figure 73:
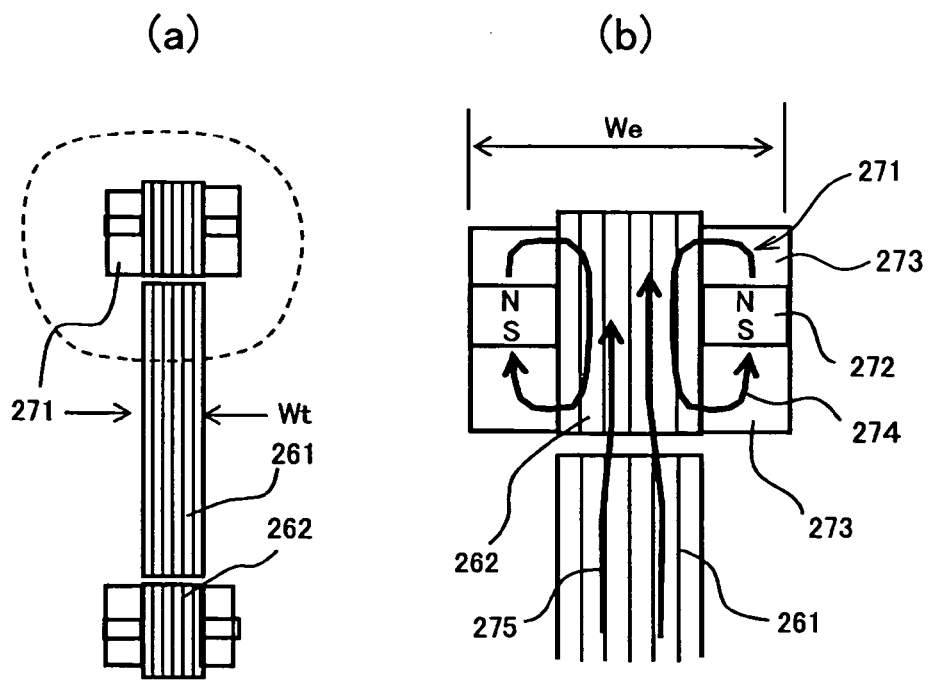
FIG. 73 is a view schematically illustrating the second method of improving a maximum torque of a reluctance motor according to the first embodiment.

(a) of FIG. 73 represents an example of an axial cross section of a modification of the reluctance motor 708 illustrated in FIG. 54.

Dashed circle 271 represents a plurality of magnetic members each is mounted on either side surface of each tooth 262. In other words, one of the magnetic members 271, each tooth 262, and the other of the magnetic members 271 are axially laminated.

Figure 78:
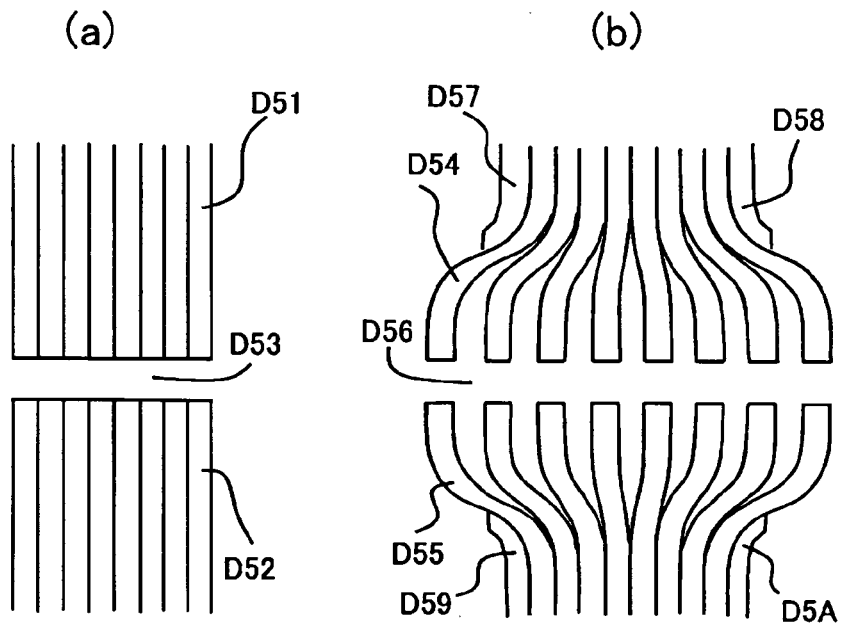
FIG. 78 is an enlarged view schematically illustrating an air gap between a rotor and a stator according to the first embodiment.

(b) of FIG. 78 illustrates, in enlarged scale, the magnetic members 271 mounted on both side surfaces of each tooth 262.

As illustrated in (b) of FIG. 73, each of the magnetic members 271 consists of a rectangular block permanent magnet 272, and a pair of soft magnetic members 273. The permanent magnet 272 is arranged such that its north pole is directed outwardly, and its south pole is directed inwardly. One of the soft magnetic members 271 is mounted on the north-pole side surface, and the other is mounted on the south-pole side surface.

As described above, the control circuit CC or CC1 is designed to supply a unidirectional direct current to a stator winding disposed in each slot. When the current flows through a stator winding adjacent to one tooth 262, magnetic fluxes 275 flow through the rotor 261 and enter the one tooth 262 via an air gap (see (b) of FIG. 73). The direction of the flow of the magnetic fluxes 275 is defined to "positive direction".

At that time, magnetic fluxes 274 travel out of the north pole, pass through the one tooth 262, and return to the south pole. That is, the flow of the magnetic fluxes 274 in the one tooth 262 is opposite to that of the magnetic fluxes 275. In other words, the direction of the magnetic fluxes 274 is defined to "negative direction".

Figure 74:
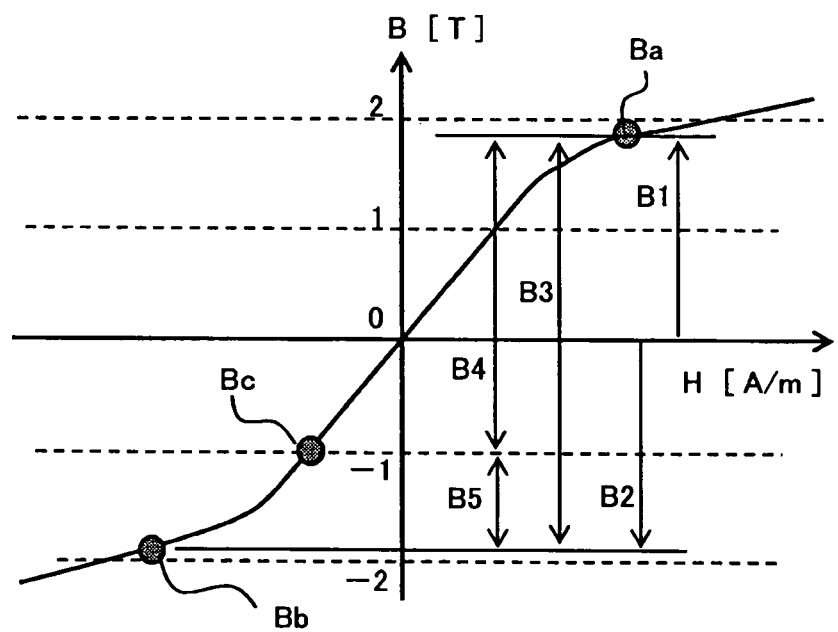
FIG. 74 is a graph schematically illustrating a magnetic characteristic curve in an one tooth of a reluctance motor according to the first embodiment.

A magnetic characteristic curve in the one tooth 262 is illustrated in FIG. 74. The horizontal axis represents magnetic field intensity H [A/m], and the vertical axis represents flux density B [T].

While no magnetic members 271 are mounted on either side of the one tooth 262 as a first structure, when a large direct current is supplied to flow through the stator winding adjacent to the one tooth 262, the flux density of the one tooth 262 is increased from zero to a point Ba. This is because the positive magnetic fluxes 275 enter the one tooth 262.

This increases the flux density of the one tooth 262 up to a value B1 at the point Ba on the magnetic characteristic curve.

Next, while the magnetic members 271 are mounted on either side of the one tooth 262 as a second structure, because the negative magnetic fluxes 274 pass through the one tooth 262, the flux density of the one tooth 262 is a negative value Bb or Bc. In this situation, when a large direct current is supplied to flow through the stator winding adjacent to the one tooth 262, the flux density of the one tooth 262 is increased from the negative value Bb or Bc to the point Ba. This increases the flux density of the one tooth 262 up to the value B1 at the point Ba on the magnetic characteristic curve.

That is, in the second structure, the change (rise) in flux density, illustrated by B3 or B4, is remarkably increased in comparison to the change (rise) in flux density, illustrated by B1.

For example, when the absolute value of a flux density B2 at the point Bb is identical to the flux density B1, the second structure doubles the amount of magnetic fluxes that passes through the one tooth 262 in comparison to the first structure.

When the increase in the amount of magnetic fluxes is expressed by an increase in torque in FIG. 5, the value T3 of the torque T is increased to a value T4.

Measures for reducing eddy currents applied to the structure illustrated in, (b) of FIG. 72 can be applied to the structure illustrated in (a) and (b) of FIG. 73.

The third method will be described hereinafter with reference to FIG. 75.

Figure 75:
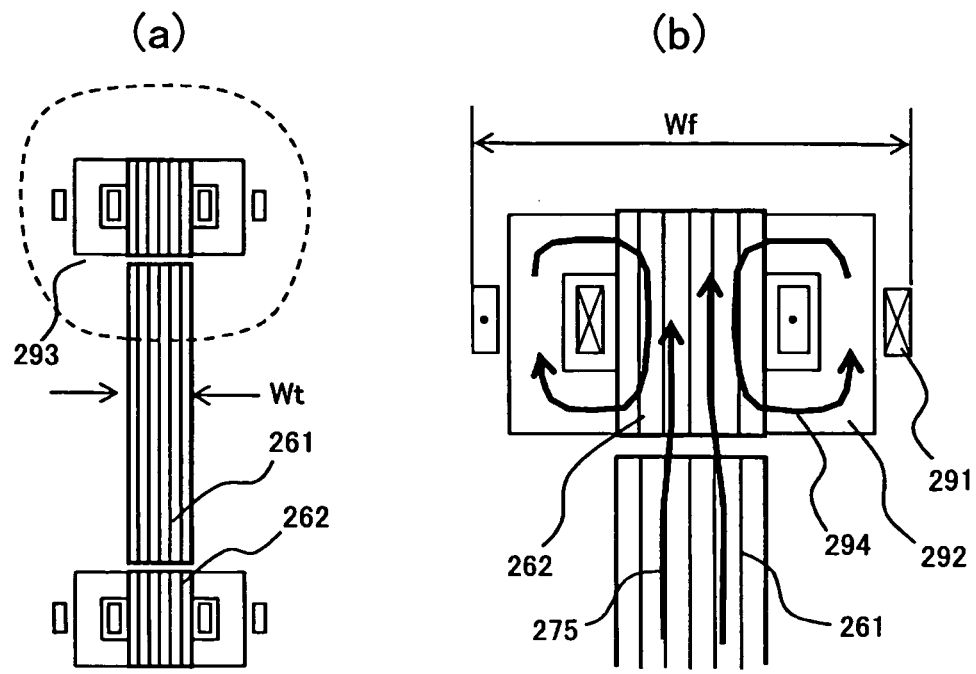
FIG. 75 is a view schematically illustrating the third method of improving a maximum torque of a reluctance motor according to the first embodiment.

(a) of FIG. 75 represents an example of an axial cross section of a modification of the reluctance motor 708 illustrated in FIG. 54.

Dashed circle 293 represents a plurality of magnetic members each is mounted on either side surface of each tooth 262.

In other words, one of the magnetic members 293, each tooth 262, and the other of the magnetic members 293 are axially laminated.

(b) of FIG. 75 illustrates, in enlarged scale, the magnetic members 293 mounted on both side surfaces of each tooth 262.

As illustrated in (b) of FIG. 75, each of the magnetic members 293 consists of a soft magnetic concave member 292, both ends of which are mounted on one side of a corresponding tooth 262.

Each of the magnetic members 293 also consists of an exciting coil 291. The exciting coil 291 is wound around a base of the concave member 292 such that, when energized, the exciting coil 291 generates magnetic fluxes 294, As described above, the control circuit CC or CC1 is designed to supply a unidirectional direct current to a stator winding disposed in each slot. When the current flows through a stator winding adjacent to one tooth 262, magnetic fluxes 275 flow through the rotor 261 and enter the one tooth 262 via an air gap (see (b) of FIG. 73). The direction of the flow of the magnetic fluxes 275 is defined to "positive direction".

In contrast, the flow of the magnetic fluxes 294 in the one tooth 262 is opposite to that of the magnetic fluxes 275. In other words, the direction of the magnetic fluxes 294 is defined to "negative direction". Thus, for the same reasons as the structure illustrated in (a) and (b) of FIG. 73, it is possible to remarkably increase the change (rise) in flux density in comparison to the structure that no magnetic members 293 are mounted on both side surfaces of each tooth 262. This increases a maximum torque of the motor (see FIG. 5).

One of the features of the structure illustrated in FIG. 75 is that adjustment of a level of a current to be supplied to the exciting coil 292 easily changes a magnetic operating point on the curve illustrated in FIG. 74.

For example, for a light-load, the level of the current to be supplied to the exciting coil 292 is set to zero, thus eliminating unnecessary control of the maximum torque. In contrast, for heavy-load, it is possible to supply a current with a preset level to the exciting coil 292; this current with the preset level, creates magnetic fluxes enough to generate a required torque.

Note that, the second method illustrated in FIG. 73 can be designed to use an actuator and control the actuator to remove the permanent magnet 272 between the paired soft magnetic members 273 and insert a space therebetween. This controls the amount of magnetic fluxes 274. The second method illustrated in FIG. 73 can be designed to use an actuator and control the actuator to reverse the direction of the permanent magnet 272.

Each of the first to third methods illustrated in FIGS. 73 and 75 can be variously modified. For example, the soft magnetic members 264, the permanent magnet 272, or the exciting coil 291 can be combined to a stator pole circumferentially adjacent thereto. Note that, in FIG. 73 or 75, the magnetic fluxes 274 or 294 are traveled through only the soft magnetic member with a high relative permeability. For this reason, when the soft magnetic member is used such that no magnetic saturation occurs therein even if the magnetic fluxes 275 enter each tooth from the rotor, it is possible to reduce the size of the permanent magnet 272, or reduce the level of the current for exciting the exciting coil 291.

The fourth method will be described hereinafter with reference to FIG. 76.

Figure 76:
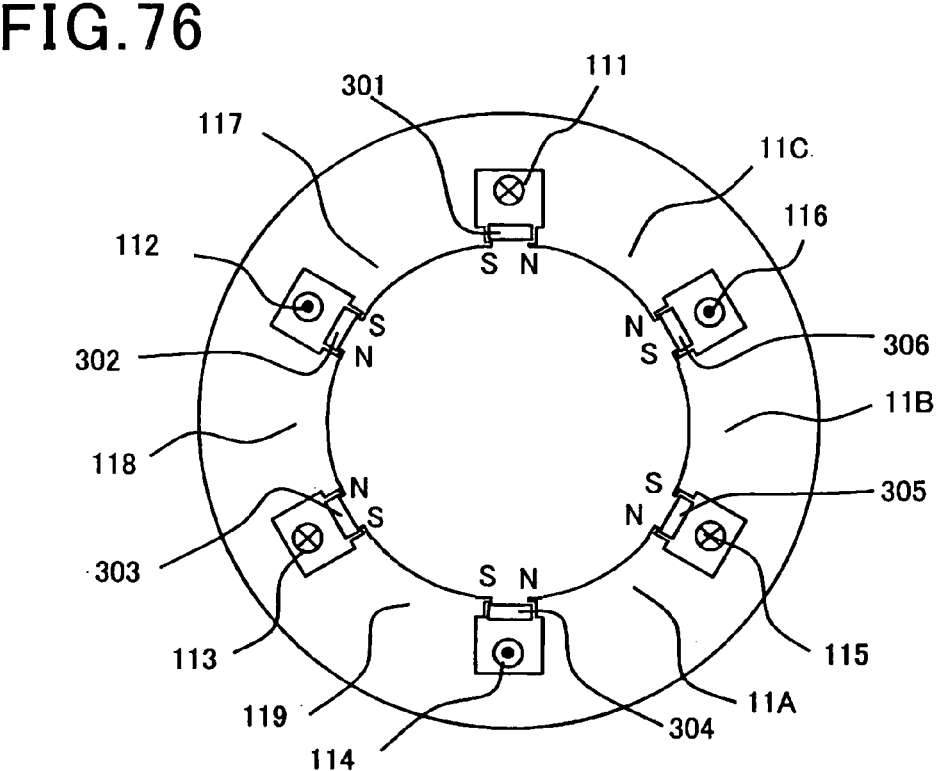
FIG. 76 is a view schematically illustrating the fourth method of improving a maximum torque of a reluctance motor according to the first embodiment.

FIG. 76 represents an example of a radial cross section of a modification of the reluctance motor 708 illustrated in FIG. 54. In FIG. 76, the rotor is omitted in illustration.

The modification of the motor 708 is provided with six plate-like permanent magnets 301, 302, 303, 304, 305, and 306. Each of the six permanent magnets 301, 302, 303, 304, 305, and 306 is disposed in the opening end of a corresponding one of the slots. Each of the six permanent magnets 301, 302, 303, 304, 305, and 306 is arranged such that the direction (N, S) of its circumferential magnetomotive force close to the corresponding opening end is opposite to magnetomotive force created when a corresponding stator winding is excited.

Specifically, each of the six permanent magnets 301, 302, 303, 304, 305, and 306 cancels out flux leakages close to the corresponding opening end, thus reducing them. As a result, as well as the second method illustrated in FIG. 73, it is possible to reduce the flux density of each tooth, thus increasing a maximum torque of the motor. The fourth method can be used by a reluctance motor even if its axial length Wt has a longer value. Thus, the fourth method can be used for high-output reluctance motors according to the first embodiment.

In contrast, the first to third methods can be used for reluctance motors each having a short axial length according to the first embodiment.

The half (three) of the six permanent magnets 301, 302, 303, 304, 305, and 306 can be reduced. Each of the permanent magnets can be arranged over the axial total length of the opening end of a corresponding slot. Each of the permanent magnets can also be arranged at a part of the axial length of the opening end of a corresponding slot. Each of the permanent magnets can further be arranged at either end of the axial direction of the opening end of a corresponding one slot.

Each of the permanent magnets 301, 302, 303, 304, 305, and 306 serves to fix the stator winding disposed in a corresponding one slot. The shape of each of the permanent magnets 301, 302, 303, 304, 305, and 306 can be changed. A member with a high heat resistance, such as a liquid cooling pipe, can be arranged in a slot between a corresponding permanent magnet and a corresponding stator winding. This reduces the increase in temperature of the permanent magnet.

The fifth method will be described hereinafter with reference to FIG. 77.

Figure 77:
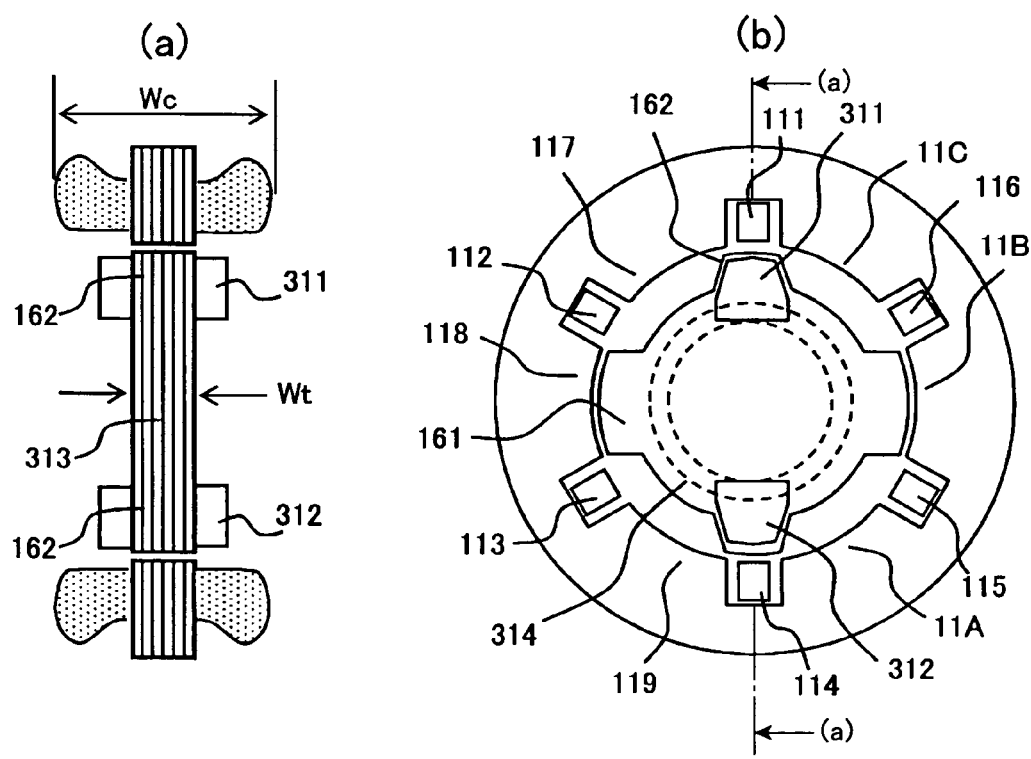
FIG. 77 is a view schematically illustrating the fifth method of improving a maximum torque of a reluctance motor according to the first embodiment.

(b) of FIG. 77 is a radial cross section of a modification of the reluctance motor 708 illustrated in FIG. 54. (a) of FIG. 77 represents an example of an axial cross section of a modification of the reluctance motor 708; this axial cross section is taken on line (a)-(a) in (b) of FIG. 77.

Reference character 313 represents a rotor core.

A first pair of soft magnetic members 311 and 312 are mounted on one major surfaces of the auxiliary salient poles 162, respectively. A second pair of soft magnetic members 311 and 312 are mounted on the other major surfaces of the auxiliary salient poles 162, respectively.

Each of the soft magnetic members 311 and 312 has a substantially trapezoidal shape such that its first base is located to face a corresponding stator winding, and its second base is located to face the center of the rotor; the second base is longer than the first base. Each of so the trapezoidal soft magnetic members 311 and 312 thickens a magnetic path through a corresponding one of the auxiliary salient poles 162 to thereby reduce magnetic saturation at each of the auxiliary salient poles 162. This increases a maximum torque of the motor.

For a multi-pole motor, such as an eight-pole motor, to be used at a high RPM, an annular soft magnetic member 314 indicated by dashed lines can be coaxially mounted on either major surface of the rotor in place of the soft magnetic members 311 and 312.

Measures for reducing eddy currents applied to the structure illustrated in (b) of FIG. 72 can be applied to soft magnetic members close to the auxiliary salient poles 162.

As described above, the first to fifth methods increase a maximum torque of a reluctance motor, thus reducing in size and cost the reluctance motor.

Next, techniques associated with an air gap between a stator pole and a rotor pole of each of reluctance motors according to the first embodiment and its modifications will be described hereinafter.

(a) of FIG. 78 illustrates, in enlarged scale, a stator pole D51, a rotor pole D52, and an air gap D53 of a reluctance motor according to one of the first embodiment and its modifications; the air gap D53 is located between the stator pole D51 and the rotor pole D52. A horizontal direction in the paper of FIG. 78 represents an axial direction of a rotor, and a vertical direction in the paper of FIG. 78 represents a radial direction of the reluctance motor. A direction into the paper of FIG. 78 represents a circumferential direction of the reluctance motor. For example, each of the stator pole D51 and the rotor pole D52 is made up of eight magnetic steel sheets stacked in alignment. For example, each of the eight magnetic steel sheets has a thickness of 0.35 mm, and the air gap D53 has 0.5 mm in the radial direction of the reluctance motor.

(b) of FIG. 78 illustrates a specific configuration of a stator pole D54, a rotor pole D55, and an air gap D56 of a reluctance motor according to one of the first embodiment and its modifications; the air gap D56 is so located between the stator pole D54 and the rotor pole B55.

The thickness of one end of the stator pole D54 opposing the air gap D56 is increased in the axial direction of the rotor such that the thickness of the one end of the stator pole D54 in the axial direction of the rotor is approximately two times that of the one end of the stator pole D51. Similarly, the thickness of one end of the rotor pole D55 opposing the air gap D56 is increased in the axial direction of the rotor such that the thickness of the one end of the stator pole D54 in the axial direction of the rotor is approximately two times that of the one end of the rotor pole D52.

Reference characters D57 and D58 are soft magnetic members mounted on both major sides of the stator pole D54 in the radial direction to prevent magnetic saturation in the stator pole D54. Similarly, reference characters D59 and D5A are soft magnetic members mounted on both major sides of the rotor pole D55 in the radial direction to prevent magnetic saturation in the rotor pole D55.

The configuration of the stator pole D54 and the rotor pole D55 illustrated in (b) of FIG. 78 reduces a magnetic resistance in the air gap D56 between the stator pole D54 and the rotor pole D55. Further modifications can be applied to each stator pole and each rotor pole of reluctance motors according to the first embodiment and its modifications; this more reduces a magnetic resistance in an air gap D56 between each stator pole and a corresponding one rotor pole to approximately the half of that of an original air gap D53. This equivalents that the length of the air gap D53 in the radial direction is reduced to the half thereof, making it possible to increase an output torque, improve the power factor, and improve the motor efficiency.

Next, one method of achieving higher output torques in reluctance motors according to the first embodiment and its modifications will be described hereinafter.

Figure 79:
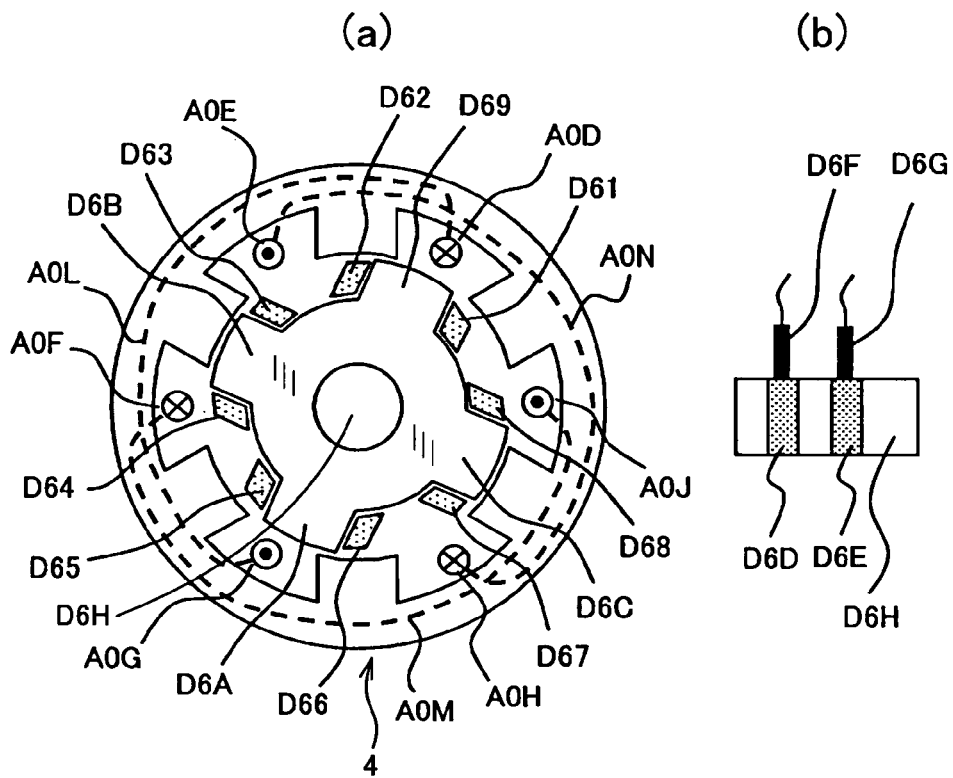
FIG. 79 is a lateral cross sectional view schematically illustrating a reluctance motor to which one method of achieving higher output torques is applied according to the first embodiment.

(a) of FIG. 79 schematically illustrates a reluctance motor to which the one method is applied. A stator of the reluctance motor is identical to that of the reluctance motor 110 illustrated in FIG. 1B.

A rotor of the reluctance motor is identical to that of the reluctance motor 110. Reference characters D69 and D6A represent a first pair of opposing salient poles, and D6B and D6C represent a second pair of opposing salient poles.

In addition, the reluctance motor is specially provided with a coil D61 and D62, a coil D63 and D64, a coil D65 and D66, and a coil D67 and D68. The coil D61 and D62 is wound around the salient pole D69 for creating magnetomotive force of the salient pole D69. The coil D63 and D64 is wound around the salient pole D6B for creating magnetomotive force of the salient pole D6B. The coil D65 and D66 is wound around the salient pole D6A for creating magnetomotive force of the salient pole D6A. The coil D67 and D68 is wound around the salient pole D6C for creating magnetomotive force of the salient pole D6C.

As illustrated in (b) of FIG. 79, a current Ir for each of the coils is supplied from brushes D6F and D6G connected to a DC power source via slip rings D67 and D68 contacted to the respective brushes D6F and D6G and mounted on the output shaft D6H. The direction of each of the salient poles D69, D6A, D6B, and D6C is reversed at six times every 360-degree rotation of the rotor. For this reason, it is necessary to switch the direction of the current Ir to be supplied to each coil each time the direction of a corresponding one of the salient poles D69, D6A, D6B, and D6C is reversed.

This configuration of the reluctance motor illustrated in FIG. 79 allows each of the stator and rotor to crease magnetomotive force, thus generating a large peak torque. When such a reluctance motor illustrated in FIG. 79 is applied to an electrical vehicle, when a large motor torque is needed when the electrical vehicle drives up a sudden slope. Even if such a large motor torque is required, the reluctance motor illustrated in FIG. 79 rapidly creates a large peak torque to be required. Note that, during normal driving, the brushes D6F and D60 can be separated from the slip rings D6D and D6E, thus ensuring the lifetime of each of the brushes D6F and D6G.

Next, a method of turning, within wide speed ranges, a rotor of a reluctance motor according to any one of the first embodiment and its modifications, and a method of enlarging a constant-output range thereof will be described hereinafter.

Figure 80:
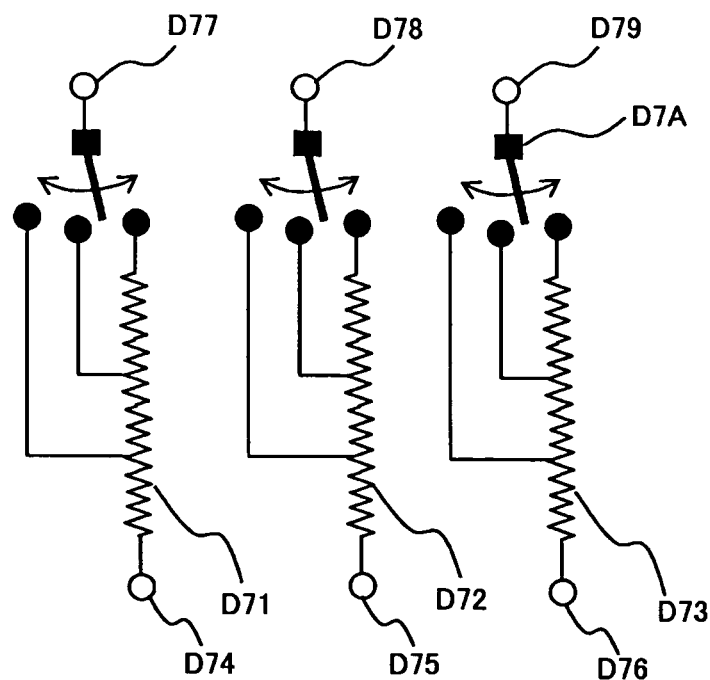
FIG. 80 is a view schematically illustrating an example of means for switching three-phase stator coils of the reluctance motor according to any one of the first embodiment and its modifications.

FIG. 80 illustrates an example of means for switching three-phase stator coils D71, D72, and D73 of the reluctance motor according to any one of the first embodiment and its modifications. For example, the three-phase stator coils D71, D72, and D73 correspond to the stator coils 561, 562, and 563, respectively (see FIG. 2). Reference characters D74, D75, and D76 represent first terminals of the three-phase stator coils D71, D72, and D73. Each of the three-phase stator coils D71, D72, and D73 is formed with three taps. For example, one of the three taps of each coil, referred to as "first tap", is located at the other end terminal of the winding of wire, and an alternative one of the three taps of each coil, referred to "second tap", is located at the center of the winding of wire. The last tap, referred to as "third tap", of the three taps of each coil is located at the first-terminal side of the winding of wire.

A coil select means D7A is configured to select any one of the three taps in each of the three-phase stator coils S71, D72, and D73. Reference characters D77, D78, and D79 represent second terminals of the three-phase coils D71, D72, and D73.

That is, when the coil select means D7A selects the first tap of the coil D71, the number of full turns of the coil D71 is selected. Because a voltage across the coil D71 is in proportional to the number of turns of the coil D71, this selects an overall voltage of the coil D71, thus outputting a high torque corresponding to the overall voltage of the coil D71.

In addition, when the coil select means D7A selects the second tap of the coil D71, the number of half turns of the coil D71 is selected.

Because a voltage across the coil D71 is in proportional to the number of turns of the coil D71, this selects a half voltage of the coil D71, thus outputting a middle torque corresponding to the half voltage of the coil D71.

Moreover, when the coil select means D7A selects the third tap of the coil D71, the number of low turns of the coil D71 is selected. Because a voltage across the coil D71 is in proportional to the number of turns of the coil D71, this selects a low voltage of the coil D71, thus outputting a low torque corresponding to the half voltage of the coil D71.

That is, at a low RPM of the reluctance motor, the number of full turns of the coil D71 is selected to thereby output a high torque corresponding to the overall voltage of the coil D71. In contrast, at a high RPM of the reluctance motor, the number of low turns of the coil D71 is selected to thereby output a low torque corresponding to the low voltage of the coil D71.

Thus, when a constant-output control is required for the reluctance motor, the selection of the three taps of each of the three-phase stator coils expands a constant-output range of the reluctance motor. Note that, as the coil select means 7A, an electromagnetic contactor for each stator coil can be used. If a current is reliably interrupted when the three-phase stator windings are switched, it is possible to relatively reduce in size the contact of each of the electromagnetic contactors.

In order to change a voltage across a stator coil of a reluctance motor according to any one of the first embodiment and its modifications, there is means for variably changing the air gap between a stator and a rotor of the reluctance motor.

Specifically, an axial length Lr of the rotor is twice an axial length Ls of the stator, and one edge of the inner surface of the stator is longer by 10 mm than the other edge of the inner surface of the stator, so that the stator is tapered. In addition, the diameter of one edge of the outer surface of each salient pole of the rotor is shorter than the inner diameter of the stator by the product of 2 and the radial length of an air gap.

The stator and rotor are configured such that the axial position of the stator relative to the rotor is changed within the length. Ls while facing the rotor.

With the configuration, the movement of the axial position of the stator relative to the rotor by the length Ls allows the radial length of the air gap to change by 10 mm in diameter, in other words, 5 mm in radius. The change of the radial length of the air gap changes magnetic fluxes between the stator and the rotor; this changes a voltage induced across each stator winding. This widens the variable speed ranges of the motor.

A stator according to any one of the first embodiment and its modifications can be made of a plurality of materials, and the diameter of each stator winding according to any one of the first embodiment can be designed.

Figure 81:
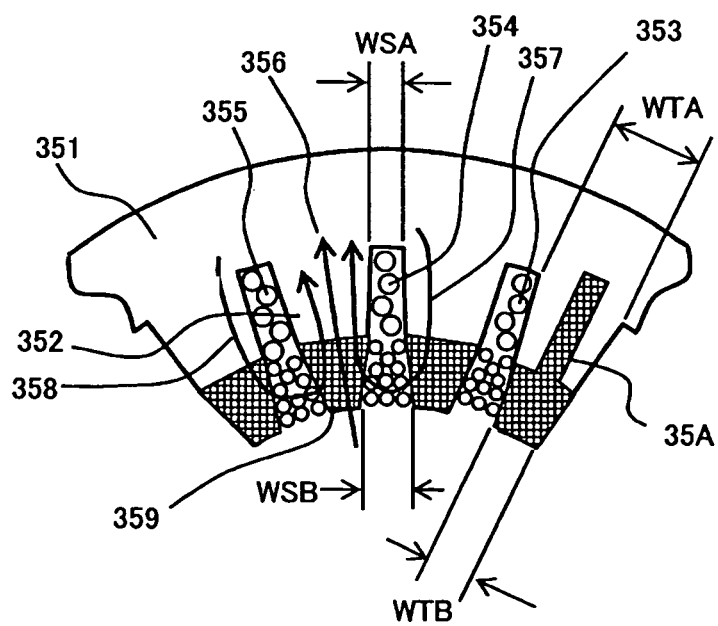
FIG. 81 is an enlarged lateral cross sectional view schematically illustrating a part of a stator according to any one of the first embodiment and its modifications.

FIG. 81 illustrates a part of a stator according to any one of the first embodiment and its modifications. Reference character 351 represents a back yoke of the stator. Reference character 352 represents a tooth (stator pole)). Reference characters 353, 354, and 355 represent three stator windings disposed in slots illustrated in FIG. 81, respectively.

At that time, it is assumed that a large current is supplied to flow through the stator winding 354 into the paper of FIG. 81, and simultaneously, the same large current is supplied to flow through the stator winding 355 out of the paper of FIG. 81. Both of the currents excite magnetic fluxes 356 through the tooth 352. In addition, from teeth at both circumferential sides of the tooth 352, flux leakages 357 and 358 are traveled through portions close to slots in which the windings 354 and 355 are disposed so as to enter the tooth 352. As described above, many magnetic fluxes collectively pass through the tooth 352 acting to pull a salient rotor pole so that the tooth 352 is prone to be magnetically saturated.

In order to reduce the flux leakages 357 and 358, it is better to increase the circumferential width WSB of the opening end of the slot in which the stator winding 354 is disposed. Thus, the shape of each slot is designed such that the opening end of each slot is tapered toward the center of the rotor. In the configuration, because the circumferential width of each tooth between circumferentially adjacent slots is narrow, each tooth may be prone to be magnetically saturated.

Thus, in order to restrict the magnetic saturation, the inner end portion of each tooth can be preferably made of a high flux-density material, such as a permendur. The permendur is an alloy created by mixing an approximately 50% cobalt with approximately 50% iron. A maximum flux density of the permendur is approximately 2.5 [T]. Each tooth having at its inner end portion with permendur can be restricted from being magnetically saturated. A permendur portion of each tooth can have a shape illustrated by reference character 35A illustrated in FIG. 81; this further reduce the magnetic saturation over each tooth.

In addition, as illustrated in FIG. 81, some of the conductors in each stator coil, such as coil 354, disposed in a corresponding slot, which are located closer to the opening end of the slot than the remaining conductors in a corresponding stator coil, have a thickness thinner than that of each of the remaining conductors. This increases a flux density around each slot to thereby reduce the flux leakages 357 and 358.

As illustrated in FIG. 61, as a low RPM of the rotor, the motor has the structure illustrated in FIG. 54 to create a constant torque over the outer circumference of the rotor. In contrast, during the RPM of the rotor higher than a preset RPM, the auxiliary salient poles 162 are moved toward the center of the rotor so that the motor has the structure illustrated in FIG. 9. The main salient poles 161 can be radially moved with move of the auxiliary salient poles 162.

The various methods for reducing magnetic saturation set forth above can be combined with each other.

Next, iron loss of reluctance motors according to the first embodiment and its modifications will be described hereinafter. As described above, in the reluctance motors according to the first embodiment and its modifications, because a unidirectional current is supplied to each stator coil, a magnetic flux passing through the stator is a unidirectional magnetic flux. Thus, the hysteresis loss in the stator is maintained at low level, thus normal magnetic steel sheets can be used to produce the stator.

Regarding the rotor, the direction of the magnetic flux through the rotor is changed at six times every 360-degree rotation of the rotor. Thus, in order to reduce iron loss of the rotor, the rotor can be made of amorphous metals. As soft magnetic materials with low iron loss, there are electromagnetic steel sheets with high silicon content, directional silicon steel sheets, and powder magnetic cores formed by compressing insulator-coated soft-magnetic powder. Any one of these materials can be used to produce the rotor.

As described above and illustrated in FIGS. 120, 121, and 122, the conventional permanent magnet motors may have the following problems:

First, the arrangement of the individual three-phase windings is complicated. This may make it difficult to produce the stator coil.

Second, the opening end of each slot of the stator has a narrow circumferential length. This may make it difficult to form turns of wires as the three-phase windings in corresponding slots, thus reducing the lamination factor of the stator coil.

Third, the difficulty in forming turns of wires as the three-phase windings may also increase both ends of the stator coil projecting from the stator core in the axial direction of the rotor; this may increase the permanent magnet brushless motor in size.

Figure 82:
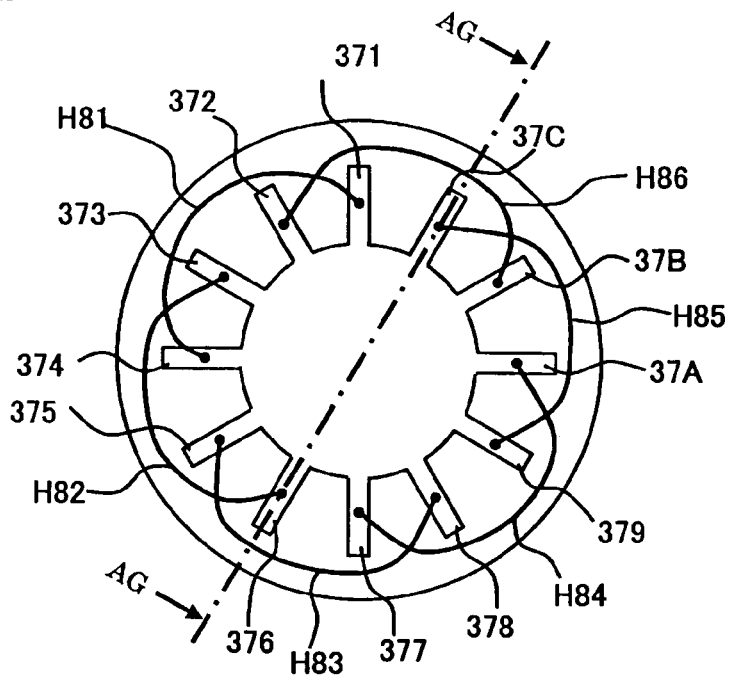
FIG. 82 is a lateral cross sectional view schematically illustrating a four-pole stator model designed by expanding the two-pole stator illustrated in FIG. 54 while being viewed from an axial end side of the rotor.

FIG. 82 schematically illustrates a four-pole stator model designed by expanding the two-pole stator illustrated in FIG. 54 while being viewed from an axial end side of the rotor.

Reference characters 371, 372, 373, 374, 375, 376, 37A, 37B, and 37C represent eight slots.

Figure 120:
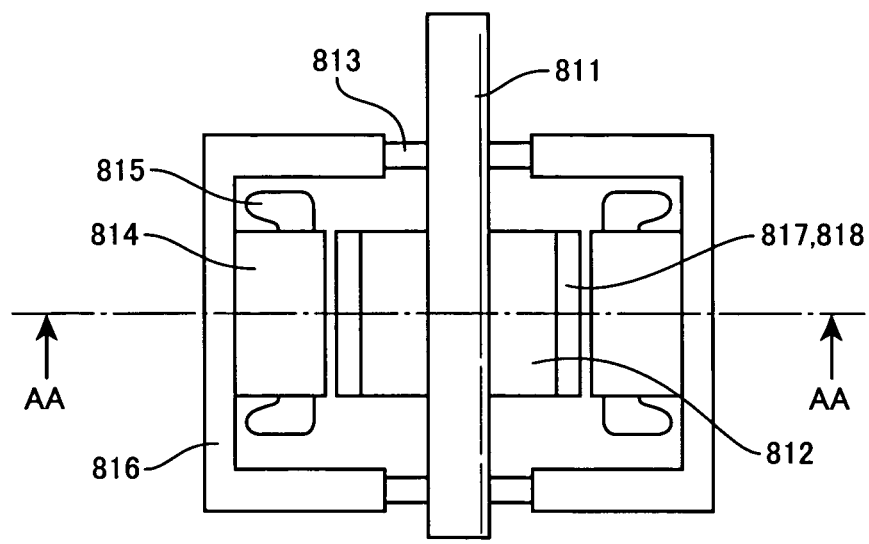
Figure 122:
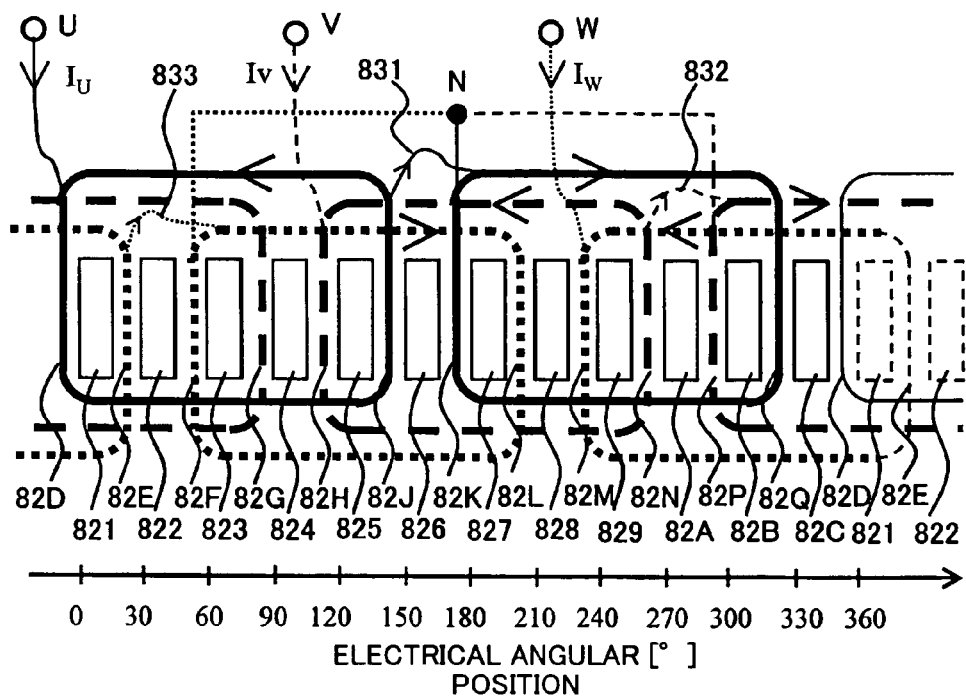

Three-phase stator coils are wound in the respective slots 371, 372, 373, 374, 375, 376, 37A, 373, and 37C in the conventional manner illustrated in FIGS. 120 to 122.

Specifically, an A-phase coil H81 is wound from the slot 371 to the slot 374, and an A-phase coil H84 is wound from the slot 377 to the slot 37A. A B-phase coil H82 is wound from the slot 373 to the slot 376, and a B-phase coil H86 is wound from the slot 379 to the slot 37C. A C-phase coil H83 is wound from the slot 375 to the slot 378, and a C-phase coil H86 is wound from the slot 37B to the slot 372.

Figure 83:
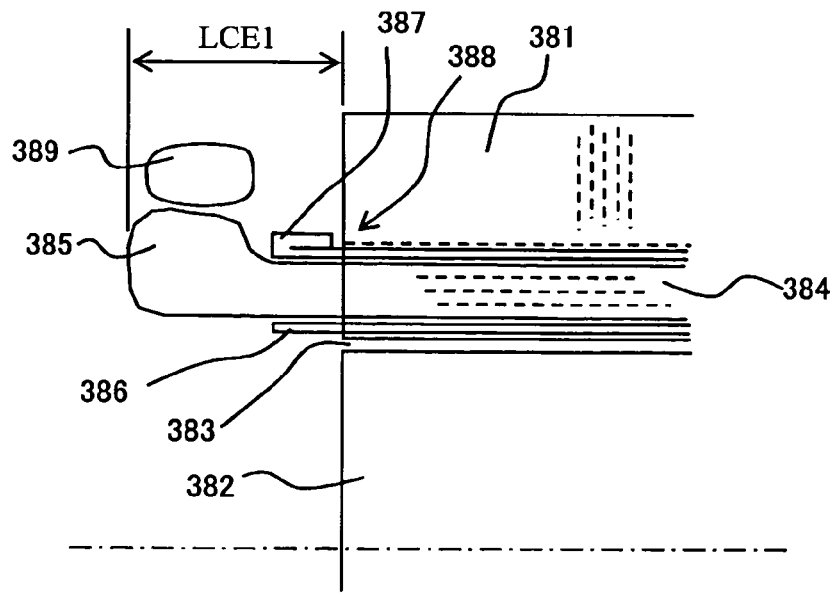
FIG. 83 is an axial cross sectional view of the stator taken on line AG to AG in FIG. 82.

FIG. 83 is an axial cross sectional view of the stator taken on line AG to AG passing through each of the slots 37C and 376 and the center of the rotor in FIG. 82.

Reference character 381 represents a stator core made up of a plurality of magnetic steel sheets stacked in alignment in the axial direction of the motor. Reference character 384 represents a B-phase winding in the B-phase coil disposed in the slot 37C, and reference characters 385 and 389 represent ends of the B- and C-phase coils projecting from one axial end surface of the stator core 381. Reference character LCE1 represents the length of the ends of the B-phase coil projecting from the one axial end surface of the stator core 381 in the axial direction of the rotor 382.

Reference characters 386 and 387 represent insulating papers. The insulating papers 386 and 387 are inserted in the slot 37C and configured to maintain insulation between the stator core 381 and the B-phase coil. The insulating paper 387 projects from the one axial end surface of the stator core 381 by 10 mm or thereabout. Reference character 382 represents the rotor, and reference character 383 represents an air gap between the stator core 381 and the rotor 382. Chain line represents the center of rotation of the rotor 382.

In two-pole motors and six-pole motors, three-phase coils can be wound in the same manner as the winding configuration illustrated in FIG. 82.

However, ends of different phase coils are radially overlapped with each other; this may make the stator-coil winding complicated. This may contribute to deterioration of productivity of the stator and the motor. The difficulty of stator-coil winding may reduce the coil space factor of each stator coil. The ends of three-phase stator coils in the axial direction of the rotor may be large in length.

Next, a method of winding a conductor (wire) to form each stator coil and arranging each stator coil in order to reduce these first to third problems set forth above will be described hereinafter with reference to FIG. 84.

FIG. 84 schematically illustrates a four-pole, twelve-slot stator model according to the first embodiment and its modifications while being viewed from an axial end side of the rotor. To like reference characters in FIGS. 82 and 84, like reference characters are assigned.

Three-phase stator coils are wound in the respective slots 371, 372, 373, 374, 375, 376, 37A, 37B, and 37C in the following manner.

Specifically, a positive A-phase winding and a negative A-phase winding of an A-phase stator coil are concentrically wound in the slot 371 and the slot 374 via a connection wire 37D, respectively. Similarly, a positive A-phase winding and a negative A-phase winding of an A-phase stator coil are concentrically wound in the slot 377 and the slot 37A via a connection wire 37G, respectively.

A positive B-phase winding and a negative B-phase winding of a B-phase stator coil are concentrically wound in the slot 373 and the slot 376 via a connection wire 37E, respectively. Similarly, a positive B-phase winding and a negative B-phase winding of an B-phase stator coil are concentrically wound in the slot 379 and the slot 37C via a connection wire 37H, respectively.

A positive C-phase winding and a negative C-phase winding of a C-phase stator coil are concentrically wound in the slot 375 and the slot 378 via a connection wire 37F, respectively. Similarly, a positive C-phase winding and a negative C-phase winding of a C-phase stator coil are concentrically wound in the slot 37B and the slot 372 via a connection wire 37J, respectively.

More specifically, the A-phase stator coil 37D wound in the slots 371 and 374 is arranged outwardly over the stator yoke of the stator core. Similarly, the B-phase stator coil 37H wound in the slots 379 and 37C is arranged outwardly over the stator yoke of the stator core. The C-phase stator coil 37F wound in the slots 375 and 377 is arranged outwardly over the stator yoke of the stator core.

In contrast, the A-phase stator coil 37G wound in the slots 377 and 37A is arranged inwardly. Similarly, the B-phase stator coil 3E wound in the slots 373 and 376 is arranged inwardly. The C-phase stator coil wound in the slots 37B and 372 is arranged inwardly.

The order of winding of the stator coils is determined such that the outwardly arranged A-, B-, and C-phase stator coils 37D, 37H, and 37F are wound first, and thereafter, the inwardly arranged A-, B-, and C-phase stator coils 370, 37E, and 37J. This is because, for example, the B-phase stator coil 37E covers one axial ends of the slots 374 and 375. Thus, the A- and C-phase stator coils 37D and 37F have been wound, and thereafter, the B-phase coil 37E is wound. Thus, after the A- and C-phase stator coils 37D and 37F have been wound, the B-phase stator winding 37E can be wound before the B-phase stator winding 371H.

The number of poles of motors, which allows one set of three-phase concentrated stator coils to be outwardly arranged in the stator core and an alternative set of three-phase concentrated stator coils to be inwardly arranged in the stator core, is an integer multiple of 4. The winding arrangement reduces physical interferences among the three-phase stator coils, thus providing effectively wound three-phase winding in the stator coil with, a high coil space factor.

Figure 85:
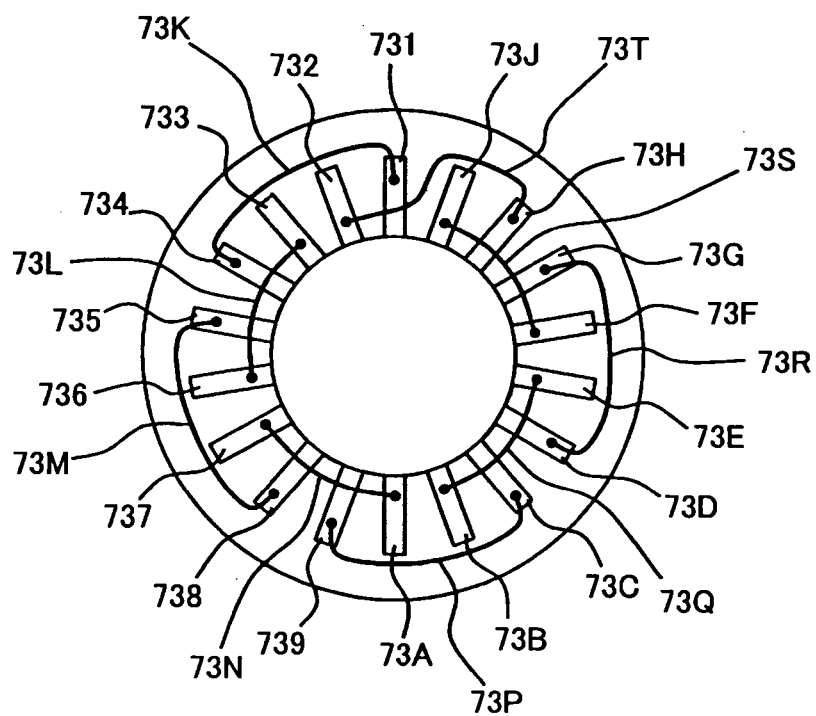
FIG. 85 is a lateral cross sectional view schematically illustrating a six-pole, eighteen-slot stator model according to the first embodiment and its modifications while being viewed from an axial end side of the rotor.

FIG. 85 schematically illustrates a six-pole, eighteen-slot stator model according to the first embodiment and its modifications while being viewed from an axial, end side of the rotor.

Reference characters 731, 732, 733, 734, 735, 736, 737, 738, 739, 73A, 73B, 73C, 73D, 73E, 73F, 73G, 73H, and 73J represent eighteen slots.

Three-phase stator coils are wound in the respective slots 731, 732, 733, 734, 735, 736, 737, 738, 739, 73A, 73B, 73C, 73D, 73E, 73F, 73G, 73H, and 73J in the following manner.

Specifically, an A-phase winding is wound in the slot 731 and the slot 734 via a connection wire 73K, an A-phase winding is wound in the slot 737 and the slot 73A via a connection wire 73N, and an A-phase winding is wound in the slot 73D and the slot 73Q via a connection wire 73R. These A-phase windings 73K, 73N, and 73R are for example connected to each other in series, which constitutes an A-phase stator coil.

A B-phase winding is wound in the slot 733 and the slot 736 via a connection wire 73L, a B-phase winding is wound in the slot 739 and the slot 73C via a connection wire 73P, and a B-phase winding is wound in the slot 73F and the slot 73J via a connection wire 73S. These B-phase windings 73L, 73P, and 73S are for example connected to each other in series, which constitutes a B-phase stator coil.

A C-phase winding is wound in the slot 735 and the slot 738 via a connection wire 73M, a C-phase winding is wound in the slot 73B and the slot 73E via a connection wire 73Q, and a C-phase winding is wound in the slot 73H and the slot 732 via a connection wire 73T. These C-phase windings 73M, 73E, and 73T are for example connected to each other in series, which constitutes a C-phase stator coil.

In the stator-winding configuration, as well as the winding configuration illustrated in FIG. 84, one set of stator windings 73K, 73M, 73P, and 73R are outwardly arranged in the stator core, and alternative set of stator windings 73L, 73N, 73Q, and 73S are inwardly arranged in the stator core except for the C-phase stator winding 73T. Thus, by allowing an irregular arrangement of a part of the three-phase stator windings (coils), it is possible to reduce physical interferences among the three-phase stator coils, thus providing effectively wound three-phase winding in the stator coil with a high coil space factor.

Accordingly, in six-pole, ten-pole, fourteen-pole, and eighteen-pole motors, by allowing an irregular arrangement of a part of three-phase stator windings, it is possible to reduce physical interferences among the three-phase stator windings, thus providing effectively wound three-phase winding in the stator coil with a high coil space factor.

Figure 86:
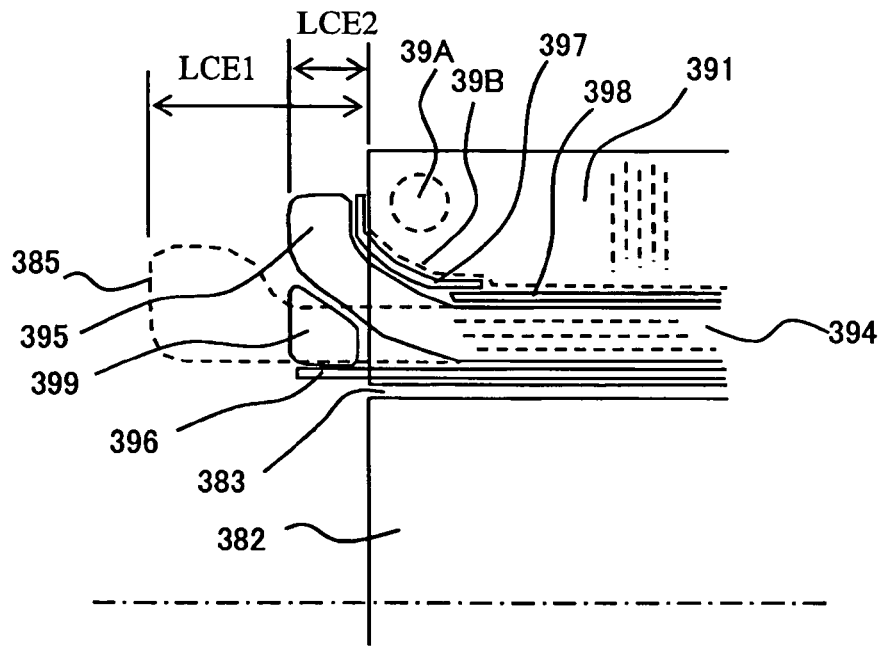
FIG. 86 is an axial cross sectional view of the stator illustrated in FIG. 84 taken on line AF to AF in FIG. 84.

FIG. 86 is an axial cross sectional view of the stator illustrated in FIG. 84 taken on line AF to AF passing through each of the slots 37B and 375 and the center of the rotor in FIG. 84.

Reference character 391 represents a stator core made up of a plurality of magnetic steel sheets stacked in alignment in the axial direction of the motor. Reference character 394 represents the C-phase winding of the C-phase coil disposed in the slot 37B, and reference character 395 represents ends of the C-phase coil projecting from one axial end surface of the stator core 391.

Specifically, the slot 37B is gradually bent outwardly toward the one axial surface of the stator core 391. This allows the C-phase winding 394 in the C-phase coil to be gradually bent outwardly toward the one axial surface of the stator core 391 along the slot 37B; these outwardly bent portions of the C-phase winding 394 constitute the ends of the C-phase coil.

Reference character 399 represents the B-phase coil arranged in the circumferential direction.

Reference characters 396, 397, and 398 represent insulating papers. The insulating papers 396 and 397 are inserted in the slot 37B and configured to maintain insulation between the stator core 391 and the C-phase coil. The insulating paper 396 projects from the one axial end surface of the stator core 391 to insulate the B-phase coil 399. The insulating paper 398 is arranged between the outwardly bent coil ends 395 and the stator core 391 to thereby maintain insulation between the stator core 391 and the coil ends 395.

Reference character 382 represents the rotor, and reference character 383 represents an air gap between the stator core 391 and the rotor 382. Chain line represents the center of rotation of the rotor 382.

Dashed line represents the coil ends 385 illustrated in FIG. 82 for comparison.

Reference character LCE1 represents the length of the coil ends 385 projecting from the one axial, end surface of the stator core 381 in the axial direction of the rotor 382.

In contrast, reference character LCE2 represents the length of the coil ends 395 projecting from the one axial end surface of the stator core 391 in the axial direction of the rotor 382.

As clearly understood by comparison between the axial coil-end length LCE1 illustrated in FIG. 82 and the axial coil-end length LCE2 illustrated in FIG. 86, the axial coil-end length LCE2 illustrated in FIG. 86 is greatly reduced from the axial coil-end length LCE1.

Figure 87:
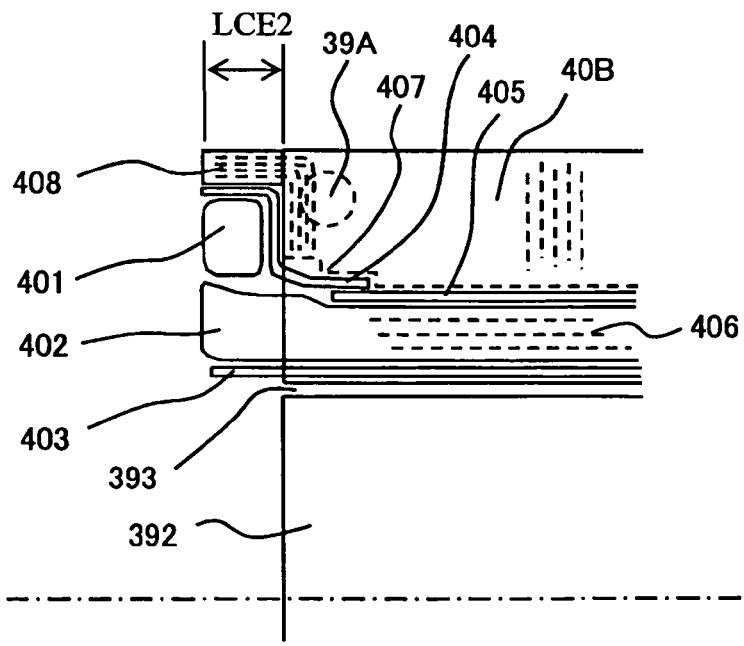
FIG. 87 is an axial cross sectional view of the stator illustrated in FIG. 84 taken on line AE to AE in FIG. 84.

FIG. 87 is an axial cross sectional view of the stator illustrated in FIG. 84 taken on line AE to AE passing through each of the slots 37C and 376 and the center of the rotor in FIG. 84.

Reference character 40B represents a stator core made up of a plurality of magnetic steel sheets stacked in alignment in the axial direction of the motor. Reference character 406 represents conductors in the B-phase coil disposed in the slot 370, and reference character 402 represents ends of the B-phase coil projecting from one axial end surface of the stator core 40B.

Reference character 407 represents the clot 37C.

The slot 407 is formed at its opening-end side with an outwardly three-stepped portion.

Figure 88:
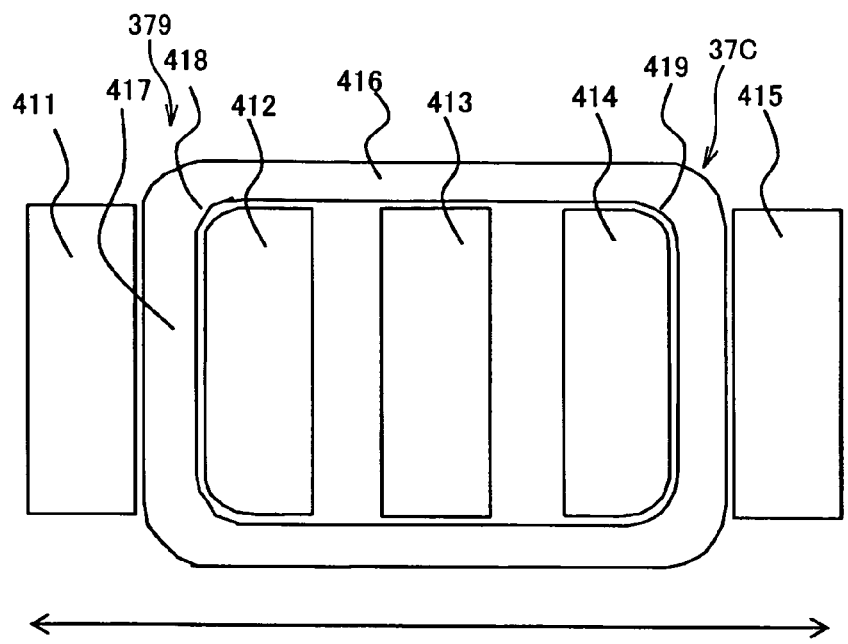
FIG. 88 is a view schematically expanding coil ends and conductors of a B-phase coil in a circumferential direction; the shape of the coil ends and the conductors of the B-phase coil when being viewed from the rotor side has a substantially ring shape according to the first embodiment.

FIG. 88 is a view schematically expanding the coil ends 402 and the conductors 406 of the B-phase coil in the circumferential direction; the shape of the coil ends 402 and the conductors 406 of the B-phase coil when being viewed from the rotor side has a substantially ring shape.

The horizontal axis of FIG. 88 represents the circumferential direction, and the vertical axis represents the axial direction of the rotor. In FIG. 88, reference characters 411, 412, 413, 414, and 415 represent the inner surfaces of the teeth between the slots 37C and the 379. Reference character 417 represents the ends 402 of the B-phase coil wound in the slots 37C and 379. Reference character 416 represents the B-phase winding of the B-phase coil disposed in each of the slots 37C and 379.

Referring to FIG. 88, the B-phase winding 416 disposed in the slot 379 is circularly bent at one corner 418 of the tooth 412 to extend in the circumferential direction toward the slot 37C. When the B-phase winding 416 reaches a rounded corner 419 of the tooth 414, the B-phase winding 416 is circularly bent at a rounded corner of the tooth 414 to be connected to the B-phase winding 416 disposed in the slot 37C.

Because the B-shaped winding 416 is smoothly bent in the form of a circle, it is possible to restrict the length of the coil ends 402 within a short length LCE2. As described above, the specific arrangement of the three-phase stator windings makes it possible to reduce the length of each of the coil ends in the axial direction of the rotor.

Note that reference character 401 represents the G-phase winding 37F arranged in the circumferential direction.

Figure 89:
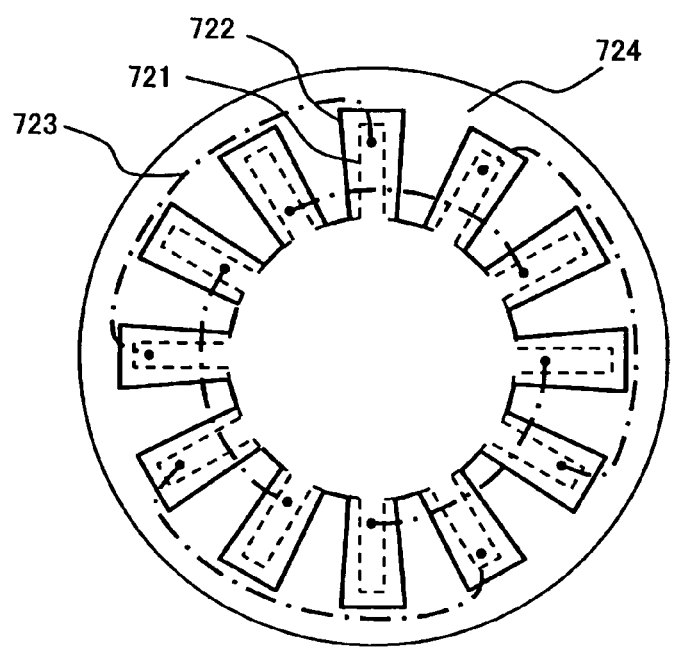
FIG. 89 is a lateral cross sectional view schematically illustrating a stator core as a modification of the stator core illustrated in FIG. 84.

FIG. 89 schematically illustrates a stator core 724 as a modification of the stator core illustrated in FIG. 84.

Reference character 723 represents the coil ends 37D illustrated in FIG. 84. Dashed line indicated by reference character 721 represents the bottom of each slot. Solid lines indicated by reference character 722 represents the shape of the opening end of each slot when each slot is viewed from an axial end of the rotor. Each slot has a curved side surface from the bottom 721 to the opening end 722 thereof. With the configuration, each stator winding can be easily wound in a corresponding pair of slots along the curved surface.

The outwardly stepped portion of the opening end of each slot illustrated in FIG. 87 can be easily produced by laminating three kinds of electromagnetic steel sheets. Thus, in comparison to forming the gradually outwardly bent shape of the opening end of each slot, it is possible to easily produce, in low cost, the stator core including a plurality of slots each having at its opening end the outwardly stepped portion.

In FIG. 87, because a circumferential magnetic path in the back yoke close to a dashed circle 39A is reduced, a ring soft magnetic member 408 is mounted on the back yoke to surround the coil ends and the three-phase stator windings over the one axial end surface of the stator core 40B. This ensures the magnetic path in the circumferential direction of the back yoke without increasing the axial length of the motor.

As illustrated by dashed lines, as the ring soft magnetic member 408, projecting portions of the laminated electromagnetic steel sheets in the axial direction of the rotor, which constitutes the back yoke, can be bent to surround the coil ends of the three-phase coils. This easily produces the ring-shaped soft magnetic member with low cost, and makes magnetic fluxes flow through the bent portions of the stator core.

Next, the improvement of the insulating papers 386 and 387 will be described hereinafter.

In FIG. 83, each slot has the same shape in its cross section orthogonal to the axial direction of the rotor. Thus, each of the insulating papers 386 and 387 projects from the one axial end surface of the stator core 381 by 10 trim or thereabout. This is because, if the insulating papers 386 and 387 were cut close to the opening end of each slot, the effective cross section of each slot would be reduced to reduce the coil space rate in each slot.

With the configuration illustrated in FIG. 86, the cross area of the opening end of each slot is more increased in comparison to that of another portion of each slot, and the insulating papers 386 and 387 are at least partly overlapped with each other in the axial direction of the rotor. This joints the insulating papers 386 and 387 while ensuring a distance for insulation with respect to the stator core 391. The insulating paper 397 is for example so arranged along each slot as to reduce the length LCE2 of the coil ends 395 in the axial direction of the rotor.

As well as the configuration illustrated in FIG. 86, with the configuration illustrated in FIG. 87, the cross area of the opening end of each slot is more increased in comparison to that of another portion of each slot, and the insulating papers 405 and 404 are at least partly overlapped with each other in the axial direction of the rotor. This joints the insulating papers 405 and 404 along each slot while ensuring a distance for insulation with respect to the stator core 408.

Flange parts of the motor are for example closely contacted on the coil ends illustrated in FIGS. 86 and 87 to fix the coil ends. The flange parts serve as a heatsink to transfer heat from the coil ends thereto, thus effectively cooling the coil ends.

The winding method illustrated in FIG. 84 reduces physical interferences among the three-phase stator coils, thus providing effectively wound three-phase winding in the stator coil with a high coil space factor. In addition, the modification of the shape of each slot allows the length of the coil ends projecting from the one axial end surface of the stator core to be reduced. This remarkably improves the ratio of utilization of a space around the coil ends as compared with conventional motors, thus reducing the motor in size.

Next, a stator core assembly for the motors according to the first embodiment and its modifications will be described hereinafter with reference to FIG. 90A.

Figure 90A:
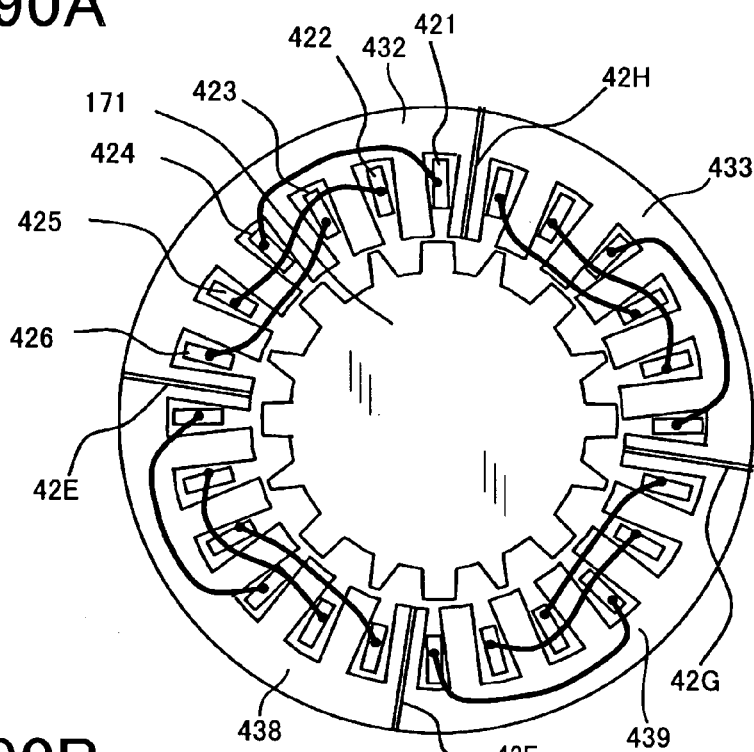
FIG. 90A is a lateral cross sectional view schematically illustrating an eight-pole motor according to the first embodiment and its modifications while being viewed from an axial end side of the rotor.

FIG. 90A schematically illustrates an eight-pole motor according to the first embodiment and its modifications while being viewed from an axial end side of the rotor.

The motor includes an eight-pole rotor 171 having a structure identical to that of the rotor illustrated in FIG. 55.

The motor also includes a stator core assembly made up four core segments 432, 433, 438, and 439 each having a same fan shape. Each of the four core segments 432, 433, 438, and 439 is made up of a plurality of magnetic steel sheets stacked in alignment.

The four core segments 432, 433, 438, and 439 are circumferentially aligned with one another such that each of the core segments 432, 433, 438, and 439 is joined to both adjacent core segments to thereby constitute the stator core assembly. Reference characters 42E, 42F, 42G, and 42H represent divided positions among the four core segments 432, 433, 438, and 439. Each of the four core segments 432, 433, 438, and 439 corresponds to 360 electrical degrees. In other words, the stator core assembly is divided by 360 electrical degrees into the four core segments 432, 433, 438, and 439.

Thus, a set of three-phase stator winding is wound in the same core segment. That is, four sets of three-phase stator windings are wound in the four core segments 432, 433, 438, and 439, respectively, thus creating four divided stators. The divided stators are individually produced.

For example, an A-phase winding is wound from a slot 421 to a slot 424, a B-phase winding is wound from a slot 423 to a slot 426, and a C-phase winding is wound from a slot 425 to a slot 423.

Because each of the core segments 432, 433, 438, and 439 is freely accessible from its inner surface side, three-phase stator windings are more easily wound in each of the core segments 432, 433, 438, and 439 in comparison when three-phase stator windings are wound in an annular stator core. Thus, three-phase stator windings can be directly wound in each of the core segments 432, 433, 438, and 439 using a winding machine. An improvement of the coil space factor in each slot can be implemented.

The stator core assembly can be divided by an integer multiple of 360 electrical degrees. For example, when the stator core assembly is divided by an integer multiple of 360 electrical degrees, the configuration of each core segment can be deformed.

When the stator core assembly is divided by 720 electrical degrees, the configuration of the stator or that of the rotor can be deformed each cycle of 720 electrical degrees. In order to reduce torque ripples, the pitch between two same-phase rotor poles can be shifted from 360 electrical degrees, thus canceling out torque ripples.

Each of the four core segments 432, 433, 438, and 439 has both circumferential end surfaces. The four core segments 432, 433, 438, and 439 are assembled to each other such that adjacent end surfaces are joined to each other.

One end surface of one core segment is formed with a plurality of projections and a plurality of recesses that are alternately arranged in the stack direction. One end surface of an alternative core segment is formed with a plurality of recesses and a plurality of projections that are alternately arranged in the stack direction. Each of the projections and recesses corresponds to at least one of the electromagnetic steel sheets.

Figure 90B:
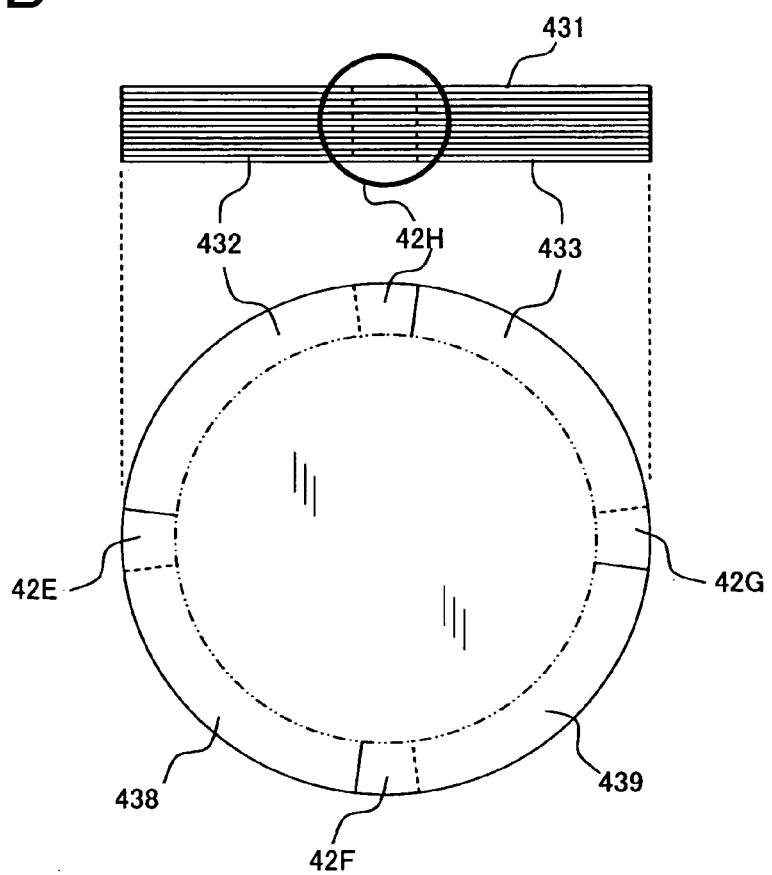
FIG. 90B is a plan view schematically illustrating the eight-pole motor illustrated in FIG. 90A while being viewed from an axial end side of the rotor.

As illustrated in FIG. 90B, the one end surface of the one core segment and the one end surface of the alternative core segment are joined to each other such that:

each of the projections of the one core segment is fitted into a corresponding one of the recesses of the alternative core segment; and each of the projections of the alternative core segment is fitted into a corresponding one of the recesses of the one core segment.

The joint method can be applied to joint other core segments to each other.

Figure 90C:
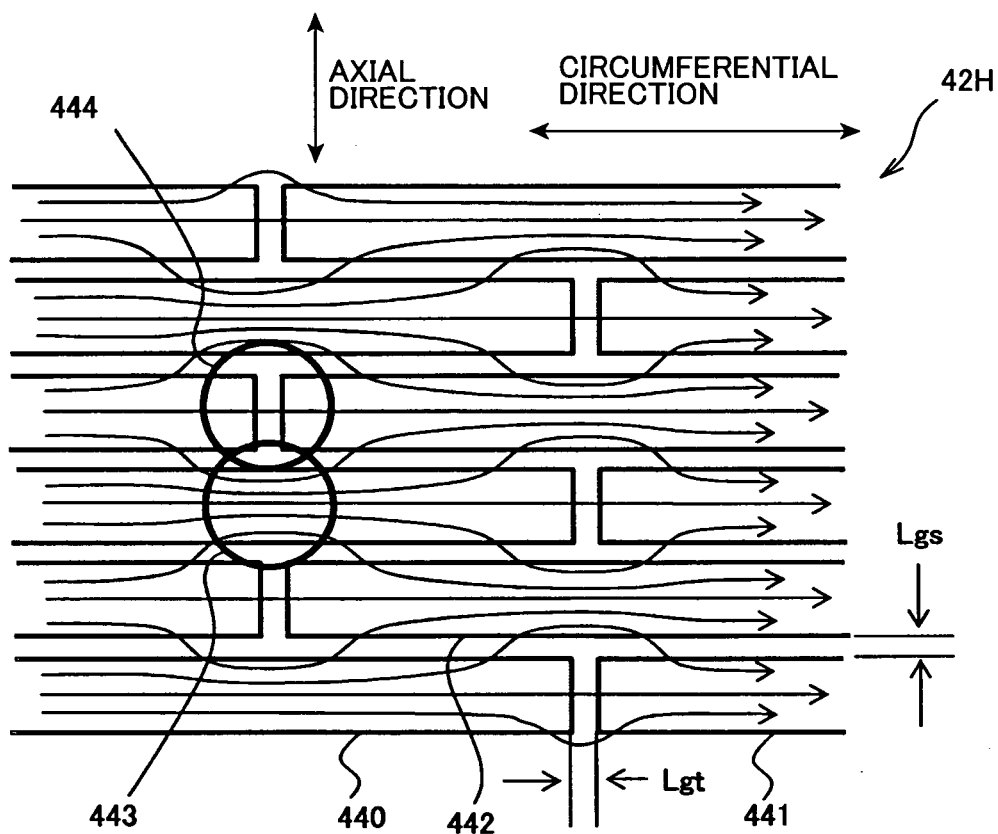
FIG. 90C is an enlarged view of one divided portion (joined portion) illustrated in FIG. 90A.

FIG. 90C is an enlarged view of one divided portion (joined portion) 42H. As illustrated in FIG. 90C, one electromagnetic steel sheet 440 and one electromagnetic steel sheet 441 are microscopically butted with a gap Lgt therebetween in the circumferential direction. In the stack direction (axial direction of the rotor), gaps Lgs are formed between stacked electromagnetic steel sheets.

Arrows in FIG. 90C represent magnetic fluxes in the circumferential direction. Even if an amount of magnetic fluxes is small at a circled portion 444 at which electromagnetic steel sheets are butted in the circumferential direction, an amount of magnetic fluxes is large at a circled portion 443. Thus, the joint method can reduce magnetic resistances between the core segments to be joined.

Figure 90D:
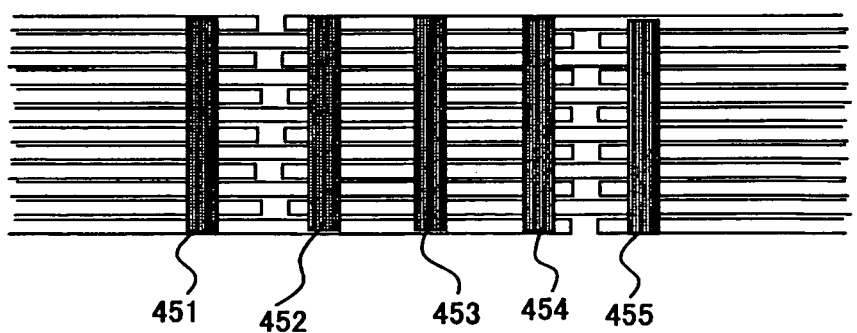
FIG. 90D is a partially axial cross sectional view of the motor illustrated in FIG. 90A.

When the one end surface of the one core segment ant the one end surface of the alternative core segment are joined to each other, the joined portions 451, 452, 453, 454, and 455 can be tightly fixed to each other by laser welding (see FIG. 90D). As mechanical fixing of each core segment, pressure welding with bolts, adhesive fixing, holding with a casing, or laser welding can be used.

Next, mechanical supporting mechanisms for the dual motors examples of which illustrated in FIGS. 15 and 16 will be described hereinafter.

Figure 91:
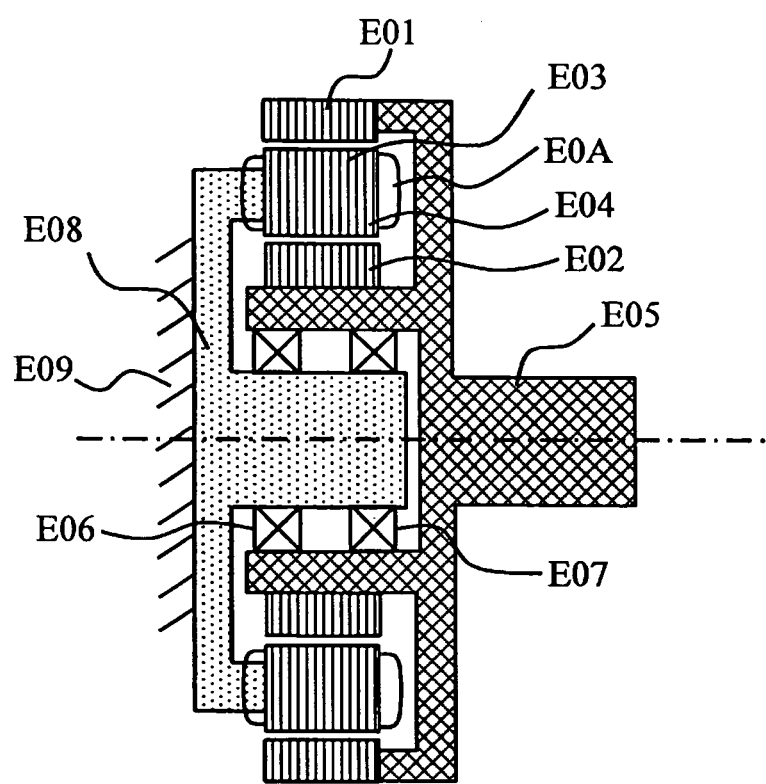
FIG. 91 is an axial cross sectional view of a dual motor as illustrated in FIG. 15 or 16.

FIG. 91 is an axial cross sectional view of a dual motor as illustrated in FIG. 15 or 16. Reference character E05 represents an output shaft (see FIG. 1A) of the dual motor, reference character E01 represents the second rotor R1, reference character E02 represents the first rotor R2, and reference characters E04 and E03 represent the first and second stators 52 and S1, respectively. Reference character E0A represents ends of stator coils wound in the first and second stators 52 and S1. Reference characters E06 and E07 represent bearings rotatably supporting the output shaft E05 fixed to each of the first and second rotors R2 and R1. Rotation of the first and second rotors R2 and R1 turns the output shaft E05 therewith.

Reference character E08 represents a supporting member fixedly supporting the first and second stators S2 and S1 while joining them, and the bearings E16 and E17. The supporting member E08 is fixed to a stationary member or portion indicated by E09; this fixes the whole of the dual motor. Note that chain line illustrated in FIG. 91 represents a center of rotation of each of the first and second rotors R2 and R1.

When motors are used at a high RPM, the lifetime and reliability of a bearing for rotatably supporting a rotor deeply depends on the product of the diameter D of the bearing and the number N of revolutions of the rotor. Specifically, when a motor is frequently used at a high RPM, it is preferable that the diameter of a bearing is set to be a lower value. From this viewpoint, the diameter of each of the bearings E06 and E07 of the dual motor is set to be a lower value. The longer the diameter of a bearing is, the higher the cost of the bearing is.

The dual motor illustrated in FIG. 91 is designed such that the second rotor R1, and the first and second stators S2 and S1 are supported from one axial end. The design however may cause errors, such as eccentricities of the stators S1 and S2 and rotors R1 and R2. From this viewpoint, the axial thickness of each stator and rotor cannot be so long.

Figure 92:
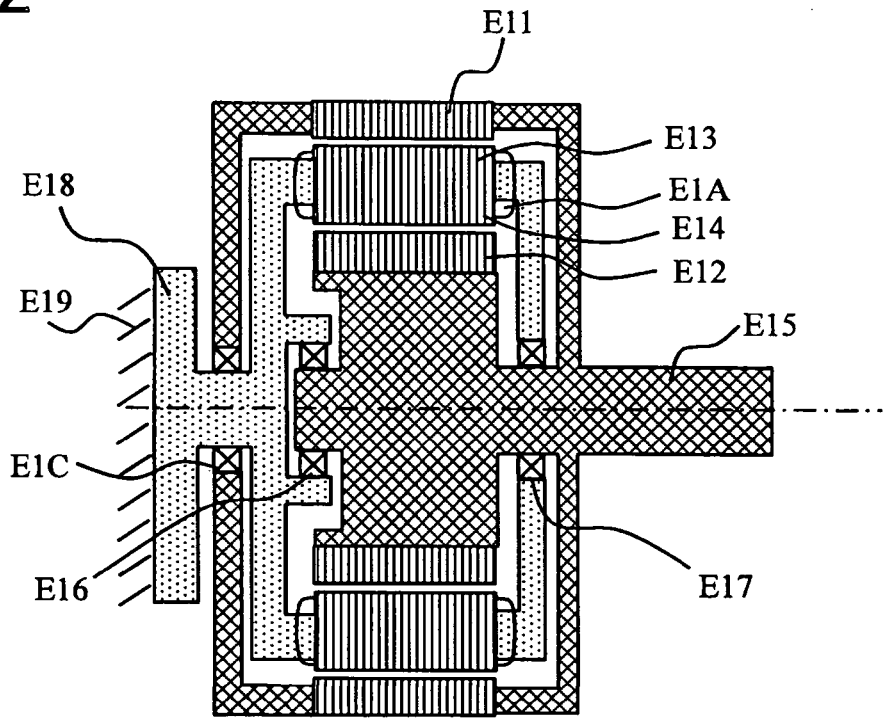
FIG. 92 is an axial cross sectional view of a dual motor as illustrated in FIG. 15 or 16.

FIG. 92 is an axial cross sectional view of a dual motor as illustrated in FIG. 15 or 16. The dual motor illustrated in FIG. 92 has an axial length (thickness) of each stator and rotor is approximately twice that of each stator and rotor of the dual motor illustrated in FIG. 91. In order to reduce eccentricities of stators and rotors, they are accurately supported from both axial ends of the dual motor.

Specifically, referring to FIG. 92, reference character E15 represents an output shaft (see FIG. 1A) of the dual motor, reference character E11 represents the second rotor R1, reference character E12 represents the first rotor R2, and reference characters E14 and E13 represent the first and second stators S2 and S1, respectively. Reference character E1A represents ends of stator coils wound in the first and second stators S2 and S1. Reference characters E16, E17, E1C, and E1B represent bearings rotatably supporting the output shaft E05 fixed to each of the first and second rotors R2 and R1. Rotation of the first and second rotors R2 and R1 turns the output shaft E15 therewith.

Reference character E18 represents a supporting member fixedly supporting the first and second stators S2 and S1 while joining them, and supporting the bearings E16, E17, E1C, and E1B. The supporting member E18 is fixed to a stationary member or portion indicated by E19; this fixes the whole of the dual motor.

The supporting member E18 fixedly supports the first and second stators S2 and S1 from their axial ends. This reduces eccentricities of the first and second stators and rotors. The inner diameter of the bearing E1C is set as long as possible to increase the rigidity of the dual motor.

Figure 93:
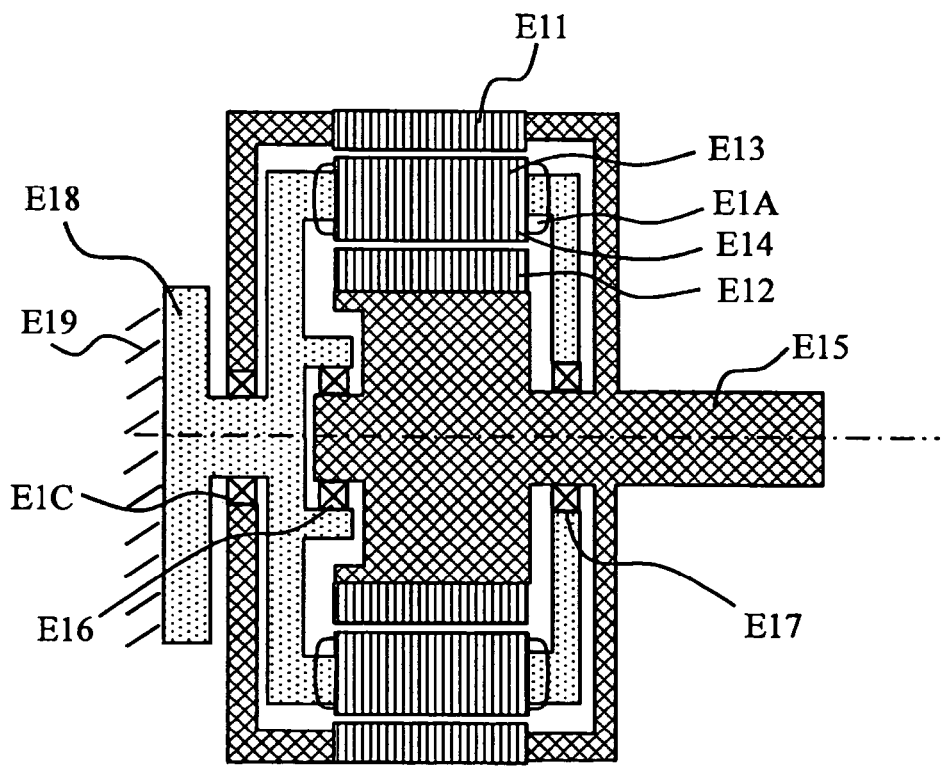
FIG. 93 is an axial cross sectional view of a dual motor as illustrated in FIG. 15 or 16.

Next, FIG. 93 is an axial cross sectional view of a dual motor as illustrated in FIG. 15 or 16. In addition to the structure of the dual motor illustrated in FIG. 92, the dual motor illustrated in FIG. 93 is equipped with a motor case and a bearing.

Reference character E1D the motor case in which the dual motor illustrated in FIG. 92 is installed with one end of the output shaft E15 rotatably projecting from an opening of one axial end wall of the motor case E1D. The other axial end wall of the motor case E1D is integrally joined to the supporting member E18. Reference character E1B represents the bearing, and the bearing E1B is installed in the opening; this bearing E1B allows the output shaft E15 to rotate.

The motor case E1D is fixed at its axial end wall to a stationary member or portion indicated by E19; this fixes the whole of the dual motor. The motor case E1D can be fixed at its one axial end wall to a stationary member or portion, or at its outer circumferential side surface to a stationary member or portion.

The structure of the dual motor illustrated in FIG. 93 supports the first and second stators, first and second rotors, and the like with high accuracy so as to maintain the symmetrical property of them with respect to the center axis of rotation of the first and rotors. This keeps, at a small length, an air gap between the first rotor and the first stator, and that between the second rotor and the second stator. This maintains the motor efficiency at a high level. The diameter of each of the bearings E1C, E16, E17, and E1B can be designed to have a suitable length, making it possible to the dual motors illustrated in FIG. 93 with high lifetime and reliability.

Next, a reluctance motor according to the first embodiment, which more simplifies the structure of a control device therefor, will be described hereinafter with reference to FIGS. 94 and 95.

Figure 95:
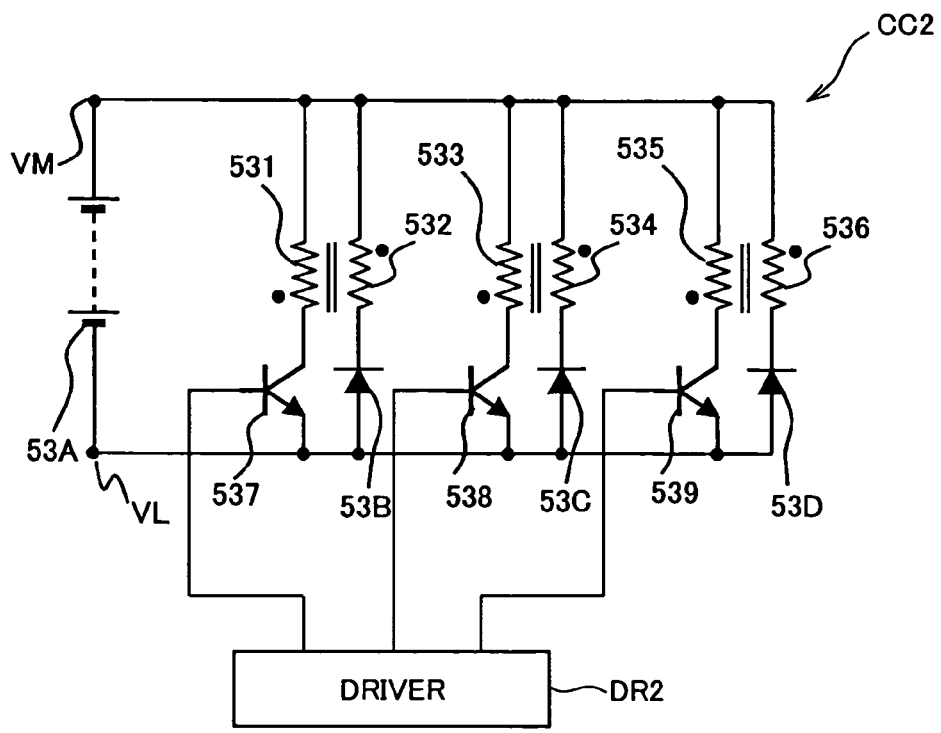
FIG. 95 is a circuit diagram schematically illustrating a control device for controlling the reluctance motor illustrated in FIG. 94 according to the first embodiment.

The configuration of the reluctance motor illustrated in FIG. 95 is substantially identical to that of the reluctance motor illustrated in FIG. 54 except that a bifilar coil for each phase coil is used.

Specifically, a bifilar coil for the A-phase includes a first winding and a second winding. The first winding is concentrically wound in a slot between the teeth 11C and 117 and in a slot between the teeth 119 and 11A to form a first coil (521 and 527). The second winding is concentrically wound in the slot between the teeth 11C and 117 and in the slot between the teeth 119 and 11A to form a second coil (522 and 528).

The first and second windings are preferably parallelly wound in the slot between the teeth 11C and 117 and in the slot between the teeth 119 and 11A. This allows magnetic fluxes to be commonly linked to the first coil (521 and 527) and second coil (522 and 528).

As well as the A-phase coil, a bifilar coil is applied to each of B- and C-phase coils.

Specifically, a bifilar coil for the B-phase includes a first winding and a second winding. The first winding is concentrically wound in a slot between the teeth 118 and 119 and in a slot between the teeth 113 and 11C to form a first coil (525 and 52B). The second winding is concentrically wound in the slot between the teeth 118 and 119 and in the slot between the teeth 11B and 11C to form a second coil (526 and 520).

A bifilar coil for the C-phase includes a first winding and a second winding. The first winding is concentrically wound in a slot between the teeth 11A and 11B and in a slot between the teeth 117 and 118 to form a first coil (529 and 523). The second winding is concentrically wound in the slot between the teeth 11A and 11B and in the slot between the teeth 117 and 118 to form a second coil (52A and 524).

Figure 94:
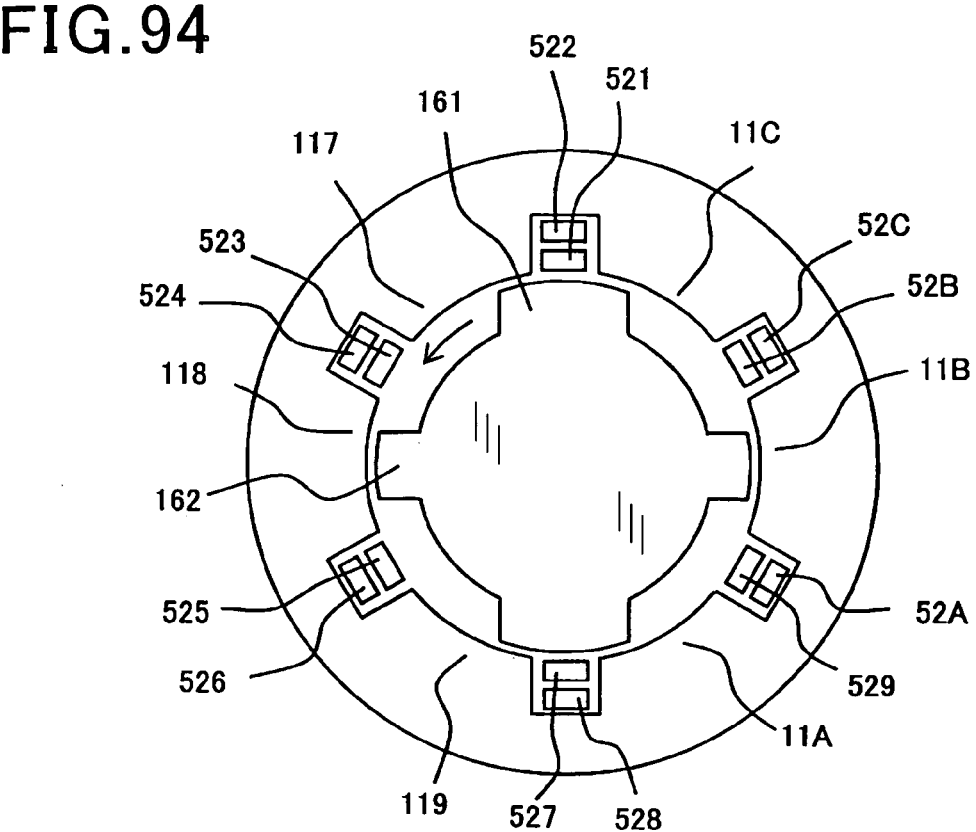
FIG. 94 is a lateral cross sectional view schematically illustrating a reluctance motor according to the first embodiment, which more simplifies the structure of a control device therefor.

The reluctance motor illustrated in FIG. 94 can be driven by a control device CC2 with a simple structure illustrated in FIG. 95. The first and second windings of each bifilar coil can be different in thickness from each other. This restricts the increase in resistance of each of the first and second winding when a current flows them, thus minimizing the reduction in motor efficiency.

The structure of the control device CC2 will be described hereinafter with reference to FIG. 95.

Reference character 531 represents the first winding constituting the first A-phase coil (521 and 527), and reference character 532 represents the winding constituting the second A-phase coil (522 and 528). When the first and second windings 531 and 532 are parallelly wound at close range therebetween, magnetic fluxes are almost commonly linked to the first coil (521 and 527) and second coil (522 and 528). As illustrated by dots, the first and second windings 531 and 532 are arranged such that the polarity of the first winding 531 is opposite to that of the second winding 532.

As illustrated in FIG. 94, when the first and second windings 531 and 532 are separated in space from each other in the corresponding slots, the second winding (522 and 528) located outwardly preferably serves as a regeneration winding illustrated by the winding 532. This snows a large amount of magnetic fluxes to be linked to the second coil (522 and 528), Similarly, reference character 533 represents the first winding constituting the first B-phase coil (525 and 52B), and reference character 534 represents the winding constituting the second A-phase coil (526 and 52C). Reference character 535 represents the first winding constituting the first C-phase coil (529 and 523), and reference character 536 represents the winding constituting the second C-phase coil (52A and 524).

The control device CC2 is provided with a DC power source 53A, first to third power transistors 537 to 538, and first to third diodes 53B to 53D. For example, bipolar transistors are used as the first to third power transistors, referred to simply as "first to third transistors".

The DC power source 53A, 84D illustrated in FIGS. 2, 3, and 95 can be designed as a DC power source obtained by converting commercial AC power with 50 or 60 Hz into DC power. The DC power source 53A, 84D illustrated in FIGS. 2, 3, and 95 can also be designed as a DC battery, Hereinafter, the DC power source 53A will be described as the DC battery (battery).

A positive terminal VM of the battery 53A is connected to one end of each of the first windings 531, 533, and 535. A negative terminal VL of the battery 53A is connected to the emitter of each of the first to third transistors 537 to 539. The collector of each of the first to third transistors 537 to 539 is connected to the other end of a corresponding one of the first windings 531, 533, and 535.

The positive terminal VM of the battery 53A is also connected to one end of each of the second windings 532, 534, and 536. The other end of each of the second windings 532, 534, and 536 is connected to the cathode of a corresponding one of the diodes 53B, 53C, and 53D. The anode of each of the diodes 53B, 53C, and 53D is connected to the negative terminal VL of the battery 53A.

The control device CC is provided with a driver DR2. The driver DR2 consisting of, for example, a microcomputer and its peripheries is connected to the base of each of the first to third transistors 537, 538, and 539.

The control device DR2 drives the motor illustrated in FIG. 94 in the same procedures as those illustrated in (a) to (d) of FIG. 56 except that magnetic-energy regenerating method applied to the motor illustrated in FIG. 94 is different from that applied to the motor 708 illustrated in FIG. 55.

Specifically, when the rotor is presently located close to the rotational angle $\theta r$ of 30 degrees illustrated in (a) of FIG. 56, one main salient pole 161 of the rotor starts to face the stator pole 11A and the other main salient pole 161 starts to face the tooth 117.

At that time, the driver DR2 turns the first transistor 537 on to thereby supply an A-phase DC current Ia from the battery 53A to the first winding 531. Simultaneously, the driver DR2 turns the third transistor 539 on to thereby supply a C-phase DC current Ic from the battery 53A to the first winding 535. This creates a torque in the CCW direction set forth above.

Thereafter, when the rotor 340 is turned in the CCW so as to be presently located close to the rotational angle $\theta r$ of 50 degrees illustrated in (b) of FIG. 56, the one main salient pole 161 of the rotor 340 faces the tooth 117 and the other main salient pole faces the tooth 117.

At that time, the driver DR2 turns the third transistor 539 off. This regenerates magnetic energy linking to the first winding 535 to the battery 53A with the use of the second winding 536 and the diode 53D. Because the mutual inductance between the first winding 535 and the second winding 536, magnetic fluxes are almost commonly linked to both the first and second windings 535 and 536, the first and second windings 535 and 536 can supply magnetic energy to each other.

Before and after the regenerative drive, the driver DR2 turns the second transistor 538 on to thereby supply a B-phase DC current Ib from the battery 53A to the first winding 533 while the A-phase current Ia is supplied to flow through the first winding 531. This creates a torque in the CCW direction set forth above.

Thereafter, when the rotor 340 is turned in the CCW so as to be presently located close to the rotational angle $\theta r$ of 70 degrees illustrated in (c) of FIG. 56, one main salient pole 161 of the rotor 340 is close to the tooth 118, and the other main salient pole 161 is close to the tooth 11B.

At that time, the driver DR2 turns the first transistor 537 off. This regenerates magnetic energy linking to the first winding 531 to the battery 53A with the use of the second winding 532 and the diode 53B set forth above.

Before and after the regenerative drive, the driver DR2 turns the third transistor 539 on to thereby supply the C-phase DC current Ic from the battery 53A to the first winding 535 while the B-phase current Ib is supplied to flow through the first winding 533. This creates a torque in the CCW direction set forth above.

Thereafter, when the rotor 349 reaches a location of the rotational angle $\theta r$ of 90 degrees illustrated in (d) of FIG. 56, the location of the rotational angle $\theta r$ of 90 degrees advances by 60 degrees from the location of the rotational angle $\theta r$ of 30 degrees illustrated in (a) of FIG. 56.

Thus, the motor 708 illustrated in FIG. 94 is designed to be periodically driven, over a cycle of 60 electrical degrees, by the control device CC2 according to the procedures illustrated in (a) to (d) of FIG. 56.

As illustrated in FIG. 95, the control device CC2 is designed as a simply-structured circuit mainly consisting of three power transistors and three diodes as compared with the structure of the conventional three-phase inverter illustrated in FIG. 123. In comparison to the three-phase inverter illustrated in FIG. 123, the number of power transistors of the control device CC2 is halved, and the current capacitance of each power transistor of the control device CC2 is also halved.

Thus, the total current capacitance of the power transistors of the control circuit CC2 becomes approximately one-fourth of the total current capacity of the conventional three-phase inverter illustrated in FIG. 123. These advantages reduce a motor system consisting of the motor illustrated in FIG. 94 and the control device CC2 illustrated in FIG. 95 in cost.

In addition, the forward voltage drop in the control device illustrated in FIG. 95 is substantially the half of that in the inverter illustrated in FIG. 123. Similarly, the sum of the voltage drops across the diodes 53B, 53C, and 53D during regeneration is substantially the half the sum of the voltage drops across the diodes 847, 848, 849, 84A, 84B, and 84C during regeneration.

This improves the efficiency of the control device CC2 and reduces the heat to be generated by the inverter, thus reducing the control device CC2 illustrated in FIG. 95 in size.

Figure 96:
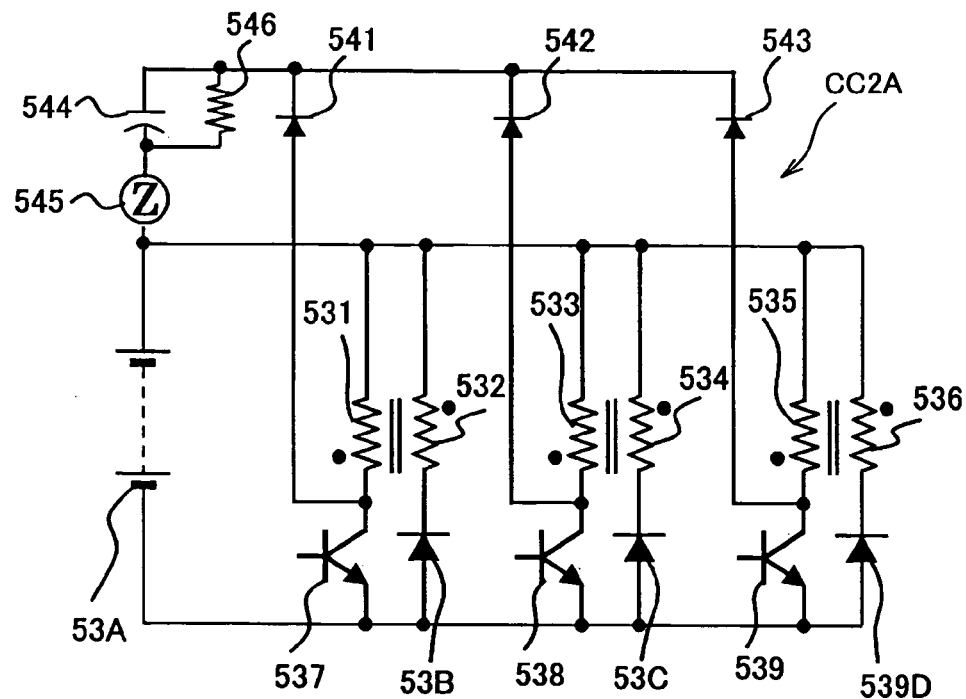
FIG. 96 is a circuit diagram schematically illustrating a control device as a modification of the control device illustrated in FIG. 95.

FIG. 96 schematically illustrates a control device CC2A as a modification of the control device CC2 with the drier DR2 being omitted in illustration. The control device CC2A is designed to reduce a transient excessive voltage across each power transistor illustrated in FIG. 95. When the transistor 537 being energized is shifted to being deenergized, magnetic energy of magnetic fluxes linked to the first winding 531 is transferred in principle by the second winding 532 and the diode 53B to the battery 53A.

However, because flux leakage components of the first winding 531 may not be not linked to the second winding 532, they may not be transferred to the battery 53A. These flux leakage components may create a surge voltage in the first winding 531 when the first transistor 537 is turned off. This may damage the first transistor 537.

In order to address such a problem, the control device CC2A is provided with three diodes 541, 542, 543, a capacitor 544, a Zener diode 545, and a resistor 546.

One end of the Zener diode 545 is connected to the positive terminal VM of the battery 53A, and the other end is connected to one electrode of the capacitor 544 and one end of the resistor 564. The other electrode of the capacitor 544 and the other end of the resistor 564 are commonly connected to the cathode of each of the diodes 541, 542, and 543.

The anode of the diode 541 is connected to a point at which the other end of the first winding 531 and the collector of the first transistor 537 are connected. Similarly, the anode of the diode 542 is connected to a point at which the other end of the first winding 533 and the collector of the second transistor 538 are connected. In addition, the anode of the diode 543 is connected to a point at which the other end of the first winding 535 and the collector of the third transistor 539 are connected.

Specifically, the diode 541 collects the surge voltage created in the first winding 531 while rectifying it. The collected serge voltage is absorbed by a snubber circuit consisting of the resistor 546, the capacitor 544, and the Zener diode 545.

Because the total amount of the magnetic energy of the flux leakage components is small, the snubber circuit with a relatively small scale can absorb the surge voltage. Various modifications can be applied to the snubber circuit.

In FIGS. 94, 95, and 96, three-phase reluctance motor and its control devices are described, but when a reluctance motor illustrated in FIG. 94 is expanded to multiphase reluctance motors over three-phase reluctance motors, the control device CC2 or CC2A can be expanded to provide with a number of power transistors and diodes corresponding to the number of multiphase. This can drive the multiphase reluctance motors based on the number of power transistors and diodes.

Next, when reluctance motors according to the first embodiment, such as illustrated in FIGS. 1, 9, and 54, are small capacitance motors having output of several watts [W], a more simplified control device can be used to control them.

Figure 97:
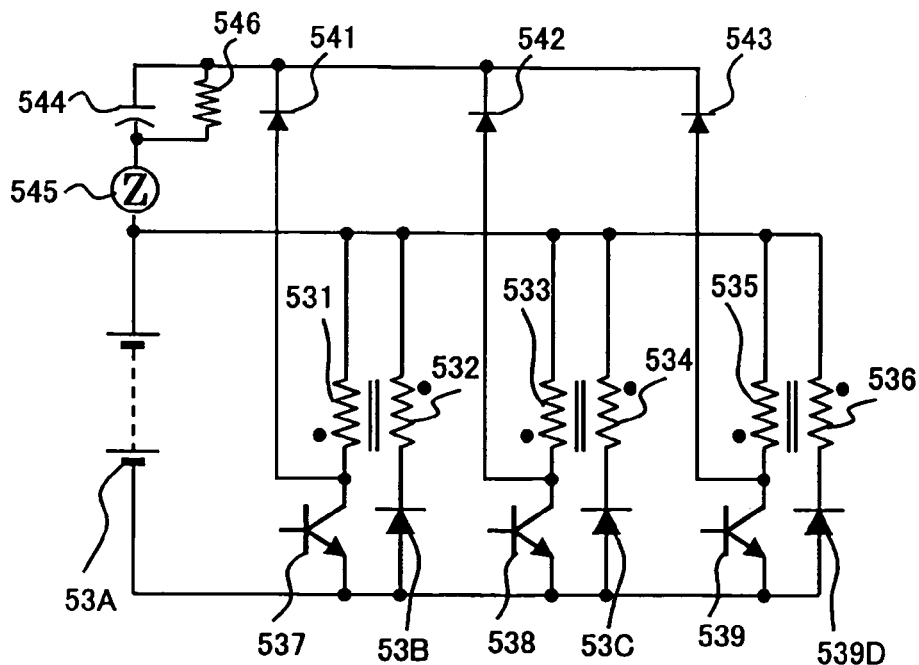
FIG. 97 is a circuit diagram schematically illustrating a structure of a more simplified control device according to the first embodiment.

An example of the structure of the more simplified control device is illustrated in FIG. 97. Like elements between the control device CC or CC2 and the more simplified control device, to which like reference characters are assigned, are omitted or simplified in description.

Reference characters 551, 552, and 553 represent an A-phase coil, a B-phase coil, and a C-phase coil illustrated in FIG. 1, 9, or 54.

Reference characters 55A, 55B, and 55C are resistors, and each of the resistors 55A, 55B, and 55C is connected between the positive terminal VM of the battery 53A and the cathode of a corresponding one of the first to third diodes 567, 568, and 569.

Each of the resistors 55A, 55B, and 55C is operative to absorb magnetic energy stored in a corresponding one of the A-, B-, and C-phase coils. This more simplifies the control device for driving the reluctance motors according to the first embodiment and its modifications. Note that the resistors 55A, 55B, and 55C can be each combined with a capacitor and/or a Zener diode.

Next, a modification of the control device CC for driving reluctance motors according to the first embodiment, such as illustrated in FIGS. 1, 9, and 54 will be described hereinafter.

Figure 98:
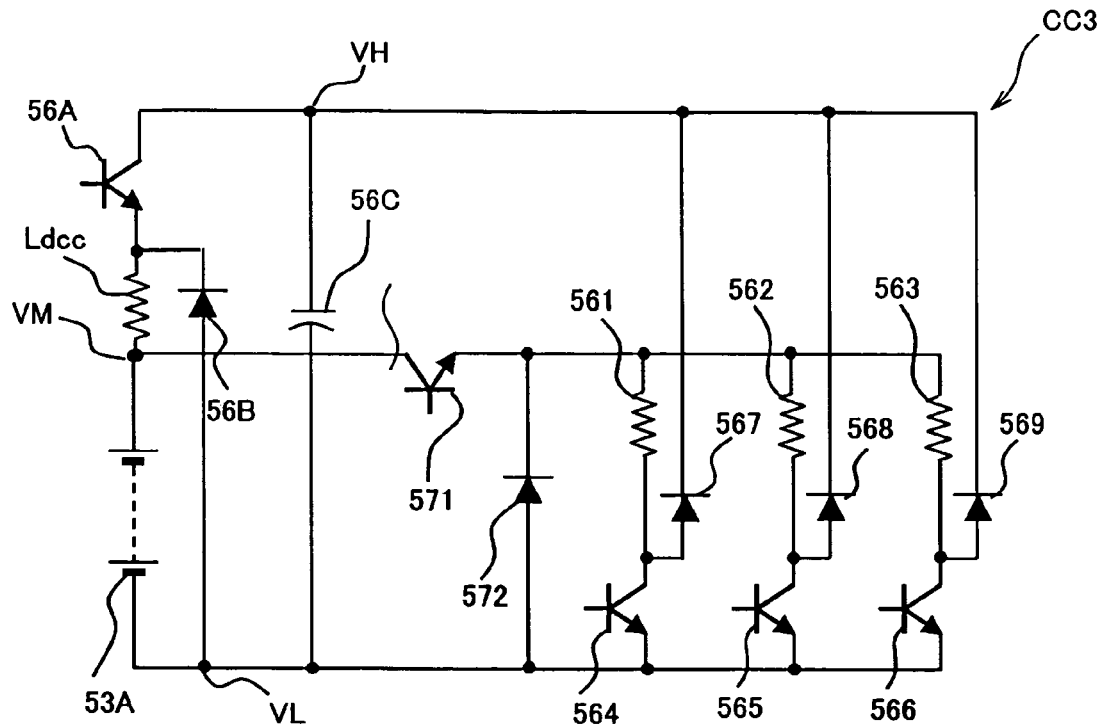
FIG. 98 is a circuit diagram schematically illustrating a control device as a modification of the control device illustrated in FIG. 3.

An example of the structure of a control device CC3 modified by the control device CC is illustrated in FIG. 98. Like elements between the control device CC and the control device CC3, to which like reference characters are assigned, are omitted or simplified in description.

In addition to the structure of the control circuit CC illustrated in FIG. 2, the control circuit CC3 is provided with a power transistor 571, such as a bipolar transistor, between the positive terminal VM of the battery 53A and each of the A-, B-, and C-phase coils 561, 562, and 563. The base of the power transistor 571 is connected to the driver DR (not shown in FIG. 98). The control circuit CC3 is also provided with a diode 572 parallelly connected to a series circuit of the coil 561 and the first transistor 564 located at the rear stage of the transistor 571.

The transistor 571 and diode 572 allow the regenerative current to flow through a closed loop (the coil 561, the diode 567, the capacitor 56C, the diode 572, and the coil 561) without passing the battery 53A. Thus, it is possible to reduce the time required for the magnetic energy charged in the coil 561 to be off.

Next, methods of existing: the improvement of a maximum torque of a reluctance motor according to the first embodiment; and the drive of the reluctance motor at a high RPM will be described hereinafter.

The first to fifth methods of improving a maximum torque of a reluctance motor according to the first embodiment have been described (see, for example, FIG. 73 and FIG. 76). Particularly, the second and fourth methods respectively illustrated in (b) of FIG. 73 and FIG. 76 are designed to allow a large amount of magnetic fluxes to be transferred form the rotor to at least one stator tooth to be excited. This increases a maximum torque of the reluctance motor from the value T2 at the operating point (torque-saturated point) Ts to the value T4 on the current-torque characteristic curve Tm illustrated in FIG. 5.

However, at that time, the increase in the amount of magnetic fluxes may increase magnetic fluxes liked to each stator coil and induced voltages. These may adversely affect on the drive of the reluctance motor at a high RPM.

In order to address such a problem, a measure to reduce the flux-linkage change rate to each stator coil over time so as to reduce a voltage induced across each stator coil to thereby simplify the drive of the reluctance motor up to a high RPM will be described hereinafter.

Figure 99:
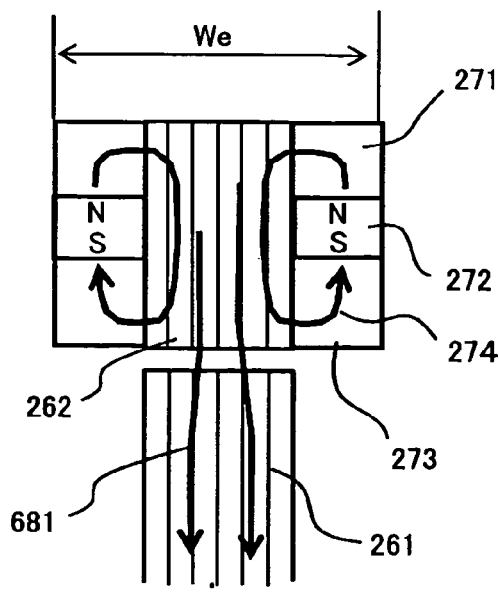
FIG. 99 is an enlarged axial cross sectional view of magnetic members mounted on both side surfaces of each tooth of a reluctance motor, which is identical to (b) of FIG. 73, according to the first embodiment.

FIG. 99 illustrates, in enlarged scale, the magnetic members 271 mounted on both side surfaces of each tooth 262 of a reluctance motor, which is identical to (b) of FIG. 73.

The different point between FIG. 99 and (b) of FIG. 73 is that the direction of a unidirectional direct current to be supplied to, for example, a stator winding adjacent to one tooth 262 to be excited is revered to the direction of a unidirectional direct current to be supplied thereto illustrated in (b) of FIG. 73.

This allows magnetic fluxes 681 to flow through the one tooth 262 to the rotor 261 via the air gap (see FIG. 99). The direction of the flow of the magnetic fluxes 681 is defined to "negative direction".

At that time, magnetic fluxes 274 travel out of the north pole, pass through the one tooth 262, and return to the south pole. That is, the flow of the magnetic fluxes 274 in the one tooth 262 is identical to that of the magnetic fluxes 681. In other words, the direction of the magnetic fluxes 274 is defined to "negative direction".

This allows the one tooth 262 to be prone to be magnetically saturated.

Specifically, in the second method illustrated in FIG. 73, the permanent magnet 272 moves a start operating point up to the point Bc on the magnetic characteristic curve in the one tooth 262 to be excited (see FIG. 74). Thus, when the magnetic fluxes 275 increase the operating point Bc up to the target point Ba, the flux-density change B4 between the operating point Bc to the target point Ba is required; this flux-density change 34 is greater than the normal flux-density difference of B1.

That is, the increase in the flux-density difference 134 increases the amount of magnetic fluxes that pass the one tooth 262 to be excited.

In the method illustrated in FIG. 99, the permanent magnet 272 moves the start operating point up to the point Bc on the magnetic characteristic curve illustrated in FIG. 74.

Thus, when the negatively directed magnetic fluxes 681 reduce the operating point Bc up to a negative target point Bb corresponding to the target point Ba, the flux-density change B5 between the operating point Bc to the target point Bb is required; this flux-density change B5 is smaller than the flux-density change 34.

Because a voltage induced across the one tooth 262 to be excited is in proportional to the flux-change B5, the voltage induced across the one tooth 262 based on the flux-density change 35 is lower than that induced across the one tooth 262 based on the flux-density change 34.

This makes it easy to drive the reluctance motor at a higher RPM.

Another measure to reduce the flux-linkage change rate to each stator coil over time will be described hereinafter.

Figure 100:
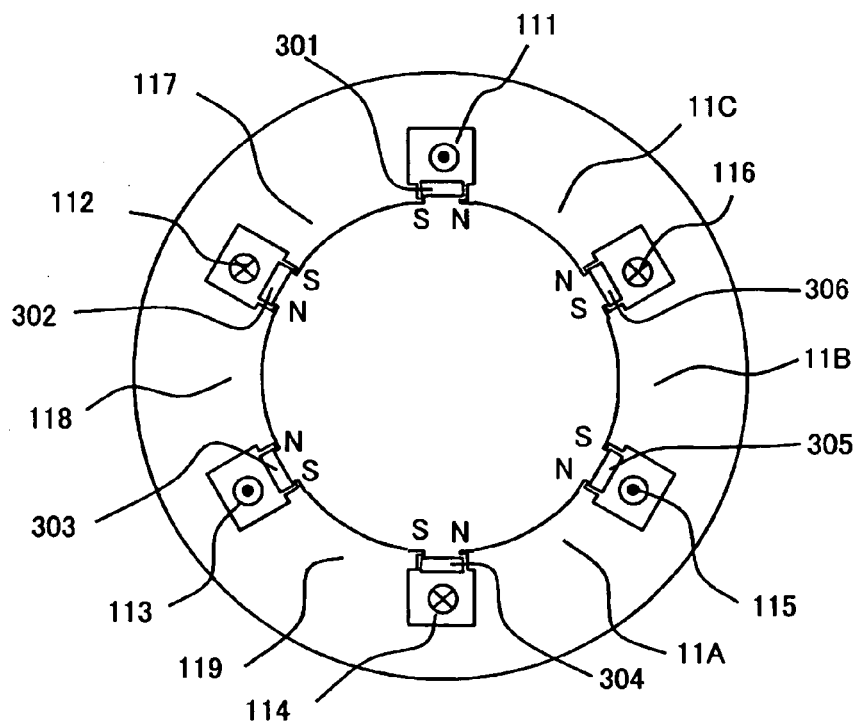
FIG. 100 is a lateral cross sectional view schematically illustrating an example of a modification of the reluctance motor illustrated in FIG. 54.

FIG. 100 represents an example of a modification of the reluctance motor 708 illustrated in FIG. 54. In FIG. 100, the rotor is omitted in illustration.

The different point between FIG. 100 and FIG. 76 is that the direction of a unidirectional direct current to be supplied to each stator winding is revered to the direction of a unidirectional direct current to be supplied to each stator winding illustrated in FIG. 76.

With the structure of the modified reluctance motor, for example, the permanent magnet 301 moves the start operating point up to the point Bc on the magnetic characteristic curve of one tooth 11C to be excited (see FIGS. 74 and 100).

Thus, when magnetic fluxes are created by the excited stator winding 111, because the direction of the magnetic fluxes are substantially identical to that of the magnetic fluxes based on the permanent magnet 301, the created magnetic fluxes reduce the operating point Bc up to the negative target point Bb corresponding to the target point Ba. This requires the flux-density change 85 between the operating point Bc to the target point Bb, and the flux-density change B5 is smaller than the flux-density change B4.

Because a voltage induced across the one tooth 262 to be excited is in proportional to the flux-change B5, the voltage induced across the one tooth 262 based on the flux-density change B5 is lower than that induced across the one tooth 262 based on the flux-density change B4.

This makes it easy to drive the reluctance motor at a higher RPM.

As described above, a control circuit according to the first embodiment is configured to supply, in maximum-torque increase mode, in a preset direction, a unidirectional direct current to each stator coil of a reluctance motor illustrated in FIG. 73 or 76. This creates a great toque based on the flux-density change B5.

On the other hand, the control circuit is configured to supply, in an induced flux reduction mode, the direct current to each stator coil in a direction reversed from the preset direction. This reduces magnetic fluxes by the flux-density change B5 to thereby carry out the drive of the rotor at a higher RPM.

First and second modifications of the control devices according to the first embodiment configured to operate in both of the maximum-torque increase mode and the flux-density reduction mode will be described with reference to FIGS. 101 and 102.

Each of control devices CC10 and CC11 according to the first and second modifications is capable of supplying a direct current to each stator winding in both of the positive direction and negative direction.

Figure 101:
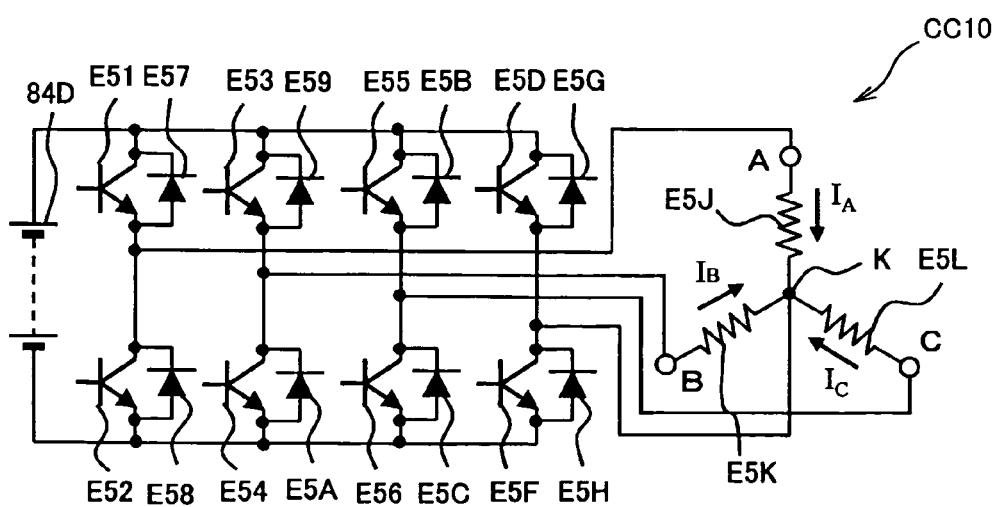
FIG. 101 is a circuit diagram schematically illustrating a control device designed to operate in both, maximum-torque increase mode and the flux-density reduction mode according to the first embodiment.

Referring to FIG. 101, reference character E5J represents the A-phase coil, and reference character E5K represents the B-phase coil. Reference character E5L represents the C-phase coil. The A-, B-, and C-phase coils E5J, E5K, and E5L are connected to each other in star configuration via a neutral point K.

The control device CC10 illustrated in FIG. 101 is provided with a DC power source, such as battery 84D, four pairs of transistors (E51, E52), (E53, E54), (E55, E56), and (E5D, E5F). The control circuit CC10 is also provided with eight diodes E57, E58, E59, E5A, E5B, E5C, E5G, and E5H. For example, bipolar transistors are used as the four pairs of transistors.

A positive terminal of the battery 84D is connected to the collector of each of the high-side transistors E51, E53, E55, and E5D. A negative terminal of the battery 84D is connected to the emitter of each of the low-side transistors E52, E54, E56, and E5F. The emitter of each of the high-side transistors E51, E53, E55, and E5D is connected, at a connection point, to the corrector of a corresponding one of the low-side transistors E52, E54, E56, and E5F.

The connection point of each of the three pairs of transistors (E51, E52), (E53, E54), and (E55, E56) is connected to the one free end of a corresponding one of the A-, B-, and C-phase coils E5J, E5K, and E5L. The neutral point K is connected to the connection point of the remaining pair of transistors (E5D, E5F).

Each of the eight diodes E57, E58, E59, E5A, E5B, E5C, E5G, and E5H is connected antiparallel to a corresponding one of the transistors E5L E52, E53, E54, E55, E56, E57, and E58. No drive circuit is omitted in illustration.

With the configuration, turning on of the transistor E51 and the transistor E5F allows a positive direct current to be supplied to the A-phase coil E5J through the transistor E51, the neutral point K, and the transistor E5F. In addition, turning on of the transistor E52 and the transistor E5D allows a negative direct current to be supplied to the A-phase coil E5J through the transistor E52, the neutral point K, and the transistor E5D.

As well as the bi-directional drive of the A-phase coil E5J, each of the B- and C-phase coils E5K and E5L can be bidirectionally driven.

When a higher torque is required at an RPM equal to or lower than a preset median RPM, the driver (not shown) operates in the maximum-torque increase mode, to supply one-directional current to flow through at least one phase stator coil in accordance with FIG. 6. This creates the magnetic fluxes 275 through at least one tooth to be excited (see (b) of FIG. 75). This creates the required higher torque.

In contrast, when a higher RPM is required, the driver (not shown) operates in the induced flux reduction mode, to supply the other-directional current, which is reversed to the one-directional current, to flow through at least one phase stator coil to thereby create the magnetic fluxes 681 through at least one tooth to be excited (see FIG. 99). This reduces a voltage to be induced across each stator coil to thereby easily drive the reluctance motor at the required higher RPM.

Figure 102:
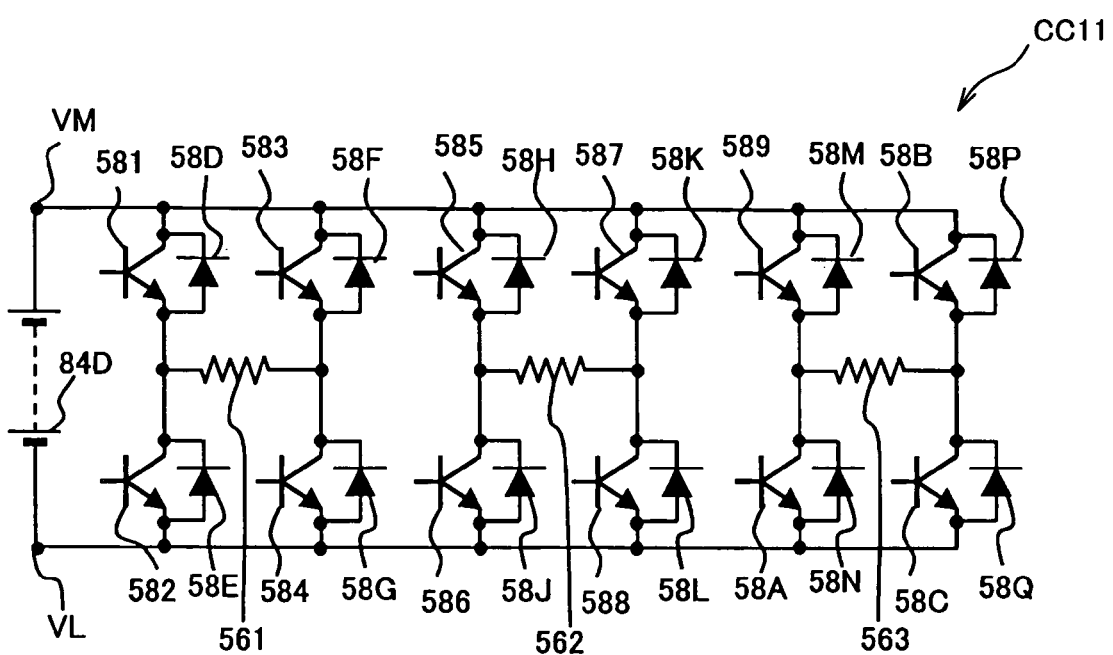
FIG. 102 is a circuit diagram schematically illustrating a control device designed to operate in both maximum-torque increase mode and the flux-density reduction mode according to the first embodiment.

To like parts in FIGS. 1, 101, and 102, like reference characters are assigned, and therefore, descriptions of which are omitted or simplified.

The control device CC11 illustrated in FIG. 102 is provided with three H-bridges. Each of the three H-bridges are connected in parallel to the battery 84D.

The first H-bridge for the A-phase includes four switch modules. The first switch module includes a power transistor 581 and a diode 58D connected antiparallel thereto. The second switch module includes a power transistor 582 and a diode 58E connected antiparallel thereto. The third switch module includes a power transistor 583 and a diode 58F connected antiparallel thereto. The fourth switch module includes a power transistor 584 and a diode 580 connected antiparallel thereto.

The first to fourth switch modules of the first H-bridge are connected to reverse a voltage based on the battery 84D across both ends of the A-phase coil 561. This allows bi-directional current to be supplied to the A-phase coil 561.

The second H-bridge for the B-phase includes four switch modules. The first switch module includes a power transistor 583 and a diode 58H connected antiparallel thereto. The second switch module includes a power transistor 586 and a diode 58J connected antiparallel thereto. The third switch module includes a power transistor 587 and a diode 58K connected antiparallel thereto. The fourth switch module includes a power transistor 588 and a diode 58L connected antiparallel thereto.

The first to fourth switch modules of the second H-bridge are connected to reverse a voltage based on the battery 84D across both ends of the B-phase coil 562. This allows bi-directional current to be supplied to the B-phase coil 562.

The third H-bridge for the C-phase includes four switch modules. The first switch module includes a power transistor 589 and a diode 58M connected antiparallel thereto. The second switch module includes a power transistor 58A and a diode 58N connected antiparallel thereto. The third switch module includes a power transistor 58B and a diode 58P connected antiparallel thereto. The fourth switch module includes a power transistor 58C and a diode 58Q connected antiparallel thereto.

The first to fourth switch modules of the third H-bridge are connected to reverse a voltage based on the battery 84D across both ends of the C-phase coil 563. This allows bi-directional current to be supplied to the C-phase coil 563.

When a higher torque is required at an RPM equal to or lower than a preset median RPM, the driver (not shown) operates in the maximum-torque increase mode, to supply one-directional current to flow through at least one phase stator coil in accordance with FIG. 6. This creates the magnetic fluxes 275 through at least one tooth to be excited (see (b) of FIG. 75). This creates the required higher torque.

In contrast, when a higher RPM is required, the driver (not shown) operates in the induced flux reduction mode, to supply the other-directional current, which is reversed to the one-directional current, to flow through at least one phase stator coil to thereby create the magnetic fluxes 681 through at least one tooth to be excited (see FIG. 99). This reduces a voltage to be induced across each stator coil to thereby easily drive the reluctance motor at the required higher RPM.

The control devices CC10 and CC11 is configured to, in each of the maximum-torque increase mode and the induced flux reduction mode, supply a unidirectional current to at least one phase stator coil.

When the reluctance motor to be controlled by the control devices CC10 and CC11 is designed as a reluctance motor without using permanent magnets, for example, illustrated in FIG. 1, 9, or 54, the motor characteristics in the maximum-torque increase mode and those in the induced flux reduction mode are identical to each other.

The control circuit CC10 or CC11 can be configured to simultaneously supply unidirectional, currents to respectively a plurality of stator coils through a plurality of paths to thereby create a torque. This can increase a continuous torque of the reluctance motor. Because the unidirectional currents are individually supplied to the plurality of stator coils through the plurality of paths, respectively, it is possible to reduce the total current capacity of the control circuit CC10 or CC11.

For example, in (a) of FIG. 4, when the control circuit CC10 or CC11 supplies a negative current to the positive B-phase winding A0F in its reversed direction and a positive current to the negative B-phase winding A0J in its reversed direction, it is possible to further increase a torque. In (b) and (d) of FIG. 4, even if the control circuit CC10 or CC11 did supply a negative current to a positive phase winding of the remaining one-phase coil in its reversed direction and a positive current to a negative phase winding thereof in its reversed direction, a torque created by the reluctance motor could not be increased.

In (c) of FIG. 4, the control circuit CC10 or CC11 supplies a negative current to the positive C-phase winding A0H in its reversed direction and a positive current to the negative C-phase winding A0E in its reversed direction, thus further increasing a torque.

When the control circuit CC10 or CC11 is applied to each of the reluctance motors each equipped with permanent magnets, it is more particularly to improve an average torque.

For example, let us consider that the control circuit CC10 or CC11 is applied to the reluctance motor illustrated in FIG. 23.

In this application, at the rotational position θr of the rotor 2 illustrated in FIG. 23, in order to create a torque in the CCW, the control circuit CC10 or CC11 supplies an A-phase current Ia to flow through the A-phase coil A0D and A0G, and supplies a C-phase current Ic to flow through the C-phase coil A014 and A0E. This creates a torque in the CCW.

At that time, the control circuit CC10 or CC11 further supplies a negative current −Ib to the positive B-phase winding A0F in its reversed direction and a positive current Ib to the negative B-phase winding A0E in its reversed direction. This further increases the created torque in the CCW. This modification reduces Joule loss, and totally increases a continuous torque to rotate the rotor because the control circuit CC10 or CC11 supplies direct currents to individually the three-phase coils, respectively.

Next, when the control circuit CC10 or CC11 is applied to the reluctance motor illustrated in FIG. 73 or 76, it is possible to further create a torque. Because the control circuit CC10 or CC11 supplies direct currents to individually the three-phase coils, respectively, it is possible to reduce Joule loss, and totally increase a continuous torque to rotate the rotor.

The increasing in a torque to be created by the reluctance motors according to the first embodiment is effectively used for various applications, particularly, an application in which an installation space for the motor is limited.

Note that, in the structure of the reluctance motor illustrated in either FIG. 99 or FIG. 11, when no currents are supplied to flow through three-phase stator coils, no magnetic fluxes are created in the rotor, and therefore, no iron loss occurs even if the rotor is rotated. That is, no drag torque occurs so that no losses occur. This is an important feature when the reluctance motor is operated at lower loads. In addition, let us consider that the reluctance motor illustrated in FIG. 99 or 100 is installed in a hybrid vehicle. When the hybrid vehicle is driven by an internal combustion engine at a high speed, the reluctance motor is rotated with rotation of the internal combustion engine. That is, in hybrid vehicles, it is very important that losses of a reluctance motor installed in them are zero even if the reluctance motor is rotated with rotation of the internal combustion engine.

Next, applications of reluctance motors equipped with permanent magnets will be described hereinafter.

FIG. 23 and FIG. 27 show the reluctance motors equipped with permanent magnets. The permanent magnets installed in each of the reluctance motors improve a torque to be created thereby and an efficiency thereof.

In the reluctance motors equipped with permanent magnets according to the first embodiment, a control circuit according to the first embodiment is designed to supply a unidirectional current to flow through at least one phase coil in a direction in which a corresponding one of the permanent magnets is magnetized. This rotatably drives a reluctance motor while applying magnetomotive force thereto.

In contrast, in conventional permanent magnet motors, during accelerated or decelerated, magnetomotive force is applied to a permanent magnet motor in a direction in which a corresponding one of the permanent magnets is demagnetized. For this reason, as each of the permanent magnets, a specific permanent magnet having a thickness enough not to be demagnetized or an expensive permanent magnet difficult to be demagnetized need be used. This however may cause a costly problem.

In contrast, the reluctance motors equipped with permanent magnets according to the first embodiment are controllable by a unidirectional current in only a direction in which no demagnetization occurs in each of the permanent magnets. For this reason, it is possible to use an inexpensive permanent magnet with a poor demagnetizing resistance or a permanent magnet with a thin thickness as each of the permanent magnet to be installed in reluctance motors according to the first embodiment.

However, in the reluctance motors equipped with permanent magnets according to the first embodiment, a control device can supply a unidirectional current to each stator coil in a direction in which at least one of a plurality of permanent magnets is demagnetized. In addition, there is a further requirement to demagnetize each of the permanent magnets at a higher RPM to reduce the flux density thereof.

In order to address these circumstances, a control device for a reluctance motor with permanent magnets according to the first embodiment is installed with means for magnetizing/demagnetizing each of the permanent magnets installed in the reluctance motor.

Specifically, a plurality of permanent magnets to be installed in reluctance motors according to the first embodiment has a necessary minimum thickness and magnetic characteristics allowed to be relatively easily magnetized and demagnetized.

In addition, the power transistors installed in a control device according to the first embodiment serve as the means for magnetizing/demagnetizing each of the permanent magnets installed in a reluctance motor to be controlled. This reduces the amount of permanent magnets, and, because no hardware elements are required as such magnetizing/demagnetizing means, it is possible to keep the cost of a control device according to the first embodiment unchanged.

As permanent magnets to be installed in reluctance motors according to the first embodiment, various types of permanent magnets can be used. For example, alnico magnets each being an alloy of aluminum-nickel-cobalt can be suitable because they have a high flux density and law coercivity.

Next, an example of means for magnetizing/demagnetizing permanent magnets will be described hereinafter.

For example, at the rotational position θr of the rotor 2 illustrated in FIG. 23, in order to magnetize each of the permanent magnets F68 and F6B, the driver DR of the control device CC turns the second transistor 565 on to thereby supply an B-phase direct current Ib to flow through the B-phase coil A0F and A0J. At the same time, the driver DR of the control device CC turns the third transistor 566 on to thereby supply a C-phase direct current Ic to flow through the C-phase coil A0H and A0E. At that time, the required level of each of the B- and C-phase currents Ib and Ic can be determined according to magnetic characteristics of the reluctance motor illustrated in FIG. 23.

In contrast, in order to demagnetize each of the permanent magnets F68 and F6B, the driver DR of the control device CC turns the first transistor 564 on to thereby supply an A-phase direct current Ia to flow through the A-phase coil A0D and A0G.

Some of permanent magnets to be installed in reluctance motors according to the first embodiment can have characteristics that are difficult to be demagnetized by motor current, and some of the remaining permanent magnets can have characteristics that are prone to be magnetized and demagnetized.

Note that, when magnetizing or demagnetizing some permanent magnets, it is possible to uniformly increase or reduce the intensity of the magnetic field of each of these permanent magnets, or increase or reduce the intensity of the magnetic field of at least one specified permanent magnet in these permanent magnets.

For example, after the magnetizing or demagnetizing of each of the permanent magnets, the control circuit CC rotatably drives the reluctance motor illustrated in, for example FIG. 23 set forth above. If the amount of a current for demagnetizing were insufficient, the current capacitance of each of the first to third transistors 564, 565, and 566 could be increased.

Because an instantaneous current is required to magnetize or demagnetize each permanent magnet, power elements, such as electromagnetic contactors, thyristors, and the like, can be provided to constitute a specific magnetizing and demagnetizing unit, and the special unit can be added to a control circuit according to the first embodiment. For example, the special unit can be arranged in parallel to the inverter of a control circuit according to the first embodiment.

To sum up, in order to magnetize or demagnetize at least one target permanent magnet installed in a reluctance motor, when the rotor is located at a predetermined rotational position optimum to magnetize or demagnetize the target permanent magnet, a control device or such a special unit supplies a current with a preset level to a predetermined stator coil. The preset level is required for the magnetization or demagnetization. The control device or special unit maintains the supply of the current with the preset level to the predetermined stator coil for a necessary minimum time and over. This carries out the magnetization or demagnetization of the target permanent magnet.

In addition, in order to demagnetize at least one target permanent magnet to reduce the flux density of the target permanent magnet during a target high-RPM range, a control device or such a special unit monitors the rotational position of the rotor.

When the rotor is located at a predetermined rotational position optimum to demagnetize the target permanent during the RPM being lower than the target high-RPM range, a control device or such a special unit supplies a current with, a level revel required for the demagnetization to flow through a predetermined stator coil for a necessary minimum time and over. This demagnetizes the target permanent magnet.

Similarly, in order to magnetize at least one target permanent magnet to increase the flux density of the target permanent magnet during a target low-RPM range, a control device or such a special unit monitors the rotational position of the rotor.

When the rotor is located at a predetermined rotational position optimum to demagnetize the target permanent during the RPM being higher than the target low-RPM range, a control device or such a special unit supplies a current with a level revel required for the magnetization to flow through a predetermined stator coil for a necessary minimum time and over. This magnetizes the target permanent magnet.

As described above, a control device according to the first embodiment, such as the control device CC or CC1, is programmed to sequentially carry out the exciting patterns for the stator coils illustrated in FIG. 6 or FIG. 12 according to the rotational position of the rotor to thereby create a continuous torque.

Figure 107:
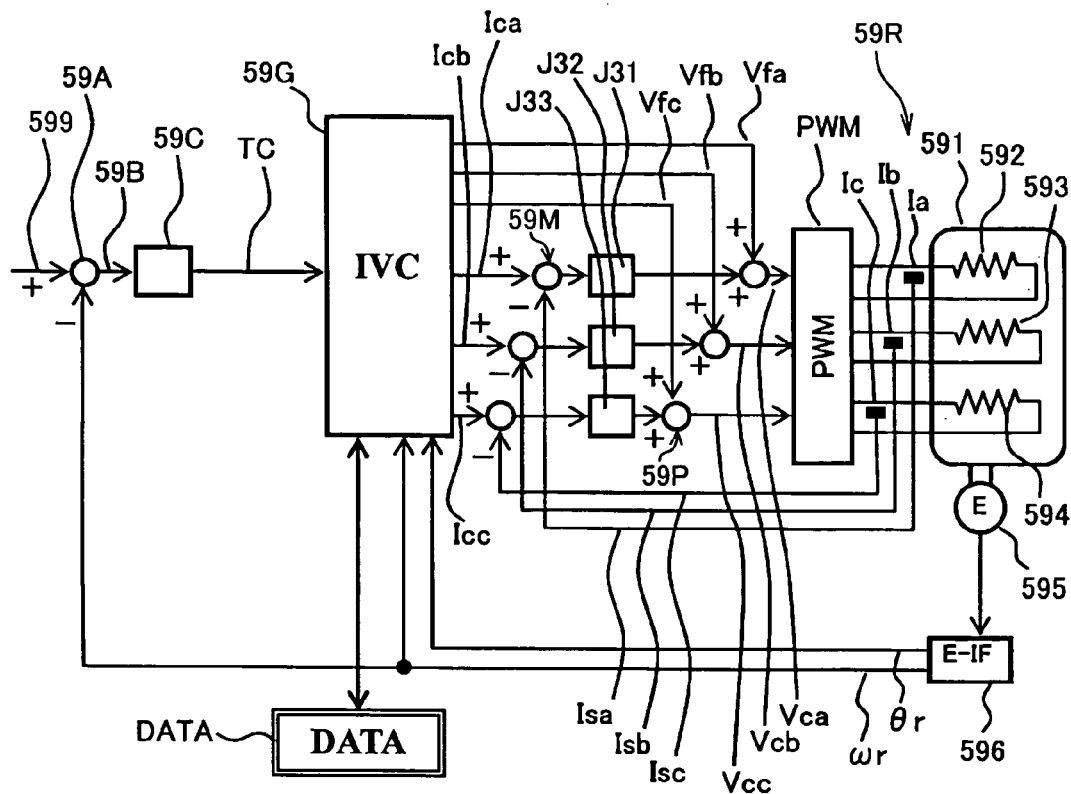
FIG. 107 is a block diagram schematically illustrating an example of the functional structure of a control device according to the first to third embodiments and their modifications.

FIG. 107 schematically illustrates specific functional modules of a control device according to the first embodiment. Note that each of or some of the functional modules included in the control device can be designed as a hardwired logic circuit, programmed logic circuit, or hardwired-logic and programmed-logic hybrid circuit.

Reference character 591 represents a three-phase reluctance motor according to the first embodiment, for example, illustrated in any one of FIGS. 1B, 9, and 54.

The control device for controlling the motor 591 is designed to sequentially excite the three-phase stator coils using the magnetically nonlinear operating area.

Reference characters 593, 594, and 595 represent the A-phase coil, B-phase coil, and C-phase coil, respectively.

The control device illustrated in FIG. 107 includes a position sensor 595, an interface 596 of the position sensor 595, an adder 59A, a compensator 59C, a current-voltage calculator 590, first to third adders 59M, compensators J31, J32, and J33, first to third adders 59M, a PWM (Pulse Width Modulation) amplifier PWM, current sensors 59R, and a database DATA.

The position sensor 595 is operative to continuously detect the rotational position θr of the rotor. The interface 596 is operative to calculate, based on the rotational position θr of the rotor, a rotational speed ωr of the rotor, and output the rotational position θr and the rotational speed ωr.

Reference character 599 represents a speed command signal indicative of a target (desired) speed for the rotor.

The adder (subtractor) 59A is operative to calculate a deviation 59B between the rotational speed ωr and the target speed to thereby output the deviation 59B to the current-voltage calculator 590.

Reference character TC represents a commanded torque (request torque) indicative of a target (desired) torque for the motor 591.

The current-voltage calculator 59G is operative to receive the commanded torque TC, the rotational position θr and the rotational speed ωr. The current-voltage calculator 59G is also operative to calculate, based on the database DATA, A-, B-, and C-phase commanded current values Ica, Icb, and Icc, and A-, B-, and C-phase commanded voltage values Vfa, Vfb, and Vfc. The current-voltage calculator 59G is operative to further output the A-, B-, and C-phase commanded current values Ica, Icb, and Icc, and the A-, B-, and C-phase commanded voltage values Vfa, Vfb, and Vfc.

In addition, the current-voltage calculator 59G is operative to:

calculate an A-phase feedforward value Vfa based on the A-phase commanded current value Ica and the rotational speed ωr, and output the A-phase feedforward value Vfa to the first adder 59P;

calculate a B-phase feedforward value Vfb based on the B-phase commanded current value Icb and the rotational speed ωr, and output the B-phase feedforward value Vfb to the second adder 59P; and calculate a C-phase feedforward value Vfc based on the C-phase commanded current value Icc and the rotational speed ωr, and output the C-phase feedforward value Vfc to the third adder 59P.

On the other hand, each of the current sensors 59R is arranged to measure an instantaneous current value flowing through a corresponding A-, B-, and C-phase coils 592, 593, and 594 of the stator. That is, the current sensors 59R are operative to measure instantaneous A-phase, B-phase, and C-phase current values Isa, Isb, and Isc flowing through the A-, B-, and C-phase coils 592, 593, and 594, respectively. The current sensors 59R are operative to output the measured A-phase, B-phase, and C-phase values Isa, Isb, and Isc to the first to third adders 59M, respectively.

The first adder (subtractor) 59M is operative to calculate a deviation between the measured A-phase value Isa and the A-phase commanded current values Ica, and output, to the compensator J31, the calculated deviation.

The first adder (subtractor) 59M is operative to calculate a deviation ΔIa between the measured A-phase value Isa and the A-phase commanded current values Ica, and output, to the compensator J31, the calculated deviation ΔIa.

The second adder (subtractor) 59M is operative to calculate a deviation ΔIb between the measured B-phase value Isb and the B-phase commanded current values Icb, and output, to the compensator J32, the calculated deviation ΔIb.

The third adder (subtractor) 59M is operative to calculate a deviation ΔIc between the measured C-phase value Isc and the C-phase commanded current values Icc, and output, to the compensator J33, the calculated deviation ΔIc.

The compensator J31 is operative to set, based on the deviation ΔIa, an A-phase commanded voltage Vea.

The compensator J32 is operative to set, based on the deviation ΔIb, a B-phase commanded voltage Veb.

The compensator J33 is operative to set, based on the deviation ΔIc, a C-phase commanded voltage Vec.

For example, each of the compensators J31, J32, and J33 computes a corresponding one of the A-, B-, and C-phase commanded voltages Vea, Veb, and Vec using a proportional, gain term and an integral gain term of a proportional integral feedback algorithm.

The first adder 59P is operative to add the A-phase feedforward value Vfa to the A-phase commanded voltage Vea to thereby obtain an A-phase commanded value Vca. The first adder 59P is also operative to output the A-phase commanded value Vca to the PWM amplifier PWM.

The second adder 59P is operative to add the B-phase feedforward value Vfb to the B-phase commanded voltage Veb to thereby obtain a B-phase commanded value Vcb. The second adder 59P is also operative to output the B-phase commanded value Vcb to the PWM amplifier PWM.

The second adder 59P is operative to add the C-phase feedforward value Vfc to the C-phase commanded voltage Vec to thereby obtain C-phase commanded value Vcc. The second adder 59P is also operative to output the C-phase commanded value Vcc to the PWM amplifier PWM.

The PWM amplifier PWM is operative to modulate pulse widths (ON duties) of a PWM control signal (the train of pulses) for each of the A-, B-, and C-phase commanded value Vca, Vcb, and Vcb in proportional to a corresponding one of the A-, B-, and C-phase commanded value Vca, Vcb, and Vcb. The PWM amplifier PWM is operative to turn on and off each of the power transistors 564, 565, and 566 in accordance with the pulse widths (ON duties) of the pulse signal. This outputs, to each of the A-, B-, and C-phase coils 561, 562, and 563, an amplified average voltage proportional to a corresponding one of the A-, B-, and C-phase commanded value Vca, Vcb, and Vcb.

That is, the PWM amplifier PWM includes a function of a PWM modulator and a function of amplifying power by the power transistors illustrated in FIG. 2 or FIG. 3.

The amplified average voltage proportional to each of the A-, B-, and C-phase commanded value Vca, Vcb, and Vcb is applied to a corresponding one of the A-, B-, and C-phase coils 592, 593, and 594. This allows A-, B-, and C-phase direct current based on the amplified average voltages for respective phases to be supplied to the A-, B-, and C-phase coils 592, 593, and 594, respectively.

Various modulation amplifiers for reducing switching loss of each power transistor or for speeding up the response of each power transistor can be used in place of the PWM amplifier.

The database DATA stores therein data in table format, program format, or equation format. The data represents a function (relationship) between a variable of each of the A-, B-, and C-phase commanded current value Ica, Icb, and Icc, a variable of the commanded torque TC, the rotational position θr of the rotor, and the rotational speed ωr. The data preferably allows the feedforward values Vfa, Vfb, and Vfc to be calculated based on at least one of: each of the A-, B-, and C-phase commanded current values Ica, Icb, and Icc, a variable of the commanded torque TC, the rotational position θr of the rotor, and the rotational speed ωr.

That is, when a value of the commanded torque TC, a value of the rotational position θr of the rotor, and a value of the rotational speed ωr are inputted to the current-voltage calculator 59G, the current-voltage calculator 59G accesses the database DATA based on the inputted data to thereby calculate the A-, B-, and C-phase commanded current values Ica, Icb, and Icc and the feedforward values Vfa, Vfb, and Vfc based on the data stored in the database DATA.

For example, the A-, B-, and C-phase commanded current values Ica, Icb, and Icc are optimally determined to meet the inputted values.

Next, a specific example of how to achieve the database DATA for controlling the reluctance motors according to the first embodiment will be described hereinafter.

For example, let us describe how to achieve the data base DATA for controlling the reluctance motor 110 illustrated in FIG. 1B.

First, in the reluctance motor 110, when the rotor is located at the rotational position of θr while an A-phase current Ia, a B-phase current Ib, and a C-phase current Ic are supplied to the corresponding A-, B-, and C-phase stator windings A0D, A0G, A0F, A0J, A0H, and A0E, nonlinear FEM (Finite Element Method) magnetic-field analysis is carried out so that the number Ψ of flux leakages φx to each of the A-, B-, and C-phase stator windings A0D, A0G, A0F, A0J, A0H, and A0E are calculated.

For example, as illustrated in FIG. 4, when a value Ix of each of the A- and C-phase currents Ia and Ic is supplied to a corresponding one stator winding at the rotor's rotational position of θr of 30 electrical degrees while a value of the B-phase current Ib is zero, the nonlinear FEM magnetic-field analysis is carried out based on the conditions. As a result of the nonlinear FEM magnetic-field analysis, the number Ψ of flux leakages φx to each of the A-, B-, and C-phase stator windings A0D, A0G, A0F, A0J, A0H, and A0E is calculated as Ψ (I, θr). Reference character I represents a current parameter of combinations among the values of three-phase currents Ia, Ib, and Ic. Reference character θr represents an angular parameter of the rotational position of the rotor. Reference character (I, θr) represents a sampling point between each of the A-, B-, and C-phase currents and the rotational position of the rotor.

That is, while the sampling point (I, θr) is changed, the nonlinear FEM magnetic-field analysis is repeatedly carried out so that the number Ψ (I, θr) of flux leakages φx to each phase stator winding at each sampling point (I, θr), and a torque T (I, θr) at each sampling point (I, θr) are calculated.

FIG. 109 schematically illustrates the number Ψ (I, θr) of flux leakage φx to each phase stator winding at each sampling point (I, θr) in table format, which are stored in the database DATA. In FIG. 109, each of the rows represents a value of the current parameter I. For example, a value In at a row represents a combination of the values of three-phase currents Ia, Ib, and Ic. In FIG. 109, each of the columns represents a value of the angular parameter θr. For example, a value θm at a column represents a value of the rotational position corresponding to the value In.

When In is a combination of three-phase currents Ia, Ib, and Ic, reference character Ψ (m, n) represents the number Ψ (Ia, θm) of flux leakages φx to the A-phase stator winding, the number Ψ (Ib, θm) of flux leakages φx to the B-phase stator winding, and the number Ψ (Ic, θm) of flux leakages φx to the C-phase stator winding.

Because the number Ψ (Ia, θm) of flux leakages φx to the A-phase stator winding is given by "Ψ (Ia, θm)=Nw×φa", where Nw represents the number of turns of the A-phase stator winding and φa represents the flux leakage to the A-phase winding, the flux leakage φa to the A-phase winding can be calculated. Similarly, the flux leakage φb to the B-phase winding and the flux leakage φc to the C-phase winding can be calculated.

That is, the flux leakage φa to the A-phase winding, the flux leakage φb to the B-phase winding, and the flux leakage φc to the C-phase winding at each sampling point (I, θr) can be stored in table format in place of or in addition to the table illustrated in FIG. 109.

Note that, when discrete 10 values are determined as typical values of each of the A-, B-, and C-phase currents Ia, Ib, and Ic, all combinations of the 10 values of each of three-phase currents Ia, Ib, and Ic are 1000. However, some combinations of the 10 values of each of three-phase currents Ia, Ib, and Ic, which are not used in normal operations of the reluctance motor, can be omitted.

The range of the angular parameter θr is within 0 to 360 degrees. The three-phase magnetic circuits of the reluctance motor 110 illustrated in FIG. 1B are symmetrical with each other. For this reason, actually used values of the angular parameter θr within 0 to 360 degrees in the total number of the values within 0 to 360 degrees can be omitted as the half, one-third, or one-sixth of the total number of the values within 0 to 360 degrees.

As described above, because the number Ψ (I, θr) of flux leakages φx to each phase stator winding is calculated at each sampling point (I, θr), the number Ψ (Ik, θk) of flux leakages φx to each phase stator winding at an actual operating point (Ik, θk) may not be stored in the database DATA.

Thus, four sampling points (Ik−1, θk−1), (Ik+1, θk−1), (Ik−1, θk+1), and (Ik+1, θk+1) closely adjacent to the actual operating point (Ik, θk) are selected, and the number s (I, θr) of flux leakages φx to each phase stator winding at each of the four sampling points (Ik−1, θk−1), (Ik+1, θk−1), (Ik−1, θk+1), and (Ik+1, θk+1) are extracted from the database DATA.

Then, based on the extracted four flux-linkage numbers Ψ (Ik−1, θk−1), (Ik+1, θk−1), Ψ (Ik−1, θk+1), and Ψ (Ik+1, θk+1), the number Ψ (Ik, θk) of flux leakage φx to each phase stator winding at the actual operating point (Ik, θk) is interpolated.

Similarly, the torque T (Ik, θk) is interpolated based on four torques T (Ik−1, θk−1), T (Ik+1, θk−1), T (Ik−1, θk+1), and T (Ik+1, θk+1).

Next, conversion of the database DATA will be described.

The number Ψ (I, θr) of flux leakage φx to each phase stator winding at each sampling point (I, θr) and the torque T (I, θr)

based on the flux leakage φx at each sampling point (I, θr) are stored in the database DATA.

At that time, based on the database DATA, the current-voltage calculator 590 calculates the A-, B-, and C-phase commanded current values Ica, Icb, and Icc, and A-, B-, and C-phase commanded voltage values Vfa, Vfb, and Vfc so as to meet the commanded torque TC and the rotational position θr.

However, during the reluctance motor being running, it may be difficult to calculate, in real time, the A-, B-, and C-phase commanded current values Ica, Icb, and Icc, and A-, B-, and C-phase commanded voltage values Vfa, Vfb, and Vfc based on the database DATA.

In order to address such a matter, there are two measures.

As the first measure, data stored in the database DATA can be converted into data that allows the current-voltage calculator 590 to easily calculate the A-, B-, and C-phase commanded current values Ica, Icb, and Icc, and A-, B-, and C-phase commanded voltage values Vfa, Vfb, and Vfc.

FIG. 110 schematically illustrates, in table format, data P (TC, θr) at each sampling point (TC, θr), which is associated with the number alt (I, θr) of flux leakages φx to each phase stator winding, at each sampling point (TC, θr). The pieces of data P (TC, θr) at each sampling point (TC, θr) are stored in the database DATA.

The data P (TC, θr) at each sampling point (TC, θr) allows the current-voltage calculator 59G to easily calculate the three-phase commanded current values Ica, Icb, and Icc, and three-phase commanded voltage values Vfa, Vfb, and Vfc.

In FIG. 110, each of the rows represents a value of the torque parameter TC. For example, a value Tn at a row represents a value of the commanded torque TC. In FIG. 110, each of the columns represents a value of the angular parameter θr. For example, a value θm at a column represents a value of the rotational position corresponding to the value Tn.

Because the data P (TC, θr) is calculated at each sampling point (TC, θr), the data P (TC, θr) at an actual operating point (TCk, θk) may not be stored in the database DATA.

Thus, four sampling points (TCk−1, θk−1), (TCk+1, θk−1), (TCk−1, θk+1), and (TCk+1, θk+1) closely adjacent to the actual operating point (TCk, θk) are selected, and the data P (TC, θr) at each of the four sampling points (TCk−1, θk−1), (TCk+1, θk−1), (TCk−1, θk+1), and (TCk+1, θk+1) are extracted from the database DATA.

Then, based on the extracted four pieces of data P (TCk−1, θk−1), P (TCk+1, θk−1), P (TCk−1, θk+1), and P (TCk+1, θk+1), the data P (TCk, θk) at the actual operating point (Ik, θk) is interpolated. Based on the data P (TCk, θk) at an actual operating point (Ik, θk), the three-phase commanded current values Ica, Icb, and Icc, and three-phase commanded voltage values Vfa, Vfb, and Vfc can be calculated.

As the data P (TC, θr) at each sampling point (TC, θr), any one of various pieces of data can be stored in the database DATA.

Information of the three-phase commanded current values Ica, Icb, and Icc allows a torque T (I, θr) at the rotational position θr to be obtained. In addition, in order to calculate the three-phase commanded voltage values Vfa, Vfb, and Vfc, information of a flux-linkage number change rate dΨ/dθr at each sampling point (TC, θr) is stored in the database DATA as the data P (TC, θr) at each sampling point (TC, θr).

In this case, when the three-phase commanded voltage values Vfa, Vfb, and Vfc at an actual operating point (TCk, θk) are calculated, four sampling points (TCk−1, θk−1), (TCk+1, θk−1), (TCk−1, θk+1), and (TCk+1, θk+1) closely adjacent to the actual operating point (TCk, θk) are selected, and the flux-linkage number change rate dΨ/dθr at each of the four sampling points (TCk−1, θk−1), (TCk+1, θk−1), (TCk−1, θk+1), and (TCk+1, θk+1) are extracted from the database DATA.

Then, the flux-linkage number change rate dΨ/dθr at the actual operating point (TCk, θk) is interpolated based on the extracted four flux-linkage number change rate dΨ/dθr (TCk−1, θk−1), dΨ/dθr (TCk+1, θk−1), dΨ/dθr (TCk−1, θk+1), and dΨ/dθr (TCk+1, θk+1).

Thereafter, in accordance with the equation (4), multiplying the flux-linkage number change rate dΨ/dθr (TCk, θk) by the rotational speed or allows the three-phase commanded voltage values Vfa, Vfb, and Vfc at the actual operating point (TCk, θk) to be easily calculated.

Note that, because the number Ψ (I, θm) of the flux linkages is given by "Ψ (I, θm)=Nw×φ (I, θm)" (see the equation (4)), information of the flux-linkage change rate dφ/dθr at each sampling point (TC, θr) can be stored as the data P (TC, θr) at each sampling point (TC, θr).

As the second measure, three-phase commanded voltage values Vfa, Vfb, and Vfc at each sampling point (TC, θr) can be directly stored in the database DATA as the data P (TC, θr) at each sampling point (TC, θr). Based on the three-phase commanded voltage values Vfa, Vfb, and Vfc at each of the sampling points (TCk−1, θk−1), (TCk+1, θk−1), (TCk−1, θk+1), and (TCk+1, θk+1), three-phase commanded voltage values Vfa, Vfb, and Vfc at an actual operating point (TC, θr) can be interpolated.

As described above, the torque T (I, θr) at each sampling point (I, θr) are calculated by repeatedly carrying out the nonlinear FEM magnetic-field analysis. However, the torque T (I, θr) based on the nonlinear FEM magnetic-field analysis is closely matched with the equation (10) or (15). Thus, the torque T (I, θr) at each sampling point (I, θr) can be calculated using the number Ψ (I, θr) at each sampling point (I, θr) in accordance with the equation (10) or (15).

Specifically, even if the torque characteristics of reluctance motors according to the first embodiment are achieved in the nonlinear operating area As in which the soft magnetic material of each of the salient poles of the rotor and that of a corresponding one of the teeth of the stator are magnetically saturated, errors are kept within a very low level. Thus, even if a plurality of permanent magnets are installed in some of reluctance motors according to the first embodiment, it is possible to calculate physical quantities, such as the torque T (I, θr) at each sampling point (I, θr), with little regard to the permanent magnets. This is because, in the first embodiment, the physical quantities handled in the first embodiment can be calculated based on only basis physical quantities, such as voltage, current, magnetic flux, the number of revolutions, and the like.

Previously, inductance motors and transformers had been modeled using inductances L. These induction machines were used in their magnetically linear regions close to 1.6 [T], so that there is little problem even if the values of the inductances L as proportionality constant were regarded as constant values.

Recently however, electrical devices are designed as variable-frequency controlled devices, and in order to meet low-size and cost-saving requirements, they are often used in their magnetically nonlinear regions close to a flux saturation region.

In motors used in their magnetically nonlinear regions, their inductances L are widely changed.

Figure 108:
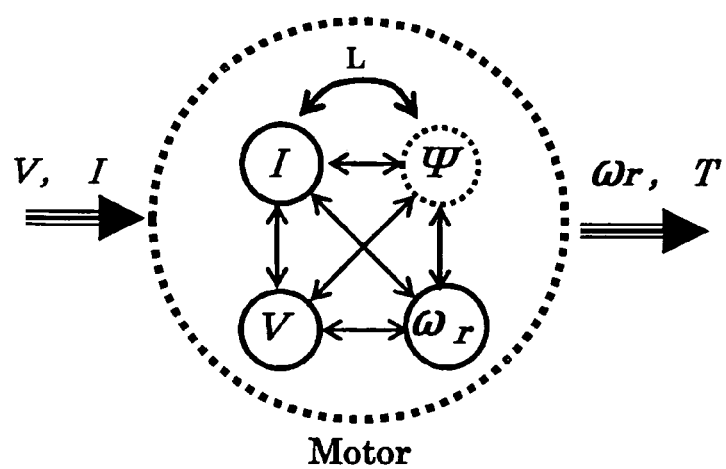
FIG. 108 is a view schematically illustrating a basic electromagnetic model of motors.

In a basic electromagnetic model of motors, as illustrated in FIG. 108, an input voltage V, an input current I, a rotational speed ωr, the number Ψ of flux linkages, and flux linkages φ have relationships represented by the following equations (28) and (29):

$$V = L \times (dI/dt) = Nw \times (d\phi/dt) \quad (28)$$

$$L \times I = Nw \times (d\phi/dt) \quad (29)$$

where dI/dt represents the time rate of change of the input current, and dφ/dt represents the time rate of change of the flux linkage φ

However, when electrical devices are used in their magnetically nonlinear regions, the inductances L do not serve as proportional constant.

As described above, the control methods using the number of flux linkages according to the first embodiment set forth above allow reluctance motors according to the first embodiment to be consistently designed and controlled.

The validity of the control methods using the number of flux linkages has been reported by the inventor of the present application and the like in:

"*Inductance Calculation and New Modeling of a Synchronous Reluctance Motor Using Flux Linkage*" IEEJ Transactions on Industry Applications, February 2007, No. 2, pp. 158-166".

The document discloses that proper torques can be calculated from the number of flux linkages in nonlinear magnetically saturated regions, and proper torques can be calculated based on the number of flux linkages in motors with permanent-magnet installed rotors without regards the permanent magnets. The document also discloses the voltage across each stator winding can be calculated from the number of flux linkages.

Second Embodiment

A reluctance motor according to the second embodiment of the present invention will be described hereinafter with reference to FIGS. 103 and 104.

Like elements between the reluctance motor 110A and the reluctance motor 770 according to the second embodiment, to which like reference characters are assigned, are omitted or simplified in description.

(a), (b), (c), and (d) of FIG. 103 schematically illustrate an example of the structure of the reluctance motor 770 according to the second embodiment of the present invention.

In comparison to the structure of the motor 1 WA illustrated in FIG. 9, the reluctance motor consists of the stator 11F and a rotor J61.

The rotor J61 is designed as a two-salient pole rotor as well as the rotor 11E.

The different point between the rotor J61 and the rotor 11E is that the circumferential electrical angular width Hm of each of the salient poles of the rotor J61 is set to 75 electrical degrees. Note that the circumferential width of each stator pole of the stator 11F is set to 40 electrical degrees, and the circumferential width of the innermost open end of each slot is set to 20 electrical degrees.

A control device, such as control device CC or CC1, according to the first embodiment can be used to control the reluctance motor 770 according to the second embodiment.

Next, a method of controlling the reluctance motor 770 while keeping vibrations and noises at low level will be described hereinafter.

When the rotor J61 is rotated in the CCW in the order of (a), (b), (c), and (d) of FIG. 103, a relationship between each phase current Ia, Ib, and Ic to be supplied to the three-phase coils, torques Ta, Tb, and Tc created by the excited stator coils, and a radial attractive force FSR will be described hereinafter.

At the rotational position θr of the rotor J61 being 30 degrees (see (a) of FIG. 103), the A-phase current Ia is supplied to positively flow through the positive A-phase winding 111 and negatively flow through the negative A-phase winding 114.

Simultaneously, the C-phase current Ic is supplied to positively flow through the positive C-phase winding 115 and negatively flow through the negative C-phase winding 112. No current is supplied to flow through the B-phase coil. The A-phase current Ia is identical in level to the C-phase current Ic.

The A-phase current Ia flowing through the A-phase windings and the C-phase current Ic flowing through the C-phase windings induce a magnetic flux J62 from the tooth 11A to tooth 117. Based on the induced magnetic flux J62, a torque Ta is created in the CCW.

At that time, a radial attractive force FSR based on the magnetic flux J62 acts between the tooth 11A and one salient pole of the rotor 11E and between the tooth 117 and the other salient pole. No magnetic fluxes are created in a direction passing through the stator poles 11C and 119 because the magnetomotive force based on the current Ia and that based on the current Ic are cancelled out.

Figure 104:
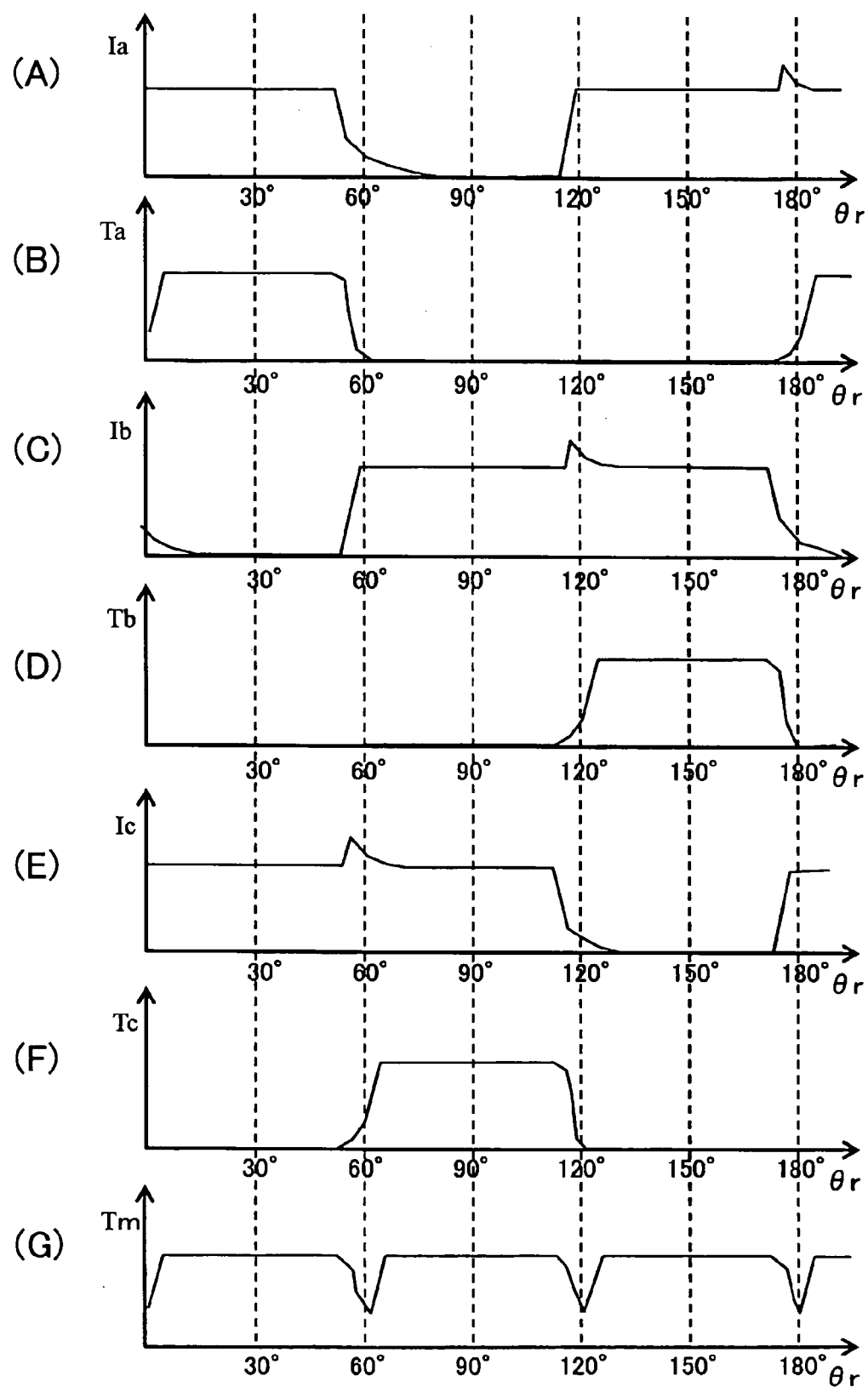
FIG. 104 is a timing chart schematically illustrating an example of exciting patterns for stator windings of the motor illustrated in FIG. 103, and torques created by the excited stator windings.

The three-phase currents Ia, Ib, and Ic, and created torques at the rotational position θr of the rotor J61 are illustrated in FIG. 104.

When the rotor 11E is turned up to the rotational position θr of 50 degrees (see (b) of FIG. 103), a C-phase current component Ic2 is supplied to positively flow through the positive C-phase winding 115 and negatively flow through the negative C-phase winding 112. Simultaneously, a B-phase current component Ib2 is supplied to positively flow through the positive B-phase winding 113 and negatively flow through the negative B-phase winding 116. The C-phase current component Ic2 is identical in level to the B-phase current component Ib2.

The C-phase current component Ic2 flowing through the C-phase windings and the B-phase current component Ib2 flowing through the B-phase windings induce a magnetic flux J63 from the tooth 118 to tooth 118. Based on the induced magnetic flux J63, a torque Tb is created in the CCW.

At that time, when components of the A-phase current Ia and the C-phase current Ic that contribute to create the magnetic flux J62 are zero, the magnetic flux J62 is rapidly changed to the magnetic flux J63 so that the radial attractive force FSR is rapidly reduced. This may cause the stator 11F and the rotor 11E to vibrate.

In order to address such vibrations, the following measurement is used.

At the rotor's rotational position θr of 50 degrees (see (b) of FIG. 103), each of the stator poles 117 and 11A substantially directly faces a corresponding one of the salient poles of the rotor 11E. In the relative arrangement between the stator 11F and the rotor 11E, the magnetic flux J62 creates no torque in the CCW or CW. The range of the rotational position of the rotor 11E from 50 degrees (see (b) of FIG. 103) to 90 degrees (see (d) of FIG. 103) causes the magnetic flux J62 not to contribute the generation of a torque so much in the CCW or CW.

The control device according to the second embodiment is designed to use this feature. Specifically, during the rotor 11E being rotated from its rotational position θr of 50 degrees to that of 90 degrees, the control device supplies an A-phase current component Ia1 to the A-phase windings 111 and 114, and a C-phase current component Ic1 to the C-phase windings 135 and 132. The A-phase current component Ia1 is identical in level to the C-phase current component Ic1.

At that time, the A-, B-, and C-phase currents Ia, Ib, and Ic are represented by the following equations (30), (31), and (32):

$$Ia = Ia1 \quad (30)$$

$$Ib = Ib2 \quad (31)$$

$$Ic = Ic1 + Ic2 \quad (32)$$

This allows the magnetic flux J63 and the magnetic flux J62 to be created. Thus, it is possible to create the torque Tc based on the magnetic flux J63 in the CCW while maintaining an amount of the magnetic flux J62 required to prevent the radial attractive force FSR from rapidly dropping.

At that time, most of magnetic fluxes are undirected to each of the stator pole 11C and 119 because the following equation (33) is established:

$$Ia + Ib + Ic = Ia1 + Ib2 - (Ic1 + Ic2) \quad (33)$$
$$= 0$$

This is because the current components Ia1 and Ic1 are equal to each other, and the current components Ib2 and Ic2 are equal to each other.

At the rotor's rotational position θr of 75 degrees (see (c) of FIG. 103), the same situation in (b) of FIG. 103 is established, but each of the salient poles of the rotor 11E is gradually away from a corresponding one of the stator poles 117 and 11A.

Thus, the control device gradually reduces the A-phase current component Ia1 to the A-phase windings 111 and 114 and the C-phase current component Ic1 to the C-phase windings 135 and 132 to thereby gradually reduce the amount of the magnetic flux J62. Simultaneously, the control device continuously supplies the C- and B-phase current components Ic2 and Ib2 to the C- and B-phase windings to thereby continuously maintain the torque Tc in the CCW.

At the rotor's rotational position θr of 90 degrees (see (d) of FIG. 103), because the magnetic flux J62 starts to contribute to the generation of a torque, the control device supplies no current components Ia1 and Ic1 to the A- and C-phase windings, respectively. Simultaneously, the control device continuously supplies the C- and B-phase current components Ic2 and Ib2 to the C- and B-phase windings to thereby continuously maintain the torque Tc in the CCW.

Note that, at the rotor's rotational position θr of 90 degrees (see (d) of FIG. 103), when a torque T3 in the CCW is desired, the control device can increase the C- and B-phase current components Ic2 and Ib2 to increase a torque created by the current components Ic2 and Ib2 from the torque T3 to a torque T5 while maintain the supply of the A- and C-phase current component Ia1 and Ic1 each with a very low level to create a tiny torque T4 in the CW. This allows the increase in torque in the CCW from the value T3 to the value T5 to compensate the torque T4 in the CW.

Levels of the A-, B-, and C-phase current components do not necessarily meet the equations (30) to (32), and therefore, the levels of the A-, B-, and C-phase current components can be slightly changed so long as a desired torque T3 in the CCW is created with the radial attractive force being gradually changed.

For example, at the rotor's rotational position θr of 50 degrees (see (b) of FIG. 103) or 75 degrees (see (c) of FIG. 103), the control device can increase in level the C-phase current component Ic2 more than the B-phase current component Ib2. The increase in the current component Ic2 maintains the magnetic flux J62, thus creating a torque in the CCW while restricting the rapid change of the radial attractive force. This method allows no A-phase current components to flow through the A-phase windings.

Vibrations and noises in a motor may appear as functions of resonance frequencies of the motor and its peripheral components. Thus, it is preferable that an increase and decrease of the radial attractive force is controlled as a function of time. Thus, the waveform of each phase current with respect to the rotor's rotational position θr is changed depending on the rotational speed of the rotor 11E.

The situation illustrated in (d) of FIG. 103 is identical to a situation obtained by rotating the situation illustrated in (a) of FIG. 3 in the CCW by 60 degrees. Thus, these operations illustrated in (a) to (d) of FIG. 103 are repeated over a cycle of 60 degrees to thereby continuously rotate the rotor 11E. Thus, because the radial attractive force is gradually reduced during the rotation of the rotor 11E each cycle of 60 degrees, it is possible to reduce vibrations and noises in the motor 770. Note that, in the second embodiment, some phase current components that are not used in terms of torque-generation are supplied to flow through the corresponding stator windings. For this reason, the levels of the three-phase current components can be adjusted in view of the balance between the reduction in vibrations and noises and the increase in motor efficiency.

Note that, in the control method illustrated in FIGS. 103 and 104, torque ripples appear in the continuous torque Tm (see (G) of FIG. 104). The skewing illustrated in FIG. 66 or another measure can reduce such torque ripples.

Third Embodiment

A reluctance motor according to the third embodiment of the present invention will be described hereinafter with reference to FIGS. 105 and 106.

Like elements between the reluctance motor 110 and the reluctance motor 780 according to the third embodiment, to which like reference characters are assigned, are omitted or simplified in description.

(a), (b), (c), and (d) of FIG. 105 schematically illustrate an example of the structure of the reluctance motor 780 according to the third embodiment of the present invention.

In comparison to the structure of the motor 110 illustrated in FIG. 1B, the reluctance motor consists of the stator 4 and a rotor 2X.

The rotor 2X is designed as a four-salient pole rotor as well as the rotor 2.

The different point between the rotor 2X and the rotor 2 is that the circumferential electrical angular width Hm of each of the salient poles of the rotor 2X is set to 45 electrical degrees.

A control device, such as control device CC or CC1, according to the first embodiment can be used to control the reluctance motor 780 according to the third embodiment.

Next, a method of controlling the reluctance motor 780 while keeping vibrations and noises at low level will be described hereinafter.

When the rotor 2X is rotated in the CCW in the order of (a), (b), (c), and (d) of FIG. 105, a relationship between each phase current Ia, Ib, and Ic to be supplied to the three-phase coils, torques Ta, Tb, and Tc created by the excited stator coils, and a radial attractive force FSR will be described hereinafter.

At the rotational position θr of the rotor 2X being 30 degrees (see (a) of FIG. 105), the A-phase current Ia is supplied to positively flow through the positive A-phase winding A0D and negatively flow through the negative A-phase winding A0G.

Simultaneously, the C-phase current Ic is supplied to positively flow through the positive C-phase winding ACTH and negatively flow through the negative C-phase winding A0E. No current is supplied to flow through the B-phase coil. The A-phase current Ia is identical in level to the C-phase current Ic.

The A-phase current Ia flowing through the A-phase windings and the C-phase current Ic flowing through the C-phase windings induce a magnetic flux K12 from the tooth A04 to tooth A01. Based on the induced magnetic flux K12, a torque Ta is created in the CCW.

At that time, a radial attractive force FSR based on the magnetic flux K12 acts between the tooth A01 and one salient pole of the rotor 2X and between the tooth A04 and the other opposing salient pole. No magnetic fluxes are created in a direction passing through the stator poles A06 and A03 because the magnetomotive force based on the current Ia and that based on the current Ic are cancelled out.

Figure 106:
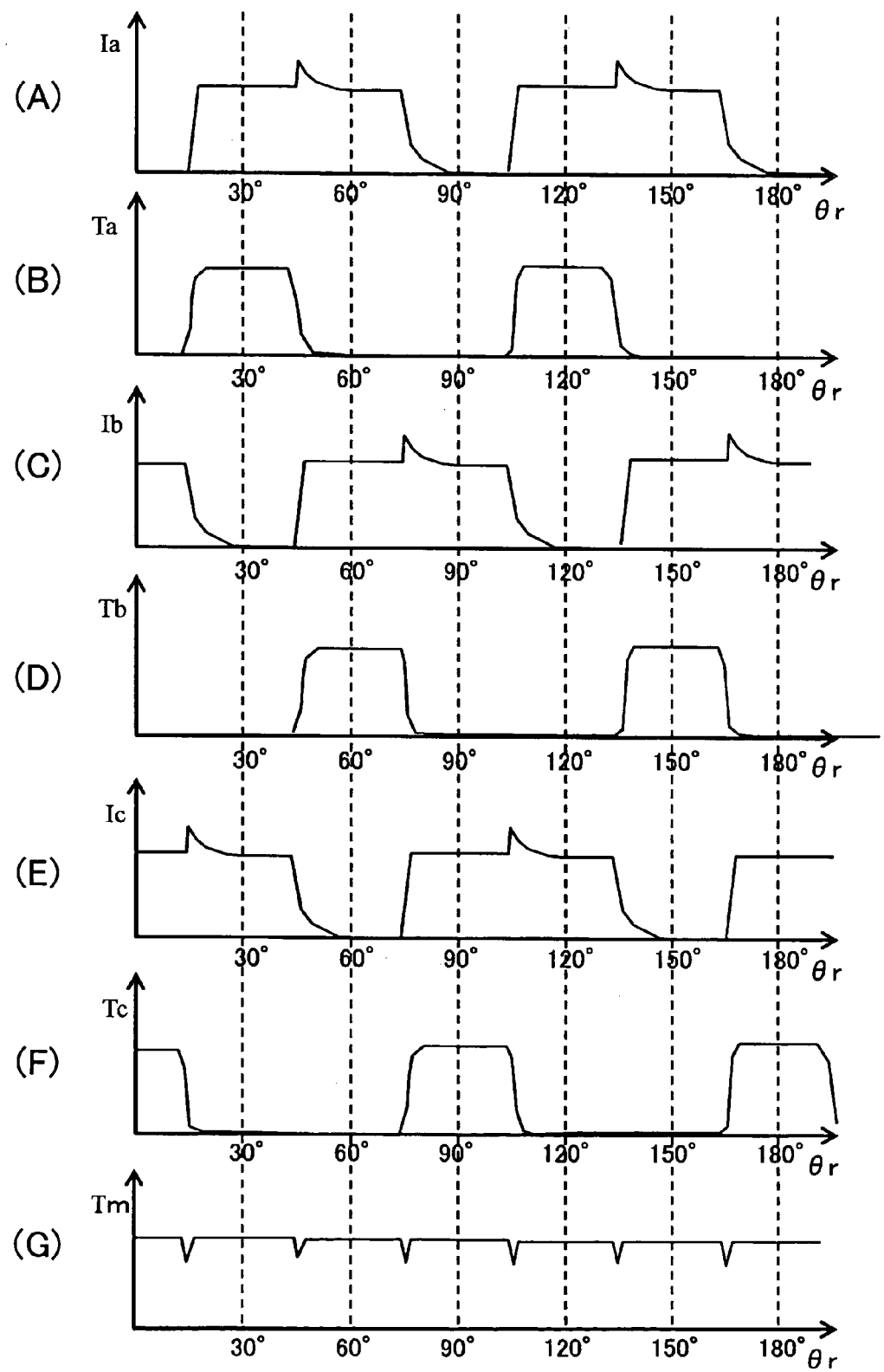
FIG. 106 is a timing chart schematically illustrating an example of exciting patterns for stator windings of the motor illustrated in FIG. 105, and torques created by the excited stator windings.

The three-phase currents Ia, Ib, and Ic, and created torques at the rotational position θr of the rotor 2X are illustrated in FIG. 106.

When the rotor 2X is turned up to the rotational position θr of 45 degrees (see (b) of FIG. 105), an A-phase current component Ia3 is supplied to positively flow through the positive A-phase winding A0D and negatively flow through the negative A-phase winding A0G. Simultaneously, a B-phase current component Ib3 is supplied to positively flow through the positive B-phase winding AF and negatively flow through the negative B-phase winding A0J. The A-phase current component Ia3 is identical in level to the B-phase current component Ib3.

The A-phase current component Ia3 flowing through the A-phase windings and the B-phase current component Ib3 flowing through the B-phase windings induce a magnetic flux K13 from the tooth. A06 to tooth A03. Based on the induced magnetic flux K13, a torque Tb is created in the CCW.

At that time, when components of the A-phase current Ia and the C-phase current Ic that contribute to create the magnetic flux K12 are zero, the magnetic flux K12 is rapidly changed to the magnetic flux K13 so that the radial attractive force FSR is rapidly reduced. This may cause the stator 4 and the rotor 2X to vibrate.

In order to address such vibrations, the following measurement is used.

At the rotor's rotational position θr of 45 degrees (see (b) of FIG. 105), each of the stator poles A01 and A04 substantially directly faces a corresponding one salient pole of the rotor 2X. In the relative arrangement between the stator 4 and the rotor 2X, the magnetic flux K12 creates no torque in the CCW or CW. The range of the rotational position of the rotor 2X from 45 degrees (see (b) of FIG. 105) to 60 degrees (see (c) of FIG. 105) causes the magnetic flux K2 not to contribute to the generation of a torque so much in the CCW or CW.

The control device according to the third embodiment is designed to use this feature. Specifically, during the rotor 2X being rotated from its rotational position θr of 45 degrees to that of 60 degrees, the control device supplies an A-phase current component Ia4 to the A-phase windings A0D and A0G, and a C-phase current component Ic4 to the C-phase windings A0H and A0E. The A-phase current component Ia4 is identical in level to the C-phase current component Ic4.

At that time, the A-, B-, and C-phase currents Ia, Ib, and Ic are represented by the following equations (33), (34), and (35):

$$Ia = Ia3 + Ia4 \quad (33)$$

$$Ib = Ib3 \quad (34)$$

$$Ic = Ic4 \quad (35)$$

This allows the magnetic flux K12 and the magnetic flux K13 to be created. Thus, it is possible to create the torque Tb based on the magnetic flux K13 in the CCW while maintaining an amount of the magnetic flux K12 required to prevent the radial attractive force FSR from rapidly dropping.

At that time, most of magnetic fluxes are undirected to each of the stator pole A02 and A05 because the following equation (36) is established:

$$Ia - Ib - Ic = Ia3 + Ia4 - Ib3 - Ic4 \quad (36)$$
$$= 0$$

This is because the current components Ia3 and Ib3 are equal to each other, and the current components Ia4 and Ic4 are equal to each other.

At the rotor's rotational position θr of 60 degrees (see (c) of FIG. 105), the same situation in (b) of FIG. 103 is established, but one salient pole of the rotor 2X is gradually away from a corresponding stator pole A01 or A04.

Thus, the control device gradually reduces the A-phase current component Ia4 to the A-phase windings A0D and A0G and the C-phase current component Ic4 to the C-phase windings A0H and A0E to thereby gradually reduce the amount of the magnetic flux K12. Simultaneously, the control device continuously supplies the A- and B-phase current components Ia3 and Ib3 to the A- and B-phase windings to thereby continuously maintain the torque Tb in the CCW.

At the rotor's rotational position θr of 75 degrees (see (d) of FIG. 105), the control device supplies a C-phase current component Ic5 to the C-phase windings A0H and A0F, and a B-phase current component Ib5 to the B-phase windings A0F and A0J. The C-phase current component Ic5 is identical in level to the B-phase current component Ib5.

The C-phase current component Ic5 flowing through the C-phase windings and the B-phase current component Ib5 flowing through the B-phase windings induce a magnetic flux K11 from the tooth A02 to tooth A05. Based on the induced magnetic flux K11, a torque Tc is created in the CCW.

In addition, at the rotor's rotational position θr of 75 degrees, the magnetic flux K13 does not contribute to the generation of a torque so much in the CCW or CW.

Thus, the control device gradually reduces the A-phase current component Ia3 to the A-phase windings A0D and A0G and the B-phase current component Ib3 to the B-phase windings A0F and A0J to thereby gradually reduce the amount of the magnetic flux K13 with the radial attractive force FSR being gradually reduced. The gradual reduction in the A- and B-phase current components Ia3 and Ib3 continues so that the A- and B-phase current components Ia3 and Ib3 become zero until the rotational position θr of the rotor 2X reaches 90 degrees.

Figure 115:
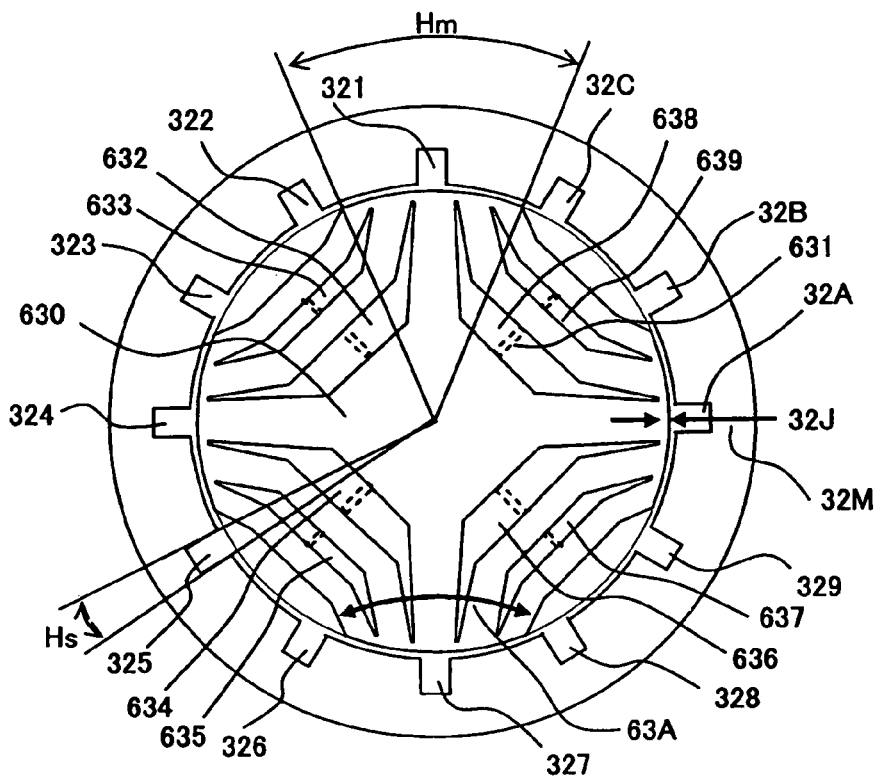

These operations illustrated in (a) to (d) of FIG. 115 are repeated while switching stator poles to be excited to thereby continuously rotate the rotor 2X. In the third embodiment, the levels of some phase current components to create a torque are determined according to the magnitude of load torque, and the remaining current components are determined to prevent the radial attractive force from being rapidly changed and from resonating with peripheral components. Various modifications can be applied to the control method illustrated in FIGS. 105 and 106.

Next, a motor-drive method to be used by the first to third embodiments for alternately switching salient poles of a rotor to create a torque to thereby achieve a continuous torque will be described hereinafter.

For example, the method is applied to a reluctance motor 110 illustrated in FIG. 1B; this reluctance motor 110 has a relationship between the rotor's rotational position θr, each phase current to be supplied to the motor 110, and torques to be created thereby.

The method can be carried out by the control device illustrated in FIG. 107.

The current-voltage calculator 59G stores therein a control algorithm in accordance with the relationship illustrated in FIG. 6.

Specifically, when the commanded torque TC, the rotational position θr and the rotational speed ωr are inputted to the current-voltage calculator 59G, the current-voltage calculator 59G carries out the algorithm to thereby calculate the A-, B-, and C-phase commanded current values Ica, Icb, and Icc, and the A-, B-, and C-phase commanded voltage values Vfa, Vfb, and We based on the relationship illustrated in FIG. 6.

The control algorithm for the reluctance motor 110 illustrated in FIG. 1 is characterized such that one pair of salient rotor poles to create a drive torque is alternately switched to the other pair of salient rotor poles to create a drive torque depending on the rotational position θr of the rotor 2.

Specifically, the control algorithm for a reluctance motor according to any one of the first to third embodiments is characterized to select, according to the rotation of the rotor, some stator poles each of which is close to a corresponding one salient rotor pole, and to excite two stator windings circumferentially adjacent to each of the selected stator poles. A torque is intermittently created by each salient rotor pole, but the created torques by a plurality of salient rotor poles over the rotor are taken as a substantially continuous torque.

Next, another motor-drive method to be used by the first to third embodiments will be described hereinafter. This motor-drive method is characterized to:

alternately switch salient poles of a rotor to create a torque to thereby achieve a continuous torque during a lower RPM range; and while the RPM of the rotor is increase over the lower RMP range, increase a torque to be created by a specific salient rotor pole with a torque to be created by another specific salient pole being reduced.

For example, in the reluctance motor 708 illustrated in FIG. 54, the rotor 340 is provided with the first pair of opposing main salient poles 161 and the second pair of opposing auxiliary salient poles 162. The circumferential width of each of the main salient poles 161 is wider than that of each of the auxiliary salient poles 162.

In order to create a continuous torque by the reluctance motor 708, it is necessary for a control device to excite alternately each main salient pole and each auxiliary salient pole so that each main salient pole and each auxiliary salient pole alternately create a torque.

A relationship between the rotor's rotational position r, each of three-phase currents Ia, Ib, and Ic to be supplied to the motor 708, and torques Ta, Tb, and Tc to be created thereby is illustrated in FIG. 57.

Specifically, during the lower RPM range of the rotational speed of the rotor, the motor-drive method is characterized to select, according to the rotation of the rotor, some stator poles each of which is close to a corresponding one salient rotor pole, and to excite two stator windings circumferentially adjacent to each of the selected stator poles. A torque is intermittently created by each salient rotor pole, but the created torques by a plurality of salient rotor poles over the rotor are taken as a substantially continuous torque.

While the RPM of the rotor is increase over the lower RPM range, the motor-drive method is characterized to:

select at least one stator pole each time the at least one stator pole is close to one main salient rotor pole according to the rotation of the rotor; and successively excite the selected stator poles one by one to thereby create magnetic fluxes such that a direction of one of the created magnetic fluxes is reversed from that of a previously created magnetic flux to thereby continuously pull the one main salient pole according to the rotation of the rotor. This creates a continuous torque to rotatably drive the rotor.

That is, the motor-drive method drives the reluctance motor 708 as if it is designed as the reluctance motor 110A illustrated in FIG. 9.

Figure 112:
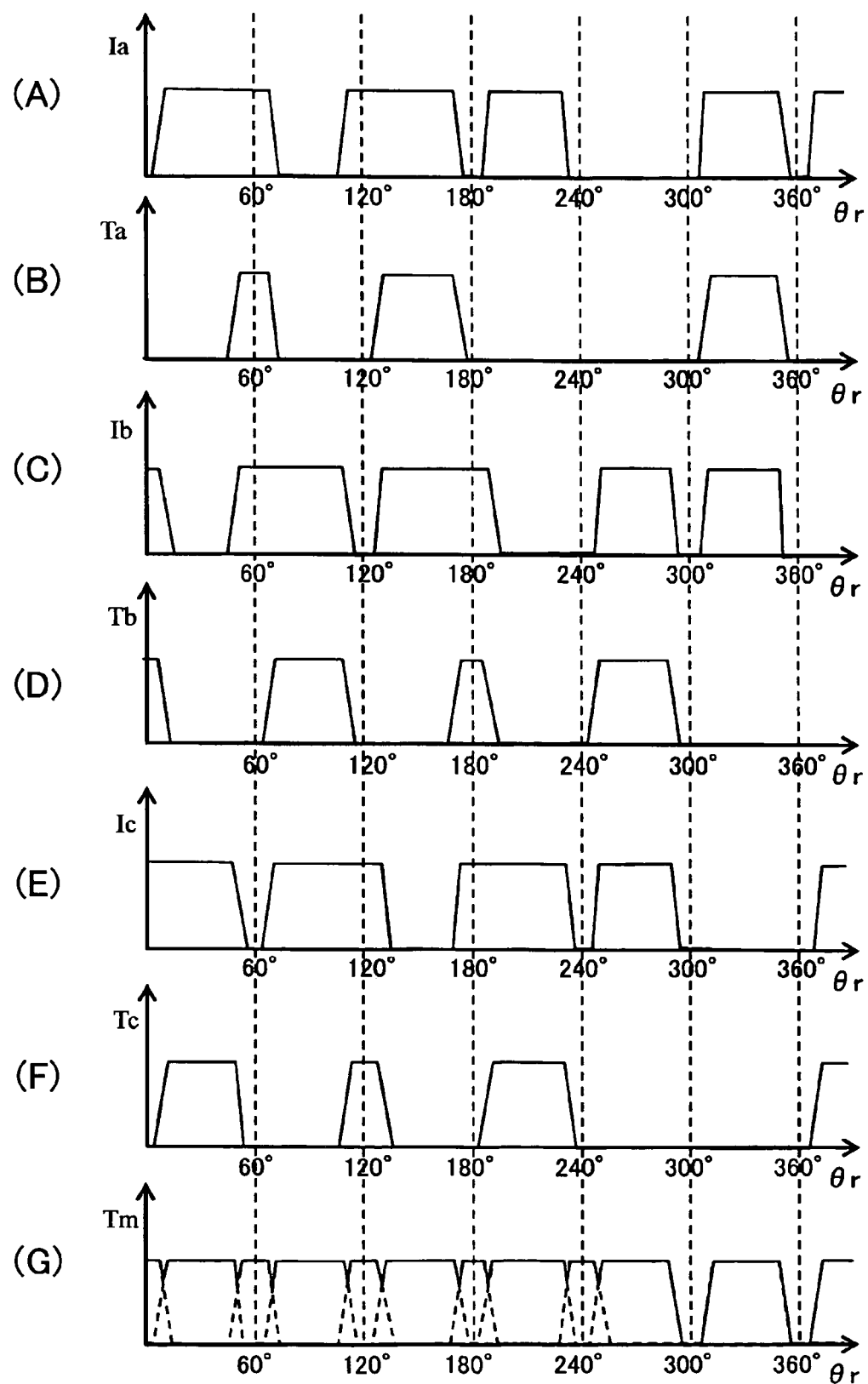
FIG. 112 is a timing chart schematically illustrating another example of exciting patterns for stator windings of a reluctance motor according to the first to third embodiments and their modifications.

In FIG. 112, alternative exciting of the opposing main salient poles and the opposing auxiliary salient poles create torques while the rotational position θr of the rotor is within the range from 0 degrees to 210 degrees.

While the rotational position θr of the rotor is over 210 degrees, the exciting of only each main salient pole creates torques.

Control applied to each phase current can be shifted from the corresponding pattern illustrated in FIG. 57 to the corresponding pattern illustrated in FIG. 12. At a higher RPM, even if torques are intermittently created with intervals therebetween, because the intervals between the created torques are very short, the rotor is idly turned during each interval. Thus, there are no problems in using the reluctance motor 708.

FIG. 113 schematically illustrates an example of the ratio of the number of excitations of the main salient poles to the number of excitations of the auxiliary salient poles.

As the RPM of the rotor is increased in the series of N1, N2, N3, ..., the number of excitations of the main salient poles 161 is increased in the series of R1, R2, R3, ....

In contrast, as the RPM of the rotor is increased in the series of N1, N2, N3, ..., the number of excitations of the auxiliary salient poles 162 is reduced in the series of R5, R6, R7, .... At each of the values N1, N2, and N3 of the RPM, an average torque based on the excited main and auxiliary salient poles is obtained. The ratio of the number of excitations of the main salient poles to the number of excitations of the auxiliary salient poles can be adjusted such that the obtained average torques at the respective values N1, N2, and N3 of the RPM are substantially similar to each other.

Next, a motor-drive method using flux linkage φ and the number Ψ of flux leakages φ illustrated in FIGS. 107, 108, 109, and 110 will be described hereinafter.

As described in the control device illustrated in FIG. 107 or as illustrated in the equation (2), a voltage across a stator winding is mainly in proportional to the time rate of change of the flux linkages (dφ/dt). In addition, as illustrated in the equation (4), a voltage across a stator winding is mainly in proportional to the product of the flux-linkage change rate dφ/dθr to each phase winding with change in the rotational position of the rotor and the rotational speed ωr.

In contrast, the flux leakages φ to each stator winding based on each of the plurality of combinations of three-phase currents Ia, Ib, and Ic are properly calculated by the nonlinear FEM magnetic-field analysis. Based on calculated data of flux leakages ϕ, the flux-linkage change rate dϕ/dθr to each phase winding with change in the rotational position of the rotor is calculated.

This results in that a voltage across each stator winding is properly calculated by the product of the number Nw of turns of a corresponding stator winding and the flux-linkage change rate dϕ/dθr to a corresponding one phase winding with change in the rotational position of the rotor in accordance with the equation (4).

Each of the flux leakages ϕ and the number Ψ of the flux leakages ϕ to each stator winding is a function of the rotor's rotational position θr and each of the three-phase currents Ia, Ib, and Ic. Thus, the flux leakages ϕ and the number Ψ of the flux leakages ϕ to each stator winding are represented by "ϕ (θr, Ia, Ib, Ic)" and "Ψ (θr, Ia, Ib, Ic)", respectively.

At that time, when the rotor's rotational position and each phase current (θr, Ia, Ib, Ic) are changed from (θ1, A1, B1, C1) to (θ2, A2, B2, C2) over a short period of time Δt, a voltage Vx across one stator winding is represented by the following equation (37):

$$Vx = Nwk \times d\varphi/dt \approx Nw \times \left\{ \begin{array}{l} \varphi(\theta 2, A2, B2, C2) - \\ \varphi(\theta 1, A1, B1, C1) \end{array} \right\} / \Delta t \quad (37)$$

Note that θ2 is calculated by adding (Δt×ωr) to θ1. The value of each phase current is a target current value after elapse of Δt, and can be interpolated from the table illustrated in FIG. 110.

As represented by the equation (28), a maximum value of the time rate of change of the input current is limited by a maximum value of a voltage to be applied to the one stator winding. Because the change of the maximum value from the present current values (A1, B1, C1) is limited, the current values (A2, B2, C2) are limited by the limitation.

The voltage Vx represented by the equation (37) includes the first, second, and third components. These first to third components are represented by the equation (28).

The first component VX1 is a component, while each current is constant, based on the change of the flux linkages ϕ according to the rotation of the rotor, which is represented by the equations (1) to (15).

The second component VX2 is a component, when the current values are changed from (A1, B1, C1) to (A2, B2, C2), based on the change of the flux linkages ϕ according to the rotation of the rotor. The second component VX2 is represented by the equation (28), and the inductance L need be obtained by an incremental inductance Linc at an operating paint (A1, B1, C1).

The third component VX3 is a component based on the time rate of change of a magnetic flux ϕt between the stator poles A02 and A05 at the rotor's rotational position θr illustrated in FIG. 1B. At the rotor's rotational position θr illustrated in FIG. 1B, the magnetic flux A0P is induced to create torque in the CCW. In this situation, when the magnetic flux ϕt is created between the stator poles A02 and A05 due to deviations between the A- and C-phase currents Ia and Ic, the third component VX3 is generated.

To sum up, a voltage across each stator winding can be calculated in accordance with the equation (37) when the flux linkages ϕ at each of the rotor's rotational position ϕr and at an operating point of the three-phase currents used to control the motor is obtained. Note that the second component VX2 can be calculated in accordance with the equation (28) when the incremental inductance is obtained at the operating point of the three-phase currents used to control the motor.

A current value and a voltage of each stator winding at each sampling point (TC, θr, ωr), which represents an operating mode of a reluctance motor to be controlled, can be directly stored in a memory as current information IJ for each phase and voltage information VJ for ease phase. Based on the current information IJ and voltage information VJ, optimum current values and voltages at an operating point used to control the reluctance motor can be interpolated. That is, a relationship between current information, flux-linkage information, and torque information of each stator winding is represented as voltage equations of each stator winding. Thus, the relationship can be converted into the current information IJ and voltage information VJ for each phase, and can be stored in a memory.

In accordance with the equation (29), the flux linkages ϕ and the number Ψ of the flux linkages ϕ can be equivalently replaced with nonlinear value of the inductance L, and the voltage and current of each stator winding can be controlled by the nonlinear values of the inductance L.

Figure 111:
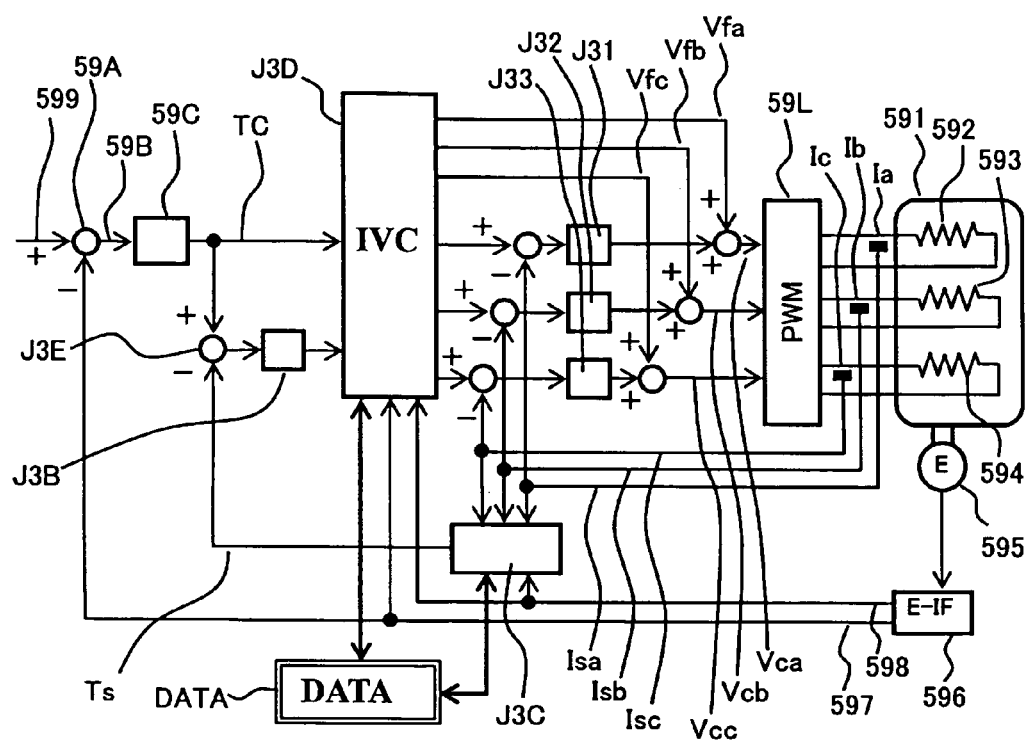
FIG. 111 is a block diagram schematically illustrating a modification of the functional structure of the control device illustrated in FIG. 107.

Next, a control device as a modification of the structure of the control device illustrated in FIG. 107 is illustrated in FIG. 111. The different point between the control device illustrated in FIG. 111 and that illustrated in FIG. 107 is that the control device illustrated in FIG. 111 includes a torque feedback function.

Specifically, the control device illustrated in FIG. 111 includes a torque estimator J3C, an adder J3E, a compensator J3B, and a current-voltage calculator J3D in place of the current-voltage calculator 59G.

The torque estimator J3C is operative to receive the measured A-phase, B-phase, and C-phase values Isa, Isb, and Isc and the rotational position θr, and calculate a torque estimate value Ts. A deviation ΔT between the commanded torque TC and the torque estimate value Te is calculated by the adder J3E.

The compensator J3B is operative to set, based on the deviation ΔT, a torque-error corrected value Tcm. For example, the compensator J3B computes the torque-error corrected value Tcm using a proportional gain term and an integral gain term of a proportional integral feedback algorithm. The compensator J3B is operative to output, to the current-voltage calculator J3D, the toque-error corrected value Tem.

The current-voltage calculator J3D, in addition to the functions of the current-voltage calculator 59G, is operative to:

convert the torque-error corrected value Tcm into a corrected voltage value and a corrected current value;

add, to each of the calculated A-, B-, and C-phase feedforward values Vfa, Vfb, and Vfc, the corrected voltage value; and/or add, to each of the calculated A-, B-, and C-phase commanded current values Ica, Icb, and Icc, the corrected current value.

As described above, even if power-supply voltage change due to, for example, temperature change, and/or errors of the motor parameters set forth above caused errors in an output torque, it would be possible to:

feedback the torque errors; and correct, based on the torque errors, the calculated A-, B-, and C-phase feedforward values Vfa, Vfb, and Vfc and/or the calculated A-, B-, and C-phase commanded current values Ica, Icb, and Icc.

This improves the accuracy of controlling the reluctance motor by the control device, making it possible to carry out high-accuracy and high-response control of reluctance motors.

In the first to third embodiments and their modifications, each of the rotors can be designed as a flux-barrier rotor.

Figure 114:
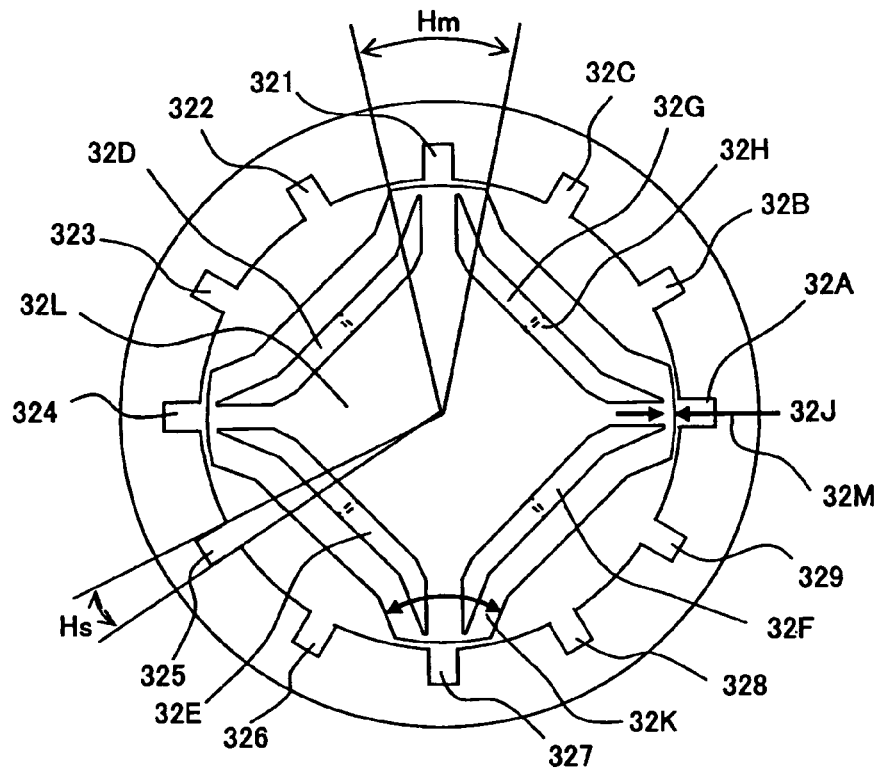
FIG. 114 is a lateral cross sectional view schematically illustrating an example of the structure of a reluctance motor (12S4R motor) according to the first to third embodiments and their modifications.

FIG. 114 schematically illustrates an example of the structure of a reluctance motor (12S4R motor).

The 12S4R motor is provided with a twelve-pole stator and a four-pole rotor.

The stator includes a stator core. The stator core consists of an annular back yoke and twelve slots 321, 322, 323, 324, 325, 326, 327, 328, 329, 32A, 32B, and 32C circumferentially arranged at equal pitches therebetween. These equal-pitched slots provide twelve teeth (stator poles).

The stator also includes A-, B-, and C-phase stator coils. When the A-phase coil is formed in the stator core in the wave winding, the positive windings of the A-phase coil are disposed in the slots 321 and 32A, respectively, and the negative windings of the A-phase coil are disposed in the slots 324 and 32A, respectively.

When the B-phase coil is formed in the stator core in the wave winding, the positive windings of the B-phase coil are disposed in the slots 323 and 329, respectively, and the negative windings of the B-phase coil are disposed in the slots 326 and 32C, respectively.

When the B-phase coil is formed in the stator core in the wave winding, the positive windings of the B-phase coil are disposed in the slots 323 and 329, respectively, and the negative windings of the B-phase coil are disposed in the slots 326 and 32C, respectively.

When the C-phase coil is formed in the stator core in the wave winding, the positive windings of the C-phase coil are disposed in the slots 325 and 32B, respectively, and the negative windings of the C-phase coil are disposed in the slots 328 and 322, respectively.

The rotor consists of a soft magnetic material rotor core with four salient poles 621 circumferentially arranged at equal pitches therebetween. The rotor core is arranged such that its outer circumference is opposite to the inner circumference of the stator with an air gap therebetween.

The rotor also consists of four chordal flux barriers 321, 32E, 32F, and 32G punched out in slit by, for example, press working. The four flux barriers 32D, 32E, 32F, and 32G are symmetrically arranged with respect to the axial direction of the output shaft 1 such that:

each of the four flux barriers 32D, 32E, 32F, and 32G is circumferentially spaced apart from another adjacent flux barrier; and both ends of each of the flux barriers 32D, 32E, 32F, and 32G extend with being gradually narrowed toward a corresponding one of the salient poles 621 with predetermined thin edges thereof left between the both, ends and the outer periphery (see arrow 32K).

The four flux barriers 32D, 32E, 32F, and 32G provide four magnetic paths therebetween up to the four salient poles 621, respectively. The four flux barriers 32D, 32E, 32F, and 32G increase magnetic resistance therein to separate magnetic fluxes, and prevent biased magnetic fluxes at respective salient poles 621.

Operations and advantages of the 12S4R motor are substantially identical to the reluctance motor 110 illustrated in FIG. 1B.

FIG. 115 is a modification of the 12S4R motor illustrated in FIG. 114.

As a different point from the 12S4R motor illustrated in FIG. 114, a rotor of the modification consists of four groups of chordal flux barriers (632, 633), (634, 635), (636, 637), and (638, 639) punched out in slit by, for example, press working. The four groups of chordal flux barriers (632, 633), (634, 635), (636, 637), and (638, 639) are symmetrically arranged with respect to the axial direction of the output shaft 1 such that:

each of the four groups of the flux barriers (632, 633), (634, 635), (636, 637), and (638, 639) is circumferentially spaced apart from another group;

the flux barriers of each of four groups are aligned in a corresponding radial direction of the rotor core at intervals therebetween; and both ends of each flux barrier of the four groups extend with being gradually narrowed toward a corresponding one of the salient poles 621 with predetermined thin edges thereof left between the both ends and the outer periphery (see arrow 63A).

In addition, the circumferential width of each salient pole 621 according to the modification is longer than that of each salient pole 621 of the 12S4R motor illustrated in FIG. 114.

Operations and advantages of the 12S4R motor are substantially identical to the reluctance motor 110 illustrated in FIG. 1B.

In each flux barrier, a magnetic join 631 can be inserted to address centrifugal force.

Figure 116:
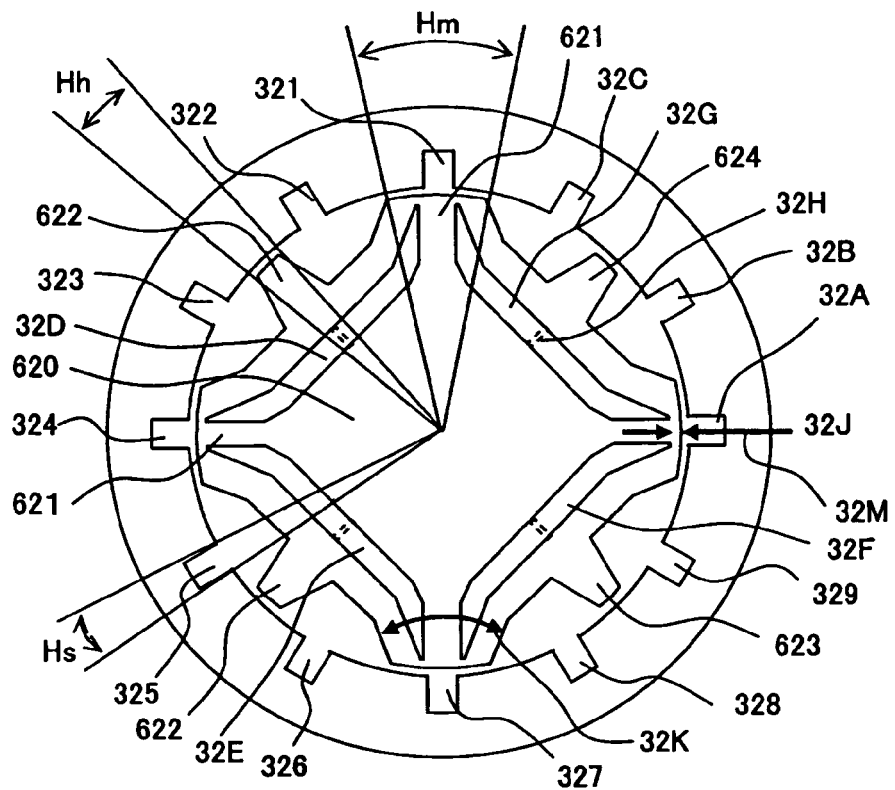

FIG. 116 is another modification of the 12S4R motor illustrated in FIG. 114.

As a different point from the 12S4R motor illustrated in FIG. 114, a rotor of this modification includes four auxiliary salient poles 624 each disposed between a corresponding circumferentially adjacent pair of salient poles 621. The circumferential width of each salient pole 621 is longer than that of each auxiliary salient pole 624. The salient poles 621 will be referred to as "main salient poles".

Features of the modification illustrated in FIG. 116 based on the main salient poles 621 and the auxiliary salient poles 624 are substantially identical to the reluctance motor 708 illustrated in FIG. 54.

Figure 117:
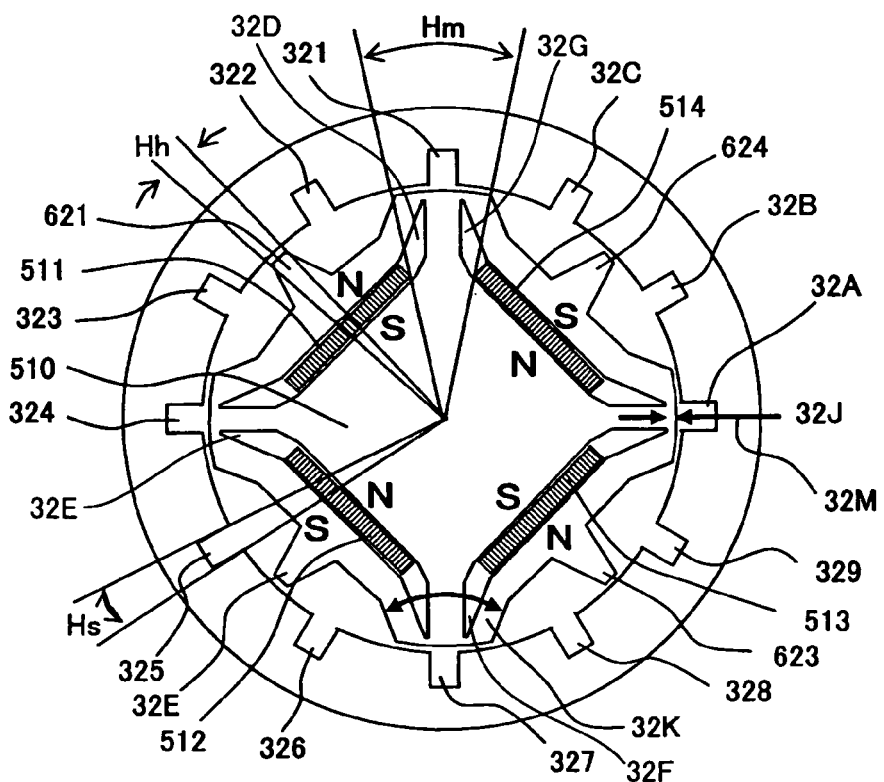

As a modification of the reluctance motor illustrated in FIG. 116, four permanent magnets 511, 512, 513, and 514 can be disposed in the slits 32D, 32E, 32F, and 32G, respectively, so as to increase a torque to be generated by the reluctance motor (see FIG. 117).

Next, a method of detecting the rotor's rotational position θr based on the inductance of a reluctance motor, each phase current, and a voltage across each stator winding will be described hereinafter. This method is called "sensorless position detection method" or "sensorless speed detection method".

Figure 118:
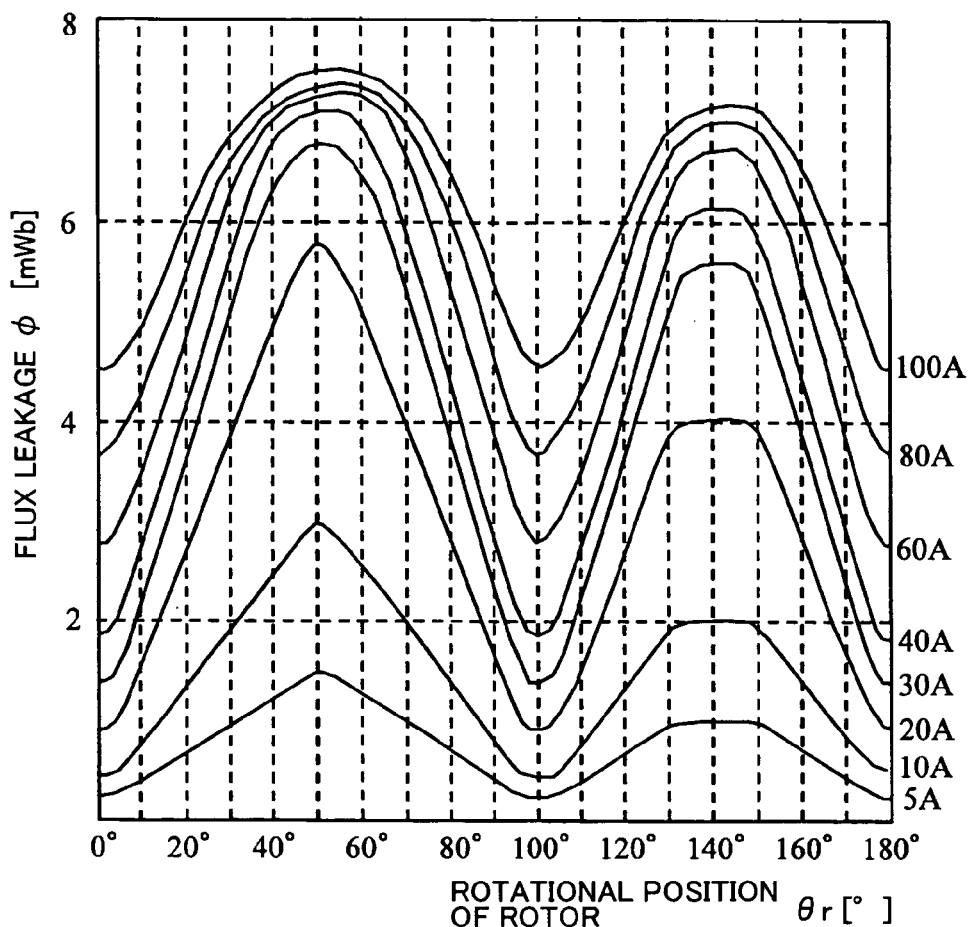

FIG. 118 schematically illustrates relationships between flux linkages φ to each of the A- and C-phase windings of a motor model and each of A- and C-phase currents Ia and Ic. The relationships have been obtained by the nonlinear FEM magnetic-field analysis while a value of each of the A- and C-phase currents Ia and Ic is changed and the rotational position θr of the rotor is changed. The motor model has a structure similar to the structure of the reluctance motor illustrated in FIG. 54 or 55.

Note that the motor model has fourteen stator poles, and the circumferential width Hm of each main salient pole 172 is set to 40 electrical degrees. In addition, the circumferential width Hh of each auxiliary salient pole 173 is set to 20 electrical degrees.

For the sake of simplicity, the method will be described hereinafter using the two-pole motor model illustrated in FIG. 54 and the flux-leakage versus current characteristic curves illustrated in FIG. 114.

As illustrated by the flux-leakage versus current characteristic curves, the flux linkages φ are increased with increase in the rotor's rotational position from 0 degrees to 50 degrees so that a torque in the CCW is created. In contrast, the flux linkages φ are reduced with increase in the rotor's rotational position from 50 degrees to 100 degrees so that a torque in the CW is created.

At the rotor's rotational position θr of 100 degrees, each auxiliary salient pole 162 is located close to a corresponding one of the stator poles 117 and 11A. For this reason, the flux linkages φ are increased with increase in the rotor's rotational position from 100 degrees to 140 degrees so that a torque in the CCW is created. In contrast, the flux linkages φ are reduced with, increase in the rotor's rotational position from 140 degrees to 180 degrees so that a torque in the CW is created.

That is the flux-leakage versus current characteristic curves illustrated in FIG. 118 are substantially cyclic curves.

In addition, a current to be supplied to each phase stator winding and a created torque have a relationship illustrated as the typical current-torque characteristic curve in FIG. 5, and are expressed by the equation (10) or (15). Thus, a torque is in proportional to the gradient of a corresponding one characteristic curve and a corresponding value of each of the A- and C-phase currents. That is, the gradients of the respective characteristic curves at a same low current region are increased with increase in the value of the A- and C-phase currents.

In this motor model, the characteristic curves achieved when C- and B-phase currents Ic and Ib are supplied to flow through the C-phase windings 115 and 112 and the B-phase windings 113 and 116, respectively, are delayed in phase by 120 electrical degrees from the characteristic curves illustrated in FIG. 118. Similarly, the characteristic curves achieved when B- and A-phase currents Ib and Ia are supplied to flow through the B-phase windings 113 and 116 and the A-phase windings 111 and 114, respectively, are delayed in phase by 240 electrical degrees from the characteristic curves illustrated in FIG. 118.

Thus, the supply of a direct current with a preset level to each of two-phase stator windings in the three-phase stator windings allows three types of characteristic curves to be obtained. These three characteristic curves include the first characteristic curves illustrated in FIG. 118, the second characteristic curves delayed in phase by 120 electrical degrees from the first characteristic curves, and the third characteristic curves delayed in phase by 240 electrical degrees from the first characteristic curves.

Figure 119:
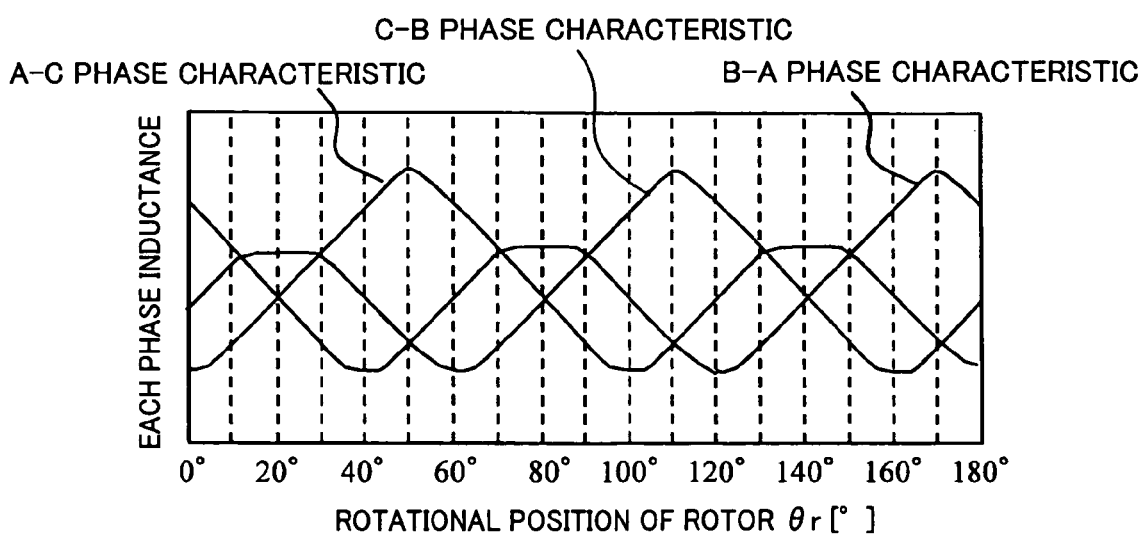

In addition, a characteristic curve of each of inductances La and Lc achieved when the A- and C-phase windings are excited by a same level current is substantially similar to the cyclic characteristic curves illustrated in FIG. 118; these characteristic curves of each of inductances La and Lc are illustrated in FIG. 119 as A-C phase characteristic curve. The horizontal axis represents the rotor's rotational position θr.

Similarly, a characteristic curve of each of inductances Lc and Lb achieved when the C- and B-phase windings are excited by a same level current is illustrated in FIG. 119 as C-B phase characteristic curve. A characteristic curve of each of inductances Lb and La achieved when the B- and C-phase windings are excited by a same level current is illustrated in FIG. 119 as B-A phase characteristic curve.

These A-C phase, C-B phase, and B-A phase characteristic curves have relatively phase differences of 60 electrical degrees therebetween. The cycle of each of the A-C phase, C-B phase, and B-A phase characteristic curves is 180 electrical degrees.

The first to third characteristic curves and the inductance characteristic curves illustrated in FIG. 119 are some of typical characteristic curves of the motor model achieved when same-level direct currents are simultaneously supplied to flow through any two of the three-stator windings. That is, other characteristic curves of the motor model achieved when a direct current is supplied to flow through any one of the three-stator windings and achieved when same-level direct currents are simultaneously supplied to flow through the three-phase stator windings can be prepared.

At least one of these previously prepared characteristic curves of the motor model can be used as information to estimate the rotor's rotational position θr based on a value of a voltage across each stator winding and a value of a direct current to be supplied thereto.

For example, the ratio, with respect to the change in the rotor's rotational position θr, of change of each inductance characteristic curve illustrated in FIG. 119, which is represented as "dL/dθr", can be used to specify an actual value of the rotor's rotational position θr. In other words, gradients of each inductance characteristic curve illustrated in FIG. 119 can be used to specify an actual value of the rotor's rotational position θr.

One specific method of estimating an actual value of the rotor's rotational position θr based on the inductance characteristic curves illustrated in FIG. 119 will be described hereinafter.

First, inductances of the three-phase stator windings at a given value of the rotor's rotational position θr are measured using a method set forth above. Next, checking of these measured inductances with the inductance characteristic curves illustrated in FIG. 119 specifies a value of the rotor's rotational position θr within a range of 0 degrees to 180 degrees. Note that, if values of the inductance characteristic curves at each of two different values of the rotor's rotational, position θr did correspond to the measured inductances, it could be possible to add, each of the two different values of the rotor's rotational position θr, the dL/dθr of the inductance characteristic curves at each of two different values of the rotor's rotational position θr. Otherwise, it could be possible to add, each of the two different values of the rotor's rotational position θr, inductances achieved in another condition.

In addition, an actual value of the rotor's rotational position θr can be simply estimated by two of the three inductance characteristic curves illustrated in FIG. 119. When the motor model is used within a limited RPM range from 500 to 2000 RPM, if a specific value of the rotor's rotational position θr were not measured, it could be possible to estimate the specific value of the rotor's rotational position θr based on the past history. Thus, rotational speed control and current-voltage control for the motor model could be reliably carried out even if a specific value of the rotor's rotational position θr were not measured.

Various reluctance motors according to the first to third embodiments and their modifications each show uniquely magnetic characteristics as well as the motor model illustrated in FIG. 54. Thus, in a reluctance motor according to the first to third embodiments and their modifications, it is possible to estimate an actual value of the rotor's rotational position θr based on the previously prepared magnetic characteristics and actually measured currents or voltages of the three phase stator windings of the reluctance motor. For example, characteristic curves of the reluctance motor 110A illustrated in FIG. 9 equivalent to the characteristic curves illustrated in FIGS. 118 and 119 are simplified. As described above, each of the reluctance motors according to the first to third embodiment and their modifications is made up of a salient pole rotor and a salient pole stator each made of a soft magnetic material. For this reason, each of the reluctance motors according to the first to third embodiment and their modifications has magnetic characteristics similar to those of variable reluctance resolvers. Thus, it is possible to use or apply various position detecting techniques to be used by conventional variable reluctance resolvers.

As a specific method of measuring inductances, a disturbance injection method can be used. The disturbance injection method includes the steps of: injecting, into a drive current or a drive voltage for a motor, a pulse current or voltage as a disturbance for measurement, and obtaining the characteristics illustrated in FIG. 119 based on actually measured current values or voltages. This disturbance injection method allows detection of an actual value of the rotor's rotational position θr based on the characteristics.

Another method includes the steps of: superimposing, into a drive current or a drive voltage for a motor, a current or a voltage with a frequency fx different from the control frequency of the drive current or drive voltage, and selecting signals with the frequency fx from the stator windings so as to obtain the characteristics illustrated in FIG. 119 based on the selected signals. This method allows detection of an actual value of the rotor's rotational position θr based on the characteristics.

A further method is to obtain the characteristics illustrated in FIG. 119 based on a drive voltage for a motor. This method allows detection of an actual value of the rotor's rotational position θr based on the characteristics.

The rotational speed ωr can be estimated from a time rate of change of the estimated rotational position θr, which is represented by "dθr/dt". Another method is to use the fact that the rate of change dφ/dθr of the flux linkages φ to the change in the rotor's rotational position θr is constant ks within a range of the rotor's rotational position θr in which the flux linkages φ vary at a constant gradient. Specifically, this method is to use a voltage Vs across each stator winding within the range to thereby detect the rotational speed ωr.

When a current flowing through a corresponding stator winding of a motor is set to Is, a value ks of the rate of change dφ/dθr of the flux linkages φ to the change in the rotor's rotational position θr is a previously defined inherent value for the motor. For this reason, the rotational speed ωr of the motor can be calculated in the following equations (38) and (39):

$$Vs = Nw \times (d\varphi/dt) \quad (35)$$
$$= Nw \times (d\varphi/d\theta r) \times (d\theta r/dt)$$

$$\omega r = d\theta r/dt \quad (36)$$
$$= Vs/Nw/((d\varphi/d\theta r))$$
$$= Vs/(Nw \times ks)$$

In addition, a specific method of detecting the rotational position and the rotational speed of the rotor of the reluctance motors illustrated in FIGS. 9 and 10 includes the steps of: supplying a constant current to all of the three-phase stator windings corresponding to a given flux density to thereby rotate the rotor, and measuring a voltage across each stator winding to thereby detect the rotational position and the rotational speed of the rotor.

At that time, across each stator winding, a substantially rectangular voltage is created, and therefore, measuring the magnitude of the created voltage and the timing when the polarity thereof is switched detects the rotational position and the rotational speed of the rotor. Because the magnitude of the created voltage is in comparison to the flux density and the rotational speed of the rotor, it is possible to use the detection of the rotational speed of the rotor. A point at which the polarity of the voltage is switched represents a timing when both ends of the outer surface of each rotor pole face both ends of the inner surface of a corresponding one of the stator poles.

Voltage characteristics of a reluctance motor with respect to change of the rotor's rotational position while a current flows through one-phase stator winding can be used to detect the rotational position and rotational speed of the rotor. Voltage characteristics of a reluctance motor with respect to change of the rotor's rotational position while a current with a same level flows through each of two-phase stator windings can also be used to detect the rotational position and rotational speed of the rotor.

As described above, a control device, as illustrated in FIG. 107 or FIG. 111, carries out torque control, rotational speed control, and/or position control of a reluctance motor based on information associated with the rotational position θr and the rotational speed of the rotor; this information is calculated based on a voltage and/or a current of a stator winding of the reluctance motor. This eliminates position detection sensors and wiring and connectors for them, making it possible to increase the reliability of a motor system according to the present invention. This also reduces the motor system in cost and size.

Various embodiments and their modifications have been described in the specification, but further modifications and deformations can be applied to the above-mentioned embodiments and their modifications.

Various configurations and shapes of rotors can be included within the scope of the present invention, and various torque-ripple reduction techniques can be applied to the present invention. For example, the shape of each of the stator poles and the salient rotor poles can be smoothed in the circumferential direction of the rotor, and some of the salient rotor poles can be shifted in the circumferential direction so as to cancel out torque ripple components.

The reluctance motors according to the first to third embodiments and their modifications can be further modified as outer rotor reluctance motors with cylindrical air gaps, axial-gap motors with disc air gaps, or liner motors. The reluctance motors according to the first to third embodiments and their modifications can be further modified such that their air gaps are slightly tapered. Some of the reluctance motors according to the first to third embodiments and their modifications can be combined with each other as dual motors. A part of the reluctance motors according to the first to third embodiments and their modifications can be eliminated.

As soft magnetic materials by which the rotors and stators of the reluctance motors according to the first to third embodiments and their modifications are produced, amorphous electromagnetic steel sheets or powder magnetic cores can be used in place of the electromagnetic silicon steel sheets. The powder magnetic cores can be formed by compressing insulator-coated soft-magnetic powder.

Particularly, in tiny motors, an electromagnetic steel sheet can be punched out, folded, and/or molded to produce three-dimensionally shaped parts to be used as a part of the reluctance motors according to the first to third embodiments and their modifications.

The reluctance motors according to the first to third embodiments and their modifications are designed such that the rotors made up of the laminated steel sheets are rugged. This makes it easy to physically use a higher RPM of the rotors, thus increasing the output of the reluctance motors to a high level. In this use, the outer circumferential shape of each rotor can be shaped in the form of a circle, and similarly, the inner circumferential shape of each stator can be shaped in the form of a circle. This can reduce windage loss. Elimination of spaces in the rotors and stators in their axial directions can be effected to reduce windage loss and/or noise.

The control devices according to the first to third embodiments and their modifications can be applied to multiphase reluctance motors, the number of phases is greater than three. The power transistors can be removed with power elements, such as thyristors or power elements to which new technologies, such as SiC or GaN technologies are applied. Currents to be applied to the reluctance motors can have various waveforms including sinusoidal shapes.

While there has been described what is at present considered to be the embodiments and their modifications of the present invention, it will be understood that various modifications which are not described yet may be made therein, and it is intended to cover in the appended claims all such modifications as fall within the scope of the invention,

What is claimed is:

1. A motor comprising:
    a stationary member provided with, a number M (M is a positive integer) of first poles within 360 electrical degrees at spaces therebetween;
    a plurality of concentrated, full-pitch windings at least partly wound in the spaces, respectively, in the stationary member;
    a movable member movably arranged relative to the stationary member and provided with a number K (K is a positive integer) of second poles, the number K of second poles being different from the number M of first poles; and
    a unidirectional current supply unit that supplies a unidirectional current to at least one of the windings so as to create an attractive force between at least one of the first poles and a corresponding at least one of the second poles to thereby move the movable member relative to the stationary member,
    wherein the unidirectional current supply unit includes at least two current supply paths, and is configured to supply the unidirectional current simultaneously to at least two of the plurality of windings through the at least two current supply paths, respectively, the at least of the windings being cyclically, in a sequential combination, designated by a control device.

2. The motor according to claim 1, wherein the plurality of windings are wound in the stationary member with pitches of 180 electrical degrees therebetween.

3. The motor according to claim 1, wherein the stationary member comprises a stator core having a substantially annular back yoke, each of the plurality of windings is wound around the back yoke through a corresponding one of the spaces, and each of the first poles of the stationary member is made of a soft magnetic material.

4. The motor according to claim 1, wherein the movable member comprises a first rotor and a second rotor, the stationary member comprises a substantially annular stator member, the first rotor being coaxially arranged opposing an inner circumferential surface of the stator member, the second rotor being coaxially arranged opposing a outer circumferential surface of the stator member, the first poles being mounted on each of the inner and outer circumferential surfaces within 360 electrical degrees at the spaces therebetween, the plurality of windings being disposed respectively in the spaces of each of the inner and outer circumferential surfaces, the second poles including first rotor poles and second rotor poles, the first rotor poles being arranged in the first rotor opposing the first poles mounted on the inner circumferential surface of the stator member, the second rotor poles being arranged in the second rotor opposing the first poles mounted on the outer circumferential surface of the stator member.

5. The motor according to claim 4, wherein the stator member comprises a substantially annular shaped first stator core having the inner circumferential surface, and a substantially annular shaped second stator core having the outer circumferential surface, the first and second stator cores being coaxially arranged such that the second stator core surrounds the first stator core.

6. The motor according to claim 1, wherein the movable member is designed to move such that each of the second poles of the movable member passes through in front of the first poles of the stationary member, the second poles of the movable member are spaced at regular pitches therebetween, and, each of the first poles of the stationary member has a surface opposing the movable member is formed with a plurality of projections arranged in parallel to a movement direction of the movable member at regular pitches therebetween, the pitches between the second poles of the movable member are substantially equal to the pitches between the projections of the stationary member.

7. The motor according to claim 1, further comprising a field winding provided in at least one of the first poles of the stationary member.

8. The motor according to claim 1, wherein the movable member is designed to move such that each of the second poles of the movable member passes through in front of the first poles of the stationary member, and, when one of the second poles of the movable member is located close to one of the first poles of the stationary member, the unidirectional current supply unit supplies the unidirectional current to two windings in the plurality of windings, the two windings being located both sides of the one of the first poles of the stationary member, the unidirectional current to be supplied to one of the two windings being opposite in direction from the unidirectional current to be supplied to the other thereof.

9. The motor according to claim 1, wherein the plurality of concentrated, full-pitch windings are grouped into a plurality of phases of windings, at least two of the windings of each phase are connected in series to each other, and the unidirectional current supply unit is configured to supply the unidirectional current to the at least two of the windings of each phase.

10. The motor according to claim 1, further comprising:
    a field winding provided in at least one of the first poles of the stationary member; and
    a rectifier connected to at least one the plurality of windings for rectifying a voltage induced across the at least one of the plurality of windings.

11. The motor according to claim 10, further comprising:
    a field current control unit configured to compare the induced voltage with a given voltage, and adjust a field current to be supplied to the field winding based on a result of the comparison.

12. The motor according to claim 1, wherein the movable member is designed to move such that each of the second poles of the movable member passes through in front of the first poles of the stationary member, and each of the first poles of the stationary member has a surface opposing the movable member, further comprising:
    a permanent magnet mounted on the surface of at least one of the first poles of the stationary member.

13. The motor according to claim 1, further comprising:
    a permanent magnet provided in at least one of the first poles of the stationary member.

14. The motor according claim 1, further comprising:
a permanent magnet provided at least one of in and on at least one of the second poles of the movable member.

15. The motor according claim 1, wherein each of the stationary member and the movable member has any one of a substantially linear shape and a substantially annular shape.

16. The motor according to claim 1, wherein the number M of the first poles of the stationary member is 6, and the number K of the second poles of the movable member is 2.

17. The motor according to claim 1, wherein the number M of the first poles of the stationary member is 6, and the number K of the second poles of the movable member is 4.

18. The motor according to claim 1, wherein the number M of the first poles of the stationary member is 8, and the number K of the second poles of the movable member is 4.

19. The motor according to claim 1, wherein the number M of the first poles of the stationary member is 8, and the number K of the second poles of the movable member is 6.

20. The motor according to claim 1, wherein the number M of the first poles of the stationary member is 10, and the number K of the second poles of the movable member is 4.

21. The motor according to claim 1, wherein the number M of the first poles of the stationary member is 10, and the number K of the second poles of the movable member is 6.

22. The motor according to claim 1, wherein the number M of the first poles of the stationary member is 10, and the number K of the second poles of the movable member is 8.

23. The motor according to claim 1, wherein the number M of the first poles of the stationary member is 12, and the number K of the second poles of the movable member is 10.

24. The motor according to claim 1, wherein the number M of the first poles of the stationary member is 14, and the number K of the second poles of the movable member is 4.

25. The motor according to claim 1, wherein the number M of the first poles of the stationary member is 14, and the number K of the second poles of the movable member is 6.

26. The motor according to claim 1, wherein the number M of the first poles of the stationary member is 14, and the number K of the second poles of the movable member is 8.

27. The motor according to claim 1, wherein the number M of the first poles of the stationary member is 14, and the number K of the second poles of the movable member is 10.

28. The motor according to claim 1, wherein the number M of the first poles of the stationary member is 14, and the number K of the second poles of the movable member is 12.

29. The motor according to claim 1, wherein the movable member is a rotor designed to be rotatable in a circumferential direction about its axial direction relative to the stationary member such that each of the second poles of the rotor passes through in front of the first poles of the stationary member, each of the first poles of the stationary member has a first surface opposing the rotor, and each of the second poles has a second surface opposing the stationary member, a width of the first surface in the circumferential direction being greater in electrical angle than a preset value, a width of the second surface in the circumferential direction being greater in electrical angle than the preset value, the preset value being given in electrical angle by 360/2M.

30. The motor according to claim 1, wherein the movable member is a rotor designed to be rotatable in a circumferential direction about its axial direction relative to the stationary member such that each of the second poles of the rotor passes through in front of the first poles of the stationary member, and each of the second poles has a surface opposing the stationary member, a width of the surface of at least one of the second poles in the circumferential direction being different from that of the surface of another at least one of the second poles of the rotor.

31. The motor according to claim 1, wherein the movable member is a rotor designed to be rotatable in a circumferential direction about its axial direction relative to the stationary member such that each of the second poles of the rotor passes through in front of the first poles of the stationary member, and each of the second poles has a surface opposing the stationary member, further comprising at least one of:
means that changes at least one of: a width of the surface of at least one of the second poles in the circumferential direction, and a position of at least one of the second poles in the circumferential direction; and
means that changes a relative positional relationship between the stationary member and the rotor in the axial direction of the rotor.

32. The motor according to claim 1, wherein the movable member is a rotor designed to be rotatable in a circumferential direction about its axial direction relative to the stationary member such that each of the second poles of the rotor passes through in front of the first poles of the stationary member, each of the first poles of the stationary member has a first surface opposing the rotor, and each of the second poles has a second surface opposing the stationary member, a width of the first surface of at least one of the first poles in the circumferential direction being different from that of the second surface of at least one of the second poles of the rotor.

33. The motor according to claim 1, wherein the movable member is a rotor designed to be rotatable in a circumferential direction about its axial direction relative to the stationary member such that each of the second poles of the rotor passes through in front of the first poles of the stationary member, and each of the second poles of the rotor has one end directed toward the stationary member, further comprising:
at least one projection made of a soft magnetic material and mounted on one side of the one end of at least one of the second poles.

34. The motor according to claim 1, wherein the movable member is a rotor designed to be rotatable in a circumferential direction about its axial direction relative to the stationary member such that each of the second poles of the rotor passes through in front of the first poles of the stationary member, and the first poles, except for a part of the first poles, are circumferentially arranged at equal pitches.

35. The motor according to claim 1, wherein the movable member is a rotor designed to be rotatable in a circumferential direction about its axial direction relative to the stationary member such that each of the second poles of the rotor passes through in front of the first poles of the stationary member, and the second poles of the rotor, except for a part of the second poles, are circumferentially arranged at equal pitches.

36. The motor according to claim 1, wherein the movable member is a rotor designed to be rotatable in a circumferential direction about its axial direction relative to the stationary member such that each of the second poles of the rotor passes through in front of the first poles of the stationary member, each of the first poles of the stationary member has a first surface opposing the rotor, and each of the second poles of the rotor has a second surface opposing the stationary member, either a shape of the first surface of at least one of the first poles or a shape of the second surface of at least one of the second poles is circumferentially skewed.

37. The motor according to claim 1, wherein the movable member is a rotor designed to be rotatable in a circumferential direction about its axial direction relative to the stationary member such that each of the second poles of the rotor passes through in front of the first poles of the stationary member, each of the first poles of the stationary member has one end directed toward the rotor, each of the second poles of the rotor has one end directed toward the stationary member, and either the one end of each of the first poles or the one end of each of he second poles is formed with concave and convex portions.

38. The motor according to claim 1, wherein the movable member is a rotor designed to be rotatable in a circumferential direction about its axial direction relative to the stationary member such that each of the second poles of the rotor passes through in front of the first poles of the stationary member, each of the first poles of the stationary member has a surface opposing the rotor, the surface of each of the first poles has a shape such that its one axial end is greater in the circumferential direction than the other axial end, the first poles are arranged in the circumferential direction such that directions of the one axial ends of the first poles are alternately reversed in the circumferential direction, and the first poles are relatively shifted in the axial direction away from each other to thereby form a space in front of the one end of each of the first poles.

39. The motor according to claim 1, wherein each of the windings has a substantially rectangular shape in its lateral cross section, and each of the windings is wound in a corresponding one of the spaces such that its longitudinal side is arranged to be directed toward the movable member.

40. The motor according to claim 1, further comprising:
a conductive member located any one of close to and inside at least one of one of the first poles and one of the second poles, the conductive member providing a closed circuit for reducing a flux leakage.

41. The motor according to claim 1, wherein at least one of the first poles and second poles is formed with a slit.

42. The motor according to claim 41, further comprising: a conductive member provided in the slit.

43. The motor according to claim 1, further comprising:
a soft magnetic member mounted on either at least one of the first poles or at least one of the second poles.

44. The motor according to claim 1, further comprising:
a permanent magnet mounted on either at least one of the first poles or at least one of the second poles; and
a soft magnetic material so mounted on either at least one of the first poles or at least one of the second poles as to be contacted to the permanent magnet.

45. The motor according to claim 1, further comprising:
a permanent magnet mounted on either at least one of the first poles or at least one of the second poles; and
an exciting winding arranged close to the permanent magnet for exciting a magnetic flux.

46. The motor according to claim 1, wherein the movable member is a rotor designed to be rotatable in a circumferential direction about its axial direction relative to the stationary member such that each of the second poles of the rotor passes through in front of the first poles of the stationary member, and an opening end of each of the spaces faces the rotor, further comprising:
a permanent magnet disposed in the opening end of each of the spaces.

47. The motor according to claim 1, wherein each of the second poles is formed with a slit directed toward another one of the second poles.

48. The motor according to claim 1, wherein the movable member is a rotor designed to be rotatable in a circumferential direction about its axial direction relative to the stationary member such that each of the second poles of the rotor passes through in front of the first poles of the stationary member, and each of the first poles of the stationary member has one end opposing one end of a corresponding one of the second poles of the rotor with an air gap therebetween, the air gap having a magnetic resistance higher than each of the first poles and each of the second poles.

49. The motor according to claim 1, further comprising: a winding wound around at least one of the second poles.

50. The motor according to claim 1, wherein the movable member is a rotor designed to be rotatable in a circumferential direction about its axial direction relative to the stationary member such that each of the second poles of the rotor passes through in front of the first poles of the stationary member, each of the first poles of the stationary member has a first surface opposing the rotor, and each of the second poles has a second surface opposing the stationary member, the first surface of each of the first poles is tapered in the axial direction of the rotor, and the second surface of each of the second poles is tapered in the axial direction, further comprising:
a mechanism configured to change a relative positional relationship between the rotor and the stationary member in the axial direction of the rotor.

51. The motor according to claim 1, wherein each of the plurality of concentrated, full-pitch windings is provided at its one and the other ends with first and second terminals, and is formed at its middle portion with at least one tap, further comprising:
a switching unit configured to select any one of the second terminal and the at least one tap, and apply a voltage across the first terminal and the selected one of the second terminal and the at least one tap.

52. The motor according to claim 1, wherein the movable member is a rotor designed to be rotatable in a circumferential direction about its axial direction relative to the stationary member such that each of the second poles of the rotor passes through in front of the first poles of the stationary member, the spaces are formed as slots in the stationary member in radial directions of the rotor, an opening end of each of the slots faces the rotor, each of the first poles is made of a plurality of soft magnetic materials, and one of the soft magnetic materials forming a portion of each of the first poles facing a corresponding one of the slots is higher in flux density than the remaining soft magnetic materials forming the remaining portion of each of the first poles.

53. The motor according to claim 1, wherein each of the rotor poles is made of an amorphous metal.

54. The motor according to claim 1, wherein the stationary member has a substantially annular shape so that the spaces are formed as slots in the stationary member in radial directions thereof, the movable member is a rotor designed to be rotatable in a circumferential direction about its axial direction relative to an inner circumferential surface of the stationary member such that each of the second poles of the rotor passes through in front of the first poles of the stationary member, each of the slots is radially formed in the stationary member, the plurality of windings are A-, B-, and C-phase first and second windings, the number M of the first poles of the stationary member is 6, a number of the slots is represented by (6.times.Nn/2; Nn is an integer equal to or greater than 4), the slots include twelve slots S1, S2, S3, S4, S5, S6, S7, S8, S9, S10, S11, and S12 circumferentially arranged in this order, the first A-phase winding is wound in the slots S1 and S4 over an outer peripheral portion of the stationary member at one axial end side of the rotor, the first B-phase winding is wound in the slots S9 and S12 over the outer peripheral portion of the stationary member at the one axial end side of the rotor, the first C-phase winding is wound in the slots S5 and S8 over the outer peripheral portion of the stationary member at the one axial end side of the rotor, the second A-phase winding is wound in the slots S7 and slot S10 to be arranged inwardly at the one axial end of the rotor, the second B-phase winding is wound in the slots S3 and S6 to be arranged inwardly at the one axial end side of the rotor, and the second C-phase winding is wound in the slots S11 and S2 to be arranged inwardly at the one axial, end side of the rotor.

55. The motor according to claim 1, wherein the stationary member has a substantially annular shape with an outer peripheral portion constituting a back yoke so that the spaces are formed as slots in the stationary member in radial directions thereof, the movable member is a rotor designed to be rotatable in a circumferential direction about its axial direction relative to an inner circumferential surface of the stationary member such that each of the second poles of the rotor passes through in front of the first poles of the stationary member, each of the slots is radially formed in the stationary member, when each of the stator winding extends from an inside of a corresponding one of the slots to the back yoke at one axial end side of the rotor, each of the slots is shaped to be wider toward the back yoke, and, when each of the winding extends from the inside of a corresponding one of the slots in the circumferential direction at one axial end side of the rotor, each of the slots is shaped to be wider in the circumferential direction.

56. The motor according to claim 1, wherein the stationary member has a substantially annular shape, the movable member is a rotor designed to be rotatable in a circumferential direction about its axial direction relative to an inner circumferential surface of the stationary member such that each of the second poles of the rotor passes through in front of the first poles of the stationary member, each of the slots is radially formed in the stationary member, and at least one of an inner peripheral portion and an outer peripheral portion of the annular-shaped stationary member at one axial end side of the rotor constitutes a back yoke.

57. The motor according to claim 1, wherein the stationary member has a substantially annular shape so that the spaces are formed as slots in the stationary member in radial directions of the rotor, the movable member is a rotor designed to be rotatable in a circumferential direction about its axial direction relative to one circumferential surface of the stationary member such that each of the second poles of the rotor passes through in front of the first poles of the stationary member, each of the slots is radially formed in the stationary member, and one axial end of each of the slots is wider than the remaining portion, further comprising:
  a first insulating member installed in each of the slots and projecting therefrom via the one axial end of a corresponding one of the slots; and
  a second insulating member located close to the one axial end of each of the slots, the first insulating member and the second insulating member being overlapped with each other over the one axial end of each of the slots.

58. The motor according to claim 1, wherein the stationary member includes a substantially annular shaped stator core, the movable member is a rotor designed to be rotatable in a circumferential direction about its axial direction relative to one circumferential surface of the stationary member such that each of the second poles of the rotor passes through in front of the first poles of the stationary member, and the stator core is made up of a plurality of circumferentially separated core segments each having a circumferential width, the circumferential width being an integer multiple of 360 electrical degrees.

59. The motor according to claim 4, further comprising an alternative plurality of windings disposed in the spaces of the outer circumferential surface of the second stator core.

60. The motor according to claim 4, further comprising
  a first pair of bearings rotatably supporting the second rotor at both axial ends of the axial direction; and
  a second pair of bearings rotatably supporting the first rotor at both axial ends of the axial, direction.

61. The motor according to claim 1, wherein the plurality of windings are grouped into a plurality of phases of windings, the plurality of windings of each phase are parallelly wound in corresponding some of the spaces, and the unidirectional current supply unit includes:
  a diode connecting between one end of the parallelly wound windings of each phase and a positive terminal of a power supply source; and
  a transistor connected to the other end of the parallelly wound windings of each phase and to a negative terminal of the power supply source.

62. The motor according to claim 1, wherein the unidirectional current supply unit includes:
  a power supply source having a positive terminal connected to one end of each of the windings;
  a drive transistor connected at a point to the other end of each of the windings and to a negative terminal of the power supply source; and
  a diode connected to the point between the drive transistor and the other end of each of the windings and to the positive terminal of the power supply source.

63. The motor according to claim 1, wherein the unidirectional current supply unit includes:
  a common bipolar transistor with an emitter to which one end of each of the windings is connected; and
  a drive bipolar transistor with a collector to which the other end of each of the windings is connected.

64. The motor according to claim 1, wherein the unidirectional current supply unit includes:
  a pair of drive transistors each with a collector and an emitter, one end of each of the windings being connected to the emitter of one of the drive transistors, the other end of each of the windings being connected to the collector of the other of the windings, the collector of the one of the drive transistors and the emitter of the other end of the windings being connected to a positive terminal and a negative terminal of a power supply source.

65. The motor according to claim 1, wherein the plurality of windings is N-phase windings (N is a positive integer), and the unidirectional current supply unit includes:
  a power supply source having positive and negative terminals; and
  N+1 transistor bridges each comprising a first bipolar transistor and a second bipolar transistor, a collector of the first bipolar transistor of each of the transistor bridges being connected to the positive terminal of the power supply source, a collector of the second bipolar transistor of each of the bridges being connected to an emitter of the first bipolar transistor thereof, an emitter of the second bipolar transistor of each of the bridges being connected to the negative terminal of the power supply source, one end of each of the N-phase windings being connected to the emitter of the first bipolar transistor of a corresponding one of the N of the N+1 transistor bridges, the other end of the N-phase windings being connected to each other to constitute a star configuration, a neutral point of the star configuration being connected to the emitter of the remaining one transistor bridge.

66. The motor according to claim 44, wherein the plurality of windings is N-phase windings (N is a positive integer), and the unidirectional current supply unit includes:

a power supply source having positive and negative terminals; and

N H-bridges, each of the N H-bridges being connected to reverse a voltage based on the power supply source across both ends of each of the N-phase windings to thereby allow bi-directional currents to be supplied to each of the N-phase windings, when causing the motor to output a high torque, the unidirectional current supply unit being configured to select any one of the bi-directional currents to be supplied to each of the N-phase windings so that a magnetic flux at each first pole is directed not to be magnetically saturated, and when reducing a voltage across each of the N-phase windings at a higher movement of the movable member, the unidirectional current supply unit being configured to select any one of the bi-directional currents to be supplied to each of the N-phase windings so that a magnetic flux at each first pole is directed to be magnetically saturated.

67. The motor according to claim 1, wherein the stationary member has a substantially annular shape so that the spaces are formed as slots in the stationary member in radial directions of the rotor, the movable member is a rotor designed to be rotatable in a circumferential direction about its axial direction relative to one circumferential surface of the stationary member such that each of the second poles of the rotor passes through in front of the first poles of the stationary member, each of the slots is radially formed in the stationary member, and the unidirectional current supply unit is configured to:

supply the unidirectional current to one winding of the plurality of windings and the unidirectional current to an alternative winding of the plurality of windings, the one winding and the alternative winding being circumferentially adjacent to each other via one target first pole in the first poles, the direction of the unidirectional current to be supplied to the one winding being opposite to that of the unidirectional current to be supplied to the alternative winding, the one target first pole being excited to create magnetomotive force so as to create the attractive force between the one target first pole and a corresponding one of the second poles, thus creating a torque in a predetermined direction.

68. The motor according to claim 12, further comprising: means for demagnetizing the permanent magnet; and means for magnetizing the permanent magnet.

69. The motor according to claim 1, wherein the stationary member has a substantially annular shape so that the spaces are formed as slots in the stationary member in radial directions of the rotor, the first poles being circumferentially arranged at the slots therebetween, the movable member is a rotor designed to be rotatable in a circumferential direction about its axial direction relative to one circumferential surface of the stationary member such that each of the second poles of the rotor passes through in front of the first poles of the stationary member, each of the slots is radially formed in the stationary member, and the unidirectional current supply unit is configured to:

supply the unidirectional current to each of the windings in a uniquely determined direction so as to excite the circumferentially arranged first poles one by one while alternately reversing a direction of a magnetic flux to be created by each exciting, thus continuously pulling the second poles to create a continuous torque.

70. The motor according to claim 1, wherein the stationary member has a substantially annular shape so that the spaces are formed as slots in the stationary member in radial directions of the rotor, the first poles being circumferentially arranged at the slots therebetween, the movable member is a rotor designed to be rotatable in a circumferential direction about its axial direction relative to one circumferential surface of the stationary member such that each of the second poles of the rotor passes through in front of the first poles of the stationary member, each of the slots is radially formed in the stationary member, and the unidirectional current supply unit is configured to:

during one of the second poles substantially located directly in front of one of the first poles being rotated so as to start to face an alternative one of the first poles adjacent to the one of the first poles, supply, to at least one of the windings, a first current component for creating a first magnetic flux that produces a torque, and supply, to at least one of the windings, a second current component for creating a second magnetic flux that maintains a radial attractive force.

71. The motor according to claim 1, wherein the stationary member has a substantially annular shape so that the spaces are formed as slots in the stationary member in radial directions of the rotor, the first poles being circumferentially arranged at the slots therebetween, the movable member is a rotor designed to be rotatable in a circumferential direction about its axial direction relative to one circumferential surface of the stationary member such that each of the second poles of the rotor passes through in front of the first poles of the stationary member, each of the slots is radially formed in the stationary member, and the unidirectional current supply unit is configured to:

select, according to a rotation of the rotor, some of the first poles each of which is close to a corresponding one of the second poles; and excite two windings circumferentially adjacent to each of the selected first poles in the plurality of windings so that a torque is intermittently created by each of the second poles, the created torques by all of the second poles over the rotor being taken as a substantially continuous torque.

72. The motor according to claim 1, wherein the stationary member has a substantially annular shape, the spaces are formed as slots in the stationary member in radial directions of the rotor, the first poles being circumferentially arranged at the slots therebetween, the movable member is a rotor designed to be rotatable in a circumferential direction about its axial direction relative to one circumferential surface of the stationary member such that each of the second poles of the rotor passes through in front of the first poles of the stationary member, each of the slots is radially formed in the stationary member, and the unidirectional current supply unit is configured to:

select, according to a rotation of the rotor at its rotational speed lower than a preset value, some of the first poles each of which is close to a corresponding one of the second poles;

excite two windings circumferentially adjacent to each of the selected first poles in the plurality of windings so at to create an intermittent torque by each of the second poles, thus producing a substantially continuous torque over the rotor based on the created intermittent torques; and supply, at a rotational speed of the rotor higher than the preset value, the unidirectional current to each of the windings in a uniquely determined direction so as to excite the circumferentially arranged first poles one by one while alternately reversing a direction of a magnetic flux to be created by each exciting, thus continuously pulling the second poles to create a continuous torque.

73. The motor according to claim 1, wherein the stationary member has a substantially annular shape so that the spaces are formed as slots in the stationary member in radial directions of the rotor, the first poles being circumferentially arranged at the slots therebetween, the movable member is a rotor designed to be rotatable in a circumferential direction about its axial direction relative to one circumferential surface of the stationary member such that each of the second poles of the rotor passes through in front of the first poles of the stationary member, each of the slots is radially formed in the stationary member, and the unidirectional current supply unit is configured to:
  create a voltage signal for each of the windings based on information of flux linkages defined by a current flowing through each winding and a rotational position of the rotor; and
  control the unidirectional current to be supplied to each of the windings based on the voltage signal for each of the windings.

74. The motor according to claim 1, wherein the stationary member has a substantially annular shape so that the spaces are formed as slots in the stationary member in radial directions of the rotor, the first poles being circumferentially arranged at the slots therebetween, the movable member is a rotor designed to be rotatable in a circumferential direction about its axial direction relative to one circumferential surface of the stationary member such that each of the second poles of the rotor passes through in front of the first poles of the stationary member, each of the slots is radially formed in the stationary member, and the unidirectional current supply unit stores therein a relationship between: a variable of a torque commanded value, a variable of a rotational position of the rotor, a variable of a rotational speed of the rotor, a variable of a current for each of the windings, and a voltage for each of the windings.

75. The motor according to claim 1, wherein the stationary member has a substantially annular shape so that the spaces are formed as slots in the stationary member in radial directions of the rotor, the first poles being circumferentially arranged at the slots therebetween, the movable member is a rotor designed to be rotatable in a circumferential direction about its axial direction relative to one circumferential surface of the stationary member such that each of the second poles of the rotor passes through in front of the first poles of the stationary member, each of the slots is radially formed in the stationary member, the plurality of windings is N-phase windings (N is a positive integer), and the unidirectional current supply unit is configured to:
  calculate a torque equivalent signal for each phase based on a current signal for each winding and information of a rotational position of the rotor;
  calculate a total torque equivalent signal by calculating a sum of the torque equivalent signals for all phases;
  calculate a torque equivalent error signal based on a difference between a torque commanded value and the total torque equivalent signal; and
  control the bi-directional current to be supplied to each of the N-phase windings and a voltage across each of the N-phase windings based on the torque commanded value and the torque equivalent error signal.

76. The motor according to claim 1, wherein the stationary member has a substantially annular shape so that the spaces are formed as slots in the stationary member in radial directions of the rotor, the first poles being circumferentially arranged at the slots therebetween, the movable member is a rotor designed to be rotatable in a circumferential direction about its axial direction relative to one circumferential surface of the stationary member such that each of the second poles of the rotor passes through in front of the first poles of the stationary member, and each of the slots is radially formed in the stationary member, further comprising:
  means for detecting at least one of a rotational position of the rotor and a rotational speed of the rotor based on a voltage across each of the windings and the bidirectional current to be supplied to each of the windings.

77. The motor of claim 1, wherein
  the motor is a three-phase synchronous reluctance motor provided with a stator and a rotor,
  the stationary motor is provided as the stator,
  the movable member is provided as the rotor, and
  the plurality of concentrated, full-pitch windings are composed of three groups of concentrated, full-pitch windings which correspond, group by group, to the three phases.

78. The motor of claim 77, wherein each of the three groups of concentrated, full-pitch windings for the three-phases includes a plurality of concentrated, full-pitch phase windings connected in series to each other, and the unidirectional current supply unit is configured to simultaneously supply, as the unidirectional current, pulsed unidirectional currents to two of the three groups of concentrated, full-pitch windings respectively at any position in rotational electrical angles of the rotor.

79. The motor of claim 78, wherein the unidirectional current supply unit is configured to repeatedly supply in parallel the pulsed unidirectional currents to the two groups of concentrated, full-pitch windings respectively during the same electrical angle range.

80. The motor according to claim 79, wherein the unidirectional current supply unit includes:
  a power supply source having a positive terminal connected to one end of each of the windings;
  a drive transistor connected at a point to the other end of each of the windings and to a negative terminal of the power supply source; and
  a diode connected to the point between the drive transistor and the other end of each of the windings and to the positive terminal of the power supply source.

81. The motor according to claim 79, wherein the unidirectional current supply unit includes:
  a common bipolar transistor with an emitter to which one end of each of the windings is connected; and
  a drive bipolar transistor with a collector to which the other end of each of the windings is connected.

* * * * *